US011703368B2

(12) United States Patent
Sudou et al.

(10) Patent No.: US 11,703,368 B2
(45) Date of Patent: Jul. 18, 2023

(54) PHYSICAL QUANTITY MEASUREMENT DEVICE

(71) Applicant: DENSO CORPORATION, Kariya (JP)

(72) Inventors: Akiyuki Sudou, Kariya (JP); Hiroshi Tagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 104 days.

(21) Appl. No.: 17/449,684

(22) Filed: Oct. 1, 2021

(65) Prior Publication Data

US 2022/0026252 A1 Jan. 27, 2022

Related U.S. Application Data

(63) Continuation of application No. PCT/JP2020/006709, filed on Feb. 20, 2020.

(30) Foreign Application Priority Data

Apr. 4, 2019 (JP) ................................ 2019-072245

(51) Int. Cl.
*G01F 1/69* (2006.01)
*F02M 35/10* (2006.01)
*G01F 5/00* (2006.01)

(52) U.S. Cl.
CPC ......... *G01F 1/69* (2013.01); *F02M 35/10386* (2013.01); *G01F 5/00* (2013.01)

(58) Field of Classification Search
CPC . G01F 1/69; G01F 5/00; G01F 1/6842; G01F 1/692; G01F 15/04; G01F 15/063; G01F 15/18; F02M 35/10386; F02D 41/187; F02D 41/18
See application file for complete search history.

(56) References Cited

U.S. PATENT DOCUMENTS

| | | | | |
|---|---|---|---|---|
| 9,441,584 | B2 * | 9/2016 | Tagawa | G01F 1/6845 |
| 10,907,762 | B2 * | 2/2021 | Kitahara | G01F 1/00 |
| 11,002,617 | B2 * | 5/2021 | Kitahara | G01K 13/02 |

(Continued)

FOREIGN PATENT DOCUMENTS

| | | |
|---|---|---|
| JP | 2014-98621 | 5/2014 |
| WO | 2020/202871 | 10/2020 |

OTHER PUBLICATIONS

U.S. Appl. No. 17/449,683, filed Oct. 1, 2021, Physical Quantity Measurement Device.

(Continued)

*Primary Examiner* — Freddie Kirkland, III
(74) *Attorney, Agent, or Firm* — Nixon & Vanderhye P.C.

(57) ABSTRACT

A sensor support portion supports a physical quantity sensor. A flow path housing portion forms a measurement flow path, which accommodates a support tip end portion of the sensor support portion. The sensor support portion includes a support front surface, which includes a front fixed portion away from the support tip end portion and fixed to an inner surface of the flow path housing portion. The physical quantity sensor includes a sensor exposure surface exposed from the support front surface. A separation distance between an end portion of the front fixed portion and an end portion of the sensor exposure surface is smaller than a separation distance between the end portion of the sensor exposure surface and the support tip end portion.

15 Claims, 105 Drawing Sheets

(56) References Cited

U.S. PATENT DOCUMENTS

| | | | | |
|---|---|---|---|---|
| 11,067,421 | B2 * | 7/2021 | Kitahara | F02M 35/10386 |
| 11,415,445 | B2 * | 8/2022 | Kono | G01F 1/696 |
| 11,448,543 | B2 * | 9/2022 | Yamaguchi | G01F 5/00 |
| 2003/0110854 | A1 | 6/2003 | Nakada et al. | |
| 2011/0296904 | A1 | 12/2011 | Tagawa et al. | |
| 2015/0096360 | A1 * | 4/2015 | Tagawa | F02M 35/10386 73/114.32 |
| 2022/0018697 | A1 * | 1/2022 | Enomoto | G01F 1/692 |

OTHER PUBLICATIONS

U.S. Appl. No. 17/449,684, filed Oct. 1, 2021, Physical Quantity Measurement Device.

U.S. Appl. No. 17/449,683, filed Oct. 1, 2021 to Takashi Enomoto entitled Physical Quantity Measurement Device (380 pages).

* cited by examiner

<COMMON>

<COMMON>

<COMMON>

<COMMON>

<COMMON>

<A>

〈A〉

<B>

〈B〉

⟨D⟩

<H>

<H>

<H>

<H>

<H>

<H>

⟨B⟩

<C>

<C>

〈C〉

〈C〉

| θ 26[deg] | 30 | 45 | 60 | 90 |
|---|---|---|---|---|
| BEHAVIOR OR REVERSE FLOW |   |   |   |   |

<C>

<B>

⟨B⟩

<B>

<C>

〈F〉

〈G〉

<G>

PHYSICAL QUANTITY MEASUREMENT DEVICE

CROSS REFERENCE TO RELATED APPLICATION

The present application is a continuation application of International Patent Application No. PCT/JP2020/006709 filed on Feb. 20, 2020, which designated the U.S. and claims the benefit of priority from Japanese Patent Application No. 2019-072245 filed on Apr. 4, 2019. The entire disclosures of all of the above applications are incorporated herein by reference.

TECHNICAL FIELD

The present disclosure relates to a physical quantity measurement device.

BACKGROUND

A flow sensor is known as a physical quantity measurement device that measures a physical quantity of a fluid.

SUMMARY

A physical quantity measurement device configured to measure a physical quantity of a fluid according to a first aspect of the present disclosure comprises: a measurement flow path that is configured to cause fluid to flow therethrough; a physical quantity sensor that is provided in a measurement flow path and configured to detect a physical quantity of the fluid; a sensor support portion that supports the physical quantity sensor; and a flow path housing portion that forms the measurement flow path and supports the sensor support portion. The sensor support portion includes: a support tip end portion, which is one end portion provided in the measurement flow path, and a support front surface that includes a front fixed portion, which is provided at a position separated from the support tip end portion and fixed to an inner surface of the flow path housing portion, the support front surface being a surface on a side where the physical quantity sensor is exposed. The physical quantity sensor includes a sensor exposure surface exposed from the support front surface. in a height direction in which the support tip end portion and the front fixed portion are arranged, a separation distance between a front fixed base end portion, which is an end portion of the front fixed portion on a side opposite from the support tip end portion, and an exposed base end portion, which is an end portion of the sensor exposure surface on a side opposite from the support tip end portion, is smaller than a separation distance between the exposed base end portion and the support tip end portion.

BRIEF DESCRIPTION OF THE DRAWINGS

The above and other objects, features and advantages of the present disclosure will become more apparent from the following detailed description made with reference to the accompanying drawings. In the drawings:

The above-described and other objects, features, and advantages of the present disclosure will become more apparent from the following detailed description with reference to the accompanying drawings. The drawings are as follows.

FIG. 52

DETAILED DESCRIPTION

Figure 1:
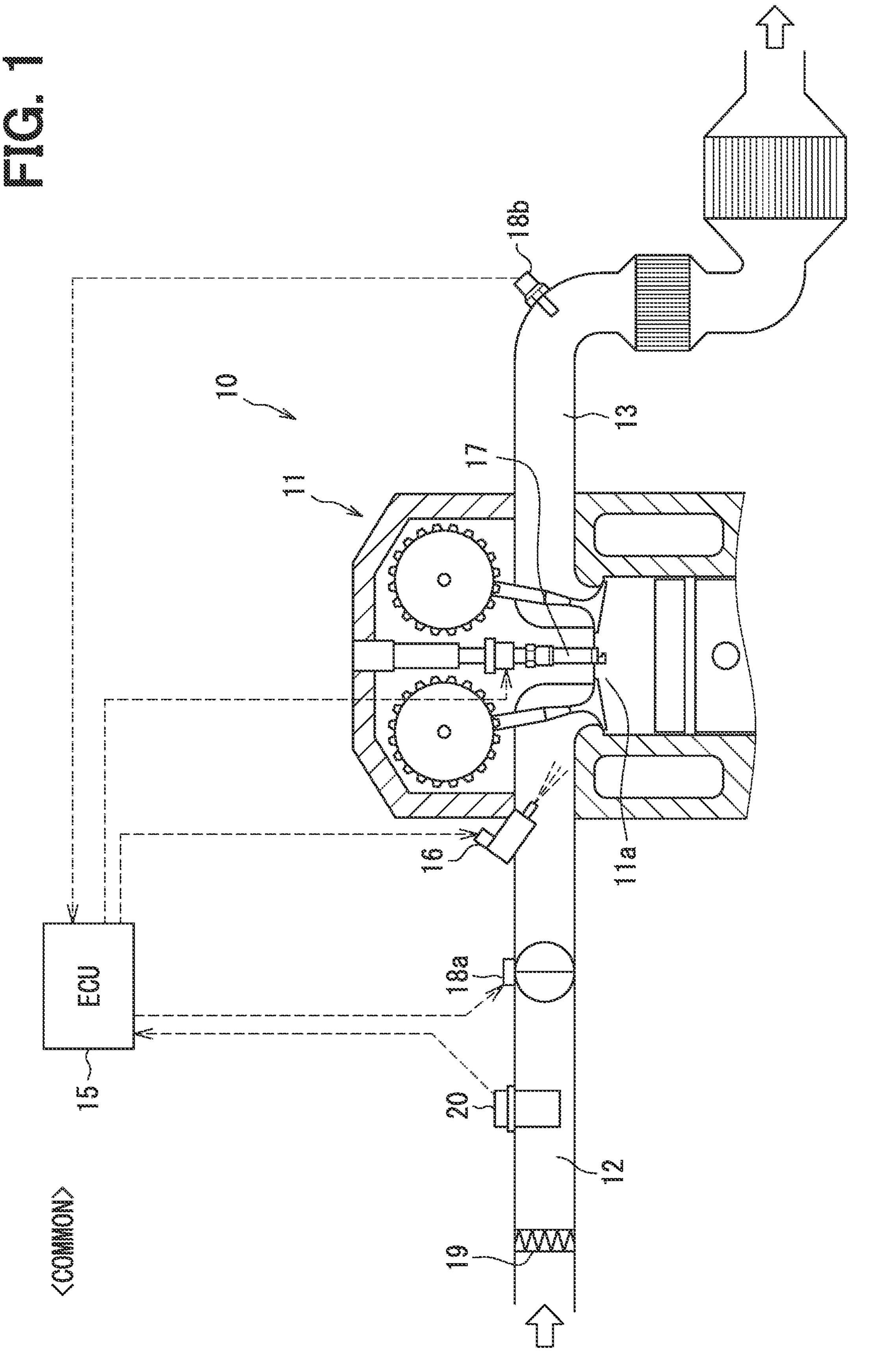
FIG. 1 is a view showing a configuration of a combustion system in the first embodiment.

As follows, examples of the present disclosure will be described.

A flow sensor is an example of a physical quantity measurement device that measures a physical quantity of a fluid.

According to an example of the present disclosure, a flow sensor as a flow rate measurement device includes a sensor body that forms a bypass flow path and a sensor chip that detects a flow rate of air in the bypass flow path. In this flow rate measurement device, a sensor assembly is formed by sealing the sensor chip with a mold resin. In this sensor assembly, the mold resin is attached to the sensor body, and the tip end of the mold resin and the sensor chip are arranged in the bypass flow path. A part of the mold resin that is fixed to the sensor chip is a fixed portion. The sensor chip is arranged at a position separated from the fixed portion of the mold resin on the tip end side of the mold resin.

The mold resin has the fixed portion. Therefore, when the sensor assembly is manufactured, there is a concern that the relative posture of the sensor assembly with respect to the sensor body may deviate about the fixed portion as a fulcrum.

According to an example of the present disclosure, the sensor chip is located at a position separated from the fixed portion of the mold resin toward the tip end side. In this configuration, a part of the fixed surface of the mold resin, which serves as the fulcrum, may be likely at a position distant from the sensor chip. Therefore, the posture of the sensor assembly may be likely to deviate. If the posture of the sensor assembly deviates, the position of the sensor chip in the bypass flow path deviates. Thus, an accuracy of flow rate measurement by using the sensor chip may be likely to decrease. In this case, if the accuracy in detection of a physical quantity such as a flow rate of a fluid such as air decreases, a measurement accuracy of the physical quantity measurement device may decrease.

A physical quantity measurement device configured to measure a physical quantity of a fluid according to an example of the present disclosure comprises: a measurement flow path that is configured to cause fluid to flow therethrough; a physical quantity sensor that is provided in a measurement flow path and configured to detect a physical quantity of the fluid; a sensor support portion that supports the physical quantity sensor; and a flow path housing portion that forms the measurement flow path and supports the sensor support portion. The sensor support portion includes: a support tip end portion, which is one end portion provided in the measurement flow path, and a support front surface that includes a front fixed portion, which is provided at a position separated from the support tip end portion and fixed to an inner surface of the flow path housing portion, the support front surface being a surface on a side where the physical quantity sensor is exposed. The physical quantity sensor includes a sensor exposure surface exposed from the support front surface. in a height direction in which the support tip end portion and the front fixed portion are arranged, a separation distance between a front fixed base end portion, which is an end portion of the front fixed portion on a side opposite from the support tip end portion, and an exposed base end portion, which is an end portion of the sensor exposure surface on a side opposite from the support tip end portion, is smaller than a separation distance between the exposed base end portion and the support tip end portion.

According to this example, the exposed base end portion of the physical quantity measurement device is provided to be closer to the front fixed base end portion than the support tip end portion between the front fixed base end portion and the support tip end portion. In this configuration, when the physical quantity measurement device is manufactured, even if the posture of the sensor support portion with respect to the flow path housing portion deviates about the front fixed portion of the sensor support portion as a fulcrum, a radius of rotation from the fulcrum to the physical quantity sensor can be made as small as possible. In this case, misalignment of the physical quantity sensor in the measurement flow path is unlikely to increase. Therefore, it is possible to suppress a decrease in the detection accuracy of the physical quantity sensor. Thus, the measurement accuracy of the physical quantity can be enhanced.

A plurality of embodiments of the present disclosure will be described below with reference to the drawings. The same reference numerals are given to corresponding components in each embodiment, and redundant description may be omitted. When only a part of the configuration is described in each embodiment, the configuration of another embodiment described previously can be applied to other parts of the configuration. It is possible to combine not only configurations explicitly described in the description of each embodiment but also to partially combine configurations of a plurality of embodiments even if not explicitly described unless the combination is particularly hindered. Combinations of configurations described in a plurality of embodiments and modifications that are not explicitly described shall also be disclosed by the following description.

First Embodiment

A combustion system 10 shown in FIG. 1 includes an internal combustion engine 11 such as a gasoline engine, an intake passage 12, an exhaust passage 13, an air flow meter 20, and an ECU 15, and is equipped on a vehicle, for example. The air flow meter 20 is provided in the intake passage 12 and measures physical quantities such as a flow rate, temperature, humidity, and pressure of intake air supplied to the internal combustion engine 11. The air flow meter 20 is a flow measurement device that measures the flow rate of air, and corresponds to a physical quantity measurement device that measures a fluid such as intake air. The intake air is gas supplied to a combustion chamber 11*a* of the internal combustion engine 11. In the combustion chamber 11*a*, an air-fuel mixture of intake air and fuel is ignited by an ignition plug 17.

An engine control unit (ECU) 15 is a control device that controls the operation of the combustion system 10. The ECU 15 is an arithmetic processing circuit including a microcomputer including a processor, a storage medium such as a RAM, a ROM, and a flash memory, and an input/output unit, and a power supply circuit. The ECU 15 receives a sensor signal output from the air flow meter 20, a sensor signal output from a large number of in-vehicle sensors, and the like. Using a measurement result by the air flow meter 20, the ECU 15 performs engine control on a fuel injection amount, an EGR amount, and the like of an injector 16. The ECU 15 is a control device that performs operation control of the internal combustion engine 11, and the combustion system 10 can also be referred to as an engine control system. The ECU 15 corresponds to an external device.

The ECU 15 may also be referred to as an electronic control unit.

The control device, or control system, is provided by (a) an algorithm as a plurality of logics called if-then-else format, or (b) an algorithm as a learned model tuned by machine learning, for example, as a neural network.

The control device is provided by a control system including at least one computer. The control system may include a plurality of computers linked by a data communication device. The computer includes at least one processor (hardware processor) that is hardware. The hardware processor may be provided by the following (i), (ii), or (iii).

(i) The hardware processor may be at least one processor core that executes a program stored in at least one memory. In this case, the computer is provided by at least one memory and at least one processor core. The processor core is referred to as a central processing unit (CPU), a graphics processing unit (GPU), a RISC-CPU, or the like. The memory is also referred to as a storage medium. The memory is a non-transitory, tangible storage medium that non-transiently stores "a program and/or data" readable by a processor. The storage medium is provided by a semiconductor memory, a magnetic disk, an optical disk, or the like. The program may be distributed alone or as a storage medium storing the program.

(ii) The hardware processor may be a hardware logic circuit. In this case, the computer is provided by a digital circuit including a large number of logic units (gate circuits) that are programmed. The digital circuit is also referred to as a logic circuit array, for example, an application-specific integrated circuit (ASIC), a field programmable gate array (FPGA), a programmable gate array (PGA), a complex programmable logic device (CPLD), or the like. The digital circuit may include a memory storing a program and/or data. The computer may be provided by an analog circuit. The computer may be provided by a combination of a digital circuit and an analog circuit.

(iii) The hardware processor may be a combination of the above (i) and the above (ii). (i) and (ii) are disposed on different chips or on a common chip. In these cases, the portion of (ii) is also referred to as an accelerator.

The control device, a signal source, and the controlled object provide various elements. At least some of those elements can be referred to as a block, a module, or a section. Elements included in the control system are referred to as functional means only when intentional.

The control unit and the method thereof described in this disclosure may be implemented by a dedicated computer provided by configuring a memory and a processor programmed to execute one or a plurality of functions embodied by a computer program. Alternatively, the control unit and the method thereof described in this disclosure may be implemented by a dedicated computer provided by configuring a processor by one or more dedicated hardware logic circuits. Alternatively, the control unit and the method thereof described in this disclosure may be implemented by one or more dedicated computers configured by a combination of a memory and a processor programmed to execute one or a plurality of functions and a processor configured by one or more hardware logic circuits. The computer program may be stored in a computer-readable non-transition tangible recording medium as an instruction executed by a computer.

The combustion system 10 includes a plurality of measurement units as in-vehicle sensors. Examples of the measurement units include a throttle sensor 18*a* and an air-fuel ratio sensor 18*b* in addition to the air flow meter 20. Each of these measurement units is electrically connected to the ECU 15, and outputs a detection signal to the ECU 15. The air flow meter 20 is provided in the intake passage 12 on the downstream side of an air cleaner 19 and on the upstream side relative to a throttle valve to which the throttle sensor 18*a* is attached. The air cleaner 19 includes an air case that forms a part of the intake passage 12 and an air filter that removes foreign matters such as dust from intake air, and the air filter is attached to the air case.

In the combustion system 10, for example, single edge nibble transmission (SENT) communication is used as a communication scheme that enables communication between the ECU 15 and a measurement unit such as the air flow meter 20. SENT communication is a type of digital communication, and is a communication method of digitizing a measurement signal of a measurement unit such as the air flow meter 20. In SENT communication, measurement signals for a plurality of channels can be transmitted by a single electric wiring. Therefore, for example, even if the communication path enabling communication between the ECU 15 and the air flow meter 20 is formed by a single electric wiring, the time required for communication between the ECU 15 and the air flow meter 20 is less likely to increase.

Figure 2:
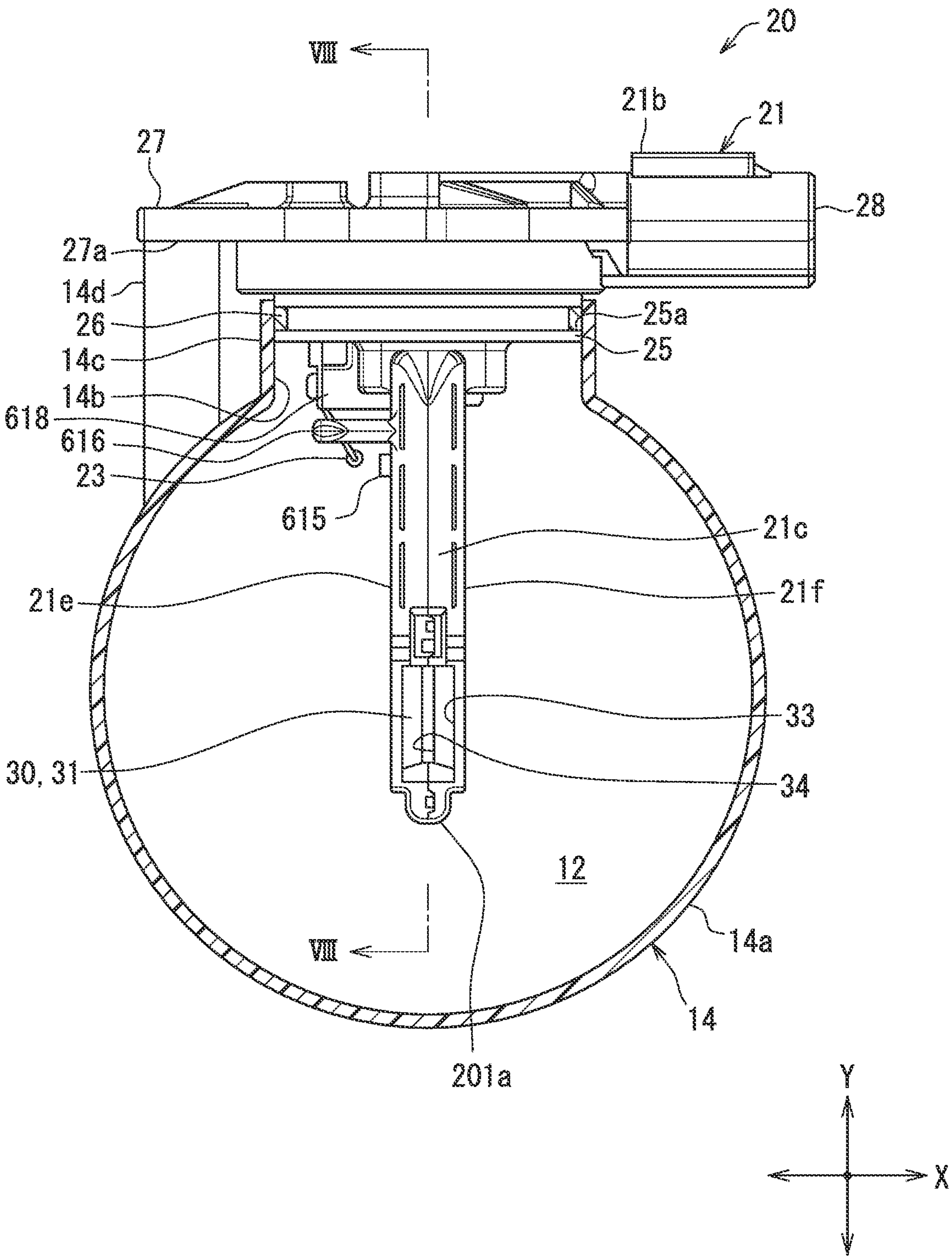
FIG. 2 is a front view of an air flow meter in a state of being attached to an intake pipe.
Figure 3:
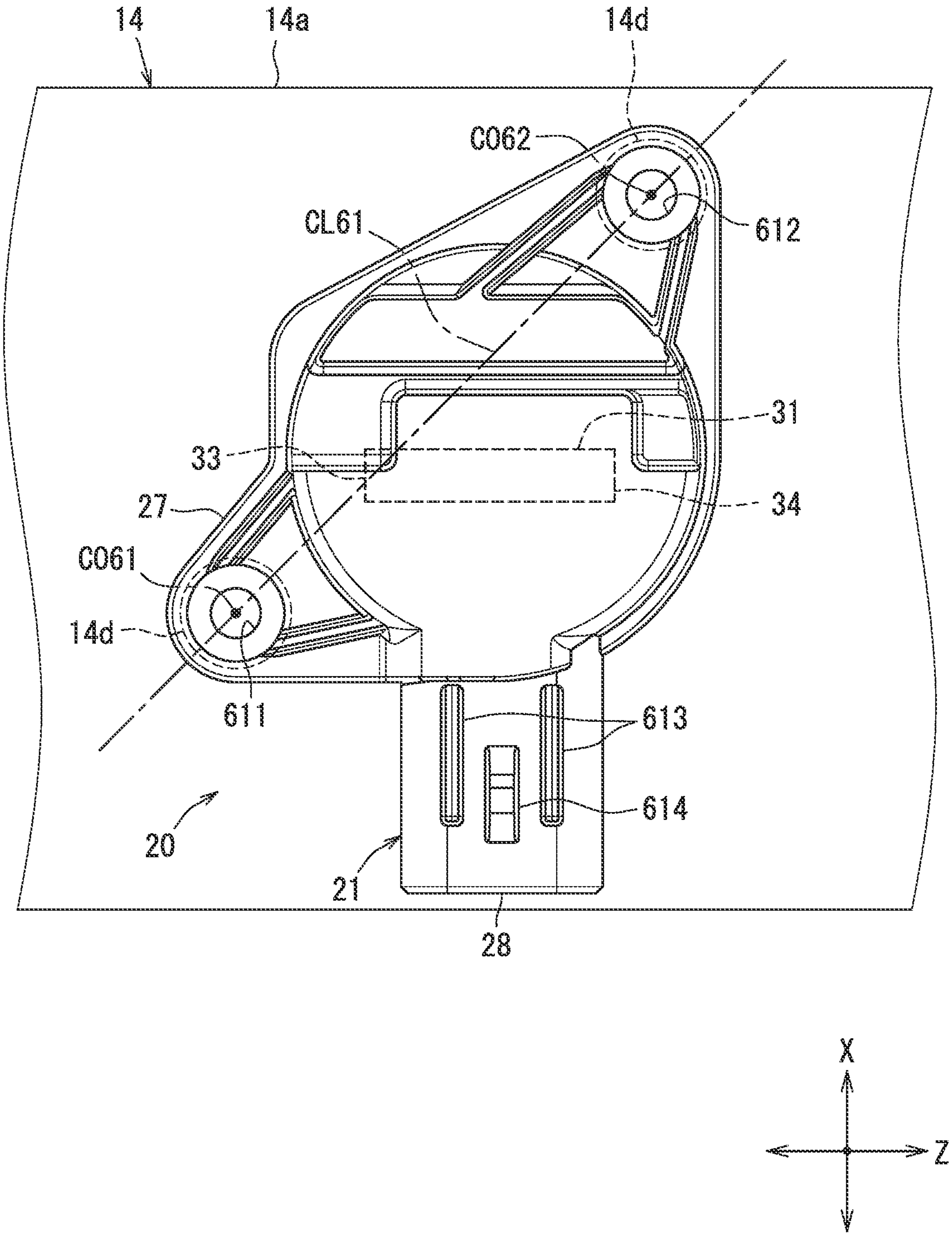
FIG. 3 is a plan view of the air flow meter in a state of being attached to the intake pipe.
Figure 8:
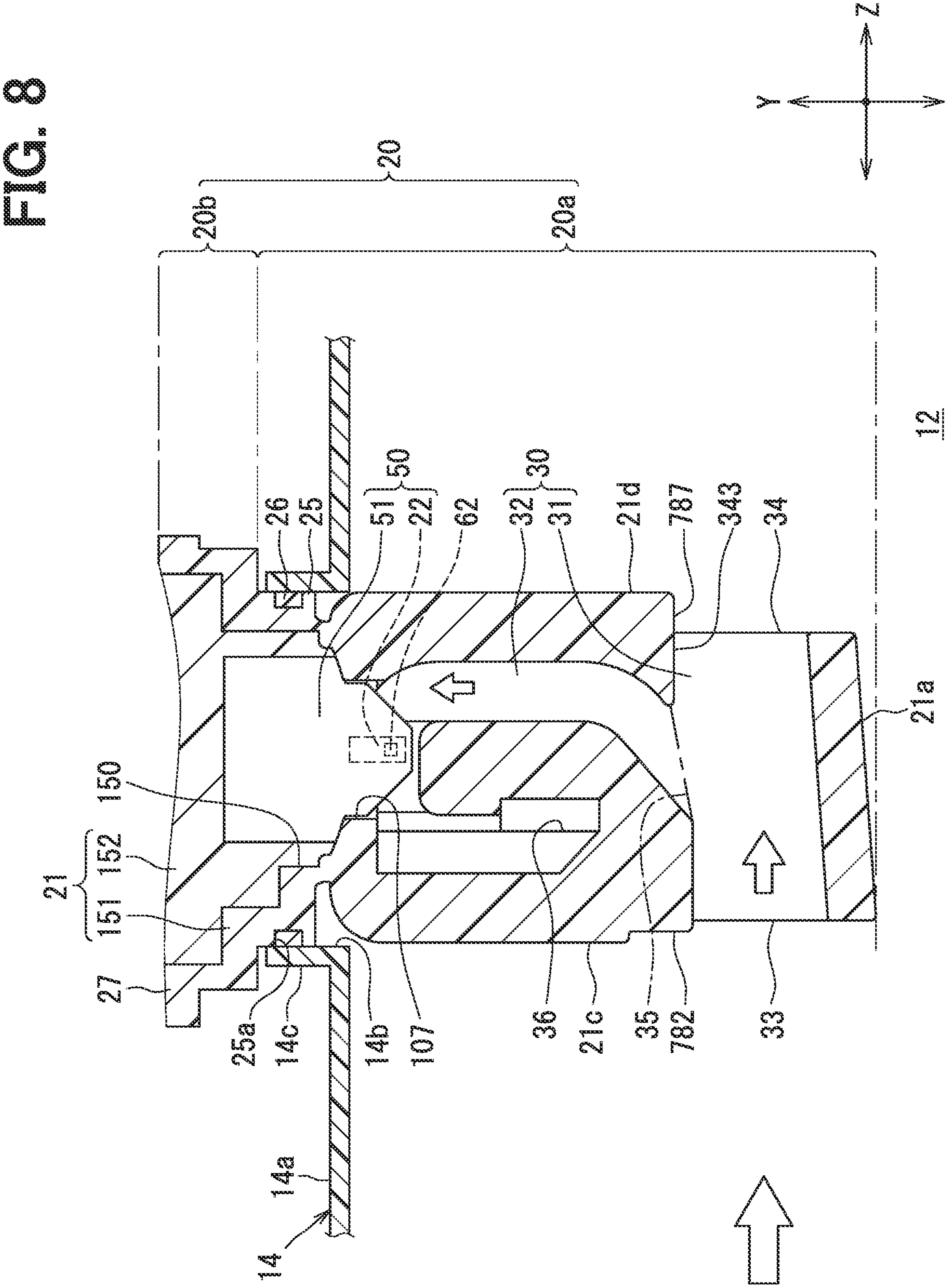
FIG. 8 is a cross-sectional view taken along a line VIII-VIII of FIG. 2.

As shown in FIGS. 2, 3, and 8, the air flow meter 20 is attached to a piping unit 14 as an attachment target. The piping unit 14 includes an intake pipe 14*a*, a pipe flange 14*c*, and a pipe boss 14*d*, and is a forming member forming the intake passage 12. The piping unit 14 forms, for example, at least a part of the air case. In the configuration in which the piping unit 14 forms an air case, an air filter is attached to the piping unit 14 in addition to the air flow meter 20. In the piping unit 14, the intake pipe 14*a*, the pipe flange 14*c*, and the pipe boss 14*d* are formed of a resin material or the like.

The intake pipe 14*a* is a pipe such as a duct forming the intake passage 12. The intake pipe 14*a* is provided with an air flow insertion hole 14*b* as a through hole penetrating the outer peripheral edge thereof. The pipe flange 14*c* is formed in an annular shape and extends along the peripheral edge portion of the air flow insertion hole 14*b*. The pipe flange 14*c* extends from the outer surface of the intake pipe 14*a* toward the side opposite from the intake passage 12. The pipe boss 14*d* is a columnar member and is a support portion that supports the air flow meter 20. The pipe boss 14*d* extends from the outer surface of the intake pipe 14*a* along the pipe flange 14*c*, and a plurality of (for example, two) pipe bosses are provided with respect to the intake pipe 14*a*. In the present embodiment, both the pipe flange 14*c* and the pipe boss 14*d* extend in a height direction Y from the intake pipe 14*a*.

The air flow meter 20 is inserted into the pipe flange 14*c* and the air flow insertion hole 14*b* to enter the intake passage 12, and is fixed to the pipe boss 14*d* with a fixing tool such as a bolt in this state. The air flow meter 20 is not in contact with the tip end surface of the pipe flange 14*c*, but is in contact with the tip end surface of the pipe boss 14*d*. Therefore, the relative position and angle of the air flow meter 20 with respect to the piping unit 14 are set not by the pipe flange 14*c* but by the pipe boss 14*d*. The tip end surfaces of the plurality of pipe bosses 14*d* are flush with each other. In FIG. 8, the pipe boss 14*d* is not illustrated.

In the present embodiment, a width direction X, a height direction Y, and a depth direction Z are set for the air flow meter 20, and these directions X, Y, and Z are orthogonal to one another. The air flow meter 20 extends in the height direction Y, and the intake passage 12 extends in the depth direction Z. The air flow meter 20 has an entering portion 20*a* that enters the intake passage 12 and a protruding portion 20*b* that protrudes to the outside from the pipe flange 14*c* without entering the intake passage 12. The entering portion 20*a* and the protruding portion 20*b* are arranged in the height direction Y.

As shown in FIGS. 2, 4, 7, and 8, the air flow meter 20 includes a housing 21, a flow sensor 22 that detects the flow rate of intake air, and an intake air temperature sensor 23 that detects the temperature of intake air. The housing 21 is formed of, for example, a resin material or the like. The flow sensor 22 is accommodated in the housing 21. In the air flow meter 20, since the housing 21 is attached to the intake pipe 14*a*, the flow sensor 22 can come into contact with the intake air flowing through the intake passage 12.

The housing 21 is attached to the piping unit 14 as an attachment target. On the outer surface of the housing 21, of a pair of end surfaces 21*a* and 21*b* arranged in the height direction Y, the end surface included in the entering portion 20*a* is referred to as the housing tip end surface 21*a*, and the end surface included in the protruding portion 20*b* is referred to as the housing base end surface 21*b*. The housing tip end surface 21*a* and the housing base end surface 21*b* are orthogonal to the height direction Y. The tip end surface of the pipe flange 14*c* is also orthogonal to the height direction Y. The attachment target to which the air flow meter 20 and the housing 21 are attached may not be the piping unit 14 as long as it is a forming member forming the intake passage 12.

On the outer surface of the housing 21, a surface disposed on the upstream side relative to the intake passage 12 is referred to as a housing upstream surface 21*c*, and a surface disposed on the opposite side of the housing upstream surface 21*c* is referred to as a housing downstream surface 21*d*. One of a pair of surfaces facing each other with the housing upstream surface 21*c* and the housing base end surface 21*b* interposed therebetween is referred to as a housing front surface 21*e*, and the other is referred to as a housing back surface 21*f*. The housing front surface 21*e* is a surface on a side where the flow sensor 22 is provided in a sensor SA50 to be described later.

As for the housing 21, in the height direction Y, the housing tip end surface 21*a* side may be referred to as a housing tip end side, and the housing base end surface 21*b* side may be referred to as a housing base end side. In a depth direction Z, the housing upstream surface 21*c* side may be referred to as a housing upstream side, and the housing downstream surface 21*d* side may be referred to as a housing downstream side. In a width direction X, the housing front surface 21*e* side may be referred to as a housing front side, and the housing back surface 21*f* side may be referred to as a housing back side.

As shown in FIGS. 2 to 7, the housing 21 includes a seal holding portion 25, a flange portion 27, and a connector portion 28. The air flow meter 20 includes a seal member 26, and the seal member 26 is attached to the seal holding portion 25.

The seal holding portion 25 is provided inside the pipe flange 14*c* and holds the seal member 26 so as not to be displaced in the height direction Y. The seal holding portion 25 is included in the entering portion 20*a* of the air flow meter 20. The seal holding portion 25 has a holding groove portion 25*a* that holds the seal member 26. The holding groove portion 25*a* extends in the directions X and Z orthogonal to the height direction Y and annularly surrounds the housing 21. The seal member 26 is a member such as an O-ring that seals the intake passage 12 inside the pipe flange 14*c*. The seal member 26 is in a state of entering the holding groove portion 25*a*, and is in close contact with both the inner surface of the holding groove portion 25*a* and the inner peripheral surface of the pipe flange 14*c*. Both the portion where the seal member 26 and the inner surface of the holding groove portion 25*a* are in close contact with each other and the portion where the seal member 26 and the inner peripheral surface of the pipe flange 14*c* are in close contact with each other annularly surrounds the housing 21.

A fixing hole such as a screw hole for fixing a fixing tool such as a screw for fixing the housing 21 to the intake pipe 14*a* is formed in the flange portion 27. In the present embodiment, the fixing hole is, for example, flange holes

611 and 612, and the fixing tool is a screw. In FIG. 3, illustration of a screw inserted into the flange holes 611 and 612 are omitted.

In the flange portion 27, the surface on the housing tip end side is in contact with the tip end surface of the pipe boss 14*d* in a state of being overlapped, and this overlapped portion is referred to as an angle setting surface 27*a*. The angle setting surface 27*a* and the tip end surface of the pipe boss 14*d* both extend in a direction orthogonal to the height direction Y, and extend in the width direction X and the depth direction Z. The tip end surface of the pipe boss 14*d* sets the relative position and angle of the angle setting surface 27*a* with respect to the intake pipe 14*a*. The angle setting surface 27*a* sets the relative position and angle of the housing 21 with respect to the intake pipe 14*a* in the air flow meter 20.

In the intake pipe 14*a* of the piping unit 14, a main flow of the air mainly flowing through the intake passage 12 proceeds in the depth direction Z. When the direction in which the main flow proceeds is referred to as a main flow direction, the depth direction Z is the main flow direction. In the housing 21, the angle setting surface 27*a* of the flange portion 27 extends in the main flow direction and the depth direction Z. The tip end surface of the pipe boss 14*d* also extends in the main flow direction and the depth direction Z.

The connector portion 28 is a protection portion that protects a connector terminal 28*a* electrically connected to the flow sensor 22. The connector terminal 28*a* is electrically connected to the ECU 15 by connecting electric wiring extending from the ECU 15 to the connector portion 28 via a plug portion. The flange portion 27 and the connector portion 28 are included in the protruding portion 20*b* of the air flow meter 20.

Figure 4:
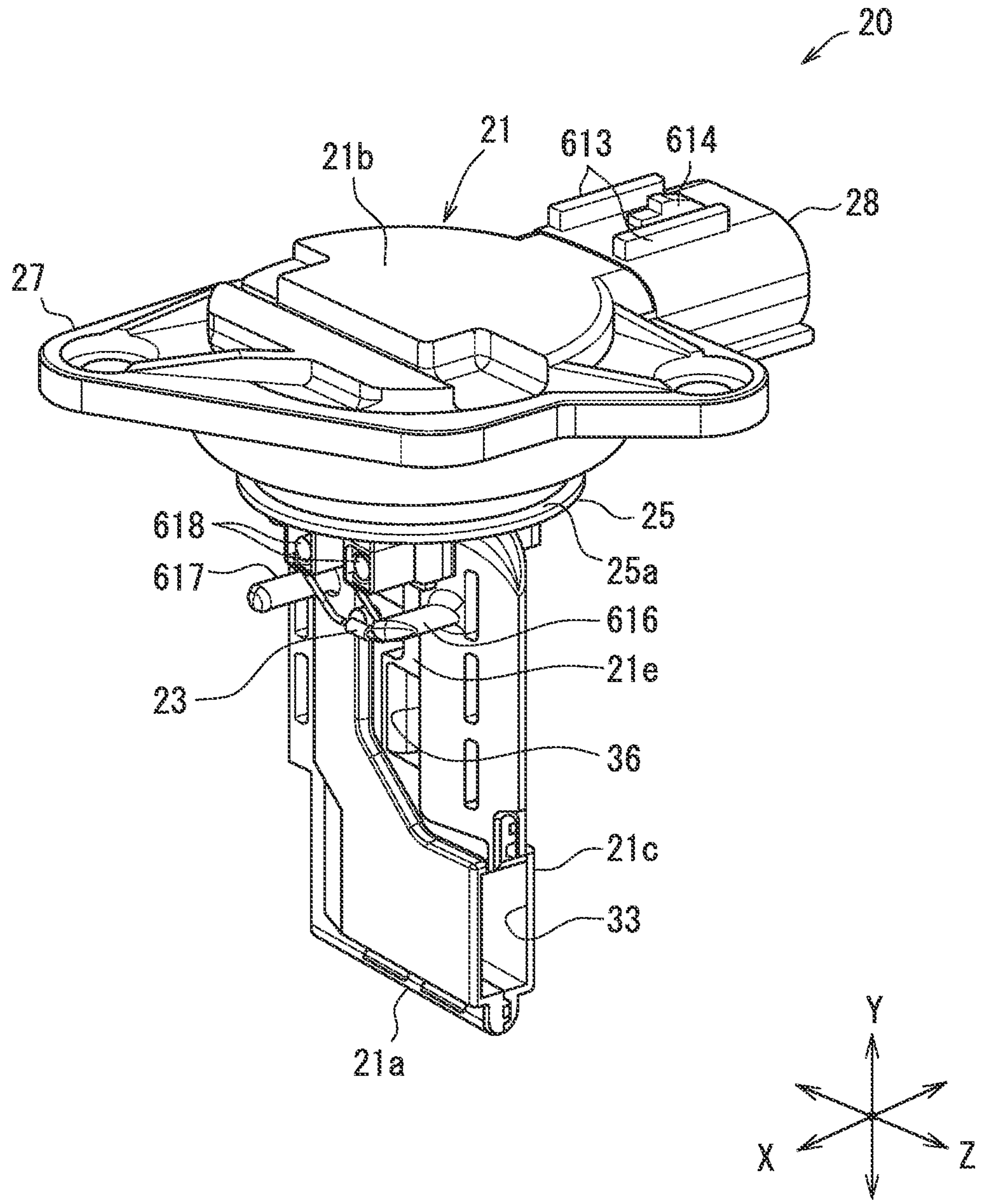
FIG. 4 is a perspective view of the air flow meter as viewed from a passage entrance side.
Figure 7:
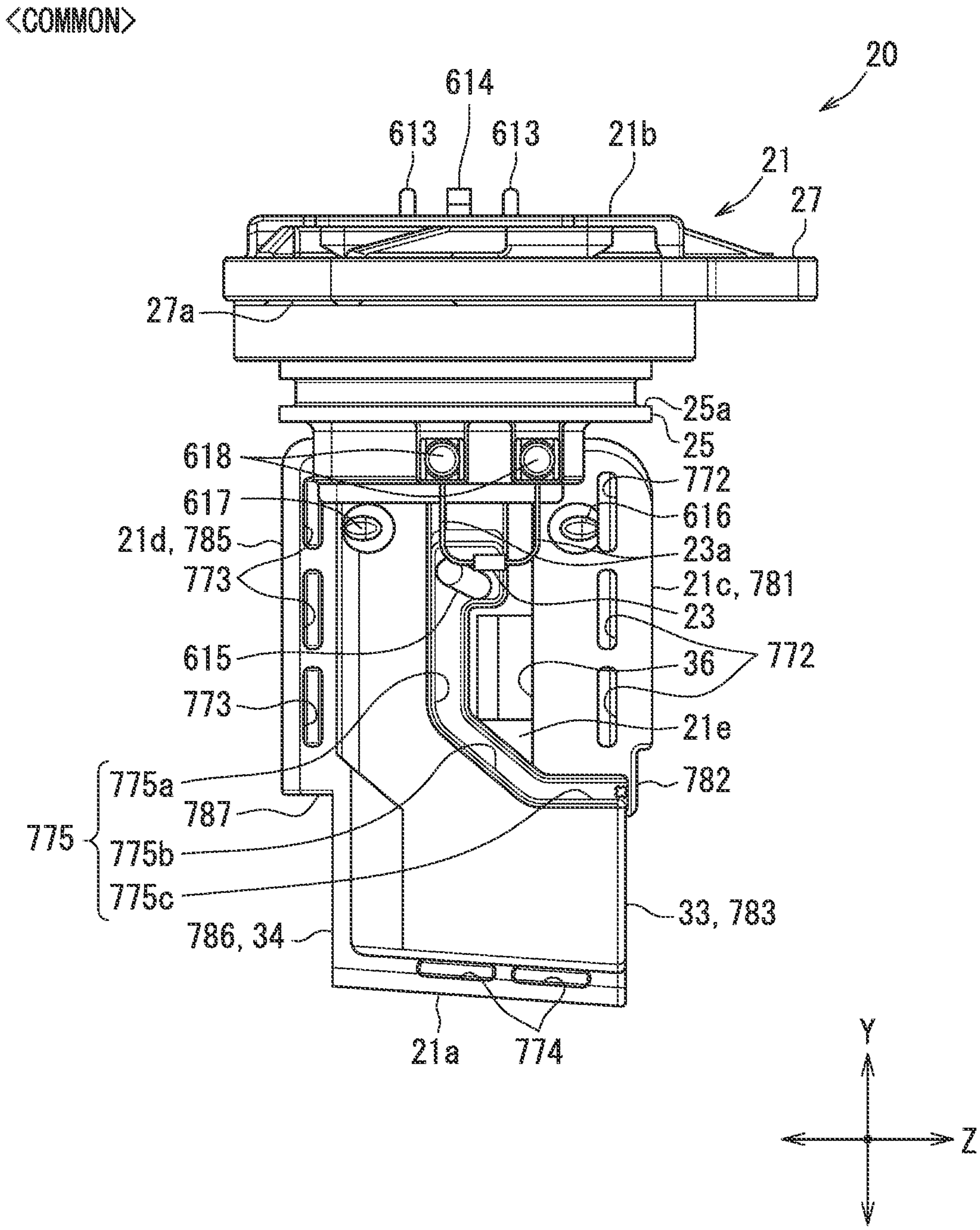
FIG. 7 is a side view of the air flow meter as viewed from a side opposite from the connector portion.

As shown in FIGS. 2, 4, and 7, the intake air temperature sensor 23 is provided outside the housing 21. The intake air temperature sensor 23, which is a temperature-sensitive element that senses the temperature of the intake air, is provided on the housing back surface 21*f* side. A lead wire 23*a* formed by wiring or the like is connected to the intake air temperature sensor 23. The housing 21 has a lead support portion 618. The lead support portion 618 is a projection portion provided on the housing back surface 21*f*, and projects toward the housing back side relative to the intake air temperature sensor 23 in the width direction X. The lead support portion 618 supports the intake air temperature sensor 23 by supporting the lead wire 23*a*. The lead support portion 618 is provided on the housing base end side relative to the intake air temperature sensor 23 in the height direction Y. The lead wire 23*a* extends from the lead support portion 618 toward the housing tip end side.

The lead wire 23*a* penetrates the lead support portion 618 in the height direction Y. At the time of manufacturing the air flow meter 20, a through hole penetrating this lead support portion 618 in the height direction Y is formed in the lead support portion 618. In a state where the lead wire 23*a* is inserted into this through hole, the through hole is crushed by crushing the lead support portion 618 in the width direction X, and the lead wire 23*a* inserted into the through hole is embedded in the lead support portion 618. In this case, the lead support portion 618 is thermally deformed by crushing the tip end surface of the lead support portion 618 while heating the tip end surface with a heating tool such as a heater, and the lead support portion 618 is held so that the thermally deformed portion of the lead support portion 618 covers the lead wire 23*a*. This operation can also be referred to as thermal caulking.

As shown in FIG. 8, the housing 21 has a bypass flow path 30. The bypass flow path 30 is provided inside the housing 21 and is formed by at least a part of the internal space of the housing 21. The inner surface of the housing 21 forms the bypass flow path 30 and is a formation surface.

The bypass flow path 30 is disposed in the entering portion 20*a* of the air flow meter 20. The bypass flow path 30 includes a passage flow path 31 and a measurement flow path 32. The measurement flow path 32 is in a state where the flow sensor 22 of the sensor SA50 described later and a portion around the flow sensor 22 enter. The passage flow path 31 is formed by the inner surface of the housing 21. The measurement flow path 32 is formed by the outer surface of a part of the sensor SA50 in addition to the inner surface of the housing 21. The intake passage 12 can be referred to as a main passage, and the bypass flow path 30 can be referred to as a sub-passage.

The passage flow path 31 penetrates the housing 21 in the depth direction Z. The passage flow path 31 has a passage entrance 33, which is an upstream end portion thereof, and a passage exit 34, which is a downstream end portion thereof. The measurement flow path 32 is a branch flow path branched from an intermediate portion of the passage flow path 31, and the flow sensor 22 is provided in this measurement flow path 32. The measurement flow path 32 has a measurement entrance 35, which is an upstream end portion thereof, and a measurement exit 36, which is a downstream end portion thereof. The portion where the measurement flow path 32 branches from the passage flow path 31 is a boundary portion between the passage flow path 31 and the measurement flow path 32, and the measurement entrance 35 is included in this boundary portion. The boundary portion between the passage flow path 31 and the measurement flow path 32 can also be referred to as a flow path boundary portion. The measurement entrance 35 faces the housing tip end side in a state of being inclined so as to face the measurement exit 36 side.

The measurement flow path 32 extends from the passage flow path 31 toward the housing base end side. The measurement flow path 32 is provided between the passage flow path 31 and the housing base end surface 21*b*. The measurement flow path 32 is bent such that a portion between the measurement entrance 35 and the measurement exit 36 bulges toward the housing base end side. The measurement flow path 32 has a portion curved so as to be continuously bent, a portion refracted so as to be bent stepwise, a portion extending straight in the height direction Y and the depth direction Z, and the like.

The flow sensor 22 is a thermal flow detection unit having a heater unit. When a temperature change occurs due to heat generation of the heater unit, the flow sensor 22 outputs a detection signal corresponding to the temperature change. The flow sensor 22 is a rectangular parallelepiped chip component, and the flow sensor 22 can also be referred to as a sensor chip. The sensor SA is attached to the housing 21 in a state where the entire flow sensor 22 is accommodated in the measurement flow path 32. A part of the flow sensor 22 may be accommodated in the measurement flow path 32 as long as the flow sensor 22 can detect the flow rate in the measurement flow path 32. As described above, since at least a part of the flow sensor 22 is accommodated in the measurement flow path 32, this flow sensor 22 is provided in the measurement flow path 32. The flow sensor 22 can also be referred to as a physical quantity sensor or a physical quantity detection unit that detects the flow rate of intake air as the physical quantity of the fluid.

The air flow meter 20 has a sensor subassembly configured to include the flow sensor 22, and this sensor subassembly is referred to as the sensor SA50. The sensor SA50 is embedded in the housing 21 in a state where a part of the sensor SA50 enters the measurement flow path 32. In the air flow meter 20, the sensor SA50 and the bypass flow path 30 are arranged in the height direction Y. Specifically, the sensor SA50 and the passage flow path 31 are arranged in the height direction. The sensor SA50 corresponds to the detection unit. The sensor SA50 can also be referred to as a measurement unit or a sensor package.

<Description of Configuration Group A>

Figure 9:
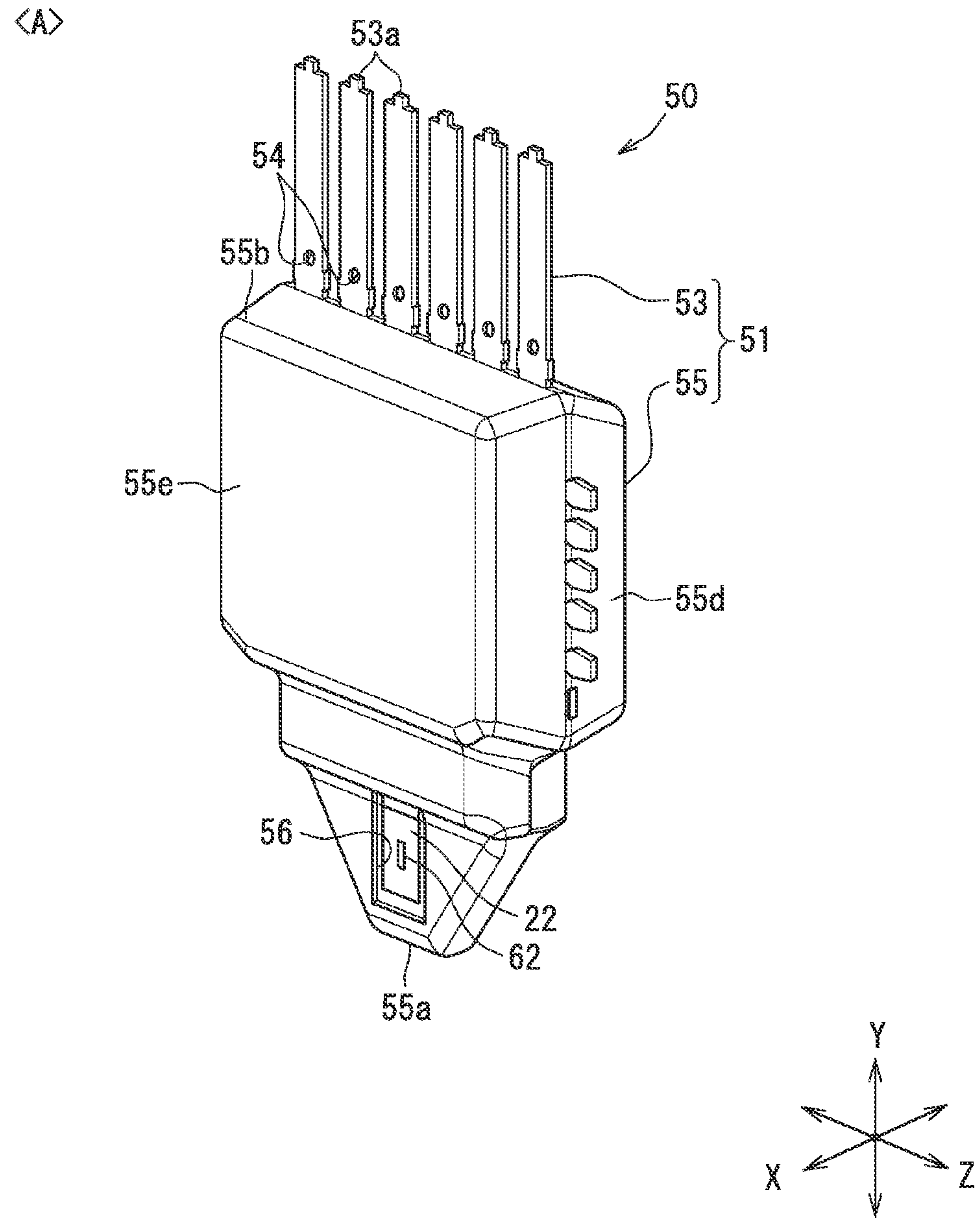
FIG. 9 is a perspective view of a sensor SA in the configuration group A.
Figure 10:
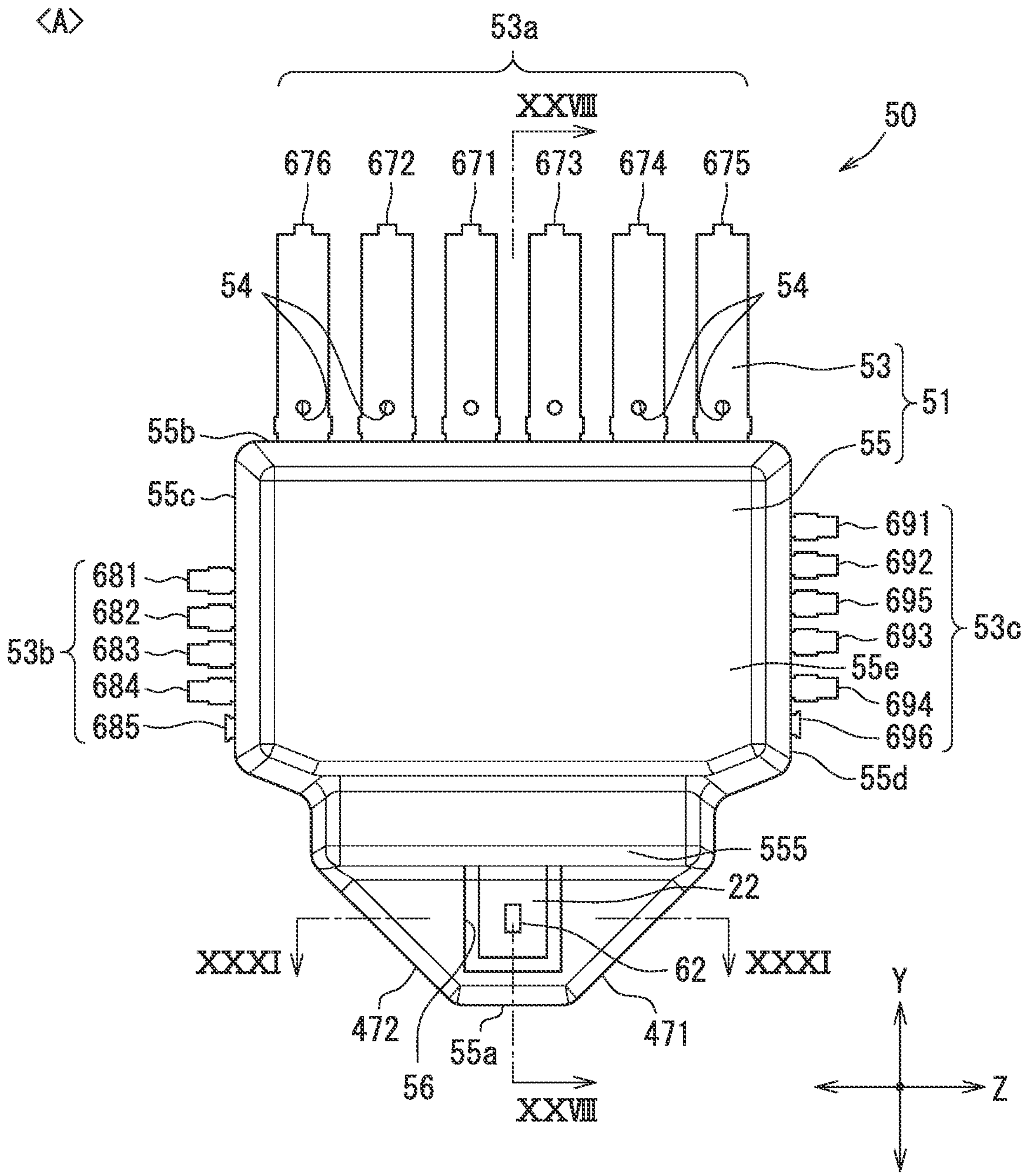
FIG. 10 is a plan view of the sensor SA as viewed from a mold front surface side.
Figure 11:
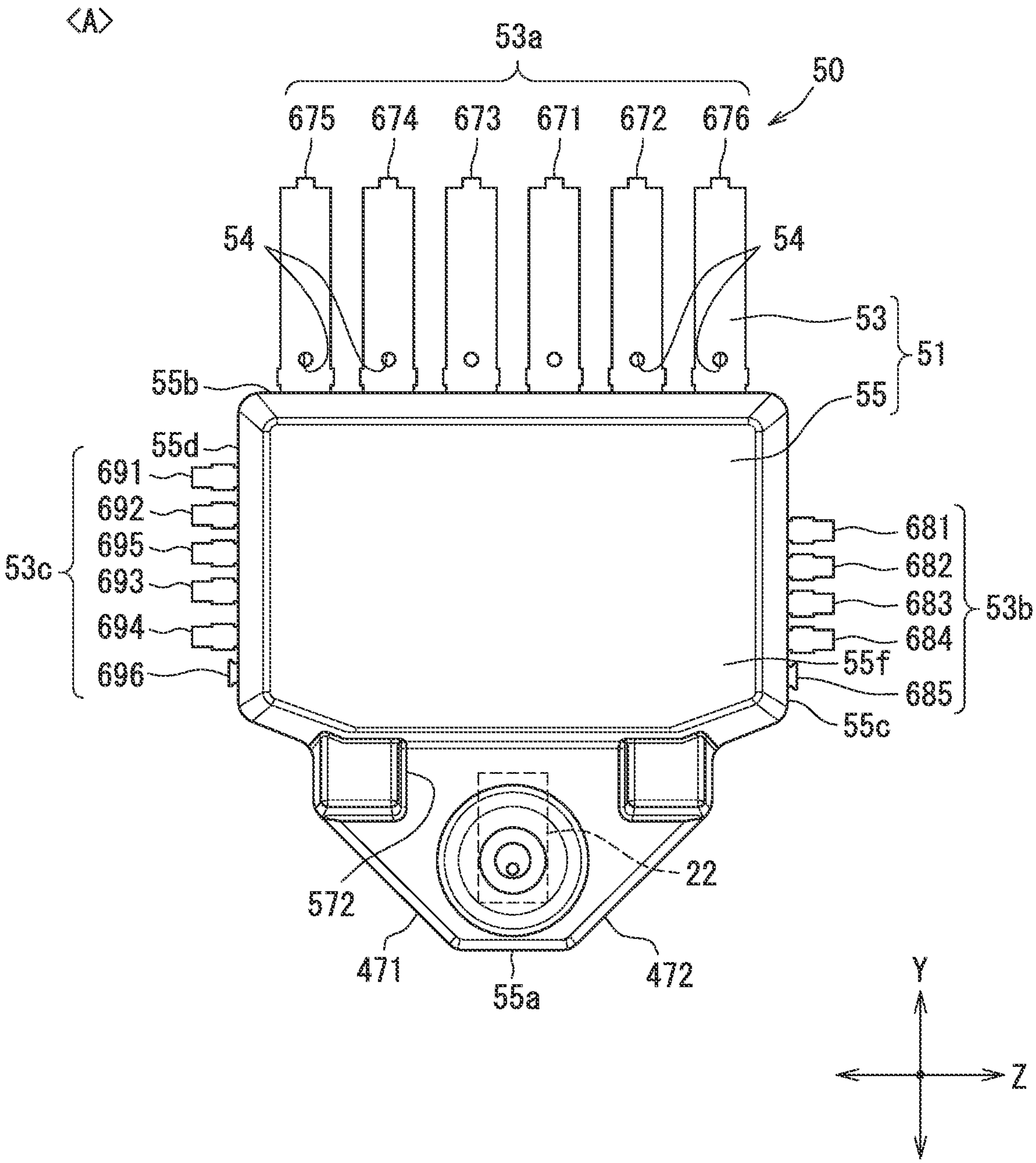
FIG. 11 is a plan view of the sensor SA as viewed from a mold back surface side.

As shown in FIGS. 9, 10, and 11, the sensor SA50 includes a sensor support portion 51 in addition to the flow sensor 22. The sensor support portion 51 is attached to the housing 21 and supports the flow sensor 22. The sensor support portion 51 includes an SA substrate 53 and a mold portion 55. The SA substrate 53 is a substrate on which the flow sensor 22 is mounted, and the mold portion 55 covers at least a part of the flow sensor 22 and at least a part of the SA substrate 53. The SA substrate 53 can also be referred to as a lead frame.

The mold portion 55 is formed in a plate shape as a whole. On the outer surface of the mold portion 55, of a pair of end surfaces 55*a* and 55*b* arranged in the height direction Y, the end surface on the housing tip end side is referred to as the mold tip end surface 55*a*, and the end surface on the housing base end side is referred to as the mold base end surface 55*b*. The mold tip end surface 55*a* is a tip end portion of the mold portion 55 and the sensor support portion 51, and corresponds to a support tip end portion. The mold portion 55 corresponds to a protection resin portion.

On the outer surface of the mold portion 55, one of a pair of surfaces provided with the mold tip end surface 55*a* and the mold base end surface 55*b* interposed therebetween is referred to as a mold upstream surface 55*c*, and the other is referred to as a mold downstream surface 55*d*. In FIG. 8, the sensor SA50 is installed inside the housing 21 in an orientation in which the mold tip end surface 55*a* is disposed on the airflow tip end side and the mold upstream surface 55*c* is disposed on the upstream side relative to the measurement flow path 32 with respect to the mold downstream surface 55*d*. In the sensor support portion 51, the mold upstream surface 55*c* corresponds to the upstream end portion, and the mold downstream surface 55*d* corresponds to the downstream end portion.

The mold upstream surface 55*c* of the sensor SA50 is disposed on the upstream side relative to the mold downstream surface 55*d* in the measurement flow path 32. In the portion where the flow sensor 22 is provided in the measurement flow path 32, the flowing orientation of the air is opposite from the flowing orientation of the air in the intake passage 12. Therefore, the mold upstream surface 55*c* is disposed on the downstream side relative to the mold downstream surface 55*d* in the intake passage 12. The air flowing along the flow sensor 22 flows in the depth direction Z, and this depth direction Z can also be referred to as a flow direction.

As shown in FIGS. 9 and 10, in the sensor SA50, the flow sensor 22 is exposed to one surface side of the sensor SA50. On the outer surface of the mold portion 55, the plate surface on the side where the flow sensor 22 is exposed is referred to as a mold front surface 55*e*, and the plate surface on the opposite side is referred to as a mold back surface 55*f*. One plate surface of the sensor SA50 is formed by the mold front surface 55*e*, and this mold front surface 55*e* corresponds to the support front surface and the mold back surface 55*f* corresponds to the support back surface.

Regarding the mold portion 55, in the height direction Y, the mold tip end surface 55*a* side may be referred to as a mold tip end side, and the mold base end surface 55*b* side may be referred to as a mold base end side. In the depth direction Z, the mold upstream surface 55*c* side may be referred to as a mold upstream side, and the mold downstream surface 55*d* side may be referred to as a mold downstream side. In the width direction X, the mold front surface 55*e* side may be referred to as a mold front side, and the mold back surface 55*f* side may be referred to as a mold back side.

The sensor SA50 has a peripheral edge recess portion 56. The peripheral edge recess portion 56 is an elongated recess portion provided on the mold front surface 55*e*, and extends in a groove shape along the peripheral edge portion of the flow sensor 22. The bottom surface of the peripheral edge recess portion 56 is provided at a position separated from the mold front surface 55*e* toward the mold back side, and is formed by the mold portion 55. The pair of inner wall surfaces of the peripheral edge recess portion 56 face each other with the bottom surface interposed therebetween, the inner wall surface on the inner peripheral side is formed by the outer wall surface of the flow sensor 22, and the inner wall surface on the outer peripheral side is formed by the mold portion 55.

In the peripheral edge recess portion 56, the depth dimension in the width direction X is smaller than the width dimensions in the directions Y and Z orthogonal to the width direction X. The peripheral edge recess portion 56 is provided on the mold tip end side with respect to a front measurement step surface 555 described later. The peripheral edge recess portion 56 has a pair of vertical portions extending parallel to each other in the height direction Y and a lateral portion extending in the depth direction Z so as to connect these vertical portions, and the pair of vertical portions extends from the front measurement step surface 555 toward the mold tip end side. The peripheral edge recess portion 56 is provided at a position separated inward from the outer peripheral edge of the mold front surface 55*e* in the directions Y and Z orthogonal to the width direction X.

The flow sensor 22 is provided at a position separated from the mold front surface 55*e* toward the mold back side in the width direction X. In the flow sensor 22, a sensor front surface 22*a* to be described later is provided at a position on the mold back side with respect to the mold front surface 55*e*. The bottom surface of the peripheral edge recess portion 56 extends parallel to the sensor front surface 22*a* in directions Y and Z orthogonal to the width direction X. In this case, in the peripheral edge recess portion 56, the height dimension of the inner wall surface on the inner peripheral side from the bottom surface is smaller than the height dimension of the inner wall surface on the outer peripheral side from the bottom surface in the width direction X (see FIG. 34).

The SA substrate 53 is a substrate formed of a metal material or the like in a plate shape as a whole, and has conductivity. The plate surface of the SA substrate 53 is orthogonal to the width direction X and extends in the height direction Y and the depth direction Z. The flow sensor 22 is mounted on the SA substrate 53. The SA substrate 53 includes a lead terminal 53*a*, an upstream testing terminal 53*b*, and a downstream testing terminal 53*c*. The SA substrate 53 has a portion covered with the mold portion 55 and a portion not covered with the mold portion 55, and the terminals 53*a*, 53*b*, and 53*c* are formed by the portion not covered. In FIG. 8 and the like, illustration of the terminals 53*a*, 53*b*, and 53*c* is omitted.

As shown in FIGS. 10 and 11, the lead terminal 53*a* is a terminal projecting from the mold base end surface 55*b* in the height direction Y, and a plurality of the lead terminals 53*a* are provided. The plurality of lead terminals 53*a* include terminals 671 to 673 connected to the connector terminal 28*a*, terminals 674 and 675 connected to the intake air temperature sensor 23, and an adjustment terminal 676 for adjusting detection accuracy and the like of the flow sensor 22.

In the present embodiment, the sensor SA50 has six lead terminals 53*a*. These six lead terminals 53*a* include three terminals connected to the connector terminal 28*a*, two terminals connected to the intake air temperature sensor 23, and one adjustment terminal. The three terminals connected to the connector terminal 28*a* include a flow ground terminal 671 that is grounded, a flow power supply terminal 672 to which a predetermined voltage such as 5V is applied, and a flow output terminal 673 that outputs a signal related to a detection result of the flow sensor 22. The two terminals connected to the intake air temperature sensor 23 include an intake air temperature ground terminal 674 connected to the ground and an intake air temperature output terminal 675 that outputs a signal related to a detection result of the intake air temperature sensor 23.

In the lead terminal 53*a*, the terminals 671 to 676 are arranged in the depth direction Z. In the depth direction Z, the flow measurement terminals 671 to 673 is disposed between the intake air temperature measurement terminals 674 and 675 and the adjustment terminal 676. In the flow measurement terminals 671 to 673, the flow ground terminal 671 is disposed between the flow power supply terminal 672 and the flow output terminal 673. The flow power supply terminal 672 is disposed next to the adjustment terminal 676, and the flow output terminal 673 is disposed next to the intake air temperature ground terminal 674. The arrangement order of the terminals 671 to 676 may not be the above-described order.

In the sensor SA50, a communication path for performing SENT communication is formed by the flow output terminal 673 and the intake air temperature output terminal 675. SENT communication for flow measurement is performed through the flow output terminal 673, and SENT communication for intake air temperature measurement is performed through the intake air temperature output terminal 675.

The downstream testing terminal 53*c* is a terminal projecting from the mold downstream surface 55*d* in the depth direction Z, and a plurality of the downstream testing terminals 53*c* are provided. The plurality of downstream testing terminals 53*c* include IC testing terminals 691 and 692, capacitor check terminals 693 and 694, and ground terminals 695 and 696. The IC testing terminals 691 and 692 are terminals for performing operation check and the like of the flow sensor 22. The capacitor check terminals 693 and 694 are terminals for performing operation check and the like of an internal capacitor mounted on the SA substrate 53. The ground terminals 695 and 696 are terminals for grounding.

In the downstream testing terminal 53*c*, the terminals 691 to 696 are arranged in the height direction Y. In the height direction Y, one ground terminal 695 is disposed between the IC testing terminals 691 and 692 and the capacitor check terminals 693 and 694. The other ground terminal 696 is disposed on the opposite side of the one ground terminal 695 with the capacitor check terminals 693 and 694 interposed therebetween. One of the ground terminals 695 and 696 is a terminal shorter than the other. For example, the ground terminal 696 is a terminal shorter than the ground terminal 695. The ground terminal 696 is a terminal also shorter than the IC testing terminals 691 and 692 and the capacitor check terminals 693 and 694.

The upstream testing terminal 53*b* is a terminal projecting from the mold upstream surface 55*c* in the depth direction Z, and a plurality of the upstream testing terminals 53*b* are provided. The plurality of upstream testing terminals 53*b* include IC testing terminals 681 and 682, capacitor check terminals 683 and 684, and a ground terminal 685. The IC testing terminals 681 and 682 are terminals for performing operation check and the like of the flow sensor 22. The capacitor check terminals 683 and 684 are terminals for performing operation check and the like of an internal capacitor. The ground terminal 685 is a terminal for grounding.

In the upstream testing terminal 53*b*, the terminals 681 to 685 are arranged in the height direction Y. In the height direction Y, the capacitor check terminals 683 and 684 are disposed between the IC testing terminals 681 and 682 and the ground terminal 685. The ground terminal 685 is a short terminal similarly to the ground terminal 696 on the upstream side, and is even shorter than the IC testing terminals 681 and 682 and the capacitor check terminals 683 and 684.

The testing terminals 53*b* and 53*c* are not in contact with the inner surface of a first housing portion 151. Specifically, in the upstream testing terminal 53*b*, the ground terminal 685 is shorter than the other terminals 681 to 684 as described above. For this reason, although the ground terminal 685 is disposed at the position closest to the housing tip end side among the terminals 681 to 685, it is difficult for the ground terminal 685 to come into contact with a housing step surface 137 (see FIG. 17) described later inside the first housing portion 151. Similarly, in the downstream testing terminal 53*c*, the ground terminal 696 is shorter than the other terminals 691 to 695 as described above. Therefore, although the ground terminal 696 is disposed at the position closest to the housing tip end side among the terminals 691 to 695, it is difficult for the ground terminal 696 to come into contact with the housing step surface 137 inside the first housing portion 151.

The lead terminal 53*a* is provided with a lead hole 54. The lead hole 54 penetrates the lead terminal 53*a* in the thickness direction of the lead terminal 53*a*, and is provided in each of the lead terminals 53*a*. The lead hole 54 is disposed at a position closer to the mold portion 55 in the lead terminal 53*a* in the height direction Y. The manufacturing process of the air flow meter 20 includes an inspection process of the flow sensor 22 at a stage after the flow sensor 22 is manufactured and before the flow sensor 22 is assembled to the first housing portion 151. This inspection process includes work of checking that the flow sensor 22 operates normally, work of acquiring the detection accuracy of the flow sensor 22, and work of adjusting the detection accuracy of the flow sensor 22. In this inspection process, the flow sensor 22 is inspected in a state where the flow sensor 22 is fixed to a workbench. The workbench is provided with a positioning jig such as a pin, and the flow sensor 22 is positioned with respect to the workbench by inserting the jig into the lead hole 54. This reduces work load when the flow sensor 22 is fixed to the workbench so as not to be displaced.

In the lead terminal 53*a*, the flow ground terminal 671 and the intake air temperature ground terminal 674 are provided integrally in a processing mounting portion 882 (see FIG.

37), meanwhile the other terminals 672, 673, 675, and 676 are provided independently of the processing mounting portion 882. In the upstream testing terminal 53*b*, the ground terminal 685 is provided integrally with the processing mounting portion 882, meanwhile the other terminals 681 to 684 are provided independently of the processing mounting portion 882. In the downstream testing terminal 53*c*, the ground terminals 695 and 696 are provided integrally with the processing mounting portion 882, meanwhile the other terminals 691 to 694 are provided independently of the processing mounting portion 882. In this manner, the ground terminals 671, 674, 685, 695, and 696 are connected to one another with the processing mounting portion 882 interposed therebetween.

In each of the upstream testing terminal 53*b* and the downstream testing terminal 53*c*, at least one terminal is only required to be short. For example, in the upstream testing terminal 53*b*, among the terminals 681 to 685, a plurality of terminals closest to the housing base end side from the housing tip end side excluding the one closest to the housing base end side may be shorter than the terminal disposed at the position closest to the housing base end side. In this case, it is possible to avoid more reliably the terminals 681 to 685 from coming into contact with the inner surface of the housing 21.

The outer surface of the SA substrate 53 includes a reference surface and a rough surface. The rough surface is a surface roughened than the reference surface by providing a large number of small projection portions and recess portions of 0.5 to 1.0 μm, for example. In the SA substrate 53, the outer surface of the lead terminal 53*a* is a reference surface, and the outer surfaces of the other portions are rough surfaces. The portions that are rough surfaces of the SA substrate 53 include a portion embedded in the mold portion 55 and testing terminals 53*b* and 53*c*. The rough surface has a larger surface area than that of the reference surface, so that the resin easily adheres to the rough surface. Therefore, since the outer surface of the portion of the SA substrate 53 embedded in the mold portion 55 is a rough surface, a gap is less likely to occur between the mold portion 55 and the SA substrate 53, and corrosion of the SA substrate 53 and the like in the mold portion 55 is suppressed. Since the outer surfaces of the testing terminals 53*b* and 53*c* are rough surfaces, a gap is less likely to occur between the testing terminals 53*b* and 53*c* and a second housing portion 152, and corrosion of the testing terminals 53*b* and 53*c* is less likely to occur inside the second housing portion 152.

On the other hand, the outer surface of the lead terminal 53*a* is a reference surface smoother than the rough surface. For this reason, since the contact area between the plate surface of the lead terminal 53*a* and the plate surface of a lead connection terminal 621 tends to become large, the electrical resistance at the connection portion between the lead terminal 53*a* and the lead connection terminal 621 tends to become small. Welding work between the lead terminal 53*a* and the lead connection terminal 621 is easily facilitated.

Figure 12:
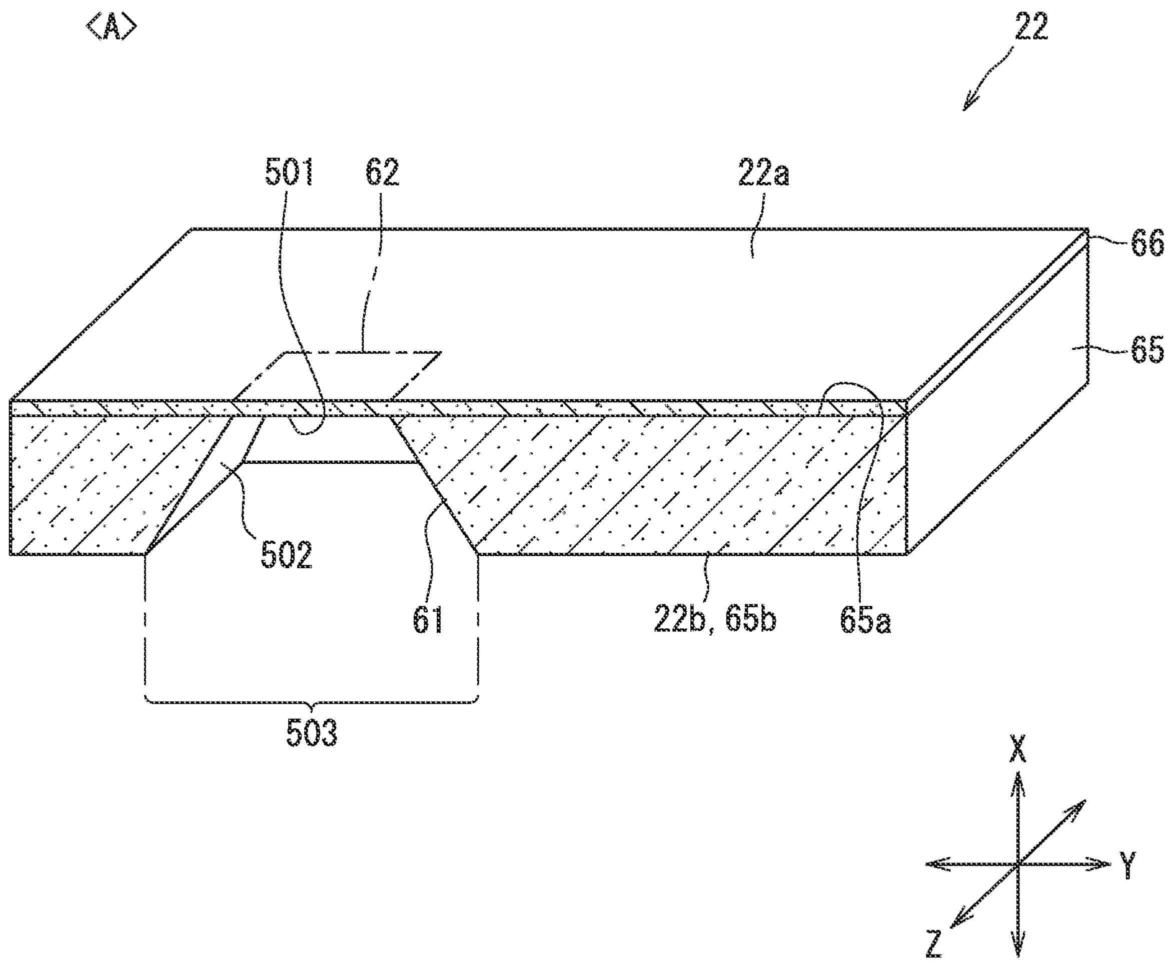
FIG. 12 is a perspective view of a flow sensor.

As shown in FIG. 12, the flow sensor 22 is formed in a plate shape as a whole. The flow sensor 22 has the sensor front surface 22*a* as one surface and a sensor back surface 22*b* opposite from the sensor front surface 22*a*. In the flow sensor 22, the sensor back surface 22*b* is overlapped on the SA substrate 53, and a part of the sensor front surface 22*a* is exposed to the outside of the sensor SA50.

The flow sensor 22 includes a sensor recess portion 61 and a membrane portion 62. The sensor recess portion 61 is provided with respect to the sensor back surface 22*b*, and the membrane portion 62 is provided with respect to the sensor front surface 22*a*. The membrane portion 62 forms a sensor recess bottom surface 501, which is a bottom surface of the sensor recess portion 61. The portion of the membrane portion 62 forming the sensor recess bottom surface 501 is a bottom portion for the sensor recess portion 61. The sensor recess portion 61 is formed by the sensor back surface 22*b* being recessed toward the sensor front surface 22*a* side, and is a cavity provided on the sensor back surface 22*b*. A sensor recess opening 503, which is an opening portion of the sensor recess portion 61, is provided on the sensor back surface 22*b*. A sensor recess inner wall surface 502, which is an inner wall surface of the sensor recess portion 61, is stretched between the sensor recess bottom surface 501 and the sensor recess opening 503. The membrane portion 62 is a sensing unit that senses the flow rate.

The flow sensor 22 includes a sensor substrate 65 and a sensor membrane portion 66. The sensor substrate 65 is a base material of the flow sensor 22, and is formed in a plate shape by a semiconductor material such as silicon. The sensor substrate 65 has a sensor substrate front surface 65*a* that is one surface and a sensor substrate back surface 65*b* opposite from the sensor substrate front surface 65*a*. A through hole penetrating the sensor substrate 65 in the width direction X is formed in the sensor substrate 65, and the sensor recess portion 61 is formed by this through hole. In the sensor substrate 65, a recess portion forming the sensor recess portion 61 may be formed instead of the through hole. In this case, the bottom surface of the sensor recess portion 61 is formed not by the membrane portion 62 but by the bottom surface of the recess portion of the sensor substrate 65.

The sensor membrane portion 66 is stacked on the sensor substrate front surface 65*a* of the sensor substrate 65 and extends in a film shape along the sensor substrate front surface 65*a*. In the flow sensor 22, the sensor front surface 22*a* is formed by the sensor membrane portion 66, and the sensor back surface 22*b* is formed by the sensor substrate 65. In this case, the sensor back surface 22*b* is the sensor substrate back surface 65*b* of the sensor substrate 65. The sensor membrane portion 66 covers the through hole of the sensor substrate 65, and a portion of the sensor membrane portion 66 covering the through hole is the membrane portion 62. In the sensor recess portion 61, the sensor recess bottom surface 501 is formed by the back surface of the sensor membrane portion 66.

The sensor membrane portion 66 has a plurality of layers such as an insulating layer, a conductive layer, and a protection layer, and has a multilayer structure. These are all formed in a film shape and extend along the sensor substrate front surface 65*a*. The sensor membrane portion 66 has a wiring pattern such as wiring and a resistance element, and this wiring pattern is formed of a conductive layer.

In the flow sensor 22, the sensor recess portion 61 is formed by processing a part of the sensor substrate 65 by wet etching. In the manufacturing process of the flow sensor 22, a mask such as a silicon nitride film is attached to the sensor substrate back surface 65*b* of the sensor substrate 65, and anisotropic etching is performed on the sensor substrate back surface 65*b* using an etching solution until the sensor substrate 65 is exposed. The sensor recess portion 61 may be formed by performing dry etching on the sensor substrate 65.

Figure 13:
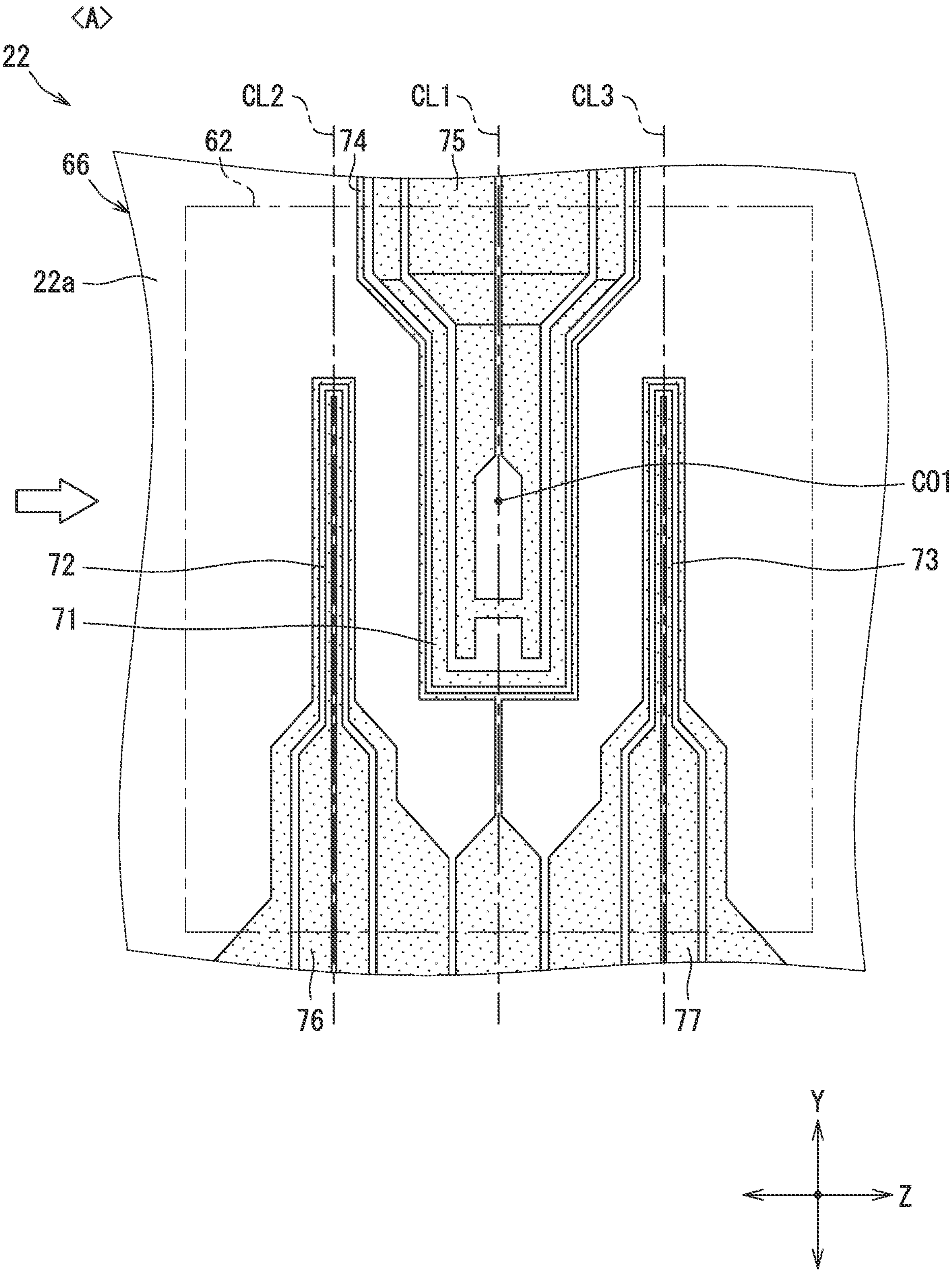
FIG. 13 is a view showing a wiring pattern of a membrane portion.

The sensor SA50 includes a flow detection circuit that detects the flow rate of air, and at least a part of this flow detection circuit is included in the flow sensor 22. As shown in FIG. 13, the sensor SA50 includes, as circuit elements included in the flow detection circuit, a heat resistance element 71, resistance thermometers 72 and 73, and an indirect thermal resistance element 74. These resistance elements 71 to 74 are included in the flow sensor 22 and are formed by the conductive layer of the sensor membrane portion 66. In this case, the sensor membrane portion 66 includes the resistance elements 71 to 74, and these resistance elements 71 to 74 are included in the wiring pattern of the conductive layer. The resistance elements 71 to 74 correspond to detection elements. In FIG. 13, a wiring pattern including the resistance elements 71 to 74 is indicated by dot hatching. The flow detection circuit can also be referred to as a flow measurement unit that measures the flow rate of air.

The heat resistance element 71 is a resistance element that generates heat as the heat resistance element 71 is energized. The heat resistance element 71 heats the sensor membrane portion 66 by generating heat and corresponds to the heater portion. The resistance thermometers 72 and 73 are resistance elements for detecting the temperature of the sensor membrane portion 66, and correspond to temperature detection units. The resistance values of the resistance thermometers 72 and 73 change according to the temperature of the sensor membrane portion 66. Using the resistance values of the resistance thermometers 72 and 73, the flow detection circuit detects the temperature of the sensor membrane portion 66. When the heat resistance element 71 raises the temperature of the sensor membrane portion 66 and the resistance thermometers 72 and 73 and air flow occurs in the measurement flow path 32, the flow detection circuit detects the air flow rate and the orientation of the flow using the change mode of the detection temperature by the resistance thermometers 72 and 73.

The heat resistance element 71 is disposed substantially at the center of the membrane portion 62 in each of the height direction Y and the depth direction Z. The heat resistance element 71 is formed in a rectangular shape extending in the height direction Y as a whole. A center line CL1 of the heat resistance element 71 passes through a center CO1 of the heat resistance element 71 and linearly extends in the height direction Y. This center line CL1 passes through the center of the membrane portion 62. The heat resistance element 71 is disposed at a position separated inward from the peripheral edge portion of the membrane portion 62. In the heat resistance element 71, the separation distance with respect to the center CO1 is the same between the end portion on the mold tip end side and the end portion on the mold base end side.

Each of the resistance thermometers 72 and 73 is formed in a rectangular shape extending in the height direction Y as a whole, and is arranged in the depth direction Z. The heat resistance element 71 is provided between these resistance thermometers 72 and 73. Among the resistance thermometers 72 and 73, the upstream resistance thermometer 72 is provided at a position separated from the heat resistance elements 71 toward the mold upstream side. The downstream resistance thermometer 73 is provided at a position away from the heat resistance elements 71 toward the mold downstream side. A center line CL2 of the upstream resistance thermometer 72 and a center line CL3 of the downstream resistance thermometer 73 both extend linearly in parallel to the center line CL1 of the heat resistance element 71. The heat resistance element 71 is provided at an intermediate position between the upstream resistance thermometer 72 and the downstream resistance thermometer 73 in the depth direction Z.

In the sensor SA50 of the present embodiment, in FIG. 10, the mold upstream surface **55*c* side is referred to as the mold upstream side, and the mold downstream surface 55*d* side is referred to as the mold downstream side. The mold tip end surface 55*a* side is referred to as the mold tip end side, and the mold base end surface 55*b*** side is referred to as the mold base end side.

Returning to the description of FIG. 13, the indirect thermal resistance element 74 is a resistance element for detecting the temperature of the heat resistance element 71. The indirect thermal resistance element 74 extends along the peripheral edge portion of the heat resistance element 71. The resistance value of the indirect thermal resistance element 74 changes according to the temperature of the heat resistance element 71. In the flow detection circuit, the temperature of the heat resistance element 71 is detected using the resistance value of the indirect thermal resistance element 74.

The sensor SA50 includes a heating wiring 75 and temperature measurement wirings 76 and 77. Similarly to the resistance elements 71 to 74, these wirings 75 to 77 are included in the wiring pattern of the sensor membrane portion 66. The heating wiring 75 extends in the height direction Y from the heat resistance element 71 toward the mold base end side. The upstream temperature measurement wiring 76 extends in the height direction Y from the upstream resistance thermometer 72 toward the mold tip end side. The downstream temperature measurement wiring 77 extends in the height direction Y from the downstream resistance thermometer 73 toward the mold tip end side.

As described above, in the sensor SA50, the internal capacitor is mounted on the SA substrate 53. The sensor SA50 has an internal power supply that applies a constant voltage to a bridge circuit or the like included in the flow detection circuit, and the internal capacitor has a function of stabilizing the voltage of the internal power supply. The internal capacitor is a passive component such as a chip capacitor.

As for the air flow meter 20, there are concerns that external noise from the outside is applied to the sensor SA50, noise generated in the sensor SA50 is emitted to the outside as internal noise, and static electricity is applied to the sensor SA50. On the other hand, the internal capacitor has an immunity resistance function for the sensor SA50 to withstand external noise, an emission reduction function for reducing internal noise from the sensor SA50, and an electrostatic resistance function for the sensor SA50 to withstand static electricity.

In the air flow meter 20, heater temperature control such as feedback control is performed in order to adjust the temperature of heat generated by the heat resistance element 71. The internal capacitor has a function of restricting oscillation of the heat resistance element 71 between the on state and the off state in heater temperature control. In this case, the internal capacitor stabilizes the heater temperature control.

Figure 14:
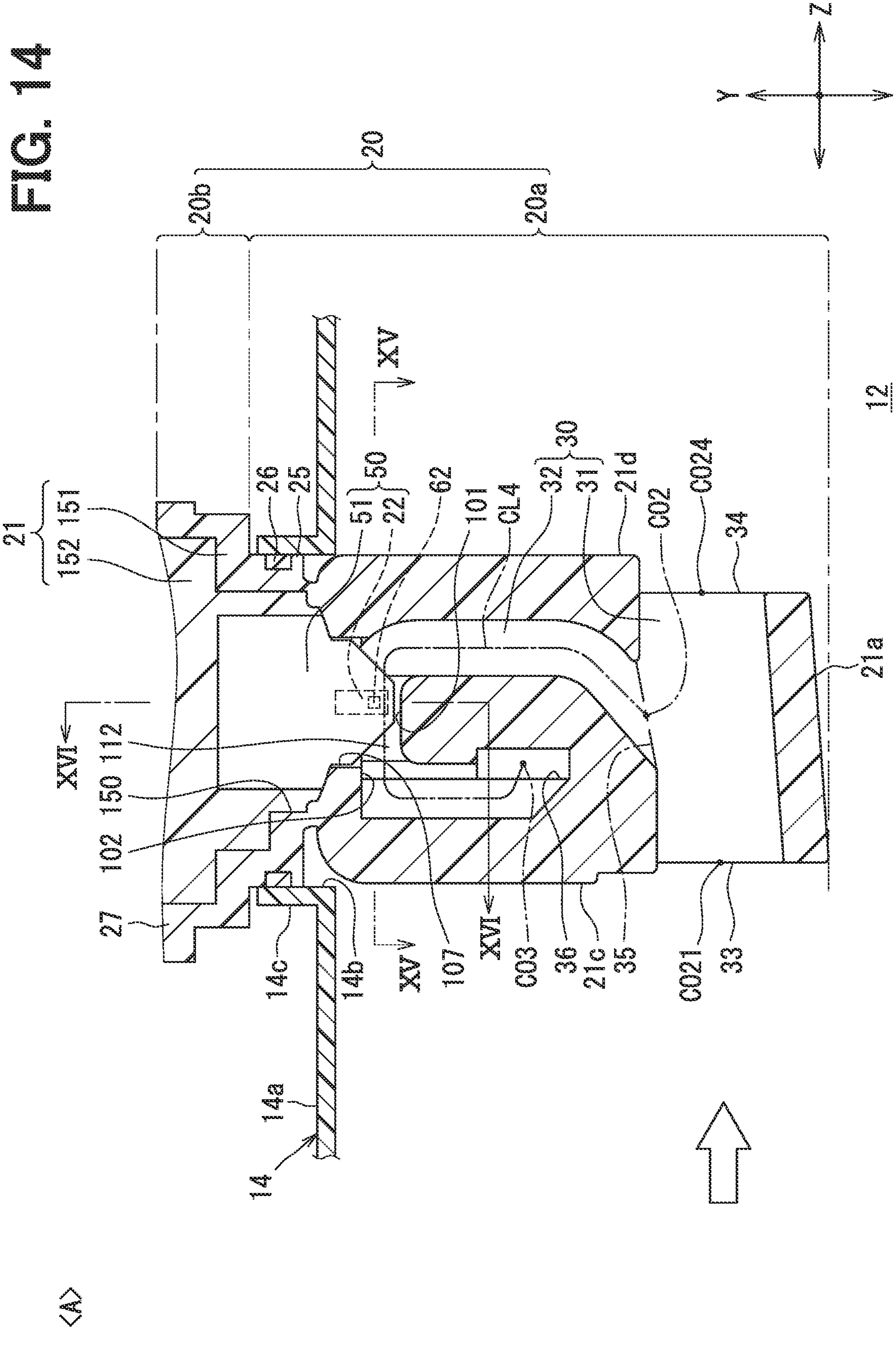
FIG. 14 is a longitudinal cross-sectional view of the air flow meter.
Figure 15:
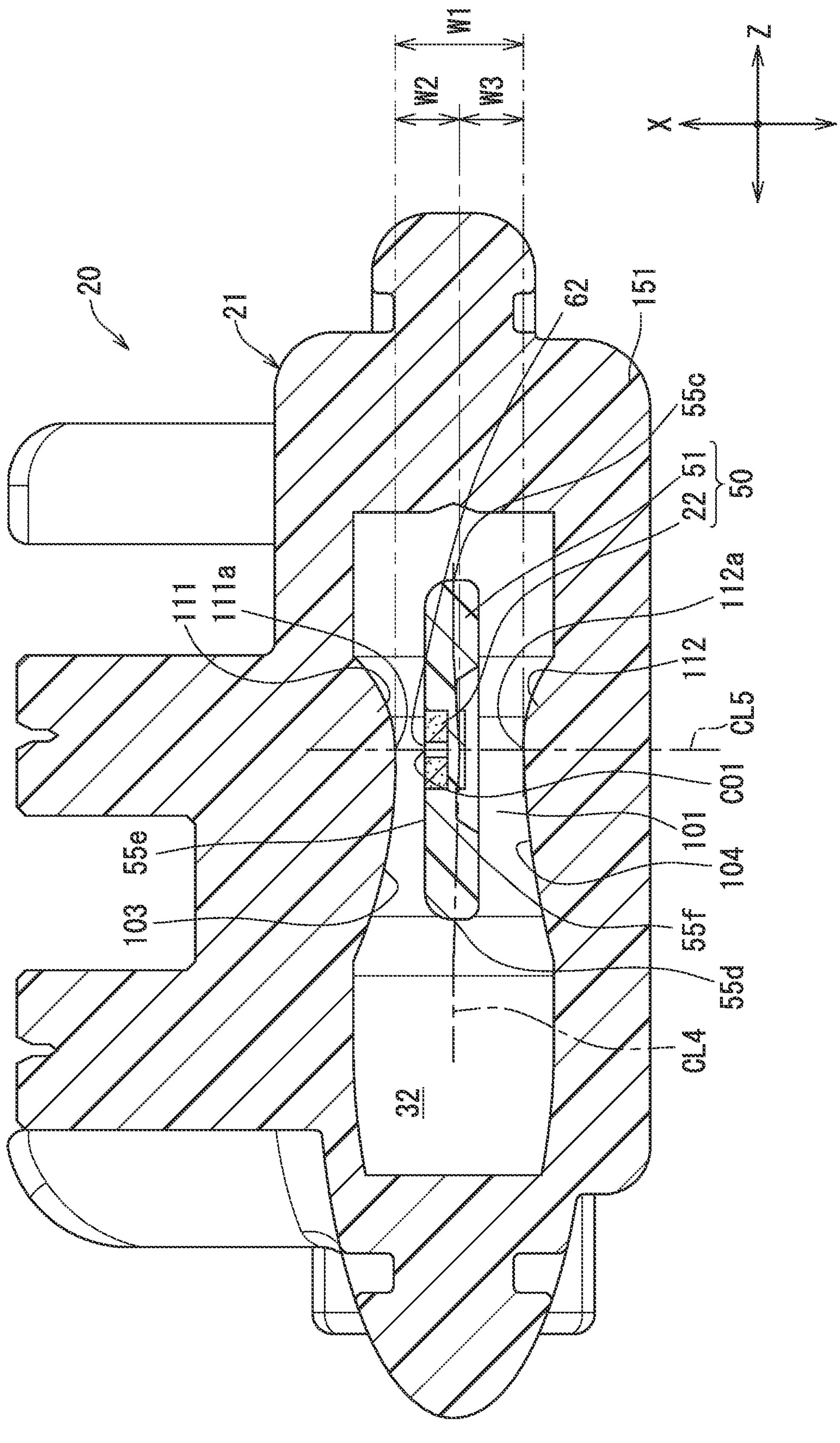
FIG. 15 is a cross-sectional view taken along a line XV-XV of FIG. 14.

As shown in FIGS. 14 and 15, a center line CL4 of the measurement flow path 32 passes through a center CO2 of the measurement entrance 35 and a center CO3 of the measurement exit 36, and extends linearly along the measurement flow path 32. The sensor SA50 is provided between the measurement entrance 35 and the measurement exit 36 in the measurement flow path 32. The sensor SA50 is provided at a position separated on the upstream side from the measurement entrance 35 and at a position separated on the upstream side from the measurement exit 36. FIG. 14 illustrates, as the center line CL4, a center line of a region of the measurement flow path 32 excluding the internal space of an SA insertion hole 107.

In the passage flow path 31, both the passage entrance 33 and the passage exit 34 have a rectangular shape and a vertically long shape. In both the passage entrance 33 and the passage exit 34, the height dimension of the height direction Y is larger than the width dimension of the width direction X. The opening area of the passage exit 34 is smaller than the opening area of the passage entrance 33. For example, the opening area of the passage exit 34 is smaller than ½ of the opening area of the passage entrance 33. The height dimension of the passage exit 34 and the height dimension of the passage entrance 33 are the same in the height direction Y, meanwhile the width dimension of the passage exit 34 is smaller than the width dimension of the passage entrance 33 in the width direction X. The opening area of the passage entrance 33 is the area of the region including a center CO21 of the passage entrance 33, and the opening area of the passage exit 34 is the area of the region including a center CO24 of the passage exit 34.

In the air flow meter 20, the center of the passage entrance 33 is disposed at a position overlapping the center line of the intake passage 12. The width dimension of the passage entrance 33 is set to a value as small as possible so that the pressure loss generated in the bypass flow path 30 does not become too large. However, if the width dimension of the passage entrance 33 is made too small with respect to the intake passage 12, there is a concern that in the configuration in which the air flows into the passage entrance 33 in the central portion of the intake passage 12, the robustness of the flow rate measurement and the flow velocity measurement is deteriorated. Therefore, the width dimension of the passage entrance 33 is preferably set such that the pressure loss in the bypass flow path 30 and the robustness of measurement are optimized.

In the measurement flow path 32, the measurement exit 36 has a rectangular shape and a vertically long shape. In the measurement exit 36, the height dimension of the height direction Y is larger than the width dimension of the width direction X. The opening area of the measurement exit 36 is smaller than the opening area of the measurement entrance 35. On the other hand, the total value of the opening areas of the plurality of measurement exits 36 is larger than the opening area of the measurement entrance 35. The opening area of the measurement entrance 35 is an area of a region including the center CO2 of the measurement entrance 35, and the opening area of the measurement exit 36 is an area of a region including the center CO3 of the measurement exit 36.

Figure 16:
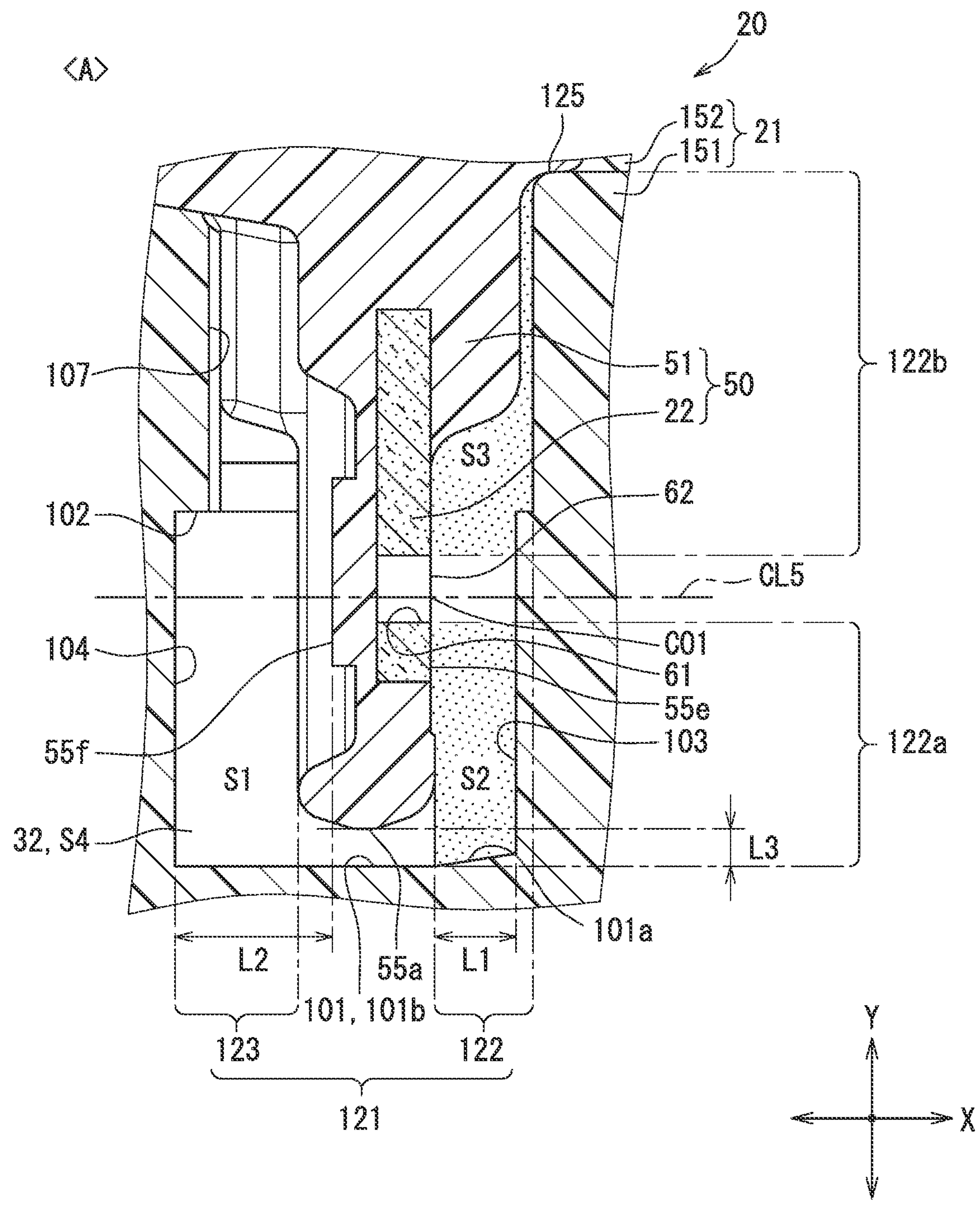
FIG. 16 is a cross-sectional view taken along a line XVI-XVI of FIG. 14.

As shown in FIGS. 15 and 16, the housing 21 includes a measurement floor surface 101, a measurement ceiling surface 102, a front measurement wall surface 103, and a back measurement wall surface 104 as formation surfaces forming the measurement flow path 32. The measurement floor surface 101, the measurement ceiling surface 102, the front measurement wall surface 103, and the back measurement wall surface 104 all extend along the center line CL4 of the measurement flow path 32. The measurement floor surface 101, the measurement ceiling surface 102, the front measurement wall surface 103, and the back measurement wall surface 104 form a portion extending in the depth direction Z of the measurement flow path 32. The measurement floor surface 101 corresponds to a floor surface, the front measurement wall surface 103 corresponds to a front wall surface, and the back measurement wall surface 104 corresponds to a back wall surface. The width direction X corresponds to the front and back direction in which the front wall surface and the back wall surface are arranged side by side.

The measurement floor surface 101 and the measurement ceiling surface 102 are provided between the front measurement wall surface 103 and the back measurement wall surface 104. The measurement floor surface 101 faces the mold tip end surface 55*a* of the sensor SA50 and extends straight in the depth direction Z. The measurement floor surface 101 has a front side floor surface portion 101*a* and a back side floor surface portion 101*b*. The front side floor surface portion 101*a* extends from the front measurement wall surface 103 toward the back measurement wall surface 104, and the back side floor surface portion 101*b* extends from the back measurement wall surface 104 toward the front measurement wall surface 103. The front side floor surface portion 101*a* and the back side floor surface portion 101*b* are provided side by side in the width direction X, and the length dimension of the front side floor surface portion 101*a* is smaller than the length dimension of the back side floor surface portion 101*b* in the width direction X. The front side floor surface portion 101*a* is stretched between the front measurement wall surface 103 and the back side floor surface portion 101*b* in the width direction X. The front side floor surface portion 101*a* extends in the width direction X, and extends, for example, in parallel to a center line CL5 of the heat resistance element 71 described later. The back side floor surface portion 101*b* is inclined with respect to the front side floor surface portion 101*a* so as to face the back measurement wall surface 104 side.

The measurement ceiling surface 102 is provided on the side opposite from the measurement floor surface 101 via the center line CL4 in the height direction Y. The SA insertion hole 107 into which the sensor SA50 is inserted is provided in a portion forming the measurement ceiling surface 102 in the housing 21. This SA insertion hole 107 is closed by the sensor SA50. The measurement flow path 32 also includes a gap between the sensor SA50 and the housing 21 of the internal space of the SA insertion hole 107.

The front measurement wall surface 103 and the back measurement wall surface 104 are a pair of wall surfaces facing each other with the measurement floor surface 101 and the measurement ceiling surface 102 interposed therebetween. The front measurement wall surface 103 faces the mold front surface 55*e* of the sensor SA50, and extends from the end portion on an airflow front side of the measurement floor surface 101 toward the housing base end side. In particular, the front measurement wall surface 103 faces the flow sensor 22 of the sensor SA50. The back measurement wall surface 104 faces the mold back surface 55*f* of the sensor SA50, and extends from the end portion on an airflow back side of the measurement floor surface 101 toward the housing base end side. In FIGS. 15 and 16, the illustration of the internal structure of the sensor SA50 is simplified, and only the mold portion 55 and the flow sensor 22 are illustrated.

The housing 21 includes a front narrowing portion 111 and a back narrowing portion 112. These narrowing portions 111 and 112 gradually narrow the measurement flow path 32 such that a cross-sectional area S4 of the measurement flow path 32 gradually decreases from the upstream of the measurement entrance 35 and the like toward the flow sensor 22. The narrowing portions 111 and 112 gradually narrow the measurement flow path 32 such that from the flow sensor 22, the cross-sectional area S4 gradually decreases from the downstream of the measurement exit 36 and the like toward the flow sensor 22. Regarding the measurement flow path 32, the area of a region orthogonal to the center line CL4 is referred to as the cross-sectional area S4, and this cross-sectional area S4 can also be referred to as a flow path area.

The front narrowing portion 111 is a projection portion in which a part of the front measurement wall surface 103 projects toward the back measurement wall surface 104. The back narrowing portion 112 is a projection portion in which a part of the back measurement wall surface 104 projects toward the front measurement wall surface 103. The front narrowing portion 111 and the back narrowing portion 112 are arranged in the height direction Y and face each other in the height direction Y. These narrowing portions 111 and 112 are stretched between the measurement ceiling surface 102 and the measurement floor surface 101. The narrowing portions 111 and 112 gradually decrease a measurement width dimension W1, which is a separation distance between the front measurement wall surface 103 and the back measurement wall surface 104 in the width direction X, from the upstream toward the flow sensor 22. The narrowing portions 111 and 112 gradually decrease the measurement width dimension W1 from the downstream toward the flow sensor 22.

The narrowing portions 111 and 112 gradually approach the center line CL4 from the upstream side toward the flow sensor 22 in the measurement flow path 32. In the measurement flow path 32, separation distances W2 and W3 between the narrowing portions 111 and 112 and the center line CL4 in the width direction X gradually decrease from the upstream toward the flow sensor 22. The narrowing portions 111 and 112 gradually approach the center line CL4 from the downstream side toward the flow sensor 22 in the measurement flow path 32. In the measurement flow path 32, the separation distances W2 and W3 between the narrowing portions 111 and 112 and the center line CL4 in the width direction X gradually decrease from the downstream toward the flow sensor 22.

In the narrowing portions 111 and 112, portions closest to the center line CL4 become top portions 111*a* and 112*a*. In this case, in the narrowing portions 111 and 112, the separation distances W2 and W3 from the center line CL4 are the smallest at the top portions 111*a* and 112*a*. Of the top portions 111*a* and 112*a*, the front top portion 111*a* is the top portion of the front narrowing portion 111, and the back top portion 112*a* is the top portion of the back narrowing portion 112. The front top portion 111*a* and the back top portion 112*a* are arranged in the width direction X and face each other.

The flow sensor 22 is provided between the front narrowing portion 111 and the back narrowing portion 112. Specifically, the center CO1 of the heat resistance element 71 of the flow sensor 22 is provided between the front top portion 111*a* and the back top portion 112*a*. Regarding the heat resistance element 71, when a linear imaginary line passing through the center CO1, orthogonal to the center line CL1, and extending in the width direction X is referred to as the center line CL5, both the front top portion 111*a* and the back top portion 112*a* are disposed on this center line CL5. In this case, the center CO1 of the heat resistance element 71 and the front top portion 111*a* are arranged in the width direction X, and the center CO1 of the heat resistance element 71 and the front top portion 111*a* face each other in the width direction X.

As shown in FIG. 16, the sensor support portion 51 of the sensor SA50 is provided at a position closer to the front narrowing portion 111 than the back narrowing portion 112 in the width direction X. That is, the sensor support portion 51 is provided at a position closer to the front measurement wall surface 103 than the back measurement wall surface 104. On the center line CL5 of the heat resistance element 71, a front distance L1, which is the separation distance between the flow sensor 22 and the front measurement wall surface 103 in the width direction X, is smaller than a back distance L2, which is the separation distance between the flow sensor 22 and the back measurement wall surface 104 in the width direction X. That is, the relationship of L1<L2 is established. The front distance L1 is a separation distance between the center CO1 of the heat resistance element 71 and the front top portion 111*a* of the front narrowing portion 111. The back distance L2 is a separation distance on the center line CL5 of the heat resistance element 71 between the mold back surface 55*f* and the back top portion 112*a* of the back narrowing portion 112.

The mold tip end surface 55*a* of the sensor support portion 51 is disposed at a position closer to the measurement floor surface 101 than the measurement ceiling surface 102 in the height direction Y. In this case, in measurement flow path 32, a floor distance L3 is smaller than the front distance L1. That is, the relationship of L1>L3 is established. The floor distance L3 is a separation distance between the mold tip end surface 55*a* and the measurement floor surface 101 in the height direction Y. Specifically, the floor distance L3 is a separation distance between a portion closest to the mold tip end surface 55*a* and the mold tip end surface 55*a* in a portion of the measurement floor surface 101 facing the mold tip end surface 55*a*.

In the measurement flow path 32, of a region surrounded by the inner surface of the housing 21 and the outer surface of the sensor SA50, a planar region orthogonal to the center line CL4 and passing through the center CO1 of the heat resistance element 71 is referred to as a sensor region 121. The air flowing from the measurement entrance 35 toward the measurement exit 36 in the measurement flow path 32 needs to pass through the sensor region 121.

The sensor region 121 has a front region 122 and a back region 123. The front region 122 is a region on the front measurement wall surface 103 side relative to the mold front surface 55*e* in the width direction X. The back region 123 is a region on the back measurement wall surface 104 side relative to the mold back surface 55*f* in the width direction X. These regions 122 and 123 extend from the measurement floor surface 101 toward the measurement ceiling surface 102 in the height direction Y. In the measurement flow path 32, the sensor SA50 is disposed between the front region 122 and the back region 123 in the width direction X.

The front region 122 has a floor side region 122*a* and a ceiling side region 122*b*. The floor side region 122*a* is a region in the front region 122 extending from the floor side end portion of the flow sensor 22 toward the measurement floor surface 101. In the floor side region 122*a*, the end portion on the housing tip end side is formed by the measurement floor surface 101. Therefore, the floor side region 122*a* is a region between the flow sensor 22 and the measurement floor surface 101 in the height direction Y. The ceiling side region 122*b* is a region in the front region 122 extending from the ceiling side end portion of the flow sensor 22 toward the measurement ceiling surface 102. In the front region 122, the end portion on the housing base end side is formed by a ceiling side boundary portion, which is a boundary portion between the inner surface of the housing 21 and the outer surface of the sensor SA50. Therefore, the ceiling side region 122*b* is a region between the flow sensor 22 and the ceiling side boundary portion in the height direction Y.

When the area of the sensor region 121 is referred to as a region area S1, this region area S1 is a cross-sectional area of a portion where the flow sensor 22 is provided in the measurement flow path 32. The region area S1 includes a floor side area S2, which is the area of the floor side region 122*a*, and a ceiling side area S3, which is the area of the ceiling side region 122*b*. In the front region 122, the ceiling side area S3 is smaller than the floor side area S2. That is, the relationship of S3<S2 is established.

According to the present embodiment described so far, the front distance L1 is larger than the floor distance L3 in the measurement flow path 32. In this configuration, the amount of air flowing along the front measurement wall surface 103 and the mold front surface 55*e* tends to be larger than the amount of air flowing along the measurement floor surface 101 and the mold tip end surface 55*a*. In this case, since the air easily flows along the flow sensor 22 of the mold front surface 55*e*, decrease in the detection accuracy of the flow rate by the flow sensor 22 due to an insufficient amount of air flowing along the flow sensor 22 is less likely to occur. Therefore, the detection accuracy of the flow rate by the flow sensor 22 can be enhanced, and as a result, the measurement accuracy of the air flow rate by the air flow meter 20 can be enhanced.

In the configuration in which the floor distance L3 is smaller than the front distance L1, there is a concern that the measurement flow path 32 is narrowed from the measurement floor surface 101 side and the region area S1 of the sensor region 121 is insufficient. In the measurement flow path 32, when the cross-sectional area such as the region area S1 is insufficient, the pressure loss increases, and the air hardly flows from the passage flow path 31 into the measurement flow path 32. In this case, the air flow rate in the measurement flow path 32 is insufficient, separation or disturbance of the airflow is likely to occur in the measurement flow path 32, and noise is likely to be included in the detection result of the flow sensor 22 due to the separation or disturbance.

On the other hand, according to the present embodiment, the front distance L1 is smaller than the back distance L2 in the measurement flow path 32. In this case, even if the region between the mold tip end surface 55*a* of the sensor SA50 and the measurement floor surface 101 is narrow, the back region 123 between the mold back surface 55*f* and the back measurement wall surface 104 is relatively wide. In this configuration, the back region 123 suppresses the shortage of the region area S1 of the sensor region 121, and the shortage of the air flow rate in the measurement flow path 32 hardly occurs. In this case, separation or disturbance of the airflow is less likely to occur in the measurement flow path 32, and it is possible to suppress noise from being included in the detection result of the flow sensor 22. In this case, since the pressure loss in the measurement flow path 32 is reduced and the flow rate tends to increase, the range of the flow detection by the flow sensor 22 can be expanded. That is, the variation of the output of the air flow meter 20 is suppressed, and the air flow meter 20 can be set to the dynamic range. Therefore, both the output variation suppression and the dynamic range can be achieved for the air flow meter 20.

The front distance L1 is smaller than the back distance L2. In this configuration, when the air flow meter 20 is manufactured, even if the relative position of the sensor SA50 with respect to the housing 21 is shifted in the width direction X due to an attachment error of the sensor SA50 with respect to the housing 21, it is easy to maintain a relationship in which the front distance L1 is smaller than the back distance L2. As described above, even if an attachment error of the sensor SA50 with respect to the housing 21 occurs, a configuration in which the detection accuracy of the flow sensor 22 is less likely to decrease can be achieved by the relationship between the front distance L1 and the back distance L2.

According to the present embodiment, the housing 21 includes the front narrowing portion 111. In this configuration, since the front narrowing portion 111 gradually narrows the measurement flow path 32 from the measurement entrance 35 side toward the flow sensor 22, even if separation or disturbance occurs in the airflow, the flow of the air is straightened by the front narrowing portion 111, so that the separation or the disturbance is reduced. In this case, since separation or disturbance hardly reaches the flow sensor 22, the detection accuracy of the flow sensor 22 can be enhanced. Moreover, since the front distance L1 is the separation distance between the front narrowing portion 111 and the flow sensor 22, the air flowing along the flow sensor 22 can be reliably straightened by the front narrowing portion 111.

According to the present embodiment, the front distance L1 is the separation distance between the front top portion 111*a* of the front narrowing portion 111 and the flow sensor 22. In the front narrowing portion 111, since the portion having the highest straightening effect tends to become the front top portion 111*a*, it is possible to reliably suppress separation or disturbance from being included in the air flowing along the flow sensor 22 by causing the portion having the highest straightening effect to face the flow sensor 22. This can further enhance the detection accuracy of the flow sensor 22.

According to the present embodiment, the housing 21 includes the back narrowing portion 112. In this configuration, since the back narrowing portion 112 gradually narrows the measurement flow path 32 from the measurement entrance 35 side toward the flow sensor 22, even if separation or disturbance occurs in the airflow, the flow of the air is straightened by the back narrowing portion 112, so that the separation or the disturbance is reduced. In the measurement flow path 32, it is considered that the air flowing toward the flow sensor 22 at the height position near the flow sensor 22 in the height direction Y easily passes through both the front side and the back side of the sensor support portion 51. Therefore, straightening, by the back narrowing portion 112, also the air flowing along the back measurement wall surface 104 is effective in suppressing separation or disturbance from reaching the flow sensor 22.

According to the present embodiment, in the measurement flow path 32, the ceiling side area S3 of the ceiling side region 122*b* is smaller than the floor side area S2 of the floor side region 122*a*. In this configuration, the pressure loss is more likely to increase in the ceiling side region 122*b* than in the floor side region 122*a*, and the air is less likely to flow. Therefore, even if the measurement flow path 32 is configured such that the air flowing along the measurement ceiling surface 102 is likely to flow faster or more than the air flowing along the measurement floor surface 101, the speed and rate of the air flowing through the ceiling side region 122*b* and the floor side region 122*a* can be equalized. As a result, it is possible to suppress that the detection accuracy of the flow sensor 22 deteriorates due to the mixture of fast airflow and slow airflow in the airflow reaching the sensor region 121.

According to the present embodiment, the measurement flow path 32 is bent such that the measurement ceiling surface 102 is on the outer peripheral side and the measurement floor surface 101 is on the inner peripheral side. In this configuration, due to a centrifugal force or the like, the air flowing along the measurement ceiling surface 102 tends to flow faster or more than the air flowing along the measurement floor surface 101. Therefore, it is effective that the ceiling side area S3 is smaller than the floor side area S2 in order to equalize the speed and rate of air flowing in the ceiling side region 122*b* and the floor side region 122*a*.

According to the present embodiment, the front distance L1 is the separation distance between the front measurement wall surface 103 and the heat resistance element 71. In the flow sensor 22, since the flow rate is detected for the air flowing along the heat resistance element 71, the detection accuracy of the flow sensor 22 can be enhanced by managing the positional relationship between the heat resistance element 71 and the front measurement wall surface 103.

According to the present embodiment, in the sensor SA50, both the mold front surface 55*e* and the mold back surface 55*f* are formed of the resin mold portion 55. In this configuration, since the smoothness of the mold front surface 55*e* and the mold back surface 55*f* is easily managed, separation or disturbance is less likely to occur in the air flowing along the mold front surface 55*e* and the mold back surface 55*f*.

<Description of Configuration Group B>

Figure 17:
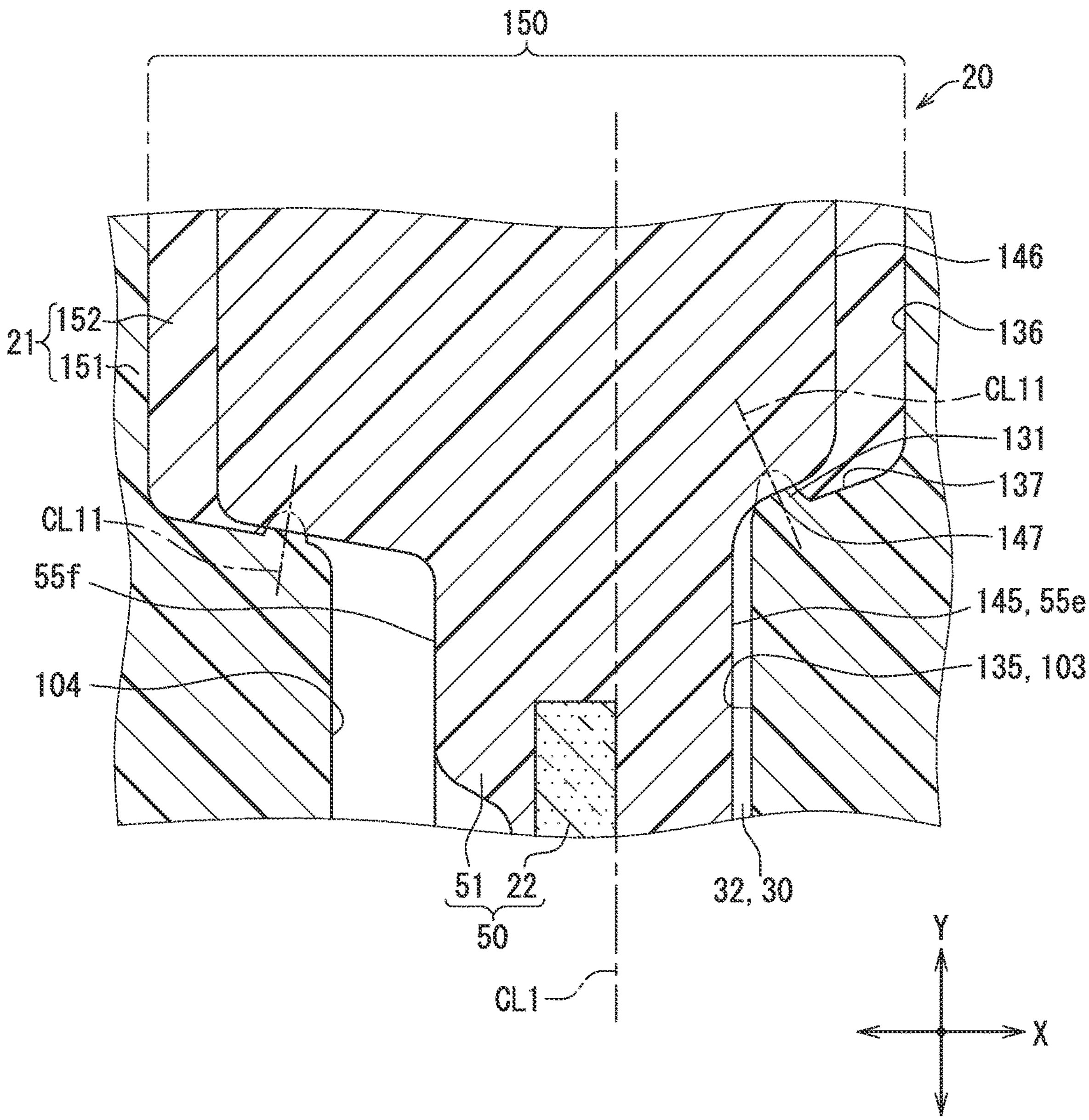
FIG. 17 is a longitudinal cross-sectional view around a housing partition portion of the air flow meter in the configuration group B.
Figure 18:
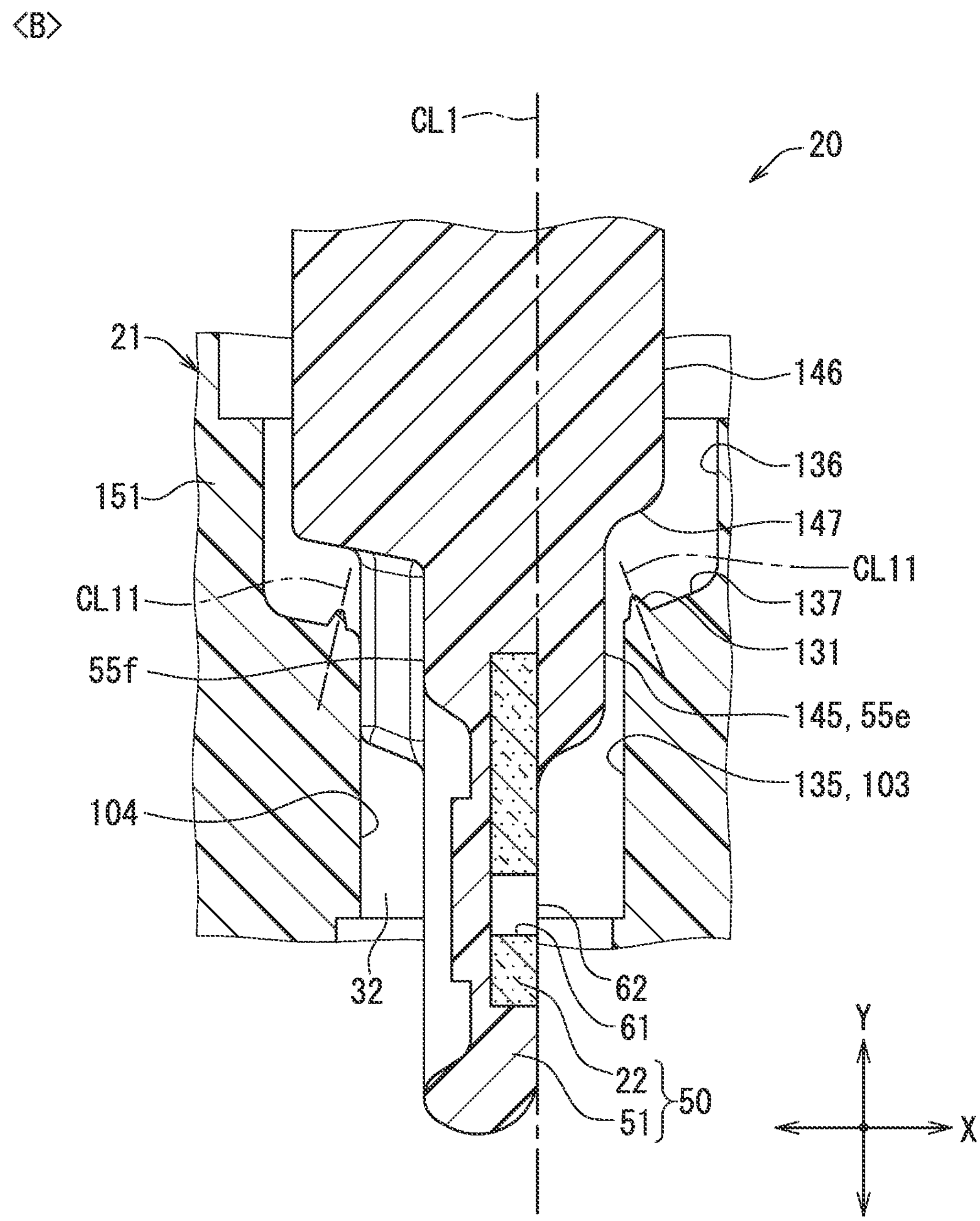
FIG. 18 is a view showing a state before the sensor SA is assembled to the housing.

As shown in FIGS. 8 and 17, the housing 21 has an SA accommodation region 150. The SA accommodation region 150 is provided on the housing base end side relative to the bypass flow path 30 and accommodates a part of the sensor SA50. At least the mold base end surface 55*b* of the sensor SA50 is accommodated in the SA accommodation region 150. The measurement flow path 32 and the SA accommodation region 150 are arranged in the height direction Y. The sensor SA50 is disposed at a position across the boundary portion between the measurement flow path 32 and the SA accommodation region 150 in the height direction Y. At least the mold tip end surface 55*a* of the sensor SA50 and the flow sensor 22 are accommodated in the measurement flow path 32. The SA accommodation region 150 corresponds to an accommodation region. In FIGS. 17 and 18, the illustration of the internal structure of the sensor SA50 is simplified, and only the mold portion 55 and the flow sensor 22 are illustrated.

The housing 21 includes the first housing portion 151 and the second housing portion 152. These housing portions 151 and 152 are assembled and integrated with each other, and form the housing 21 in this state. The first housing portion 151 forms the SA accommodation region 150. The first housing portion 151 forms the bypass flow path 30 in addition to the SA accommodation region 150. The inner surface of the first housing portion 151 forms the SA accommodation region 150 and the bypass flow path 30 as the inner surface of the housing 21. A housing opening portion 151*a* (see FIG. 19) is provided at an open end of the first housing portion 151. The housing opening portion 151*a* opens the SA accommodation region 150 toward the side opposite from the measurement flow path 32.

In a state where the sensor SA50 is accommodated in the SA accommodation region 150 and the measurement flow path 32, a gap is formed between the outer surface of the sensor SA50 and the inner surface of the first housing portion 151. The second housing portion 152 fills this gap. Specifically, the second housing portion 152 is in a state of entering between the outer surface of the sensor SA50 and the inner surface of the first housing portion 151 in the SA accommodation region 150.

As shown in FIG. 17, the housing 21 has a housing partition portion 131. The housing partition portion 131 is a projection portion provided on the inner surface of the first housing portion 151, and projects from the first housing portion 151 toward the sensor SA50. In this case, the first housing portion 151 has the housing partition portion 131. The tip end portion of the housing partition portion 131 is in contact with the outer surface of the sensor SA50. The housing partition portion 131 partitions the SA accommodation region 150 and the measurement flow path 32 between the outer surface of the sensor SA50 and the inner surface of the first housing portion 151.

The inner surface of the first housing portion 151 has a housing flow path surface 135, a housing accommodation surface 136, and the housing step surface 137. The housing flow path surface 135, the housing accommodation surface 136, and the housing step surface 137 extend in a direction intersecting the height direction Y, and annularly surround the sensor SA50. In the sensor SA50, the center line CL1 of the heat resistance element 71 extends in the height direction Y, and the housing flow path surface 135, the housing accommodation surface 136, and the housing step surface 137 each extend in the circumferential direction around this center line CL1.

In the first housing portion 151, the housing step surface 137 is provided between the housing tip end surface 21*a* and the housing base end surface 21*b*. The housing step surface 137 faces the housing base end side in the height direction Y. The housing step surface 137 is inclined with respect to the center line CL1 and faces the radial inside, which is the center line CL1 side. The housing step surface 137 intersects the height direction Y and corresponds to a housing intersection surface. On the inner surface of the first housing portion 151, an outside corner portion between the housing flow path surface 135 and the housing step surface 137 and an inside corner portion between the housing accommodation surface 136 and the housing step surface 137 are chamfered. The height direction Y corresponds to an arrangement direction in which the measurement flow path and the accommodation region are arranged.

The housing flow path surface 135 forms the measurement flow path 32 and extends from the inner peripheral end portion of the housing step surface 137 toward the housing tip end side. The housing flow path surface 135 extends from the housing step surface 137 toward the side opposite from the SA accommodation region 150. On the other hand, the housing accommodation surface 136 forms the SA accommodation region 150 and extends from the outer peripheral end portion of the housing step surface 137 toward the housing base end side. The housing accommodation surface 136 extends from the housing step surface 137 toward the side opposite from the measurement flow path 32. The housing step surface 137 is provided between the housing flow path surface 135 and the housing accommodation surface 136, and forms a step on the inner surface of the first housing portion 151. The housing step surface 137 connects the housing flow path surface 135 and the housing accommodation surface 136.

The outer surface of the sensor SA50 is formed by the outer surface of the mold portion 55. The outer surface of the sensor SA50 has an SA flow path surface 145, an SA accommodation surface 146, and an SA step surface 147. The SA flow path surface 145, the SA accommodation surface 146, and the SA step surface 147 extend in a direction intersecting the height direction Y, and are portions annularly surrounding the outer surface of the sensor SA50. The SA flow path surface 145, the SA accommodation surface 146, and the SA step surface 147 extend in the circumferential direction around the center line CL1 of the heat resistance element 71.

In the sensor SA50, the SA step surface 147 is provided between the mold tip end surface 55*a* and the mold base end surface 55*b*. The SA step surface 147 faces the mold tip end surface 55*a* side in the height direction Y. The SA step surface 147 is inclined with respect to the center line CL1 and faces the radial outside, which is the side opposite from the center line CL1. The SA step surface 147 intersects the height direction Y and corresponds to a unit intersection surface. The SA flow path surface 145 corresponds to a unit flow path surface, and the SA accommodation surface 146 corresponds to a unit accommodation surface. On the outer surface of the sensor SA50, an inside corner portion between the SA flow path surface 145 and the SA step surface 147 and an outer inside corner portion between the SA accommodation surface 146 and the SA step surface 147 are chamfered.

The SA flow path surface 145 forms the measurement flow path 32 and extends in the height direction Y from the inner peripheral end portion of the SA step surface 147 toward the mold tip end side. The SA flow path surface 145 extends from the SA step surface 147 toward the side opposite from the SA accommodation region 150. On the other hand, the SA accommodation surface 146 forms the SA accommodation region 150, and extends from the outer peripheral end portion of the SA step surface 147 toward the mold base end side. The SA accommodation surface 146 extends from the SA step surface 147 toward the side opposite from the measurement flow path 32. The SA step surface 147 is provided between the SA flow path surface 145 and the SA accommodation surface 146, and forms a step on the outer surface of the sensor SA50. The SA step surface 147 connects the SA flow path surface 145 and the SA accommodation surface 146.

In the sensor SA50, the SA flow path surface 145, the SA accommodation surface 146, and the SA step surface 147 are each formed by the mold upstream surface 55*c*, the mold downstream surface 55*d*, the mold front surface 55*e*, and the mold back surface 55*f*.

In the air flow meter 20, the housing step surface 137 facing the housing base end side and the SA step surface 147 facing the housing tip end side face each other. The housing flow path surface 135 facing the inner peripheral side and the SA flow path surface 145 facing the outer peripheral side face each other. Similarly, the housing accommodation surface 136 facing the inner peripheral side and the SA accommodation surface 146 facing the outer peripheral side face each other.

Figure 19:
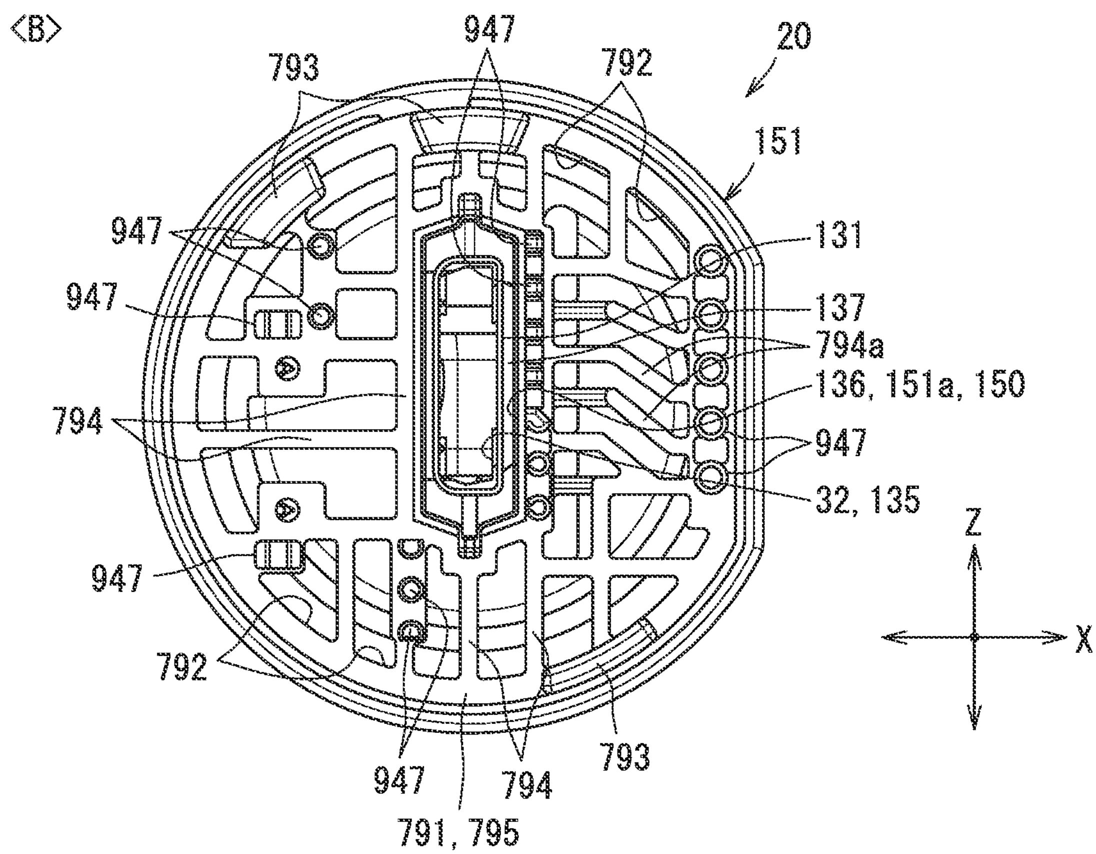
FIG. 19 is a plan view of the housing before the sensor SA is assembled.

The housing partition portion 131 is provided on the housing step surface 137 and extends in the height direction Y toward the housing base end side. A center line CL11 of the housing partition portion 131 extends linearly in the height direction Y. The housing partition portion 131 annularly surrounds the sensor SA50 together with the housing step surface 137. In this case, as shown in FIG. 19, the housing partition portion 131 has a portion extending in the width direction X and a portion extending in the depth direction Z, and has a substantially rectangular frame shape as a whole.

Returning to the description of FIG. 17, the tip end portion of the housing partition portion 131 is in contact with the SA step surface 147 of the sensor SA50. The housing partition portion 131 and the SA step surface 147 are in close contact with each other to enhance the sealability of the portion partitioning the SA accommodation region 150 and the measurement flow path 32. The SA step surface 147 is a flat surface extending straight in a direction intersecting the height direction Y. In the present embodiment, the housing step surface 137 and the SA step surface 147 do not extend in parallel, and the SA step surface 147 is inclined with respect to the housing step surface 137. Even if the SA step surface 147 and the housing step surface 137 are not parallel to each other as described above, the housing partition portion 131 is in contact with the SA step surface 147, thereby improving the sealability at the portion where the outer surface of the sensor SA50 and the inner surface of the first housing portion 151 are in contact with each other. The housing step surface 137 and the SA step surface 147 may extend in parallel.

The housing partition portion 131 is orthogonal to the housing step surface 137. In this case, the center line CL11 of the housing partition portion 131 and the housing step surface 137 are orthogonal to each other. The housing partition portion 131 has a tapered shape. The directions X and Z orthogonal to the height direction Y are the width directions for the housing partition portion 131. The width dimension of the housing partition portion 131 in the width direction gradually decreases toward the tip end portion of the housing partition portion 131. Both of the pair of side surfaces of the housing partition portion 131 extend straight from the housing step surface 137. In this case, the housing partition portion 131 has a tapered cross section.

The housing partition portion 131 is disposed at a position on the housing flow path surface 135 side relative to the housing accommodation surface 136 on the housing step surface 137. In this case, in the directions X and Z orthogonal to the height direction Y, the separation distance between the housing partition portion 131 and the housing accommodation surface 136 is smaller than the separation distance between the housing partition portion 131 and the housing flow path surface 135.

A portion of the housing step surface 137 on the housing flow path surface 135 side relative to the housing partition portion 131 forms the measurement flow path 32 together with the housing flow path surface 135. A portion on the housing accommodation surface 136 side relative to the housing partition portion 131 forms the SA accommodation region 150 together with the housing accommodation surface 136.

A portion of the SA step surface 147 on the SA flow path surface 145 side relative to the housing partition portion 131 forms the measurement flow path 32 together with the SA flow path surface 145. A portion on the SA accommodation surface 146 side relative to the housing partition portion 131 forms the SA accommodation region 150 together with the SA accommodation surface 146.

Next, the manufacturing method of the air flow meter 20 will be described with reference to FIGS. 18 to 21, focusing on a procedure of mounting the sensor SA50 to the housing 21.

The manufacturing process of the air flow meter 20 includes a process of manufacturing the sensor SA50 and a process of manufacturing the first housing portion 151 by resin molding or the like. After these processes, a process of assembling the sensor SA50 to the first housing portion 151 is performed.

In the process of manufacturing the sensor SA50, the mold portion 55 of the sensor SA50 is molded with resin using an SA mold device 580 (see FIGS. 33 and 34) to be described later. In this process, an epoxy-based thermosetting resin such as an epoxy resin is used as a resin material for forming the mold portion 55.

In the process of manufacturing the first housing portion 151, the first housing portion 151 is molded with resin using a housing mold device or the like. In this process, thermoplastic resin such as polybutylene terephthalate (PBT) or polyphenylene sulfide (PPS) is used as a resin material forming the first housing portion 151. The first housing portion 151 thus formed of the thermoplastic resin is softer than the mold portion 55 formed of the thermosetting resin. In other words, the first housing portion 151 is lower in hardness and higher in flexibility than the mold portion 55.

There is a concern that a burr is generated at the outer peripheral edge of the measurement exit 36 due to resin molding of the first housing portion 151. On the other hand, the shape and size of the measurement exit 36 are set such that the length dimension of the outer peripheral edge of the measurement exit 36 becomes as small as possible. This makes it possible to reduce the possibility of generation of a burr on the outer peripheral edge of the measurement exit 36 and to reduce the amount of burrs generated on the outer peripheral edge of the measurement exit 36. Therefore, for the measurement exit 36, it is possible to reduce the work load of removing the burr and to make the flow of air flowing out from the measurement exit 36 less likely to be disturbed by the burr. Since the length dimension of the outer peripheral edge of the measurement exit 36 is as small as possible, the flow velocity of the air flowing out from the measurement exit 36 tends to be high. In this case, it becomes less likely to happen that due to the force of the air flowing through the intake passage 12, it becomes difficult for the air to flow out of the measurement exit 36. Hence, the flow velocity in the measurement flow path 32 is less likely to decrease, and as a result, the detection accuracy of the flow sensor 22 is likely to be improved.

Figure 20:
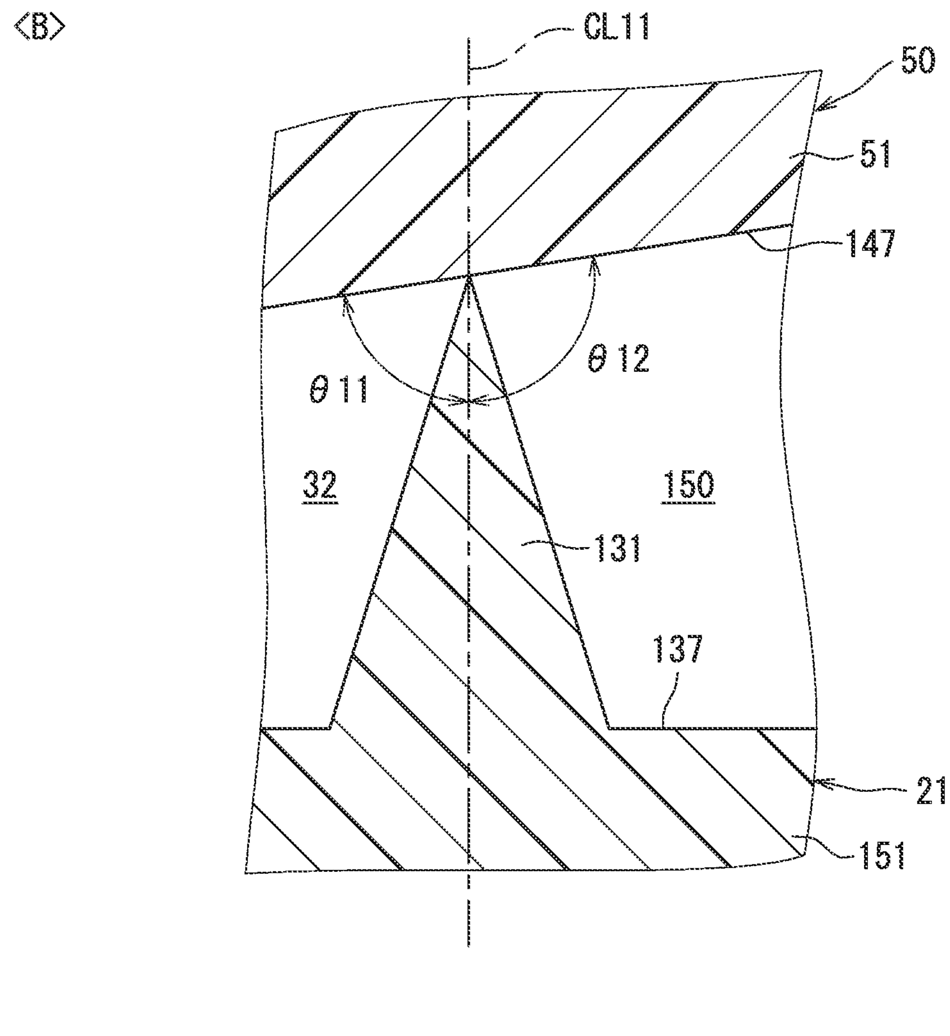
FIG. 20 is a view showing a state before the sensor SA deforms the housing partition portion.
Figure 21:
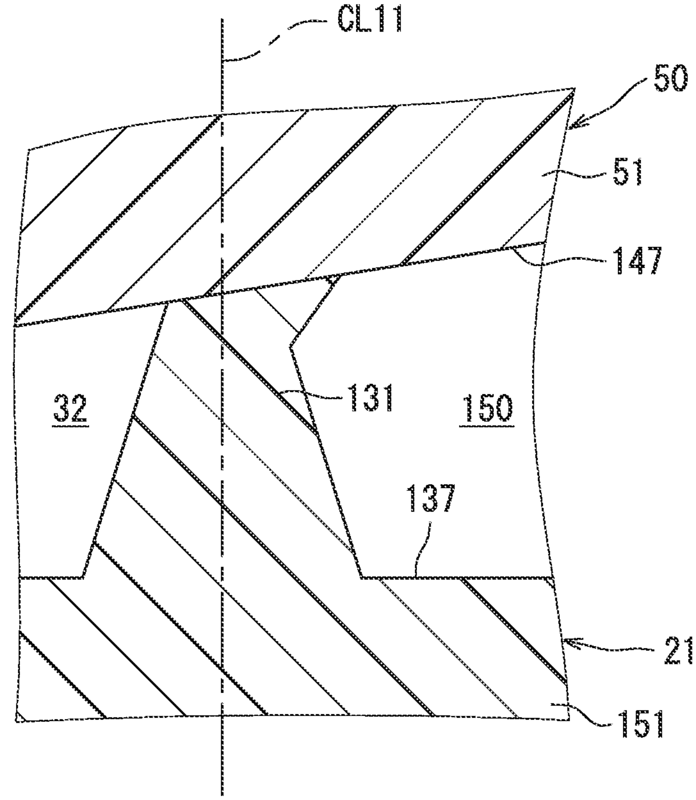
FIG. 21 is a view showing a state after the sensor SA deforms the housing partition portion.

In the process of assembling the sensor SA50 to the first housing portion 151, as shown in FIG. 18, the sensor SA50 is inserted into the first housing portion 151 from the housing opening portion 151*a* (see FIG. 19). Here, as shown in FIG. 20, after the SA step surface 147 comes into contact with the tip end portion of the housing partition portion 131, the sensor SA50 is further pushed into the first housing portion 151 toward the housing tip end side. In this case, due to the hardness of the first housing portion 151 being lower than the hardness of the mold portion 55, as shown in FIG. 21, the housing partition portion 131 is deformed such that its tip end portion is crushed on the SA step surface 147. In the housing partition portion 131, the tip end portion is crushed, so that a newly formed tip end surface easily comes into close contact with the SA step surface 147, thereby improving the sealability between the housing partition portion 131 and the SA step surface 147. In FIG. 17, a portion of the housing partition portion 131 crushed by the sensor SA50 is indicated by a two-dot chain line as an imaginary line.

In the assembling process of the sensor SA50, there is a concern that when the tip end portion of the housing partition portion 131 is crushed by the SA step surface 147, a fragment or the like of the housing partition portion 131 is generated as a crushed residue and this crushed residue enters the measurement flow path 32. In a case where the crushed residue that has entered the measurement flow path 32 comes into contact with or adheres to the flow sensor 22 as a foreign matter in the measurement flow path 32, the detection accuracy of the flow sensor 22 is assumed to decrease.

On the other hand, in the present embodiment, the crushed residue is less likely to enter the measurement flow path 32. Specifically, as shown in FIG. 20, of the angles between the center line CL11 of the housing partition portion 131 and the SA step surface 147, an accommodation side angle θ12 facing the SA accommodation region 150 is larger than a flow path side angle θ11 facing the measurement flow path 32. That is, the relationship of θ12>θ11 is established. In this configuration, the tip end portion of the housing partition portion 131 easily falls or gets crushed toward the SA accommodation region 150 side relative to the measurement flow path 32 side. For this reason, even if the crushed residue is generated, the crushed residue hardly enters the measurement flow path 32.

The flow path side angle θ11 is an angle of a portion closest to the SA step surface 147 in the outer surface of the housing partition portion 131, and the accommodation side angle θ12 is an angle opposite from the flow path side angle θ11 across the center line CL11.

After the sensor SA50 is assembled to the first housing portion 151, a molding process of the second housing portion 152 with resin using a housing mold device or the like is performed. In this process, the housing mold device is mounted to the first housing portion 151 together with the sensor SA50, and a molten resin obtained by melting a resin material is injected from an injection mold machine and press-fitted into the housing mold device. In this manner, by injecting the molten resin into the housing mold device, a gap between the first housing portion 151 and the sensor SA50 is filled with the molten resin. In this case, since the housing partition portion 131 is in close contact with the outer surface of the sensor SA50 as described above, the molten resin is restricted from entering the measurement flow path 32 through the gap between the first housing portion 151 and the sensor SA50. The second housing portion 152 is formed by solidifying the molten resin inside the housing mold device.

Similarly to first housing portion 151, thermoplastic resin such as polybutylene terephthalate (PBT) or polyphenylene sulfide (PPS) is used as a resin material forming the second housing portion 152. Both of the first housing portion 151 and the second housing portion 152 contain a conductive carbon material. Examples of the carbon material include carbon powder, carbon fiber, nanocarbon, graphene, and carbon microparticles.

The first housing portion 151 is more easily discharged when charged than the second housing portion 152. For example, the content rate and amount of the carbon material in the first housing portion 151 is larger than those in the second housing portion 152. In the housing 21, when a portion that is likely to become a path of charges at the time of discharge is referred to as a conductive portion, the first housing portion 151 includes more conductive portions than the second housing portion 152 does. The conductive portion includes a plurality of carbon powder, carbon fiber, nanocarbon, graphene, and carbon microparticles, and examples of the nanocarbon include carbon nanotube, carbon nanofiber, and fullerene.

According to the present embodiment described so far, the housing partition portion 131 projecting from the inner surface of the housing 21 partitions the measurement flow path 32 and the SA accommodation region 150 between the sensor SA50 and the housing 21. In this configuration, since the tip end portion of the housing partition portion 131 and the sensor SA50 are easily brought into close contact with each other, a gap is less likely to be generated between the inner surface of the housing 21 and the outer surface of the sensor SA50. Therefore, when the second housing portion 152 is formed by injecting the molten resin into the SA accommodation region 150 of the first housing portion 151, the molten resin is restricted from entering the measurement flow path 32 through the gap between the first housing portion 151 and the sensor SA50.

In this case, it is less likely to happen that the molten resin entering the measurement flow path 32 through the gap between the first housing portion 151 and the sensor SA50 is solidified, and the shape of the measurement flow path 32 unintentionally changes due to the solidified portion. It is less likely to happen that the solidified portion separates from the first housing portion 151 and the sensor SA50 in the measurement flow path 32 and comes into contact with or adheres to the flow sensor 22 as a foreign matter. Therefore, it is possible to suppress that the detection accuracy of the flow sensor 22 decreases due to the molten resin entering the measurement flow path 32 from the SA accommodation region 150. This can enhance the detection accuracy of the air flow rate by the flow sensor 22, and as a result, can enhance the measurement accuracy of the air flow rate by the air flow meter 20.

According to the present embodiment, the housing partition portion 131 annularly surrounds the sensor SA50. In this configuration, the housing partition portion 131 can create a state in which the outer surface of the sensor SA50 and the inner surface of the first housing portion 151 are in close contact with each other over the entire circumference of the outer surface of the sensor SA50. Therefore, the housing partition portion 131 can enhance the sealability of the entire boundary portion between the measurement flow path 32 and the SA accommodation region 150.

According to the present embodiment, the housing partition portion 131 is provided on the housing step surface 137 at a position closer to the housing flow path surface 135 side than the housing accommodation surface 136. In this configuration, by partitioning the measurement flow path 32 and the SA accommodation region 150 by the housing partition portion 131 at a position as close as possible to the measurement flow path 32 side, it is possible to make it as small as possible a portion of the gap between the first housing portion 151 and the sensor SA50, the portion included in the measurement flow path 32. Here, in the measurement flow path 32, the gap between the first housing portion 151 and the sensor SA50 is a region where disturbance is likely to be generated in the airflow by the air that flows from the measurement entrance 35 toward the measurement exit 36 flowing in. Therefore, the smaller the gap between the first housing portion 151 and the sensor SA50 is, the less disturbance is likely to be generated in the airflow in the measurement flow path 32, and the detection accuracy of the flow sensor 22 is likely to be improved. Therefore, by providing the housing partition portion 131 at a position as close as possible to the housing flow path surface 135, it is possible to enhance the detection accuracy of the flow sensor 22.

According to the present embodiment, the accommodation side angle θ12 is larger than the flow path side angle θ11. In this configuration, it is likely to happen that when the sensor SA50 is inserted into the SA accommodation region 150 of the first housing portion 151, the housing partition portion 131 is crushed and deformed so as to be folded or fallen on the SA accommodation region 150 side. Therefore, it is less likely to happen that when the housing partition portion 131 is deformed and brought into close contact with the outer surface of the sensor SA50, the crushed residue of the housing partition portion 131 unintentionally enters the measurement flow path 32. Therefore, it is possible to suppress that the detection accuracy of the flow sensor 22 decreases due to contact or adhesion of the crushed residue to the flow sensor 22 in the measurement flow path 32.

According to the present embodiment, the housing partition portion 131 provided on the housing step surface 137 is in contact with the SA step surface 147. In this configuration, since the housing step surface 137 and the SA step surface 147 both intersect in the height direction Y and face each other, the SA step surface 147 becomes hooked on the housing partition portion 131 when the sensor SA50 is inserted into the first housing portion 151. Therefore, the housing partition portion 131 can be brought into close contact with the SA step surface 147 by performing work of simply pushing the sensor SA50 into the first housing portion 151 toward the measurement flow path 32. This makes it possible to suppress an increase in work load when the sensor SA50 is assembled to the first housing portion 151 meanwhile reliably partitioning the measurement flow path 32 and the SA accommodation region 150 by the housing partition portion 131.

In the present embodiment, the housing step surface 137 in the first housing portion 151 faces the housing opening portion 151*a* side. In this configuration, the SA step surface 147 of the sensor SA50 can be pressed against the housing step surface 137 by simply pushing the sensor SA50 inserted into the SA accommodation region 150 from the housing opening portion 151*a* toward the measurement flow path 32. Therefore, it is possible to achieve a configuration in which the housing partition portion 131 of the SA step surface 147 can be easily brought into close contact with the housing step surface 137.

<Description of Configuration Group D>

Figure 22:
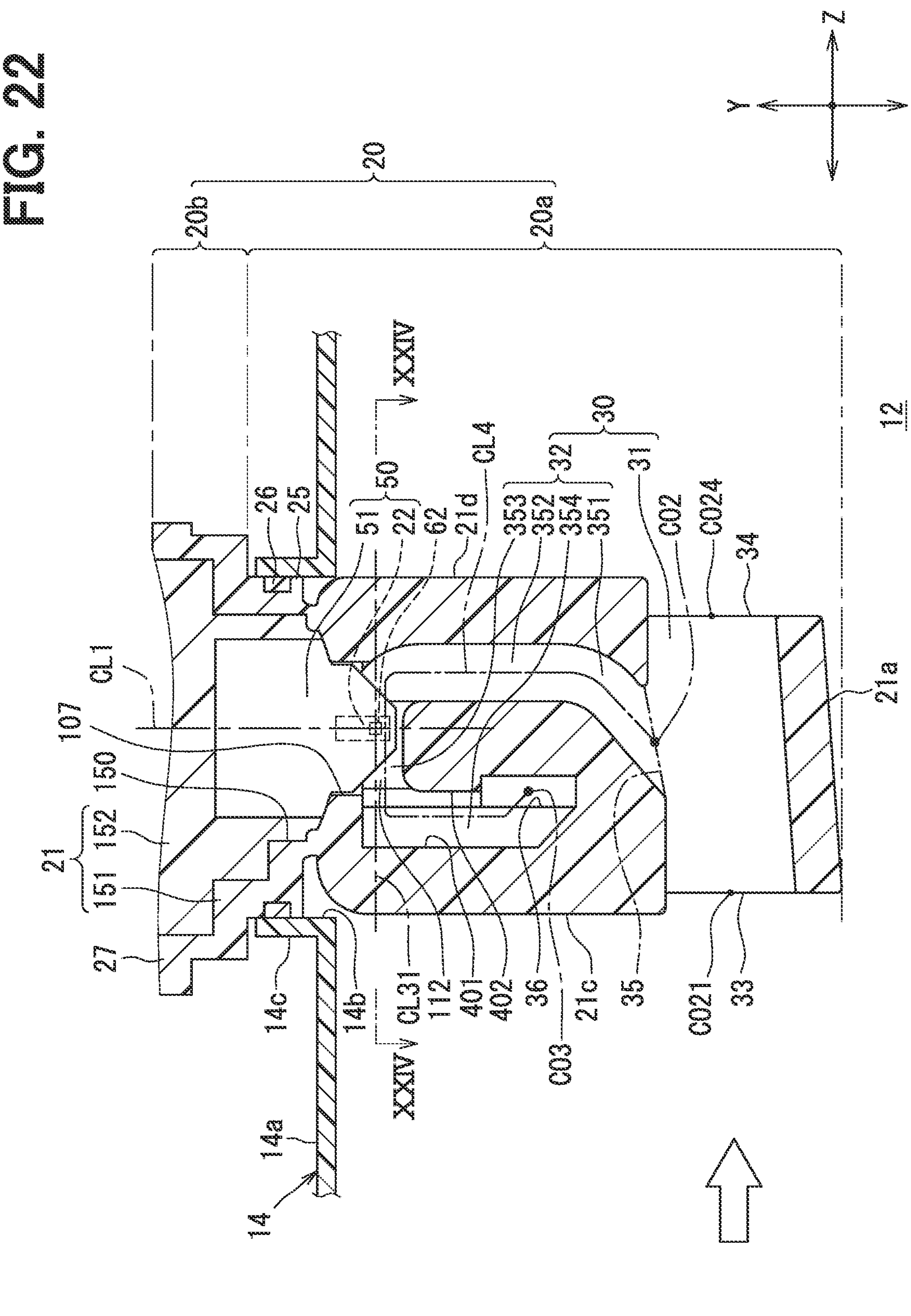
FIG. 22 is a longitudinal cross-sectional view of the air flow meter in the configuration group D.
Figure 23:
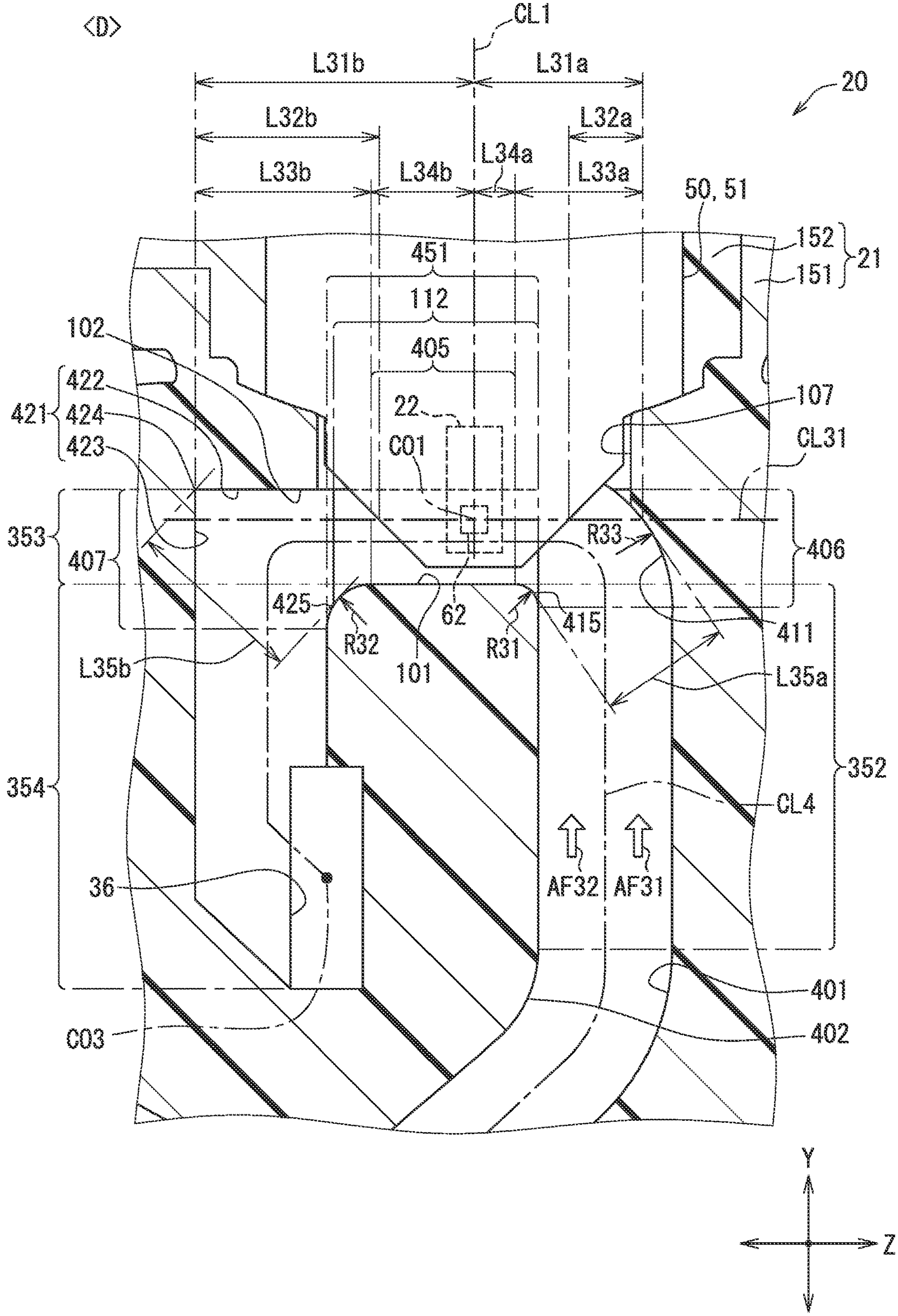
FIG. 23 is an enlarged view around a sensor path of FIG. 22.

As shown in FIGS. 22 and 23, the measurement flow path 32 is bent such that a portion between the measurement entrance 35 and the measurement exit 36 bulges toward the flow sensor 22, and has a U-shape as a whole. In the measurement flow path 32, the measurement entrance 35 and the measurement exit 36 are arranged in the depth direction Z. In this case, the depth direction Z corresponds to the arrangement direction, and the height direction Y is orthogonal to the depth direction Z. In the measurement flow path 32, a portion between the measurement entrance 35 and the measurement exit 36 is bent so as to bulge in the height direction Y toward the housing base end side.

The inner surface of the housing 21 has an outer measurement bent surface 401 and an inner measurement bent surface 402. The outer measurement bent surface 401 and the inner measurement bent surface 402 extend along the center line CL4 of the measurement flow path 32. The inner surface of the housing 21 has the front measurement wall surface 103 and the back measurement wall surface 104 as described above in addition to the outer measurement bent surface 401 and the inner measurement bent surface 402. The outer measurement bent surface 401 and the inner measurement bent surface 402 are arranged in directions Y and Z orthogonal to the width direction X, and face each other with the front measurement wall surface 103 and the back measurement wall surface 104 interposed therebetween.

The outer measurement bent surface 401 forms the measurement flow path 32 from the outside of the bend, and is provided on the outer peripheral side of the measurement flow path 32 and the flow sensor 22. The outer measurement bent surface 401 is stretched between the measurement entrance 35 and the measurement exit 36. The outer measurement bent surface 401 is bent in a recess shape such that a portion between the measurement entrance 35 and the measurement exit 36 is recessed toward the flow sensor 22 side as a whole. The outer measurement bent surface 401 includes the measurement ceiling surface 102, and is provided with the SA insertion hole 107.

The inner measurement bent surface 402 forms the measurement flow path 32 from the inside of the bend, and is provided on the inner peripheral side of the measurement flow path 32. The inner measurement bent surface 402 is stretched between the measurement entrance 35 and the measurement exit 36. The inner measurement bent surface 402 is bent such that a portion between the measurement entrance 35 and the measurement exit 36 bulges toward the flow sensor 22 side as a whole. The inner measurement bent surface 402 does not have a portion recessed toward the side opposite from the outer measurement bent surface 401, and its entirety surface is bent in a projection shape so as to bulge toward the outer measurement bent surface 401. The inner measurement bent surface 402 includes the measurement floor surface 101.

As shown in FIG. 23, the measurement flow path 32 includes a sensor path 405, an upstream bent path 406, and a downstream bent path 407. The sensor path 405 is a portion where the flow sensor 22 is provided in the measurement flow path 32. The sensor path 405 extends straight in the depth direction Z, and extends in the main flow direction in parallel to the angle setting surface 27*a* of the flange portion 27. The upstream bent path 406 and the downstream bent path 407 are arranged in the depth direction Z, and the sensor path 405 is provided between the upstream bent path 406 and the downstream bent path 407 and connects these bent paths 406 and 407.

A surface forming the sensor path 405 in the housing 21 includes at least a part of the measurement floor surface 101. In the present embodiment, the length dimension of the sensor path 405 in the depth direction Z is defined by the measurement floor surface 101. Specifically, the upstream end portion of the sensor path 405 includes the upstream end portion of the measurement floor surface 101, and the downstream end portion of the sensor path 405 includes the downstream end portion of the measurement floor surface 101. In this case, the length dimension of the sensor path 405 in the depth direction Z is the same as the length dimension of the measurement floor surface 101. The surface forming the sensor path 405 in the housing 21 includes a part of the measurement ceiling surface 102, a part of the front measurement wall surface 103, and a part of the back measurement wall surface 104 in addition to at least a part of the measurement floor surface 101. In the present embodiment, the measurement floor surface 101 extends straight in the depth direction Z, and the fact that the measurement floor surface 101 extends straight in this manner is referred to as that the sensor path 405 extends straight.

The upstream bent path 406 extends from the sensor path 405 toward the measurement entrance 35 in the measurement flow path 32, and is provided between the sensor path 405 and the measurement entrance 35. The upstream bent path 406 is curved so as to extend from the sensor path 405 toward the measurement entrance 35 in the housing 21. In the upstream bent path 406, a downstream end portion thereof is opened in the depth direction Z toward the sensor path 405, and an upstream end portion thereof is opened in the height direction Y toward the measurement entrance 35. As described above, in the upstream bent path 406, the opening orientation of the upstream end portion and the opening orientation of the downstream end portion intersect each other, and the intersection angle is, for example, 90 degrees. The inner surface of the upstream bent path 406 includes a part of the front measurement wall surface 103 and a part of the back measurement wall surface 104.

The downstream bent path 407 extends from the sensor path 405 toward the measurement exit 36 in the measurement flow path 32, and is provided between the sensor path 405 and the measurement exit 36. The downstream bent path 407 is curved so as to extend from the sensor path 405 toward the measurement exit 36 in the housing 21. In the downstream bent path 407, an upstream end portion thereof is opened in the depth direction Z toward the sensor path 405, and a downstream end portion thereof is opened in the height direction Y toward the measurement exit 36. As described above, similarly to the upstream bent path 406, in the downstream bent path 407, the opening orientation of the upstream end portion and the opening orientation of the downstream end portion intersect each other, and the intersection angle is, for example, 90 degrees. The inner surface of the downstream bent path 407 includes a part of the front measurement wall surface 103 and a part of the back measurement wall surface 104.

In the measurement flow path 32, the sensor path 405 is included in a detection measurement path 353. The upstream bent path 406 is provided at a position across the boundary portion between a guide measurement path 352 and the detection measurement path 353 in the height direction Y. In this case, the upstream bent path 406 has a part of the guide measurement path 352 and a part of the detection measurement path 353. The downstream bent path 407 is provided at a position across the boundary portion between the detection measurement path 353 and a discharge measurement path 354 in the height direction Y. In this case, the downstream bent path 407 has a part of the detection measurement path 353 and a part of the discharge measurement path 354.

The inner surface of the housing 21 has an upstream outer bent surface 411 and an upstream inner bent surface 415 as surfaces forming the upstream bent path 406. The upstream outer bent surface 411 forms the upstream bent path 406 from the outside of the bend, and is provided on the outer peripheral side of the upstream bent path 406. The upstream outer bent surface 411 extends so as to be recessed along the center line CL4 of the measurement flow path 32, and is curved so as to continuously bend along this center line CL4. The upstream outer bent surface 411 is stretched between the upstream end portion and the downstream end portion of the upstream bent path 406 and corresponds to an upstream outer curved surface.

The upstream inner bent surface 415 forms the upstream bent path 406 from the inside of the bend, and is provided on the inner peripheral side of the upstream bent path 406. The upstream inner bent surface 415 extends so as to bulge along the center line CL4 of the measurement flow path 32, and is curved so as to continuously bend along this center line CL4. The upstream inner bent surface 415 is stretched between the upstream end portion and the downstream end portion of the upstream bent path 406 and corresponds to an upstream inner curved surface. The inner surface of the housing 21 has a part of the front measurement wall surface 103 and a part of the back measurement wall surface 104 in addition to the upstream outer bent surface 411 and the upstream inner bent surface 415 as surfaces forming the upstream bent path 406.

The inner surface of the housing 21 has a downstream outer bent surface 421 and a downstream inner bent surface 425 as surfaces forming the downstream bent path 407. The downstream outer bent surface 421 forms the downstream bent path 407 from the outside of the bend, and is provided on the outer peripheral side of the downstream bent path 407. The downstream outer bent surface 421 extends along the center line CL4 of the measurement flow path 32 and is bent at a predetermined angle along this center line CL4. The bending angle of the downstream outer bent surface 421 is, for example, 90 degrees.

The downstream outer bent surface 421 has a downstream outer lateral surface 422, a downstream outer longitudinal surface 423, and a downstream outer inside corner portion 424. The downstream outer lateral surface 422 extends straight in the depth direction Z from the upstream end portion of the downstream bent path 407 toward the downstream side. The downstream outer longitudinal surface 423 extends straight in the height direction Y from the downstream end portion of the downstream bent path 407 toward the upstream side. The downstream outer lateral surface 422 and the downstream outer longitudinal surface 423 are connected to each other, and form the downstream outer inside corner portion 424 as an inside corner portion that enters each other inward. The downstream outer inside corner portion 424 has a shape in which the downstream outer bent surface 421 is bent substantially at a right angle.

The downstream inner bent surface 425 forms the downstream bent path 407 from the inside of the bend, and is provided on the inner peripheral side of the downstream bent path 407. The downstream inner bent surface 425 extends so as to bulge along the center line CL4 of the measurement flow path 32, and is curved so as to continuously bend along this center line CL4. The downstream inner bent surface 425 is stretched between the upstream end portion and the downstream end portion of the downstream bent path 407 and corresponds to a downstream inner curved surface. The inner surface of the housing 21 has a part of the front measurement wall surface 103 and a part of the back measurement wall surface 104 in addition to the downstream outer bent surface 421 and the downstream inner bent surface 425 as surfaces forming the downstream bent path 407.

In the measurement flow path 32, the outer measurement bent surface 401 includes the upstream outer bent surface 411 and the downstream outer bent surface 421. Each of the upstream outer bent surface 411 and the downstream outer bent surface 421 includes a part of the measurement ceiling surface 102. The inner measurement bent surface 402 includes the upstream inner bent surface 415 and the downstream inner bent surface 425 in addition to the measurement floor surface 101 described above.

In the measurement flow path 32, the bulging degree of the downstream inner bent surface 425 toward the side where the measurement flow path 32 is expanded is smaller than the bulging degree of the upstream inner bent surface 415 toward the side where the measurement flow path 32 is expanded. Specifically, in the direction where the center line CL4 of the measurement flow path 32 extends, the length dimension of the downstream inner bent surface 425 is larger than the length dimension of the upstream inner bent surface 415. In this case, a curvature radius R32 of the downstream inner bent surface 425 is larger than a curvature radius R31 of the upstream inner bent surface 415. That is, the relationship of R32>R31 is established. In other words, the bend of the downstream inner bent surface 425 is looser than the bend of the upstream inner bent surface 415.

In the measurement flow path 32, the recess degree of the downstream outer bent surface 421 toward the side where the measurement flow path 32 is expanded is larger than the recess degree of the upstream outer bent surface 411 toward the side where the measurement flow path 32 is expanded. Specifically, the downstream outer bent surface 421 is bent at a right angle, whereas the upstream outer bent surface 411 is curved. In this case, in the direction where the center line CL4 of the measurement flow path 32 extends, the length dimension of the bent portion in the downstream outer bent surface 421 is a very small value, and is smaller than the length dimension of the upstream outer bent surface 411. Here, assuming that the curvature radius can be calculated for the bent portion in the downstream outer bent surface 421, this curvature radius is substantially zero and is smaller than the curvature radius R33 of the upstream outer bent surface 411. In this case, the bend of the downstream outer bent surface 421 is sharper than the bend of the upstream outer bent surface 411.

In the upstream bent path 406, the recess degree of the upstream outer bent surface 411 toward the side where the measurement flow path 32 is expanded is smaller than the bulging degree of the upstream inner bent surface 415 toward the side where the measurement flow path 32 is expanded. Specifically, in the direction where the center line CL4 of the measurement flow path 32 extends, the length dimension of the upstream outer bent surface 411 is larger than the length dimension of the upstream inner bent surface 415. In this case, the curvature radius R33 of the upstream outer bent surface 411 is larger than a curvature radius R31 of the upstream inner bent surface 415. That is, the relationship of R33>R31 is established.

In the downstream bent path 407, the recess degree of the downstream outer bent surface 421 toward the side where the measurement flow path 32 is expanded is larger than the bulging degree of the downstream inner bent surface 425 toward the side where the measurement flow path 32 is expanded. Specifically, in the direction where the center line CL4 of the measurement flow path 32 extends, the length dimension of the downstream outer bent surface 421 is smaller than the length dimension of the downstream inner bent surface 425.

In the downstream bent path 407, since the recess degree of the downstream outer bent surface 421 is larger than the bulging degree of the downstream inner bent surface 425, the cross-sectional area of the downstream bent path 407 is as large as possible in the cross-sectional area S4 of the measurement flow path 32. Specifically, in the direction orthogonal to both the center line CL4 and the width direction X of the measurement flow path 32, a separation distance L35*b* between the downstream outer bent surface 421 and the downstream inner bent surface 425 is larger than a separation distance L35*a* between the upstream outer bent surface 411 and the upstream inner bent surface 415. That is, the relationship of L35*b*>L35*a* is established.

The separation distance L35*b* between the downstream outer bent surface 421 and the downstream inner bent surface 425 is a separation distance at a portion where the downstream outer bent surface 421 and the downstream inner bent surface 425 are most separated in the downstream bent path 407. The portion where the downstream outer bent surface 421 and the downstream inner bent surface 425 are most separated is, for example, a portion where the downstream outer inside corner portion 424 of the downstream outer bent surface 421 and the central portion of the downstream inner bent surface 425 face each other. The separation distance L35*a* between the upstream outer bent surface 411 and the upstream inner bent surface 415 is a separation distance at a portion where the upstream outer bent surface 411 and the upstream inner bent surface 415 are most separated in the upstream bent path 406. The portion where the upstream outer bent surface 411 and the upstream inner bent surface 415 are most separated is, for example, a portion where the central portion of the upstream outer bent surface 411 and the central portion of the upstream inner bent surface 415 face each other.

Regarding the measurement flow path 32, an arrangement line CL31 is assumed as an imaginary straight line passing through the flow sensor 22 and extending in the depth direction Z. The arrangement line CL31 passes through the center CO1 of the heat resistance element 71 of the flow sensor 22 and is orthogonal to both the center lines CL1 and CL5 of the heat resistance element 71. Regarding the arrangement line CL31, the depth direction Z corresponds to the arrangement direction of the upstream bent path 406 and the downstream bent path 407. In the sensor path 405, the arrangement line CL31 and the center line CL4 of the measurement flow path 32 extend in parallel. The arrangement line CL31 extends parallel to the angle setting surface 27*a* of the housing 21.

The arrangement line CL31 passes through each of the sensor path 405, the upstream bent path 406, and the downstream bent path 407, and intersects each of the upstream outer bent surface 411 and the downstream outer bent surface 421. In the downstream outer bent surface 421, the arrangement line CL31 intersects the downstream outer longitudinal surface 423. The sensor path 405 extends straight along the arrangement line CL31. On the arrangement line CL31, a separation distance L31*b* between the flow sensor 22 and the downstream outer bent surface 421 is larger than a separation distance L31*a* between the flow sensor 22 and the upstream outer bent surface 411. That is, the relationship of L31*b*>L31*a* is established. In this manner, the flow sensor 22 is provided at a position closer to the upstream outer bent surface 411. The separation distances L31*a* and L31*b* are distances to the center line CL5 of the heat resistance element 71.

In the sensor SA50, since the sensor support portion 51 is provided at a position closer to the upstream outer bent surface 411, the flow sensor 22 is provided at a position closer to the upstream outer bent surface 411. On the arrangement line CL31, a separation distance L32*b* between the sensor support portion 51 and the downstream outer bent surface 421 is larger than a separation distance L32*a* between the sensor support portion 51 and the upstream outer bent surface 411. That is, the relationship of L32*b*>L32*a* is established. In the measurement flow path 32, the separation distance between the sensor support portion 51 and the upstream outer bent surface 411 in the depth direction Z is larger than the separation distance between the sensor support portion 51 and the downstream outer bent surface 421 in the depth direction Z even in a portion other than that on the arrangement line CL31.

In FIG. 23, the separation distance between a portion of the mold upstream surface 55*c* of the sensor support portion 51 through which the arrangement line CL31 passes and the upstream outer bent surface 411 is defined as the separation distance L32*a*. The separation distance between a portion of the mold downstream surface 55*d* of the sensor support portion 51 through which the arrangement line CL31 passes and the downstream outer bent surface 421 is defined as the separation distance L32*b*.

The sensor path 405 is provided at a position closer to the upstream outer bent surface 411 between the upstream outer bent surface 411 and the downstream outer bent surface 421. In this case, on the arrangement line L31, a separation distance L33*b* between the sensor path 405 and the downstream outer bent surface 421 is larger than a separation distance L33*a* between the sensor path 405 and the upstream outer bent surface 411. That is, the relationship of L33*b*>L33*a* is established.

The flow sensor 22 is provided at a position closer to the upstream bent path 406 in the sensor path 405. In this case, on the arrangement line L31, a separation distance L34*b* between the flow sensor 22 and the downstream bent path 407 is larger than a separation distance L34*a* between the flow sensor 22 and the upstream bent path 406. That is, the relationship of L34*b*>L34*a* is established. The sum of the separation distance L34*a* and the separation distance L34*b* is the length dimension of the sensor path 405 in the depth direction Z.

Figure 24:
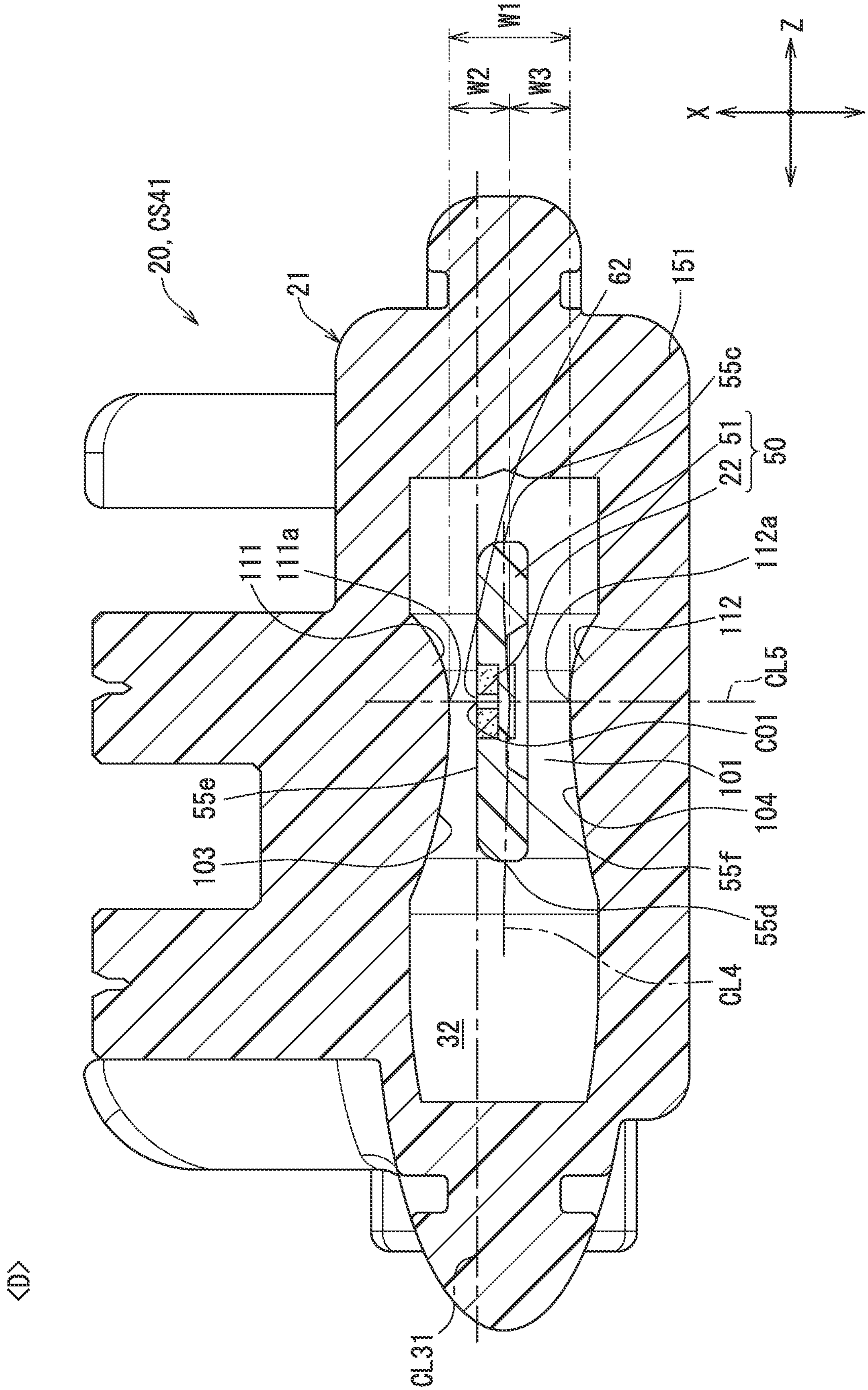
FIG. 24 is a cross-sectional view taken along a line XXIV-XXIV of FIG. 22.
Figure 25:
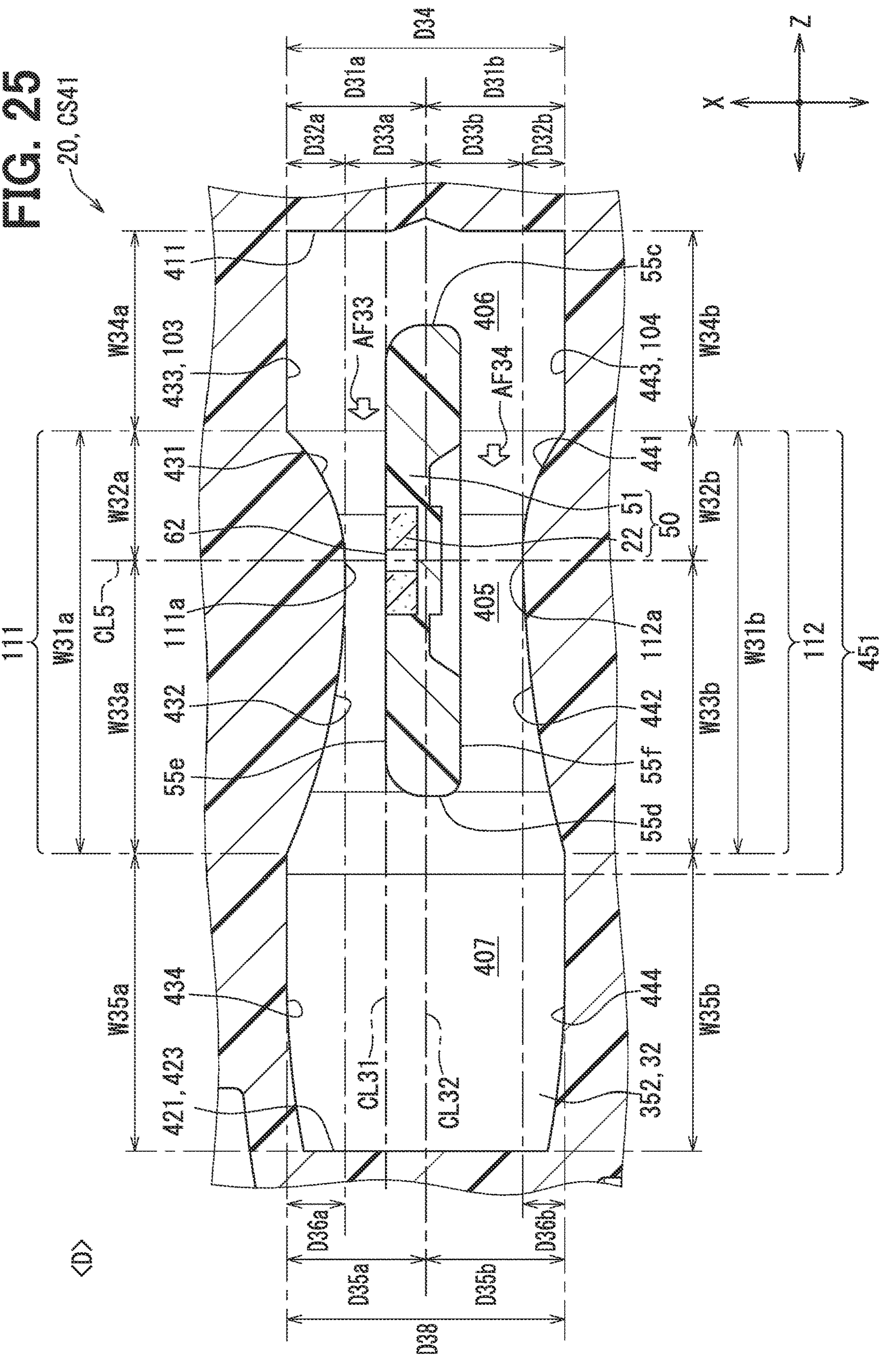
FIG. 25 is an enlarged view around the sensor path of FIG. 24.

As described above, the housing 21 includes the narrowing portions 111 and 112 shown in FIGS. 24 and 25. These narrowing portions 111 and 112 are provided on the measurement wall surfaces 103 and 104 and form a part of the measurement wall surfaces 103 and 104. FIGS. 24 and 25 illustrate an arrangement cross section CS41. The arrangement cross section CS41 is a cross section extending along the arrangement line CL41 and extending in a direction where the measurement wall surfaces 103 and 104 are arranged. The arrangement cross section CS41 is orthogonal to the height direction Y.

The front measurement wall surface 103 includes a front narrowing surface 431, a front expansion surface 432, a front narrowing upstream surface 433, and a front expansion downstream surface 434. The front narrowing surface 431 and the front expansion surface 432 are formed by the front narrowing portion 111 and are included in the outer surface of the front narrowing portion 111. That is, the front narrowing portion 111 has the front narrowing surface 431 and the front expansion surface 432. In the front narrowing portion 111, the front narrowing portion 431 extends in the depth direction Z from the front top portion 111*a* toward the upstream bent path 406, and the front expansion surface 432 extends in the depth direction Z from the front top portion 111*a* toward the downstream bent path 407. The front top portion 111*a* is a boundary portion between the front narrowing surface 431 and the front expansion surface 432.

The front narrowing surface 431 is inclined with respect to the center line CL4 of the measurement flow path 32 in the detection measurement path 353 and faces the upstream outer bent surface 411 side. The front narrowing portion 431 gradually reduces and narrows the measurement flow path 32 from the measurement entrance 35 toward the flow sensor 22. The cross-sectional area S4 of the measurement flow path 32 gradually decreases from the upstream end portion of the front narrowing surface 431 toward the front top portion 111*a*. The front narrowing surface 431 is curved such that the portion between the upstream end portion and the downstream end portion thereof bulges toward the center line CL4 of the measurement flow path 32.

The front expansion surface 432 is inclined with respect to the center line CL4 of the measurement flow path 32 in the detection measurement path 353 and faces the downstream outer bent surface 421 side. The front expansion surface 432 gradually expands the measurement flow path 32 from the flow sensor 22 side toward the measurement exit 36. The cross-sectional area S4 of the measurement flow path 32 gradually increases from the front top portion 111*a* toward the downstream end portion of the front expansion surface 432. The front expansion surface 432 is curved such that the portion between the upstream end portion and the downstream end portion thereof bulges toward the center line CL4 of the measurement flow path 32.

The front narrowing upstream surface 433 extends straight parallel to the arrangement line CL31 from the upstream end portion of the front narrowing surface 431 toward the measurement entrance 35. The front narrowing upstream surface 433 is provided between the upstream outer bent surface 411 and the front narrowing surface 431 in the upstream bent path 406, and is stretched between the upstream outer bent surface 411 and the front narrowing surface 431. The front expansion downstream surface 434 extends straight parallel to the arrangement line CL31 from the downstream end portion of the front expansion surface 432 toward the measurement exit 36. The front expansion downstream surface 434 is provided between the downstream outer bent surface 421 and the front expansion surface 432 in the downstream bent path 407, and is stretched between the downstream outer bent surface 421 and the front expansion surface 432. The front narrowing upstream surface 433 and the front expansion downstream surface 434 are arranged in the depth direction Z, and are flush with each other by overlapping positions in the width direction X.

The back measurement wall surface 104 has a back narrowing surface 441, a back expansion surface 442, a back narrowing upstream surface 443, and a back expansion downstream surface 444. The back narrowing surface 441 and the back expansion surface 442 are formed by the back narrowing portion 112 and are included in the outer surface of the back narrowing portion 112. That is, the back narrowing portion 112 has the back narrowing surface 441 and the back expansion surface 442. In the back narrowing portion 112, the back narrowing surface 441 extends in the depth direction Z from the back top portion 112*a* toward the upstream bent path 406, and the back expansion surface 442 extends in the depth direction Z from the back top portion 112*a* toward the downstream bent path 407. The back top portion 112*a* is a boundary portion between the back narrowing surface 441 and the back expansion surface 442.

The back narrowing surface 441 is inclined with respect to the center line CL4 of the measurement flow path 32 in the detection measurement path 353 and faces the upstream outer bent surface 411 side. The back narrowing surface 441 gradually reduces and narrows the measurement flow path 32 from the measurement entrance 35 toward the flow sensor 22. The cross-sectional area S4 of the measurement flow path 32 gradually decreases from the upstream end portion of the back narrowing surface 441 toward the back top portion 112*a*. The back narrowing surface 441 is curved such that the portion between the upstream end portion and the downstream end portion thereof bulges toward the center line CL4 of the measurement flow path 32.

The back expansion surface 442 is inclined with respect to the center line CL4 of the measurement flow path 32 in the detection measurement path 353 and faces the downstream outer bent surface 421 side. The back expansion surface 442 gradually expands the measurement flow path 32 from the flow sensor 22 side toward the measurement exit 36. The cross-sectional area S4 of the measurement flow path 32 gradually increases from the back top portion 112*a* toward the downstream end portion of the back expansion surface 442. The back expansion surface 442 is curved such that the portion between the upstream end portion and the downstream end portion thereof bulges toward the center line CL4 of the measurement flow path 32.

The back narrowing upstream surface 443 extends straight parallel to the arrangement line CL31 from the upstream end portion of the back narrowing surface 441 toward the measurement entrance 35. The back narrowing upstream surface 443 is provided between the upstream outer bent surface 411 and the front narrowing surface 431 in the upstream bent path 406, and is stretched between the upstream outer bent surface 411 and the front narrowing surface 431. The back expansion downstream surface 444 extends straight parallel to the arrangement line CL31 from the downstream end portion of the back expansion surface 442 toward the measurement exit 36. The back expansion downstream surface 444 is provided between the downstream outer bent surface 421 and the back expansion surface 442 in the downstream bent path 407, and is stretched between the downstream outer bent surface 421 and the back expansion surface 442. The back narrowing upstream surface 443 and the back expansion downstream surface 444 are arranged in the depth direction Z, and are flush with each other by overlapping positions in the width direction X.

The narrowing portions 111 and 112 correspond to measurement narrowing portions. The front narrowing surface 431 and the back narrowing surface 441 correspond to measurement narrowing surfaces, and the front expansion surface 432 and the back expansion surface 442 correspond to measurement expansion surfaces. As described above, the center CO1, the front top portion 111*a*, and the back top portion 112*a* of the heat resistance element 71 are arranged in the width direction X, and the front top portion 111*a* and the back top portion 112*a* are disposed on the center line CL5 of the heat resistance element 71.

In the depth direction Z in which the arrangement line CL31 extends, a length dimension W31*a* of the front narrowing portion 111 and a length dimension W31*b* of the back narrowing portion 112 are the same. In the front narrowing portion 111, a length dimension W32*a* of the front narrowing portion 431 in the depth direction Z is smaller than a length dimension W33*a* of the front expansion surface 432 in the depth direction Z. In the back narrowing portion 112, a length dimension W32*b* of the back narrowing surface 441 in the depth direction Z is smaller than a length dimension W33*b* of the back expansion surface 442 in the depth direction Z. In the narrowing portions 111 and 112, the length dimension W32*a* of the front narrowing surface 431 and the length dimension W32*b* of the back narrowing surface 441 are the same, and the length dimension W33*a* of the front expansion surface 432 and the length dimension W33*b* of the back expansion surface 442 are the same.

The front narrowing portion 111 is provided at a position closer to the upstream bent path 406 in the depth direction Z. In this case, on the arrangement line CL31, a separation distance W34*a* between the front narrowing portion 111 and the upstream outer bent surface 411 is larger than a separation distance W35*a* between the front narrowing portion 111 and the downstream outer bent surface 421. Similarly to the front narrowing portion 111, the back narrowing portion 112 is provided at a position closer to the upstream bent path 406 in the depth direction Z. In this case, on the arrangement line CL31, a separation distance W34*b* between the back narrowing portion 112 and the upstream outer bent surface 411 is larger than a separation distance W35*b* between the back narrowing portion 112 and the downstream outer bent surface 421.

As a positional relationship between the upstream outer bent surface 411 and the narrowing portions 111 and 112, the separation distance W34*a* and the separation distance W34*b* are the same. As a positional relationship between the downstream outer bent surface 421 and the narrowing portions 111 and 112, the separation distance W35*a* and the separation distance W35*b* are the same.

In the measurement flow path 32, the measurement width dimension W1 (see FIG. 15) of the front measurement wall surface 103 and the back measurement wall surface 104 varies depending on the position. This measurement width dimension W1 is different among the sensor path 405, the upstream bent path 406, and the downstream bent path 407, and is not uniform in each of the sensor path 405, the upstream bent path 406, and the downstream bent path 407. However, a separation distance D34 between the front narrowing upstream surface 433 and the back narrowing upstream surface 443 in the upstream bent path 406 is the same as a separation distance D38 between the front expansion downstream surface 434 and the back expansion downstream surface 444 in the downstream bent path 407.

The sensor support portion 51 is provided at a central position between the front narrowing upstream surface 433 and the back narrowing upstream surface 443 in the upstream bent path 406. Here, a center line CL32 of the sensor SA50 is assumed. This center line CL32 is a straight imaginary line that passes through the center of the sensor support portion 51 in the width direction X on the center line CL5 of the heat resistance element 71, is orthogonal to the center line CL5, and extends in the depth direction Z. This center line CL32 extends in parallel with the arrangement line CL31. In this case, in the upstream bent path 406, a separation distance D31*a* between the center line CL32 and the front narrowing upstream surface 433 is the same as a separation distance D31*b* between the center line CL32 and the back narrowing upstream surface 443.

The sensor support portion 51 is also provided at the center position between the front expansion downstream surface 434 and the back expansion downstream surface 444 in the downstream bent path 407. In the downstream bent path 407, a separation distance D35*a* between the center line CL32 and the front expansion downstream surface 434 is equal to a separation distance D35*b* between the center line CL32 and the back expansion downstream surface 444. As a positional relationship between the front measurement wall surface 103 and the sensor support portion 51, the separation distance D31*a* and the separation distance D35*a* are the same. As a positional relationship between the back measurement wall surface 104 and the sensor support portion 51, the separation distance D31*b* and the separation distance D35*b* are the same.

On the front measurement wall surface 103, since the front narrowing upstream surface 433 and the front expansion downstream surface 434 are flush with each other, the projection dimension of the front narrowing portion 111 in the upstream bent path 406 and the projection dimension of the front narrowing portion 111 at in downstream bent path 407 are the same. Specifically, a projection dimension D32*a* of the front top portion 111*a* with respect to the front narrowing upstream surface 433 and a projection dimension D36*a* of the front top portion 111*a* with respect to the front expansion downstream surface 434 are the same.

The projection dimension of the front narrowing surface 431 with respect to the front narrowing upstream surface 433 gradually increases from the front narrowing upstream surface 433 toward the front top portion 111*a*. This increase rate gradually increases from the front narrowing upstream surface 433 toward the front top portion 111*a*, and hence the front narrowing surface 431 is a curved surface. The projection dimension of the front expansion surface 432 with respect to the front expansion downstream surface 434 gradually decreases from the front top portion 111*a* toward the front expansion downstream surface 434. This decrease rate gradually increases from the front top portion 111*a* toward the front expansion downstream surface 434, and hence the front expansion surface 432 is a curved surface.

As described above, in the front narrowing portion 111, the length dimension W33*a* of the front expansion surface 432 is larger than the length dimension W32*a* of the front narrowing surface 431. In this case, the decrease rate of the projection dimension of the front expansion surface 432 from the front top portion 111*a* toward the front expansion downstream surface 434 is smaller than the increase rate of the projection dimension of the front narrowing surface 431 from the front narrowing upstream surface 433 toward the front top portion 111*a*. The front narrowing surface 431 and the front expansion surface 432 are continuous curved surfaces, and a tangential line of the front narrowing surface 431 and a tangential line of the front expansion surface 432 both extend parallel to the arrangement line CL31 in the front top portion 111*a*.

Regarding the front narrowing portion 111, a ratio between the length dimension W32*a* of the front narrowing surface 431 and a projection dimension D32*a* on the narrowing side of the front top portion 111*a* is referred to as a front narrowing rate, and a ratio between the length dimension W33*a* of the front expansion surface 432 and a projection dimension D36*a* on the expansion side of the front top portion 111*a* is referred to as a front expansion rate. For example, a value obtained by dividing the projection dimension D32*a* on the narrowing side by the length dimension W32*a* is calculated as the front narrowing rate, and a value obtained by dividing the projection dimension D36*a* on the expansion side by the length dimension W33*a* is calculated as the front expansion rate. In this case, the front expansion rate is smaller than the front narrowing rate.

On the back measurement wall surface 104, since the back narrowing upstream surface 443 and the back expansion downstream surface 444 are flush with each other, the projection dimension of the back narrowing portion 112 in the upstream bent path 406 and the projection dimension of the back narrowing portion 112 in the downstream bent path 407 are the same. Specifically, a projection dimension D32*b* of the back top portion 112*a* with respect to the back narrowing upstream surface 443 and a projection dimension D36*b* of the back top portion 112*a* with respect to the back expansion downstream surface 444 are the same.

The projection dimension of the back narrowing surface 441 with respect to the back narrowing upstream surface 443 gradually increases from the back narrowing upstream surface 443 toward the back top portion 112*a*. This increase rate gradually increases from the back narrowing upstream surface 443 toward the back top portion 112*a*, and hence the back narrowing surface 441 is a curved surface. The projection dimension of the back expansion surface 442 with respect to the back expansion downstream surface 444 gradually decreases from the back top portion 112*a* toward the back expansion downstream surface 444. This decrease rate gradually increases from the back top portion 112*a* toward the back expansion downstream surface 444, and hence the back expansion surface 442 is a curved surface.

As described above, in the back narrowing portion 112, the length dimension W33*b* of the back expansion surface 442 is larger than the length dimension W32*b* of the back narrowing surface 441. In this case, the decrease rate of the projection dimension of the back expansion surface 442 from the back top portion 112*a* toward the back expansion downstream surface 444 is smaller than the increase rate of the projection dimension of the back narrowing surface 441 from the back narrowing upstream surface 443 toward the back top portion 112*a*. The back narrowing surface 441 and the back expansion surface 442 are continuous curved surfaces, and a tangential line of the back narrowing surface 441 and a tangential line of the back expansion surface 442 both extend parallel to the arrangement line CL31 in the back top portion 112*a*.

Regarding the back narrowing portion 112, a ratio between the length dimension W32*b* of the back narrowing surface 441 and the projection dimension D32*b* on the narrowing side of the back top portion 112*a* is referred to as the back narrowing rate, and a ratio between the length dimension W33*b* of the back expansion surface 442 and the projection dimension D32*b* on the expansion side of the back top portion 112*a* is referred to as the back expansion rate. For example, a value obtained by dividing the projection dimension D32*b* on the narrowing side by the length dimension W32*b* is calculated as the back narrowing rate, and a value obtained by dividing the projection dimension D32*b* on the expansion side by the length dimension W33*b* is calculated as the back expansion rate. In this case, the back expansion rate is smaller than the back narrowing rate.

In the relationship between the front narrowing portion 111 and the back narrowing portion 112, because the projection dimensions D32*a* and D36*a* of the front top portion 111*a* are larger than the projection dimensions D32*b* and D36*b* of the back top portion 112*a*, the front narrowing rate is larger than the back narrowing rate, and the front expansion rate is larger than the back expansion rate.

When a rate at which the narrowing portions 111 and 112 reduce the measurement flow path 32 is referred to as a reduction rate, this reduction rate is proportional to the narrowing rate. Therefore, the larger the front narrowing rate of the front narrowing portion 111 is, the larger the front reduction rate at which the front narrowing portion 111 reduces measurement flow path 32 becomes. For example, the front reduction rate and the front narrowing rate have the same value. Similarly, the larger the back narrowing rate of the back narrowing portion 112 is, the larger the back reduction rate at which the back narrowing portion 112 reduces the measurement flow path 32 becomes. Therefore, in the present embodiment, the front reduction rate is larger than the back reduction rate because the front narrowing rate is larger than the back narrowing rate. For example, the back reduction rate and the back narrowing rate have the same value.

The sensor support portion 51 is provided at a central position between the front measurement wall surface 103 and the back measurement wall surface 104 in the upstream bent path 406 and the downstream bent path 407, whereas it is provided at a position closer to the front measurement wall surface 103 in the sensor path 405. This is because the projection dimension of the front narrowing portion 111 on the front measurement wall surface 103 is larger than the projection dimension of the back narrowing portion 112 on the back measurement wall surface 104. Specifically, the projection dimensions D32*a* and D36*a* of the front top portion 111*a* with respect to the front narrowing upstream surface 433 and the front expansion downstream surface 434 are larger than the projection dimensions D32*b* and D36*b* of the back top portion 112*a* with respect to the back narrowing upstream surface 443 and the back expansion downstream surface 444. As a result, the separation distance D33*a* between the center line CL32 of the sensor support portion 51 and the front top portion 111*a* is smaller than the separation distance D33*b* between the center line CL32 and the back top portion 112*a*.

The housing 21 has a measurement partition portion 451. The measurement partition portion 451 is provided between the guide measurement path 352 and the discharge measurement path 354 in the depth direction Z, and partitions the guide measurement path 352 and the discharge measurement path 354. The measurement partition portion 451 is provided between the passage flow path 31 or a branch measurement path 351 and the detection measurement path 353 in the height direction Y, and partitions the passage flow path 31 or the branch measurement path 351 and detection measurement path 353. The measurement partition portion 451 is stretched between the front measurement wall surface 103 and the back measurement wall surface 104 in the width direction X to form the inner measurement bent surface 402. The outer surface of the measurement partition portion 451 includes the measurement floor surface 101 and the inner measurement bent surface 402 such as the upstream inner bent surface 415 and the downstream inner bent surface 425.

The narrowing portions 111 and 112 extend from the measurement partition portion 451 toward the measurement ceiling surface 102. The narrowing portions 111 and 112 do not protrude from the measurement partition portion 451 to either the upstream outer bent surface 411 side or the downstream outer bent surface 421 side in the depth direction Z. In the depth direction Z, the width dimension of the measurement partition portion 451 is equal to or smaller than the length dimensions W31*a* and W31*b* of the narrowing portions 111 and 112. The narrowing portions 111 and 112 are provided between the upstream bent path 406 and the downstream bent path 407. In the present embodiment, the upstream end portions of the narrowing portions 111 and 112 are provided in the upstream bent path 406, and the downstream end portions are provided in the downstream bent path 407. However, also in this configuration, the narrowing portions 111 and 112 are provided between the upstream bent path 406 and the downstream bent path 407.

As shown in FIGS. 4 to 7, the passage entrance 33 is provided on the housing upstream surface 21*c* and is opened toward the upstream side in the intake passage 12. Therefore, the main flow flowing in the main flow direction through the intake passage 12 easily flows into the passage entrance 33. The passage exit 34 is provided on the housing downstream surface 21*d* and is opened toward the downstream side in the intake passage 12. Therefore, the air flowing out of the passage exit 34 easily flows downstream together with the main flow in the intake passage 12.

The measurement exit 36 is provided on each of the housing front surface 21*e* and the housing back surface 21*f*. The housing front surface 21*e* and the housing back surface 21*f* extend along the arrangement line CL31, and the measurement exit 36 is opened in an orthogonal direction orthogonal to the arrangement line CL31. Therefore, the main flow flowing through the intake passage 12 in the main flow direction is less likely to flow into the measurement exit 36, and the air flowing out from the measurement exit 36 easily flows downstream together with the main flow in the intake passage 12. When the main flow passes near the measurement exit 36 in the intake passage 12, the air near the measurement exit 36 in the measurement flow path 32 is in a state of being pulled by the main flow, and the air easily flows out from the measurement exit 36. This makes it easy for the air in the measurement flow path 32 to flow out from the measurement exit 36. The width direction X corresponds to the orthogonal direction.

Next, a flow mode of the air flowing through the measurement flow path 32 will be described.

As shown in FIG. 23, the air flowing into the measurement flow path 32 from the passage flow path 31 through the measurement entrance 35 includes an outer bent flow AF31 proceeding along the outer measurement bent surface 401 and an inner bent flow AF32 proceeding along the inner measurement bent surface 402. As described above, in the measurement flow path 32, since the outer measurement bent surface 401 is bent so as to be recessed as a whole, the outer bent flow AF31 easily proceeds along the outer measurement bent surface 401. Since the inner measurement bent surface 402 is bent so as to bulge as a whole, the inner bent flow AF32 easily proceeds along the inner measurement bent surface 402. While the outer measurement bent surface 401 and the inner measurement bent surface 402 are bent in the direction orthogonal to the width direction X, the narrowing portions 111 and 112 narrow the measurement flow path 32 in the width direction X. Therefore, in the measurement flow path 32, it is less likely to happen that the disturbance of airflow occurs such that the outer bent flow AF31 and the inner bent flow AF32 are mixed.

The outer bent flow AF31 that has reached the upstream bent path 406 in the measurement flow path 32 changes the orientation by flowing along the upstream outer bent surface 411. In this case, due to the configuration in which the bend of the upstream outer bent surface 411 is looser than the bend of the downstream outer bent surface 421, the bend of the upstream outer bent surface 411 is has become sufficiently loose, and hence disturbance such as a vortex is less likely to occur in the outer bent flow AF31.

As shown in FIG. 25, the airflow flowing through the measurement flow path 32 includes a front closing flow AF33 flowing into between the sensor support portion 51 and the front narrowing surface 431 and a back closing flow AF34 flowing into between the sensor support portion 51 and the back narrowing surface 441. Of the bent flows AF31 and AF32, air that has flowed along the front measurement wall surface 103 and reached the narrowing portions 111 and 112 are likely to be included in the front closing flow AF33, and air that has flowed along the back measurement wall surface 104 and reached the narrowing portions 111 and 112 are likely to be included in the back closing flow AF34.

Regarding the front side of the sensor support portion 51, the straightening effect of the front closing flow AF33 gradually increases toward the front top portion 111*a* such that the narrowing degree of the front narrowing surface 431 gradually increases toward the front top portion 111*a*. Since the projection dimensions D32*a* and D36*a* of the front top portion 111*a* are larger than the projection dimensions D32*b* and D36*b* of the back top portion 112*a*, the straightening effect of the front narrowing portion 431 is sufficiently enhanced. Due to these, the front closing flow AF33 in a state of being sufficiently straightened by the front narrowing surface 431 and the sensor support portion 51 reaches the flow sensor 22, and thus the detection accuracy of the flow rate by the flow sensor 22 tends to be high.

The front closing flow AF33 is gradually accelerated toward the front top portion 111*a*. Because the region between the front narrowing portion 111 and the sensor support portion 51 is expanded by the front expansion surface 432, the front closing flow AF33 proceeds toward the downstream bent path 407 so as to be blown out as a jet from between the front top portion 111*a* and the sensor support portion 51. Here, if the region between the front expansion surface 432 and the sensor support portion 51 is rapidly expanded, there is a concern that disturbance such as a vortex is likely to occur due to separation of the front closing flow AF33 from the front expansion surface 432. On the other hand, due to the configuration in which the length dimension W33*a* of the front expansion surface 432 is larger than the length dimension W32*a* of the front narrowing surface 431, the region between the front expansion surface 432 and the sensor support portion 51 is gently expanded. For this reason, separation of the front closing flow AF33 from the front expansion surface 432 is less likely to occur, and disturbance such as a vortex is less likely to occur on the downstream side relative to the front top portion 111*a*.

Regarding the back side of the sensor support portion 51, since the narrowing degree of the back narrowing surface 441 gradually increases toward the back top portion 112*a*, the straightening effect of the back closing flow AF34 gradually increases toward the back top portion 112*a*. In this case, the back closing flow AF34 in a state of being sufficiently straightened by the back narrowing surface 441 and the sensor support portion 51 reaches the back top portion 112*a*, and thus this back closing flow AF34 is less likely to be disturbed even after passing through the back top portion 112*a*.

The back closing flow AF34 is gradually accelerated toward the back top portion 112*a*. Because the region between the back narrowing portion 112 and the sensor support portion 51 is expanded by the back expansion surface 442, the back closing flow AF34 proceeds toward the downstream bent path 407 so as to be blown out as a jet from between the back top portion 112*a* and the sensor support portion 51. Here, if the region between the back expansion surface 442 and the sensor support portion 51 is rapidly expanded, there is a concern that disturbance such as a vortex is likely to occur due to separation of the back closing flow AF34 from the back expansion surface 442. On the other hand, due to the configuration in which the length dimension W33*b* of the back expansion surface 442 is larger than the length dimension W32*b* of the back narrowing surface 441, the region between the back expansion surface 442 and the sensor support portion 51 is gently expanded. For this reason, separation of the back closing flow AF34 from the back expansion surface 442 is less likely to occur, and disturbance such as a vortex is less likely to occur on the downstream side relative to the back top portion 112*a*.

The front closing flow AF33 and the back closing flow AF34 are considered to merge at the sensor path 405 and the downstream bent path 407 after passing through the sensor support portion 51. For example, when the flow of the back closing flow AF34 is disturbed, disturbance of airflow occurs on the downstream side relative to the sensor support portion 51, and the front closing flow AF33 becomes less likely to pass between the front narrowing portion 111 and the sensor support portion 51. In this case, there is a concern that the flow rate and the flow velocity of the front closing flow AF33 passing through the flow sensor 22 are insufficient, and the detection accuracy of the flow rate by the flow sensor 22 is lowered. On the other hand, in the present embodiment, since the back closing flow AF34 is straightened by the back narrowing portion 112, it is possible to suppress that disturbance of airflow occurs on the downstream side relative to the sensor support portion 51 due to the disturbance of the back closing flow AF34 having passed through the sensor support portion 51.

When the front closing flow AF33 and the back closing flow AF34 are blown out from between the sensor support portion 51 and the narrowing portions 111 and 112 toward the downstream bent path 407, the front closing flows AF33 and AF34 proceed as forward flows toward the downstream outer bent surface 421 along the arrangement line CL31. When the closing flows AF33 and AF34 hit the downstream outer bent surface 421, there is a concern that the closing flows AF33 and AF34 bounce back on the downstream outer bent surface 421 and flow back in the measurement flow path 32 in an orientation returning to the flow sensor 22 side. In particular, it is considered that in a case where the closing flows AF33 and AF34 hit the downstream outer longitudinal surface 423, the closing flows AF33 and AF34 are likely to flow back toward the flow sensor 22 along the arrangement line CL31. When the backflow reaches the flow sensor 22 against the forward flow, the detection accuracy of the flow sensor 22 decreases, for example, the orientation of the flow of air detected by the flow sensor 22 becomes opposite from the actual flow. Even if the backflow does not reach the flow sensor 22, the forward flow becomes less likely to flow due to the backflow, and thus, the detection accuracy of the flow sensor 22 decreases, for example, the detection flow rate of the flow sensor 22 becomes smaller than the actual flow rate.

On the other hand, in the present embodiment, since the flow sensor 22 is provided at a position closer to the upstream outer bent surface 411 than the downstream outer bent surface 421, the flow sensor 22 is at a position as far as possible from the downstream outer bent surface 421. In this configuration, the momentum of the closing flows AF33 and AF34 is likely to decrease until the closing flows AF33 and AF34 blown out from between the sensor support portion 51 and the narrowing portions 111 and 112 reach the downstream outer bent surface 421. For this reason, even if the closing flows AF33 and AF34 bounce back on the downstream outer bent surface 421 and become backflows, there is no momentum of this backflow and it is less likely to reach the flow sensor 22. The farther the flow sensor 22 is from the downstream outer bent surface 421, the longer the distance in which the backflow reaches the flow sensor 22, and thus the backflow is reliably suppressed from reaching the flow sensor 22.

Since the imaginary line passing through the flow sensor 22 is the arrangement line CL31, the air of the front closing flow AF33 having passed through the flow sensor 22 easily flows along the arrangement line CL31. Therefore, by increasing as much as possible the separation distance L31*b* between the flow sensor 22 and the downstream outer bent surface 421 on the arrangement line CL31, it is possible to increase as much as possible the distance in which the air of the front closing flow AF33 having passed through the flow sensor 22 reaches the downstream outer bent surface 421. Here, it is considered that in the configuration in which the arrangement line CL31 passes through the downstream outer longitudinal surface 423 as in the present embodiment, when the air having passed through the flow sensor 22 hits the downstream outer longitudinal surface 423 and bounces back, the air tends to flow back to return to the flow sensor 22 as it is. Therefore, in the configuration in which the arrangement line CL31 passes through the downstream outer longitudinal surface 423, it is effective, in order to make it difficult for the backflow to reach the flow sensor 22, to set the separation distance L31*b* between the flow sensor 22 and the downstream outer bent surface 421 at the arrangement line CL31 to a value as large as possible.

According to the present embodiment described so far, the recess degree of the downstream outer bent surface 421 is larger than the recess degree of the upstream outer bent surface 411. In this configuration, since the cross-sectional area and the volume of the downstream bent path 407 can be increased as much as possible by increasing the recess degree of the downstream outer bent surface 421 as much as possible, the pressure loss when the air flows through the downstream bent path 407 can be reduced. As described above, by reducing the pressure loss in the downstream bent path 407, a state in which the air having passed through the flow sensor 22 is clogged in the downstream bent path 407 is less likely to occur, and the rate and flow velocity of the air having passed through the flow sensor 22 are less likely to become insufficient. Therefore, the detection accuracy of the flow rate by the flow sensor 22 can be lowered, and as a result, the measurement accuracy of the flow rate by the air flow meter 20 can be enhanced.

Here, in order to increase the cross-sectional area and volume of the downstream bent path 407 as much as possible, a method of expanding the downstream bent path 407 in the width direction X and the depth direction Z is considered. However, with this method, there is a concern that the housing 21 increases in size in the width direction X and the depth direction Z. In this case, the flow of air in the intake passage 12 is disturbed by the housing 21, and the detection accuracy of the flow sensor 22 is likely to decrease. In this case, the resin material required for molding the housing 21 increases, and the manufacturing cost of the housing 21 tends to increase.

On the other hand, in the present embodiment, since the cross-sectional area and the volume of the downstream bent path 407 are increased as much as possible by increasing the recess degree of the downstream outer bent surface 421 as much as possible, it is possible to avoid an increase in size of the housing 21. In this case, since the flow of air in the intake passage 12 is less likely to be disturbed by the housing 21, the detection accuracy of the flow sensor 22 can be enhanced. In this case, since the resin material required for molding the housing 21 is easily reduced, an increase in cost when manufacturing the housing 21 can be suppressed.

According to the present embodiment, the bent portion of the downstream outer bent surface 421 is formed by the downstream outer inside corner portion 424. In this configuration, the recess degree of the downstream outer bent surface 421 can be maximized in a range where the downstream outer bent surface 421 does not detour. That is, it is possible to achieve a configuration in which the cross-sectional area and the volume of the downstream bent path 407 are the largest in the range where the downstream bent path 407 can be expanded by the shape of the downstream outer bent surface 421.

According to the present embodiment, the separation distance L35*b* between the downstream outer bent surface 421 and the downstream inner bent surface 425 is larger than the separation distance L35*a* between the upstream outer bent surface 411 and the upstream inner bent surface 415. This configuration can achieve the configuration in which the downstream outer bent surface 421 and the downstream inner bent surface 425 are separated from each other as much as possible in a direction orthogonal to the center line CL4 of the measurement flow path 32. Therefore, even without expanding the downstream bent path 407 and the housing 21 in the width direction X, it is possible to increase the cross-sectional area and volume of the downstream bent path 407 as much as possible depending on the positional relationship between the downstream outer bent surface 421 and the downstream inner bent surface 425.

According to the present embodiment, the bulging degree of the downstream inner bent surface 425 is smaller than the bulging degree of the upstream inner bent surface 415. Therefore, even without expanding the downstream bent path 407 and the housing 21 in the width direction X, it is possible to increase the cross-sectional area and volume of the downstream bent path 407 as much as possible the shape of the downstream inner bent surface 425.

According to the present embodiment, the configuration is achieved, in which since the curvature radius R32 of the downstream inner bent surface 425 is larger than the curvature radius R31 of the upstream inner bent surface 415, the bulging degree of the downstream inner bent surface 425 is smaller than the bulging degree of the upstream inner bent surface 415. In this configuration, the air reaching the downstream bent path 407 from the flow sensor 22 side easily flows toward the measurement exit 36 along the curve of the downstream inner bent surface 425 meanwhile minimizing the bulging degree of the downstream inner bent surface 425. Therefore, by the shape of the downstream inner bent surface 425, it is possible to suppress that the air remains in the downstream bent path 407 and the pressure loss in the downstream bent path 407 increases.

According to the present embodiment, on the arrangement line CL31, the separation distance L31*b* between the flow sensor 22 and the downstream outer bent surface 421 is larger than the separation distance L31*a* between the flow sensor 22 and the upstream outer bent surface 411. In this configuration, between the upstream outer bent surface 411 and the downstream outer bent surface 421, the flow sensor 22 can be disposed at a position as far as possible from the downstream outer bent surface 421. Therefore, even if the air having passed through the flow sensor 22 in the measurement flow path 32 hits the downstream outer bent surface 421 and flows back in an orientation returning to the flow sensor 22 side, the backflow is less likely to reach the flow sensor 22. Even if the disturbance of the airflow due to the backflow occurs in the downstream bent path 407, this disturbance hardly reaches the flow sensor 22. Therefore, it is possible to suppress a decrease in accuracy of the flow detection by the flow sensor 22. As a result, the measurement accuracy of the flow rate by the air flow meter 20 can be enhanced.

Here, in order to maximize the separation distance L31*b* between the flow sensor 22 and the downstream outer bent surface 421, it is considered a method of separating the downstream outer bent surface 421 from the flow sensor 22 by extending the detection measurement path 353 in the depth direction Z or the like. However, with this method, there is a concern that the housing 21 increases in size in the depth direction Z. On the other hand, in the present embodiment, by setting the position of the flow sensor 22 in the detection measurement path 353 to the position closer to the upstream outer bent surface 411, the separation distance L31*b* between the flow sensor 22 and the downstream outer bent surface 421 is maximized, so that it is possible to avoid an increase in size of the housing 21.

According to the present embodiment, the sensor path 405 on which the flow sensor 22 is installed extends along the arrangement line CL31. In this configuration, the air flowing along the flow sensor 22 easily proceeds straight along the arrangement line CL31, so that the disturbance of the airflow is less likely to occur around the flow sensor 22. In this case, since the flow velocity of the air around the flow sensor 22 is easily stabilized, the detection accuracy of the flow sensor 22 can be enhanced. Since the flow sensor 22 is disposed at a position as far as possible from the downstream outer bent surface 421, the disturbance of the airflow in the downstream bent path 407 is less likely to be imparted to the flow sensor 22, so that the disturbance of the airflow around the flow sensor 22 can be more reliably suppressed. In this case, since the flow velocity of the air around the flow sensor 22 is more likely to be stabilized, the detection accuracy of the flow sensor 22 can be further improved.

According to the present embodiment, in the sensor path 405 extending along the arrangement line CL31, the flow sensor 22 is provided at a position closer to the upstream bent path 406 than the downstream bent path 407. In this configuration, in the sensor path 405, after suppressing the disturbance of the air around the flow sensor 22 and stabilizing the flow velocity of the air, the flow sensor 22 can be disposed at a position as far as possible from the downstream outer bent surface 421.

According to the present embodiment, on the arrangement line CL31, the sensor support portion 51 is provided at a position closer to the upstream outer bent surface 411 than the downstream bent path 407. In this configuration, since the sensor support portion 51 can be disposed at a position as far as possible from the downstream bent path 407, it is possible to suppress the airflow flowing into the downstream bent path 407 from being easily disturbed by the presence of the sensor support portion 51.

According to the present embodiment, the arrangement line CL31 passes through the downstream outer longitudinal surface 423 of the downstream outer bent surface 421. In this configuration, because the downstream outer longitudinal surface 423 extends straight from the downstream end portion of the downstream bent path 407 toward the upstream side, the arrangement line CL31 passes through the portion farthest from the flow sensor 22 in the downstream outer bent surface 421. In this manner, by maximizing the distance required for the air having passed through the flow sensor 22 to reach the downstream outer bent surface 421, it is possible to reliably suppress the air having passed through the flow sensor 22 from bouncing back on the downstream outer bent surface 421 and returning to the flow sensor 22 as a backflow.

According to the present embodiment, since the downstream inner bent surface 425 is curved, it is possible to maximize the separation distance L35*b* between the downstream outer bent surface 421 and the downstream inner bent surface 425 in the downstream bent path 407. In this configuration, since the cross-sectional area of the downstream bent path 407 is maximized by the downstream inner bent surface 425 being curved, the volume of the downstream bent path 407 is maximized. Therefore, even if the disturbance of the airflow occurs in the downstream bent path 407 due to the bounce of the air at the downstream outer bent surface 421 or the like, the air in the downstream bent path 407 easily flows toward the measurement exit 36 together with this disturbance. Therefore, it is possible to more reliably suppress backflow from reaching the flow sensor 22 from the downstream bent path 407.

According to the present embodiment, the narrowing portions 111 and 112 that gradually expand after gradually narrowing the measurement flow path 32 are provided between the upstream end portion of the upstream bent path 406 and the downstream end portion of the downstream bent path 407. In this configuration, there is a concern that the air having passed through the narrowing portions 111 and 112 are vigorously blown out as a jet flow toward the downstream bent path 407 and easily bounces back at the downstream outer bent surface 421. Therefore, in order to suppress the air having bounced back at the downstream outer bent surface 421 from reaching the flow sensor 22, it is effective to provide the flow sensor 22 at a position as far as possible from the downstream outer bent surface 421.

According to the present embodiment, in the narrowing portions 111 and 112, the length dimensions W33*a* and W33*b* of the expansion surfaces 432 and 442 are larger than the length dimension W32*a* of the narrowing surfaces 431 and 441. In this configuration, the bulging degree and the expansion rate of the measurement flow path 32 by the expansion surfaces 432 and 442 are moderate so that disturbance such as separation of the airflow does not occur due to rapid expansion of the measurement flow path 32. As a result, it is possible to suppress that the flow in the downstream bent path 407 from is disturbed by the air having passed through the narrowing portions 111 and 112.

According to the present embodiment, the narrowing portions 111 and 112 are provided at positions closer to the upstream outer bent surface 411 than the downstream outer bent surface 421. In this configuration, between the upstream outer bent surface 411 and the downstream outer bent surface 421, the narrowing portions 111 and 112 can be disposed at a position as far as possible from the downstream outer bent surface 421. Therefore, without increasing the size of the housing 21, it is possible to reduce the momentum with which the air having passed through the narrowing portions 111 and 112 hits the downstream outer bent surface 421.

According to the present embodiment, the front measurement wall surface 103 and the back measurement wall surface 104 face each other across the upstream bent path 406, and these measurement wall surfaces 103 and 104 are provided with the narrowing portions 111 and 112. In this configuration, the orientation in which the air bends in the upstream bent path 406 and the orientation in which the air is narrowed by the narrowing portions 111 and 112 are substantially orthogonal to each other. For this reason, it is less likely to occur that the airflow such as the outer bent flow AF31 flowing along the upstream outer bent surface 411 and the airflow such as the inner bent flow AF32 flowing along the upstream inner bent surface 415 are mixed with each other when passing through the narrowing portions 111 and 112 and disturbance is generated. Therefore, the straightening effect of the airflow by the narrowing portions 111 and 112 can be enhanced.

According to the present embodiment, the upstream outer bent surface 411 is curved. In this configuration, since the orientation of the airflow such as the outer bent flow AF31 flowing along the outer measurement bent surface 401 is gradually changed by the upstream outer bent surface 411, the airflow flowing along the upstream outer bent surface 411 is less likely to be disturbed. Therefore, the air such as the outer bent flow AF31 reaching the flow sensor 22 is less likely to be disturbed, and the air blown out toward the downstream bent path 407 is also less likely to be disturbed.

According to the present embodiment, the inner measurement bent surface 402 extending along the measurement flow path 32 is bent so as to bulge toward the flow sensor 22 as a whole. In this configuration, since no recess portion is formed in the inner measurement bent surface 402, it is hardly occurs that air such as the inner bent flow AF32 flowing along the inner measurement bent surface 402 enters the recess portion and disturbance such as a vortex is generated. Therefore, the air such as the inner bent flow AF32 reaching the flow sensor 22 is hardly disturbed, and the air blown out toward the downstream bent path 407 is also hardly disturbed.

According to the present embodiment, the measurement exit 36 is provided on the housing front surface 21*e* and the housing back surface 21*f* of the outer surface of the housing 21. In this configuration, it is likely to occur an event that when air flows along the measurement exit 36 along the housing front surface 21*e* and the housing back surface 21*f* in the intake passage 12, the air in the measurement flow path 32 flows out from the measurement exit 36 so as to be pulled by this air. Therefore, even if the disturbance of the airflow occurs due to the rebound of the air or the like in the downstream bent path 407, the air can easily flow from the downstream bent path 407 toward the measurement exit 36 together with the disturbance of the airflow using the air flowing outside the housing 21 in the intake passage 12.

<Description of Configuration Group E>

Figure 26:
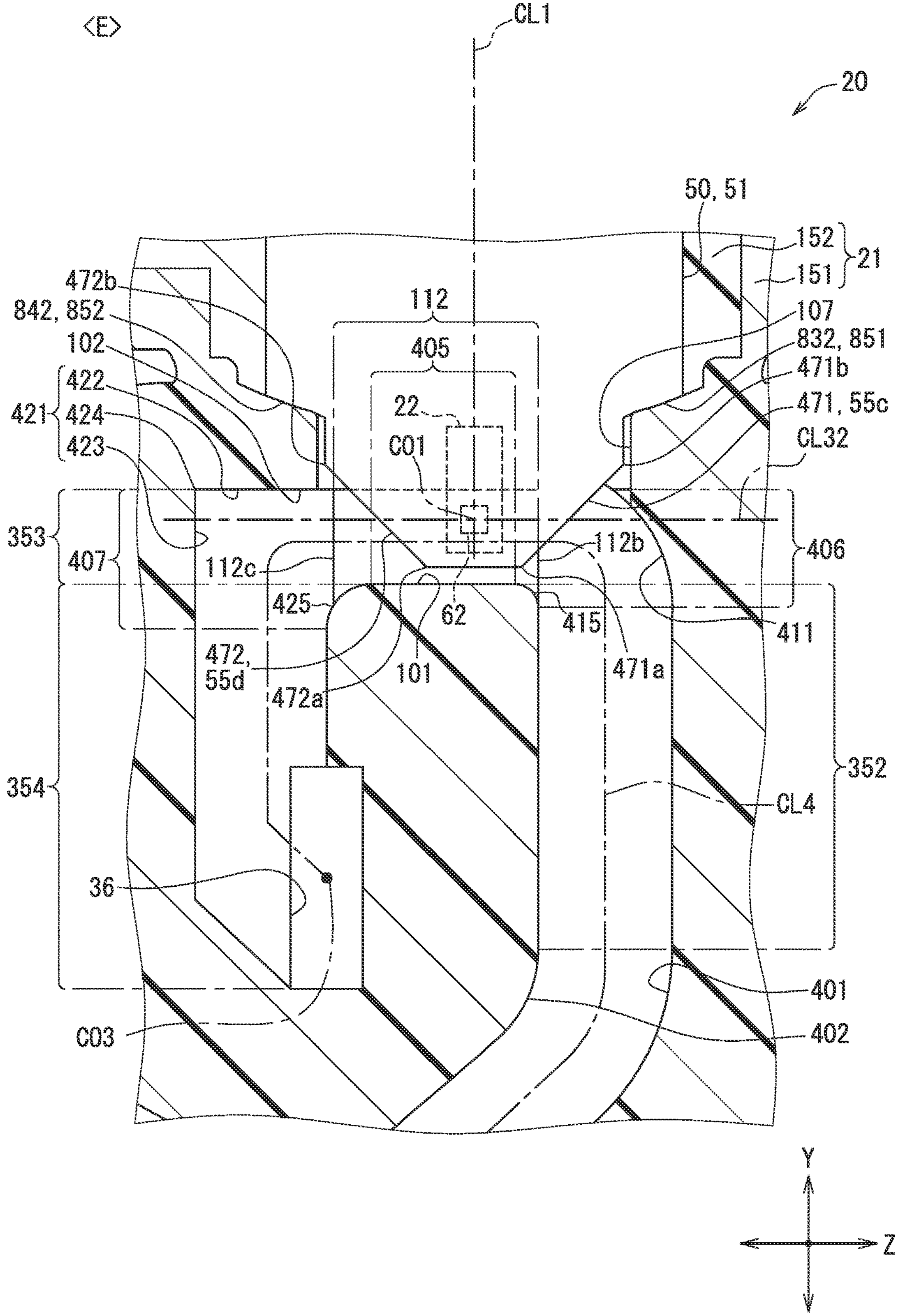
FIG. 26 is a longitudinal cross-sectional view of the air flow meter in the configuration group E, and is an enlarged view around the sensor path.

As shown in FIGS. 10, 11, and 26, the mold upstream surface 55*c* of the sensor SA50 has a mold upstream inclined surface 471. The mold upstream inclined surface 471 extends obliquely straight from the upstream end portion of the mold tip end surface 55*a* toward the mold base end surface 55*b*, and corresponds to an upstream inclined portion inclined with respect to the height direction Y. The mold downstream surface 55*d* has a mold downstream inclined surface 472. The mold downstream inclined surface 472 extends obliquely from the downstream end portion of the mold tip end surface 55*a* toward the mold base end surface 55*b*, and corresponds to a downstream inclined portion inclined with respect to the height direction Y. Both the mold upstream inclined surface 471 and the mold downstream inclined surface 472 are inclined with respect to the arrangement cross section CS41, and are in a state of being across the arrangement cross section CS41 in the height direction Y.

Figure 27:
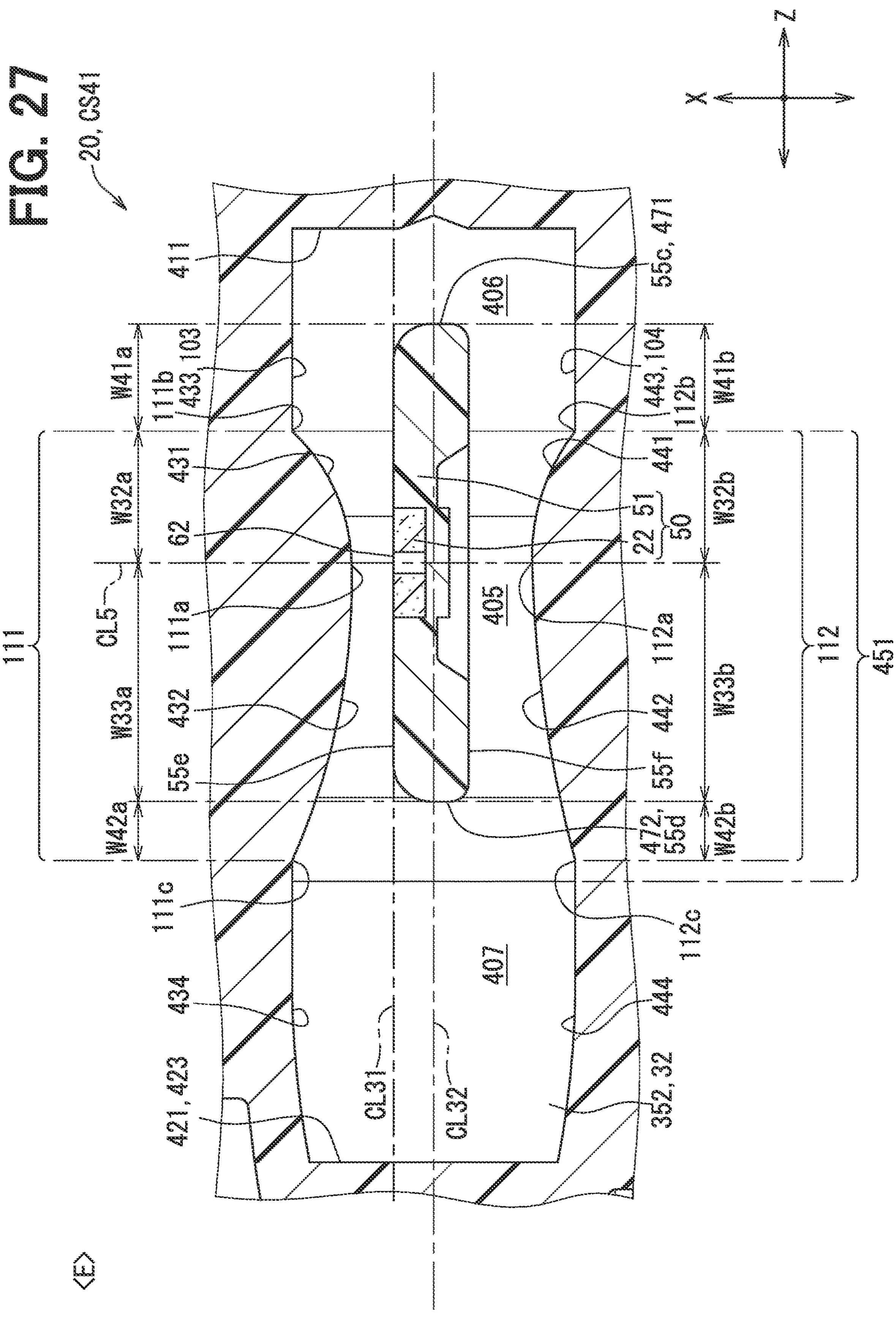
FIG. 27 is a transverse cross-sectional view of the air flow meter, and is an enlarged view around the sensor path.

As shown in FIGS. 26 and 27, a front upstream end portion 111*b*, which is the upstream end portion of the front narrowing portion 111, is disposed at the boundary portion between the front narrowing surface 431 and the front narrowing upstream surface 433. A front downstream end portion 111*c*, which is the downstream end portion of the front narrowing portion 111, is disposed at the boundary portion between the front expansion surface 432 and the front expansion downstream surface 434. A back upstream end portion 112*b*, which is the upstream end portion of the back narrowing portion 112, is disposed at the boundary portion between the back narrowing surface 441 and the back narrowing upstream surface 443. A back downstream end portion 112*c*, which is the downstream end portion of the back narrowing portion 112, is disposed at the boundary portion between the back expansion surface 442 and the back expansion downstream surface 444.

The mold upstream inclined surface 471 of the sensor SA50 is disposed at a position across both the front upstream end portion 111*b* of the front narrowing portion 111 and the back upstream end portion 112*b* of the back narrowing portion 112 in the depth direction Z. Here, the end portion on the mold tip end side of the mold upstream inclined surface 471 is referred to as a tip end side end portion 471*a*, and the end portion on the mold base end side is referred to as a base end side end portion 471*b*. In this case, the tip end side end portion 471*a* is provided on the downstream side relative to the upstream end portions 111*b* and 112*b* of the narrowing portions 111 and 112 in the depth direction Z. The base end side end portion 471*b* of the mold upstream inclined surface 471 is provided on the upstream side relative to the narrowing portion 111 and the back narrowing portion 112 in the depth direction Z. The upstream end portions 111*b* and 112*b* of the narrowing portions 111 and 112 are provided at positions closer to the tip end side end portion 471*a* than the base end side end portion 471*b* of the mold upstream inclined surface 471 in the depth direction Z.

The mold downstream inclined surface 472 is disposed at a position across in the depth direction Z both the front downstream end portion 111*c* of the front narrowing portion 111 and the back downstream end portion 112*c* of the back narrowing portion 112. Here, the end portion on the mold tip end side of the mold downstream inclined surface 472 is referred to as a tip end side end portion 472*a*, and the end portion on the mold base end side is referred to as a base end side end portion 472*b*. In this case, the tip end side end portion 472*a* is provided on the upstream side relative to the downstream end portions 111*c* and 112*c* of the narrowing portions 111 and 112 in the depth direction Z. The base end side end portion 472*b* of the mold downstream inclined surface 472 is provided on the downstream side relative to the narrowing portions 111 and 112 in the depth direction Z. The downstream end portions 111*c* and 112*c* of the narrowing portions 111 and 112 are provided at positions closer to the base end side end portion 471*b* than the tip end side end portion 472*a* of the mold downstream inclined surface 472 in the depth direction Z.

As shown in FIG. 27, in the arrangement cross section CS41 of the air flow meter 20, the mold upstream inclined surface 471 of the mold upstream surface 55*c* is provided on the upstream side relative to the narrowing portions 111 and 112. In this case, the mold upstream inclined surface 471 is provided between the upstream end portions 111*b* and 112*b* of the narrowing portions 111 and 112 and the upstream outer bent surface 411. In the arrangement cross section CS41, a separation distance W41*a* between the mold upstream inclined surface 471 and the front narrowing portion 111 in the depth direction Z is the same as a separation distance W41*b* between the mold upstream inclined surface 471 and the back narrowing portion 112. The separation distance W41*a* is smaller than the length dimension W32*a* of the front narrowing surface 431, and the separation distance W41*b* is smaller than the length dimension W32*b* of the back narrowing surface 441.

In the arrangement cross section CS41, the mold downstream inclined surface 472 of the mold downstream surface 55*d* is provided on the upstream side relative to the downstream end portions 111*c* and 112*c* of the narrowing portions 111 and 112. In this case, in the depth direction Z, the mold downstream inclined surface 472 of the mold downstream surface 55*d* is provided between the top portions 111*a* and 112*a* of the narrowing portions 111 and 112 and the downstream end portions 111*c* and 112*c*. In the arrangement cross section CS41, a separation distance W42*a* between the mold downstream inclined surface 472 and the front downstream end portion 111*c* of the front narrowing portion 111 in the depth direction Z is equal to a separation distance W42*b* between the mold downstream inclined surface 472 and the back downstream end portion 112*c* of the back narrowing portion 112. The separation distance W42*a* is smaller than the length dimension W33*a* of the front expansion surface 432, and the separation distance W42*b* is smaller than the length dimension W33*b* of the back expansion surface 442.

A portion of the mold upstream inclined surface 471 of the sensor support portion 51 disposed in the arrangement cross section CS41 is at a position arranged side by side with the guide measurement path 352 in the height direction Y. This portion is provided on the housing downstream side relative to the upstream inner bent surface 415 in the upstream bent path 406. In the measurement flow path 32, the guide measurement path 352 can be referred to as a first section, the detection measurement path 353 can be referred to as a second section, and the discharge measurement path 354 can be referred to as a third section. The discharge measurement path 354 has a portion extending straight in the height direction Y and a portion extending from the measurement exit 36 in a direction inclined in the height direction Y.

The flow sensor 22 is disposed in accordance with the position where the flow velocity of the air flowing through the measurement flow path 32 becomes maximum. Specifically, the flow sensor 22 is provided at a position where the flow velocity of the air becomes maximum. In the present embodiment, the position where the flow velocity of the air becomes maximum in the measurement flow path 32 is the position where the front top portion 111*a* is provided, and the flow sensor 22 is provided at a position facing the front top portion 111*a*.

According to the present embodiment described so far, since the narrowing portion 111 is provided in the measurement flow path 32, the air flowing through the measurement flow path 32 can be straightened. In the arrangement cross section CS41, the mold upstream surface 55*c* of the sensor support portion 51 is provided on the upstream side relative to the narrowing portions 111 and 112. In this configuration, the air having passed through the mold upstream surface 55*c* along the arrangement cross section CS41 is straightened in the entire narrowing portions 111 and 112 in the arrangement cross section CS41. In this case, even if the disturbance of the airflow is generated by the air flowing through the measurement flow path 32 reaching the sensor support portion 51, the disturbance of the airflow can be reduced in the entire narrowing portions 111 and 112. That is, it is less likely to happen that the straightening effect by the narrowing portions 111 and 112 decreases due to the presence of the sensor support portion 51. Therefore, it is possible to suppress a decrease in the detection accuracy of the flow rate by the flow sensor 22, and as a result, it is possible to enhance the measurement accuracy of the flow rate by the air flow meter 20.

According to the present embodiment, the mold upstream inclined surface 471 is disposed at a position across the upstream end portions 111*b* and 112*b* of the narrowing portions 111 and 112 in the depth direction Z. In this configuration, it is not necessary to dispose the entire mold upstream inclined surface 471 and the entire mold upstream surface 55*c* on the upstream side relative to the narrowing portions 111 and 112 in the measurement flow path 32, so that the sensor support portion 51 and the mold portion 55 can be downsized. Therefore, it is possible to suppress that the airflow in the measurement flow path 32 from being disturbed due to the increase in size of the sensor support portion 51 toward the upstream side.

When a configuration in which the cross-sectional area S4 of the measurement flow path 32 is decreased from the measurement entrance 35 side toward the flow sensor 22 is referred to as a configuration of narrowing the measurement flow path 32, the sensor support portion 51 as well as the narrowing surfaces 431 and 441 is included in the configuration of narrowing the measurement flow path 32. Therefore, since the mold upstream inclined surface 471 is provided at a position across the upstream end portions 111*b* and 112*b* of the narrowing portions 111 and 112 in the depth direction Z, the sensor support portion 51 and the narrowing portions 111 and 112 can continuously narrow the measurement flow path 32 toward the flow sensor 22. As a result, it is possible to suppress that the straightening effect by the sensor support portion 51 and the narrowing portions 111 and 112 decreases by the cross-sectional area S4 of the measurement flow path 32 increasing or decreasing from the measurement entrance 35 side toward the flow sensor 22.

On the other hand, for example, in a configuration in which the sensor support portion 51 and the narrowing portions 111 and 112 are provided at positions separated from each other in the direction where the measurement flow path 32 extends, the cross-sectional area S4 of the flow sensor 22 increases between the sensor support portion 51 and the narrowing portions 111 and 112. That is, the measurement flow path 32 cannot be continuously narrowed toward the flow sensor 22 by the sensor support portion 51 and the narrowing portions 111 and 112. In this case, there is a concern that the straightening effect by the sensor support portion 51 and the narrowing portions 111 and 112 decreases by the cross-sectional area S4 of the measurement flow path 32 increasing or decreasing from the measurement entrance 35 side toward the flow sensor 22.

In the configuration in which the mold upstream inclined surface 471 is provided at a position across the upstream end portions 111*b* and 112*b* of the narrowing portions 111 and 112 in the depth direction Z, the volume of the sensor support portion 51 in the measurement flow path 32 gradually increases from the measurement entrance 35 side toward the flow sensor 22. In this case, the sensor support portion 51 can gradually narrow the measurement flow path 32 by gradually decreasing the cross-sectional area S4 of the measurement flow path 32 from the measurement entrance 35 side toward the flow sensor 22. For this reason, it is possible to suppress that the disturbance of the airflow occurs in the measurement flow path 32 due to the excessively sharp narrowing degree by the sensor support portion 51.

According to the present embodiment, in the arrangement cross section CS41, the mold downstream surface 55*d* of the sensor support portion 51 is provided on the upstream side relative to the downstream end portions 111*c* and 112*c* of the narrowing portions 111 and 112. In this configuration, the straightening effect of the narrowing portions 111 and 112 can suppress the air having passed through the downstream end portions 111*c* and 112*c* of the sensor support portion 51 from being disturbed. The straightening effect of the narrowing portions 111 and 112 is exerted by the expansion surfaces 432 and 442 even on the downstream side relative to the top portions 111*a* and 112*a*. In this configuration, for example, the sensor support portion 51 can be downsized as compared with that in a configuration in which the mold downstream surface 55*d* is disposed on the downstream side relative to the narrowing portions 111 and 112 in the arrangement cross section CS41. As a result, it is less likely to happen that the straightening effect by the narrowing portions 111 and 112 decreases due to the increase in size of the sensor support portion 51.

According to the present embodiment, the mold downstream inclined surface 472 is disposed at a position across the downstream end portions 111*c* and 112*c* of the narrowing portions 111 and 112 in the depth direction Z. In this configuration, in the measurement flow path 32, it is not necessary to arrange the entire mold downstream inclined surface 472 or the entire mold downstream surface 55*d* on the upstream side relative to the downstream end portions 111*c* and 112*c* of the narrowing portions 111 and 112, so that the sensor support portion 51 and the mold portion 55 can be downsized. Therefore, it is possible to suppress that the airflow in the measurement flow path 32 from is disturbed by an increase in size of the sensor support portion 51 toward the downstream side.

When a configuration in which the cross-sectional area S4 of the measurement flow path 32 is increased from the flow sensor 22 toward the measurement exit 36 is referred to as a configuration of expanding the measurement flow path 32, the sensor support portion 51 as well as the expansion surfaces 432 and 442 is included in the configuration of expanding the measurement flow path 32. Therefore, since the mold downstream inclined surface 472 is provided at a position across the downstream end portions 111*c* and 112*c* of the narrowing portions 111 and 112 in the depth direction Z, the sensor support portion 51 and the narrowing portions 111 and 112 can continuously expand the measurement flow path 32 toward the measurement exit 36. As a result, it is possible to suppress that the straightening effect by the sensor support portion 51 and the narrowing portions 111 and 112 decreases by the cross-sectional area S4 of the measurement flow path 32 increasing or decreasing from the flow sensor 22 toward the measurement exit 36.

According to the present embodiment, in the narrowing portions 111 and 112 provided on the downstream side relative to the mold tip end surface 55*a* of the sensor support portion 51 in the arrangement cross section CS41, the length dimensions W33*a* and W33*b* of the expansion surfaces 432 and 442 are larger than the length dimension W32*a* of the narrowing surfaces 431 and 441. In this configuration, the measurement flow path 32 is gently expanded toward the measurement exit 36 so that disturbance such as separation does not occur due to rapid expansion of the measurement flow path 32 by the narrowing portions 111 and 112 with respect to the airflow having passed through the mold tip end surface 55*a* and reached the narrowing portions 111 and 112. Therefore, it is possible to suppress the airflow having passed through the sensor support portion 51 and the narrowing portions 111 and 112 from being disturbed.

According to the present embodiment, the front narrowing portion 111 is provided at a position facing the flow sensor 22 on the front measurement wall surface 103. Therefore, in the configuration in which the mold upstream surface 55*c* is disposed on the upstream side relative to the front narrowing portion 111 in the arrangement cross section CS41 to enhance the straightening effect of the front narrowing portion 111, the air flowing along the flow sensor 22 can be more effectively straightened by the front narrowing portion 111.

According to the present embodiment, the back narrowing portion 112 is provided on the side opposite from the front narrowing portion 111 across the flow sensor 22. Therefore, in the configuration in which the mold upstream surface 55*c* is disposed on the upstream side relative to the front narrowing portion 111 in the arrangement cross section CS41 to enhance the straightening effect of the front narrowing portion 111, the air flowing between the sensor support portion 51 and the back measurement wall surface 104 can also be straightened by the back narrowing portion 112. Therefore, it is possible to suppress that due to the air flowing between the sensor support portion 51 and the back measurement wall surface 104, the air flowing along the flow sensor 22 is disturbed, and the detection accuracy of the flow sensor 22 is lowered.

According to the present embodiment, the sensor support portion 51 is provided at a position closer to the front narrowing portion 111 than the back narrowing portion 112 in the width direction X. Therefore, in the configuration in which the mold upstream surface 55*c* is disposed on the upstream side relative to the front narrowing portion 111 in the arrangement cross section CS41 to enhance the straightening effect of the front narrowing portion 111, the straightening effect by the front narrowing portion 111 for the air flowing along the flow sensor 22 can be further enhanced.

According to the present embodiment, the reduction rate of the measurement flow path 32 by the front narrowing portion 111 is larger than the reduction rate of the measurement flow path 32 by the back narrowing portion 112. Therefore, in the configuration in which the mold upstream surface 55*c* is disposed on the upstream side relative to the front narrowing portion 111 in the arrangement cross section CS41 to enhance the straightening effect of the front narrowing portion 111, the straightening effect by the front narrowing portion 111 can be enhanced more than the straightening effect by the back narrowing portion 112. It is possible to achieve a configuration in which a foreign matter such as dust contained in the air flowing toward the flow sensor 22 enters more easily between the sensor support portion 51 and the back narrowing portion 112 than between the sensor support portion 51 and the front narrowing portion 111.

According to the present embodiment, the flow sensor 22 is disposed in accordance with the position where the flow velocity becomes maximum in the measurement flow path 32. Therefore, in the configuration in which the mold upstream surface 55*c* is disposed on the upstream side relative to the front narrowing portion 111 in the arrangement cross section CS41 to enhance the straightening effect of the front narrowing portion 111, it is possible to suppress insufficiency of the rate and velocity of the air flowing along the flow sensor 22.

According to the present embodiment, the portion of the mold upstream surface 55*c* of the sensor support portion 51 disposed in the arrangement cross section CS41 is included in the upstream bent path 406. Therefore, in the configuration in which the mold upstream surface 55*c* is disposed on the upstream side relative to the front narrowing portion 111 in the arrangement cross section CS41 to enhance the straightening effect of the front narrowing portion 111, even if the airflow disturbance occurs in the upstream bent path 406, the disturbance can be reduced by the narrowing portions 111 and 112.

According to the present embodiment, the opening area of the measurement exit 36 is smaller than the opening area of the measurement entrance 35. Since the measurement exit 36 is narrower than the measurement entrance 35 in this manner, it is possible to achieve a configuration in which the entire measurement flow path 32 is narrower toward the measurement exit 36. Therefore, in the configuration in which the mold upstream surface 55*c* is disposed on the upstream side relative to the front narrowing portion 111 in the arrangement cross section CS41 to enhance the straightening effect of the front narrowing portion 111, the straightening effect can be further enhanced in the entire measurement flow path 32.

According to the present embodiment, the opening area of the passage exit 34 is smaller than the opening area of the passage entrance 33. As described above, since the passage exit 34 is narrower than the passage entrance 33, it is possible to achieve a configuration in which the entire passage flow path 31 is narrower toward the measurement entrance 35 and the passage exit 34. Therefore, in the configuration in which the mold upstream surface 55*c* is disposed on the upstream side relative to the front narrowing portion 111 in the arrangement cross section CS41 to enhance the straightening effect of the front narrowing portion 111, the straightening effect can be further enhanced in the entire passage flow path 31.

<Description of Configuration Group F>

Figure 28:
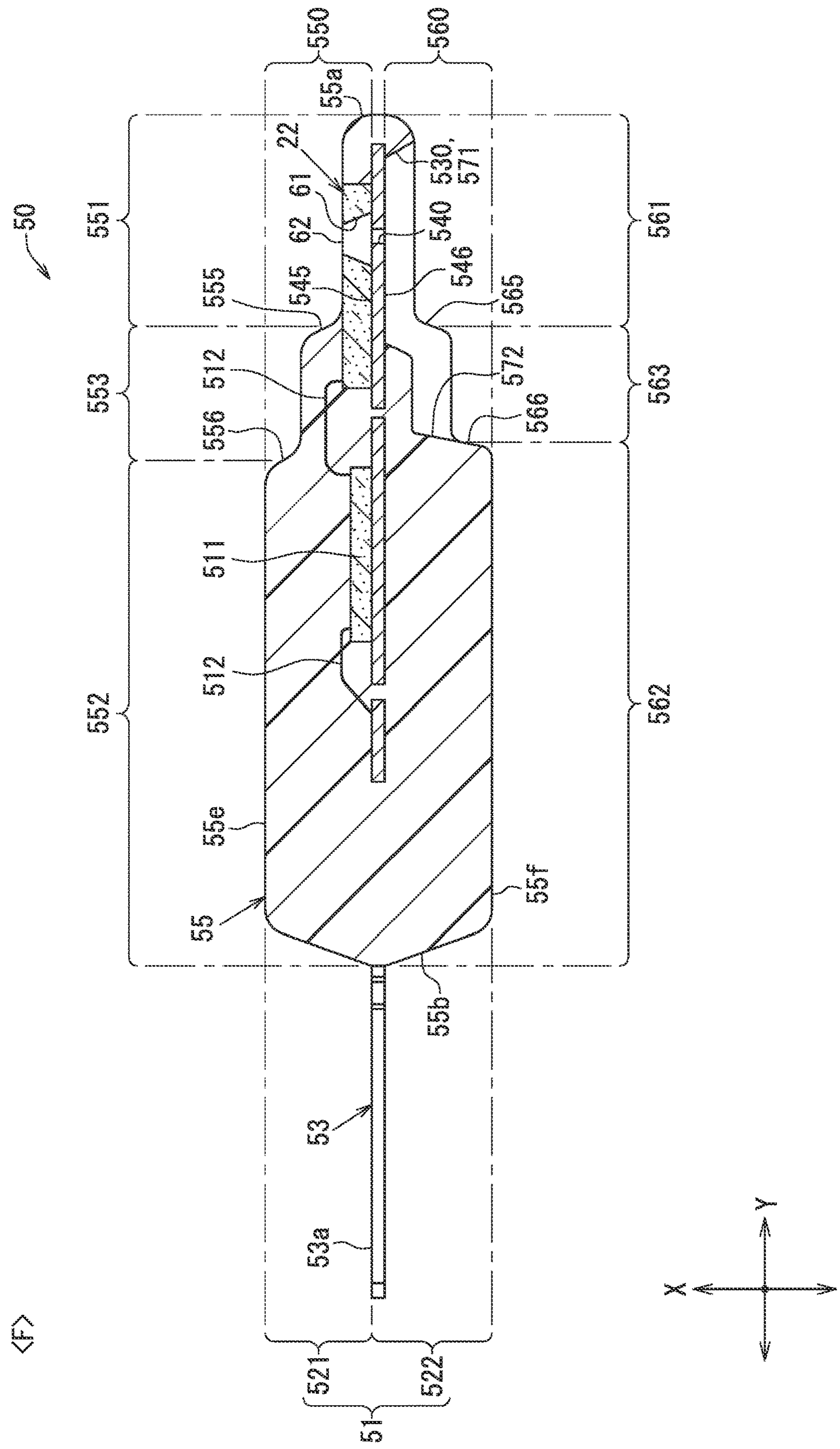
FIG. 28 is a cross-sectional view taken along a line XXVIII-XXVIII of FIG. 10 in the configuration group F.
Figure 29:
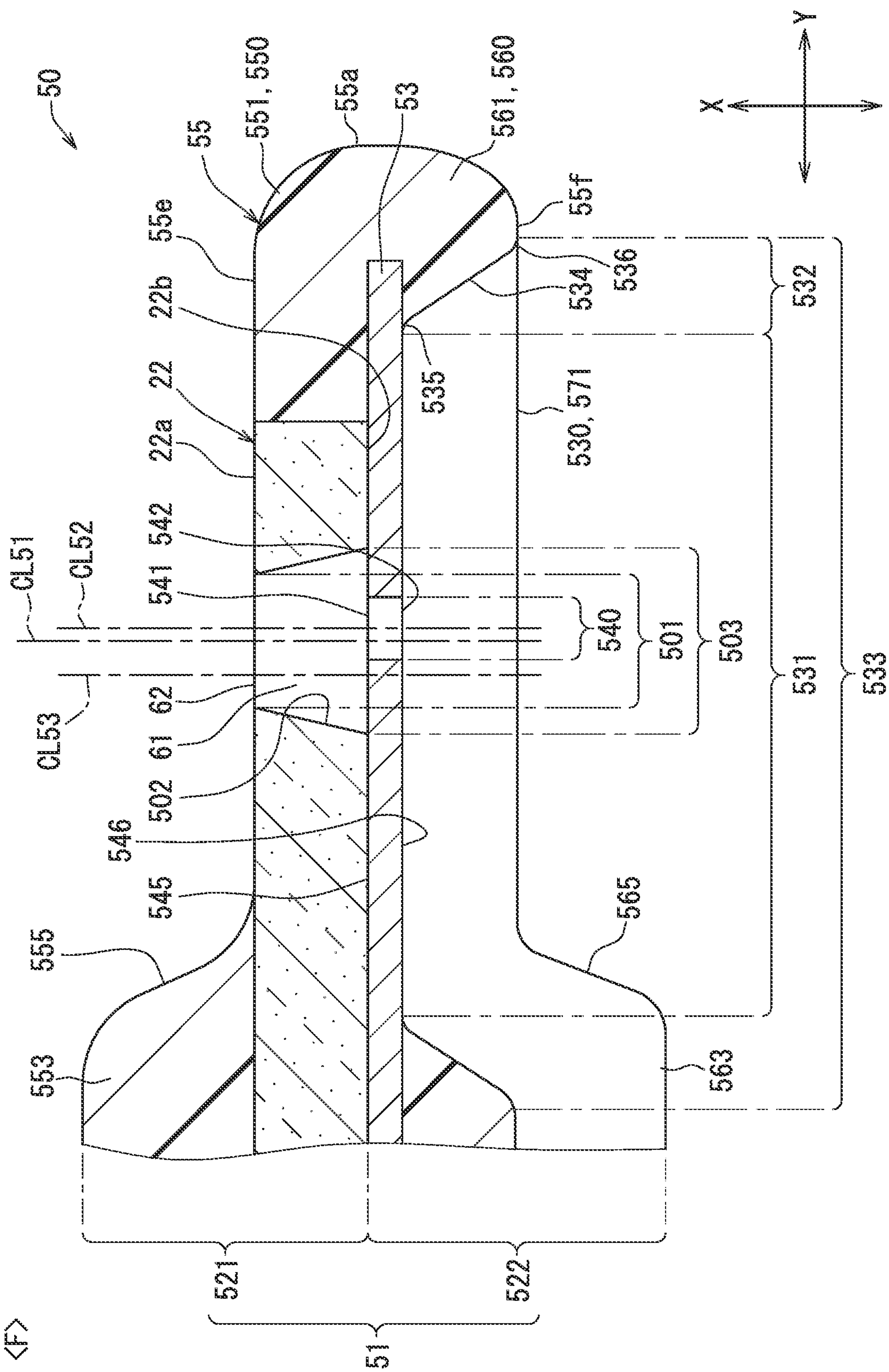
FIG. 29 is an enlarged view around a membrane portion of FIG. 28.

As shown in FIGS. 12, 28, and 29, the sensor recess portion 61 of the flow sensor 22 includes the sensor recess bottom surface 501, the sensor recess inner wall surface 502, and the sensor recess opening 503. The sensor recess bottom surface 501 and the sensor recess inner wall surface 502 are included in the inner surface of the sensor recess portion 61. A center line CL51 of the sensor recess portion 61 extends in the width direction X and passes through the center of the sensor recess bottom surface 501 and the center of the sensor recess opening 503. The center line CL51 is parallel to the center line CL5 (see FIG. 15) of the heat resistance element 71.

The sensor recess bottom surface 501 is a back surface of the membrane portion 62 and is orthogonal to the center line CL51 of the sensor recess portion 61. The sensor recess bottom surface 501 and the membrane portion 62 are formed in a substantially rectangular shape. The surface of the membrane portion 62 is included in the sensor front surface 22*a* of the flow sensor 22.

The sensor recess inner wall surface 502 extends from the sensor recess bottom surface 501 toward the sensor back surface 22*b*. Because the sensor recess portion 61 is formed by wet etching, the sensor recess inner wall surface 502 is inclined by a predetermined angle (for example, 54.7 degrees) with respect to the center line CL51 of the membrane portion 62 and faces the mold back side. The sensor recess inner wall surface 502 may not be inclined with respect to the center line CL51. For example, when the sensor recess portion 61 is formed by dry etching, the angle of the sensor recess inner wall surface 502 with respect to the center line CL51 becomes approximately 90 degrees.

The sensor recess opening 503 is an open end of the sensor recess portion 61, and is provided on the sensor back surface 22*b* as an end portion on the mold back side of the sensor recess portion 61. The sensor recess opening 503 is formed by an end portion of the mold back side on the sensor recess inner wall surface 502, and is rectangular or substantially rectangular. The sensor recess opening 503 is opened in a direction where the center line CL51 of the sensor recess portion 61 extends. The outer peripheral edge of the sensor recess opening 503 is disposed at a position separated outward from the membrane portion 62 and the sensor recess bottom surface 501 in the directions Y and Z orthogonal to the center line CL51 of the sensor recess portion 61.

As shown in FIG. 28, the sensor SA50 includes a flow processing unit 511 and a bonding wire 512 in addition to the flow sensor 22 and the like. The flow processing unit 511 is mounted on the SA substrate 53 together with the flow sensor 22. When one of both plate surfaces of the SA substrate 53 is referred to as an SA substrate front surface 545 and the other is referred to as an SA substrate back surface 546, both the flow sensor 22 and the flow processing unit 511 are provided on the SA substrate front surface 545. The flow processing unit 511 is electrically connected to the flow sensor 22 via the bonding wire 512, and performs various processing related to the detection signal from the flow sensor 22. The flow processing unit 511 is a rectangular parallelepiped chip component, and the flow processing unit 511 can also be referred to as a circuit chip.

The bonding wire 512 is connected to the SA substrate 53, the flow sensor 22, and the flow processing unit 511. The mold portion 55 covers at least the bonding wire 512 in the sensor SA50 and protects at least the bonding wire 512. For example, a connection portion between the bonding wire 512 and the flow processing unit 511, a connection portion between the bonding wire 512 and the flow sensor 22, a connection portion between the bonding wire 512 and the SA substrate 53, and the like are protected in a state of being covered by the mold portion 55.

Figure 31:
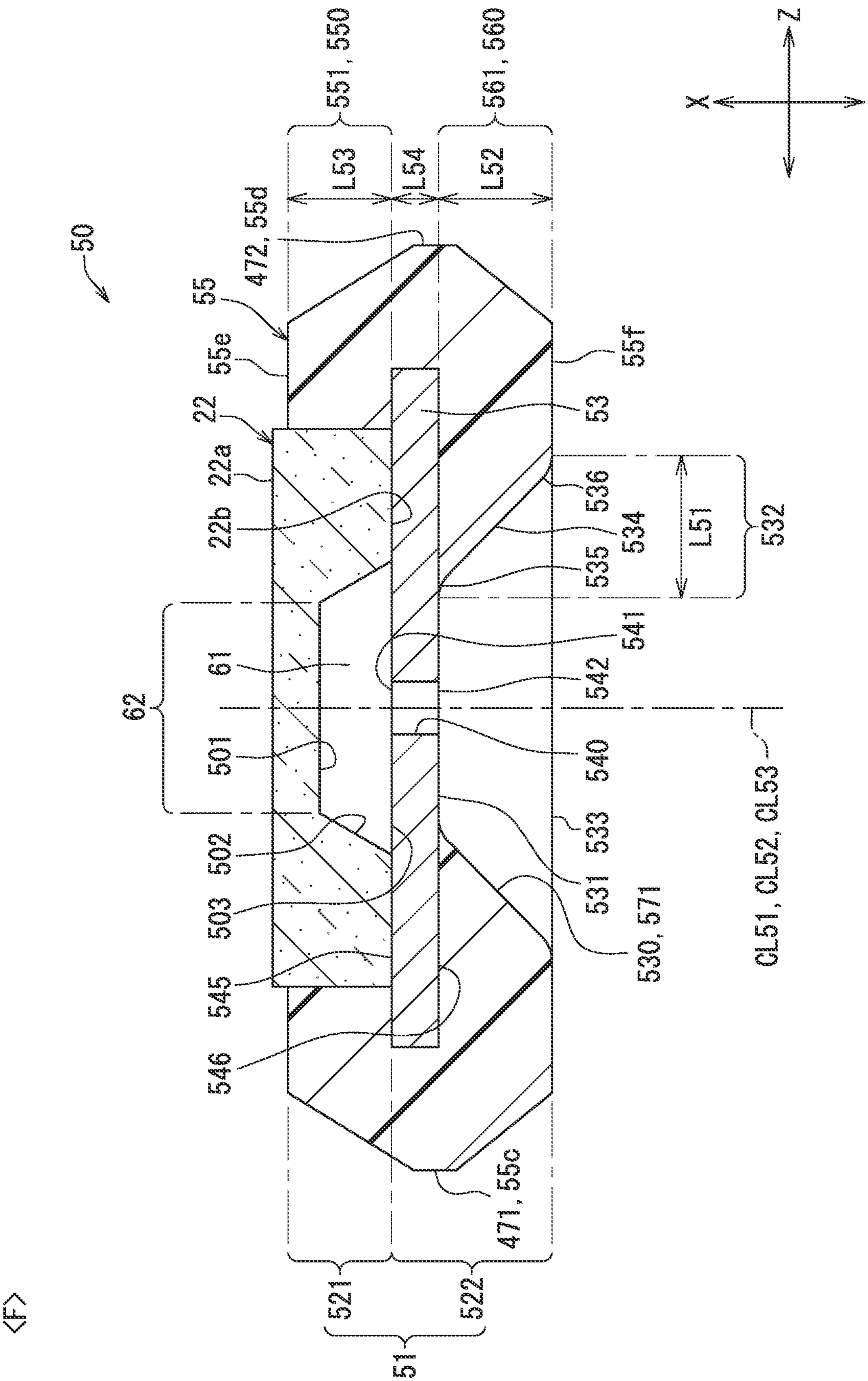
FIG. 31 is a cross-sectional view taken along a line XXXI-XXXI in FIG. 10.

As shown in FIGS. 28, 29, and 31, the sensor support portion 51 includes a front support portion 521 and a back support portion 522. Here, of the sensor support portion 51, a portion provided on the sensor back surface 22*b* side of the flow sensor 22 is referred to as the back support portion 522, and a portion provided on the mold front side relative to the back support portion 522 is referred to as the front support portion 521. In this case, the front support portion 521 includes a mold front portion 550 to be described later and the flow processing unit 511, and the back support portion 522 includes a mold back portion 560 and the SA substrate 53 to be described later.

The back support portion 522 extends along the sensor back surface 22*b* and covers the sensor recess opening 503 from the mold back side. The back support portion 522 has a support recess portion 530 and a support hole 540. The back surface of the back support portion 522 is the mold back surface 55*f*, and the support recess portion 530 is a recess portion provided on the mold back surface 55*f*. The support recess portion 530 is formed by the mold back surface 55*f* being recessed toward the mold front side.

Figure 30:
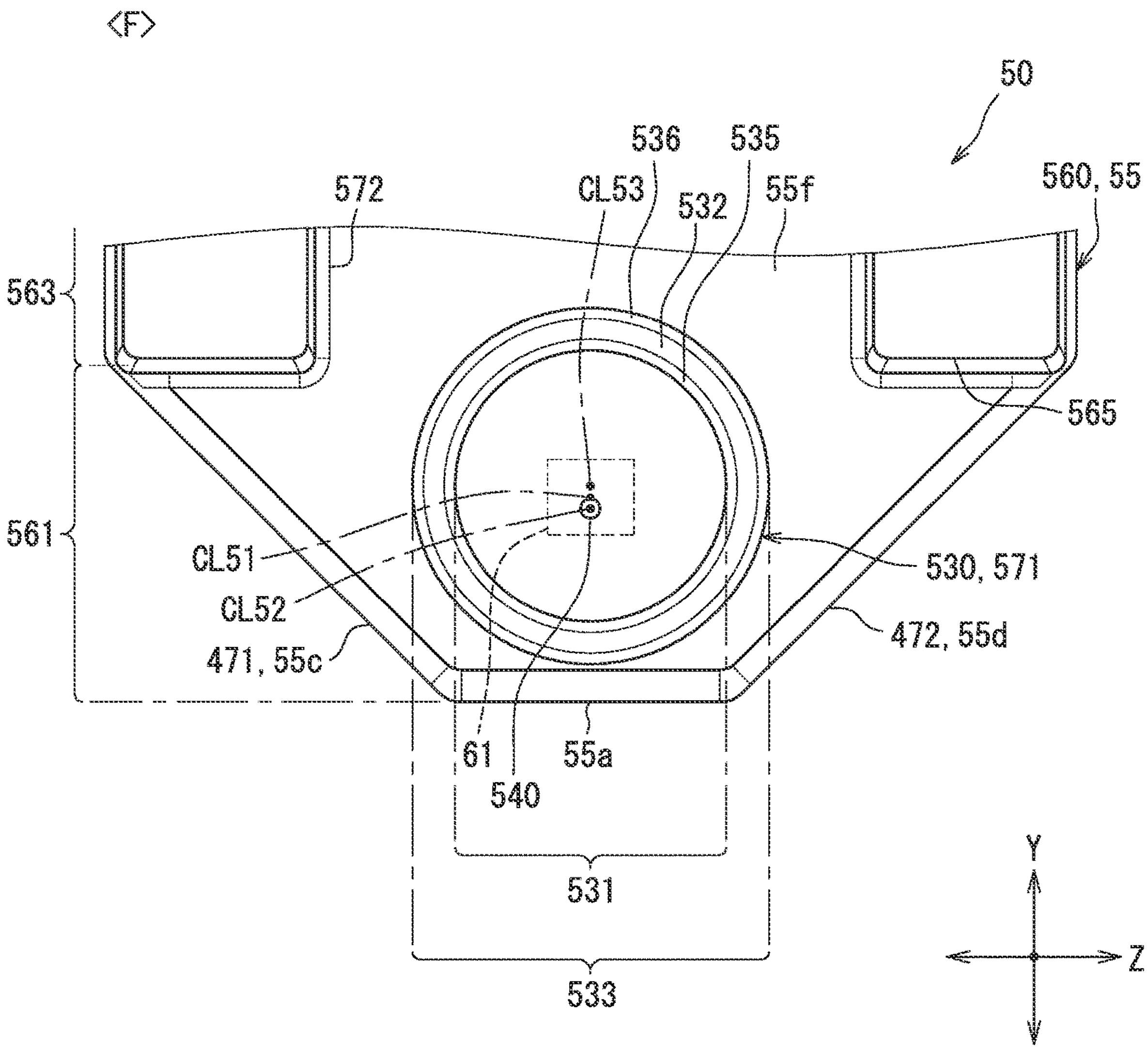
FIG. 30 is an enlarged view around the sensor recess portion of the flow sensor as viewed from the mold back side.

The support recess portion 530 includes a support recess bottom surface 531, a support recess inner wall surface 532, and a support recess opening 533. The support recess bottom surface 531 and the support recess inner wall surface 532 are included in the inner surface of the support recess portion 530. A center line CL53 of the support recess portion 530 extends in the width direction X and passes through the center of the support recess bottom surface 531 and the center of the support recess opening 533. The center line CL53 extends in parallel with the center line CL51 of the sensor recess portion 61 and is arranged with the center line CL51 of the sensor recess portion 61 in the height direction Y. As shown in FIGS. 29 and 30, the center line CL53 of the support recess portion 530 is disposed at a position shifted toward the mold base end side from the center line CL51 of the sensor recess portion 61 in the height direction Y. The cross-sectional shape of the support recess portion 530 in the direction orthogonal to the center line CL53 is circular or substantially circular.

As shown in FIGS. 28, 29, and 31, the support recess bottom surface 531 is included in the SA substrate back surface 546 of the SA substrate 53. The support recess bottom surface 531 is orthogonal to the center line CL53 of the support recess portion 530, and is formed in a circular shape or a substantially circular shape. The outer peripheral edge of the support recess bottom surface 531 is provided at a position separated outward from the sensor recess opening 503 in the directions Y and Z orthogonal to the center line CL53 of the support recess portion 530. The support recess bottom surface 531 corresponds to a support recess bottom portion.

The support recess inner wall surface 532 extends from the support recess bottom surface 531 toward the mold back side. The support recess inner wall surface 532 is inclined with respect to the center line CL53 of the support recess portion 530 and faces the mold back side. The support recess portion 530 is gradually expanded toward the mold back side in the width direction X. In other words, the internal space of the support recess portion 530 is gradually narrowed toward the flow sensor 22 in the width direction X. The support recess inner wall surface 532 annularly extends along the outer peripheral edge of the support recess bottom surface 531.

As shown in FIGS. 28, 29, and 31, the support recess opening 533 is an open end of the support recess portion 530, and is provided on the mold back surface 55*f* as an end portion of the mold back side of the support recess portion 530. The support recess opening 533 is formed by an end portion of the mold back side of the support recess inner wall surface 532, and is circular or substantially circular. The support recess opening 533 is opened in a direction where the center line CL53 of the support recess portion 530 extends. The outer peripheral edge of the support recess opening 533 is provided at a position separated outward from both the support recess bottom surface 531 and the sensor recess opening 503 in the directions Y and Z orthogonal to the center line CL53 of the support recess portion 530.

The support recess inner wall surface 532 has an inner wall inclined surface 534, a bottom surface chamfered surface 535, and an opening surface chamfered surface 536. The inner wall inclined surface 534 extends straight in a direction inclined with respect to the center line CL53 of the support recess portion 530, and an inclination angle with respect to the center line CL53 is larger than 45 degrees, for example. The bottom surface chamfered surface 535 is a surface that chamfers the inside corner portion between the support recess bottom surface 531 and the inner wall inclined surface 534, and is curved so as to be recessed outward the support recess portion 530. The opening surface chamfered surface 536 is a surface that chamfers the outside corner portion between the inner wall inclined surface 534 and the mold back surface 55*f*, and is bent so as to bulge inward the support recess portion 530.

As shown in FIG. 31, in the entire circumferential direction of the support recess inner wall surface 532, a length dimension L51 of the support recess inner wall surface 532 in the directions Y and Z orthogonal to the width direction X is larger than a length dimension L52 of the support recess inner wall surface 532 in the width direction X. The length dimension L51 is a separation distance between the inner peripheral edge of the bottom surface chamfered surface 535 and the outer peripheral edge of the opening surface chamfered surface 536 in the directions Y and Z. The length dimension L52 is a depth dimension of the support recess portion 530, and is a separation distance between the inner peripheral edge of the bottom surface chamfered surface 535 and the outer peripheral edge of the opening surface chamfered surface 536 in the width direction X. The length dimension L52 is a thickness dimension of a portion of the mold back portion 560 where the support recess portion 530 is provided, and is larger than the thickness dimension L54 of the SA substrate 53. That is, the portion of the mold back portion 560 where the support recess portion 530 is provided is thicker than the SA substrate 53.

As shown in FIGS. 28, 29, and 31, the support hole 540 extends from the support recess bottom surface 531 of the support recess portion 530 toward the flow sensor 22, and leads to the sensor recess opening 503. The support hole 540 penetrates the back support portion 522 in the width direction X. In the back support portion 522, the support recess bottom surface 531 is formed by the SA substrate 53, and the support hole 540 is a through hole penetrating the SA substrate 53 in the width direction X. The support hole 540 can also be referred to as an SA substrate hole. In the SA substrate 53, the thickness direction is the width direction X. The center line CL52 of the support hole 540 extends in the width direction X and extends in parallel with the center line CL51 of the sensor recess portion 61 and the center line CL53 of the support recess portion 530. The center line CL52 of the support hole 540 is arranged with the center lines CL51 and CL53 in the height direction Y. As shown in FIGS. 29 and 30, the center line CL52 of the support hole 540 is disposed at a position shifted toward the mold tip end side from both of the center lines CL51 and CL53.

The center line CL51 of the sensor recess portion 61 is disposed at a position closer to the center line CL52 of the support hole 540 than the center line CL53 of the support recess portion 530. In this case, the separation distance between the center lines CL51 and CL52 in the height direction Y is smaller than the separation distance between the center lines CL51 and CL53.

The support hole 540 has a circular cross section or a substantially circular cross section, and has a uniform thickness in the direction where the center line CL52 extends. In the support hole 540, when an end portion on the mold front side is referred to as a front end portion 541 and an end portion on the mold back side is referred to as a back end portion 542, both the front end portion 541 and the back end portion 542 are circular or substantially circular. As shown in FIGS. 29 and 30, the front end portion 541 is included in the SA substrate front surface 545 and is at a position separated inward from both the outer peripheral edge of the sensor recess opening 503 and the outer peripheral edge of the sensor recess bottom surface 501 in the directions Y and Z orthogonal to the center line CL52 of the support hole 540. Therefore, the support recess bottom surface 531 annularly extends along the outer peripheral edge of the back end portion 542. The back end portion 542 is included in the SA substrate back surface 546, and is disposed at a position separated inward from the outer peripheral edge of the support recess opening 533 in the directions Y and Z orthogonal to the center line CL52 of the support hole 540.

As shown in FIGS. 28, 29, and 31, the mold portion 55 includes the mold front portion 550 and the mold back portion 560. The mold front portion 550 is included in the front support portion 521 and is a portion of the mold portion 55 provided on the mold front side relative to the SA substrate 53. The mold front portion 550 is overlapped on the SA substrate front surface 545 in a state of extending along the SA substrate front surface 545. The mold front portion 550 covers the flow processing unit 511 and the bonding wire 512 from the mold front side. The mold front portion 550 covers a part of the flow sensor 22 from the mold front side in a state where the membrane portion 62 is exposed to the mold front side.

The mold back portion 560 is included in the back support portion 522 and is a portion of the mold portion 55 provided on the mold back side relative to the SA substrate 53. The mold back portion 560 is overlapped on the SA substrate back surface 546 in a state of extending along the SA substrate back surface 546. The mold back portion 560 is provided with a recess formation hole 571. The recess formation hole 571 is a through hole penetrating the mold back portion 560 in the width direction X, and forms the support recess portion 530 together with the SA substrate 53. In the support recess portion 530, the inner surface of the recess formation hole 571 forms the support recess inner wall surface 532, and the SA substrate 53 forms the support recess bottom surface 531. In this case, the center line of the recess formation hole 571 coincides with the center line CL53 of the support recess portion 530.

As shown in FIG. 28, the mold portion 55 is thinned stepwise from the mold base end surface 55*b* toward the mold tip end surface 55*a*. That is, the thickness dimension of the mold portion 55 in the width direction X decreases stepwise toward the mold tip end surface 55*a*. In the mold portion 55, the mold front portion 550 includes a front measurement portion 551, a front base portion 552, and a front intermediate portion 553, and the mold back portion 560 includes a back measurement portion 561, a back base portion 562, and a back intermediate portion 563.

In the mold front portion 550, the front intermediate portion 553 is provided between the front measurement portion 551 and the front base portion 552 in the height direction Y. The front measurement portion 551, the front base portion 552, and the front intermediate portion 553 all extend along the SA substrate front surface 545. The front measurement portion 551 forms the mold tip end surface 55*a*, and the front base portion 552 forms the mold base end surface 55*b*. The front surface of the front measurement portion 551, the front surface of the front base portion 552, and the front surface of the front intermediate portion 553 all extend in parallel to the SA substrate front surface 545 and are included in the mold front surface 55*e*.

The thickness of the front measurement portion 551, the front base portion 552, and the front intermediate portion 553 are substantially uniform. The thickness dimension in the width direction X is the smallest in the front measurement portion 551 and the largest in the front base portion 552. For example, the thickness dimension of the front intermediate portion 553 is substantially twice the thickness dimension of the front measurement portion 551, and the thickness dimension of the front base portion 552 is substantially thrice the thickness dimension of the front measurement portion 551. As shown in FIG. 31, a thickness dimension L53 of the front measurement portion 551 is larger than a thickness dimension L54 of the SA substrate 53. In the width direction X, the front measurement portion 551 does not project to the mold front side relative to the flow sensor 22.

In FIG. 31, the sensor front surface 22*a* of the flow sensor 22 is shown at a position projecting to the mold front side relative to the surface of the front measurement portion 551, but actually, the sensor front surface 22*a* is provided at a position on the mold back side relative to the surface of the front measurement portion 551. In this case, the sensor front surface 22*a* forms a part of the bottom surface of the recess portion recessed from the mold front surface 55*e* to the mold back side. In the front measurement portion 551, the peripheral edge recess portion 56 (see FIG. 10) extends along the outer peripheral edge of the sensor front surface 22*a*, but the peripheral edge recess portion 56 is not illustrated in FIG. 31.

Figure 34:
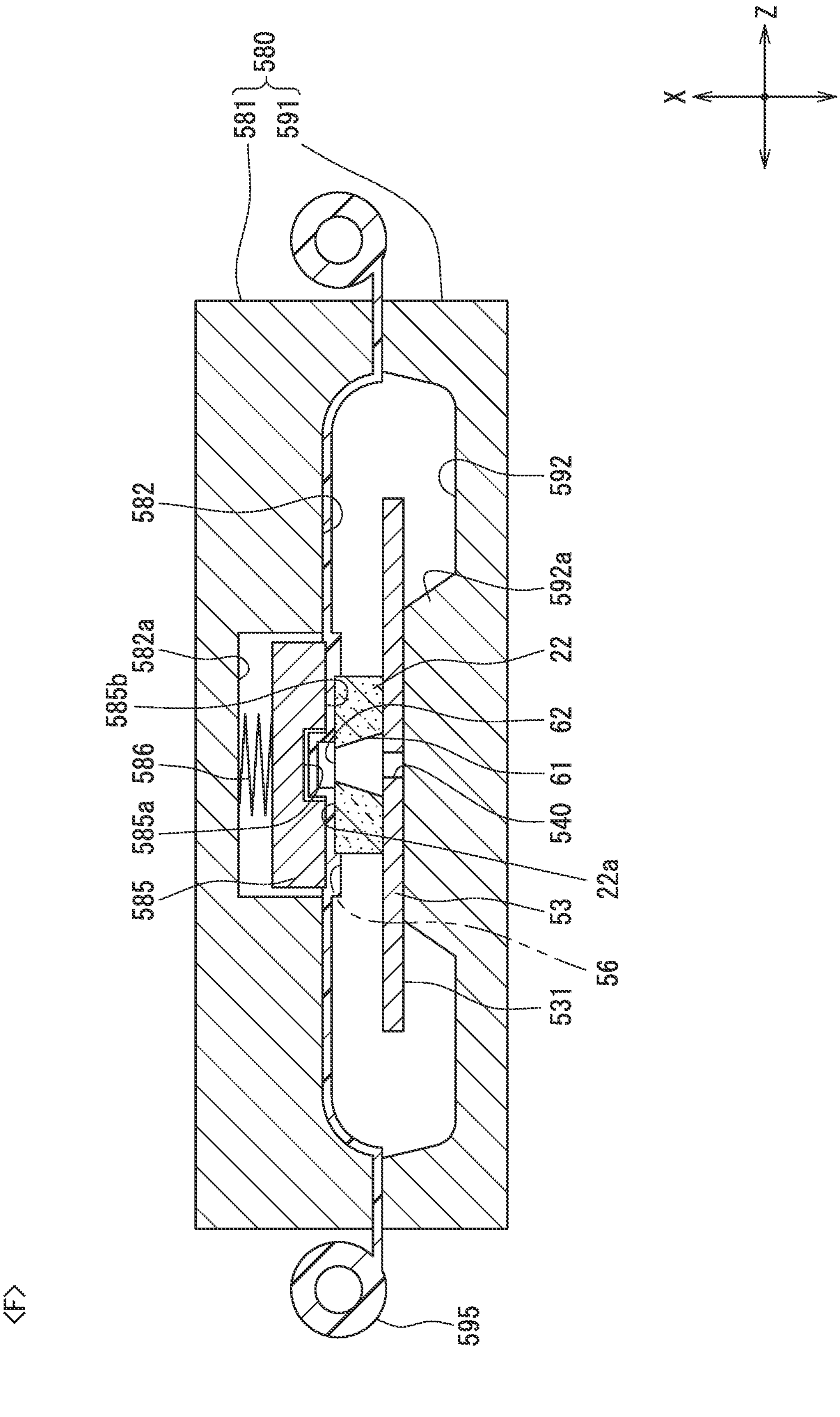
FIG. 34 is a cross-sectional view of the mold device.

In FIG. 10, the peripheral edge recess portion 56 has an inside corner portion formed by the bottom surface of the peripheral edge recess portion 56 and the inner wall surface on the inner peripheral side, and an inside corner portion formed by the bottom surface and the inner wall surface on the outer peripheral side (see FIG. 34). Each of these inside corner portions extends along the peripheral edge portion of the sensor front surface 22*a*. It is considered that the foreign matter flowing through the measurement flow path 32 toward the downstream side together with the air tends to accumulate in a portion in the inside corner portion of the peripheral edge recess portion 56 facing the mold upstream side. When the foreign matter accumulated in these portions is separated from the inside corner portion, the foreign matter flows to the downstream side in clumps. In the peripheral edge recess portion 56, a portion facing the mold upstream side is included in both the inside corner portion of the inner peripheral side and the inside corner portion of the outer peripheral side. In particular, since a portion facing the mold upstream side in the inside corner portion on the inner peripheral side is present on the upstream side relative to the membrane portion 62, when a foreign matter separates from this portion, the foreign matter adheres to or approaches the membrane portion 62 in clumps. In this case, there is a concern that the operation accuracy of the resistance elements 71 to 73 and the like in the membrane portion 62 decreases due to the foreign matter, and the detection accuracy of the flow sensor 22 decreases.

On the other hand, in the peripheral edge recess portion 56, the height dimension of the inner wall surface on the inner peripheral side in the width direction X is smaller than the height dimension of the inner wall surface on the outer peripheral side in the width direction X. That is, in the peripheral edge recess portion 56, the inside corner portion of the inner peripheral side is smaller than the inside corner portion of the outer peripheral side in the width direction X. For this reason, the foreign matter is less likely to accumulate in the portion in the inside corner portion of the inner peripheral side facing the mold upstream side than the portion in the inside corner portion of the outer peripheral side facing the mold upstream side. In this case, unlike the present embodiment, for example, as compared with the peripheral edge recess portion in which the height dimension of the inner wall surface on the inner peripheral side is larger than the height dimension of the inner wall surface on the outer peripheral side, the foreign matter is less likely to accumulate in the portion in the inside corner portion on the inner peripheral side facing the mold upstream side. Therefore, it is less likely to occur that the detection accuracy of the flow sensor 22 decreases due to the foreign matter accumulated in this portion.

As shown in FIG. 28, the mold front surface 55*e* has the front measurement step surface 555 and a front base step surface 556. The front measurement step surface 555 is provided at a boundary portion between the front measurement portion 551 and the front intermediate portion 553, and the front base step surface 556 is provided at a boundary portion between the front intermediate portion 553 and the front base portion 552. Both the front measurement step surface 555 and the front base step surface 556 face the mold tip end side, and are included in the mold front surface 55*e*. The front measurement step surface 555 and the front base step surface 556 are inclined with respect to the center line CL53 of the support recess portion 530 and face the side opposite from the mold back surface 55*f*. In the height direction Y, the boundary portion between the front measurement portion 551 and the front intermediate portion 553 is disposed at the center of the front measurement step surface 555, and the boundary portion between the front intermediate portion 553 and the front base portion 552 is disposed at the center of the front base step surface 556. The front measurement step surface 555 is included in the SA step surface 147 (see FIG. 18).

In the mold front portion 550, the front measurement step surface 555 is in a state of extending to the mold front side with respect to the sensor front surface 22*a*. In this configuration, air flowing along the front measurement step surface 555 in the intake passage 12 flows along the sensor front surface 22*a*. In this case, the rate and velocity of air flowing along the sensor front surface 22*a* become values corresponding to the position of the front measurement step surface 555. In this case, the degree of likeliness of disturbance of the airflow flowing along the sensor front surface 22*a* changes according to the degree of flatness of the front measurement step surface 555. Therefore, in manufacturing the sensor SA50, the detection accuracy of the flow sensor 22 becomes higher as the accuracy of the position and shape of the front measurement step surface 555 is higher.

On the other hand, unlike the present embodiment, for example, a configuration is assumed in which a step surface extending to the mold front side with respect to the sensor front surface 22*a* is provided on the mold tip end side with respect to the sensor front surface 22*a* in addition to the front measurement step surface 555. When this step surface is referred to as a tip end side step surface, air flowing between the tip end side step surface and the front measurement step surface 555 flows along the sensor front surface 22*a* on the mold front surface 55*e*. In this case, the rate and velocity of air flowing along the sensor front surface 22*a* become values corresponding to the position of each of the front measurement step surface 555 and the tip end side step surface. In this case, the degree of likeliness of disturbance of the airflow flowing along the sensor front surface 22*a* changes according to the degree of flatness of each of the front measurement step surface 555 and the tip end side step surface. Therefore, in manufacturing the sensor SA50, the detection accuracy of the flow sensor 22 becomes higher as the accuracy of the position and shape of each of the front measurement step surface 555 and the tip end side step surface is higher.

As described above, in the configuration in which the tip end side step surface is provided on the mold front portion 550, it is necessary to improve the accuracy of the position and shape of both the front measurement step surface 555 and the tip end side step surface in order to improve the detection accuracy of the flow sensor 22. On the other hand, in the present embodiment, since the tip end side step surface is not provided in the mold front portion 550, it is only necessary to improve the accuracy of the position and shape of the front measurement step surface 555 in order to improve the detection accuracy of the flow sensor 22. Therefore, in the present embodiment in which the tip end side step surface is not provided, the detection accuracy of the flow sensor 22 is easily improved as compared with the configuration in which the tip end side step surface is provided on the mold front portion 550.

In the mold back portion 560, the back intermediate portion 563 is provided between the back measurement portion 561 and the back base portion 562 in the height direction Y. The back measurement portion 561, the back base portion 562, and the back intermediate portion 563 all extend along the SA substrate back surface 546. The back measurement portion 561 forms the mold tip end surface 55*a*, and the back base portion 562 forms the mold base end surface 55*b*. The back surface of the back measurement portion 561, the back surface of the back base portion 562, and the back surface of the back intermediate portion 563 all extend in parallel to the SA substrate back surface 546 and are included in the mold back surface 55*f*.

The thickness of the back measurement portion 561, the back base portion 562, and the back intermediate portion 563 are substantially uniform. The thickness dimension in the width direction X is the smallest in the back measurement portion 561 and the largest in the back base portion 562. For example, the thickness dimension of the back intermediate portion 563 is substantially twice the thickness dimension of the back measurement portion 561, and the thickness dimension of the back base portion 562 is substantially thrice the thickness dimension of the back measurement portion 561. As shown in FIG. 31, a length dimension L52, which is a thickness dimension of the back measurement portion 561, is larger than the thickness dimension L54 of the SA substrate 53.

As shown in FIG. 28, the mold back surface 55*f* has a back measurement step surface 565 and a back base step surface 566. The back measurement step surface 565 is provided at a boundary portion between the back measurement portion 561 and the back intermediate portion 563, and the back base step surface 566 is provided at a boundary portion between the back intermediate portion 563 and the back base portion 562. Both the back measurement step surface 565 and the back base step surface 566 face the mold tip end side, and are included in the mold back surface 55*f*. The back measurement step surface 565 and the back base step surface 566 are inclined with respect to the center line CL53 of the support recess portion 530 and face the side opposite from the mold front surface 55*e*. In the height direction Y, the boundary portion between the back measurement portion 561 and the back intermediate portion 563 is disposed at the center of the back measurement step surface 565, and the boundary portion between the back intermediate portion 563 and the back base portion 562 is disposed at the center of the back base step surface 566. The back measurement step surface 565 is included in the SA step surface 147 (see FIG. 18).

As described above, because the thickness of the measurement portions 551 and 561 is substantially uniform, the thickness of the overlapping portion, which is the portion where the measurement portions 551 and 561 overlaps in the width direction X in the mold portion 55, is substantially uniform. In this configuration, even if the overlapping portion of the mold portion 55 is deformed due to thermal deformation or the like, the degree of deformation is less likely to be different between the portion on the mold tip end side and the portion on the mold base end side in the overlapping portion. In this case, the overlapping portion of the mold portion 55 is less likely to be deformed so as to bend in the width direction X and the depth direction Z, and thus the flow sensor 22 is less likely to deform so as to bend toward the mold front side and the mold back side along with the deformation of the overlapping portion. Therefore, unintentional deformation of the membrane portion 62 and the resistance elements 71 to 74 is suppressed.

In the mold portion 55, the front measurement portion 551 and the back measurement portion 561 have the same or substantially the same thickness dimension. In this configuration, even if the overlapping portion of the mold portion 55 is deformed due to thermal deformation or the like, the degree of deformation is less likely to be different between the front measurement portion 551 and the back measurement portion 561 at the overlapping portion. Even in this case, the overlapping portion of the mold portion 55 is hardly deformed so as to bend toward the mold front side or the mold back side in the width direction X. Therefore, similarly to the case where the thickness of the overlapping portion of the mold portion 55 is substantially uniform, the membrane portion 62 and the resistance elements 71 to 74 are suppressed from being unintentionally deformed.

The back intermediate portion 563 has an intermediate recess portion 572. The intermediate recess portion 572 is provided between the mold upstream surface 55*c* and the mold downstream surface 55*d* in the depth direction Z, and is a notch extending from the back measurement step surface 565 toward the back base portion 562. The bottom surface of the intermediate recess portion 572 is flush with the back surface of the back measurement portion 561. Here, the support recess portion 530 is provided at a position across the back measurement step surface 565 in the height direction Y. In this case, the peripheral edge portion of the support recess opening 533 is formed by the same plane formed by the outer surface of the back measurement portion 561 and the bottom surface of the intermediate recess portion 572.

Figure 32:
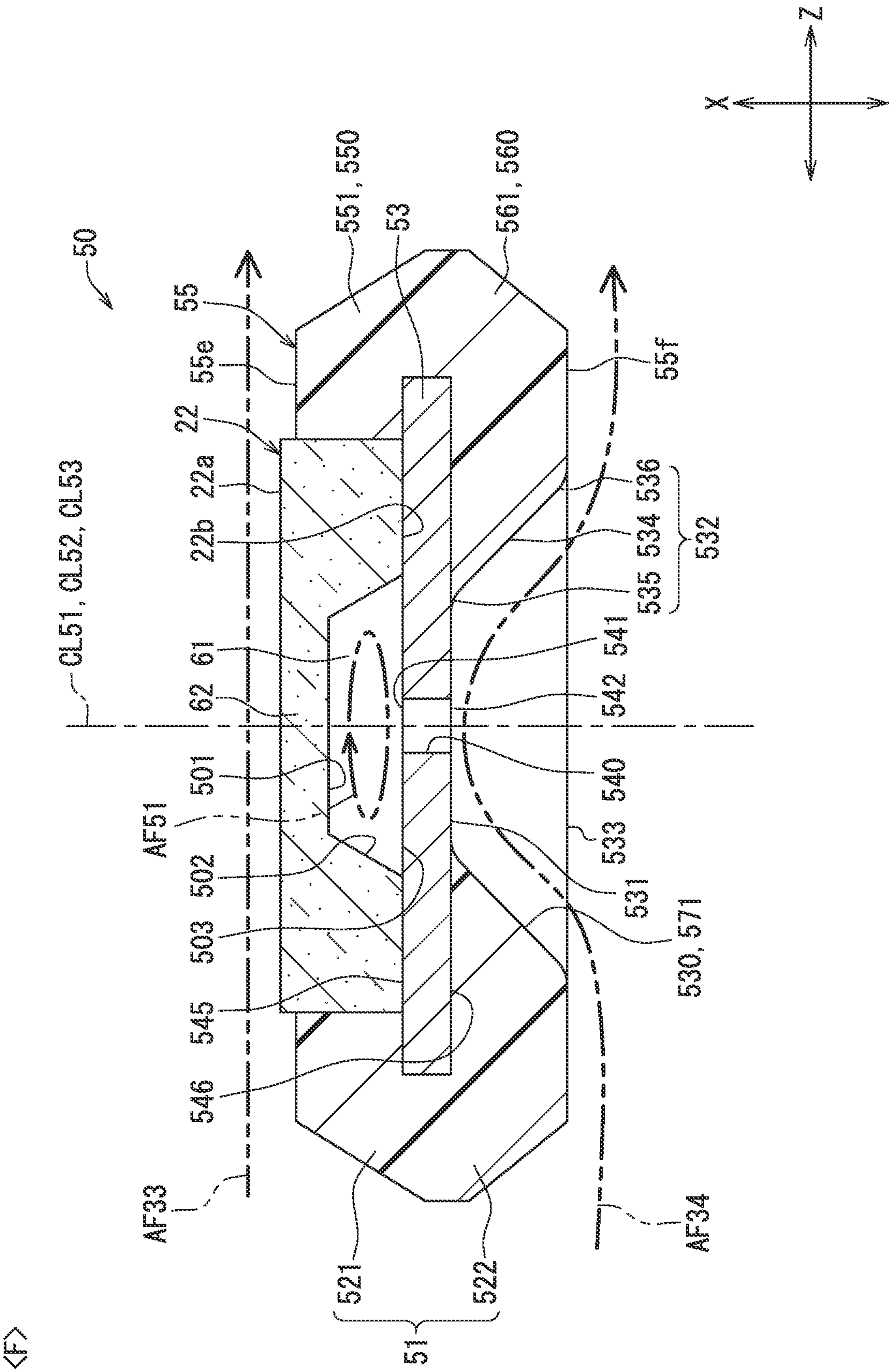
FIG. 32 is a view for explaining an airflow generated in a measurement flow path.

As shown in FIGS. 25 and 32, the air flowing through the measurement flow path 32 includes the front closing flow AF33 and the back closing flow AF34. The front closing flow AF33 is an airflow flowing along the mold front surface 55*e*, and the back closing flow AF34 is an airflow flowing along the mold back surface 55*f*. The flow sensor 22 detects the flow rate of the front closing flow AF33 flowing along the membrane portion 62 of the sensor front surface 22*a* as a target. Therefore, the detection accuracy of the flow sensor 22 tends to be higher as the disturbance included in the front closing flow AF33 is smaller.

In the flow sensor 22, an airflow may be generated inside the sensor recess portion 61. When this airflow is referred to as a cavity flow AF51, this cavity flow AF51 is generated by air flowing into and out of the sensor recess portion 61 through the support recess portion 530 and the support hole 540. For example, when the intake pressure, which is the pressure of the intake air, increases in the intake passage 12, air such as the back closing flow AF34 flows into the sensor recess portion 61 through the support recess portion 530 and the support hole 540, and the cavity flow AF51 is generated. When the intake pressure decreases in the intake passage 12, the internal air of the sensor recess portion 61 flows out through the support recess portion 530 and the support hole 540, and the cavity flow AF51 is generated. In these cases, the internal pressure of the sensor recess portion 61 increases or decreases according to the pressure of the intake passage 12, and a pressure difference hardly occurs between the inside and the outside of the membrane portion 62. The pressure inside the membrane portion 62 is the internal pressure of the sensor recess portion 61. The pressure outside the membrane portion 62 is the external pressure of the sensor SA50 and is the intake pressure of the intake passage 12.

Even if the intake pressure in the intake passage 12 does not increase or decrease, the back closing flow AF34 flowing along the mold back surface 55*f* may flow into the sensor recess portion 61 through the support recess portion 530 and the support hole 540. When the back closing flow AF34 flows into the sensor recess portion 61, the cavity flow AF51 is likely to occur in the sensor recess portion 61. When the cavity flow AF51 is generated, there is a concern that an error is likely to occur in the detection result of the flow sensor 22 that detects the flow rate for the front closing flow AF33.

In the flow sensor 22, the membrane portion 62 is heated by the heat resistance element 71, and the temperature of the membrane portion 62 is detected by the resistance thermometers 72 and 73 to detect the flow rate of the air such as the front closing flow AF33 flowing along the sensor front surface 22*a*. For example, when the amount of the front closing flow AF33 flowing along the sensor front surface 22*a* is small or when the flow of the front closing flow AF33 is slow, the temperature difference that is the difference between the detected temperature of the upstream resistance thermometer 72 and the detected temperature of the downstream resistance thermometer 73 tends to be small. This is because, in the membrane portion 62, the ambient temperature of the upstream resistance thermometer 72 is less likely to decrease by the front closing flow AF33, and the front closing flow AF33 is less likely to transfer the heat of the heat resistance elements 71 to the peripheral portion of the downstream resistance thermometer 73. In other words, when the amount of the front closing flow AF33 flowing along the sensor front surface 22*a* is large or when the flow of the front closing flow AF33 is fast, the temperature difference between the resistance thermometers 72 and 73 tends to be large. This is because the ambient temperature of the upstream resistance thermometer 72 of the membrane portion 62 is likely to decrease by the front closing flow AF33, and the front closing flow AF33 is likely to transfer the heat of the heat resistance elements 71 to the peripheral portion of the downstream resistance thermometer 73.

However, when the cavity flow AF51 is generated, the temperature of the membrane portion 62 may be changed not only by the front closing flow AF33 flowing along the front surface of the membrane portion 62 but also by the cavity flow AF51 flowing along the back surface of the membrane portion 62. For example, when the flow of the cavity flow AF51 is faster than the flow of the front closing flow AF33, the temperature difference between the resistance thermometers 72 and 73 tends to be larger than that when the cavity flow AF51 is not generated. In this case, the detection result of the flow sensor 22 indicates a flow rate larger than the actual flow rate for the front closing flow AF33. When the cavity flow AF51 is generated as described above, there is a concern that the detection accuracy of the flow sensor 22 is deteriorated.

For example, as shown in FIG. 32, the back closing flow AF34 flowing into the support recess portion 530 proceeds toward the support recess bottom surface 531 obliquely with respect to the width direction X along a portion of the support recess inner wall surface 532 on the mold upstream side. The back closing flow AF34 having reached the support recess bottom surface 531 then proceeds in the depth direction Z along the support recess bottom surface 531, passes through the back end portion 542 of the support hole 540, and reaches a portion of the support recess inner wall surface 532 on the mold downstream side. The back closing flow AF34 proceeds toward the support recess opening 533 obliquely with respect to the width direction X along the support recess inner wall surface 532, and flows out from the support recess opening 533 to the outside.

On the other hand, in the sensor SA50, as described above, the support recess inner wall surface 532 has a shape in which the internal space of the support recess portion 530 is gradually narrowed toward the support hole 540. Therefore, even if the back closing flow AF34 flows into the inside of the support recess portion 530, the back closing flow AF34 is bounced back by the support recess inner wall surface 532 and the support recess bottom surface 531, and easily flows out from the support recess opening 533. In other words, the back closing flow AF34 hardly flows into the back end portion 542 of the support hole 540 inside the support recess portion 530. Since the support recess inner wall surface 532 is inclined with respect to the mold back surface 55*f*, the back closing flow AF34 having reached the support recess portion 530 is less likely to be separated from the support recess inner wall surface 532. Therefore, even if the back closing flow AF34 reaches the support recess portion 530, disturbance such as a vortex accompanying separation is less likely to occur inside the support recess portion 530.

As described above, inside the support recess portion 530, the inner peripheral edge of the support recess inner wall surface 532 is separated from the back end portion 542 of the support hole 540 in the depth direction Z. In this configuration, the back closing flow AF34 proceeding toward the mold front side along the support recess inner wall surface 532 inside the support recess portion 530 more easily reaches the support recess bottom surface 531 than the back end portion 542 of the support hole 540. Therefore, the back closing flow AF34 proceeding along the support recess inner wall surface 532 is less likely to directly flow into the back end portion 542 of the support hole 540. The back closing flow AF34 is bounced back by the support recess bottom surface 531 and proceeds toward the housing back side, so that the back closing flow AF34 easily flows out from the support recess opening 533 to the outside.

Unlike the present embodiment, for example, a configuration is assumed in which only the support hole 540 of the support recess portion 530 and the support hole 540 is provided in the back support portion 522, and not the support recess opening 533 of the support recess portion 530 but the back end portion 542 of the support hole 540 is disposed on the mold back surface 55*f*. In this configuration, the internal space of the support hole 540 is not narrowed toward the support recess portion 530, and it is considered that when the back closing flow AF34 flows into the back end portion 542 of the support hole 540, the back closing flow AF34 easily flows into the inside of the sensor recess portion 61 through the support hole 540. In this case, there is a concern that the cavity flow AF51 is likely to occur in the sensor recess portion 61 due to the back closing flow AF34 flowing into the sensor recess portion 61.

Next, as a manufacturing method of the air flow meter 20, a manufacturing method of the sensor SA50 will be described with reference to FIGS. 33 and 34. The manufacturing method of the air flow meter 20 corresponds to a manufacturing method of a physical quantity measurement device.

First, the flow sensor 22, the flow processing unit 511, and the SA substrate 53 are manufactured. The flow sensor 22 and the flow processing unit 511 are mounted on the SA substrate 53, and the bonding wire 512 is connected to the flow sensor 22, the flow processing unit 511, and the SA substrate 53. When wire bonding for connecting the bonding wire 512 to the flow sensor 22 or the like is performed, the SA substrate 53 may vibrate. There is a concern that when the SA substrate 53 vibrates, the bonding wire 512 resonates with the vibration of the SA substrate 53 and the bonding wire 512 is cut. Therefore, the bonding wire 512 is temporarily fixed to a workbench or the like with an adhesive tape or the like. As a result, the bonding wire 512 hardly resonates with the vibration of the SA substrate 53. The connection portion between the flow sensor 22 and the bonding wire 512 is covered with a resin material to protect the connection portion.

In the plate-shaped base material forming the SA substrate 53, the flow sensor 22 and the flow processing unit 511 are mounted on each SA substrate 53 while the plurality of SA substrates 53 are connected to each other, and the mold portion 55 is provided on each SA substrate 53 as described later. In addition to the flow sensor 22 and the flow processing unit 511, passive components such as a chip capacitor are mounted on the SA substrate 53.

Subsequently, a molding process of the mold portion 55 is performed using the SA mold device 580 such as a mold. In this molding process, the SA mold device 580 is attached to the SA substrate 53, and the mold portion 55 is molded by the SA mold device 580. The SA mold device 580 is included in an injection mold device, and the injection mold device includes an injection mold machine and a hopper in addition to the SA mold device 580. The hopper supplies a resin material such as pellets to an injection mold machine. The injection mold machine heats the resin material supplied from the hopper to generate a molten resin, and supplies the molten resin by press-fitting the molten resin into the SA mold device 580.

Figure 33:
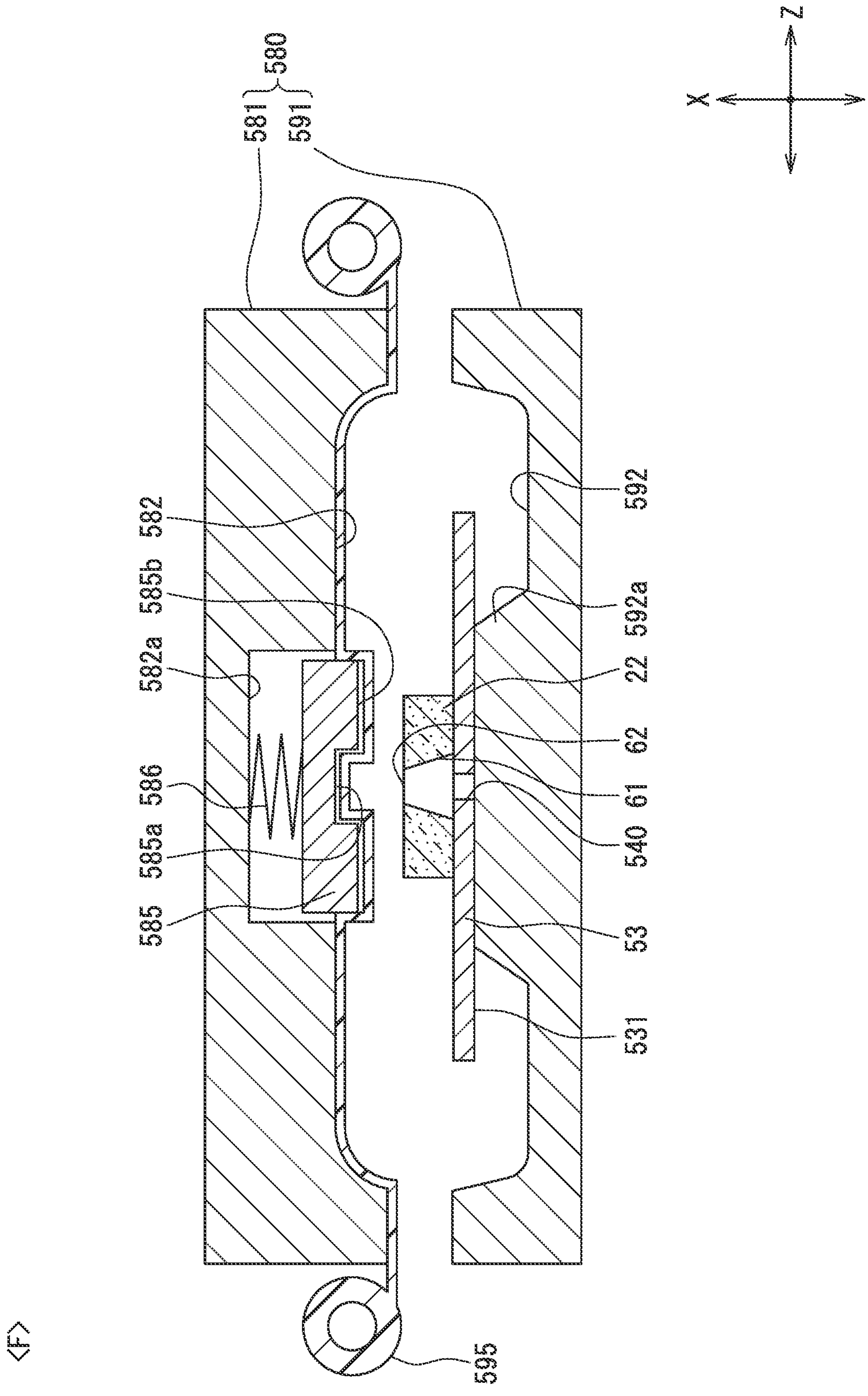
FIG. 33 is a cross-sectional view of a mold device showing a state before a front mold portion and a back mold portion are assembled.

As shown in FIGS. 33 and 34, the SA mold device 580 includes a front mold portion 581 and a back mold portion 591, and has a plate shape as a whole. The front mold portion 581 and the back mold portion 591 are each formed in a plate shape as a whole by a resin material or a metal material. The front mold portion 581 and the back mold portion 591 are assembled to each other with their plate surfaces facing each other. The internal space of the SA mold device 580 includes a mold space for molding the mold portion 55, and the mold space is formed by the front mold portion 581 and the back mold portion 591.

The front mold portion 581 is a mold portion for molding the mold portion 55 from the mold front side. The front mold portion 581 has a front mold recess portion 582. The front mold recess portion 582 is a recess portion provided on a plate surface facing the back mold portion 591 in the outer surface of the front mold portion 581, and molds at least a part of the mold front portion 550.

The back mold portion 591 is a mold portion for molding the mold portion 55 from the mold back side. The back mold portion 591 has a back mold recess portion 592. The back mold recess portion 592 is a recess portion provided on a plate surface facing the front mold portion 581 in the outer surface of the back mold portion 591, and molds at least a part of the mold back portion 560. The back mold portion 591 includes a support recess mold portion 592*a*. The support recess mold portion 592*a* is a portion for molding the support recess portion 530 to the mold back portion 560 in the back mold portion 591. The support recess mold portion 592*a* is a projection portion provided on the inner surface of the back mold portion 591, and projects from the inner surface of the back mold portion 591 toward the front mold portion 581 in the width direction X. The tip end surface of the support recess mold portion 592*a* overlaps the support recess bottom surface 531 of the SA substrate 53 in a state where the SA mold device 580 is attached to the SA substrate 53.

The SA mold device 580 includes a movable mold portion 585 and a movable spring 586 in addition to the front mold portion 581 and the back mold portion 591. The movable mold portion 585 is a mold portion formed in a plate shape as a whole by a resin material or a metal material, and provided in a state of being exposed to the internal space of the front mold portion 581. The movable mold portion 585 is provided at least at a position facing the sensor front surface 22*a* of the flow sensor 22 in a state where the SA mold device 580 is attached to the SA substrate 53. The movable mold portion 585 is pressed against the sensor front surface 22*a* of the flow sensor 22 by the biasing force of the movable spring 586. When the plate surface of the movable mold portion 585 on the back mold portion 591 side is referred to as a movable surface 585*b*, the movable surface 585*b* is pressed against the flow sensor 22 by the movable spring 586.

The movable mold portion 585 is movable relative to the front mold portion 581 in the width direction X. The front mold portion 581 has a movable accommodation portion 582*a*. The movable accommodation portion 582*a* is a recess portion provided on the inner surface of the front mold portion 581, and is recessed from the inner surface of the front mold portion 581 toward the side opposite from the back mold portion 591 in the width direction X. The movable mold portion 585 is in a state of entering the movable accommodation portion 582*a* in a state of projecting from the movable accommodation portion 582*a* toward the back mold portion 591.

The movable spring 586 is a spring member formed of a metal material or the like, and is a biasing member biasing the movable mold portion 585 toward the back mold portion 591. The movable spring 586 is provided inside the movable accommodation portion 582*a*. In the SA mold device 580, the bottom surface of the movable accommodation portion 582*a* and the movable mold portion 585 are separated from each other, and the movable spring 586 is provided in this separated portion. The SA mold device 580 may include a member formed of rubber or a resin material instead of or in addition to the movable spring 586 as a biasing member that biases the movable mold portion 585.

The movable mold portion 585 has an avoidance recess portion 585*a*. The avoidance recess portion 585*a* is a recess portion provided on the movable surface 585*b* of the movable mold portion 585, and is provided at a position facing at least the membrane portion 62 in a state where the SA mold device 580 is attached to the SA substrate 53. Since the movable mold portion 585 has the avoidance recess portion 585*a* as described above, the movable surface 585*b* is not pressed against the membrane portion 62 even when the movable mold portion 585 is pressed against the flow sensor 22 by the movable spring 586. On the other hand, the movable surface 585*b* is pressed against a portion of the sensor front surface 22*a* different from the membrane portion 62 by the movable spring 586.

In the molding process of the mold portion 55, the front mold portion 581 and the back mold portion 591 are assembled to each other with a mold film 595 held between the front mold portion 581, the movable mold portion 585, and the back mold portion 591. The mold film 595 is formed in a film shape by a resin material or the like and is deformable. For example, when an external force is applied, the mold film 595 can be thinned as compared with a case where no external force is applied.

In the SA mold device 580, when a portion of the mold film 595 held between the flow sensor 22 and the movable mold portion 585 becomes thin, a portion of the mold film 595 protruding outward from the outer peripheral edge of the flow sensor 22 tends to be thickened accordingly. The thickened portion of the mold film 595 extends along the outer peripheral edge of the sensor front surface 22*a* of the flow sensor 22, and forms the peripheral edge recess portion 56 in the mold portion 55. FIG. 34 illustrates a state before the mold portion 55 is subjected to resin molding in the SA mold device 580, and thus illustrates the peripheral edge recess portion 56 as an imaginary line.

The mold film 595 extends along the inner surface of the front mold portion 581 in a state of covering the movable mold portion 585 from the back mold portion 591 side. The SA mold device 580 has a gate as a supply passage through which the molten resin is supplied from the injection mold machine. This gate communicates with the mold space of the SA mold device 580, and is disposed between the mold film 595 and the back mold portion 591 in the width direction X. Therefore, the molten resin supplied from the injection mold machine to the SA mold device 580 is press-fitted between the mold film 595 and the back mold portion 591 in the mold space.

At least a portion of the mold film 595 facing the avoidance recess portion 585*a* of the movable mold portion 585 is in a state of entering the avoidance recess portion 585*a*. Therefore, in a state where the front mold portion 581 and the back mold portion 591 are assembled, the mold film 595 is not brought into contact with the surface of the membrane portion 62 of the sensor front surface 22*a*. Therefore, deformation of the membrane portion 62 by the mold film 595 and an unintended change in the resistance value of the resistance elements 71 to 74 in the membrane portion 62 are suppressed.

In the SA mold device 580, when the front mold portion 581 and the back mold portion 591 are assembled, clamping is performed in which an external force is applied in an orientation where the front mold portion 581 and the back mold portion 591 are brought into close contact with each other. By performing clamping, the molten resin is blocked from flowing from the mold space of the SA mold device 580 to the outside through the gap between the front mold portion 581 and the back mold portion 591.

Unlike the present embodiment, for example, in a configuration in which the SA mold device 580 does not have the movable mold portion 585 and the inner surface of the front mold portion 581 faces the flow sensor 22 in the SA mold device 580, it is conceivable that the load from the front mold portion 581 to the flow sensor 22 becomes excessive or insufficient. When the load from the front mold portion 581 to the flow sensor 22 becomes excessive, there is a concern that the flow sensor 22 may be deformed or damaged by this load. On the other hand, when the load from the front mold portion 581 to the flow sensor 22 is insufficient, there is a concern that the molten resin press-fitted into the mold space of the SA mold device 580 enters between the front mold portion 581 and the flow sensor 22, and the molten resin adheres to the sensor front surface 22*a* of the flow sensor 22. In either case, the detection accuracy of the flow sensor 22 is likely to decrease.

On the other hand, in the present embodiment, since the movable mold portion 585 is biased by the movable spring 586 in the SA mold device 580, the load from the front mold portion 581 to the flow sensor 22 is less likely to be excessive or insufficient.

For example, when the thickness dimension of the flow sensor 22 or the SA substrate 53 is larger than the design value due to a manufacturing error or the like at the time of manufacturing the flow sensor 22 or the SA substrate 53, the projection dimension of the movable mold portion 585 from the front mold portion 581 is reduced by the movable spring 586. In this case, the load from the movable mold portion 585 to the flow sensor 22 is less likely to become excessively large. Therefore, the flow sensor 22 is suppressed from being deformed or damaged by the load from the movable mold portion 585. In this case, the portion molded by the movable mold portion 585 on the mold front surface 55*e* of the mold portion 55 may be in a state of projecting toward the mold front side more relative to the portion molded by the front mold portion 581.

On the other hand, when the thickness dimension of the flow sensor 22 or the SA substrate 53 is smaller than the design value due to a manufacturing error or the like, the projection dimension of the movable mold portion 585 from the front mold portion 581 is increased by the movable spring 586. In this case, the load from the movable mold portion 585 to the flow sensor 22 is less likely to be insufficient. Therefore, the molten resin is less likely to enter between the movable mold portion 585 and the flow sensor 22, and adhesion of the molten resin to the sensor front surface 22*a* of the flow sensor 22 is suppressed. In this case, the portion of the mold front surface 55*e* of the mold portion 55 molded by the movable mold portion 585 and the portion molded by the front mold portion 581 may also be in a state of being recessed toward the mold back side.

As described above, the movable surface 585*b* of the movable mold portion 585 is not brought into contact with the membrane portion 62 by the avoidance recess portion 585*a*. Therefore, regardless of the excess or insufficiency of the load from the movable mold portion 585 to the flow sensor 22, the membrane portion 62 is suppressed from being deformed by the load from the movable mold portion 585 to the membrane portion 62, and the resistance value of the resistance elements 71 to 74 is suppressed from changing.

In the SA mold device 580, not only the movable mold portion 585 and the movable spring 586 but also the mold film 595 can suppress deformation and breakage of the flow sensor 22 and adhesion of the molten resin to the sensor front surface 22*a*. For example, since the mold film 595 is stacked on the sensor front surface 22*a*, it is suppressed that the SA mold device 580 comes into contact with the sensor front surface 22*a* and deforms or breaks the sensor front surface 22*a*. The mold film 595 is deformed and brought into close contact with the sensor front surface 22*a* as the SA mold device 580 is attached to the SA substrate 53 and the flow sensor 22, so that the molten resin is suppressed from entering between the mold film 595 and the sensor front surface 22*a*. Even if a foreign matter adheres to the sensor front surface 22*a*, the mold film 595 easily adheres to the sensor front surface 22*a* around the foreign matter so as to wrap the foreign matter. Therefore, the molten resin is suppressed from entering between the mold film 595 and the sensor front surface 22*a* through the gap generated by the foreign matter. In this manner, adhesion of the molten resin to the sensor front surface 22*a* is more reliably suppressed.

When the load from the movable mold portion 585 to the mold film 595 is excessive, the portion of the mold film 595 held between the movable mold portion 585 and the flow sensor 22 is deformed to be thin, so that the load from the movable mold portion 585 to the flow sensor 22 is reduced. That is, the clamping force that is an external force applied to the flow sensor 22 as the front mold portion 581 and the back mold portion 591 are clamped is relaxed. As a result, not only the movable mold portion 585 and the movable spring 586 but also the mold film 595 suppresses the flow sensor 22 from being deformed or damaged due to an excessive load applied from the movable mold portion 585 to the flow sensor 22.

According to the present embodiment described so far, in the back support portion 522 of the sensor support portion 51, the support recess inner wall surface 532 is inclined so as to face the side opposite from the flow sensor 22. In this configuration, the back closing flow AF34 flowing along the mold back surface 55*f* easily flows along the support recess inner wall surface 532 when reaching the support recess portion 530. In this case, separation of the back closing flow AF34 from the support recess inner wall surface 532 hardly occurs, and disturbance of the airflow such as a vortex hardly occurs inside the support recess portion 530. Therefore, it is possible to suppress an excessive increase in the rate and velocity of the cavity flow AF51 inside the sensor recess portion 61 due to disturbance in the airflow generated inside the support recess portion 530. Therefore, since it is unlikely to happen that the operation accuracy of the resistance elements 71 to 74 and the like in the membrane portion 62 is lowered by the excessively large cavity flow AF51, the measurement accuracy of the air flow meter 20 can be enhanced.

The internal space of the support recess portion 530 is gradually narrowed toward the support hole 540 in the width direction X. In this configuration, even if the back closing flow AF34 flowing along the mold back surface 55*f* enters the inside of the support recess portion 530 from the support recess opening 533, the back closing flow AF34 easily bounces off the support recess inner wall surface 532 and flows out from the support recess opening 533 to the outside. As described above, even if air such as the back closing flow AF34 flows into the support recess portion 530 from the support recess opening 533, it is possible to suppress that the air flows into the sensor recess portion 61 through the support hole 540 and the cavity flow AF51 is generated inside the sensor recess portion 61.

Unlike the present embodiment, for example, a configuration is assumed in which the support recess portion 530 is not provided in the mold back portion 560 of the sensor support portion 51, and the length dimension of the support hole 540 penetrating the mold back portion 560 is the same as the thickness dimension of the mold back portion 560. In this configuration, due to the support hole 540 being long, the pressure loss in the support hole 540 is likely to increase, and air hardly enters and exits the inside of the sensor recess portion 61 through the support hole 540. Therefore, there is a concern that when the intake pressure in the intake passage 12 increases or decreases, the internal pressure of the sensor recess portion 61 hardly follows the increase or decrease of the intake pressure, and a pressure difference is likely to occur between the inside and the outside of the membrane portion 62.

On the other hand, in the present embodiment, since the support hole 540 extends from the support recess bottom surface 531 of the support recess portion 530 toward the sensor recess portion 61 in the sensor support portion 51, the length dimension of the support hole 540 is reduced by the length dimension of the support recess portion 530. In this configuration, the pressure loss of the support hole 540 is less likely to increase, and air easily enters and exits the inside of the sensor recess portion 61 through the support hole 540. Therefore, even when the intake pressure in the intake passage 12 increases or decreases, the internal pressure of the sensor recess portion 61 easily follows the increase or decrease of the intake pressure, and a pressure difference hardly occurs between the inside and the outside of the membrane portion 62. Therefore, it is possible to suppress that the membrane portion 62 and the resistance elements 71 to 74 are unintentionally deformed due to this pressure difference and the detection accuracy of the flow sensor 22 is lowered.

Unlike the present embodiment, for example, a configuration is assumed in which the support recess portion 530 is not provided in the mold back portion 560 of the sensor support portion 51, and the length dimension of the support hole 540 is reduced by thinning the entire mold back portion 560. In this configuration, since the entire mold back portion 560 becomes thin, there is a concern that the strength of the back support portion 522 becomes insufficient. In this case, it is conceivable that the back support portion 522 is easily deformed when the sensor SA50 is attached to the housing 21. When the back support portion 522 is deformed, the flow sensor 22, the membrane portion 62, and the resistance elements 71 to 74 are deformed, and the detection accuracy of the flow sensor 22 is likely to decrease.

On the other hand, in the present embodiment, both the support recess portion 530 and the support hole 540 are provided in the mold back portion 560. In this configuration, by not thinning the entire mold back portion 560, it is possible to reduce the length dimension of the support hole 540 while avoiding a decrease in the strength of the mold back portion 560. Therefore, it is possible to suppress both a decrease in detection accuracy of the flow sensor 22 due to insufficient strength of the back support portion 522 and a decrease in detection accuracy of the flow sensor 22 due to a pressure difference occurring between the inside and the outside of the membrane portion 62.

According to the present embodiment, in the directions Y and Z orthogonal to the width direction X, the outer peripheral edge of the support recess bottom surface 531 is provided at a position separated outward from the back end portion 542 of the support hole 540. In this configuration, the back closing flow AF34 having proceeded along the support recess inner wall surface 532 without being separated from the support recess inner wall surface 532 passes through the support hole 540 by flowing along the support recess bottom surface 531, and easily flows out from the support recess opening 533 to the outside. Therefore, the support recess bottom surface 531 can suppress the back closing flow AF34 from flowing into the support hole 540.

According to the present embodiment, the support recess bottom surface 531 becomes so large that the outer peripheral edge of the support recess bottom surface 531 is provided at a position separated outward from the sensor recess opening 503 in the directions Y and Z orthogonal to the width direction X. Therefore, the back closing flow AF34 proceeding toward the mold front side along the support recess inner wall surface 532 inside the support recess portion 530 can be more reliably bounced back on the support recess bottom surface 531.

According to the present embodiment, the length dimension L51 of the support recess inner wall surface 532 in the directions Y and Z orthogonal to the width direction X is larger than the length dimension L52 of the support recess inner wall surface 532 in the width direction X. In this configuration, the degree to which the support recess inner wall surface 532 gradually narrows the internal space of the support recess portion 530 from the support recess opening 533 toward the support recess bottom surface 531 is as gentle as possible. Therefore, when the back closing flow AF34 flows in from the support recess opening 533 and proceeds along the support recess inner wall surface 532, the change in the proceeding direction is suppressed, so that disturbance such as a vortex is less likely to occur. In this case, the back closing flow AF34 flowing into the support recess portion 530 is easily bounced back toward the support recess opening 533 by the support recess inner wall surface 532. Therefore, it is possible to suppress the back closing flow AF34 flowing into the support recess portion 530 from the support recess opening 533 from reaching the support hole 540.

According to the present embodiment, the support hole 540 is so shortened by the support recess portion 530 in the sensor support portion 51 that the length dimension of the support hole 540 in the width direction X becomes smaller than the depth dimension of the support recess portion 530. In this configuration, since the air easily enters and exits from the inside of the sensor recess portion 61 through the support hole 540 by the depth of the support recess portion 530, it is possible to suppress the occurrence of the pressure difference between the inside and the outside of the membrane portion 62.

<Description of Configuration Group G>

Figure 35:
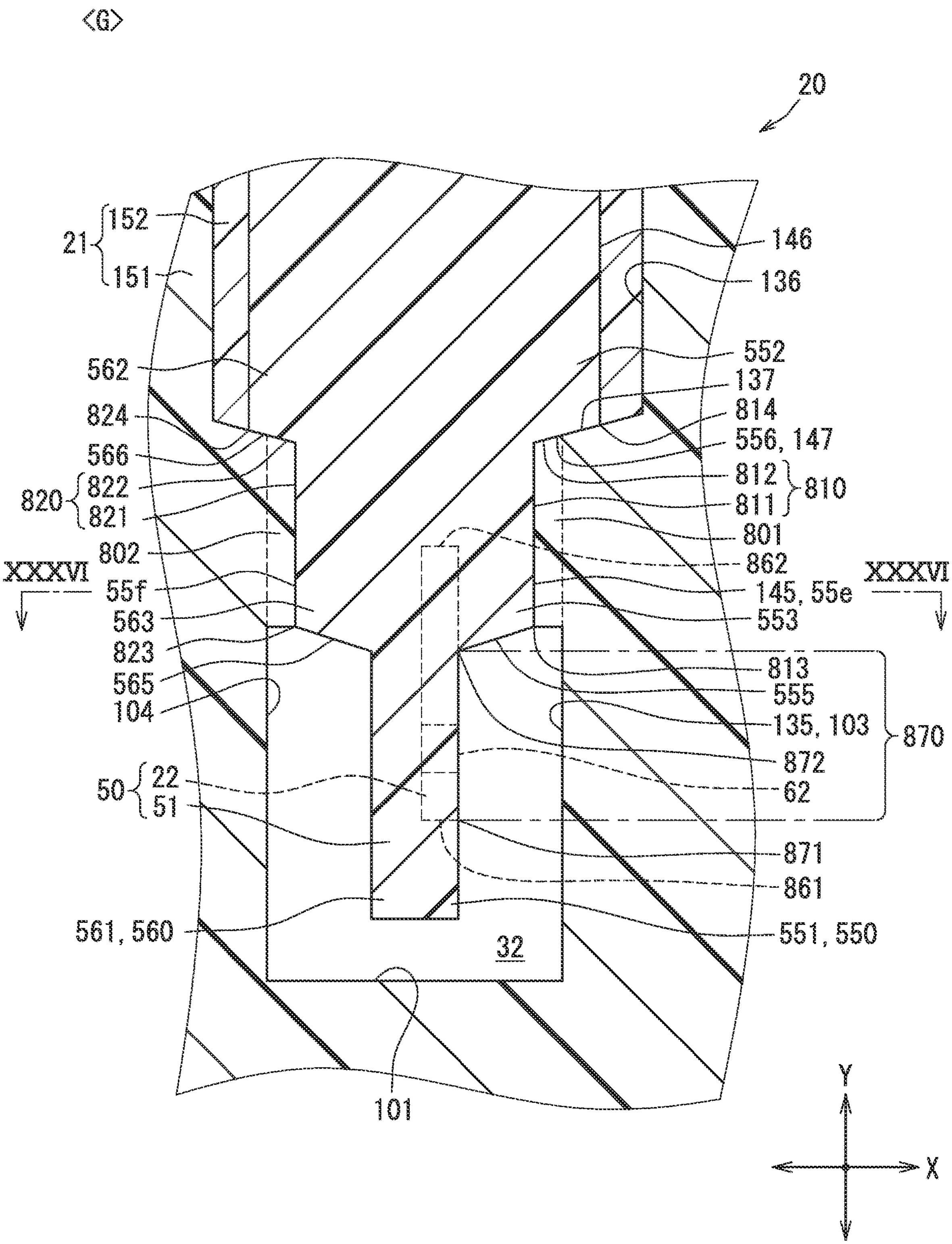
FIG. 35 is a longitudinal cross-sectional view of the air flow meter in the configuration group G, and is an enlarged view around a front rib and a back rib.
Figure 36:
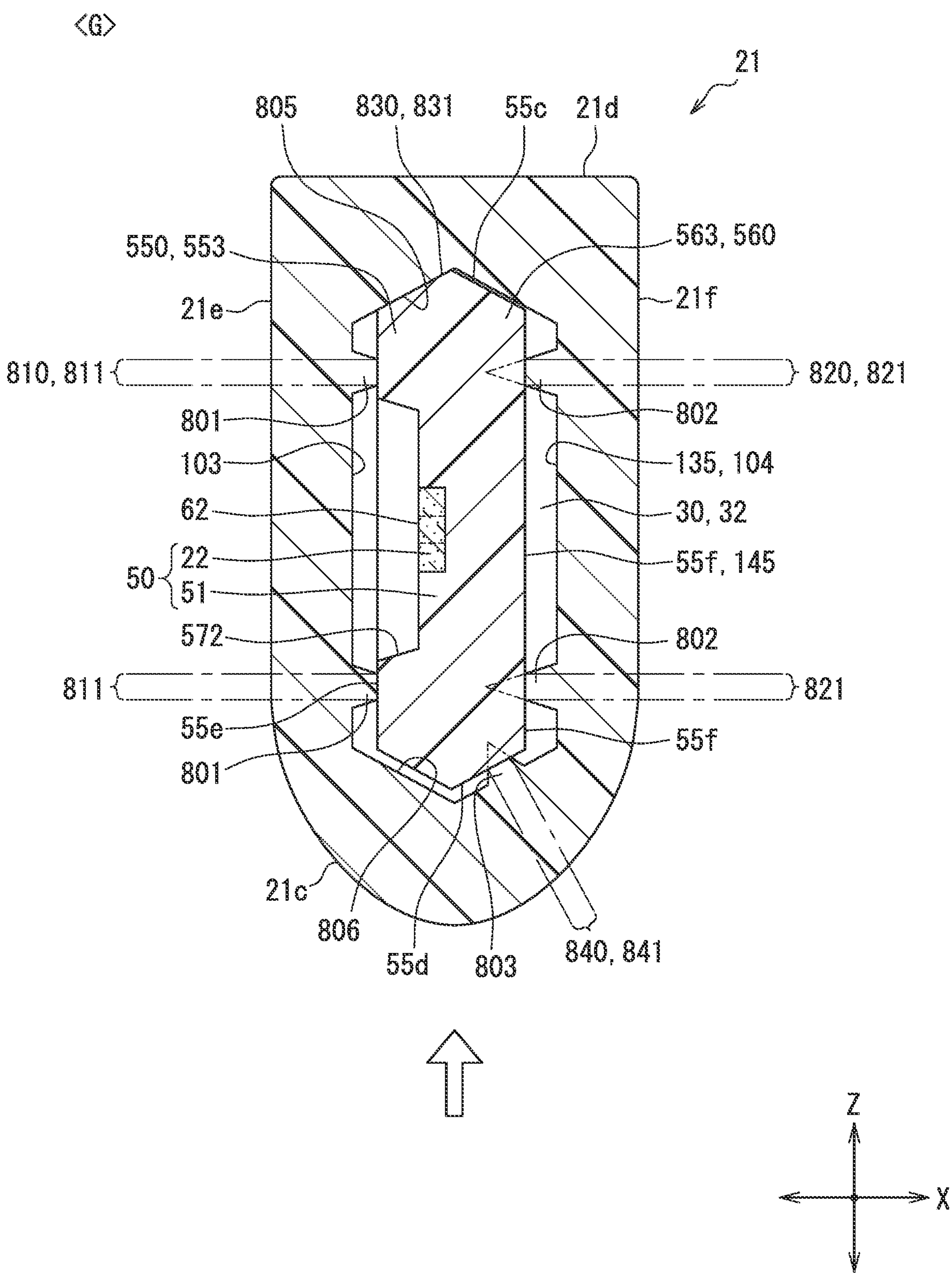
FIG. 36 is a cross-sectional view taken along a line XXXVI-XXXVI of FIG. 35.

As shown in FIGS. 35 and 36, the first housing portion 151 has ribs 801 to 803. The ribs 801 to 803 are projection portions provided on the inner surface of the first housing portion 151, and project from the inner surface of the first housing portion 151 in directions X and Z orthogonal to the height direction Y. The ribs 801 to 803 are provided at least on the housing flow path surface 135 of the inner surface of the housing 21.

The ribs 801 to 803 are elongated in the height direction Y along the housing flow path surface 135 from the housing partition portion 131 (see FIG. 17) toward the housing tip end side. Therefore, when the housing partition portion 131 is at a position separated from the boundary portion between the housing flow path surface 135 and the housing step surface 137, the ribs 801 to 803 are in a state of being stretched between the housing step surface 137 and the housing flow path surface 135. That is, the ribs 801 to 803 are provided on both the housing flow path surface 135 and the housing step surface 137. On the other hand, when the housing partition portion 131 is at the boundary portion between the housing flow path surface 135 and the housing step surface 137, the ribs 801 to 803 are provided on the housing flow path surface 135 without being provided on the housing step surface 137. In FIG. 35, the housing partition portion 131 is not illustrated, and in FIG. 36, the second housing portion 152 is not illustrated.

The housing flow path surface 135 includes the front measurement wall surface 103, the back measurement wall surface 104, an upstream measurement wall surface 805, and a downstream measurement wall surface 806. The front measurement wall surface 103 is a portion of the housing flow path surface 135 facing the housing back side, and the back measurement wall surface 104 is a portion facing the housing front side. The front measurement wall surface 103 and the back measurement wall surface 104 face each other in the width direction X with the sensor SA50 interposed therebetween. The front measurement wall surface 103 faces the mold front surface 55*e* of the sensor SA50, and the back measurement wall surface 104 faces the mold back surface 55*f* of the sensor SA50.

The upstream measurement wall surface 805 and the downstream measurement wall surface 806 are stretched to the front measurement wall surface 103 and the back measurement wall surface 104, respectively, and face each other in the depth direction Z with the sensor SA50 interposed therebetween. The upstream measurement wall surface 805 is provided on the upstream side in the measurement flow path 32 relative to the downstream measurement wall surface 806. On the housing flow path surface 135, the upstream measurement wall surface 805 faces the downstream side in the measurement flow path 32, and the downstream measurement wall surface 806 faces the upstream side in the measurement flow path 32. The upstream measurement wall surface 805 faces the mold upstream surface 55*c* of the sensor SA50, and the downstream measurement wall surface 806 faces the mold downstream surface 55*d* of the sensor SA50.

As described above, since the orientations of flow of the air are opposite between the passage flow path 31 and the detection measurement path 353, the upstream measurement wall surface 805 is provided at a position closer to the housing downstream surface 21*d* than the downstream measurement wall surface 806. In this case, the upstream measurement wall surface 805 faces the housing upstream side, and the downstream measurement wall surface 806 faces the housing downstream side.

Of the ribs 801 to 803, the front rib 801 is provided on the front measurement wall surface 103 and extends in the width direction X toward the back measurement wall surface 104. The center line of the front rib 801 extends parallel to the width direction X. The tip end portion of the front rib 801 is in contact with the front intermediate portion 553 of the sensor SA50. The tip end portion of the front rib 801 is a tip end surface extending along the mold front surface 55*e* of the sensor SA50 and overlaps the mold front surface 55*e*. A plurality of (for example, two) front ribs 801 are provided side by side in the depth direction Z. These front ribs 801 extend parallel to one another in the height direction Y. The end portion of the front rib 801 on the housing base end side is in contact with the front base step surface 556 of the sensor SA50. That is, the front rib 801 is also in contact with the front base portion 552 in addition to the front intermediate portion 553.

The back rib 802 is provided on the back measurement wall surface 104 and extends in the width direction X toward the front measurement wall surface 103. The center line of the back rib 802 extends parallel to the width direction X. The tip end portion of the back rib 802 is in contact with the back intermediate portion 563 of the sensor SA50. The tip end portion of the back rib 802 is a tip end surface extending along the mold back surface 55*f* of the sensor SA50 and overlaps the mold back surface 55*f*. A plurality of (for example, two) back ribs 802 are provided side by side in the depth direction Z. These back ribs 802 extend parallel to one another in the height direction Y. The end portion of the back rib 802 on the housing base end side is in contact with the back base step surface 566 of the sensor SA50. That is, the back rib 802 is also in contact with the back base portion 562 in addition to the back intermediate portion 563.

The downstream rib 803 is provided on the downstream measurement wall surface 806 and extends in the depth direction Z toward the upstream measurement wall surface 805. The center line of the downstream rib 803 is inclined with respect to the depth direction Z. The downstream rib 803 is provided at a position closer to the back measurement wall surface 104 than the front measurement wall surface 103 in the width direction X, and the tip end portion of the downstream rib 803 is in contact with the back intermediate portion 563 of the sensor SA50. The tip end portion of the downstream rib 803 is a tip end surface extending along the mold downstream surface 55*d* of the sensor SA50 and overlaps the mold downstream surface 55*d*. The downstream rib 803, the front rib 801, and the back rib 802 extend parallel to one another in the height direction Y. The end portion of the downstream rib 803 on the housing base end side is in contact with the back base step surface 566 of the sensor SA50. That is, the downstream rib 803 is also in contact with the back base portion 562 in addition to the back intermediate portion 563.

The length dimension in the height direction Y is substantially the same among the front rib 801, the back rib 802, and the downstream rib 803. In the height direction Y, the length dimension of the front rib 801 is substantially the same as the length dimension of the front intermediate portion 553 of the sensor SA50. The length dimension of the back rib 802 and the length dimension of the downstream rib 803 are substantially the same as the length dimension of the back intermediate portion 563 of the sensor SA50.

The first housing portion 151 supports the mold portion 55 of the sensor SA50 and corresponds to a flow path housing. In the first housing portion 151, the ribs 801 to 803, the housing partition portion 131 (see FIG. 17), and the housing step surface 137 support the sensor SA50. At the time of manufacturing the air flow meter 20, the ribs 801 to 803, the housing partition portion 131, and the housing step surface 137 fix the sensor SA50 so as to restrict displacement of the sensor SA50 with respect to the first housing portion 151 in the width direction X and the depth direction Z. The ribs 801 to 803, the housing partition portion 131, and the housing step surface 137 are in contact with the mold portion 55 of the sensor SA50. The sensor SA50 is not necessarily in contact with the housing step surface 137. Therefore, in the present embodiment, the description of the portion where the sensor SA50 is in contact with the housing step surface 137 is basically omitted.

The second housing portion 152 fills the gap between the first housing portion 151 and the sensor SA50 on the housing base end side with respect to fixed surfaces 810, 820, 830, and 840. For this reason, the second housing portion 152 restricts positional displacement of the sensor SA50 in the width direction X and the depth direction Z with respect to the first housing portion 151. The second housing portion 152 covers the sensor SA50 from the housing base end side. Therefore, the second housing portion 152 restricts the sensor SA50 from being displaced to the housing base end side in the height direction Y with respect to the first housing portion 151.

Of the outer surface of the mold portion 55, a portion fixed to the first housing portion 151 such as the ribs 801 to 803 and the housing partition portion 131 is referred to as the fixed surfaces 810, 820, 830, and 840. Each of these fixed surfaces 810, 820, 830, and 840 is in contact with the first housing portion 151 such as the ribs 801 to 803 and the housing partition portion 131. Therefore, the fixed surfaces 810, 820, 830, and 840 can also be referred to as contact surfaces.

The front fixed surface 810 of the fixed surfaces 810, 820, 830, and 840 is included in the mold front surface 55*e*, and is provided at a position separated from the mold tip end surface 55*a* toward the mold base end side. The front fixed surface 810 is fixed to the inner surface of the first housing portion 151 and corresponds to a front fixed portion. The front fixed surface 810 has a front intermediate contact surface 811 and a front step contact surface 812. The front step contact surface 812 is a portion of the front base step surface 556 of the mold front surface 55*e* in contact with the first housing portion 151, and extends in the depth direction Z. The front step contact surface 812 is in contact with the housing partition portion 131 of the first housing portion 151. The front step contact surface 812 may be in contact with the housing step surface 137.

The front intermediate contact surface 811 is a portion in contact with the first housing portion 151 in the front intermediate portion 553 on the mold front surface 55*e*, and extends in the height direction Y from the front step contact surface 812 toward the housing tip end side. The front intermediate contact surface 811 is in contact with the tip end surface of the front rib 801 of the first housing portion 151. The front intermediate contact surfaces 811 are the same in number as the front ribs 801, and these front intermediate contact surfaces 811 extend in the height direction Y in parallel with one another at positions separated in the depth direction Z.

The front fixed surface 810 has a front fixed tip end portion 813 and a front fixed base end portion 814. The front fixed base end portion 814 is an end portion of the front fixed surface 810 on the mold base end side, and is formed by the end portion of the front step contact surface 812 on the mold base end side. The front fixed tip end portion 813 is an end portion of the front fixed surface 810 on the mold tip end side, and is formed by the end portion of the front intermediate contact surface 811 on the mold tip end side. In the plurality of front intermediate contact surfaces 811, the separation distance between the end portion on the mold tip end side and the mold tip end surface 55*a* is the same, and the end portion on the mold tip end side is the front fixed tip end portion 813. Among the end portions on the mold tip end side of the plurality of front intermediate contact surfaces 811, only the end portion on the mold tip end side closest to the mold tip end surface 55*a* may be the front fixed tip end portion 813.

The front fixed tip end portion 813 is disposed at an end portion of the front measurement step surface 555 on the mold base end side. The front fixed base end portion 814 is provided between the end portion of the front base step surface 556 on the mold tip end side and the end portion thereof on the mold base end side.

The back fixed surface 820 of the fixed surfaces 810, 820, 830, and 840 is included in the mold back surface 55*f*, and is provided at a position separated from the mold tip end surface 55*a* toward the mold base end side. The back fixed surface 820 is fixed to the inner surface of the first housing portion 151 and corresponds to a back fixed portion. The back fixed surface 820 has a back intermediate contact surface 821 and a back step contact surface 822. The back step contact surface 822 is a portion of the back base step surface 566 of the mold back surface 55*f* in contact with the first housing portion 151, and extends in the depth direction Z. The back step contact surface 822 is in contact with the housing partition portion 131 of the first housing portion 151. The back step contact surface 822 may be in contact with the housing step surface 137.

The back intermediate contact surface 821 is a portion of the back intermediate portion 563 in the mold back surface 55*f* in contact with the first housing portion 151, and extends in the height direction Y from the back step contact surface 822 toward the housing tip end side. The back intermediate contact surface 821 is in contact with the tip end surface of the back rib 802 of the first housing portion 151. The back intermediate contact surfaces 821 are the same in number as the back ribs 802, and these back intermediate contact surfaces 821 extend in the height direction Y in parallel with one another at positions separated in the depth direction Z.

The back fixed surface 820 has a back fixed tip end portion 823 and a back fixed base end portion 824. The back fixed base end portion 824 is an end portion of the back fixed surface 820 on the mold base end side, and is formed by an end portion of the back step contact surface 822 on the mold base end side. The back fixed tip end portion 823 is an end portion of the back fixed surface 820 on the mold tip end side, and is formed by an end portion of the back intermediate contact surface 821 on the mold tip end side. In the plurality of back intermediate contact surfaces 821, the separation distance between the end portion on the mold tip end side and the mold tip end surface 55*a* is the same, and the end portion on the mold tip end side is the back fixed tip end portion 823. Among the end portions on the mold tip end side of the plurality of back intermediate contact surfaces 821, only the end portion on the mold tip end side closest to the mold tip end surface 55*a* may be the back fixed tip end portion 823.

The back fixed tip end portion 823 is disposed at an end portion of the back measurement step surface 565 on the mold base end side. The back fixed base end portion 824 is provided between an end portion of the back base step surface 566 on the mold tip end side and an end portion thereof on the mold base end side.

As shown in FIG. 36, the upstream fixed surface 830 of the fixed surfaces 810, 820, 830, and 840 has an upstream intermediate contact surface 831 and an upstream step contact surface 832 (see FIG. 26). The upstream step contact surface 832 is a portion in contact with the first housing portion 151 of the upstream base step surface 851 (see FIG. 26) of the mold upstream surface 55*c*, and extends in the width direction X. The upstream base step surface 851 is a part of the mold upstream surface 55*c* and is a step surface facing the mold tip end side. The upstream base step surface 851 is provided at a boundary portion between the front intermediate portion 553 and the front base portion 552 in the mold front portion 550, and is provided at a boundary portion between the back intermediate portion 563 and the back base portion 562 in the mold back portion 560. The upstream step contact surface 832 is in contact with the housing partition portion 131 of the first housing portion 151. The upstream step contact surface 832 may be in contact with the housing step surface 137.

The end portion of the upstream intermediate contact surface 831 on the mold tip end side is disposed at the end portion of the back measurement step surface 565 on the mold base end side. The end portion of the upstream intermediate contact surface 831 on the mold base end side is provided between an end portion of the back base step surface 566 on the mold tip end side and an end portion thereof on the mold base end side.

The upstream intermediate contact surface 831 is a portion in contact with the first housing portion 151 of the front intermediate portion 553 and the back intermediate portion 563 in the mold upstream surface 55*c*, and extends in the height direction Y from the upstream step contact surface 832 toward the housing tip end side. The upstream intermediate contact surface 831 is in contact with the upstream measurement wall surface 805 of the first housing portion 151.

The downstream fixed surface 840 of the fixed surfaces 810, 820, 830, and 840 has a downstream intermediate contact surface 841 and a downstream step contact surface 842 (see FIG. 26). The downstream step contact surface 842 is a portion in contact with the first housing portion 151 of the downstream base step surface 852 (see FIG. 26) of the mold downstream surface 55*d*, and extends in the width direction X. The downstream base step surface 852 is a part of the mold downstream surface 55*d* and is a step surface facing the mold tip end side. The downstream base step surface 852 is provided at a boundary portion between the front intermediate portion 553 and the front base portion 552 in the mold front portion 550, and is provided at a boundary portion between the back intermediate portion 563 and the back base portion 562 in the mold back portion 560. The downstream step contact surface 842 is in contact with the housing partition portion 131 of the first housing portion 151. The downstream step contact surface 842 may be in contact with the housing step surface 137.

The end portion of the downstream intermediate contact surface 841 on the mold tip end side is disposed at the end portion of front measurement step surface 555 on the mold base end side. An end portion of the downstream intermediate contact surface 841 on the mold base end side is provided between the end portion of the front base step surface 556 on the mold tip end side and the end portion thereof on the mold base end side.

The downstream intermediate contact surface 841 is a portion in contact with the first housing portion 151 of the front intermediate portion 553 and the back intermediate portion 563 in the mold downstream surface 55*d*, and extends in the height direction Y from the downstream step contact surface 842 toward the housing tip end side. The downstream intermediate contact surface 841 is in contact with the downstream measurement wall surface 806 of the first housing portion 151.

Figure 37:
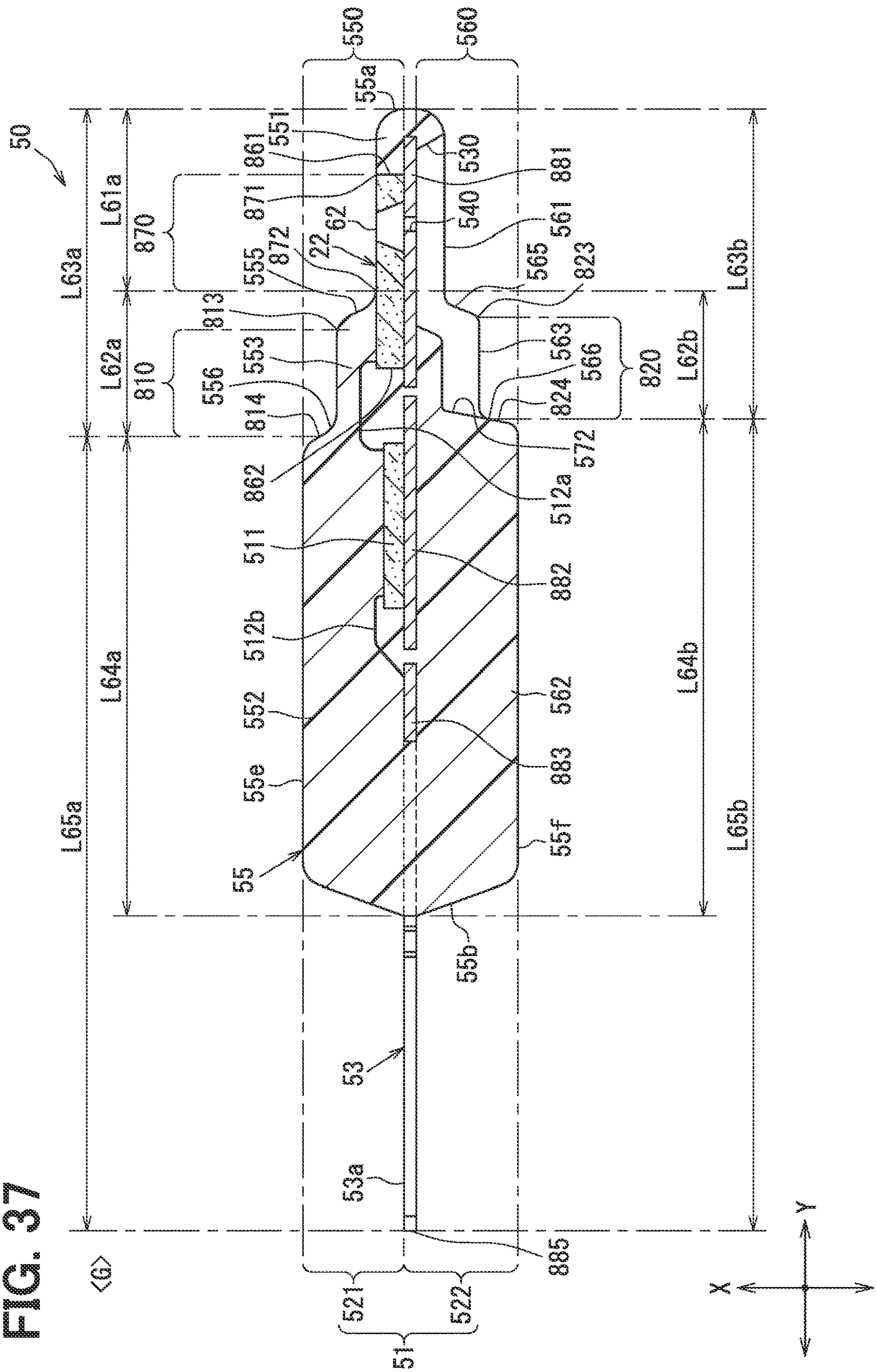
FIG. 37 is a longitudinal cross-sectional view of the sensor SA.

As shown in FIGS. 35 and 37, in the flow sensor 22, the end portion on the mold tip end side is referred to as a sensor tip end portion 861, and the end portion on the mold base end side is referred to as a sensor base end portion 862. The sensor tip end portion 861 is exposed from the front measurement portion 551 of the mold front portion 550 to the mold front side. On the other hand, the sensor base end portion 862 is in a state of being covered from the mold front side by the front intermediate portion 553 of the mold front portion 550, and is not exposed to the mold front side.

The flow sensor 22 has a sensor exposure surface 870. The sensor exposure surface 870 is a portion of the sensor front surface 22*a* exposed from the mold front surface 55*e*. The sensor exposure surface 870 extends from the end portion of the sensor front surface 22*a* on the mold tip end side toward the mold base end side. When the end portion of the sensor exposure surface 870 on the mold tip end side is referred to as an exposed tip end portion 871, the exposed tip end portion 871 is an end portion of the sensor front surface 22*a* on the mold tip end side and is included in the sensor tip end portion 861. When the end portion of the sensor exposure surface 870 on the mold base end side is referred to as an exposed base end portion 872, the exposed tip end portion 871 is provided at a position separated from the sensor base end portion 862 toward the mold tip end side due to the sensor base end portion 862 being covered with the front measurement portion 551. The exposed base end portion 872 is provided between the sensor tip end portion 861 and the sensor base end portion 862 in the height direction Y, and is disposed at a position closer to the sensor base end portion 862 than the sensor tip end portion 861.

As shown in FIG. 37, the SA substrate 53 of the sensor SA50 includes a sensor mounting portion 881, the processing mounting portion 882, and a terminal extending portion 883. The sensor mounting portion 881, the processing mounting portion 882, and the terminal extending portion 883 are all formed in a plate shape, and are provided inside the mold portion 55 with their plate surfaces facing the width direction X. The sensor mounting portion 881, the processing mounting portion 882, and the terminal extending portion 883 are arranged in directions Y and Z orthogonal to the width direction X, and are separated from one another in these directions Y and Z. A part of the sensor mounting portion 881 is exposed to the mold back side through the support recess portion 530.

The sensor mounting portion 881 is a portion on which the flow sensor 22 is mounted, and is provided between the front base step surface 556, the back base step surface 566, the upstream base step surface 851, and the downstream base step surface 852, and the mold tip end surface 55*a*. The processing mounting portion 882 is a portion on which the flow processing unit 511 is mounted, and is provided at a position across the base step surfaces 556, 566, 851, and 852 in the height direction Y. The terminal extending portion 883 is a portion extending from the lead terminal 53*a*, the upstream testing terminal 53*b*, and the downstream testing terminal 53*c*, and supports the lead terminal 53*a* and the testing terminals 53*b* and 53*c* by being embedded in the mold portion 55.

The sensor SA50 includes a bonding wire 512*a* that electrically connects the flow sensor 22 and the flow processing unit 511. The bonding wire 512*a* has one end connected to the flow sensor 22 and the other end connected to the flow processing unit 511, thereby directly connecting the flow sensor 22 and the flow processing unit 511.

The sensor SA50 includes a bonding wire 512*b* that electrically connects the flow processing unit 511 and the terminal extending portion 883. The bonding wire 512*b* has one end directly connected to the flow processing unit 511, and the other end connected to the terminal extending portion 883. Thus, the bonding wire 512*b* indirectly connects, via the terminal extending portion 883, the flow processing unit 511 and the lead terminal 53*a*, the upstream testing terminal 53*b*, and the downstream testing terminal 53*c*.

In the mold portion 55 of the sensor SA50, the front base step surface 556, the back base step surface 566, the upstream base step surface 851, and the downstream base step surface 852 are provided at positions closer to the mold tip end surface 55*a* than the mold base end surface 55*b*. As described above, in the sensor SA50, the flow sensor 22 and the flow processing unit 511 are directly connected by the bonding wire 512*a*. Therefore, in the SA substrate 53, it is not necessary to provide a relay portion that relays electrical connection between the flow sensor 22 and the flow processing unit 511. Therefore, in the sensor SA50, the separation distance between the base step surfaces 556, 566, 851, and 852 and the mold tip end surface 55*a* becomes as small as possible. In other words, the length dimension of the mold portion 55 is reduced by reducing the length dimension of the front measurement portion 551, the front intermediate portion 553, the back measurement portion 561, and the back intermediate portion 563 as much as possible in the height direction Y.

Unlike the present embodiment, for example, in the SA substrate 53, a configuration is assumed in which a relay portion is installed between the base step surfaces 556, 566, 851, and 852 and the mold tip end surface 55*a*, and the flow sensor 22 and the flow processing unit 511 are electrically connected via the relay portion. In this configuration, the separation distance between the base step surfaces 556, 566, 851, and 852 and the mold tip end surface 55*a* is increased by the amount of the relay portion as compared with the configuration without the relay portion as in the present embodiment.

At the front side of the sensor SA50, in the height direction Y, a separation distance L62*a* between the exposed base end portion 872 of the flow sensor 22 and the front fixed base end portion 814 of the mold portion 55 is smaller than a separation distance L61*a* between the exposed base end portion 872 and the mold tip end surface 55*a*. That is, the relationship of L62*a*<L61*a* is established. In this case, in the height direction Y, the exposed base end portion 872 is provided at a position closer to the front fixed base end portion 814 than the mold tip end surface 55*a*. This indicates that the front fixed surface 810 of the mold portion 55 is disposed at a position as close as possible to the front measurement step surface 555 and the mold tip end surface 55*a* in the height direction Y. The separation distance L61*a* is a separation distance between the mold tip end portion, which is a portion farthest from the exposed base end portion 872 in the mold tip end surface 55*a*, and the exposed base end portion 872.

In the height direction Y, the length dimension of the front fixed surface 810 is smaller than the separation distance L62*a* between the exposed base end portion 872 and the front fixed base end portion 814. Therefore, the length dimension of the front fixed surface 810 in the height direction Y is smaller than the separation distance L61*a* between the exposed base end portion 872 and the mold tip end surface 55*a*.

The front fixed tip end portion 813 of the mold front portion 550 is provided between the sensor base end portion 862 of the flow sensor 22 and the mold tip end surface 55*a* in the height direction Y. In this case, the front fixed tip end portion 813 is provided between the sensor tip end portion 861 and the sensor base end portion 862 in the height direction Y. In the mold front portion 550, since the front measurement step surface 555 extends from the exposed base end portion 872 toward the mold base end side, the front fixed tip end portion 813 is provided at a position separated from the exposed base end portion 872 toward the mold base end side in the height direction Y. In this case, the front fixed tip end portion 813 is between the sensor base end portion 862 and the exposed base end portion 872 in the height direction Y.

In the height direction Y, a separation distance L63*a* between the mold tip end surface 55*a* and the front fixed base end portion 814 is smaller than a separation distance L64*a* between the mold base end surface 55*b* and the front fixed base end portion 814. That is, the relationship of L63*a*<L64*a* is established. When the end portion of the lead terminal 53*a* opposite from the mold portion 55 is referred to as a lead base end portion 885, the lead base end portion 885 is an end portion of the sensor support portion 51 opposite from the mold tip end surface 55*a* and corresponds to a support base end portion. The separation distance L63*a* is smaller than the separation distance L65*a* between the lead base end portion 885 and the front fixed base end portion 814 in the height direction Y. That is, the relationship of L63*a*<L65*a* is established.

The separation distance L63*a* is the sum of the separation distances L61*a* and L62*a*, and the relationship of L63*a*=L61*a*+L62*a* is established. The separation distance L64*a* is a separation distance between the mold base end portion, which is the portion of the mold base end surface 55*b* farthest from the front fixed base end portion 814, and the front fixed base end portion 814 in the height direction Y.

On the back side of the sensor SA50, in the height direction Y, a separation distance L62*b* between the exposed base end portion 872 of the flow sensor 22 and the back fixed base end portion 824 of the mold portion 55 is smaller than the separation distance L61*a* on the front side. That is, the relationship of L62*b*<L61*a* is established. In this case, in the height direction Y, the exposed base end portion 872 is provided at a position closer to the back fixed base end portion 824 than the mold tip end surface 55*a*. This indicates that the back fixed surface 820 of the mold portion 55 is disposed at a position as close as possible to the back measurement step surface 565 and the mold tip end surface 55*a* in the height direction Y.

In the height direction Y, the length dimension of the back fixed surface 820 is smaller than the separation distance L62*b* between the exposed base end portion 872 and the back fixed base end portion 824. Therefore, the length dimension of the back fixed surface 820 in the height direction Y is smaller than the separation distance L61*a* between the exposed base end portion 872 and the mold tip end surface 55*a*.

Similarly to the front fixed tip end portion 813, the back fixed tip end portion 823 of the mold back portion 560 is provided between the sensor base end portion 862 and the mold tip end surface 55*a* in the height direction Y. The back fixed tip end portion 823 is provided at a position separated from the exposed base end portion 872 of the flow sensor 22 toward the mold base end side in the height direction Y. In this case, the back fixed tip end portion 823 is present between the sensor base end portion 862 and the exposed base end portion 872 in the height direction Y.

In the height direction Y, a separation distance L63*b* between the mold tip end surface 55*a* and the back fixed base end portion 824 is smaller than a separation distance L64*b* between the mold base end surface 55*b* and the back fixed base end portion 824. That is, the relationship of L63*b*<L64*b* is established. The separation distance L63*b* is smaller than the separation distance L65*b* between the lead base end portion 885 and the back fixed base end portion 824 in the height direction Y. That is, the relationship of L63*b*<L65*b* is established. The separation distance L63*b* is the sum of the separation distances L61*b* and L62*b*, and the relationship of L63*b*=L61*b*+L62*b* is established. The separation distance L64*b* is a separation distance between the mold base end and the back fixed base end portion 824 in the height direction Y.

In the mold portion 55, the back fixed surface 820 is provided at a position closer to the mold tip end surface 55*a* than the front fixed surface 810 in the height direction Y. Specifically, the back fixed base end portion 824 is provided at a position closer to the mold tip end surface 55*a* than the front fixed base end portion 814. Therefore, the separation distance L62*b* between the exposed base end portion 872 and the back fixed base end portion 824 is smaller than the separation distance L62*a* between the exposed base end portion 872 and the front fixed base end portion 814. That is, the relationship of L62*b*<L62*a* is established. The back fixed tip end portion 823 is provided at a position closer to the mold tip end surface 55*a* than the front fixed tip end portion 813. The fact that the relationship of L62*b*<L61*a* is established means that the relationship of L64*b*>L64*a* and the relationship of L65*b*>L65*a* are established. In the mold portion 55, the length dimension of the front fixed surface 810 and the length dimension of the back fixed surface 820 are substantially the same in the height direction Y.

On the mold upstream surface 55*c* of the mold portion 55, similarly to the mold front surface 55*e* and the mold back surface 55*f*, the exposed base end portion 872 of the flow sensor 22 is provided at a position closer to the end portion on the mold base end side of the upstream fixed surface 830 than the mold tip end surface 55*a* in the height direction Y. Also on the mold downstream surface 55*d* of the mold portion 55, the exposed base end portion 872 of the flow sensor 22 is provided at a position closer to the end portion of the mold base end side of the downstream fixed surface 840 than the mold tip end surface 55*a* in the height direction Y.

Figure 38:
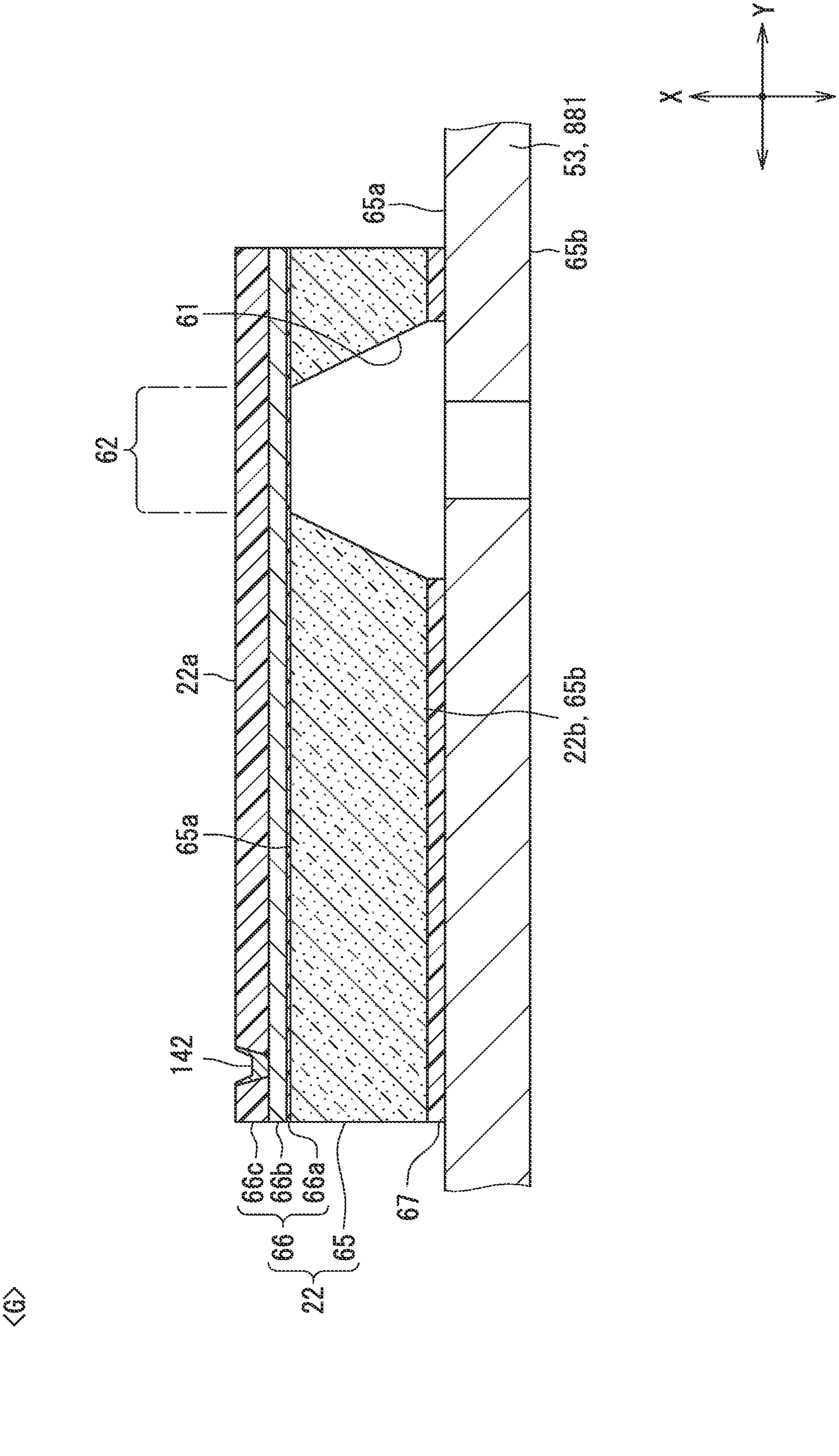
FIG. 38 is a longitudinal cross-sectional view around the flow sensor.

As shown in FIG. 38, the sensor membrane portion 66 of the flow sensor 22 includes an insulating layer 66*a*, a conductive layer 66*b*, and a protection layer 66*c*. The insulating layer 66*a*, the conductive layer 66*b*, and the protection layer 66*c* all extend along the sensor substrate front surface 65*a* of the sensor substrate 65. The insulating layer 66*a* is overlapped on the sensor substrate front surface 65*a*, the conductive layer 66*b* is overlapped on the insulating layer 66*a*, and the protection layer 66*c* is overlapped on the conductive layer 66*b*. In the flow sensor 22, the outer surface of the protection layer 66*c* is the sensor front surface 22*a*. The membrane portion 62 is formed to include the insulating layer 66*a*, the conductive layer 66*b*, and the protection layer 66*c*. The sensor recess bottom surface 501 is formed of the insulating layer 66*a*. In FIG. 38, the mold portion 55 is not illustrated.

The insulating layer 66*a* is formed in a film shape by an insulating material such as a resin material, and has an insulating property. The insulating layer 66*a* is provided between the sensor substrate 65 and the conductive layer 66*b*, and electrically insulates the sensor substrate 65 from the conductive layer 66*b*. Similar to the insulating layer 66*a*, the protection layer 66*c* is formed in a film shape of an insulating material such as a resin material, and has an insulating property. The protection layer 66*c* covers the conductive layer 66*b* and the insulating layer 66*a* to protect the conductive layer 66*b* and the insulating layer 66*a*.

The conductive layer 66*b* is formed in a film shape or a thin plate shape by a material such as a metal material, and has conductivity. The conductive layer 66*b* forms a wiring pattern of the sensor membrane portion 66. The conductive layer 66*b* is formed of, for example, platinum. In this case, the main component of the material forming the conductive layer 66*b* is platinum. The conductive layer 66*b* has a gauge factor lower than that of a conductive layer formed of a material whose main component is silicon, for example, and is less likely to be deformed in the width direction X, which is the thickness direction of the conductive layer 66*b*. The conductive layer 66*b* has a gauge factor lower than that of both the insulating layer 66*a* and the protection layer 66*c*, and is less likely to be deformed in the width direction X. Therefore, the conductive layer 66*b* restricts the sensor membrane portion 66 from being deformed in the width direction X, and as a result, restricts the sensor substrate 65 and the flow sensor 22 from being deformed in the width direction X. The conductive layer 66*b* has higher strength, hardness, and rigidity than those of a conductive layer whose main component is silicon. The width direction X corresponds to a direction orthogonal to the sensor exposure surface 870 of the flow sensor 22.

The flow sensor 22 is fixed to the SA substrate 53 by a sensor bonding portion 67. The sensor bonding portion 67 is provided between the flow sensor 22 and the SA substrate 53, and bonds the flow sensor 22 and the SA substrate 53 together. The sensor bonding portion 67 is a bonding layer provided between the sensor back surface 22*b* and the sensor substrate front surface 65*a*, and extends along the sensor back surface 22*b* and the sensor substrate front surface 65*a*. The sensor bonding portion 67 is included in the sensor SA50 and corresponds to a bonding portion. The SA substrate 53 corresponds to a support plate portion.

The sensor bonding portion 67 is formed in a film shape by solidification of the adhesive, and has an insulating property. The sensor bonding portion 67 is formed of, for example, a silicon adhesive. The silicon adhesive is an adhesive containing a silicone resin as a main component. The sensor bonding portion 67 has higher flexibility and is more easily deformed compared with, for example, a bonding portion formed of an acrylic adhesive mainly composed of an acrylic resin or a bonding portion formed of an epoxy adhesive mainly composed of an epoxy resin. The sensor bonding portion 67 has higher flexibility and is more easily deformed than the flow sensor 22. For example, when the SA substrate 53 is deformed in the width direction X, the sensor bonding portion 67 is deformed in accordance with the deformation of the SA substrate 53. Therefore, the flow sensor 22 is hardly deformed in accordance with the deformation of the SA substrate 53. In this case, by deforming along with the deformation of the SA substrate 53, the sensor bonding portion 67 restricts the deformation of the flow sensor 22. The sensor bonding portion 67 is higher in followability to deformation of the SA substrate 53 than a bonding portion formed of an acrylic adhesive or an epoxy adhesive. The fact that the sensor bonding portion 67 is easily deformed may be referred to as "having high elasticity".

In the air flow meter 20, the flow sensor 22, the mold portion 55, and the housing 21 have different thermal conductivities. Among the flow sensor 22, the mold portion 55, and the housing 21, the thermal conductivity of the flow sensor 22 is the largest, and the thermal conductivity of the housing 21 is the smallest. The thermal conductivity of the flow sensor 22 is, for example, 1.4 W/mK, the thermal conductivity of the mold portion 55 is, for example, 0.67 W/mK, and the thermal conductivity of the housing 21 is, for example, 0.25 W/mK. Therefore, among the flow sensor 22, the mold portion 55, and the housing 21, the flow sensor 22 most easily transmits heat, and the housing 21 most hardly transmits heat.

In the air flow meter 20, since the thermal conductivity of the housing 21 is as small as possible, external heat is less likely to be transmitted to the sensor SA50 via the housing 21. In the sensor SA50, since the thermal conductivity of the mold portion 55 is smaller than the thermal conductivity of the flow sensor 22, external heat is less likely to be transferred to the flow sensor 22 via the mold portion 55. Therefore, it is suppressed that the external heat is transmitted to the membrane portion 62 and the resistance thermometers 72 and 73 of the flow sensor 22 and the operation accuracy of the resistance thermometers 72 and 73 is reduced and the detection accuracy of the flow sensor 22 is reduced.

The resin material forming the mold portion 55 of the sensor SA is a thermosetting resin as described above and is a material containing a glass epoxy resin. In the air flow meter 20, the mold portion 55 and the housing 21 have different linear expansion coefficients. The linear expansion coefficient of the mold portion 55 is smaller than the linear expansion coefficient of the housing 21. The linear expansion coefficient of the mold portion 55 is, for example, 15 ppm, and the linear expansion coefficient of the housing 21 is, for example, 50 ppm. Therefore, the mold portion 55 is less likely to be thermally deformed than the housing 21.

In the air flow meter 20, since the linear expansion coefficient of the mold portion 55 is as small as possible, the mold portion 55 is less likely to be deformed by heat. Therefore, even if external heat is applied to the mold portion 55, the mold portion 55 is less likely to be deformed. Therefore, it is suppressed that the flow sensor 22 is deformed along with the deformation of the mold portion 55, the heat resistance element 71 and the resistance thermometers 72 and 73 of the membrane portion 62 are deformed, the operation accuracy of these resistance elements 71 to 73 is lowered, and the detection accuracy of the flow sensor 22 is lowered.

In the mold portion 55 shown in FIG. 37, the volume of the mold front portion 550 and the volume of the mold back portion 560 are substantially the same. In the manufacturing process of the sensor SA50, when the molten resin is press-fitted into the SA mold device 580, the pressure of the molten resin filled on the front side of the SA substrate 53 inside the SA mold device 580 and the pressure of the molten resin filled on the back side of the SA substrate 53 are easily equalized. Therefore, it is suppressed that at the time of resin molding of the mold portion 55, the filling state of the molten resin inside the SA mold device 580 does not become appropriate, and an unintended recess portion or the like is generated in the mold portion 55.

Unlike the present embodiment, for example, when a mold portion in which the volume of the mold front portion is significantly larger than the volume of the mold back portion is molded with resin, there is a concern that the pressure of the molten resin for forming the mold front portion having a large volume unintentionally decreases in the SA mold device. In this case, the filling state of the molten resin does not become appropriate on the front side of the SA substrate 53, and an unintended recess portion or the like is likely to occur in the mold front portion.

In the mold portion 55, the shape and size of the mold front portion 550 and the shape and size of the mold back portion 560 are substantially the same as a whole. For example, in the width direction X, as described above, the front measurement portion 551 and the back measurement portion 561 have the same or substantially the same thickness dimension, and the front base portion 552 and the back base portion 562 have the same or substantially the same thickness dimension.

In the width direction X, the front intermediate portion 553 and the back intermediate portion 563 have the same or substantially the same thickness dimension. As described above, the back intermediate portion 563 is provided with the intermediate recess portion 572, and the volume of the mold back portion 560 is reduced by the amount of the intermediate recess portion 572. On the other hand, as described above, the back base step surface 566 is disposed at a position closer to the mold tip end surface 55*a* than the front base step surface 556 so that the relationship of L62*b*<L61*a* is established. Therefore, the length dimension of the back base portion 562 is larger than the length dimension of the front base portion 552 in the height direction Y, and the volume of the mold back portion 560 is larger by the length of the back base portion 562 longer than the front base portion 552. As described above, since the volume of the back base portion 562 is increased by the smallness in volume of the back intermediate portion 563, even if the intermediate recess portion 572 is present in the back intermediate portion 563, the volumes of the mold front portion 550 and the mold back portion 560 are equalized.

Next, a process of assembling the sensor SA50 to the first housing portion 151 in the manufacturing process of the air flow meter 20 will be described with reference to FIGS. 35, 39, 40, and the like.

Figure 39:
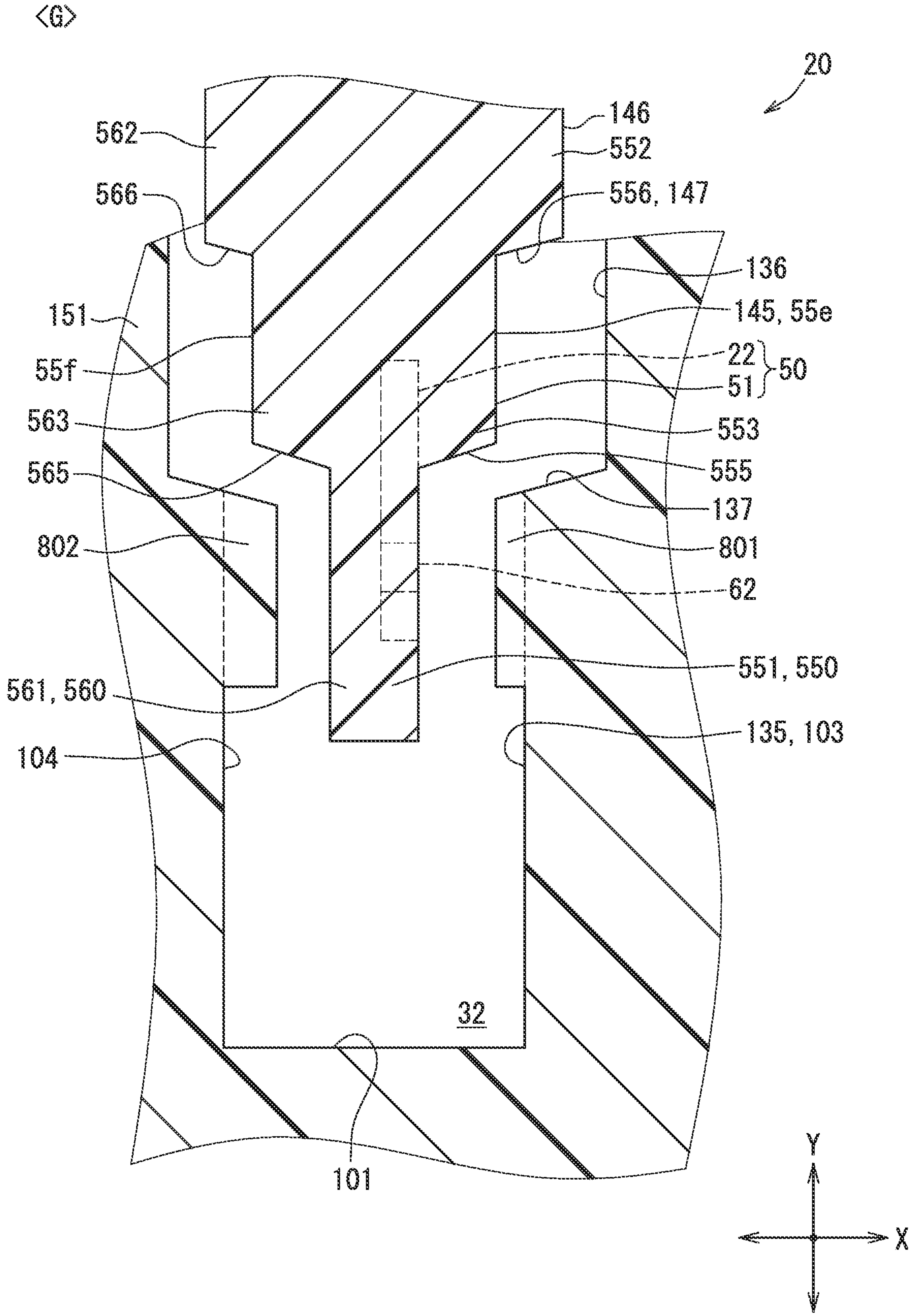
FIG. 39 is a view showing a state before the sensor SA is attached to a first housing portion.

In the process of assembling the sensor SA50 to the first housing portion 151, as shown in FIGS. 18 and 39, the sensor SA50 is inserted into the first housing portion 151 from the housing opening portion 151*a* (see FIG. 19). Here, the position of the sensor SA50 with respect to the first housing portion 151 is adjusted with reference to the tip end surface of the front rib 801 in the width direction X and with reference to the upstream measurement wall surface 805 in the depth direction Z of the inner surface of the first housing portion 151. In this case, in the front intermediate portion 553 of the sensor SA50, the mold front surface 55*e* is overlapped on the tip end surface of the front rib 801, and the mold upstream surface 55*c* is overlapped on the upstream measurement wall surface 805.

In the first housing portion 151 before the sensor SA50 is assembled, as indicated by a two-dot chain line in FIG. 36, the projection dimensions of the back rib 802 and the downstream rib 803 are larger than those after the sensor SA50 is assembled. Before the sensor SA50 is assembled, the back rib 802 and the downstream rib 803 have a top portion and have a tapered cross section. Therefore, as shown in FIG. 39, when the sensor SA50 is inserted into the first housing portion 151, the back measurement step surface 565 of the sensor SA50 is caught on the tip end portion of the back rib 802 and the tip end portion of the downstream rib 803 from the housing base end side.

Figure 40:
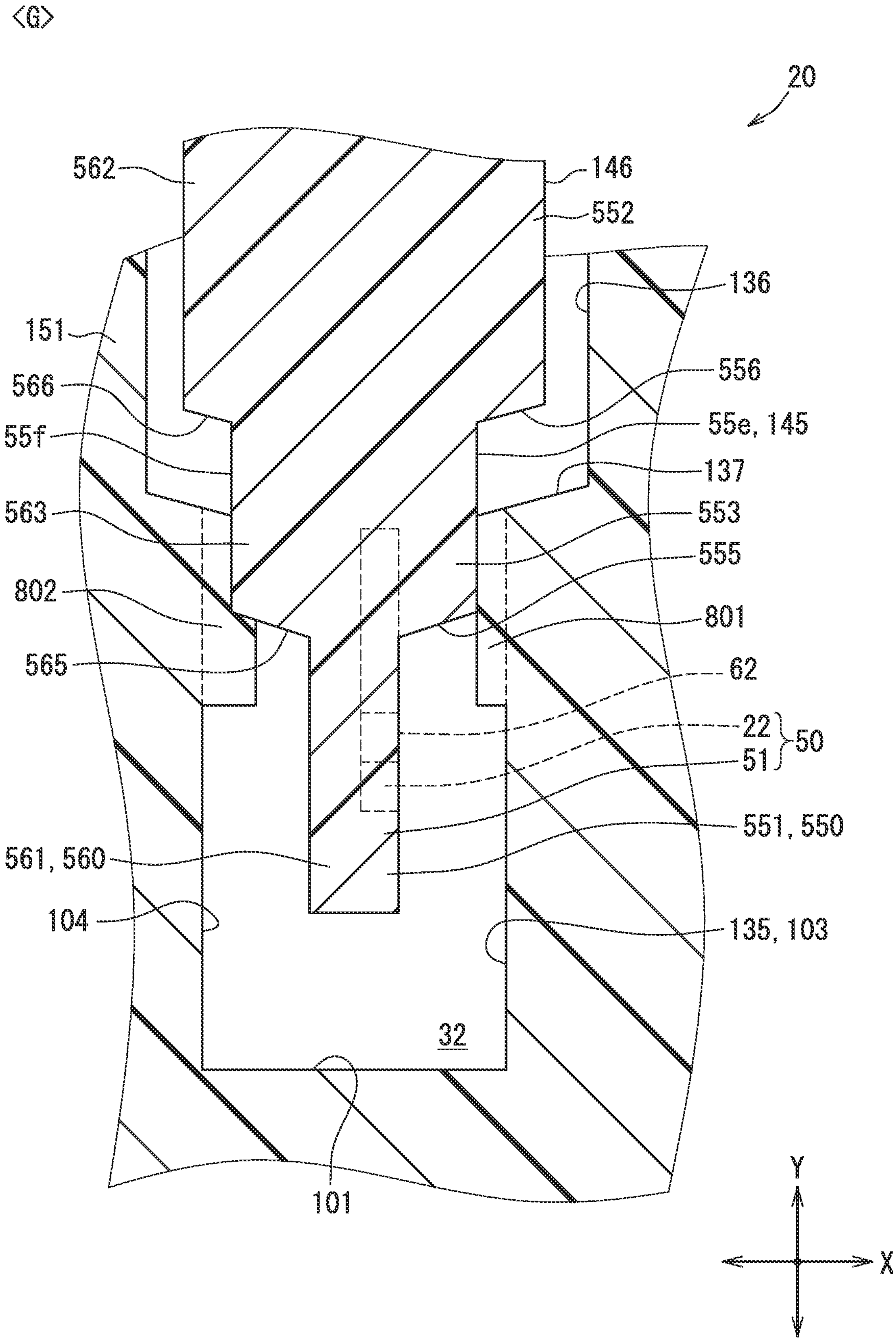
FIG. 40 is a view showing a state in the middle of attaching the sensor SA to the first housing portion.

Even when the sensor SA50 is caught by the back rib 802 and the downstream rib 803 as described above, the sensor SA50 is further inserted toward the depth side of the inside of the first housing portion 151 as shown in FIG. 40. In this case, as described above, since the hardness and rigidity of the first housing portion 151 are lower than the hardness and rigidity of the mold portion 55, the back rib 802 and the downstream rib 803 are deformed such that the tip end portion of each of them is crushed by the back measurement step surface 565 of the sensor SA50. In the back rib 802 and the downstream rib 803, the tip end portion of each of them is crushed, so that the newly formed tip end surface easily comes into close contact with the mold back surface 55*f* of the back intermediate portion 563.

As shown in FIG. 35, the worker pushes the sensor SA50 into the first housing portion 151 until the SA step surface 147 comes into close contact with the housing partition portion 131 and the housing step surface 137. In this state, the ribs 801 to 803 restrict that the sensor SA50 is displaced in the directions X and Z orthogonal to the height direction Y inside the first housing portion 151. In the width direction X, the sensor SA50 is interposed between the front rib 801 and the back rib 802, and the position of the sensor SA50 is held by the front rib 801 and the back rib 802. In the depth direction Z, the sensor SA50 is interposed between the downstream rib 803 and the upstream measurement wall surface 805, and the position of the sensor SA50 is held by the downstream rib 803 and the upstream measurement wall surface 805.

As described above, the portion of the outer surface of the sensor SA50 in contact with the ribs 801 to 803, the upstream measurement wall surface 805, the housing partition portion 131, and the housing step surface 137 has become the fixed surfaces 810, 820, 830, and 840.

In the present embodiment described so far, at the time of manufacturing the air flow meter 20, there is a concern that the attitude of the sensor SA50 with respect to the first housing portion 151 is shifted from the design attitude in a state where the sensor SA50 is inserted into the first housing portion 151. For example, the attitude of the sensor SA50 is shifted when the front fixed surface 810 of the sensor support portion 51 serves as a fulcrum and the sensor SA50 rotates with respect to the first housing portion 151 such that the mold tip end surface 55*a* moves in the width direction X and the depth direction Z. In this case, the membrane portion 62 is displaced in the width direction X and the depth direction Z, the operation accuracy of the resistance thermometers 72 and 73 decreases, and the detection accuracy of the flow sensor 22 tends to decrease.

On the other hand, the separation distance L62*a* between the exposed base end portion 872 of the flow sensor 22 and the front fixed base end portion 814 of the sensor support portion 51 is smaller than the separation distance L61*a* between the exposed base end portion 872 and the mold tip end surface 55*a*. In this configuration, in the sensor SA50, the exposed base end portion 872 is provided at a position closer to the front fixed base end portion 814 than the mold tip end surface 55*a*. Therefore, even if the front fixed surface 810 of the sensor support portion 51 serves as a fulcrum of the rotation of the sensor SA50 with respect to the first housing portion 151, the turning radius from the fulcrum to the flow sensor 22 or the membrane portion 62 can be minimized. In this case, since the positional displacement of the flow sensor 22 and the membrane portion 62 due to the displacement of the attitude of the sensor SA50 is less likely to increase, it is possible to suppress a decrease in the detection accuracy of the flow sensor 22. Therefore, the measurement accuracy of the air flow meter 20 can be enhanced.

According to the present embodiment, in the height direction Y, the front fixed tip end portion 813 of the sensor SA50 is provided between the sensor tip end portion 861 and the sensor base end portion 862 of the flow sensor 22. In this configuration, the front fixed tip end portion 813 overlaps the flow sensor 22 in the directions X and Z orthogonal to the height direction Y. Therefore, at the time of manufacturing the air flow meter 20, even if the front fixed surface 810 serves as a fulcrum of the rotation of the sensor SA50, this fulcrum and the flow sensor 22 overlap in the width direction X. Therefore, even if the attitude of the flow sensor 22 with respect to the first housing portion 151 is shifted, the shift can be reduced as much as possible.

In the present embodiment, at the time of manufacturing the air flow meter 20, even in a case where not the front fixed surface 810 of the sensor support portion 51 but the back fixed surface 820 serves as a fulcrum, when the sensor SA50 rotates with respect to the first housing portion 151, the attitude of the sensor SA50 is shifted.

On the other hand, according to the present embodiment, the separation distance L62*b* between the exposed base end portion 872 of the flow sensor 22 and the back fixed base end portion 824 of the sensor support portion 51 is smaller than the separation distance L61*a* between the exposed base end portion 872 and the mold tip end surface 55*a*. In this configuration, in the sensor SA50, also on the mold back side in addition to the mold front side of the sensor support portion 51, the exposed base end portion 872 is provided at a position closer to the back fixed base end portion 824 than the mold tip end surface 55*a*. Therefore, even if the back fixed surface 820 of the sensor support portion 51 serves as a fulcrum of the rotation of the sensor SA50, the turning radius from this fulcrum to the flow sensor 22 and the membrane portion 62 can be reduced as much as possible. As described above, even when the back fixed surface 820 serves as a fulcrum of the rotation of the sensor SA50, the displacement of the flow sensor 22 and the membrane portion 62 due to the displacement of the attitude of the sensor SA50 is less likely to increase, so that the detection accuracy of the flow sensor 22 can be suppressed from deteriorating.

According to the present embodiment, in the sensor support portion 51, the front fixed base end portion 814 and the back fixed base end portion 824 have different separation distances from the exposed base end portion 872 of the flow sensor 22. That is, the separation distance L62*a* between the exposed base end portion 872 and the front fixed base end portion 814 and the separation distance L62*b* between the exposed base end portion 872 and the back fixed base end portion 824 are different from each other. In this configuration, in the manufacturing process of the air flow meter 20, the orientation in which the attitude of the sensor SA50 is shifted with respect to the first housing portion 151 can be managed.

For example, according to the relationship of L62*b*<L62*a* in the present embodiment, the front fixed base end portion 814 is disposed at a position closer to the flow sensor 22 than the back fixed base end portion 824 in the height direction Y. Therefore, in the sensor support portion 51, from the viewpoint that the shift of the attitude of the sensor SA50 tends to be smaller on the mold front side than on the mold back side, processing such as correction for the detection result of the flow sensor 22 can be performed in accordance with the attitude of the sensor SA50. Therefore, the measurement accuracy of the flow rate by the air flow meter 20 can be enhanced.

In the present embodiment, when the mold portion 55 is molded with resin in the manufacturing process of the sensor SA50, there is a concern that the mold portion 55 is unintentionally deformed due to a difference in pressure of the molten resin between the front side and the back side of the SA substrate 53 inside the SA mold device 580. As unintended deformation of the mold portion 55, for example, it is conceivable that the mold portion 55 is sagged or bent in the width direction X.

On the other hand, according to the present embodiment, in the sensor support portion 51, the separation distance of the flow sensor 22 to the exposed base end portion 872 is different between the front fixed base end portion 814 and the back fixed base end portion 824. In this configuration, in the mold portion 55 of the sensor support portion 51, the total volume of the front measurement portion 551 and the front intermediate portion 553 and the total volume of the back measurement portion 561 and the back intermediate portion 563 are likely to be different. Therefore, when the mold portion 55 is molded with resin in the manufacturing process of the air flow meter 20, it is possible to manage a mode in which the mold portion 55 is deformed in the width direction X.

For example, according to the relationship of L62*b*<L62*a* in the present embodiment, the total volume of the back measurement portion 561 and the back intermediate portion 563 tends to be smaller than the total volume of the front measurement portion 551 and the front intermediate portion 553. In the mold portion 55, the volume of the portion present between the back fixed base end portion 824 and the flow sensor 22 tends to be smaller than the volume of the portion present between the front fixed base end portion 814 and the flow sensor 22. Therefore, since the mold portion 55 is easily deformed toward one of the mold front side and the mold back side, the deformation of the membrane portion 62 and the resistance elements 71 to 73 due to the deformation of the mold portion 55 is easily limited to one of expansion and contraction. Therefore, the error of the detection result of the flow sensor 22 with respect to the true value is easily limited to one of positive and negative, and as a result, it is possible to appropriately perform processing for enhancing measurement accuracy such as correction for the detection result of the flow sensor 22.

According to the present embodiment, the conductive layer 66*b* restricts deformation of the flow sensor 22 in the width direction X. Therefore, even if deformation such as thermal deformation occurs in the mold portion 55 at the time of manufacturing or after manufacturing the air flow meter 20, the conductive layer 66*b* can restrict that the flow sensor 22 is deformed along with the deformation of the mold portion 55. Therefore, the conductive layer 66*b* can suppress that the detection accuracy of the flow sensor 22 deteriorates due to deformation of the membrane portion 62 and the resistance elements 71 to 73.

According to the present embodiment, since the conductive layer 66*b* is formed of platinum, a configuration in which the conductive layer 66*b* is hardly deformed can be achieved. Therefore, it is possible to suppress the flow sensor 22 from being unintentionally deformed by changing the material forming the conductive layer 66*b* without changing the design such as significantly changing the structure of the flow sensor 22 such as the shape and size of the conductive layer 66*b*.

According to the present embodiment, in the sensor SA50, the sensor bonding portion 67 is deformed along with the deformation of the SA substrate 53, so that the deformation of the flow sensor 22 is restricted by the sensor bonding portion 67. Therefore, even if the SA substrate 53 is deformed due to deformation such as thermal deformation in the mold portion 55 at the time of manufacturing or after manufacturing the air flow meter 20, the sensor bonding portion 67 can restrict that the flow sensor 22 is deformed due to deformation of the SA substrate 53. Therefore, the sensor bonding portion 67 can suppress a decrease in detection accuracy of the flow sensor 22 due to deformation of the membrane portion 62 and the resistance elements 71 to 73.

According to the present embodiment, since the sensor bonding portion 67 is formed to contain silicon resin, it is possible to achieve a configuration in which the sensor bonding portion 67 is easily deformed in accordance with the deformation of the SA substrate 53. Therefore, it is possible to suppress the flow sensor 22 from being unintentionally deformed by changing the material forming the sensor bonding portion 67 without changing the design such as significantly changing the structure of the sensor SA50 such as the positional relationship between the SA substrate 53 and the flow sensor 22.

<Description of Configuration Group H>

As shown in FIG. 3, the housing 21 has the flange holes 611 and 612. The flange holes 611 and 612 are through holes provided in the flange portion 27 and penetrating the flange portion 27 in the height direction Y. The flange holes 611 and 612 are provided at positions separated from each other in each of the width direction X and the depth direction Z. In the width direction X, the passage flow path 31 is disposed between these flange holes 611 and 612. Of the flange holes 611 and 612, the first flange hole 611 is provided between the connector portion 28 and the passage flow path 31 in the width direction X, and the second flange hole 612 is provided on the side opposite from the first flange hole 611 with the passage flow path 31 interposed therebetween in the width direction X.

Assuming a flange hole line CL61 as a linear imaginary line passing through a center CO61 of the first flange hole 611 and a center CO62 of the second flange hole 612, this flange hole line CL61 overlaps the passage entrance 33 of the passage flow path 31. In other words, the passage entrance 33 is provided between the first flange hole 611 and the second flange hole 612 in plan view when the air flow meter 20 is viewed from the housing base end side. The center line of the screw inserted into the flange holes 611 and 612 extends in the height direction Y and passes through the centers CO61 and CO62 of the flange holes 611 and 612.

When the housing 21 is fixed to the pipe boss 14*d* with a screw, it is assumed that the center line of the screw shifts from the centers CO61 and CO62 of the flange holes 611 and 612 due to displacement of the screw with respect to the flange holes 611 and 612. In this case, the housing 21 is displaced in the width direction X and the depth direction Z about the screw, but the portion of the housing 21 overlapping the flange hole line CL61 in plan view is less likely to be displaced in the width direction X and the depth direction Z than other portions. As described above, since a part of the passage entrance 33 overlaps the flange hole line CL61 in plan view, the displacement of the passage entrance 33 is less likely to occur in the intake passage 12. Therefore, the product error is less likely to occur in the position of the passage entrance 33 in the intake passage 12, and it is possible to suppress the ease of air flowing into the passage entrance 33 in the intake passage 12 from varying depending on the products. Accordingly, the measurement accuracy of the flow rate by the air flow meter 20 can be enhanced.

The passage entrance 33 is preferably disposed at the center or a position close to the center of the intake passage 12 in the directions X and Y orthogonal to the depth direction Z. This is because the center of the intake passage 12 is at a position where the flow rate and the flow velocity are likely to become maximized and the flow of air is likely to be the most stable.

The flange holes 611 and 612 are not provided with a metal bush. In this configuration, the screw easily comes into direct contact with the portion forming the flange holes 611 and 612 in the flange portion 27. The flange holes 611 and 612 may be provided with a metal bush. In this configuration, the screw is more likely to come into contact with the bush than the portion forming the flange holes 611 and 612 in the flange portion 27.

Figure 41:
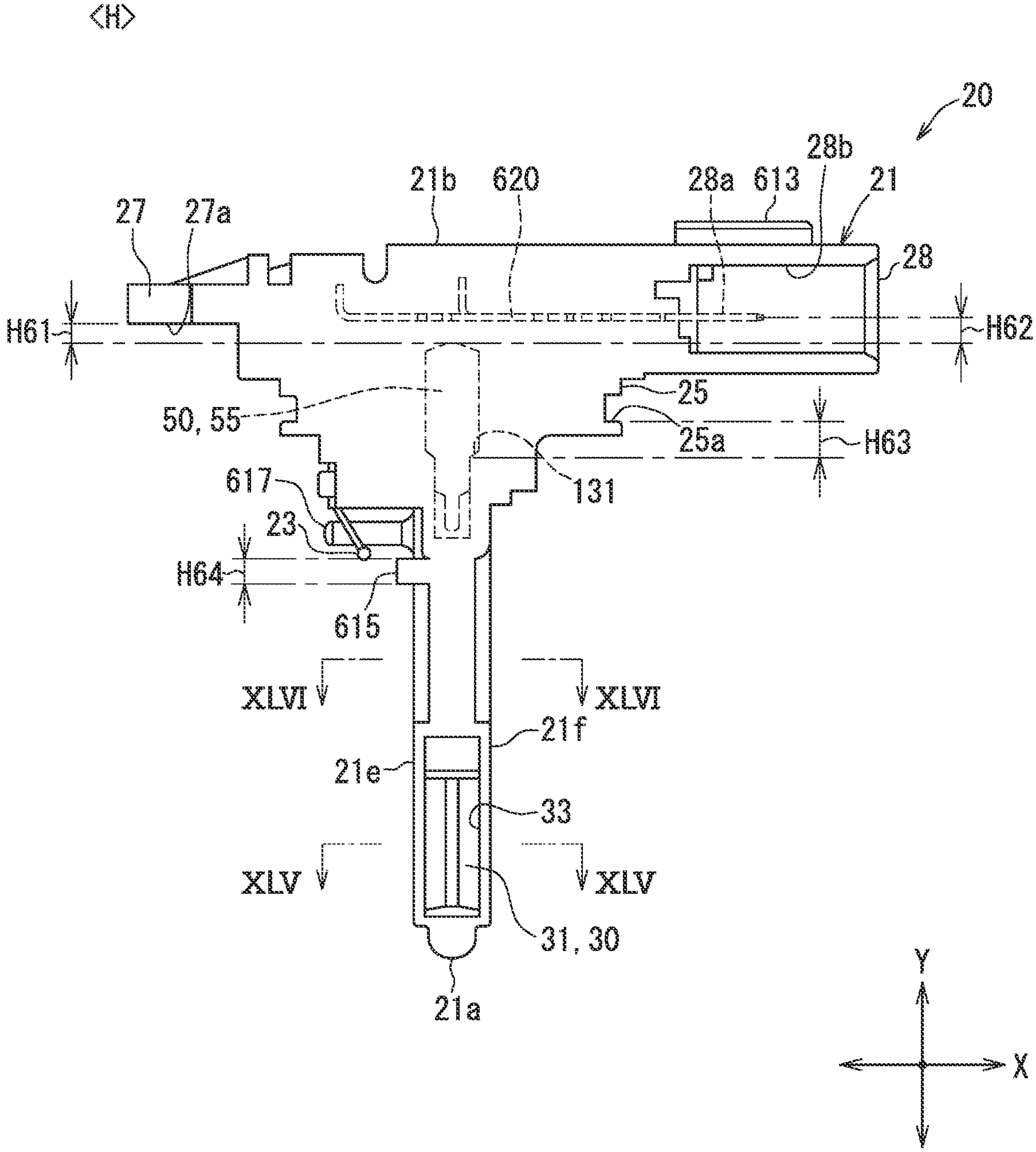
FIG. 41 is a schematic front view of the air flow meter in the configuration group H.

As shown in FIG. 41, the housing 21 includes a connector guide portion 613. The connector guide portion 613 is provided on the outer surface of the connector portion 28 and extends in the opening direction of the connector portion 28. The connector guide portion 613 is a portion that guides the position of the plug portion with respect to the connector portion 28 and guides the insertion direction of the plug portion when the plug portion is mounted to the connector portion 28. The connector guide portion 613 is a portion provided, for example, in a portion forming the housing base end surface 21*b* of the connector portion 28, and projecting most toward the housing base end side in the housing 21.

Figure 5:
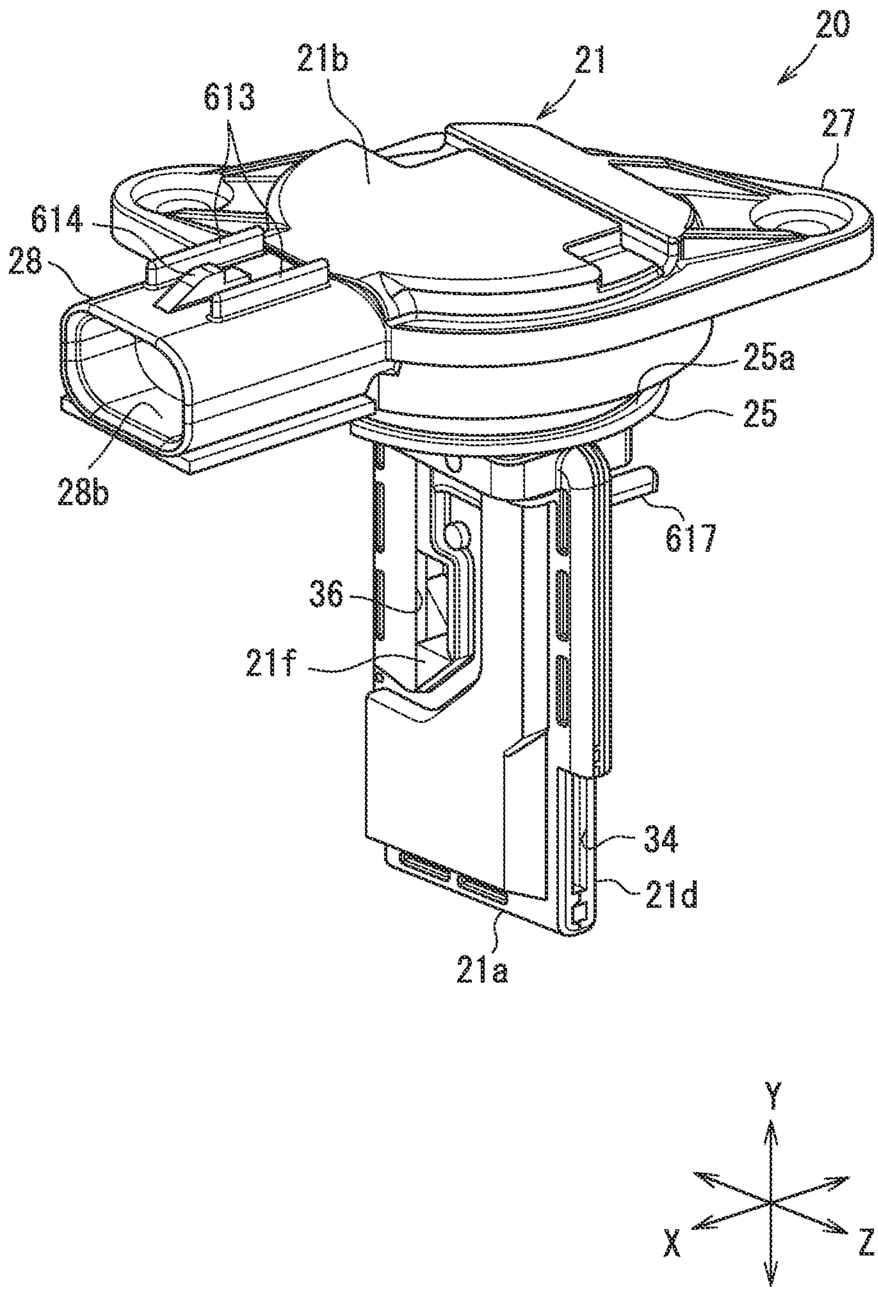
FIG. 5 is a perspective view of the air flow meter as viewed from a passage exit side.
Figure 6:
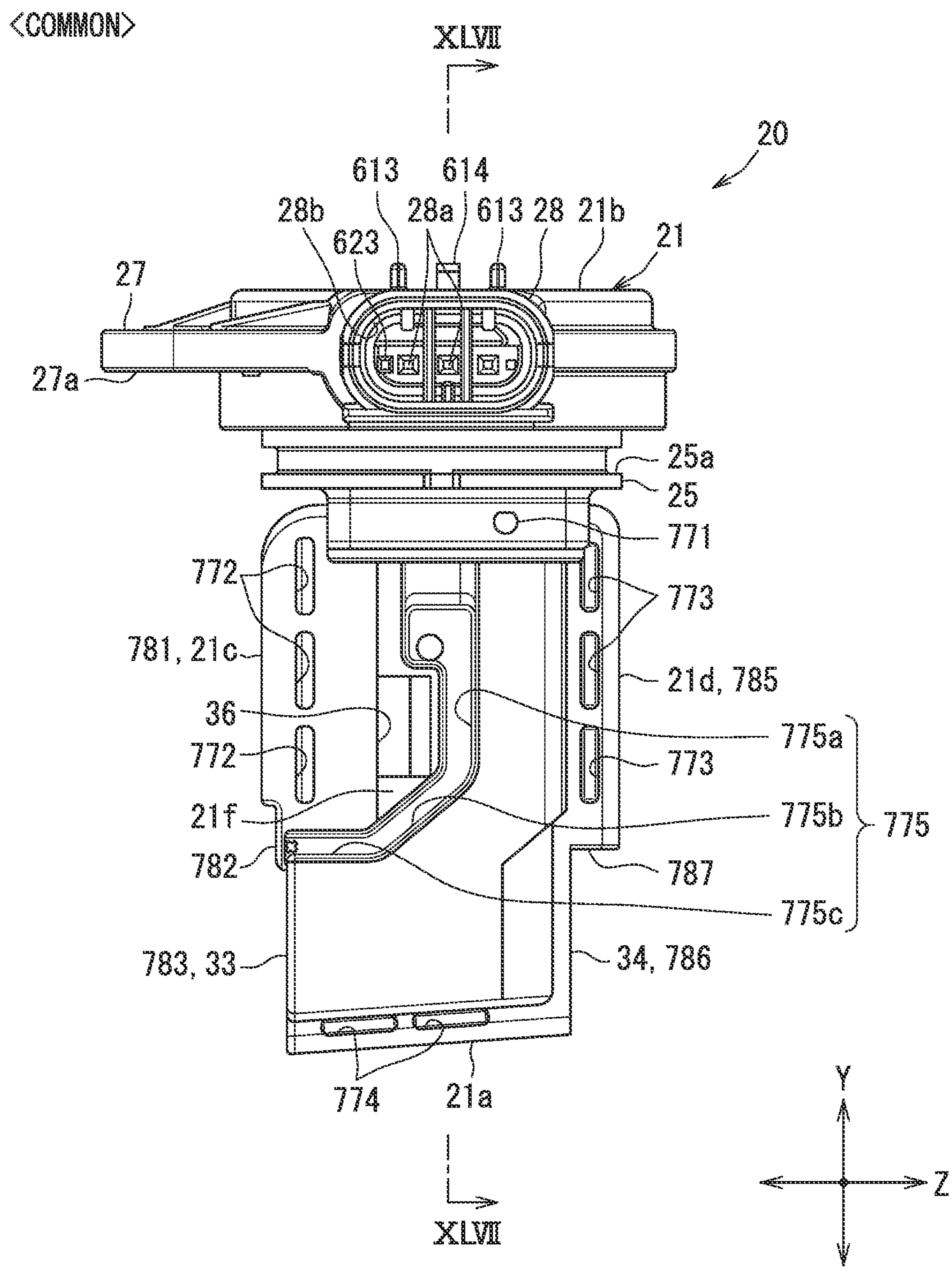
FIG. 6 is a side view of the air flow meter as viewed from a connector portion side.

As shown in FIGS. 3, 4, and 5, the housing 21 includes a connector engagement portion 614 in addition to the connector guide portion 613. Similarly to the connector guide portion 613, the connector engagement portion 614 is provided on the outer surface of the connector portion 28. The connector engagement portion 614 is a disengagement restriction portion that restricts disengagement of the plug portion from the connector portion 28 in a state where the plug portion is mounted to the connector portion 28. The connector engagement portion 614 can also be referred to as a retaining portion. Similarly to the connector guide portion 613, the connector engagement portion 614 is provided, for example, in a portion forming the housing base end surface 21*b* in the connector portion 28. As shown in FIGS. 6 and 7, two connector guide portions 613 are provided side by side in the width direction X, and the connector engagement portion 614 is provided between these connector guide portions 613. Each connector guide portion 613 and the connector engagement portion 614 extend in parallel to each other in the depth direction Z.

As shown in FIG. 41, the housing 21 has a connector recess portion 28*b*. The connector recess portion 28*b* is a recess portion provided on the tip end surface of the connector portion 28. In the housing 21, the connector portion 28 extends from the flange portion 27 in the width direction X, and the connector recess portion 28*b* extends from the tip end surface of the connector portion 28 toward the flange portion 27 in the width direction X. The connector terminal 28*a* extends in the width direction X from the bottom surface of the connector recess portion 28*b*. In this case, at least the tip end portion of the connector terminal 28*a* is disposed inside the connector recess portion 28*b*. In a state where the plug portion is mounted to the connector portion 28, at least a part of the plug portion enters the connector recess portion 28*b*.

The angle setting surface 27*a* of the flange portion 27 is provided on the housing base end side relative to the mold portion 55 of the sensor SA50 in the height direction Y. In this configuration, even if the flange portion 27 is deformed due to the angle setting surface 27*a* being caught on the pipe boss 14*d*, the position of the mold portion 55 is less likely to unintentionally change due to this deformation. Therefore, it is possible to suppress unintentional change of the flow sensor 22 in the measurement flow path 32.

The connector terminal 28*a* of the connector portion 28 is provided on the housing base end side relative to the mold portion 55 of the sensor SA50 in the height direction Y. In this configuration, even if the connector terminal 28*a* is deformed due to the plug terminal being connected to the connector terminal 28*a* as the plug portion is mounted to the connector portion 28, the position of the mold portion 55 is less likely to unintentionally change due to this deformation.

The connector terminal 28*a* is provided on the housing base end side relative to the angle setting surface 27*a* in the height direction Y. In this case, a separation distance H62 between the connector terminal 28*a* and the mold portion 55 in the height direction Y is larger than a separation distance H61 between the angle setting surface 27*a* and the mold portion 55 in the height direction Y. The connector terminal 28*a* may not be provided on the housing base end side with respect to the angle setting surface 27*a*.

In the housing 21, the connector portion 28 and the flange portion 27 are provided side by side in the directions X and Z orthogonal to the height direction Y. The end portion of the connector portion 28 on the housing base end side is provided on the housing base end side relative to an end portion of the flange portion 27 on the housing base end side. On the other hand, the end portion of the connector portion 28 on the housing tip end side is provided on the housing tip end side relative to the end portion of the flange portion 27 on the housing tip end side. As described above, since the connector portion 28 is arranged in the width direction X and the depth direction Z with the flange portion 27, the height dimension of the protruding portion 20*b* in the height direction Y is less likely to be increased by the flange portion 27. With this configuration, in a vehicle in which the air flow meter 20 is accommodated in an engine room or the like together with the intake pipe 14*a* or the like, it is possible to appropriately secure a separation distance between the air flow meter 20 and a vehicle body inside the vehicle body. Therefore, for example, even if a part of the vehicle body such as the hood is deformed to be recessed due to contact of another vehicle or the like with this vehicle, it is possible to suppress the deformed portion from coming into contact with the air flow meter 20.

The holding groove portion 25*a* of the seal holding portion 25 is provided on the housing base end side relative to the housing partition portion 131 of the housing 21. In this configuration, even if the holding groove portion 25*a* is deformed due to the seal member 26 being in close contact with both the inner surface of the holding groove portion 25*a* and the inner surface of the pipe flange 14*c*, the housing partition portion 131 is less likely to be unintentionally deformed due to this deformation. Therefore, it is possible to suppress unintentional release of the state in which the housing partition portion 131 partitions the SA accommodation region 150 and the measurement flow path 32.

The housing 21 has a tip end protection projection portion 615, an upstream protection projection portion 616, and a downstream protection projection portion 617. Each of these protection projection portions 615 to 617 is a projection portion provided on the housing back surface 21*f*. The tip end protection projection portion 615 is provided on the housing tip end side relative to the intake air temperature sensor 23 in the height direction Y, and does not project toward the housing back side relative to the intake air temperature sensor 23 in the width direction X.

The upstream protection projection portion 616 is provided on the housing upstream side relative to the intake air temperature sensor 23 in the depth direction Z. The downstream protection projection portion 617 is provided on the housing downstream side relative to the intake air temperature sensor 23 in the depth direction Z. The upstream protection projection portion 616 and the downstream protection projection portion 617 project to the housing back side with respect to the intake air temperature sensor 23 in the width direction X, and are provided on the housing base end side with respect to the intake air temperature sensor 23 in the height direction Y.

The protection projection portions 616 and 617 are provided on the housing front side together with the intake air temperature sensor 23. The projection dimension of the upstream protection projection portion 616 from the housing front surface 21*e* is smaller than the projection dimension of the downstream protection projection portion 617 from the housing front surface 21*e*. In this case, the tip end portion of the upstream protection projection portion 616 is disposed at a position closer to the housing front surface 21*e* than the tip end portion of the downstream protection projection portion 617. In this configuration, the upstream protection projection portion 616 is made as short as possible so that the flow of air reaching the intake air temperature sensor 23 is less likely to become large. Therefore, the accuracy of temperature detection by the intake air temperature sensor 23 is easily improved.

In the height direction Y, a separation distance H63 between the holding groove portion 25*a* and the housing partition portion 131 is larger than a separation distance H64 between the end portion on the housing tip end side of the tip end protection projection portion 615 and the intake air temperature sensor 23. The separation distance H63 is larger than any of the separation distances H61, H62, and H64.

Figure 42:
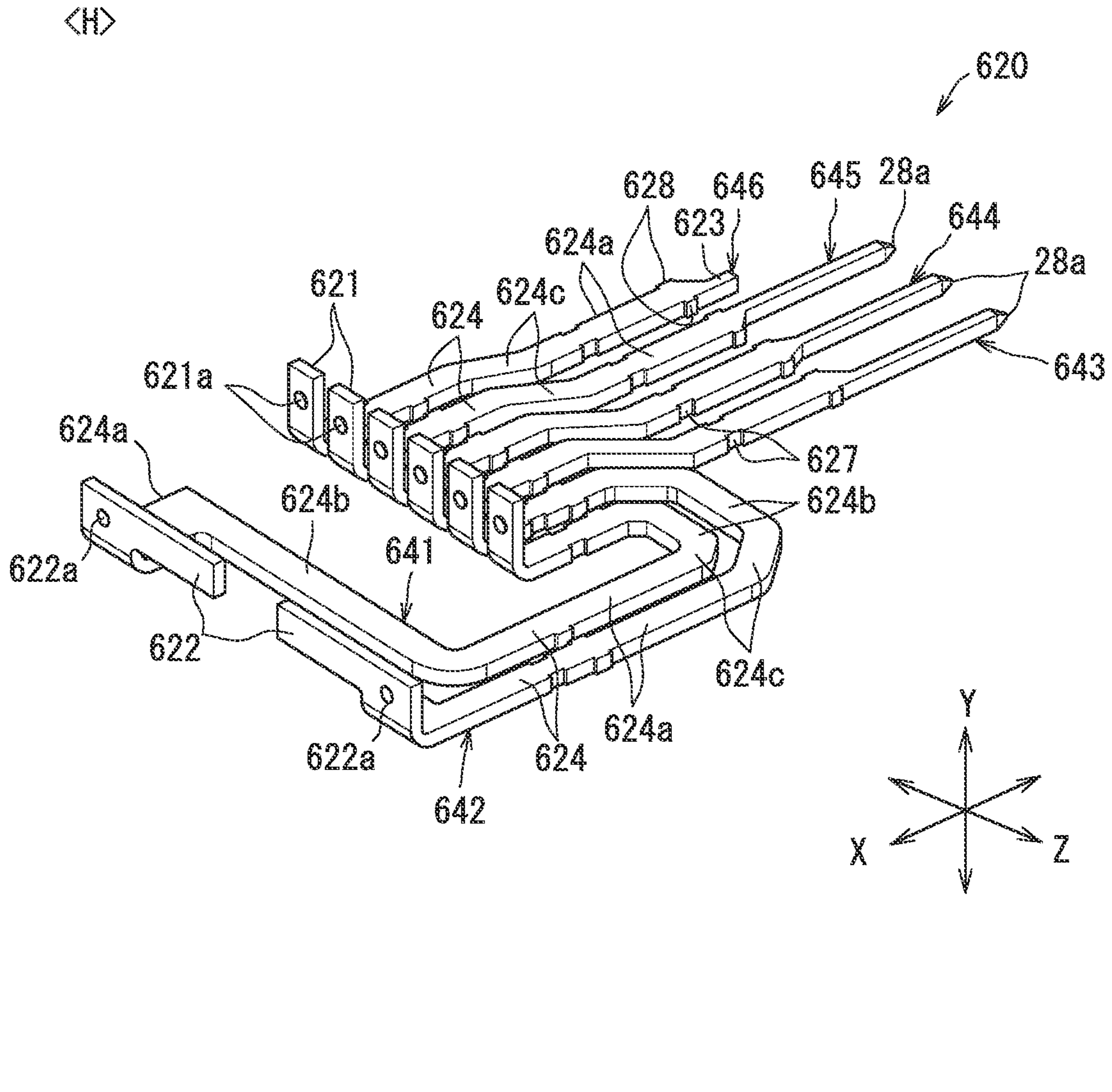
FIG. 42 is a perspective view of a connection terminal.
Figure 43:
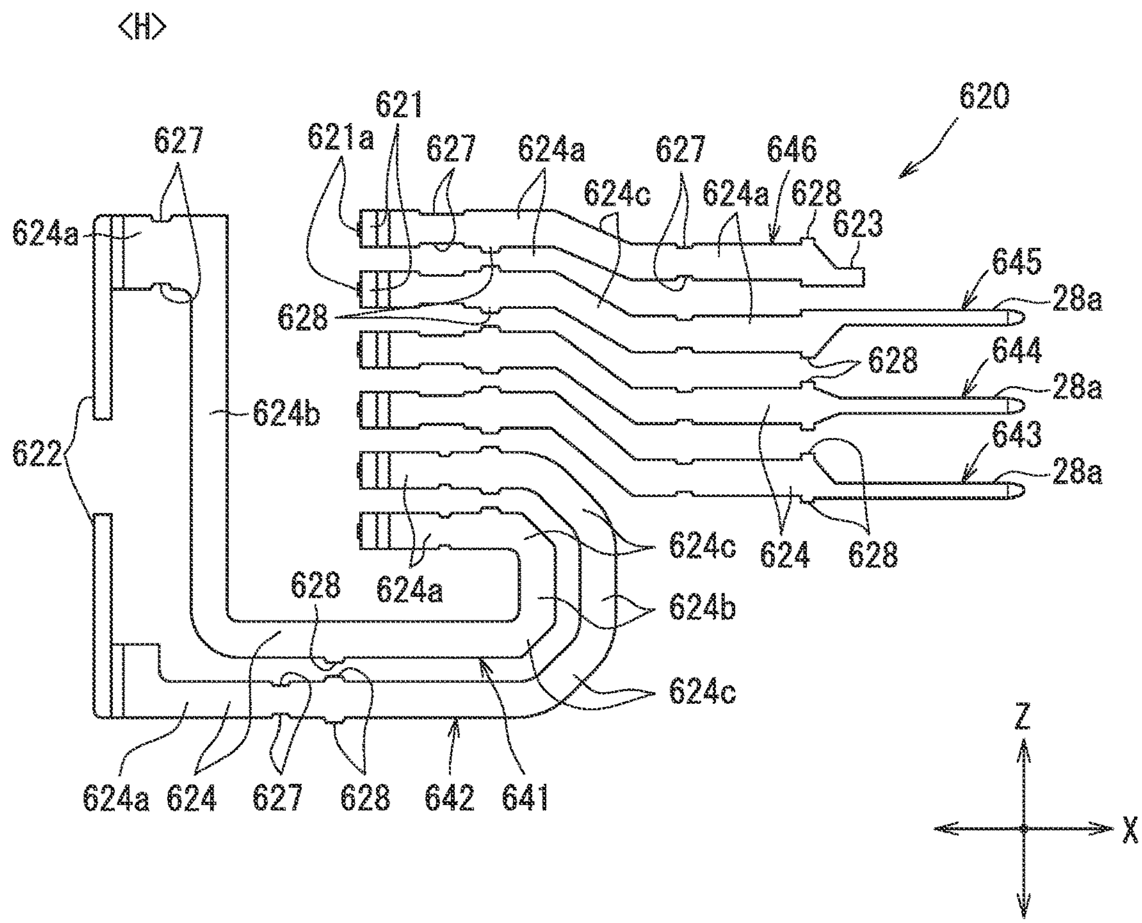
FIG. 43 is a plan view of the connection terminal.

The housing 21 is provided with a connection terminal 620 having the connector terminal 28*a*. As shown in FIGS. 42 and 43, the connection terminal 620 includes terminal members 641 to 646. The terminal members 641 to 646 are members independent from each other, and are in a state of being electrically insulated from each other by being separated from each other. The terminal members 641 to 646 are elongated plate materials having conductivity and formed of a metal material. The terminal members 641 to 646 are made of brass, for example.

The terminal members 641 to 646 may be made of a metal material such as phosphor bronze different from brass. However, if brass is more inexpensive than phosphor bronze, the manufacturing cost of the terminal members 641 to 646 can be easily reduced by using brass as the material for forming the terminal members 641 to 646 as in the present embodiment. The connection terminal 620 may have a connection member that connects the terminal members 641 to 646. The connection member is preferably formed of a resin material or the like to have an insulating property.

Each of the terminal members 641 to 646 is connected to the lead terminal 53*a* of the sensor SA50. Each of the terminal members 641 to 646 includes the lead connection terminal 621 and a terminal intermediate portion 624. The lead connection terminal 621 is connected to the lead terminal 53*a* by welding or the like. The terminal intermediate portion 624 extends from the lead connection terminal 621 in a direction different from the lead connection terminal 621. Specifically, while the lead connection terminal 621 extends in the height direction Y, the terminal intermediate portion 624 extends in the directions X and Z orthogonal to the height direction Y. The plurality of lead connection terminals 621 are arranged in the depth direction Z.

The first terminal member 641 of the member members 641 to 646 is connected to the intake air temperature output terminal 675 of the lead terminal 53*a*. The second terminal member 642 is connected to the intake air temperature ground terminal 674 of the lead terminal 53*a*. Each of the terminal members 641 and 642 has an intake air temperature connection terminal 622. In the terminal members 641 and 642, one end portion is included in the lead connection terminal 621, and the other end portion is included in the intake air temperature connection terminal 622.

The intake air temperature connection terminal 622 is a terminal electrically connected to the lead wire 23*a* of the intake air temperature sensor 23. A plurality of (for example, two) intake air temperature connection terminals 622 are included in the connection terminal 620. These intake air temperature connection terminals 622 extend in the height direction Y from the terminal intermediate portion 624 toward the housing base end side, and are parallel to one another. These intake air temperature connection terminals 622 are arranged in the depth direction Z. In the terminal members 641 and 642, the intake air temperature connection terminal 622 is connected to the lead connection terminal 621 via the terminal intermediate portion 624. Each of the terminal members 641 and 642 is entirely embedded in the housing 21. In the height direction Y, an extending dimension of the lead connection terminal 621 from the terminal intermediate portion 624 in the terminal members 641 to 646 is larger than an extending dimension of the intake air temperature connection terminal 622 from the terminal intermediate portion 624 in the terminal members 641 and 642. The extending dimension of the lead connection terminal 621 may not be larger than the extending dimension of the intake air temperature connection terminal 622.

The third terminal member 643 of the terminal members 641 to 646 is connected to the flow output terminal 673 of the lead terminal 53*a*. The fourth terminal member 644 is connected to the flow ground terminal 671 of the lead terminal 53*a*. The fifth terminal member 645 is connected to the flow power supply terminal 672 of the lead terminal 53*a*. Each of the terminal members 643 to 645 has the connector terminal 28*a*. In the terminal members 643 to 645, one end portion is included in the lead connection terminal 621, and the other end portion is included in the connector terminal 28*a*.

The connector terminal 28*a* is a terminal provided in the connector portion 28 in a state of being exposed to the inside of the connector recess portion 28*b*. A plurality of (for example, three) connector terminals 28*a* are included in the connection terminal 620. These connector terminals 28*a* extend in the width direction X from the terminal intermediate portion 624 toward the side opposite from the lead connection terminal 621, and are parallel to each other. The connector terminals 28*a* are arranged in the depth direction Z, and are disposed on the side opposite from the intake air temperature connection terminal 622 via the lead connection terminal 621 in the width direction X. In the terminal members 643 to 645, the connector terminal 28*a* is connected to the lead connection terminal 621 via the terminal intermediate portion 624. The terminal members 643 to 645 are embedded inside the housing 21 in a state where at least the tip end portion of each connector terminal 28*a* projects from the housing 21 toward the inside of the connector recess portion 28*b*.

The sixth terminal member 646 of the terminal members 641 to 646 is connected to the adjustment terminal 676 of the lead terminal 53*a*. The sixth terminal member 646 has an adjustment connection terminal 623. In the sixth terminal member 646, one end portion is included in the lead connection terminal 621, and the other end portion is included in the adjustment connection terminal 623.

The adjustment connection terminal 623 is a terminal provided in the connector portion 28 in a state of being exposed to the inside of the connector recess portion 28*b*, and is a terminal for adjusting an output signal or the like from the connector terminal 28*a* at the time of manufacturing the air flow meter 20 or the like. The adjustment connection terminal 623 extends in the width direction X from the terminal intermediate portion 624 toward the side opposite from the lead connection terminal 621, and is parallel to each connector terminal 28*a*. The adjustment connection terminal 623 is provided side by side with each connector terminal 28*a* in the depth direction Z. In the sixth terminal member 646, the adjustment connection terminal 623 is connected to the lead connection terminal 621 via the terminal intermediate portion 624. The sixth terminal member 646 is embedded in the housing 21 in a state where at least the tip end portion of the adjustment connection terminal 623 projects from the housing 21 toward the inside of the connector recess portion 28*b*.

In the terminal members 641 to 646, the terminal intermediate portion 624 has at least a part of a laterally extending portion 624*a*, a longitudinally extending portion 624*b*, and an inclined extending portion 624*c*. The laterally extending portion 624*a* is a portion extending in the width direction X, and the longitudinally extending portion 624*b* is a portion extending in the depth direction Z. The inclined extending portion 624*c* is the same as the laterally extending portion 624*a* and the longitudinally extending portion 624*b* from the viewpoint of extending in the directions X and Z orthogonal to the height direction Y, and extends in a direction inclined with respect to both of the laterally extending portion 624*a* and the longitudinally extending portion 624*b*.

The first terminal member 641 has the laterally extending portion 624*a*, the longitudinally extending portion 624*b*, and the inclined extending portion 624*c*. In the first terminal member 641, the laterally extending portion 624*a* extends from each of the lead connection terminal 621 and the intake air temperature connection terminal 622 toward the connector terminal 28*a* side. These laterally extending portions 624*a* are connected to each other with one laterally extending portion 624*a* and two longitudinally extending portions 624*b* interposed therebetween. The first terminal member 641 includes at least one portion where the laterally extending portion 624*a* and the longitudinally extending portion 624*b* are connected with the inclined extending portion 624*c* interposed therebetween.

Similarly to the first terminal member 641, the second terminal member 642 has the laterally extending portion 624*a*, the longitudinally extending portion 624*b*, and the inclined extending portion 624*c*. In the second terminal member 642, similarly to the first terminal member 641, the laterally extending portion 624*a* extends from each of the lead connection terminal 621 and the intake air temperature connection terminal 622 toward the connector terminal 28*a* side. These laterally extending portions 624*a* are connected to each other with one longitudinally extending portion 624*b* interposed therebetween. In the second terminal member 642, the laterally extending portion 624*a* and the longitudinally extending portion 624*b* are connected with the inclined extending portion 624*c* interposed therebetween.

The third terminal member 643, the fourth terminal member 644, and the fifth terminal member 645 do not have the longitudinally extending portion 624*b*, but have the laterally extending portion 624*a* and the inclined extending portion 624*c*. In these terminal members 643 to 645, the laterally extending portion 624*a* extending from the lead connection terminal 621 toward the connector terminal 28*a* and the laterally extending portion 624*a* extending from the connector terminal 28*a* toward the lead connection terminal 621 are connected to each other with the inclined extending portion 624*c* interposed therebetween. Similarly to the third terminal member 643, the sixth terminal member 646 does not have the longitudinally extending portion 624*b*, but has the laterally extending portion 624*a* and the inclined extending portion 624*c*. In the sixth terminal member 646, similarly to the third terminal member 643, the laterally extending portion 624*a* extending from the lead connection terminal 621 and the laterally extending portion 624*a* extending from the connector terminal 28*a* are connected to each other with the inclined extending portion 624*c* interposed therebetween.

In the terminal members 643 to 646, the width dimension of the connector terminal 28*a* and the adjustment connection terminal 623 in the depth direction Z is smaller than the width dimension of the laterally extending portion 624*a* extending from the connector terminal 28*a* or the adjustment connection terminal 623 in the depth direction Z. In this case, the connector terminal 28*a* and the adjustment connection terminal 623 are thinner than the laterally extending portion 624*a*. In the fourth terminal member 644 disposed at the center among the three terminal members 643 to 645 arranged side by side, the center line of the connector terminal 28*a* coincides with the center line of the laterally extending portion 624*a* extending from the connector terminal 28*a*. In this case, in the fourth terminal member 644, the connector terminal 28*a* extends from the center of the laterally extending portion 624*a*. On the other hand, in the third terminal member 643 and the fifth terminal member 645, the center line of each connector terminal 28*a* is disposed at a position farther from the fourth terminal member 644 than the center line of the laterally extending portion 624*a* extending from each connector terminal 28*a*. In this case, in the third terminal member 643 and the fifth terminal member 645, the connector terminal 28*a* extends from the side surface opposite from the fourth terminal member 644 in the laterally extending portion 624*a*.

The sixth terminal member 646 is disposed next to the fifth terminal member 645 at a position opposite from the fourth terminal member 644 with the fifth terminal member 645 interposed therebetween in the depth direction Z. In the sixth terminal member 646, the center line of the adjustment connection terminal 623 is disposed at a position closer to the fifth terminal member 645 than the center line of the laterally extending portion 624*a* extending from the adjustment connection terminal 623. In this case, in the sixth terminal member 646, the adjustment connection terminal 623 extends from the side surface of the laterally extending portion 624*a* on the fifth terminal member 645 side.

Each of the terminal members 641 to 646 has a uniform thickness dimension. For example, in the first terminal member 641, the thickness dimension of the lead connection terminal 621 in the height direction Y, the thickness dimension of the terminal intermediate portion 624 in the height direction Y, and the thickness dimension of the intake air temperature connection terminal 622 in the width direction X are the same. The terminal members 641 to 646 have the thickness dimension same as one another.

In the connection terminal 620, in the depth direction Z, the length dimension of the region where all the intake air temperature connection terminals 622 are installed is larger than the length dimension of the region where all the lead connection terminals 621 are installed. On the other hand, in the depth direction Z, the length dimension of the region where all the connector terminals 28*a* and the adjustment connection terminal 623 are installed is smaller than the length dimension of the region where all the lead connection terminals 621 are installed. In the connection terminal 620, the lead connection terminal 621, the connector terminal 28*a*, and the adjustment connection terminal 623 are disposed at positions that do not protrude outward from the intake air temperature connection terminal 622 in the depth direction Z.

In the manufacturing process of the air flow meter 20, a plate material formed of a metal material is processed by punching or the like to form a base material of the connection terminal 620 with tie bars. In this base material, the tie bar includes a coupling portion and a frame portion. The coupling portion includes a coupling portion that couples the terminal members 641 to 646 to each other and a coupling portion that couples at least one of the terminal members 641 to 646 to the frame portion. The intake air temperature connection terminal 622 and the lead connection terminal 621 are formed by bending the base material in the thickness direction. As described above, in the terminal members 641 to 646, the intake air temperature connection terminal 622 and the lead connection terminal 621 extend in the same orientation of the housing base end side from the terminal intermediate portion 624. Therefore, when the intake air temperature connection terminal 622 and the lead connection terminal 621 are formed by bending the base material, it is possible to save the labor of changing the bending orientation.

The terminal members 641 to 646 are provided with a terminal recess portion 627 and a terminal projection portion 628. The terminal recess portion 627 is a recess portion provided on the side surface of the terminal members 641 to 646, and extends from the side surface of the terminal members 641 to 646 in the directions X and Z orthogonal to the height direction Y. The terminal projection portion 628 is a projection portion provided on the side surface of the terminal members 641 to 646, and extends from the side surface of the terminal members 641 to 646 in the directions X and Z orthogonal to the height direction Y. The terminal recess portion 627 and the terminal projection portion 628 are provided in the terminal intermediate portion 624 in each of the terminal members 641 to 646. Specifically, the terminal recess portion 627 and the terminal projection portion 628 are provided in the laterally extending portion 624*a* of the terminal intermediate portion 624, and are not provided in the longitudinally extending portion 624*b* and the inclined extending portion 624*c*. The terminal recess portion 627 and the terminal projection portion 628 are provided in a portion of the terminal members 641 to 646 embedded in the housing 21, but are not provided in a portion exposed to the outside from the housing 21.

The terminal projection portion 628 is a tie bar mark that is a trace of the tie bar separated from the terminal members 641 to 646. In the manufacturing process of the air flow meter 20, after the connection terminal 620 with a tie bar is formed, the connection terminal 620 is held by a jig that holds the connection terminal 620 in a movable state. The tie bar is separated from the terminal members 641 to 646 while the connection terminal 620 is held by the jig, and the terminal members 641 to 646 are attached to the first housing portion 151.

In the present embodiment, the detection result of the intake air temperature sensor 23 is input to the sensor SA50 via the connection terminal 620. In this case, the intake air temperature sensor 23 is electrically connected to the lead terminal 53*a* of the sensor SA50 via the connection terminal 620. Information on the detection result of the intake air temperature sensor 23 is output from the sensor SA50 to the ECU 15 via the connector terminal 28*a*. The detection result of the intake air temperature sensor 23 may be output to the ECU 15 without via the sensor SA50. For example, the intake air temperature sensor 23 is connected not to the lead terminal 53*a* of the sensor SA50 but to the connector terminal 28*a* via the connection terminal 620. In this configuration, in the connection terminal 620, the intake air temperature connection terminal 622 is connected not to the lead connection terminal 621 but to the connector terminal 28*a* via the terminal intermediate portion 624.

Figure 44:
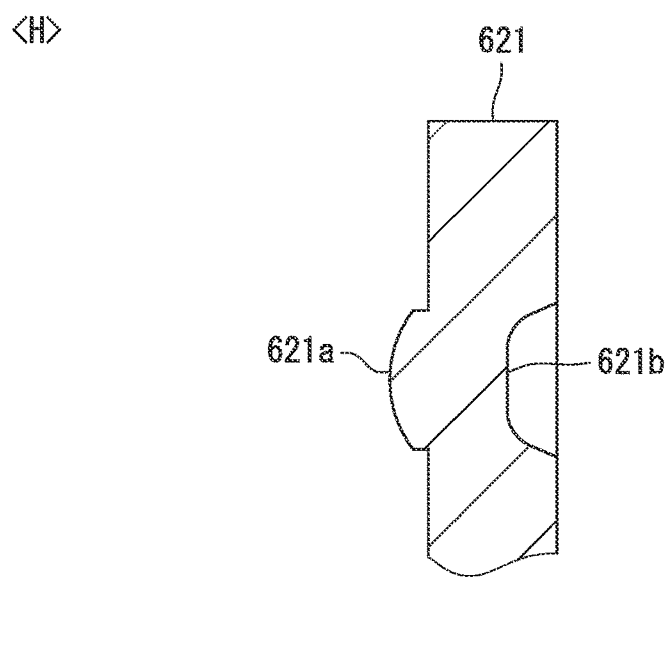
FIG. 44 is an enlarged view around a terminal projection portion in a lead connection terminal.

As shown in FIGS. 42 and 44, before the lead connection terminal 621 is connected to the lead terminal 53*a* of the sensor SA50, the lead connection terminal 621 is provided with a terminal projection portion 621*a* and a terminal recess portion 621*b*. The terminal projection portion 621*a* is a projection portion provided on one plate surface of the lead connection terminal 621, and is provided, for example, on a plate surface of the lead connection terminal 621 on the intake air temperature connection terminal 622 side. The terminal projection portion 621*a* is provided at a position separated inward from the outer peripheral edge of the plate surface of the lead connection terminal 621. The terminal recess portion 621*b* is a recess portion provided on the plate surface of the lead connection terminal 621 opposite from the terminal projection portion 621*a*, and extends from the lead connection terminal 621 toward the terminal projection portion 621*a*, for example. The terminal recess portion 621*b* is provided at a position separated inward from the outer peripheral edge of the plate surface of the lead connection terminal 621. The terminal projection portion 621*a* and the terminal recess portion 621*b* are arranged in the thickness direction of the lead connection terminal 621, and the center line of the terminal projection portion 621*a* and the center line of the terminal recess portion 621*b* coincide with each other.

The lead connection terminal 621 is connected to the lead terminal 53*a* by welding in a state where the terminal projection portion 621*a* is in contact with the lead terminal 53*a* of the sensor SA50. For example, in a state where the tip end portion of the terminal projection portion 621*a* and one plate surface of the lead terminal 53*a* are in contact with each other, heat is applied to the terminal projection portion 621*a* from the terminal recess portion 621*b* side using a jig such as a welding tool to melt at least a part of the terminal projection portion 621*a* and at least a part of the lead terminal 53*a*. In this way, when lead connection terminal 621 and lead terminal 53*a* are joined by welding, terminal projection portion 621*a* and terminal recess portion 621*b* are deformed or eliminated in the lead connection terminal 621. As a welding method, spot welding, arc welding, or laser welding is used.

In a state before the intake air temperature connection terminal 622 is connected to the lead wire 23*a*, the intake air temperature connection terminal 622 may be provided with a projection portion similar to the terminal projection portion 621*a* or a recess portion similar to the terminal recess portion 621*b*. The intake air temperature connection terminal 622 is connected to the lead wire 23*a* by welding a contact portion between the intake air temperature connection terminal 622 and the lead wire 23*a* of the intake air temperature sensor 23.

The intake air temperature connection terminal 622 is provided with a terminal hole 622*a*. The terminal hole 622*a* is provided at a position shifted in the depth direction Z from the position of the intake air temperature connection terminal 622 to which the lead wire 23*a* is connected, and penetrates the intake air temperature connection terminal 622 in the width direction X. The terminal hole 622*a* is provided at a position arranged in the height direction Y with respect to the boundary portion between the intake air temperature connection terminal 622 and the terminal intermediate portion 624, and the position separated from this boundary in the height direction Y. A jig for holding the terminal members 641 to 646 are inserted into the terminal hole 622*a* in a case where the terminal members 641 to 646 are manufactured by bending an elongated plate material or in a case where the terminal members 641 to 646 are positioned with respect to the first housing portion 151. Accordingly, the position of the terminal members 641 to 646 can be easily held by the jig.

Figure 46:
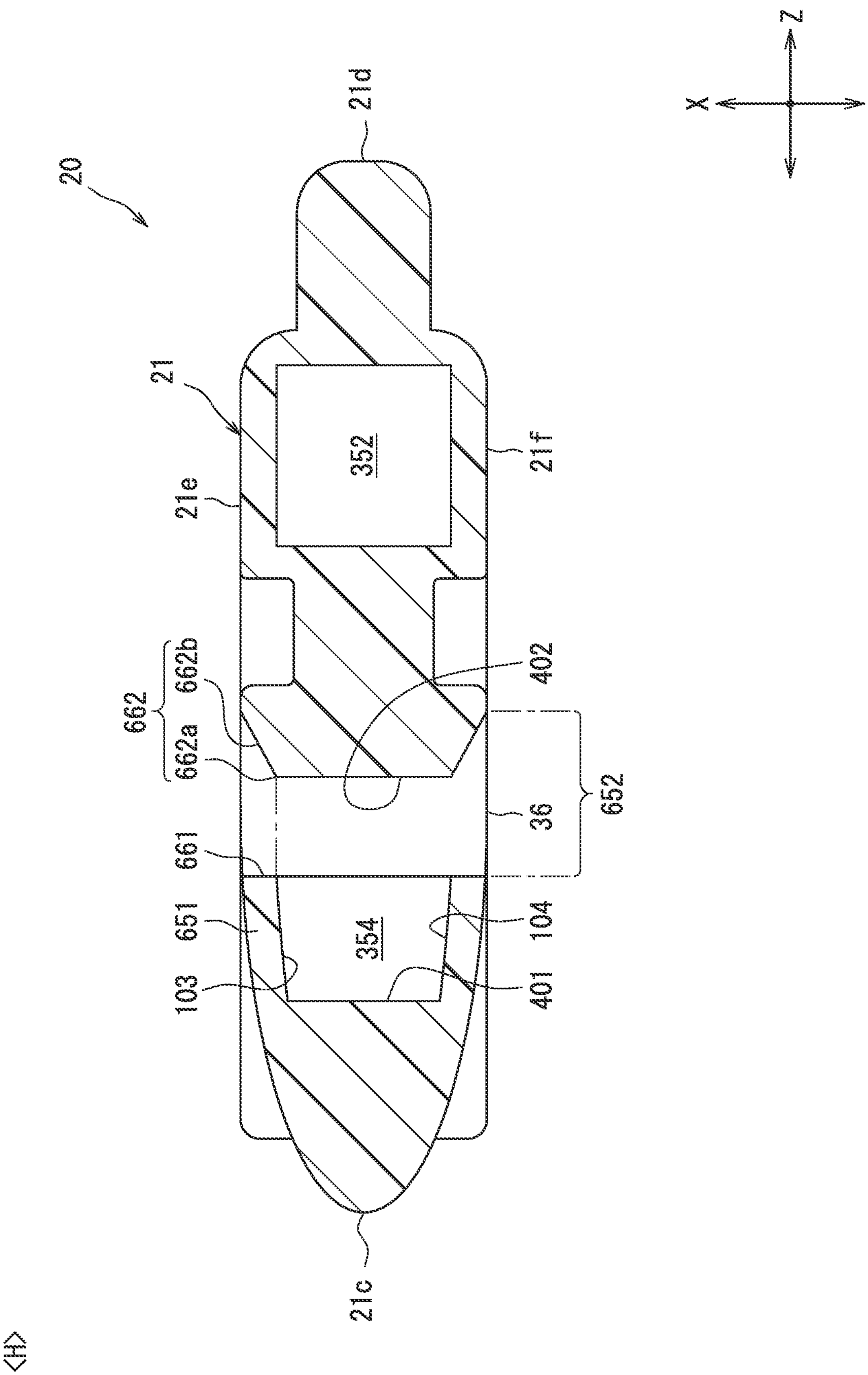
FIG. 46 is a cross-sectional view taken along a line XLVI-XLVI of FIG. 41.

As shown in FIG. 46, the inner surface of the housing 21 has, as formation surfaces forming the passage flow path 31, a front passage wall surface 631 and a back passage wall surface 632 in addition to the passage ceiling surface 341 and the passage floor surface 345. The front passage wall surface 631 and the back passage wall surface 632 are a pair of wall surfaces facing each other with the passage ceiling surface 341 and the passage floor surface 345 interposed therebetween, and are stretched between the passage ceiling surface 341 and the passage floor surface 345. The front passage wall surface 631 extends from the front measurement wall surface 103 toward the housing tip end side, and the back passage wall surface 632 extends from the back measurement wall surface 104 toward the housing tip end side.

An inner surface of the housing 21 has a front passage narrowing surface 635 and a back passage narrowing surface 636. The front passage narrowing surface 635 is included in the front passage wall surface 631, and the back passage narrowing surface 636 is included in the back passage wall surface 632. These passage narrowing surfaces 635 and 636 gradually narrow the passage flow path 31 such that the cross-sectional area of the passage flow path 31 gradually decreases from the passage entrance 33 side toward the passage exit 34. The passage narrowing surfaces 635 and 636 are provided between the measurement entrance 35 and the passage exit 34 in the passage flow path 31. The passage narrowing surfaces 635 and 636 are stretched between an exit ceiling surface 343 and the passage floor surface 345, and a separation distance between the front passage wall surface 631 and the back passage wall surface 632 in the width direction X is gradually reduced from the measurement entrance 35 toward the passage exit 34. The passage narrowing surfaces 635 and 636 are inclined with respect to the depth direction Z, which is the direction in which the center line of the passage flow path 31 extends, and each face the passage entrance 33 side.

The passage narrowing surfaces 635 and 636 extend from the end portion of the measurement entrance 35 on the passage exit 34 side toward the passage exit 34. For this reason, when the first housing portion 151 is molded with resin, the position of the end portion of the passage narrowing surfaces 635 and 636 on the passage entrance 33 side hardly varies in the depth direction Z from product to product. In this case, the rate and velocity of air flowing through the passage flow path 31 and the measurement flow path 32 are less likely to vary from product to product due to the passage narrowing surfaces 635 and 636, so that the detection accuracy of the flow sensor 22 is suppressed from varying from product to product.

The inner surface of the housing 21 has a front narrowing top portion 637 and a back narrowing top portion 638. The front narrowing top portion 637 is included in the front passage wall surface 631 and is a surface stretched between the front passage narrowing surface 635 and the passage exit 34. The back narrowing top portion 638 is included in the back passage wall surface 632 and is a surface stretched between the back passage narrowing surface 636 and the passage exit 34. The narrowing top portions 637 and 638 extend in the depth direction Z in parallel with the center line of the passage flow path 31 and face each other.

As shown in FIG. 46, the housing 21 has a housing outer wall 651. The housing outer wall 651 forms an outer surface of the housing 21 and is a cylindrical portion extending in the height direction Y. The outer surface of the housing outer wall 651 forms the housing upstream surface 21*c*, the housing downstream surface 21*d*, the housing front surface 21*e*, and the housing back surface 21*f*. The housing front surface 21*e* and the housing back surface 21*f* include a flat surface extending straight in the depth direction Z and an inclined surface inclined with respect to this flat surface so as to face the housing upstream side. The measurement exit 36 is provided at a position across the boundary portion between the flat surface and the inclined surface in the depth direction Z on each of the housing front surface 21*e* and the housing back surface 21*f*.

The housing outer wall 651 is provided with a measurement hole portion 652. The measurement hole portion 652 is provided for each of the housing front surface 21*e* and the housing back surface 21*f*, and the outer end portion of the measurement hole portion 652 forms the measurement exit 36. The measurement hole portion 652 extends in the width direction X from the measurement exit 36. The measurement hole portion 652 provided on the housing front side is stretched between a measurement exit 36 provided on the housing front surface 21*e* and the front measurement wall surface 103. The measurement hole portion 652 provided on the housing back side is stretched between the measurement exit 36 provided on the housing back surface 21*f* and the back measurement wall surface 104.

The inner surface of the measurement hole portion 652 has an upstream formation surface 661 and a downstream formation surface 662. The upstream formation surface 661 forms an end portion of the measurement hole portion 652 on the housing upstream side and faces the housing downstream side. The downstream formation surface 662 forms an end portion of the measurement hole portion 652 on the housing downstream side and faces the housing upstream side. The upstream formation surface 661 and the downstream formation surface 662 are stretched between the measurement exit 36 and the measurement wall surfaces 103 and 104 in the width direction X.

The downstream formation surface 662 has a downstream inclined surface 662*a* and a downstream facing surface 662*b*. The downstream inclined surface 662*a* extends in a direction inclined with respect to the width direction X and extends in the height direction Y in a state of being facing obliquely outward. The downstream facing surface 662*b* extends in the width direction X and faces the upstream formation surface 661 in parallel. The width dimension of the downstream inclined surface 662*a* in the width direction X is smaller than the width dimension of the upstream formation surface 661 in the width direction X. On the other hand, the width dimension of the downstream inclined surface 662*a* in the width direction X is larger than the width dimension of the downstream facing surface 662*b* in the width direction X.

In the measurement hole portion 652, since the downstream inclined surface 662*a* of the downstream formation surface 662 faces obliquely outward, the air flowing out from the measurement exit 36 obliquely proceeds toward the housing downstream side along the downstream inclined surface 662*a* in the measurement flow path 32. In this case, the air flowing out of the measurement exit 36 proceeds toward the housing downstream side being inclined with respect to the width direction X, so that the air easily merges with the air flowing through the intake passage 12 in the main flow direction. For this reason, for example, as compared with the case where the air flows out in the width direction X from the measurement exit 36, the disturbance of the airflow is less likely to occur in around the measurement exit 36.

As shown in FIG. 6, the housing 21 is provided with a gate mark 771. The gate mark 771 is provided at least on the housing back surface 21*f* of the first housing portion 151. In the manufacturing process of the air flow meter 20, the first housing portion 151 is molded with resin using an injection mold machine or a mold device. The mold device is provided with a gate as a supply passage through which the molten resin is supplied from the injection mold machine, and the gate communicates with a mold space of the mold device. Therefore, when the first housing portion 151 is subjected to resin molding using this mold device, the resin solidified in the gate is connected to the first housing portion 151 as the gate, and the gate is separated from the first housing portion 151. As described above, the trace of the gate portion separated from the first housing portion 151 is the gate mark 771. The gate mark 771 is formed by, for example, a projection portion or the like provided on the outer surface of the housing 21.

The gate mark 771 is provided on the housing base end surface 21*b* rather than the housing tip end surface 21*a* in the height direction Y. In this case, the gate mark 771 is provided in the entering portion 20*a* (see FIG. 8) of the housing 21. The gate mark 771 is provided at a position closer to the housing downstream surface 21*d* than the housing upstream surface 21*c* in the depth direction Z. The gate mark 771 may be provided at or near the center of the housing upstream surface 21*c* and the housing downstream surface 21*d*. In this case, since the gate is disposed at or near the center in the width direction X in the mold space of the mold device for molding the first housing portion 151, the pressure of the molten resin tends to be uniform between the upstream side of the housing and the downstream side of the housing. For this reason, the flow of the molten resin in the mold space becomes easily stabilized, and the first housing portion 151 in a state where the molten resin is solidified is suppressed from being unintentionally deformed or damaged.

As shown in FIGS. 6 and 7, pressing portions 772 to 774 are provided on an outer surface of the housing 21. The pressing portions 772 to 774 are recess portions provided in each of the housing front surface 21*e* and the housing back surface 21*f*. The pressing portions 772 to 774 are provided in the first housing portion 151, and are formed so as to be pressed by a mold device at the time of resin molding of the first housing portion 151. Therefore, the pressing portions 772 to 774 can also be referred to as mold pressing portions. The pressing portions 772 to 774 can also be referred to as thinned portions.

A plurality of (for example, three) upstream pressing portions 772 to 774 of the pressing portion 772 are provided on each of the housing front surface 21*e* and the housing back surface 21*f*. The upstream pressing portion 772 is disposed at a position closer to the housing upstream surface 21*c* than the housing downstream surface 21*d* in the depth direction Z. The upstream pressing portions 772 extend in an elongated shape in the height direction Y, and are arranged in series in the height direction Y along the housing upstream surface 21*c* on each of the housing front surface 21*e* and the housing back surface 21*f*. In each of the housing front surface 21*e* and the housing back surface 21*f*, when the plurality of upstream pressing portions 772 is referred to as one assembly, the assembly is disposed at or near the center of the housing tip end surface 21*a* and the housing base end surface 21*b* in the height direction Y.

A plurality of (for example, three) downstream pressing portions 773 of the pressing portions 772 to 774 are provided on each of the housing front surface 21*e* and the housing back surface 21*f*. The downstream pressing portion 773 is disposed at a position closer to the housing downstream surface 21*d* than the housing upstream surface 21*c* in the depth direction Z. Each of the downstream pressing portions 773 extends in an elongated shape in the height direction Y, and is arranged in series in the height direction Y along the housing downstream surface 21*d* on each of the housing front surface 21*e* and the housing back surface 21*f*. In each of the housing front surface 21*e* and the housing back surface 21*f*, when the plurality of downstream pressing portions 773 is referred to as one assembly, the assembly is disposed at or near the center of the housing tip end surface 21*a* and the housing base end surface 21*b* in the height direction Y.

A plurality of (for example, two) tip end pressing portions 772 to 774 of the pressing portion 774 is provided on each of the housing front surface 21*e* and the housing back surface 21*f*. The tip end pressing portion 774 is disposed at a position closer to the housing tip end surface 21*a* than the housing base end surface 21*b* in the height direction Y. The tip end pressing portions 774 extend in an elongated shape in the depth direction Z, and are arranged in series in the depth direction Z along the housing tip end surface 21*a* on each of the housing front surface 21*e* and the housing back surface 21*f*. In each of the housing front surface 21*e* and the housing back surface 21*f*, when the plurality of tip end pressing portions 774 is referred to as one assembly, the assembly is disposed at a position closer to the housing upstream surface 21*c* than the housing downstream surface 21*d* in the depth direction Z. These assemblies are disposed at or near the center of the housing upstream surface 21*c* and the housing downstream surface 21*d*.

In the molding process of the housing 21, a die slide injection (DSI) molding technique is used. Specifically, the first housing portion 151 is molded using a mold device, and then secondary molding of joining the first housing portion 151 and the second housing portion 152 is continuously performed using this mold device. In this mold device, when the DSI molding is performed, the mold pressing of the first housing portion 151 by the mold device can be reliably performed using the pressing portions 772 to 774, so that the first housing portion 151 and the second housing portion 152 can be reliably coupled. Since the pressing portions 772 to 774 restricts the relative positional relationship between the first housing portion 151 and the second housing portion 152 from being unintentionally shifted, it is possible to suppress the shape and size of the bypass flow path 30 from being shifted from the design shape and size. In this case, since an error is less likely to be included in the relationship between the flow rate of the air flowing through the measurement flow path 32 and the output result of the flow sensor 22, the detection accuracy of the flow sensor 22 is improved.

An outer groove portion 775 is provided on an outer surface of the housing 21. The outer groove portion 775 is a groove provided on each of the housing front surface 21*e* and the housing back surface 21*f*. The outer groove portion 775 provided on the housing front surface 21*e* and the outer groove portion 775 provided on the housing back surface 21*f* basically have the same shape and the same size. The outer groove portion 775 is provided in the first housing portion 151 and basically extends in the height direction Y. On the housing back surface 21*f*, the tip end protection projection portion 615 extends in the width direction X from the bottom surface of the outer groove portion 775. The outer groove portion 775 can also be referred to as a thinned portion.

An end portion of the outer groove portion 775 on the housing base end side is provided between the measurement exit 36 and the seal holding portion 25 in the height direction Y, and is disposed at a position closer to the measurement exit 36 than the seal holding portion 25 in the height direction Y. This end portion is disposed at or near the center of the housing upstream surface 21*c* and the housing downstream surface 21*d* in the depth direction Z, and the tip end protection projection portion 615 is provided at this end portion.

The outer groove portion 775 extends from an end portion on the housing base end side toward the housing tip end side through between the measurement exit 36 and the housing downstream surface 21*d*, and extends between the measurement exit 36 and the housing tip end surface 21*a* toward the housing upstream surface 21*c* in the height direction Y. An end portion of the outer groove portion 775 on the housing tip end side is provided between the measurement exit 36 and the housing tip end surface 21*a* in the height direction Y, and is disposed at a position closer to the measurement exit 36 than the housing tip end surface 21*a* in the height direction Y. The end portion is provided at a position closer to the housing upstream surface 21*c* than the housing downstream surface 21*d* in the depth direction Z.

The outer groove portion 775 includes a longitudinal groove portion 775*a*, an inclined groove portion 775*b*, and a lateral groove portion 775*c*. The longitudinal groove portion 775*a* forms the end portion of the outer groove portion 775 on the housing base end side, and extends in the height direction Y. The lateral groove portion 775*c* forms the end portion of the outer groove portion on the housing tip end side, and extends in the depth direction Z. The inclined groove portion 775*b* connects the end portion on the housing tip end side of the longitudinal groove portion 775*a* and the end portion on the housing downstream side of the lateral groove portion 775*c*, and extends in a direction inclined with respect to both the height direction Y and the depth direction Z.

Since the outer groove portion 775 is provided around the measurement exit 36 in each of the housing front surface 21*e* and the housing back surface 21*f*, a foreign matter flowing in the intake passage 12 together with air easily flows along the outer groove portion 775 and hardly enters the measurement exit 36. Since the outer groove portion 775 is provided around the measurement exit 36, the flow of air is less likely to become fast. Therefore, the air flowing out from the measurement flow path 32 through the measurement exit 36 is less likely to be disturbed.

The housing upstream surface 21*c* has an upstream projection portion 781, an upstream intermediate portion 782, and an entrance formation portion 783. The upstream projection portion 781 projects to the housing upstream side relative to both the upstream intermediate portion 782 and the entrance formation portion 783 in the depth direction Z. The width dimension of the upstream projection portion 781 in the width direction X gradually decreases toward the housing upstream side, and the upstream end portion of the upstream projection portion 781 extends in a ridge shape in the height direction Y. The upstream projection portion 781 is provided between the entrance formation portion 783 and the seal holding portion 25 in the height direction Y. In the height direction Y, the length dimension of the upstream projection portion 781 is larger than any of the length dimensions of the upstream intermediate portion 782 and the entrance formation portion 783.

The upstream pressing portion 772 is provided at a position across a boundary portion between the upstream projection portion 781 and the housing front surface 21*e* and the housing back surface 21*f* in the depth direction Z. Since the upstream projection portion 781 of the housing upstream surface 21*c* faces the obliquely upstream side in the intake passage 12, the upstream pressing portion 772 is also opened to the obliquely upstream side in the passage flow path 31. In this case, when the housing 21 is viewed from the upstream side, a part of the inside of the upstream pressing portion 772 is visible. As described above, since the upstream pressing portion 772 is opened toward the oblique upstream side, a small turbulent flow is likely to occur in each upstream pressing portion 772, and generation of a large turbulent flow due to the small turbulent flow is suppressed.

The upstream intermediate portion 782 is provided between the entrance formation portion 783 and the upstream projection portion 781 in the height direction Y, and extends flat in a direction orthogonal to the depth direction Z. The upstream intermediate portion 782 is provided between the upstream projection portion 781 and the entrance formation portion 783 in the depth direction Z. Specifically, the upstream intermediate portion 782 is provided between the upstream projection portion 781 and the entrance formation portion 783 in the depth direction Z. In the height direction Y, the length dimension of the upstream intermediate portion 782 is smaller than any of the length dimensions of the upstream projection portion 781 and the entrance formation portion 783.

The entrance formation portion 783 is an elongated surface extending from the housing tip end surface 21*a* toward the housing base end side in the housing upstream surface 21*c*, and is orthogonal to the depth direction Z. The entrance formation portion 783 is provided with the passage entrance 33.

As described above, on the housing upstream surface 21*c*, the upstream intermediate portion 782 having a flat surface shape is provided on the housing upstream side relative to the passage entrance 33. For this reason, the detection accuracy of the flow sensor 22 is less likely to vary because the rate and velocity of air flowing into the passage entrance 33 are less likely to vary. In addition, the foreign matter flowing downstream in the intake passage 12 together with air hits the upstream intermediate portion 782 and is bounced back, so that the foreign matter hardly enters the passage entrance 33. Therefore, the detection accuracy of the flow sensor 22 is suppressed from being lowered by the foreign matter.

The housing downstream surface 21*d* has a downstream projection portion 785 and an exit formation portion 786. The downstream projection portion 785 projects to the housing upstream side of the exit formation portion 786 in the depth direction Z. The width dimension of the downstream projection portion 785 in the width direction X gradually decreases toward the housing downstream side, and the downstream end portion of the downstream projection portion 785 has an elongated shape extending in the height direction Y. The downstream projection portion 785 is provided between the exit formation portion 786 and the seal holding portion 25 in the height direction Y. In the height direction Y, the length dimension of the downstream projection portion 785 is larger than the length dimension of the exit formation portion 786.

The exit formation portion 786 is an elongated surface extending from the housing tip end surface 21*a* toward the housing base end side in the housing downstream surface 21*d*, and is orthogonal to the depth direction Z. The exit formation portion 786 is provided with the passage exit 34.

In the housing downstream surface 21*d*, a downstream step surface 787 is provided at a boundary portion between the downstream projection portion 785 and the exit formation portion 786. The downstream step surface 787 extends from the exit formation portion 786 toward the housing downstream side and faces the housing tip end side.

As described later, a surface forming the passage flow path 31 on the inner surface of the housing 21 includes the exit ceiling surface 343 (see FIG. 65). The exit ceiling surface 343 extends in the depth direction Z from the passage exit 34 toward the passage entrance 33. The downstream step surface 787 extends from an end portion of the passage exit 34 on the housing base end side toward the housing downstream side. That is, the downstream step surface 787 extends from the exit ceiling surface 343 toward the housing downstream side. The downstream step surface 787 and the exit ceiling surface 343 are continuous surfaces in the depth direction Z, and no step surface is formed at a boundary portion between the downstream step surface 787 and the exit ceiling surface 343.

As described above, the exit ceiling surface 343 and the downstream step surface 787 are continuous with each other. For this reason, it is less likely to happen that the foreign matter flowing through the passage flow path 31 toward the passage exit 34 together with the air hardly passes through the exit ceiling surface 343, flows out from the passage exit 34, then hits the downstream step surface 787, bounces back, and returns to the inside of the passage flow path 31 again. Therefore, it is possible to suppress the foreign matter from entering the measurement flow path 32 from the measurement entrance 35 due to the disturbance of the airflow around the passage exit 34.

In the housing 21, since the downstream step surface 787 is provided on the downstream side of the passage exit 34, the length dimension of the passage flow path 31 in the depth direction Z is reduced by the amount of the downstream step surface 787. That is, the passage flow path 31 is shortened by the downstream step surface 787. Therefore, when a pressure loss or a friction loss occurs in the air flowing through the passage flow path 31, the pressure loss or the friction loss can be reduced.

In the manufacturing process of the housing 21, a resin material in which a conductive material having conductivity is mixed with an insulating material having insulating properties is used for resin molding of the housing 21. In this case, the conductive material is used in a smaller amount than the insulating material. Therefore, in the housing 21, the insulating portion formed of the insulating material forms the main portion, and the conductive portion formed of the conductive material is included so as to be scattered in the insulating portion. As the insulating material, a PBT resin, which is a polybutylene terephthalate resin, a PPS resin, which is a polyphenylene sulfide resin, or the like is used. As the conductive material, a carbon material or the like is used. The carbon material includes carbon powder, carbon fiber, nanocarbon, graphene, and carbon microparticles.

In the housing 21, the ratio of the conductive portion included in the insulating portion is larger in the first housing portion 151 than in the second housing portion 152. In this configuration, in the first housing portion 151, the separation distance between the conductive portions tends to be shorter than that in the second housing portion 152, so that dielectric breakdown of the insulating portion tends to occur. Therefore, even if the first housing portion 151 is charged due to accumulation of negative charges in the first housing portion 151 in the intake passage 12, the negative charges move through the plurality of conductive portions with dielectric breakdown and are easily discharged to the ground from the intake pipe 14*a* or the like. Therefore, it is less likely to happen that the negative charge accumulated in the first housing portion 151 moves to the flow sensor 22, and the flow sensor 22 is charged with the negative charge, so that the detection accuracy of the flow sensor 22 decreases.

On the other hand, the second housing portion 152 is less likely to be charged because the ratio of the conductive portion to the insulating portion is smaller than that of the first housing portion 151. In the housing 21, when a person such as a user touches the air flow meter 20 with a hand or the like due to the second housing portion 152 protruding outside the intake pipe 14*a*, a portion to be touched tends to be the second housing portion 152. Therefore, there is a concern that a charge such as a negative charge moves from a person to the second housing portion 152 and the second housing portion 152 is charged. On the other hand, since the second housing portion 152 is less likely to be charged than the first housing portion 151, even if a person touches the second housing portion 152, it is less likely to happen that charges are accumulated in the second housing portion 152 and the charges reach the flow sensor 22.

In the second housing portion 152, it is not necessary to increase the ratio of the conductive portion to the insulating portion as large as that of the first housing portion 151. Therefore, if the conductive material is more inexpensive than the insulating material, the manufacturing cost of the second housing portion 152 can be easily reduced.

Figure 47:
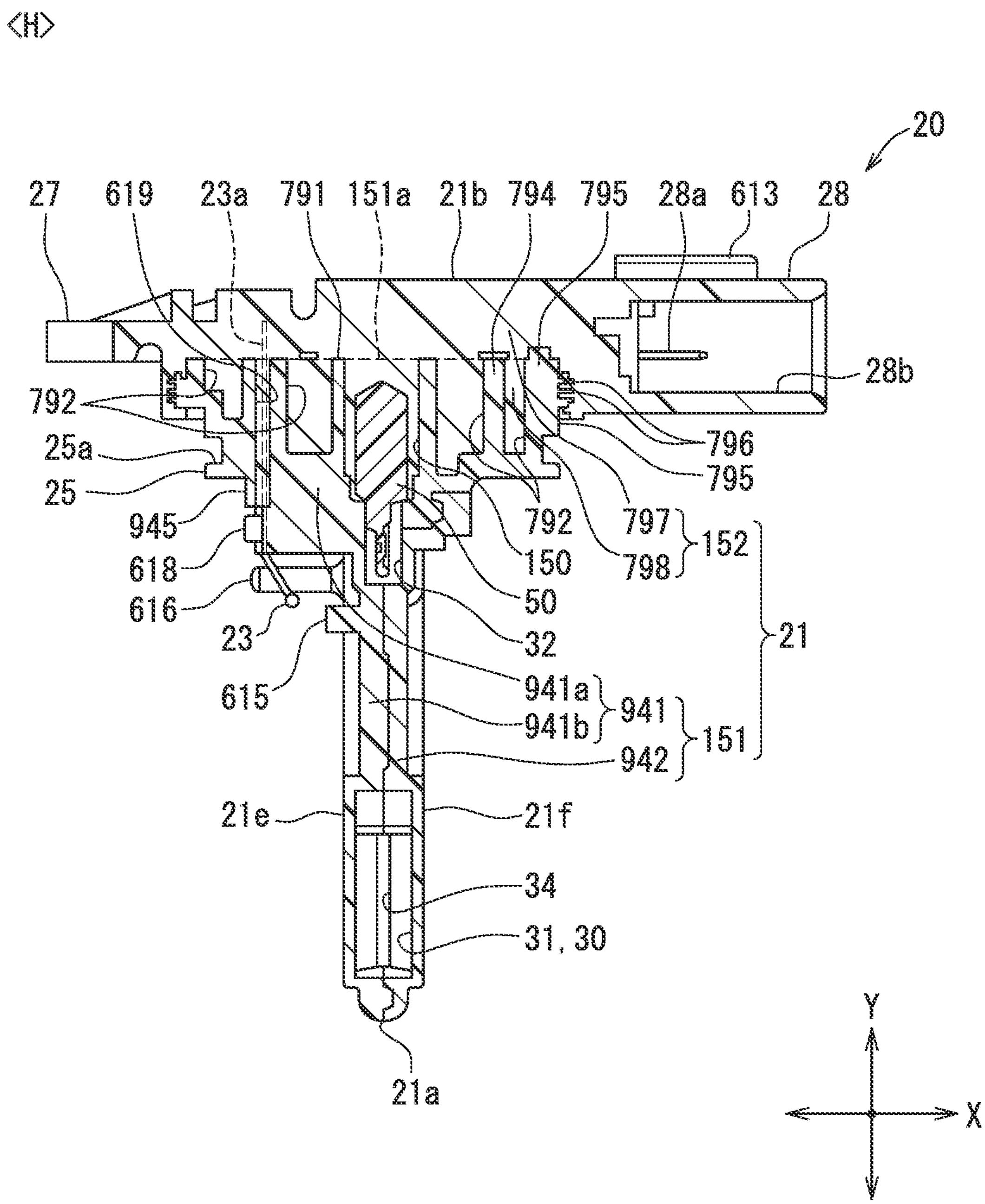
FIG. 47 is a cross-sectional view taken along a line XLVII-XLVII of FIG. 6.

As shown in FIG. 47, in the housing 21, the first housing portion 151 and the second housing portion 152 mesh with each other. As shown in FIGS. 19, 47, 52, 54, and 55, the first housing portion 151 has a base end recess portion 792 and a base end projection portion 793, and the second housing portion 152 has a shape meshing with the base end recess portion 792 and the base end projection portion 793. In the first housing portion 151, a first base end surface 791 is included at an end portion opposite from the housing tip end surface 21*a*, and a plurality of base end recess portions 792 and a plurality of base end projection portions 793 are provided on the first base end surface 791. The first base end surface 791 is provided side by side in the connector recess portion 28*b* in the directions X and Z orthogonal to the height direction Y. In the first housing portion 151, the housing tip end surface 21*a* can also be referred to as a first tip end surface.

The base end recess portion 792 extends in the height direction Y from the first base end surface 791 toward the housing tip end surface 21*a*. Similarly to the base end recess portion 792, the SA accommodation region 150 extends in the height direction Y from the first base end surface 791 toward the housing tip end side. The first base end surface 791 is provided with an opening of the base end recess portion 792 and the housing opening portion 151*a*, which is an opening portion of the SA accommodation region 150. The plurality of the base end recess portions 792 are arranged in both the width direction X and the depth direction Z. In this case, the plurality of base end recess portions 792 are arranged in the SA accommodation region 150 in both the width direction X and the depth direction Z, and are further arranged along the outer peripheral edge of the first base end surface 791.

The first housing portion 151 has a recess partition portion 794 and a recess outer peripheral portion 795. The recess outer peripheral portion 795 forms an outer surface of the first housing portion 151 outside the plurality of base end recess portions 792 in the width direction X and the depth direction Z, and extends along an outer peripheral edge of a region where the plurality of base end recess portions 792 are provided. The recess partition portion 794 forms the base end recess portion 792 together with the recess outer peripheral portion 795 in a state of extending from the recess outer peripheral portion 795 in the width direction X and the depth direction Z. The recess partition portion 794 is provided at a boundary portion between the base end recess portions 792 adjacent to each other in the width direction X and the depth direction Z. The base end recess portion 792 is formed by at least the recess partition portion 794 of the recess partition portion 794 and the recess outer peripheral portion 795. The SA accommodation region 150 is provided at a position separated from the recess outer peripheral portion 795 in both the width direction X and the depth direction Z, and is formed by the recess partition portion 794.

The end surfaces of the recess partition portion 794 and the recess outer peripheral portion 795 on the housing base end side are included in the first base end surface 791. Similarly to the base end recess portion 792, the recess partition portion 794 and the recess outer peripheral portion 795 extend in the height direction Y from the first base end surface 791 toward the housing tip end surface 21*a*. In the first housing portion 151, since the plurality of base end recess portions 792 are arranged in the width direction X and the depth direction Z, the thickness of the recess partition portion 794 and the recess outer peripheral portion 795 in the width direction X and the depth direction Z is not too large. That is, since the base end recess portion 792 is provided in the first housing portion 151, the first housing portion 151 does not become one resin clump. In this manner, the base end recess portion 792 serves as a thinned portion in the first housing portion 151. For this reason, it is less likely to happen that when the first housing portion 151 is molded with resin, the first housing portion 151 is unintentionally deformed, air bubbles such as voids are generated in the first housing portion 151, and the like.

In the plurality of base end recess portions 792, the base end recess portion 792 closer to the recess outer peripheral portion 795 has a smaller depth dimension in the height direction Y. In this case, the base end recess portion 792 closer to the SA accommodation region 150 has a larger depth dimension. In the height direction Y, the depth dimension of the SA accommodation region 150 is larger than any of the depth dimensions of the base end recess portions 792. The depth dimension of the plurality of base end recess portions 792 may be uniform. The depth dimension of the SA accommodation region 150 may be smaller than the depth dimension of the at least one base end recess portion 792.

The base end projection portion 793 extends in the height direction Y from the first base end surface 791 toward the side opposite from the housing tip end surface 21*a*. That is, the base end projection portion 793 extends from the first base end surface 791 toward the side opposite from the base end recess portion 792. The base end projection portion 793 extends toward the housing base end side from at least the recess outer peripheral portion 795 of the recess partition portion 794 and the recess outer peripheral portion 795. The plurality of base end projection portions 793 are arranged along the outer peripheral edge of the first base end surface 791.

As shown in FIG. 47, the second housing portion 152 includes a second base portion 797 and a second extending portion 798. The second base portion 797 is a portion forming the housing base end surface 21*b* and overlapping the first base end surface 791 of the first housing portion 151. In the height direction Y, the thickness dimension of the second base portion 797 is smaller than the height dimension of the connector portion 28. The second extending portion 798 extends in the height direction Y from the second base portion 797 toward the housing tip end side. The second housing portion 152 has a plurality of second extending portions 798, and each of the second extending portions 798 enters the inside of the base end recess portion 792.

In the manufacturing process of the second housing portion 152, the molten resin filled in the base end recess portion 792 is solidified to form the second extending portion 798. As described above, since the second extending portion 798 has a shape and a size corresponding to the base end recess portion 792, similarly to the first housing portion 151, the second housing portion 152 does not become one resin clump. For this reason, it is less likely to happen that when the second housing portion 152 is molded with resin, the second housing portion 152 is unintentionally deformed, air bubbles such as voids are generated in the second housing portion 152, and the like. There is a concern that when air bubbles such as voids are generated in the first housing portion 151 and the second housing portion 152, the outside air, water, and the like come into contact with the connection terminal 620 and the lead terminal 53*a* through the air bubbles, which corrode the connection terminal 620 and the lead terminal 53*a*.

The contact area between the first housing portion 151 and the second housing portion 152 is enlarged by the base end recess portion 792 and the second extending portion 798, so that the first housing portion 151 and the second housing portion 152 are easily in close contact with each other. As shown in FIGS. 47 to 51 and FIGS. 54 to 57, the first housing portion 151 has the outer wall projection portion 796, and the contact area between the first housing portion 151 and the second housing portion 152 is also enlarged by the outer wall projection portion 796. The outer wall projection portion 796 is a projection portion provided on the outer wall surface of the recess outer peripheral portion 795, and extends in directions X and Z orthogonal to the height direction Y. The outer wall projection portion 796 has an annular shape surrounding the recess outer peripheral portion 795, and a plurality of the outer wall projection portion 796 are arranged in the height direction Y. As described above, since the outer wall projection portion 796 projects in the width direction X and the depth direction Z, a restraining force is exerted against separation of the first housing portion 151 from the second housing portion 152 in the height direction Y.

Figure 48:
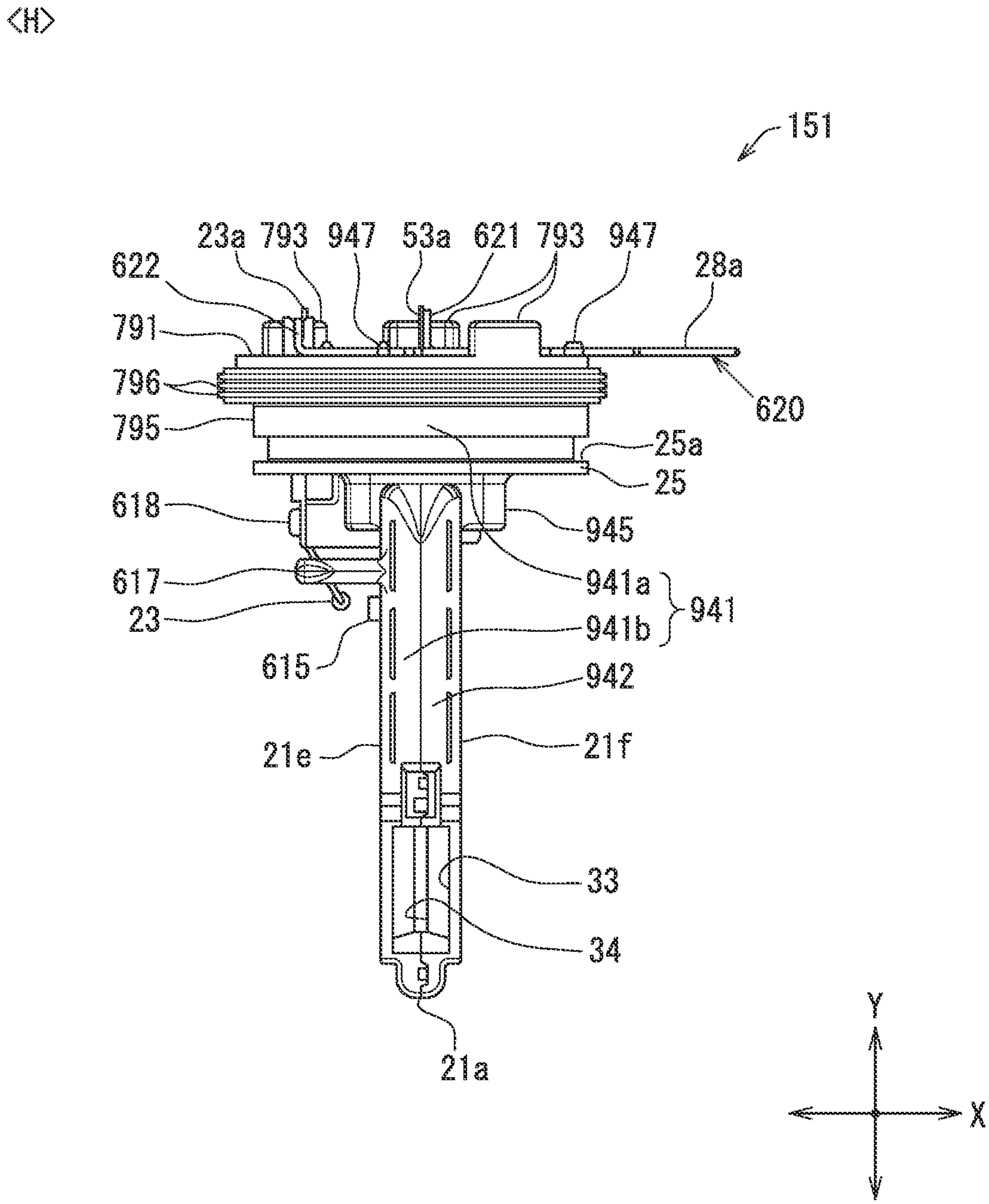
FIG. 48 is a view of the first housing portion in a state of being equipped with the sensor SA and the connection terminal, as viewed from the passage entrance side.
Figure 49:
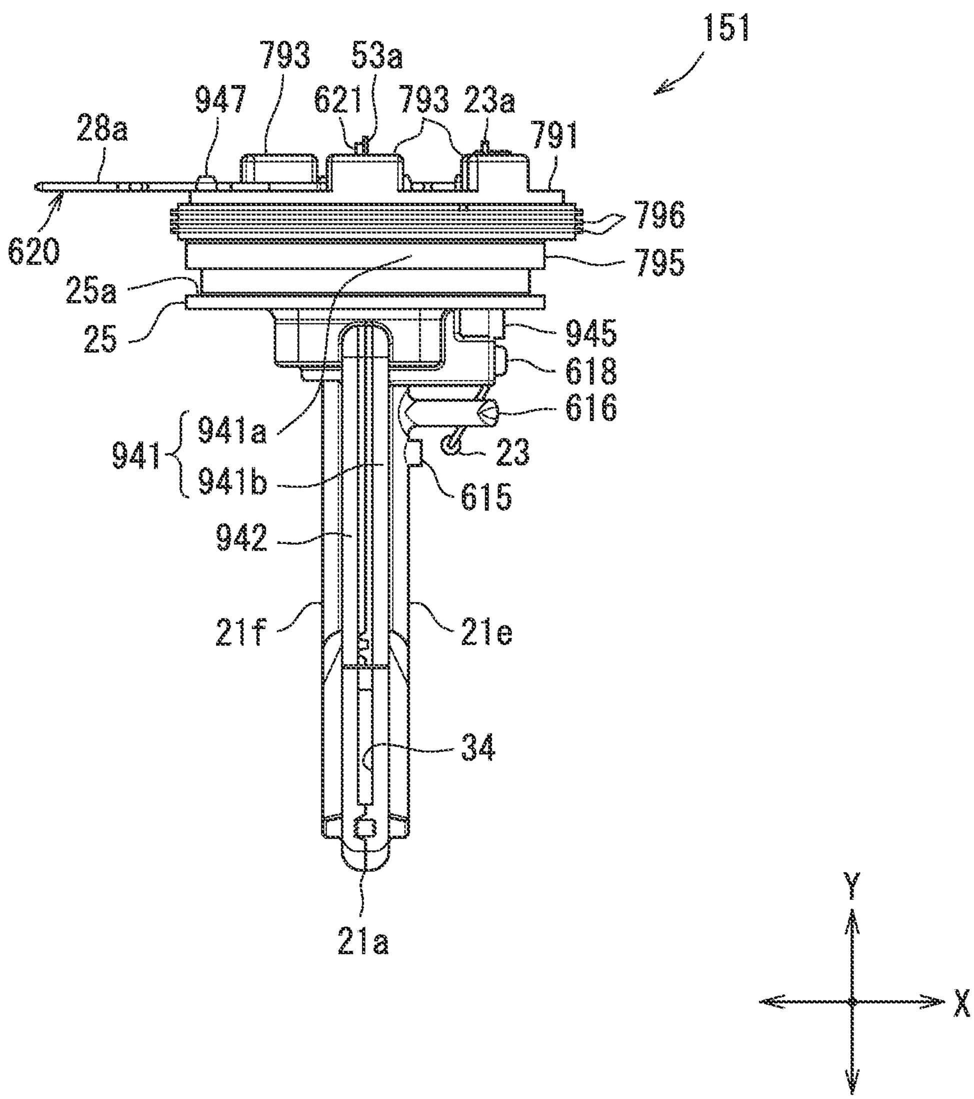
FIG. 49 is a view of the first housing portion in a state of being equipped with the sensor SA and the connection terminal, as viewed from the passage exit side.
Figure 50:
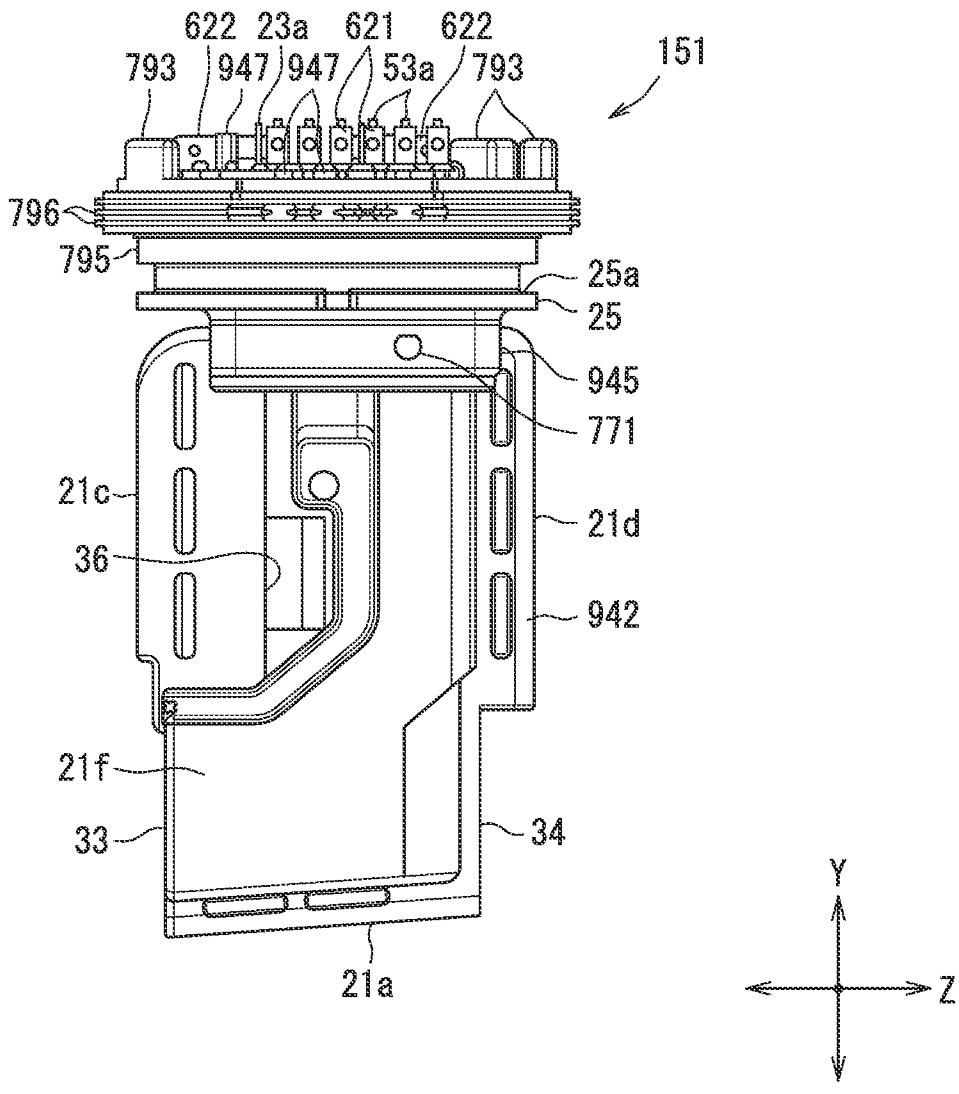
FIG. 50 is a view of the first housing portion in a state of being equipped with the sensor SA and the connection terminal, as viewed from a housing back side.
Figure 51:
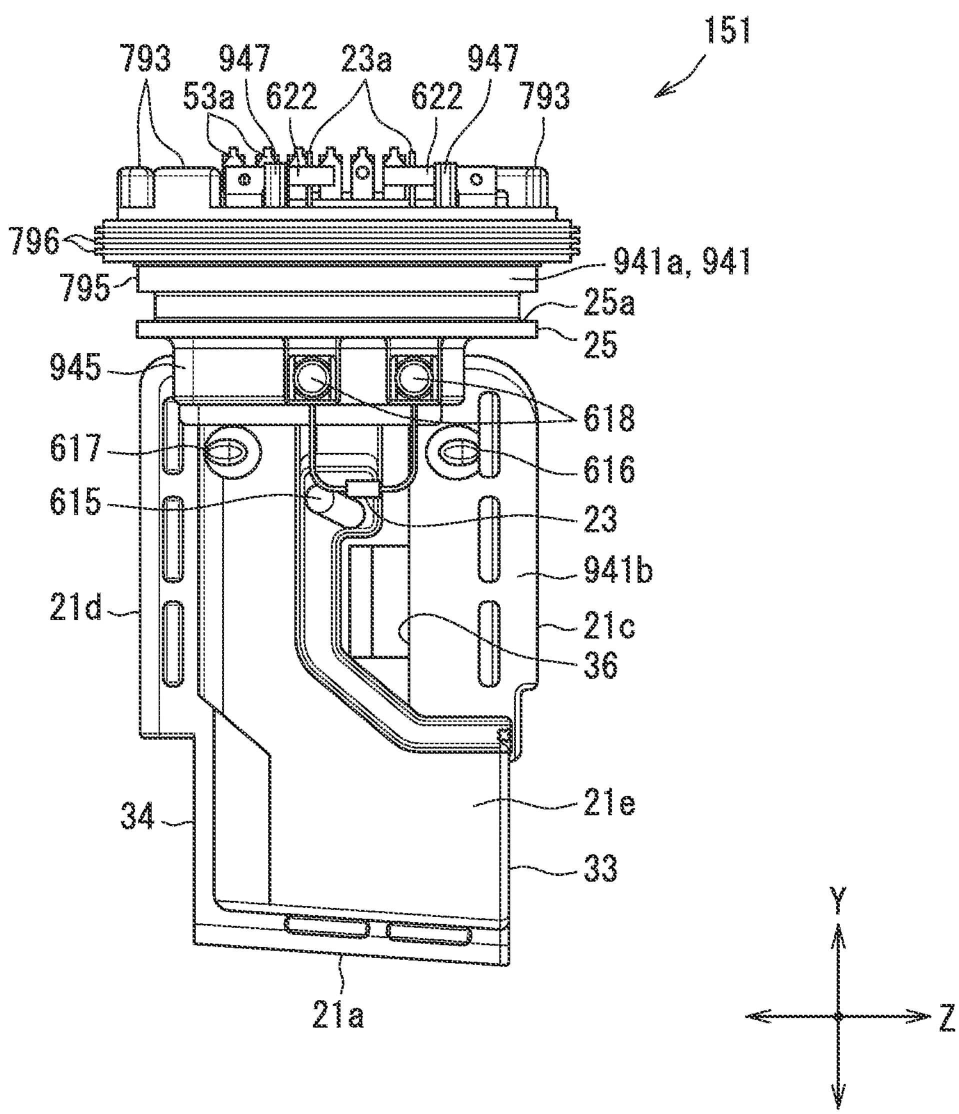
FIG. 51 is a view of the first housing portion in a state of being equipped with the sensor SA and the connection terminal, as viewed from a housing front side.

As shown in FIGS. 47, 48, and 49, the first housing portion 151 includes a front side member 941 and a back side member 942. The first housing portion 151 is a flow path formation portion forming the bypass flow path 30, the front side member 941 forms the bypass flow path 30 from the housing front side, and the back side member 942 forms the bypass flow path 30 from the housing back side. The outer surface of the front side member 941 includes a portion forming the housing front surface 21*e*, and the outer surface of the back side member 942 includes a portion forming the housing back surface 21*f*. The inner surface of the front side member 941 and the inner surface of the back side member 942 include a formation surface that forms the bypass flow path 30.

The front side member 941 includes a region formation portion 941*a* and a flow path formation portion 941*b*. The region formation portion 941*a* forms the SA accommodation region 150, and the flow path formation portion 941*b* forms the bypass flow path 30. The flow path formation portion 941*b* extends from the region formation portion 941*a* toward the housing tip end side. The flow path formation portion 941*b* includes the tip end protection projection portion 615, the upstream protection projection portion 616, the downstream protection projection portion 617, the lead support portion 618, and the seal holding portion 25. The back side member 942 is provided side by side in the width direction X in the flow path formation portion 941*b* on the housing tip end side of the region formation portion 941*a*. As described above, since the back side member 942 forms the bypass flow path 30 together with the flow path formation portion 941*b*, the back side member 942 can be referred to as a flow path formation portion. The flow path formation portion 941*b* of the front side member 941 and the back side member 942 are in a state of dividing in the width direction a portion of the first housing portion 151 on the housing tip end side relative to the region formation portion 941*a*.

The region formation portion 941*a* includes the seal holding portion 25, the upstream protection projection portion 616, the downstream protection projection portion 617, the recess partition portion 794, and the recess outer peripheral portion 795. In the region formation portion 941*a*, the seal holding portion 25 is formed by the recess outer peripheral portion 795.

Instead of the front side member 941, the back side member 942 may form the SA accommodation region 150. For example, the region formation portion forming the SA accommodation region 150 may be included in the back side member 942. This region formation portion may be a member independent of both the front side member 941 and the back side member 942, and the first housing portion 151 may be formed by assembling this member, the front side member 941, and the back side member 942 to one another.

Figure 54:
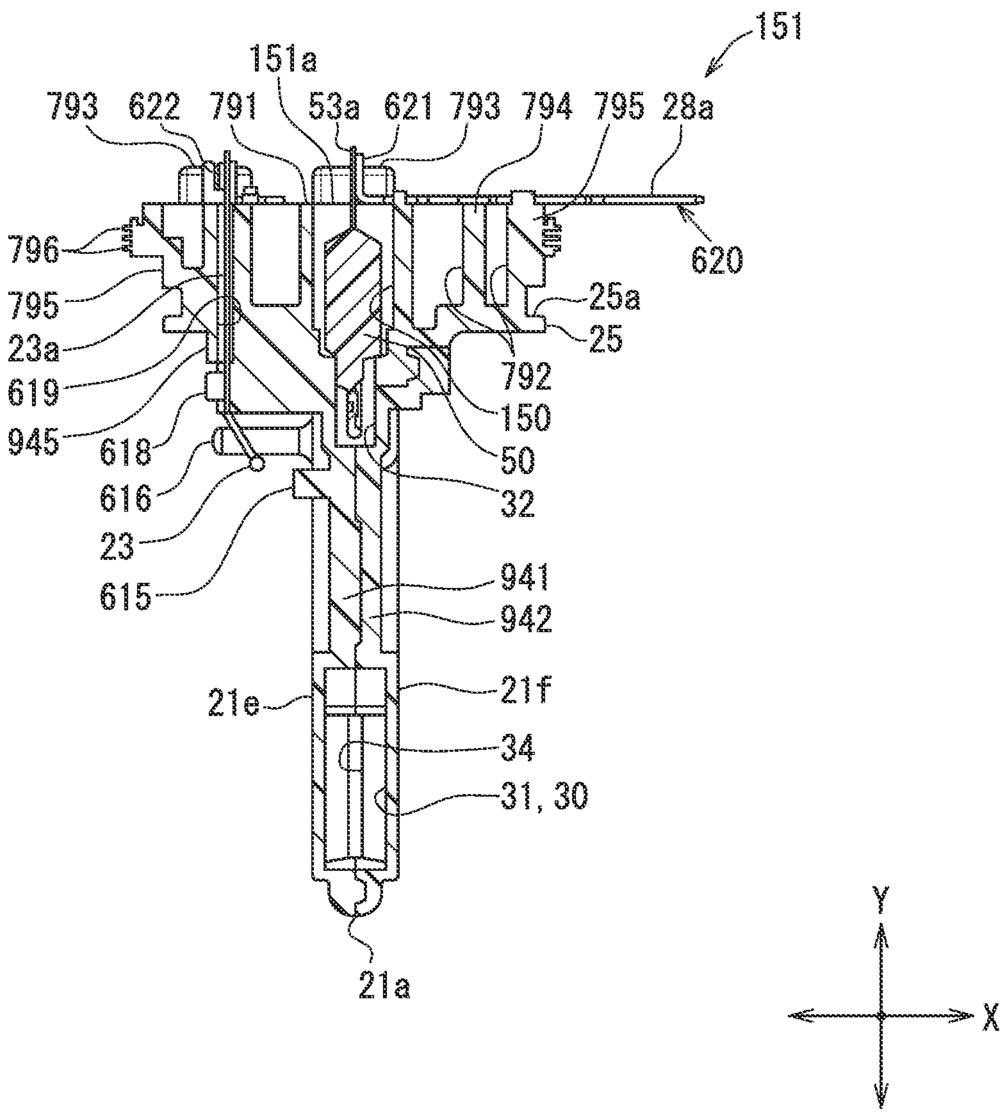
FIG. 54 is a cross-sectional view taken along a line LIV-LIV of FIG. 52.
Figure 55:
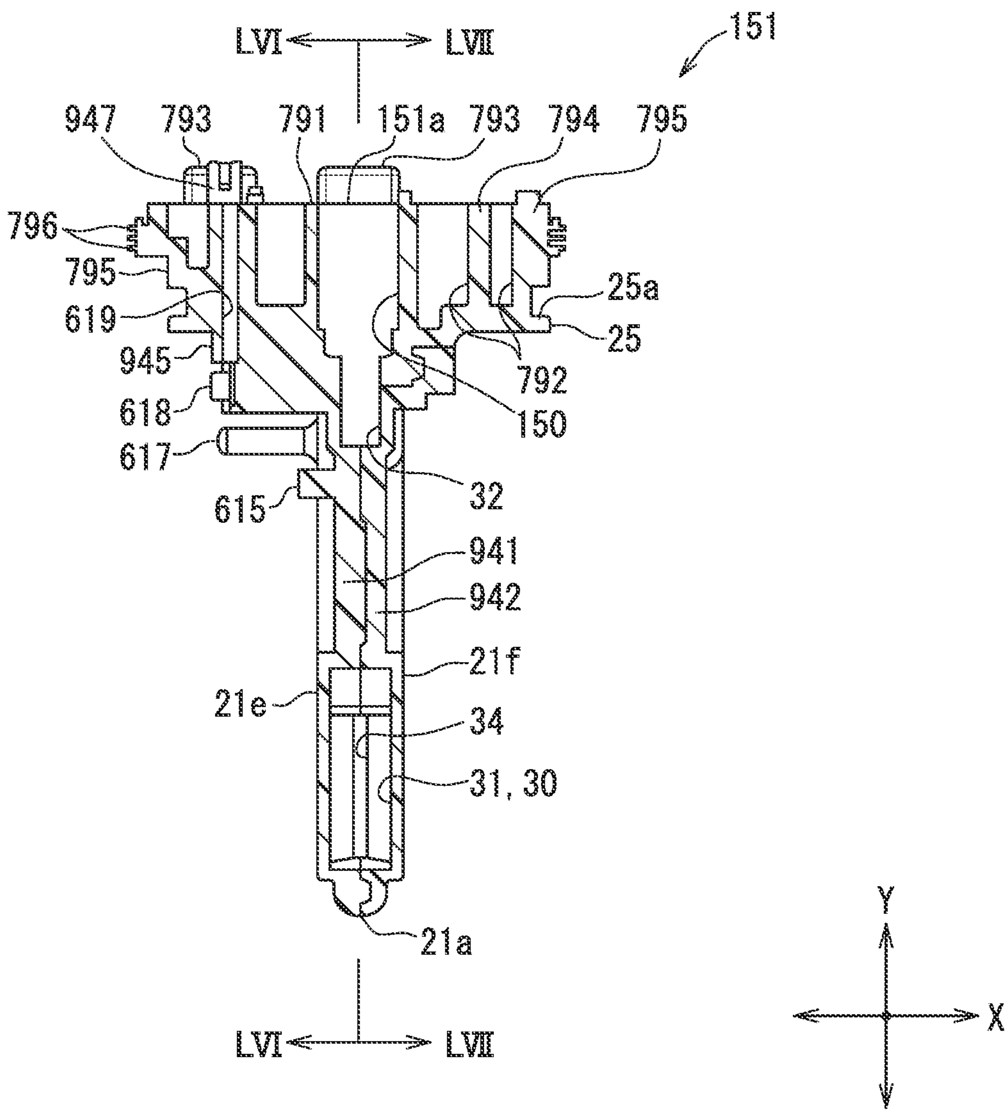
FIG. 55 is a view of the first housing portion in a state of not being equipped with the sensor SA and the connection terminal in FIG. 54.

As shown in FIGS. 47, 54, and 55, the housing 21 has a lead insertion hole 619. The lead insertion hole 619 is provided in the first housing portion 151 and extends in the height direction Y from the lead support portion 618 toward the first base end surface 791. The lead insertion hole 619 is opened toward the housing base end side on the first base end surface 791. In this case, an end portion of the lead insertion hole 619 on the housing base end side is provided on the first base end surface 791. The lead wire 23*a* extending from the intake air temperature sensor 23 is inserted into the lead insertion hole 619. The lead insertion hole 619 is closed in the lead support portion 618.

As shown in FIG. 55, before the intake air temperature sensor 23 and the lead wire 23*a* are assembled to the first housing portion 151, the lead insertion hole 619 penetrates at least the lead support portion 618 in the height direction Y. In this state, the lead insertion hole 619 penetrates the first housing portion 151 in the height direction Y, and is opened toward the housing tip end side via the lead support portion 618. In a state where the lead wire 23*a* is inserted from the end portion on the lead support portion 618 side, the above-described thermal caulking is performed on the lead support portion 618, whereby the lead insertion hole 619 is closed by the lead support portion 618, and the lead wire 23*a* is fixed to the lead support portion 618. As described above, the lead support portion 618 has a function as a closing portion that closes the lead insertion hole 619 in addition to the function of supporting the lead wire 23*a*.

The lead support portion 618 closes the lead insertion hole 619. Therefore, it is restricted that when the molten resin flows into the lead insertion hole 619 along with resin molding of the second housing portion 152, the molten resin leaks from the lead insertion hole 619 in the lead support portion 618. In a state where the air flow meter 20 is installed in the intake passage 12, the lead support portion 618 restricts that air, water, and the like from entering the lead insertion hole 619 from the intake passage 12. Therefore, the lead wire 23*a*, the connection terminal 620, and the lead terminal 53*a* are less likely to corrode inside the housing 21.

Unlike the present embodiment, for example, a configuration is assumed in which the lead insertion hole 619 is closed in the lead support portion 618 by injecting a sealing material into the lead insertion hole 619. In this configuration, an epoxy adhesive or a silicon adhesive can be used as the sealing material. On the other hand, as in the present embodiment, in the configuration where the lead insertion hole 619 is closed by thermal caulking, it is not necessary to use a sealing material to close the lead insertion hole 619. Therefore, it is possible to reduce the material cost by the amount of the sealing material.

As shown in FIGS. 47, 54, and 55, the housing 21 has a housing bulging portion 945. The housing bulging portion 945 is a portion projecting so as to bulge from the seal holding portion 25 toward the housing tip end side. The housing bulging portion 945 has a portion projecting from the housing front surface 21*e* toward the housing front side and a portion projecting from the housing back surface 21*f* toward the housing back side. The housing front surface 21*e* and the housing back surface 21*f* extend from the housing bulging portion 945 toward the housing tip end side. The SA accommodation region 150 penetrates the housing bulging portion 945 in the height direction Y. The housing bulging portion 945 is formed by both the front side member 941 and the back side member 942. The housing bulging portion 945 is provided with the lead support portion 618 and the gate mark 771 (see FIG. 50).

Figure 52:
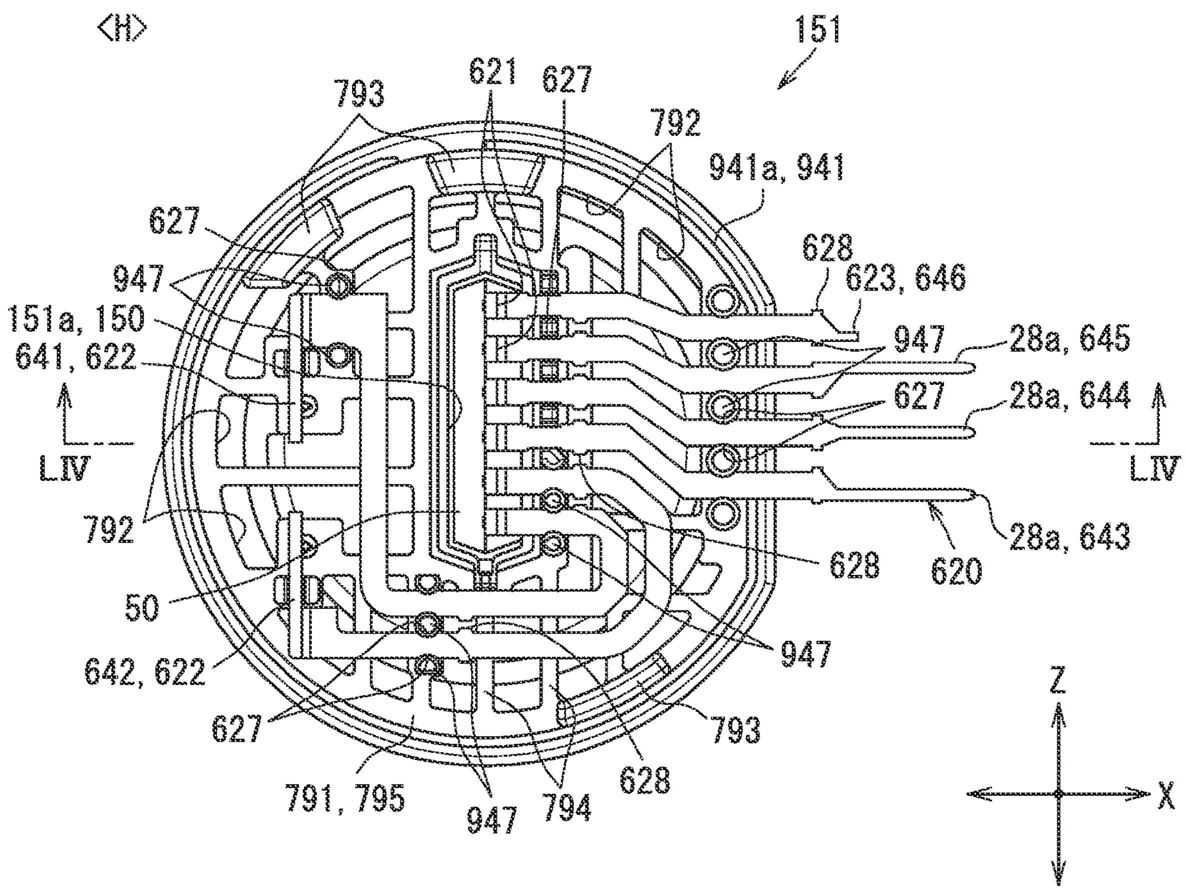
FIG. 52 is a view of the first housing portion in a state of being equipped with the sensor SA and the connection terminal, as viewed from a housing base end side.
Figure 53:
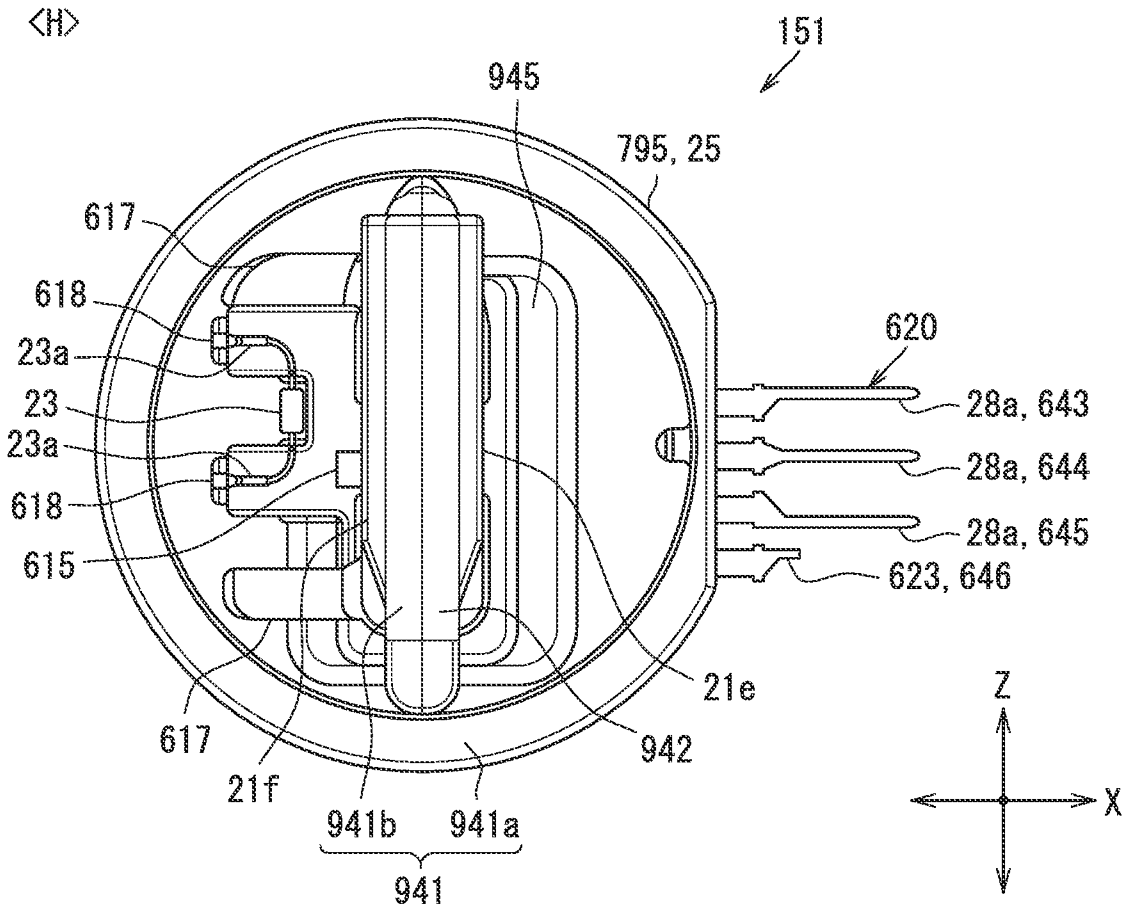
FIG. 53 is a view of the first housing portion in a state of being equipped with the sensor SA and the connection terminal, as viewed from a housing tip end side.

As shown in FIGS. 52 and 54, the connection terminal 620 extends along the first base end surface 791. In this state, as shown in FIGS. 52, 53, and 54, the connector terminal 28*a* and the adjustment connection terminal 623 of the connection terminal 620 project laterally from the first base end surface 791 in the directions X and Z orthogonal to the height direction Y. Specifically, the connector terminal 28*a* and the adjustment connection terminal 623 project from the first base end surface 791 to the housing front side. In this case, in the directions X and Z orthogonal to the height direction Y, the terminal members 643 to 646 project in the width direction X from the first base end surface 791, while the first terminal member 641 and the second terminal member 642 do not project in the width direction X from the first base end surface 791. In the terminal members 643 to 646, in addition to the connector terminal 28*a* and the adjustment connection terminal 623, each terminal intermediate portion 624 projects from the first base end surface 791 in the width direction X.

In FIGS. 52 and 54, in the manufacturing process of the housing 21, the connection terminal 620 is installed on the first base end surface 791, and the connection terminal 620 is connected to the lead terminal 53*a* and the lead wire 23*a* by welding or the like. The second housing portion 152 is molded with resin in a state where the connection terminal 620 is placed on the first base end surface 791. In this resin molding, the connection terminal 620 is sealed with the first housing portion 151 and the second housing portion 152 such that the connector terminal 28*a* is exposed to the connector recess portion 28*b*.

As shown in FIGS. 19 and 52, the first housing portion 151 includes a terminal holding portion 947. A plurality of terminal holding portions 947 are provided on the first base end surface 791. The terminal holding portion 947 is a portion that holds the position of the connection terminal 620 in a state where the connection terminal 620 is placed on the first base end surface 791. The terminal holding portion 947 is a projection portion provided on the first base end surface 791, and restricts positional displacement of the connection terminal 620 relative to the first base end surface 791. The terminal holding portion 947 is provided in both the recess partition portion 794 and the recess outer peripheral portion 795, and extends from the recess partition portion 794 and the recess outer peripheral portion 795 toward the housing base end side. The terminal holding portion 947 restricts the movement of the connection terminal 620 at least in the width direction X and the depth direction Z.

The terminal members 641 to 646 are positionally held by the terminal holding portion 947 in the first housing portion 151. The terminal holding portion 947 is in a state of entering inside the terminal recess portion 627 of the terminal members 641 to 646, and in this state, the terminal holding portion 947 and the terminal recess portion 627 are in a state of being caught with each other. For example, since the terminal members 641 to 646 enter between the two terminal holding portions 947 arranged in the depth direction Z, movement in the depth direction Z is restricted by these terminal holding portions 947. Since the terminal holding portion 947 enters the terminal recess portion 627, the movement of the terminal intermediate portion 624 in the width direction X is restricted by the terminal holding portion 947.

In the first housing portion 151, the recess partition portion 794 includes a terminal along portion 794*a*. The terminal along portion 794*a* extends in the width direction X and the depth direction Z along the terminal intermediate portion 624, and an end surface of the terminal along portion 794*a* on the housing tip end side is included in the first base end surface 791. The terminal intermediate portion 624 is placed on the terminal along portion 794*a*. In this case, the terminal along portion 794*a* supports the terminal intermediate portion 624 from the housing tip end side. For example, the terminal along portion 794*a* extends from the recess outer peripheral portion 795 toward the housing opening portion 151*a*.

Figure 56:
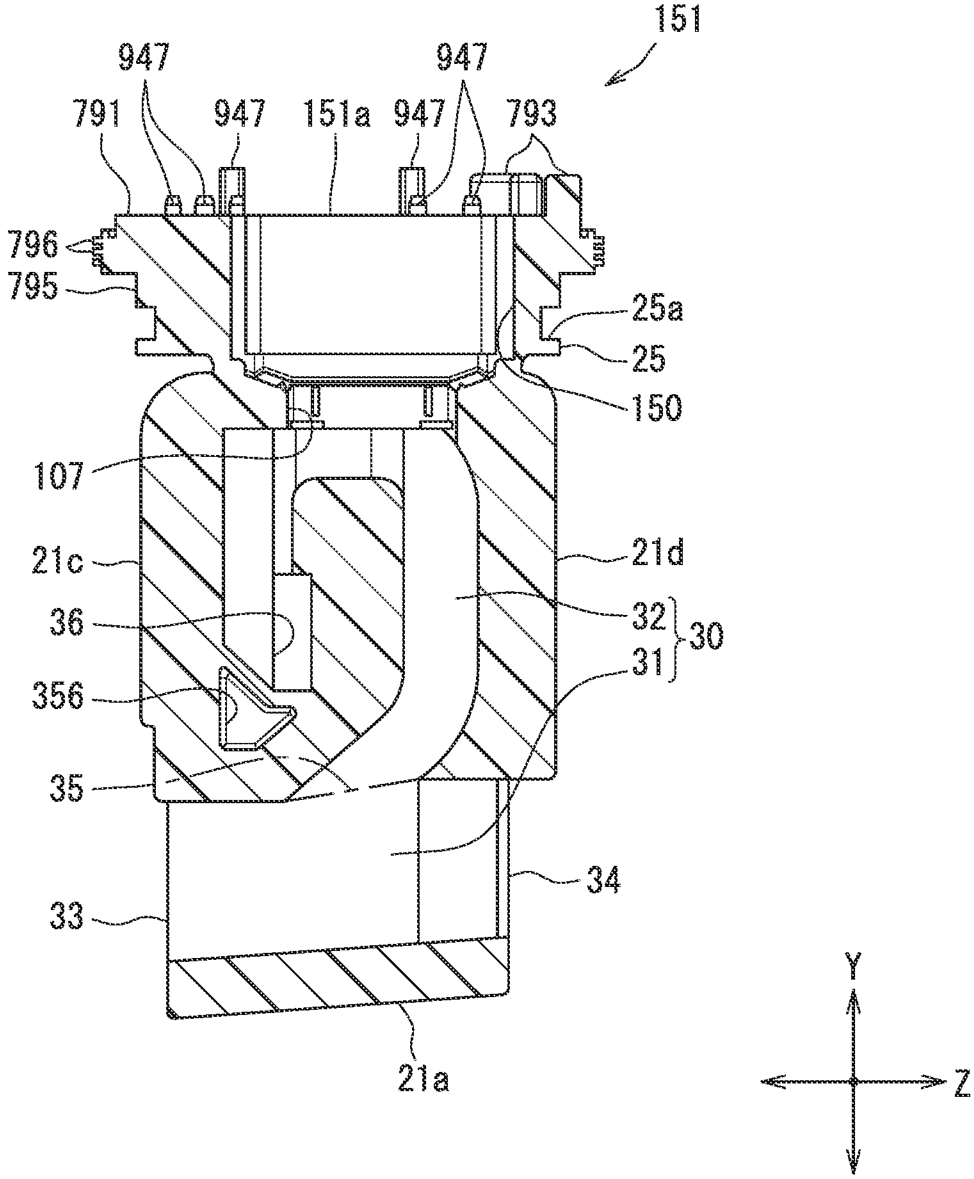
FIG. 56 is a cross-sectional view taken along a line LVI-LVI of FIG. 55.
Figure 57:
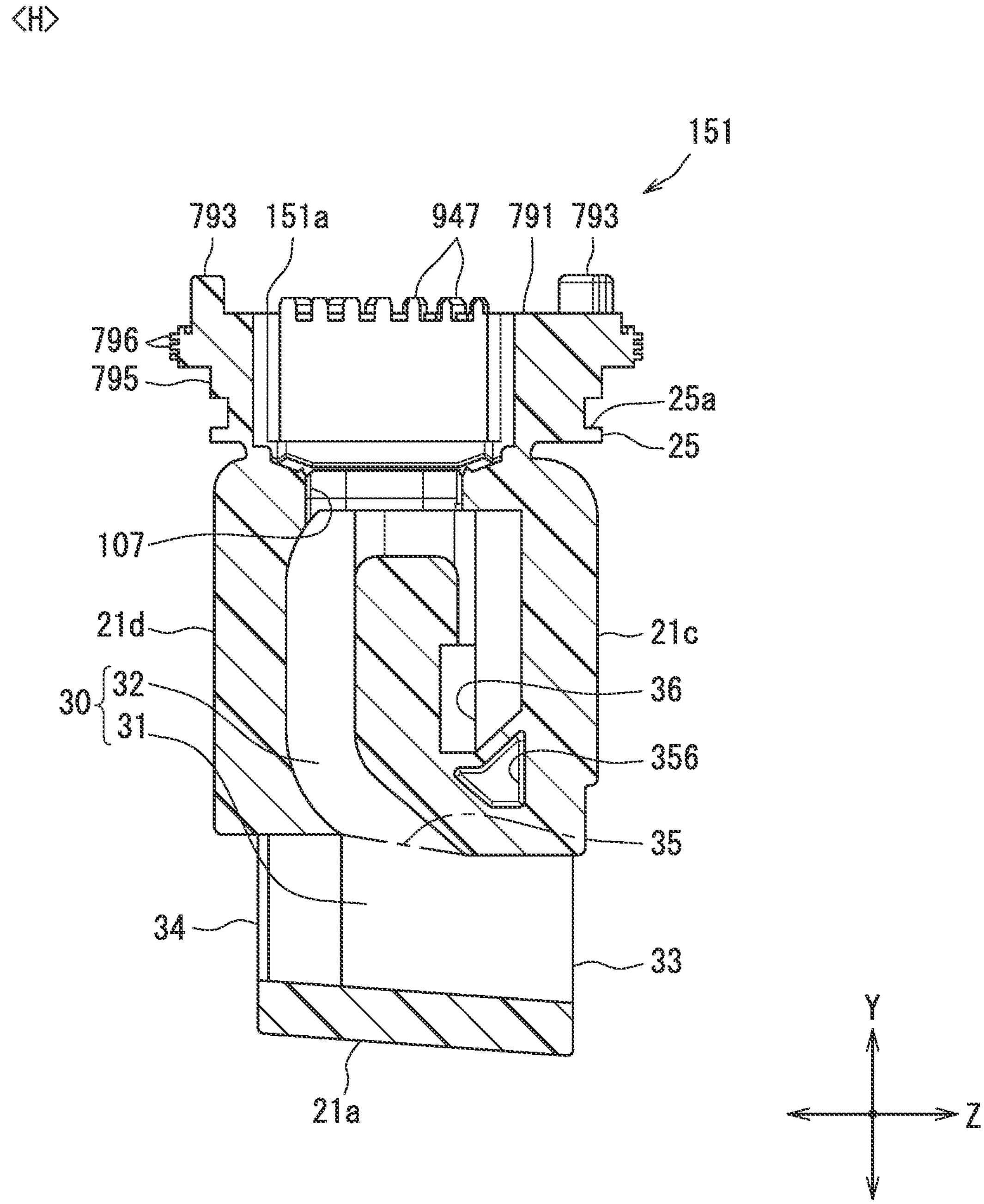
FIG. 57 is a cross-sectional view taken along a line LVII-LVII of FIG. 55.

As shown in FIGS. 56 and 57, in a state where the sensor SA50 is not mounted to the first housing portion 151, the measurement flow path 32 is opened toward the housing base end side via the SA insertion hole 107, the SA accommodation region 150, and the housing opening portion 151*a*.

Second Embodiment

In the first embodiment, the housing opening portion 151*a* communicating with the SA accommodation region 150 is provided on the housing base end side relative to the first housing portion 151. On the other hand, in the second embodiment, a base opening portion 291*a* communicating with an SA accommodation region 290 is provided on the housing front side of a base member 291. In the present embodiment, the combustion system 10 includes an air flow meter 200 as a physical quantity measurement device instead of the air flow meter 20. In the present embodiment, components denoted by the same reference numerals as those in the drawings in the first embodiment and configurations that will not be described are similar to those in the first embodiment, and achieve the same functions and effects. In the present embodiment, differences from the first embodiment will be mainly described.

Figure 58:
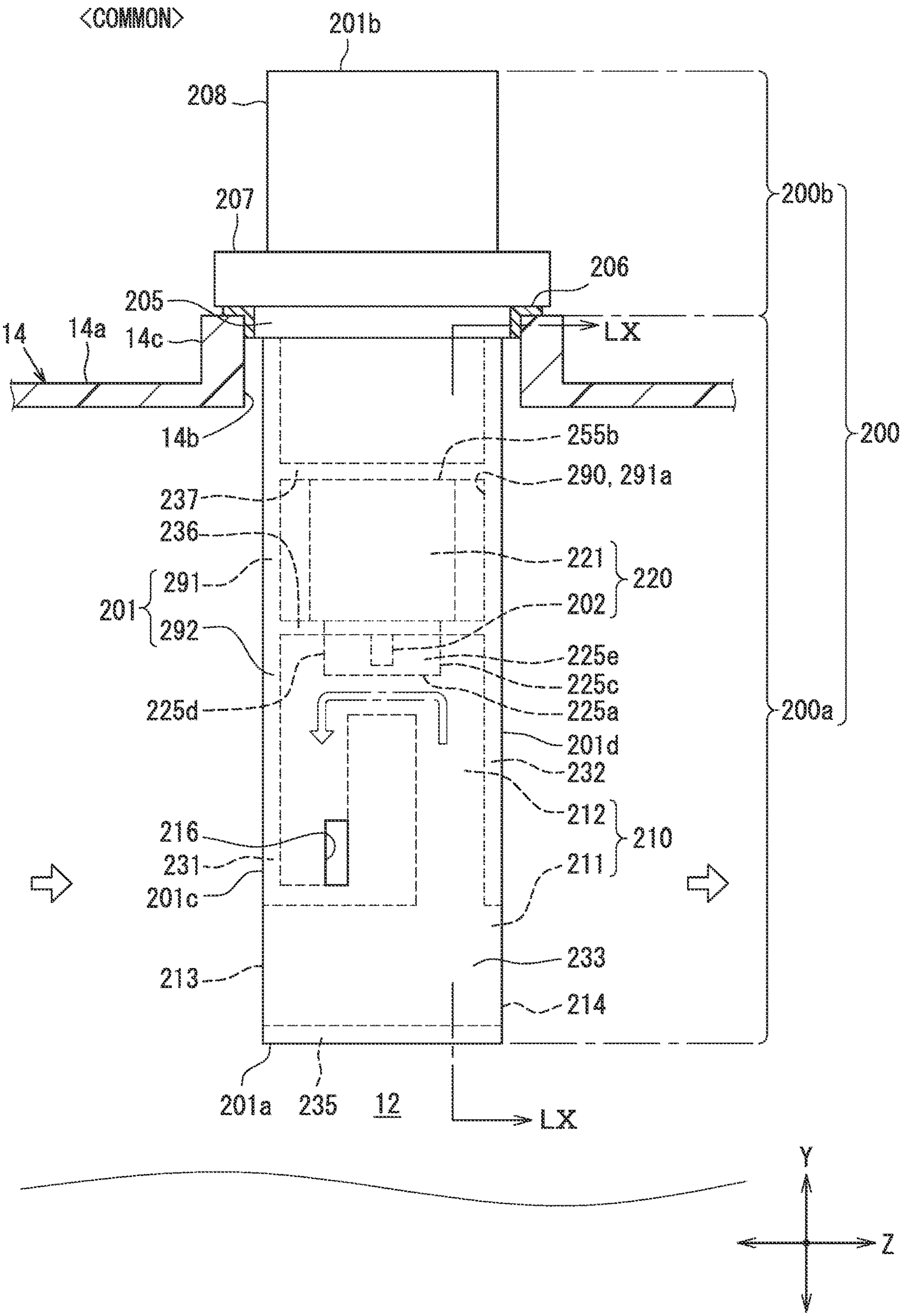
FIG. 58 is a side view of the air flow meter in a state of being attached to the intake pipe according to the second embodiment.
Figure 59:
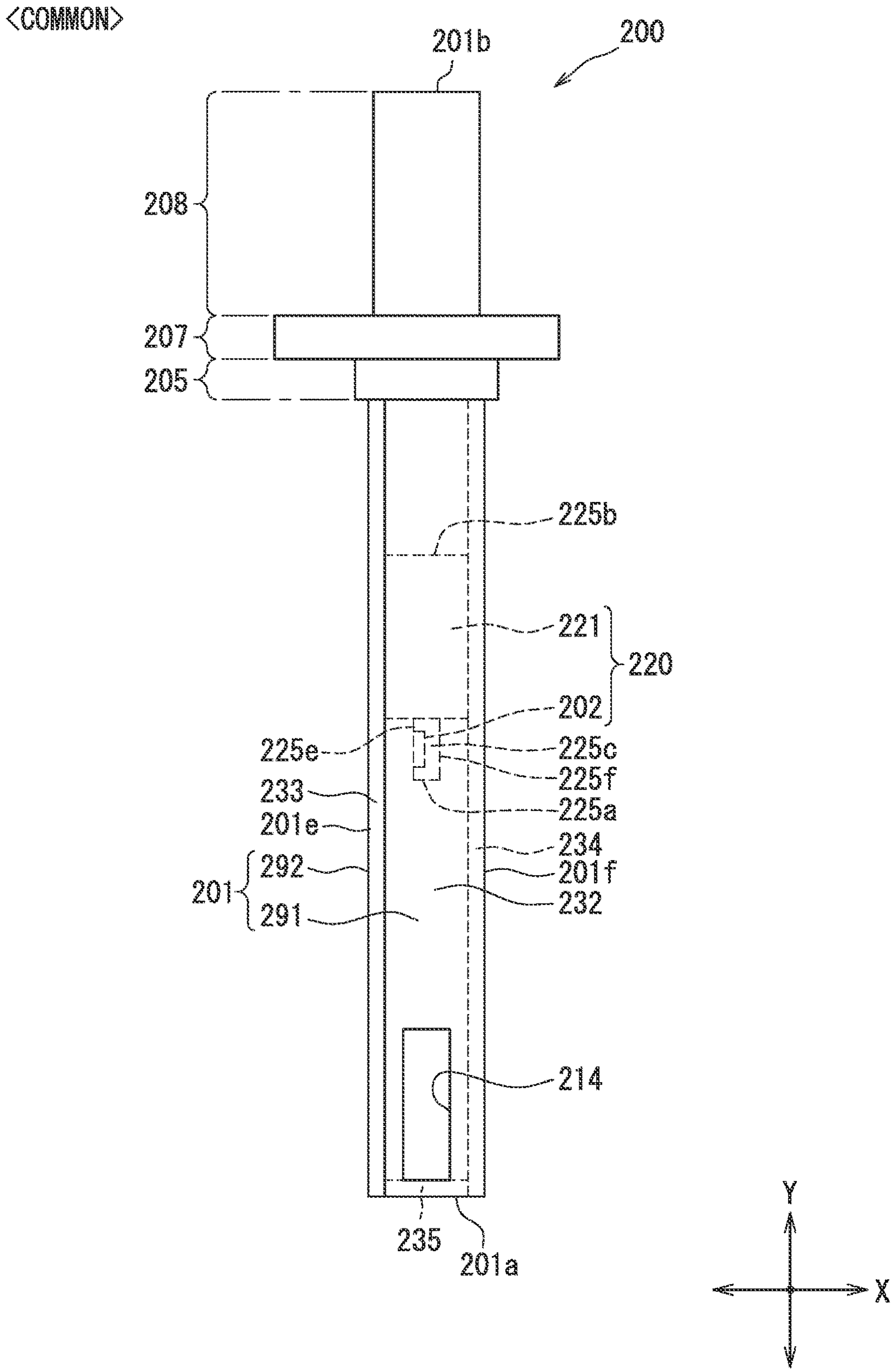
FIG. 59 is a front view of the air flow meter.

As shown in FIGS. 58 and 59, the air flow meter 200 is provided in the intake passage 12. Similarly to the air flow meter 20 of the first embodiment, the air flow meter 200 is a physical quantity measurement device that measures a physical quantity, and is attached to the piping unit 14 (see FIGS. 2 and 8).

The air flow meter 200 has an entering portion 200*a* that enters the intake passage 12 and a protruding portion 200*b* that protrudes to the outside from the pipe flange 14*c* without entering the intake passage 12. The entering portion 200*a* and the protruding portion 200*b* are arranged in the height direction Y.

The air flow meter 200 includes a housing 201 and a flow sensor 202 that detects the flow rate of intake air. The housing 201 is formed of, for example, a resin material or the like. The flow sensor 202 is accommodated in the housing 201. In the air flow meter 200, since the housing 201 is attached to the intake pipe 14*a*, the flow sensor 202 can come into contact with the intake air flowing through the intake passage 12.

The housing 201 is attached to the piping unit 14 as an attachment target. On the outer surface of the housing 201, of a pair of end surfaces 201*a* and 201*b* arranged in the height direction Y, the end surface included in the entering portion 200*a* is referred to as the housing tip end surface 201*a*, and the end surface included in the protruding portion 200*b* is referred to as the housing base end surface 201*b*. The housing tip end surface 201*a* and the housing base end surface 201*b* are orthogonal to the height direction Y.

On the outer surface of the housing 201, a surface disposed on the upstream side relative to the intake passage 12 is referred to as a housing upstream surface 201*c*, and a surface disposed on the opposite side of the housing upstream surface 201*c* is referred to as a housing downstream surface 201*d*. One of a pair of surfaces facing each other with the housing upstream surface 201*c* and the housing base end surface 201*b* interposed therebetween is referred to as a housing front surface 201*e*, and the other is referred to as a housing back surface 201*f*. The housing front surface 201*e* is a surface on a side where the flow sensor 202 is provided in a sensor SA220 to be described later.

As for the housing 201, in the height direction Y, the housing tip end surface 201*a* side may be referred to as a housing tip end side, and the housing base end surface 201*b* side may be referred to as a housing base end side. In a depth direction Z, the housing upstream surface 201*c* side may be referred to as a housing upstream side, and the housing downstream surface 201*d* side may be referred to as a housing downstream side. In a width direction X, the housing front surface 201*e* side may be referred to as a housing front side, and the housing back surface 201*f* side may be referred to as a housing back side.

Figure 60:
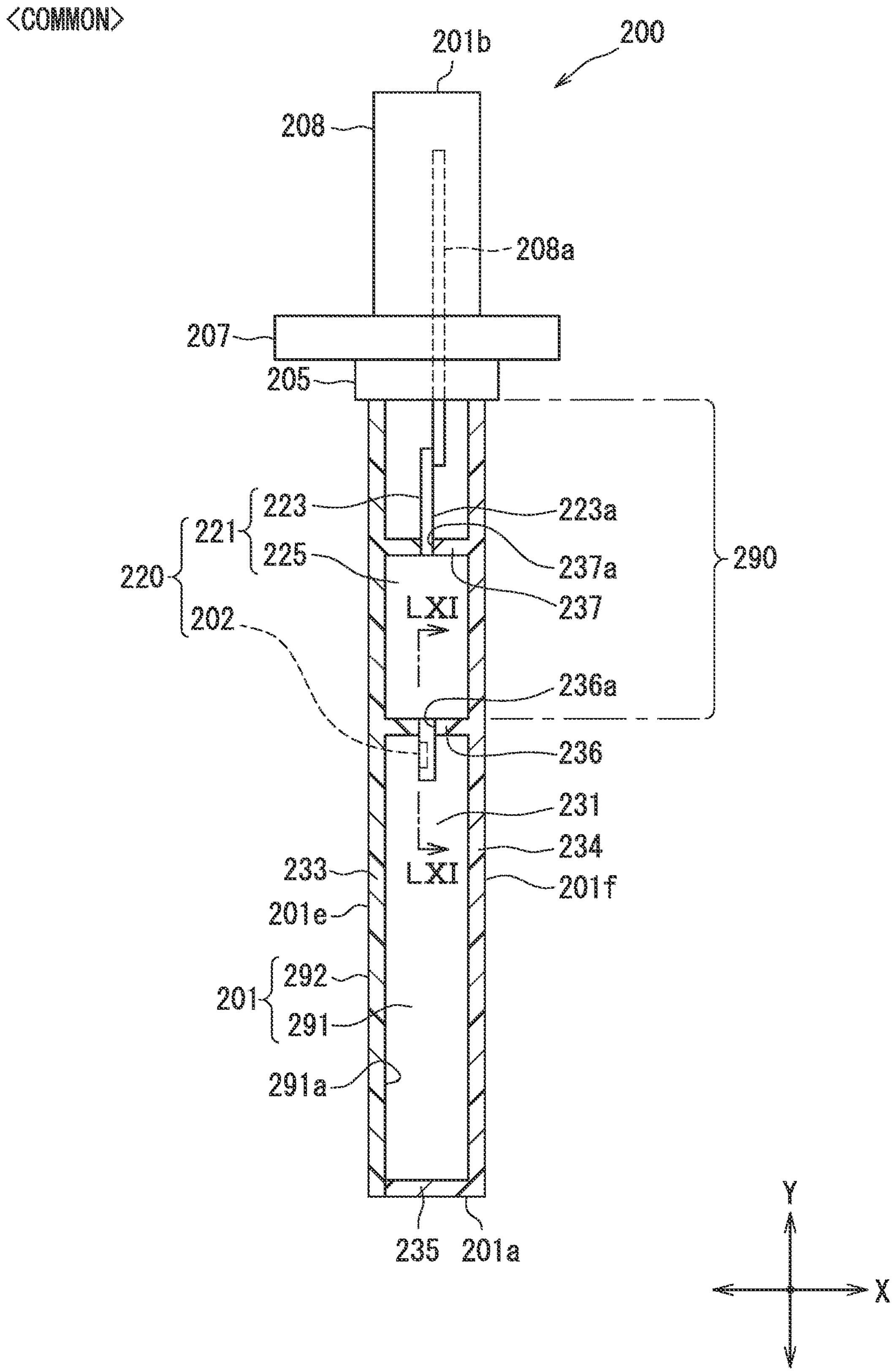
FIG. 60 is a cross-sectional view taken along a line LX-LX of FIG. 58.

As shown in FIGS. 58, 59, and 60, the housing 201 includes a seal holding portion 205, a flange portion 207, and a connector portion 208. The air flow meter 200 includes a seal member 206, and the seal member 206 is attached to the seal holding portion 205.

The seal holding portion 205 is provided inside the pipe flange 14*c* and holds the seal member 206 so as not to be displaced in the height direction Y. The seal holding portion 205 is included in the entering portion 200*a* of the air flow meter 200. The seal member 206 is a member such as an O-ring that seals the intake passage 12 inside the pipe flange 14*c*, and is in close contact with both the outer peripheral surface of the seal holding portion 205 and the inner peripheral surface of the pipe flange 14*c*. The connector portion 208 is a protection portion that protects a connector terminal 208*a* electrically connected to the flow sensor 202. The connector terminal 208*a* is electrically connected to the ECU 15 by connecting electric wiring extending from the ECU 15 to the connector portion 208 via a plug portion. For example, the connector terminal 208*a* is electrically and mechanically connected to the plug terminal of the plug portion. The flange portion 207 and the connector portion 208 are included in the protruding portion 200*b* of the air flow meter 200.

The housing 201 has a bypass flow path 210. The bypass flow path 210 is provided inside the housing 201 and is formed by at least a part of the internal space of the housing 201. The inner surface of the housing 201 forms the bypass flow path 210 and is a formation surface.

The bypass flow path 210 is disposed in the entering portion 200*a* of the air flow meter 200. The bypass flow path 210 includes a passage flow path 211 and a measurement flow path 212. The measurement flow path 212 is in a state where the flow sensor 202 of the sensor SA220 described later and a portion around the flow sensor 202 enter. The passage flow path 211 is formed by the inner surface of the housing 201. The measurement flow path 212 is formed by the outer surface of a part of the sensor SA220 in addition to the inner surface of the housing 201. The intake passage 12 can be referred to as a main passage, and the bypass flow path 210 can be referred to as a sub-passage.

The passage flow path 211 penetrates the housing 201 in the depth direction Z. The passage flow path 211 has a passage entrance 213, which is an upstream end portion thereof, and a passage exit 214, which is a downstream end portion thereof. The measurement flow path 212 is a branch flow path branched from an intermediate portion of the passage flow path 211, and the flow sensor 202 is provided in this measurement flow path 212. The measurement flow path 212 has a measurement entrance 215, which is an upstream end portion thereof, and a measurement exit 216, which is a downstream end portion thereof. The portion where the measurement flow path 212 branches from the passage flow path 211 is a boundary portion between the passage flow path 211 and the measurement flow path 212, and the measurement entrance 215 is included in this boundary portion. The boundary portion between the passage flow path 211 and the measurement flow path 212 can also be referred to as a flow path boundary portion.

The measurement flow path 212 extends from the passage flow path 211 toward the housing base end side. The measurement flow path 212 is provided between the passage flow path 211 and the housing base end surface 201*b*. The measurement flow path 212 is bent such that a portion between the measurement entrance 215 and the measurement exit 216 bulges toward the housing base end side. The measurement flow path 212 has a portion curved so as to be continuously bent, a portion refracted so as to be bent stepwise, a portion extending straight in the height direction Y and the depth direction Z, and the like.

The air flow meter 200 has a sensor subassembly configured to include the flow sensor 202, and this sensor subassembly is referred to as the sensor SA220. The sensor SA220 is embedded in the housing 201 in a state where a part of the sensor SA220 enters the measurement flow path 212. In the air flow meter 200, the sensor SA220 and the bypass flow path 210 are arranged in the height direction Y. Specifically, the sensor SA220 and the passage flow path 211 are arranged in the height direction. The sensor SA220 corresponds to the detection unit. The sensor SA220 can also be referred to as a measurement unit or a sensor package.

The housing 201 includes an upstream wall portion 231, a downstream wall portion 232, a front wall portion 233, a back wall portion 234, and a tip end wall portion 235. The upstream wall portion 231 forms the housing upstream surface 201*c*, and the downstream wall portion 232 forms the housing downstream surface 201*d*. The front wall portion 233 forms the housing front surface 201*e*, and the back wall portion 234 forms the housing back surface 201*f*. The upstream wall portion 231 and the downstream wall portion 232 are provided at positions separated from each other in the depth direction Z, and the front wall portion 233 and the back wall portion 234 are provided at positions separated from each other in the width direction X. The measurement flow path 212 and an SA accommodation region 290 to be described later are provided between the upstream wall portion 231 and the downstream wall portion 232, and between the front wall portion 233 and the back wall portion 234. The tip end wall portion 235 forms the housing tip end surface 201*a*, and is provided at a position separated from the seal holding portion 205 in the height direction Y.

The housing 201 has a first intermediate wall portion 236 and a second intermediate wall portion 237. Similarly to the tip end wall portion 235, the intermediate wall portions 236 and 237 extend in a plate shape in the directions X and Z orthogonal to the height direction Y, and provided between the tip end wall portion 235 and the seal holding portion 205 in the height direction Y. The first intermediate wall portion 236 is provided between the tip end wall portion 235 and the second intermediate wall portion 237, and the bypass flow path 210 is provided between the first intermediate wall portion 236 and the tip end wall portion 235. The first intermediate wall portion 236 is provided between the measurement flow path 32 and the SA accommodation region 290, and partitions the measurement flow path 212 and the SA accommodation region 290 in the height direction Y. The second intermediate wall portion 237 is provided between the first intermediate wall portion 236 and the seal holding portion 205, and partitions the SA accommodation region 290 in the height direction Y.

The first intermediate wall portion 236 is provided with a first intermediate hole 236*a*. The first intermediate hole 236*a* penetrates the first intermediate wall portion 236 in the height direction Y. The inner peripheral surface of the first intermediate wall portion 236 is included in the inner surface of the housing 201 and annularly extends along the peripheral edge portion of the first intermediate hole 236*a*. In the sensor SA220, a portion on the flow sensor 202 side penetrates the first intermediate hole 236*a* in the height direction Y. As a result, in the sensor SA220, the mold tip end surface 225*a* and the flow sensor 202 are installed in the measurement flow path 32, and the mold base end surface 225*b* is installed in the SA accommodation region 290.

The second intermediate wall portion 237 is provided with a second intermediate hole 237*a*. The second intermediate hole 237*a* penetrates the second intermediate wall portion 237 in the height direction Y. In the sensor SA220, the lead terminal 53*a* to be described later penetrates the second intermediate hole 237*a* in the height direction Y. As a result, in the sensor SA220, a mold portion 225 to be described later is disposed on the housing tip end side relative to the second intermediate wall portion 237, and at least the tip end portion of the lead terminal 53*a* is disposed on the housing base end side relative to the second intermediate wall portion 237.

In the SA accommodation region 290, the gap between the housing 201 and the sensor SA220 is filled with a filled portion not illustrated. The filled portion is formed of a thermosetting resin such as an epoxy resin, a urethane resin, or a silicon resin. Here, the SA accommodation region 290 is filled with a molten resin by potting in a state where the thermosetting resin is melted, and the molten resin is solidified as a potting resin to form the filled portion. The filled portion can also be referred to as a potting portion or a potting resin portion.

<Description of Configuration Group A>

The sensor SA220 includes a sensor support portion 221 in addition to the flow sensor 202. The sensor support portion 221 is attached to the housing 201 and supports the flow sensor 202. The sensor support portion 221 includes an SA substrate 223 and the mold portion 225. The SA substrate 223 is a substrate on which the flow sensor 202 is mounted, and the mold portion 225 covers at least a part of the flow sensor 202 and at least a part of the SA substrate 223. The SA substrate 223 can also be referred to as a lead frame.

The mold portion 225 is formed in a plate shape as a whole. In the mold portion 225, of a pair of end surfaces 225*a* and 225*b* arranged in the height direction Y, the end surface on the housing tip end side is referred to as the mold tip end surface 225*a*, and the end surface on the housing base end side is referred to as the mold base end surface 225*b*. The mold tip end surface 225*a* is a tip end portion of the mold portion 225 and the sensor support portion 221, and corresponds to the support tip end portion. The mold portion 225 corresponds to a protection resin portion.

In the mold portion 225, one of a pair of surfaces provided with the mold tip end surface 225*a* and the mold base end surface 225*b* interposed therebetween is referred to as a mold upstream surface 225*c*, and the other is referred to as a mold downstream surface 225*d*. The sensor SA220 is installed inside the housing 201 in an orientation in which the mold tip end surface 225*a* is disposed on the airflow tip end side and the mold upstream surface 225*c* is disposed on the upstream side relative to the measurement flow path 212 with respect to the mold downstream surface 225*d*.

The mold upstream surface 225*c* of the sensor SA220 is disposed on the upstream side relative to the mold downstream surface 225*d* in the measurement flow path 212. In the portion where the flow sensor 202 is provided in the measurement flow path 212, the flowing orientation of the air is opposite from the flowing orientation of the air in the intake passage 12 (see FIG. 8). Therefore, the mold upstream surface 225*c* is disposed on the downstream side relative to the mold downstream surface 225*d* in the intake passage 12. The air flowing along the flow sensor 202 flows in the depth direction Z, and this depth direction Z can also be referred to as a flow direction.

In the sensor SA220, the flow sensor 202 is exposed to one surface side of the sensor SA220. In the mold portion 225, the plate surface on the side where the flow sensor 202 is exposed is referred to as a mold front surface 225*e*, and the plate surface on the opposite side is referred to as a mold back surface 225*f*. One plate surface of the sensor SA220 is formed by the mold front surface 225*e*, and this mold front surface 225*e* corresponds to the support front surface and the mold back surface 225*f* corresponds to the support back surface.

The SA substrate 223 is a substrate formed of a metal material or the like in a plate shape as a whole, and has conductivity. The plate surface of the SA substrate 223 is orthogonal to the width direction X and extends in the height direction Y and the depth direction Z. The flow sensor 202 is mounted on the SA substrate 223. The SA substrate 223 forms a lead terminal 223*a* connected to the connector terminal 208*a*. The SA substrate 223 has a portion covered with the mold portion 225 and a portion not covered with the mold portion 225, and the portion not covered is the lead terminal 223*a*. The lead terminal 223*a* projects in the height direction Y from the mold base end surface 225*b*. In FIGS. 58 and 59, the lead terminal 223*a* is not illustrated.

The flow sensor 202 has the same configuration as that of the flow sensor 22 of the first embodiment. The flow sensor 202 includes, for example, portions and members corresponding to each of the sensor recess portion 61, the membrane portion 62, the sensor substrate 65, the sensor membrane portion 66, the heat resistance element 71, the resistance thermometers 72 and 73, the indirect thermal resistance element 74, and the wirings 75 to 77 of the flow sensor 22.

<Description of Configuration Group B>

As shown in FIGS. 58 and 59, the housing 201 has the SA accommodation region 290. The SA accommodation region 290 is provided on the housing base end side relative to the bypass flow path 210 and accommodates a part of the sensor SA220. At least the mold base end surface 225*b* of the sensor SA220 is accommodated in the SA accommodation region 290. The measurement flow path 212 and the SA accommodation region 290 are arranged in the height direction Y. The sensor SA220 is disposed at a position across the boundary portion between the measurement flow path 212 and the SA accommodation region 290 in the height direction Y. At least the mold tip end surface 225*a* of the sensor SA220 and the flow sensor 202 are accommodated in the measurement flow path 212. The SA accommodation region 290 corresponds to an accommodation region.

Figure 61:
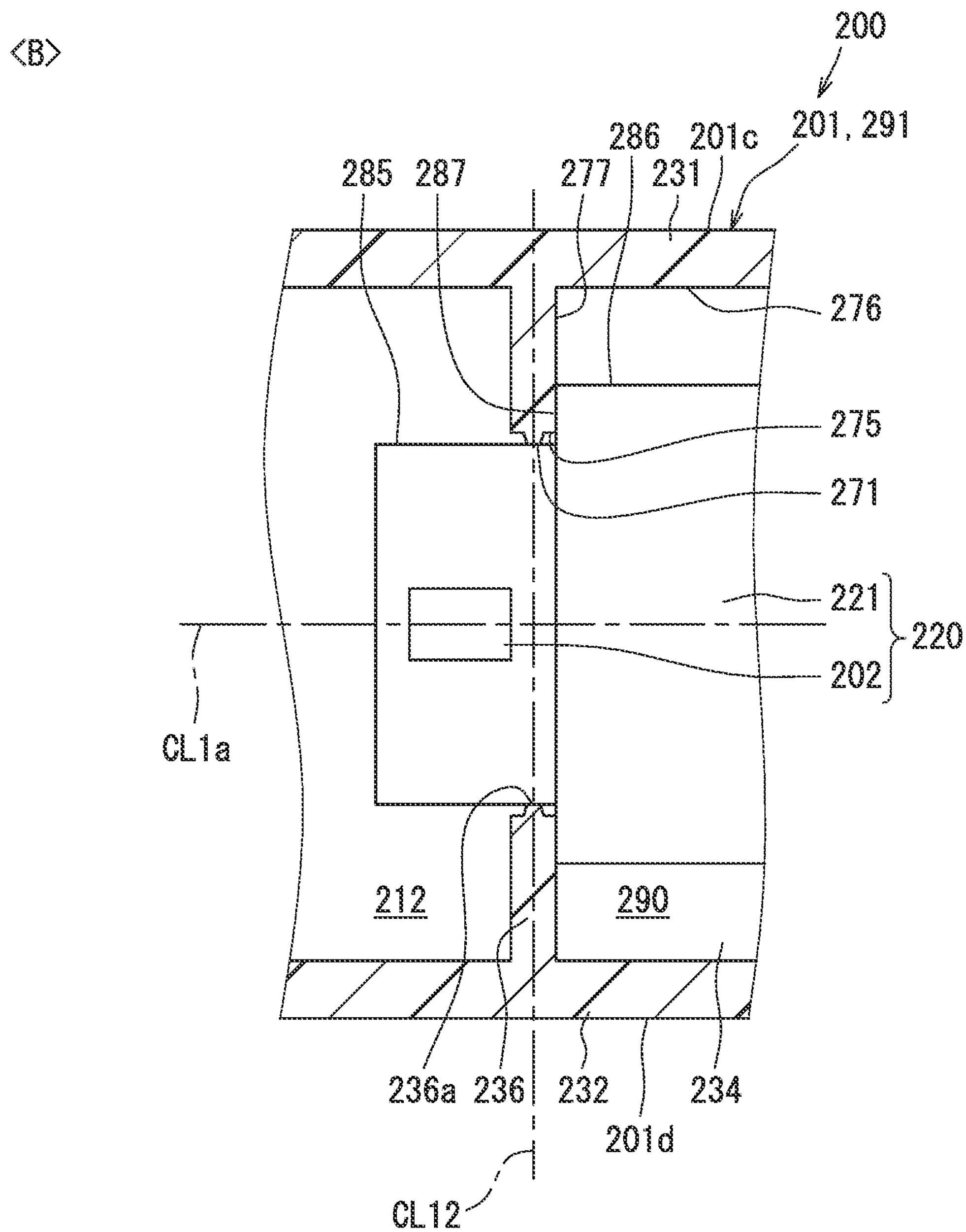
FIG. 61 is a cross-sectional view taken along a line LXI-LXI of FIG. 60 in the configuration group B.
Figure 62:
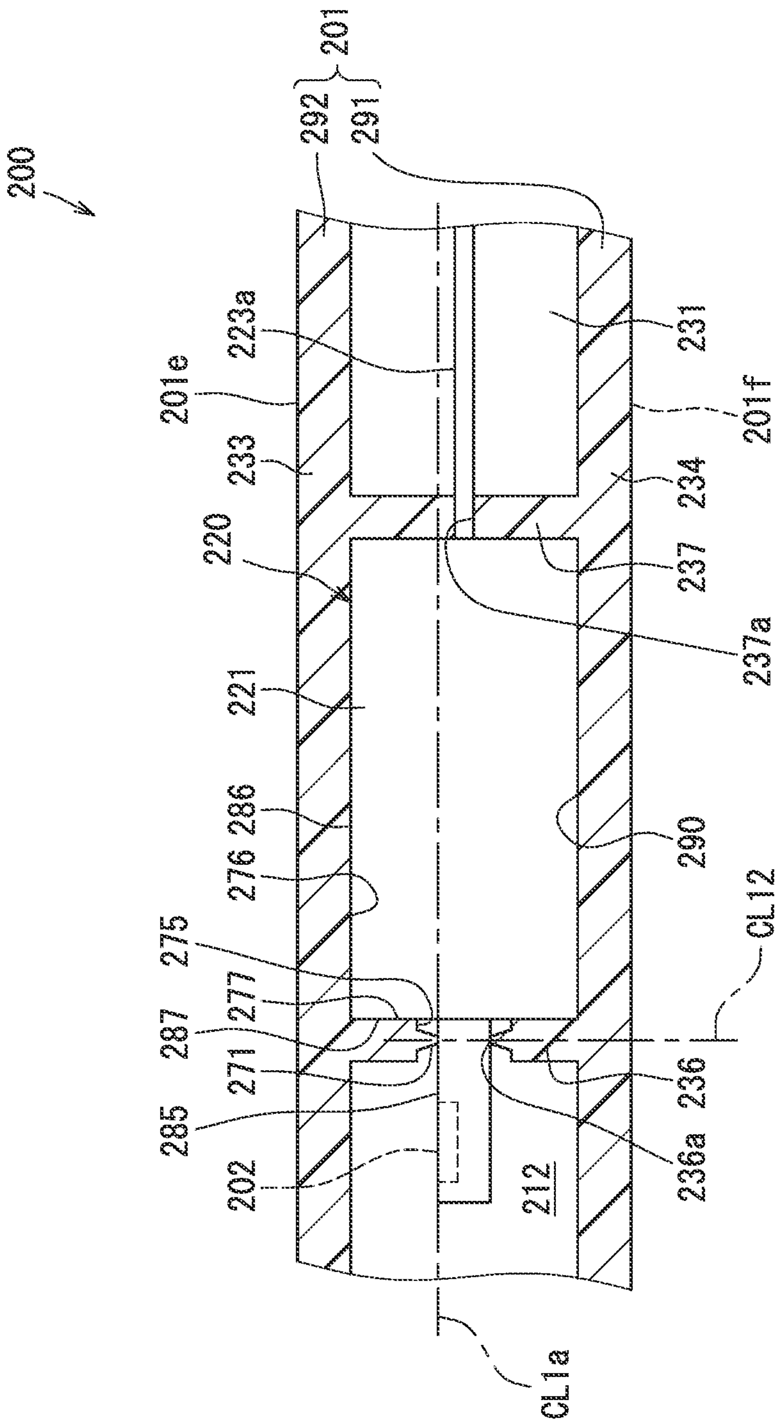
FIG. 62 is an enlarged view around the sensor SA of FIG. 60.

As shown in FIGS. 61 and 62, the housing 201 has a housing partition portion 271. The housing partition portion 271 is a projection portion provided on the inner peripheral surface of the first intermediate wall portion 236, and projects from the first intermediate wall portion 236 toward the sensor SA220. The tip end portion of the housing partition portion 271 is in contact with the outer surface of the sensor SA220. The housing partition portion 271 partitions the SA accommodation region 290 and the measurement flow path 212 between the outer surface of the sensor SA220 and the inner surface of the housing 201.

The inner surface of the housing 201 has a housing flow path surface 275, a housing accommodation surface 276, and a housing step surface 277. The housing flow path surface 275, the housing accommodation surface 276, and the housing step surface 277 extend in a direction intersecting the height direction Y, and annularly surround the sensor SA220. In the sensor SA220, a center line CL1*a* of the heat resistance element linearly extends in the height direction Y as in the first embodiment, and each of the housing flow path surface 275, the housing accommodation surface 276, and the housing step surface 277 extends in the circumferential direction around this center line.

The housing step surface 277 is a wall surface on the housing base end side of the first intermediate wall portion 236, and faces the housing base end side in the height direction Y. The housing step surface 277 is inclined with respect to the center line CL1*a* and faces the radial inside, which is the center line CL1*a* side. The housing step surface 277 intersects the height direction Y and corresponds to a housing intersection surface. In the present embodiment, the housing step surface 277 is orthogonal to the center line CL1*a*. On the inner surface of the housing 201, an outside corner portion between the housing flow path surface 275 and the housing step surface 277 and an inside corner portion between the housing accommodation surface 276 and the housing step surface 277 are chamfered.

The housing flow path surface 275 is an inner peripheral surface of the first intermediate wall portion 236. The housing flow path surface 275 forms the measurement flow path 212 and extends from the inner peripheral end portion of the housing step surface 277 toward the housing tip end side. The housing flow path surface 275 extends from the housing step surface 277 toward the side opposite from the SA accommodation region 290.

On the other hand, the housing accommodation surface 276 is an inner surface of each of the upstream wall portion 231, the downstream wall portion 232, the front wall portion 233, and the back wall portion 234. The housing accommodation surface 276 forms the SA accommodation region 290 and extends from the outer peripheral end portion of the housing step surface 277 toward the housing base end side. The housing accommodation surface 276 extends from the housing step surface 277 toward the side opposite from the measurement flow path 212. The housing step surface 277 is provided between the housing flow path surface 275 and the housing accommodation surface 276, and forms a step on the inner surface of the housing 201. The housing step surface 277 connects the housing flow path surface 275 and the housing accommodation surface 276.

The outer surface of the sensor SA220 is formed by the outer surface of the mold portion 225. The outer surface of the sensor SA220 has an SA flow path surface 285, an SA accommodation surface 286, and an SA step surface 287. The SA flow path surface 285, the SA accommodation surface 286, and the SA step surface 287 extend in a direction intersecting the height direction Y, and are portions annularly surrounding the outer surface of the sensor SA220. The SA flow path surface 285, the SA accommodation surface 286, and the SA step surface 287 extend in the circumferential direction around the center line CL1*a* of the heat resistance element.

In the sensor SA220, the SA step surface 287 is provided between the mold tip end surface 225*a* and the mold base end surface 225*b*. The SA step surface 287 faces the mold tip end surface 225*a* side in the height direction Y. The SA step surface 287 is inclined with respect to the center line CL1*a* and faces the radial outside, which is the side opposite from the center line CL1*a*. The SA step surface 287 intersects the height direction Y and corresponds to a unit intersection surface. The SA flow path surface 285 corresponds to a unit flow path surface, and the SA accommodation surface 286 corresponds to a unit accommodation surface. In the present embodiment, the SA step surface 287 is orthogonal to the center line CL1*a*. On the outer surface of the sensor SA220, an inside corner portion between the SA flow path surface 285 and the SA step surface 287 and an outside corner portion between the SA accommodation surface 286 and the SA step surface 287 are chamfered.

The SA flow path surface 285 forms the measurement flow path 212 and extends in the height direction Y from the inner peripheral end portion of the SA step surface 287 toward the mold tip end side. The SA flow path surface 285 extends from the SA step surface 287 toward the side opposite from the SA accommodation region 290. On the other hand, the SA accommodation surface 286 forms the SA accommodation region 290, and extends from the outer peripheral end portion of the SA step surface 287 toward the mold base end side. The SA accommodation surface 286 extends from the SA step surface 287 toward the side opposite from the measurement flow path 212. The SA step surface 287 is provided between the SA flow path surface 285 and the SA accommodation surface 286, and forms a step on the outer surface of the sensor SA220. The SA step surface 287 connects the SA flow path surface 285 and the SA accommodation surface 286.

In the sensor SA220, the SA flow path surface 285, the SA accommodation surface 286, and the SA step surface 287 are each formed by the mold upstream surface 225*c*, the mold downstream surface 225*d*, the mold front surface 225*e*, and the mold back surface 225*f*.

In the air flow meter 200, the housing step surface 277 facing the housing base end side and the SA step surface 287 facing the housing tip end side face each other. The housing flow path surface 275 facing the inner peripheral side and the SA flow path surface 285 facing the outer peripheral side face each other. Similarly, the housing accommodation surface 276 facing the inner peripheral side and the SA accommodation surface 286 facing the outer peripheral side face each other.

The housing partition portion 271 of the present embodiment is provided on the housing flow path surface 275, not provided on the housing step surface 277 unlike in the first embodiment. In this case, the housing partition portion 271 extends in the directions X and Z intersecting the height direction Y toward the first intermediate hole 236*a*. A center line CL12 of the housing partition portion 271 extends linearly in a direction intersecting the height direction Y. In the present embodiment, the center line CL12 is orthogonal to the height direction Y. The housing partition portion 271 annularly surrounds the sensor SA220 together with the housing flow path surface 275. In this case, the tip end portion of the housing partition portion 271 forms the first intermediate hole 236*a*, and the tip end surface of the housing partition portion 271 is the inner peripheral surface of the first intermediate hole 236*a*. The housing partition portion 271 has a portion extending in the width direction X and a portion extending in the depth direction Z, and has a substantially rectangular frame shape as a whole.

The tip end portion of the housing partition portion 271 is in contact with the SA flow path surface 285 of the sensor SA220. The housing partition portion 271 and the SA flow path surface 285 are in close contact with each other to enhance the sealability of the portion partitioning the SA accommodation region 290 and the measurement flow path 212. The SA flow path surface 285 is a flat surface extending straight in a direction intersecting the height direction Y. In the present embodiment, the housing flow path surface 275 and the SA flow path surface 285 extend in parallel to each other. In this case, the housing partition portion 271 is in contact with the SA flow path surface 285, thereby improving the sealability at the portion where the outer surface of the sensor SA220 and the inner surface of the housing 201 are in contact with each other. The housing flow path surface 275 and the SA flow path surface 285 may not be parallel to each other but may be relatively inclined.

The housing partition portion 271 is orthogonal to the housing flow path surface 275. In this case, the center line CL12 of the housing partition portion 271 and the housing flow path surface 275 are orthogonal to each other. The housing partition portion 271 has a tapered shape. In the present embodiment, the height direction Y is the width direction for the housing partition portion 271. The width dimension of the housing partition portion 271 in the width direction gradually decreases toward the tip end portion of the housing partition portion 271. Both of the pair of side surfaces of the housing partition portion 271 extend straight from the housing flow path surface 275. In this case, the housing partition portion 271 has a tapered cross section.

The housing partition portion 271 is provided at the center of the housing flow path surface 275 in the height direction Y. In this case, the separation distance between the housing tip end side end portion of the housing flow path surface 275 and the housing partition portion 271 is the same as the separation distance between the housing base end side end portion of the housing flow path surface 275 and the housing partition portion 271. The housing partition portion 271 may be provided at a position close to the housing tip end side on the housing flow path surface 275, or may be provided at a position close to the housing base end side.

The portion of the housing step surface 277 on the housing flow path surface 275 side relative to the housing partition portion 271 forms the measurement flow path 212 together with the housing flow path surface 275. The portion on the housing accommodation surface 276 relative to the housing partition portion 271 forms the SA accommodation region 290 together with the housing accommodation surface 276.

The portion of the SA step surface 287 on the SA flow path surface 285 relative to the housing partition portion 271 forms the measurement flow path 212 together with the SA flow path surface 285. The portion on the SA accommodation surface 286 relative to the housing partition portion 271 forms the SA accommodation region 290 together with the SA accommodation surface 286.

Figure 63:
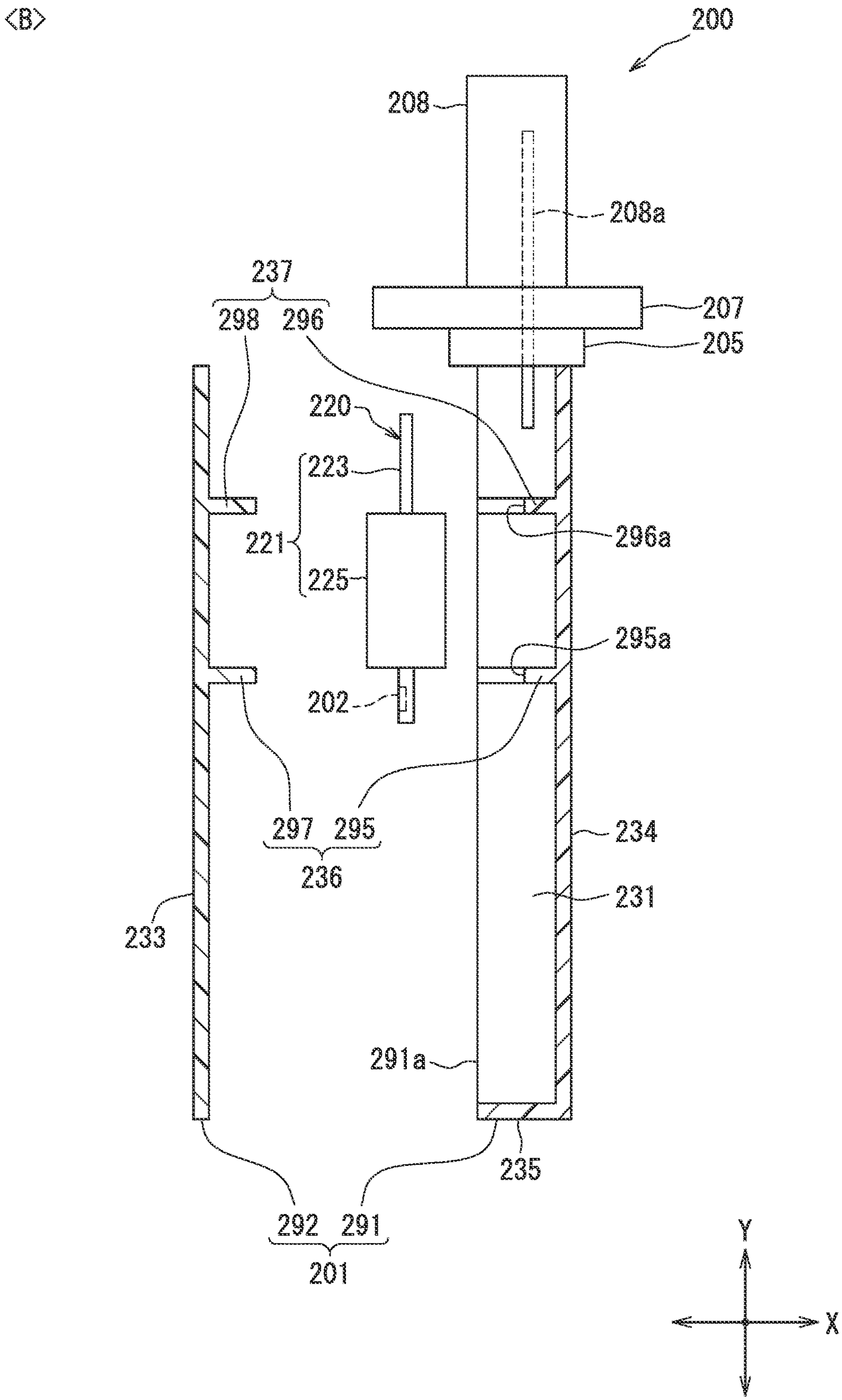
FIG. 63 is an exploded cross-sectional view of a base member, a cover member, and the sensor SA in FIG. 60.

As shown in FIG. 63, the housing 201 includes the base member 291 and a cover member 292. The base member 291 and the cover member 292 are assembled and integrated with each other, and forms the housing 201 in this state. In the housing 201, the base member 291 forms the upstream wall portion 231, the downstream wall portion 232, the back wall portion 234, the tip end wall portion 235, the seal holding portion 205, the flange portion 207, and the connector portion 208. The base member 291 is a box-shaped member opened to the housing front side as a whole. In the base member 291, the base opening portion 291*a* is provided at an open end, which is a front side end portion. The base opening portion 291*a* is formed by each housing front side end portion of the upstream wall portion 231, the downstream wall portion 232, the tip end wall portion 235, and the seal holding portion 205, and opens the bypass flow path 210 and the SA accommodation region 290 toward the housing front side.

The cover member 292 forms the front wall portion 233 in the housing 201, and is a plate-shaped member as a whole. The cover member 292 is attached to the open end of the base member 291 and closes the base opening portion 291*a*. In the housing 201, the passage flow path 211, the measurement flow path 212, and the SA accommodation region 290 are provided between the base member 291 and the cover member 292.

In the housing 201, the first intermediate wall portion 236 has a first base projection portion 295 and a first cover projection portion 297. The first base projection portion 295 is a projection portion projecting from the back wall portion 234 of the base member 291 toward the cover member 292. The first base projection portion 295 has a first recess portion 295*a*. The first recess portion 295*a* is a recess portion provided on the tip end surface of the first base projection portion 295, and penetrates the first base projection portion 295 in the height direction Y. The first cover projection portion 297 is a projection portion projecting from the front wall portion 233 of the cover member 292 toward the base member 291. The first cover projection portion 297 enters the first recess portion 295*a*. In the first intermediate wall portion 236, the tip end surface of the first cover projection portion 297 and the bottom surface of the first recess portion 295*a* are separated from each other, and this separated portion is the first intermediate hole 236*a*.

In the housing 201, the second intermediate wall portion 237 has a second base projection portion 296 and a second cover projection portion 298. The second base projection portion 296 is a projection portion projecting from the back wall portion 234 of the base member 291 toward the cover member 292. The second base projection portion 296 has a second recess portion 296*a*. The second recess portion 296*a* is a recess portion provided on the tip end surface of the second base projection portion 296, and penetrates the second base projection portion 296 in the height direction Y. The second cover projection portion 298 is a projection portion projecting from the front wall portion 233 of the cover member 292 toward the base member 291. The second cover projection portion 298 enters the second recess portion 296*a*. In the second intermediate wall portion 237, the tip end surface of the second cover projection portion 298 and the bottom surface of the second recess portion 296*a* are separated from each other, and this separated portion is the second intermediate hole 237*a*.

The first base projection portion 295 and the second base projection portion 296 are included in the base member 291. These base projection portions 295 and 296 project from the back wall portion 234 of the base member 291 toward the cover member 292. The recess portions 295*a* and 296*a* are provided on the tip end surfaces of the base projection portions 295 and 296. The first recess portion 295*a* is provided at an intermediate position of the first base projection portion 295 in the depth direction Z. The second recess portion 296*a* is provided at an intermediate position of the second base projection portion 296 in the depth direction Z.

The first cover projection portion 297 and the second cover projection portion 298 are included in the cover member 292. These cover projection portions 297 and 298 project from the front wall portion 233 of the cover member 292 toward the base member 291.

The housing partition portion 271 includes a base projection 271*a* and a cover projection 271*b*. The base projection 271*a* is included in the base member 291. The base projection 271*a* is a projection provided on the inner peripheral surface of the first recess portion 295*a* in the first base projection portion 295. The base projection 271*a* provided on the bottom surface of the first recess portion 295*a* extends in the width direction X toward the cover member 292. The base projection 271*a* provided on each of the pair of wall surfaces of the first recess portion 295*a* extend in the depth direction Z in a state of facing each other. The separation distance between the base projections 271*a* facing each other by being provided on each of the pair of wall surfaces is slightly smaller than the width dimension in the depth direction Z of the portion of the sensor SA220 to be inserted into the first recess portion 295*a*.

The cover projection 271*b* is included in the cover member 292. The cover projection 271*b* is a projection provided on the tip end surface of the first base projection portion 295, and extends in the width direction X toward the base member 291.

Next, the manufacturing method of the air flow meter 200 will be described with reference to FIGS. 63 and 64, focusing on a procedure of mounting the sensor SA220 to the housing 201.

The manufacturing process of the air flow meter 200 includes a process of manufacturing the sensor SA220, a process of manufacturing the base member 291, and a process of manufacturing the cover member 292. After these steps, a process of assembling the sensor SA220, the base member 291, and the cover member 292 to one another is performed.

In the process of manufacturing the sensor SA220, the mold portion 225 of the sensor SA220 is manufactured by resin molding or the like using an injection mold device having an injection mold machine and a mold device. In this process, similarly to the process of manufacturing the mold portion 55 of the first embodiment, a molten resin obtained by melting a resin material is injected from an injection mold machine and press-fitted into the mold device. In this process, an epoxy-based thermosetting resin such as an epoxy resin is used as a resin material for forming the mold portion 225.

In the process of manufacturing the base member 291, the base member 291 is manufactured by resin molding or the like using an injection mold device or the like. In the process of manufacturing the cover member 292, the cover member 292 is manufactured by resin molding or the like using an injection mold device or the like. In this process, thermoplastic resin such as polybutylene terephthalate (PBT) or polyphenylene sulfide (PPS) is used as a resin material forming the base member 291 and the cover member 292. The base member 291 and the cover member 292 thus formed of the thermoplastic resin is softer than the mold portion 225 formed of the thermosetting resin. In other words, the base member 291 and the cover member 292 are lower in hardness and higher in flexibility than the mold portion 225.

Figure 64:
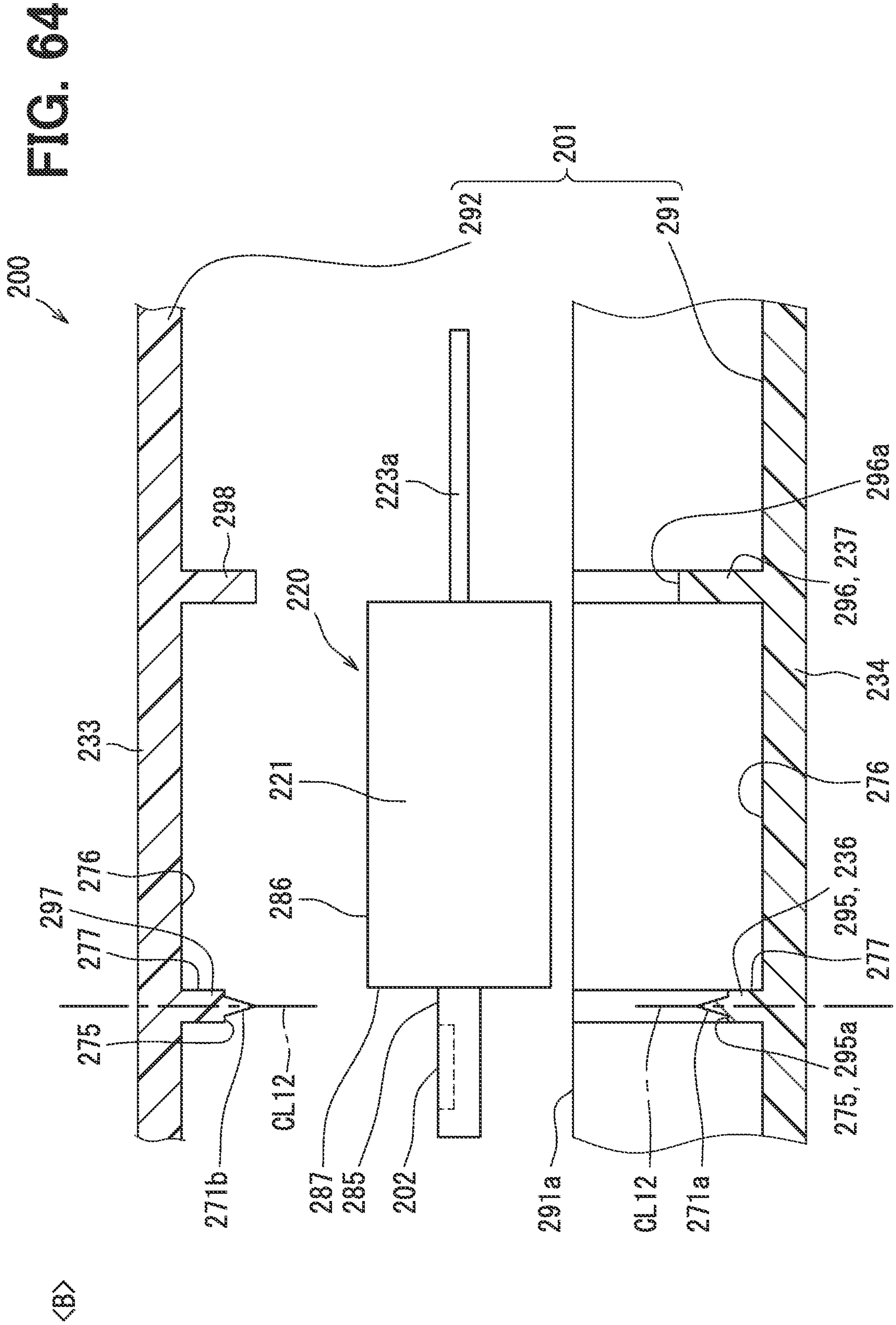
FIG. 64 is an enlarged view around the sensor SA of FIG. 63.

In the process of assembling the sensor SA220, the base member 291, and the cover member 292, in FIGS. 63 and 64, first, a work of inserting the sensor SA220 into the base member 291 from the base opening portion 291*a* is performed. In this work, the sensor SA220 is fitted between the first base projection portion 295 and the second base projection portion 296 by inserting the lead terminal 223*a* into the second recess portion 296*a* while inserting the SA flow path surface 145 of the sensor SA220 into the first recess portion 295*a*. Here, after the SA flow path surface 285 of the sensor SA220 comes into contact with the base projection 271*a* of the first base projection portion 295, the sensor SA220 is further pushed into the base member 291 toward the back wall portion 234. In this case, due to the hardness of the base member 291 being lower than the hardness of the mold portion 225, the base projection 271*a* is deformed such that its tip end portion is crushed toward the housing back side on the SA flow path surface 285.

As described above, on the inner peripheral surface of the first recess portion 295*a* of the base member 291, the base projection 271*a* is provided on each of the pair of wall surfaces facing each other. In this configuration, by simply fitting the sensor SA220 between the pair of wall surfaces, the sensor SA220 scrapes the tip end portion of the base projection 271*a* of the wall surface with the SA flow path surface 285, and the base projection 271*a* of the wall surface is deformed. As a result, the tip end portion of the base projection 271*a* is scraped, so that the newly formed tip end surface easily comes into close contact with the SA flow path surface 285 of the sensor SA220.

When the sensor SA220 is pushed into the first recess portion 295*a*, the SA flow path surface 285 of the sensor SA220 crushes the base projection 271*a* on the bottom surface of the inner peripheral surface of the first recess portion 295*a* toward the back wall portion 234. In this case, the tip end portion of the base projection 271*a* on the bottom surface is deformed so as to be crushed by the SA flow path surface 285, and the tip end portion of the base projection 271*a* is crushed, so that a newly formed tip end surface is easily brought into close contact with the SA flow path surface 285 of the sensor SA220.

As described above, in the cover member 292, the cover projection 271*b* is provided on the tip end surface of the first cover projection portion 297. In this configuration, when the cover member 292 is assembled to the base member 291, the cover projection 271*b* of the cover member 292 is pressed against the SA flow path surface 285 of the sensor SA220. Therefore, by simply pressing the cover member 292 against the base member 291, the tip end portion of the cover projection 271*b* of the first cover projection portion 297 is deformed so as to be crushed by the SA flow path surface 285. In this case, the tip end portion of the cover projection 271*b* is crushed, so that a newly formed tip end surface easily comes into close contact with the SA flow path surface 285 of the sensor SA220.

The cover member 292 is attached to the base member 291 such that the cover member 292 covers the base opening portion 291*a* and the sensor SA220. In this work, the first cover projection portion 297 of the cover member 292 is inserted into the first recess portion 295*a*. Here, after the cover projection 271*b* on the tip end surface of the first cover projection portion 297 comes into contact with the SA flow path surface 285 of the sensor SA220, the cover member 292 is further pressed against the sensor SA220 toward the inside of the base member 291. In this case, due to the hardness of the cover member 292 being lower than the hardness of the mold portion 225, the cover projection 271*b* is deformed such that its tip end portion is crushed toward the housing front side on the SA flow path surface 285. As a result, the tip end surface of the cover projection 271*b* in the crushed state is easily brought into close contact with the SA flow path surface 285, and the sealability between the cover projection 271*b* and the SA flow path surface 285 is enhanced.

In the first embodiment, the crushed portion of the housing partition portion 131 is shown by the two-dot chain line in FIG. 17, but in the present embodiment, the portion of the base projection 271*a* and the cover projection 271*b* crushed by the sensor SA220 is not illustrated by the two-dot chain line.

Thereafter, the sensor SA220, the base member 291, and the cover member 292 are fixed to one another by joining a contact portion between the base member 291 and the cover member 292 with an adhesive or the like. In this case, the housing 201 is formed by integrating the base member 291 and the cover member 292. In this case, the housing partition portion 271 is formed by the base projection 271*a* and the cover projection 271*b*.

According to the present embodiment described so far, the housing partition portion 271 projecting from the inner surface of the housing 201 partitions the measurement flow path 212 and the SA accommodation region 290 between the sensor SA220 and the housing 201. In this configuration, since the tip end portion of the housing partition portion 271 and the sensor SA220 are easily brought into close contact with each other, a gap is less likely to be generated between the inner surface of the housing 201 and the outer surface of the sensor SA220. Therefore, when the filled portion is formed by injecting the molten potting resin into the SA accommodation region 290 of the housing 201, the potting resin is restricted from entering the measurement flow path 212 through the gap between the housing 201 and the sensor SA220.

In this case, it is less likely to happen that the molten resin entering the measurement flow path 212 through the gap between the housing 201 and the sensor SA220 is solidified, and the shape of the measurement flow path 212 is unintentionally changed due to the solidified portion. It is less likely to happen that the solidified portion separates from the housing 201 and the sensor SA220 in the measurement flow path 212 and comes into contact with or adhere to the flow sensor 202 as a foreign matter. Therefore, it is possible to suppress a decrease in the detection accuracy of the flow sensor 202 due to the molten resin entering the measurement flow path 212 from the SA accommodation region 290. As a result, the detection accuracy of the air flow rate by the flow sensor 202 can be enhanced, and as a result, the measurement accuracy of the air flow rate by the air flow meter 200 can be enhanced.

According to the present embodiment, the housing partition portion 271 annularly surrounds the sensor SA220. In this configuration, the housing partition portion 271 can create a state in which the outer surface of the sensor SA220 and the inner surface of the housing 201 are in close contact with each other over the entire circumference of the outer surface of the sensor SA220. Therefore, the housing partition portion 271 can enhance the sealability of the entire boundary portion between the measurement flow path 212 and the SA accommodation region 290.

In the present embodiment, the housing partition portion 271 is provided on the housing flow path surface 275. In this configuration, by partitioning the measurement flow path 212 and the SA accommodation region 290 by the housing partition portion 271 at a position as close as possible to the measurement flow path 212 side, it is possible to make it as small as possible a portion of the gap between the housing 201 and the sensor SA220, the portion included in the measurement flow path 212. Here, in the measurement flow path 212, the gap between the housing 201 and the sensor SA220 is a region where disturbance is likely to be generated in the airflow by the air that flows from the measurement entrance 215 toward the measurement exit 216 flowing in. Therefore, the smaller the gap between the housing 201 and the sensor SA220 is, the less disturbance is likely to be generated in the airflow in the measurement flow path 212, and the detection accuracy of the flow sensor 202 is likely to be improved. Therefore, the detection accuracy of the flow sensor 202 can be enhanced by providing the housing partition portion 271 on the housing flow path surface 275.

Third Embodiment

In the first embodiment, the passage flow path 31 is not substantially narrowed in the height direction Y from the passage entrance 33 toward the measurement entrance 35. However, in the third embodiment, the passage flow path 31 is narrowed in the height direction Y from the passage entrance 33 toward the measurement entrance 35. In the present embodiment, components denoted by the same reference numerals as those in the drawings in the first embodiment and configurations that will not be described are similar to those in the first embodiment, and achieve the same functions and effects. In the present embodiment, differences from the first embodiment will be mainly described.

<Description of Configuration Group C>

Figure 65:
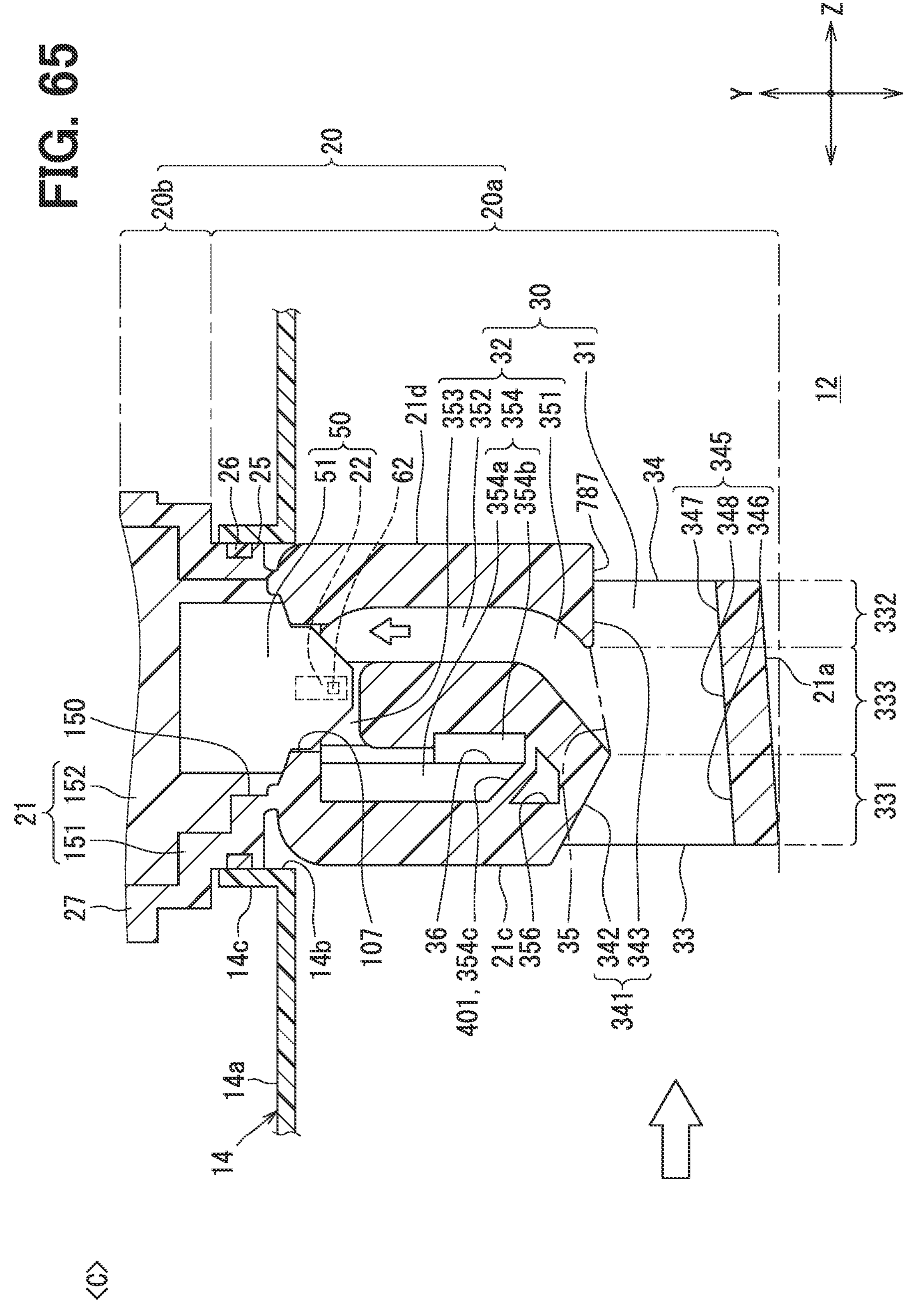
FIG. 65 is a longitudinal cross-sectional view of the air flow meter in the configuration group C in the third embodiment.
Figure 66:
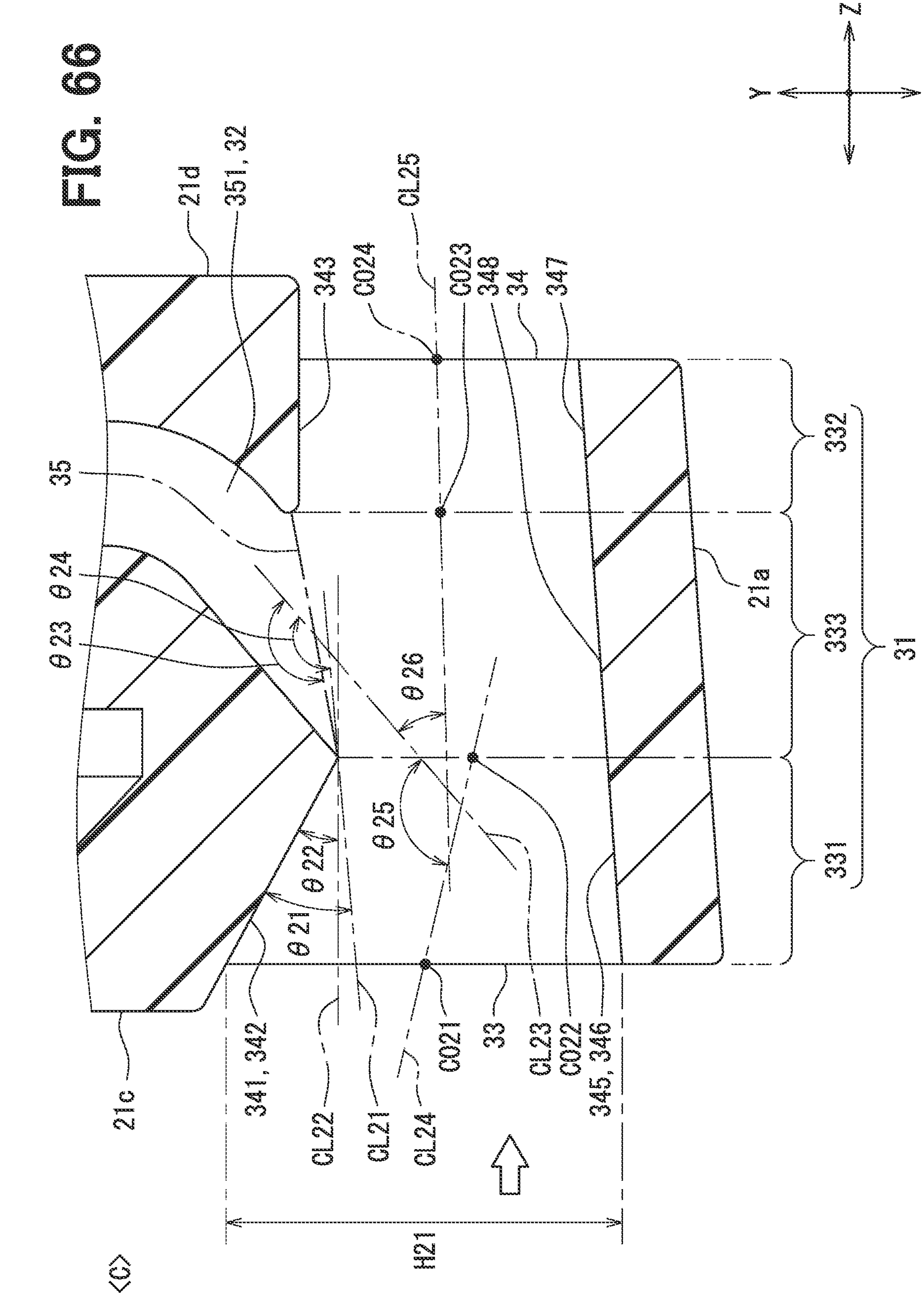
FIG. 66 is an enlarged view around a passage flow path of FIG. 65.

As shown in FIGS. 65 and 66, the passage flow path 31 includes an entrance Passage Path 331, an Exit Passage Path 332, and a Branch Passage Path 333. The entrance passage path 331 extends from the passage entrance 33 toward the passage exit 34 and is stretched between the passage entrance 33 and the upstream end portion of the measurement entrance 35. The exit passage path 332 extends from the passage exit 34 toward the passage entrance 33 and is stretched between the passage exit 34 and the downstream end portion of the measurement entrance 35. The branch passage path 333 is provided between the entrance passage path 331 and the exit passage path 332, and connects the entrance passage path 331 and the exit passage path 332. The branch passage path 333 extends in the depth direction Z along the measurement entrance 35, and is a portion of the passage flow path 31 from which the measurement flow path 32 is branched. The branch passage path 333 extends from the measurement entrance 35 toward the housing tip end side.

The inner surface of the housing 21 has the passage ceiling surface 341 and the passage floor surface 345 as formation surfaces forming the passage flow path 31. The passage ceiling surface 341 and the passage floor surface 345 are arranged in the height direction Y, and the passage flow path 31 is provided between the passage ceiling surface 341 and the passage floor surface 345. The passage ceiling surface 341 and the passage floor surface 345 are stretched between the passage entrance 33 and the passage exit 34. The passage ceiling surface 341 and the passage floor surface 345 both intersect the height direction Y and extend in the width direction X and the depth direction Z. The passage ceiling surface 341 is provided with the measurement exit 36.

The passage ceiling surface 341 has an entrance ceiling surface 342 and an exit ceiling surface 343. The entrance ceiling surface 342 forms the ceiling surface of the entrance passage path 331, and is stretched between the passage entrance 33 and an upstream end portion of the measurement entrance 35 in the depth direction Z. In this case, the depth direction Z corresponds to a direction in which the passage entrance 33 and the passage exit 34 are arranged. The entrance ceiling surface 342 extends straight from the passage entrance 33 toward the upstream end portion of the measurement entrance 35. The exit ceiling surface 343 forms the ceiling surface of the exit passage path 332, and is stretched between the passage exit 34 and the downstream end portion of the measurement entrance 35. The exit ceiling surface 343 extends straight from the passage exit 34 toward the downstream end portion of the measurement entrance 35.

The passage floor surface 345 has an entrance floor surface 346, an exit floor surface 347, and a branch floor surface 348. The entrance floor surface 346 forms the floor surface of the entrance passage path 331, and extends from the passage entrance 33 toward the passage exit 34. The entrance floor surface 346 and the entrance ceiling surface 342 face each other with the entrance passage path 331 and the passage entrance 33 interposed therebetween. The exit floor surface 347 forms the floor surface of the exit passage path 332, and extends from the passage exit 34 toward the passage entrance 33. The exit floor surface 347 and the exit ceiling surface 343 face each other with the exit passage path 332 and the passage exit 34 interposed therebetween. The branch floor surface 348 forms the floor surface of the branch passage path 333. The branch floor surface 348 is provided between the entrance floor surface 346 and the exit floor surface 347, and connects the entrance floor surface 346 and the exit floor surface 347. The branch floor surface 348 faces the measurement entrance 35 with the branch passage path 333 interposed therebetween.

Figure 45:
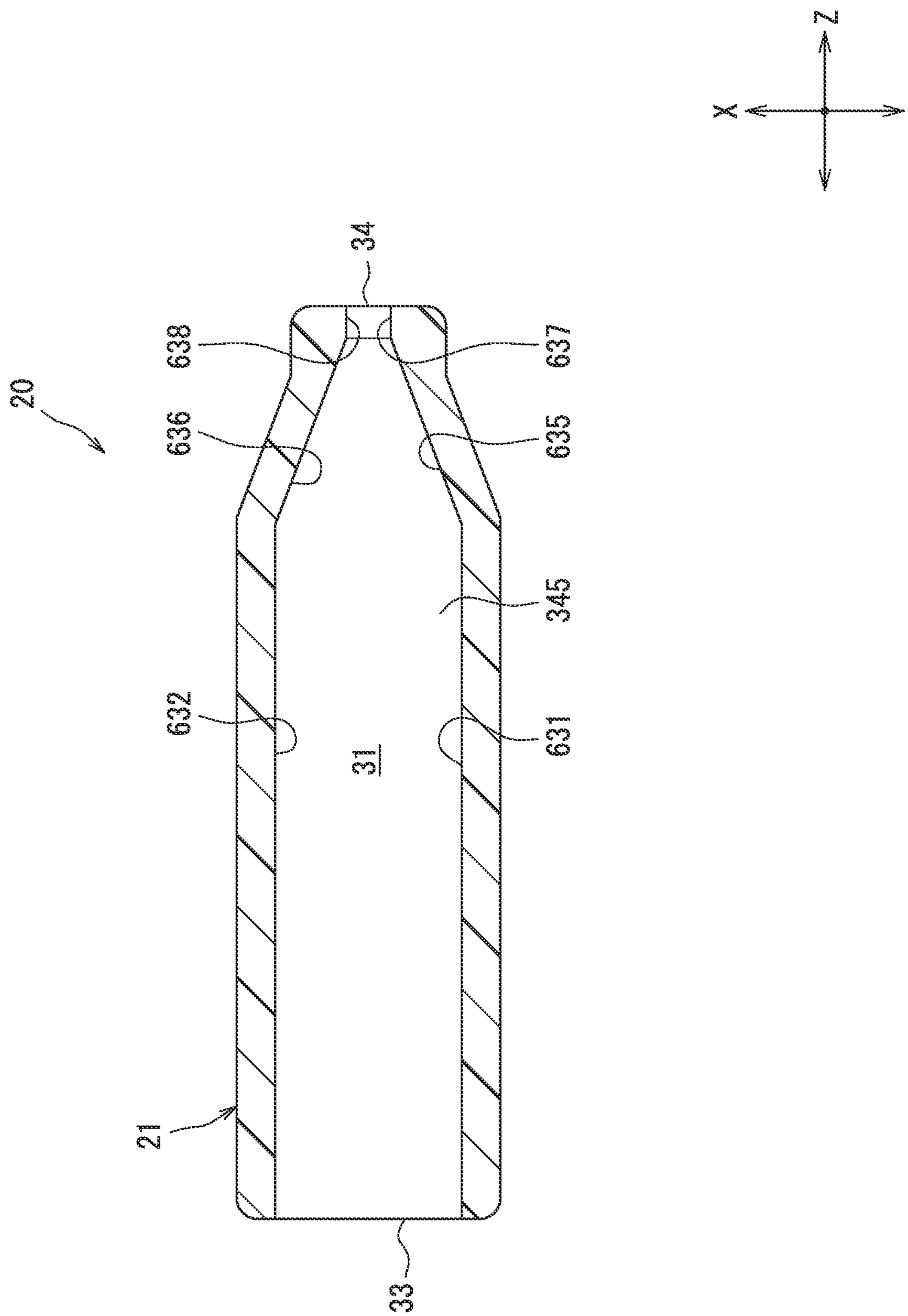
FIG. 45 is a cross-sectional view taken along a line XLV-XLV of FIG. 41.

The entrance ceiling surface 342 and the exit ceiling surface 343 both extend straight in the depth direction Z and are parallel to each other. The ceiling surfaces 342 and 343 extend straight in the width direction X and are parallel to each other. The passage floor surface 345 extends straight in the depth direction Z and is parallel to the ceiling surfaces 342 and 343. The passage floor surface 345 extends straight in the width direction X and is parallel to the ceiling surfaces 342 and 343. As described above, because the ceiling surfaces 342 and 343 and the passage floor surface 345 extend straight in the width direction X and passage wall surfaces 631 and 632 (see FIG. 45) described later extend straight in the height direction Y, the passage entrance 33 and the passage exit 34 have a rectangular shape.

The entrance ceiling surface 342, the exit ceiling surface 343, and the passage floor surface 345 may be bent such that portions between respective upstream end portions and downstream end portions are recessed or bulged in the depth direction Z. The entrance ceiling surface 342, the exit ceiling surface 343, and the passage floor surface 345 may be bent such that a portion between the passage wall surfaces 631 and 632 is recessed or bulged in the width direction X. As described above, the passage entrance 33 and the passage exit 34 may be bent such that at least one side is recessed or bulged. That is, the passage entrance 33 and the passage exit 34 may not have a rectangular shape. For example, since the entrance ceiling surface 342, the exit ceiling surface 343, and the passage floor surface 345 are curved so that a portion between the passage wall surfaces 631 and 632 bulges, the passage entrance 33 and the passage exit 34 may have a curved shape so as to bulge each side extending in the width direction X.

The entrance ceiling surface 342 is inclined with respect to the entrance floor surface 346 so as to face the passage entrance 33 side. An inclination angle θ21 of the entrance ceiling surface 342 with respect to the entrance floor surface 346 is 10 degrees or more. That is, the inclination angle θ21 has the same value as 10 degrees or a value larger than 10 degrees, and the relationship of θ21≥10 is established. As shown in FIG. 66, assuming a floor parallel line CL21 as an imaginary straight line extending parallel to the entrance floor surface 346, the inclination angle θ21 is an angle of a portion between the entrance ceiling surface 342 and the floor parallel line CL21 and facing the passage entrance 33 side. In the passage ceiling surface 341, the inclination angle with respect to the floor parallel line CL21 is different between the entrance ceiling surface 342 and the exit ceiling surface 343. Specifically, the inclination angle θ21 of the entrance ceiling surface 342 with respect to the floor parallel line CL21 is larger than the inclination angle of the exit ceiling surface 343 with respect to the floor parallel line CL21.

The entrance ceiling surface 342 corresponds to a ceiling inclined surface. The configuration of the present embodiment is basically the same as the configuration of the first embodiment except that the entrance ceiling surface 342 faces the passage entrance 33 side, and the description of the present embodiment regarding this configuration is also the description of the first embodiment.

In the entrance passage path 331, a separation distance H21 between the entrance ceiling surface 342 and the entrance floor surface 346 in the height direction Y gradually decreases from the passage entrance 33 toward the passage exit 34. Here, the height direction Y is a direction orthogonal to a main flow line CL22. The decrease rate of the separation distance H21 is a constant value in the entrance passage path 331.

The passage floor surface 345 extends straight in the depth direction Z. On the passage floor surface 345, the entrance floor surface 346, the exit floor surface 347, and the branch floor surface 348 form the same plane. As shown in FIG. 66, assuming that a main flow line CL22 is assumed as an imaginary straight line extending in the depth direction Z, which is the main flow direction, the passage floor surface 345 is inclined with respect to the main flow line CL22 so as to face the passage entrance 33 side. In this case, each of the entrance floor surface 346, the exit floor surface 347, and the branch floor surface 348 is inclined with respect to the main flow line CL22. As described above, due to the angle setting surface 27*a* of the flange portion 27 extending in the main flow direction, the main flow line CL22 extends parallel to the angle setting surface 27*a*.

The entrance ceiling surface 342 is inclined with respect to the main flow line CL22 in addition to the entrance floor surface 346. An inclination angle θ22 of the entrance ceiling surface 342 with respect to the main flow line CL22 is 10 degrees or more similarly to the inclination angle θ21. That is, the inclination angle θ22 has the same value as 10 degrees or a value larger than 10 degrees, and the relationship of θ22≥10 is established. In the present embodiment, the inclination angle θ22 is set to, for example, 10 degrees. As shown in FIG. 66, the inclination angle θ22 is an angle of a portion facing the passage entrance 33 side between the entrance ceiling surface 342 and the main flow line CL22. The inclination angle θ22 of the entrance ceiling surface 342 with respect to the main flow line CL22 is smaller than the inclination angle θ21 of the entrance ceiling surface 342 with respect to the entrance floor surface 346.

Figure 67:
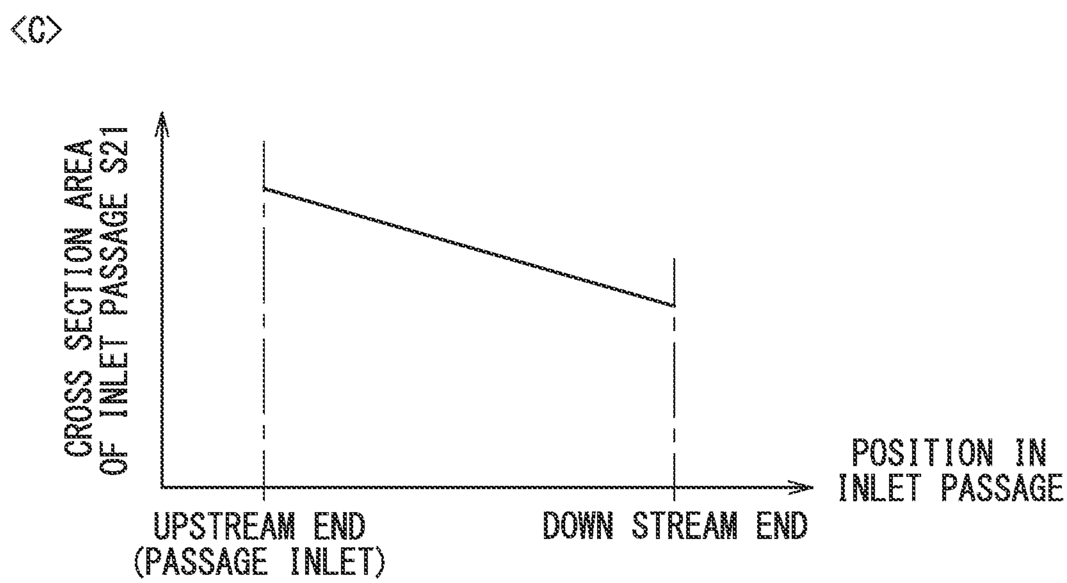
FIG. 67 is a view for explaining a cross-sectional area of an entrance passage portion.

The entrance passage path 331 has a shape gradually narrowed by at least the entrance ceiling surface 342 and the entrance floor surface 346 from the passage entrance 33 toward the passage exit 34. In this case, as shown in FIG. 67, a cross-sectional area S21 of the entrance passage path 331 in the directions X and Y orthogonal to the main flow line CL22 gradually decreases from the passage entrance 33 toward the passage exit 34. The cross-sectional area S21 has the largest value at the passage entrance 33, which is the upstream end portion of the entrance passage path 331, and has the smallest value at the downstream end portion of the entrance passage path 331. The decrease rate of the cross-sectional area S21 is a constant value in the entrance passage path 331, and the graph indicating the value of the cross-sectional area S21 in the entrance passage path 331 linearly extends as shown in FIG. 67.

The exit passage path 332 has a shape gradually narrowed from the upstream end portion of the exit passage path 332 toward the passage exit 34. In this case, the cross-sectional area of the exit passage path 332 in the directions X and Y orthogonal to the main flow line CL22 gradually decreases from the upstream end portion of the exit passage path 332 toward the passage exit 34. The cross-sectional area of the entrance passage path 331 can also be referred to as a flow passage area of the entrance passage path 331.

As shown in FIG. 65, the measurement flow path 32 has a folded shape folded between the measurement entrance 35 and the measurement exit 36. The measurement flow path 32 includes the branch measurement path 351, the guide measurement path 352, the detection measurement path 353, and the discharge measurement path 354. In the measurement flow path 32, the branch measurement path 351, the guide measurement path 352, the detection measurement path 353, and the discharge measurement path 354 are arranged in this order from the measurement entrance 35 side toward the measurement exit 36.

The branch measurement path 351 extends from the measurement entrance 35 toward the housing base end side, and is a portion of the measurement flow path 32 that branches from the passage flow path 31. The branch measurement path 351 forms the measurement entrance 35, and the upstream end portion of the branch measurement path 351 is the measurement entrance 35. The branch measurement path 351 is inclined with respect to both the height direction Y and the depth direction Z. The branch measurement path 351 is inclined with respect to the passage flow path 31.

The guide measurement path 352 extends in the height direction Y from the downstream end portion of the branch measurement path 351 toward the side opposite from the passage flow path 31. The guide measurement path 352 guides the air flowing in from the branch measurement path 351 toward the flow sensor 22.

The detection measurement path 353 extends in the depth direction Z from the downstream end portion of the guide measurement path 352, and is provided on the opposite side of the branch measurement path 351 via the guide measurement path 352. The detection measurement path 353 is provided with the flow sensor 22.

The discharge measurement path 354 extends in the height direction Y from the downstream end portion of the detection measurement path 353 toward the passage flow path 31, and is provided in parallel with the guide measurement path 352. The discharge measurement path 354 forms the measurement exit 36, and the downstream end portion of the discharge measurement path 354 is the measurement exit 36. In this case, the discharge measurement path 354 discharges the air flowing from the detection measurement path 353 from the measurement exit 36.

The discharge measurement path 354 includes a longitudinally extending path 354*a* and a laterally extending path 354*b*. The longitudinally extending path 354*a* longitudinally extends from the detection measurement path 353 toward the housing tip end side. The laterally extending path 354*b* extends from an end portion of the longitudinally extending path 354*a* on the housing tip end side toward the housing downstream side. The longitudinally extending path 354*a* and the laterally extending path 354*b* are arranged in the depth direction Z, and a boundary portion between the longitudinally extending path 354*a* and the laterally extending path 354*b* extends in the height direction Y. In this case, the laterally extending path 354*b* is disposed between the guide measurement path 352 and the longitudinally extending path 354*a* in the depth direction Z. Therefore, in the housing 21, the entire length of the measurement flow path 32 can be maximized while effectively using the portion between the guide measurement path 352 and the longitudinally extending path 354*a* as a portion for installing the laterally extending path 354*b*.

The measurement exit 36 is disposed at a position across the boundary portion between the longitudinally extending path 354*a* and the laterally extending path 354*b* in the depth direction Z. The measurement exit 36 extends toward the housing upstream side from the housing downstream end portion of the laterally extending path 354*b* in the depth direction Z. In this case, since the separation distance between the flow sensor 22 and the measurement exit 36 can be increased by the amount of the laterally extending path 354*b*, even if a foreign matter inversely enters from the measurement exit 36, the foreign matter hardly reaches the flow sensor 22.

In the discharge measurement path 354, the outer measurement bent surface 401 includes a measurement inclined surface 354*c*. The measurement inclined surface 354*c* is a chamfered surface obtained by chamfering the outside corner portion of the longitudinally extending path 354*a* and the laterally extending path 354*b* in the outer measurement bent surface 401, and is inclined with respect to both the height direction Y and the depth direction Z. The measurement inclined surface 354*c* guides water such as dew condensation water toward the measurement exit 36 when the water flows on the inner surface of the longitudinally extending path 354*a* toward the housing tip end side. As described above, the water in the discharge measurement path 354 flows through the measurement inclined surface 354*c* and is discharged to the outside from the measurement exit 36, whereby even when the vehicle body is inclined, the water is suppressed from accumulating at the outside corner portion of the longitudinally extending path 354*a* and the laterally extending path 354*b*. The measurement inclined surface 354*c* can also be referred to as a drain inclined surface.

In the housing 21, a cavity portion 356 is provided between the discharge measurement path 354 and the passage flow path 31. The cavity portion 356 does not communicate with the passage flow path 31 and the measurement flow path 32 inside the housing 21, and is a closed space. The cavity portion 356 can also be referred to as a thinned portion.

As shown in FIG. 66, the branch measurement path 351 has a portion extending straight from the measurement entrance 35 toward the guide measurement path 352. When the center line of this portion is referred to as a branch measurement line CL23, the branch measurement line CL23 extends linearly in a state of being inclined with respect to the entrance ceiling surface 342. The branch measurement line CL23 obliquely extends from the measurement entrance 35 toward the downstream side of the branch measurement path 351 to the side opposite from the passage entrance 33. In other words, the branch measurement line CL23 obliquely extends on the passage exit 34 side from the measurement entrance 35 toward the downstream side of the branch measurement path 351.

In FIG. 66, the inner surface of the housing 21 is chamfered at the branch portion between the passage flow path 31 and the measurement flow path 32, but the branch measurement line CL23 is set assuming a configuration without this chamfering. The branch measurement line CL23 is also an extension line obtained by extending the center line of the branch measurement path 351 at the measurement entrance 35 toward the passage flow path 31.

The branch measurement line CL23 is inclined with respect to the entrance floor surface 346. An inclination angle θ23 of the branch measurement line CL23 with respect to the entrance floor surface 346 is 90 degrees or more. That is, the inclination angle θ23 has the same value as 90 degrees or a value larger than 90 degrees, and the relationship of $\theta23 \geq 90$ is established. The inclination angle θ23 is an angle of a portion between the floor parallel line CL21 and the branch measurement line CL23 and facing the passage entrance 33 side. In the range of 90 degrees or more, θ23 is preferably 150 degrees or less, and more preferably 120 degrees or less.

The branch measurement line CL23 is inclined with respect to the main flow line CL22 in addition to the entrance floor surface 346. An inclination angle θ24 of the branch measurement line CL23 with respect to the main flow line CL22 is 90 degrees or more similarly to the inclination angle θ23. That is, the inclination angle θ24 has the same value as 90 degrees or a value larger than 90 degrees, and the relationship of $\theta24 \geq 90$ is established. The inclination angle θ24 is an angle of a portion between the main flow line CL22 and the branch measurement line CL23 and facing the passage entrance 33 side. The inclination angle θ24 is included in the obtuse angle. In the range of 90 degrees or more, θ24 is preferably 150 degrees or less, and more preferably 120 degrees or less.

The inclination angles θ23 and θ24 are included in the obtuse angle. The branch measurement line CL23 is inclined with respect to the entrance ceiling surface 342 in addition to the entrance floor surface 346 and the main flow line CL22. The inclination angle of the branch measurement line CL23 with respect to the entrance ceiling surface 342 is 10 degrees or more similarly to the inclination angles θ23 and θ24.

The branch measurement path 351 is inclined with respect to the entrance passage path 331. In this case, the branch measurement line CL23, which is the center line of the branch measurement path 351, is inclined with respect to an entrance passage line CL24, which is the center line of the entrance passage path 331. An inclination angle θ25 of the branch measurement line CL23 with respect to the entrance passage line CL24 is 90 degrees or more. That is, the inclination angle θ25 has the same value as 90 degrees or a value larger than 90 degrees, and the relationship of $\theta 25 \geq 90$ is established. The inclination angle θ25 is an angle of a portion between the branch measurement line CL23 and the entrance passage line CL24 and facing the passage entrance 33 side. The entrance passage line CL24 is a straight imaginary line passing through the center CO21 of the measurement entrance 35, which is the upstream end portion of the entrance passage path 331, and a center CO22 of the downstream end portion of the entrance passage path 331.

The branch measurement path 351 is inclined with respect to the exit passage path 332. In this case, the branch measurement line CL23 is inclined with respect to an exit passage line CL25, which is the center line of the exit passage path 332. An inclination angle θ26 of the branch measurement line CL23 with respect to the exit passage line CL25 is 60 degrees or less. That is, the inclination angle θ26 has the same value as 60 degrees or a value smaller than 60 degrees, and the relationship of $\theta 26 \leq 60$ is established. The inclination angle θ26 is set to 60 degrees, for example. The exit passage line CL25 is a straight imaginary line passing through a center CO23 of the upstream end portion of the exit passage path 332 and a center CO24 of the passage exit 34, which is the downstream end portion of the exit passage path 332. The exit passage line CL25 is inclined with respect to the entrance passage line CL24.

The inclination angle θ26 of the branch measurement line CL23 with respect to the exit passage line CL25 is an inclination angle of the branch measurement path 351 with respect to the branch passage path 333, and corresponds to a branch angle indicating an angle at which the measurement flow path 32 branches from the passage flow path 31.

Next, a flow mode of air in the bypass flow path 30 will be described with reference to FIGS. 68 to 71. The airflow flowing through the intake passage 12 includes main flows AF21 and AF22 and drift flows AF23 to AF26.

Figure 68:
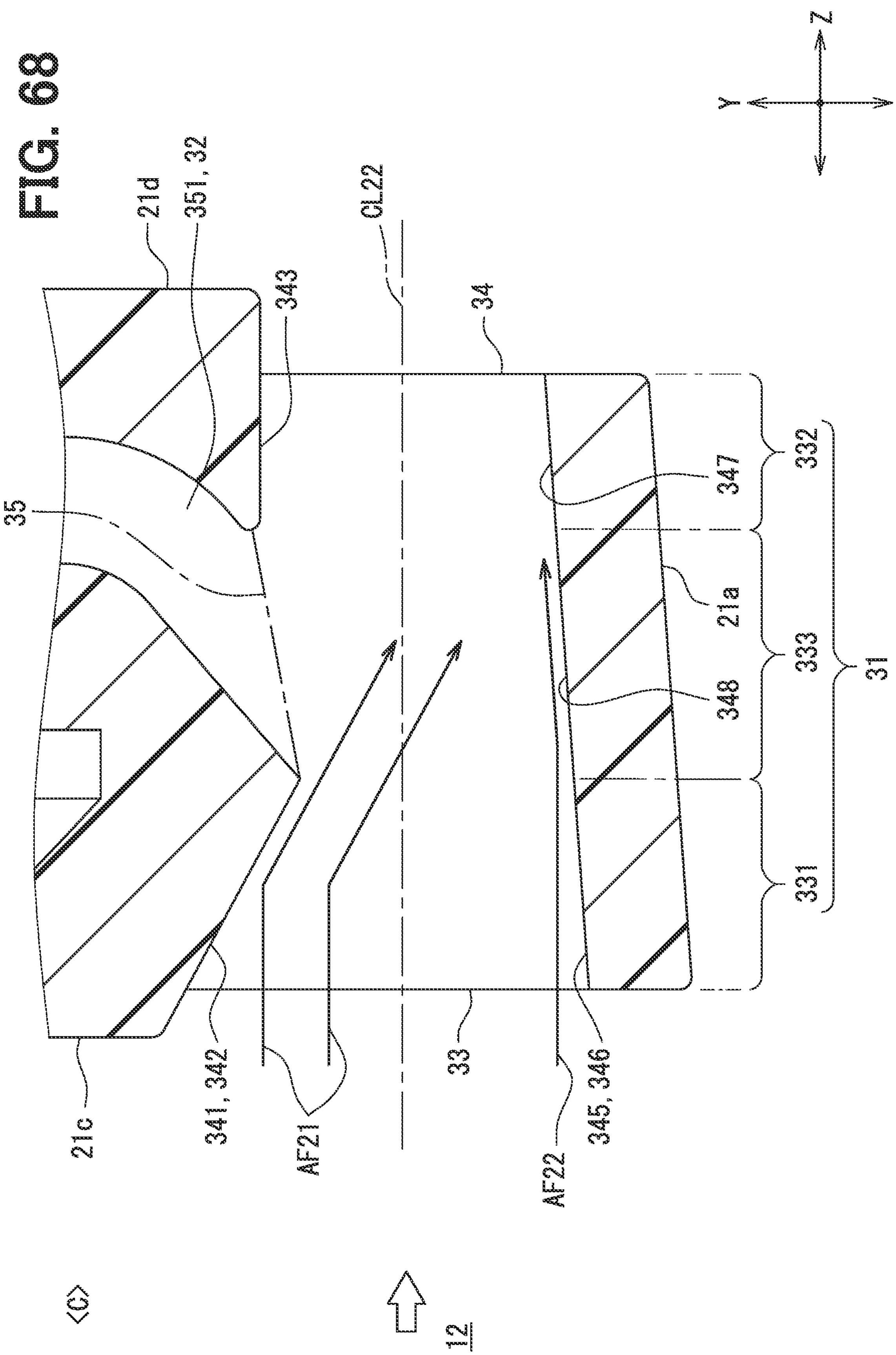
FIG. 68 is a view for explaining a main flow flowing into the passage flow path.

As shown in FIG. 68, the main flows AF21 and AF22 flow in the main flow direction along the main flow line CL22 in the intake passage 12, and flow from the passage entrance 33 into the entrance passage path 331 in the flow orientation as it is. Of the main flows AF21 and AF22, the main flow AF21 flowing from the passage entrance 33 to the entrance ceiling surface 342 side proceeds toward the entrance ceiling surface 342, and when approaching the entrance ceiling surface 342, the proceeding orientation is changed by the entrance ceiling surface 342. In this case, the entrance ceiling surface 342 changes the proceeding orientation of the main flow AF21 to the orientation toward the passage floor surface 345. Therefore, even if a foreign matter such as dust enters from the passage entrance 33 together with the main flow AF21, the foreign matter easily proceeds toward the passage floor surface 345, and the foreign matter hardly enters the measurement entrance 35.

On the other hand, the main flow AF22 flowing from the passage entrance 33 to the entrance floor surface 346 side proceeds toward the passage floor surface 345 such as the entrance floor surface 346 and the branch floor surface 348, and when approaching the passage floor surface 345, the proceeding orientation is changed by the passage floor surface 345. In this case, the passage floor surface 345 changes the proceeding orientation of the main flow AF22 to the orientation toward the passage exit 34. Therefore, even if the foreign matter enters from the passage entrance 33 together with the main flow AF22, the foreign matter easily proceeds toward the passage exit 34 along the passage floor surface 345, and the foreign matter hardly enters the measurement entrance 35.

Figure 69:
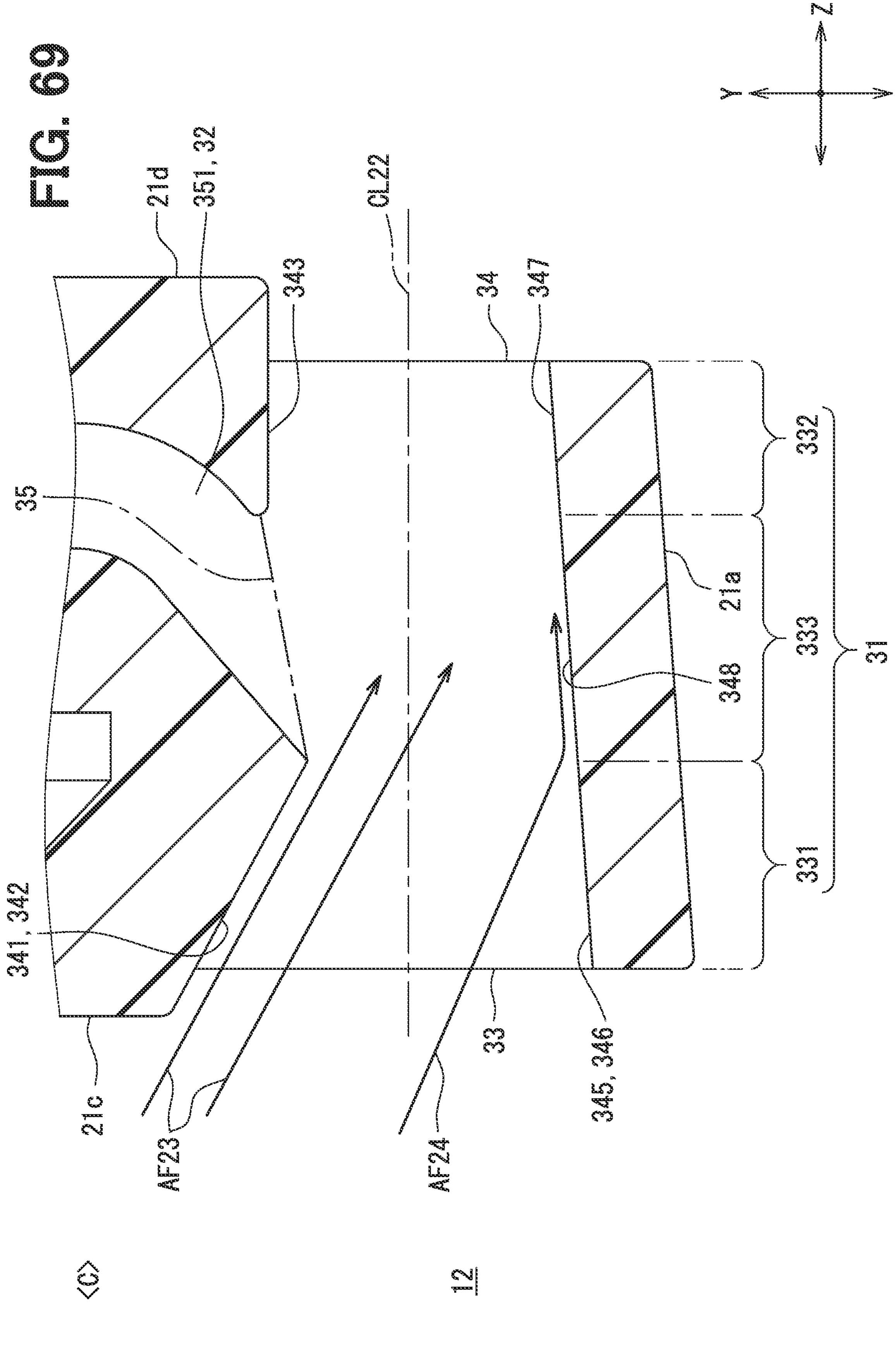
FIG. 69 is a view for explaining downward drift flow flowing into the passage flow path.
Figure 70:
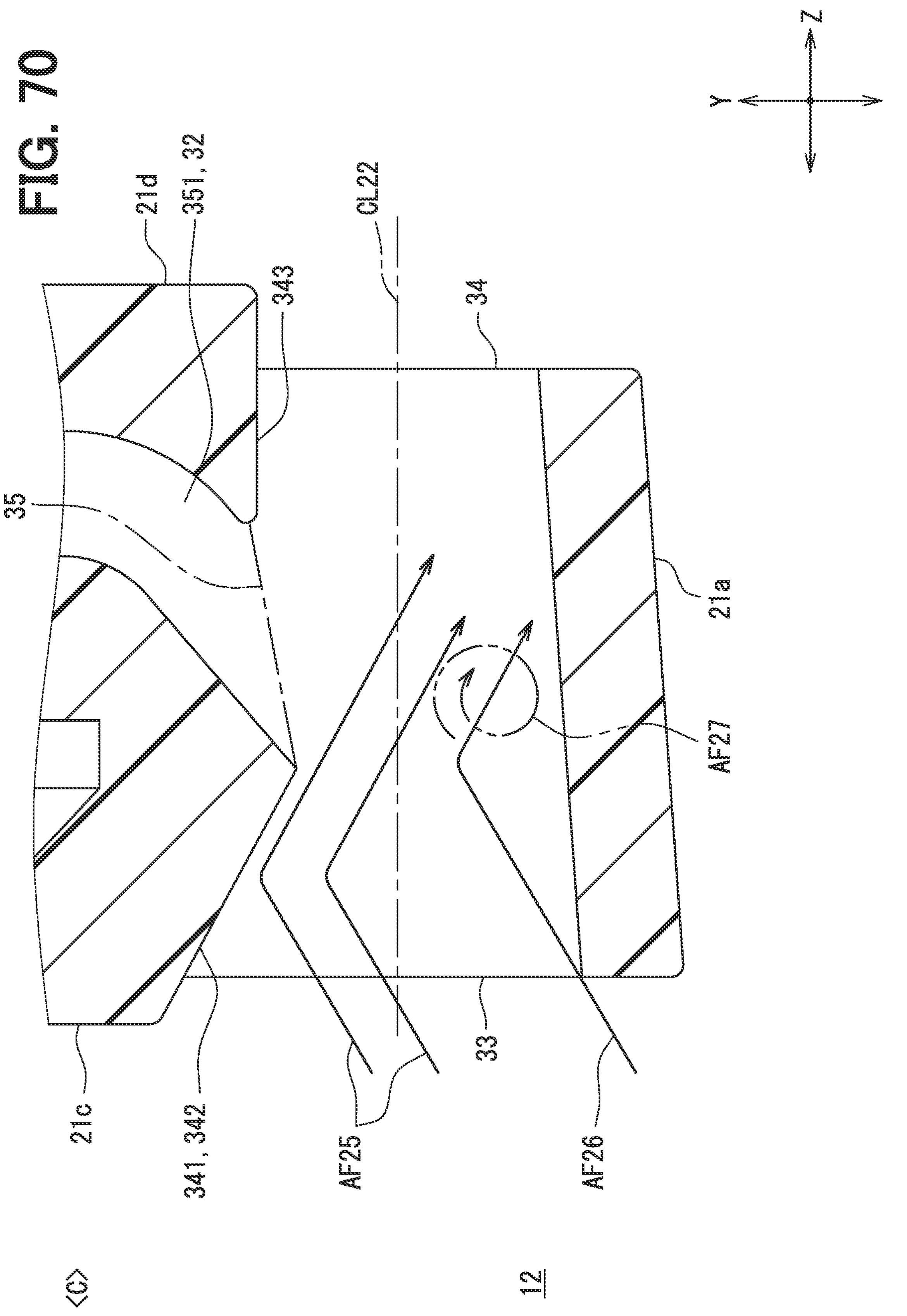
FIG. 70 is a view for explaining upward drift flow flowing into the passage flow path.

As shown in FIGS. 69 and 70, the drift flows AF23 to AF26 flow through the intake passage 12 in an orientation inclined with respect to the main flow line CL22 and the main flow direction, and flow from the passage entrance 33 to the entrance passage path 331 with the orientation of the flow as it is.

As shown in FIG. 69, among the drift flows AF23 to AF26, the downward drift flows AF23 and AF24 are airflows obliquely proceeding in the intake passage 12 from the housing base end side toward the housing tip end side around the housing 21. Here, airflows whose inclination angle with respect to the main flow line CL22 is smaller than that of the entrance ceiling surface 342 are referred to as the downward drift flows AF23 and AF24.

Of the downward drift flows AF23 and AF24, the downward drift flow AF23 flowing from the passage entrance 33 toward the entrance ceiling surface 342 easily proceeds along the entrance ceiling surface 342 toward the passage floor surface 345. In particular, when the inclination angle with respect to the main flow direction is substantially the same between the downward drift flow AF23 and the entrance ceiling surface 342, the proceeding orientation of the downward drift flow AF23 is unlikely to change by the entrance ceiling surface 342. In these cases, even if a foreign matter enters from the passage entrance 33 together with the downward drift flow AF23, the foreign matter easily proceeds toward the passage floor surface 345, and the foreign matter hardly enters the measurement entrance 35.

On the other hand, the downward drift flow AF24 flowing from the passage entrance 33 to the entrance floor surface 346 side proceeds toward the passage floor surface 345, and when approaching the passage floor surface 345, the proceeding orientation is changed by the passage floor surface 345. In this case, the passage floor surface 345 changes the proceeding orientation of the downward drift flow AF24 to the orientation toward the passage exit 34. Therefore, even if the foreign matter enters from the passage entrance 33 together with the downward drift flow AF24, the foreign matter easily proceeds toward the passage exit 34 along the passage floor surface 345, and the foreign matter hardly enters the measurement entrance 35.

As shown in FIG. 70, among the drift flows AF23 to AF26, the upward drift flows AF25 and AF26 are airflows obliquely proceeding in the intake passage 12 from the housing tip end side toward the housing base end side around the housing 21. Here, airflows whose inclination angle with respect to the main flow line CL22 is larger than that of the entrance floor surface 346 are referred to as the upward drift flows AF25 and AF26.

Of the upward drift flows AF25 and AF26, the upward drift flow AF25 flowing from the passage entrance 33 to the entrance ceiling surface 342 side proceeds toward the entrance ceiling surface 342, and when approaching the entrance ceiling surface 342, the proceeding orientation is changed by the entrance ceiling surface 342. In this case, the entrance ceiling surface 342 changes the proceeding orientation of the upward drift flow AF25 to the orientation toward the passage floor surface 345. Therefore, even if a foreign matter such as dust enters from the passage entrance 33 together with the upward drift flow AF25, the foreign matter easily proceeds toward the passage floor surface 345, and the foreign matter hardly enters the measurement entrance 35.

On the other hand, the upward drift flow AF26 flowing from the passage entrance 33 to the entrance floor surface 346 side easily proceeds toward the entrance ceiling surface 342 and the measurement entrance 35. That is, after flowing into the entrance passage path 331 from the passage entrance 33, the upward drift flow AF26 easily proceeds in an orientation separating from the passage floor surface 345 such as the entrance floor surface 346. In this case, since the upward drift flow AF26 is separated from the passage floor surface 345, a vortex AF27 that flows so as to be wound around the passage floor surface 345 side is generated, and the flow of the upward drift flow AF26 is easily disturbed. In a case where the flow of the upward drift flow AF26 is disturbed in this manner, the upward drift flow AF25 on the entrance ceiling surface 342 side is also disturbed by the disturbance of the upward drift flow AF26, and thus the airflow is easily disturbed in the entire passage flow path 31. In this case, there is a concern that since the disturbed airflow flows into the measurement flow path 32 from the measurement entrance 35, the detection accuracy of the flow rate by the flow sensor 22 decreases.

On the other hand, since the upward drift flow AF25 whose orientation is changed by the entrance ceiling surface 342 proceeds toward the passage floor surface 345, the upward drift flow AF25 is in a state of pushing the upward drift flow AF26 against the passage floor surface 345. In this case, the upward drift flow AF25 proceeding toward the passage floor surface 345 changes the proceeding orientation of the upward drift flow AF26 on the entrance floor surface 346 side to the orientation toward the passage floor surface 345. For this reason, the upward drift flow AF26 is less likely to separate from the passage floor surface 345, and as a result, the vortex AF27 accompanying the separation is also less likely to occur. Therefore, it is suppressed that the airflow in the passage flow path 31 is disturbed due to the generation of the vortex AF27 or the like.

In the air flow meter 20, the variation mode of the output related to the flow rate measurement correlates with the inclination angle θ21 of the entrance ceiling surface 342 with respect to the entrance floor surface 346. Specifically, when the variation mode of the measurement value of the air flow meter 20 with respect to the true air flow rate in the intake passage 12 is calculated as an output variation, the output variation is appropriately managed in a configuration in which the inclination angle θ21 of the entrance ceiling surface 342 with respect to the entrance floor surface 346 is 10 degrees or more. For example, in a range where the inclination angle θ21 is larger than 0 degrees and smaller than 10 degrees, the output variation of the air flow meter 20 becomes smaller as the inclination angle θ21 is closer to 10 degrees. In a range where the inclination angle θ21 is 10 degrees or more, the output variation of the air flow meter 20 is maintained at an appropriately small value. In the range of 10 degrees or more, the inclination angle θ21 is preferably 60 degrees or less, and more preferably 30 degrees or less.

Figure 71:
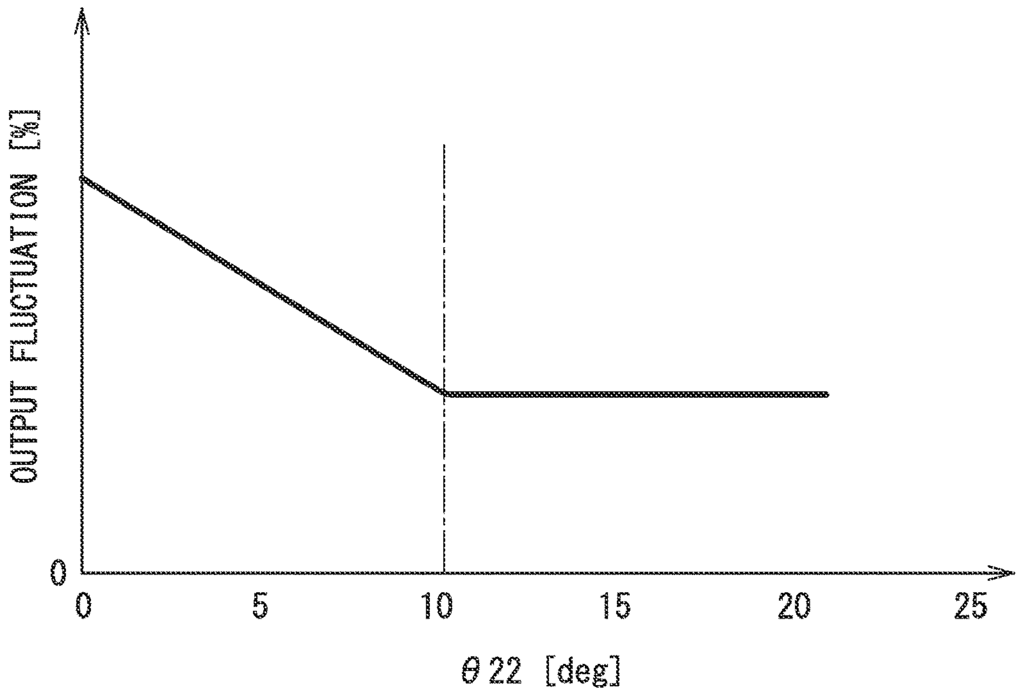
FIG. 71 is a view showing a relationship between an inclination angle of an entrance ceiling surface with respect to a main flow line and output variation of the air flow meter.

The output variation of the air flow meter 20 also correlates with the inclination angle θ22 of the entrance ceiling surface 342 with respect to the main flow line CL22. This output variation is appropriately managed in a configuration in which the inclination angle θ22 of the entrance ceiling surface 342 with respect to the main flow line CL22 is 10 degrees or more. For example, as shown in FIG. 71, in the range where inclination angle θ22 is larger than 0 degrees and smaller than 10 degrees, the output variation of air flow meter 20 decreases as inclination angle θ22 is closer to 10 degrees. In a range where the inclination angle θ22 is 10 degrees or more, the output variation of the air flow meter 20 is maintained at an appropriately small value. In the range of 10 degrees or more, the inclination angle θ22 is preferably 60 degrees or less, and more preferably 30 degrees or less.

In the intake passage 12 shown in FIG. 66, when pulsation occurs in the flow of the intake air due to the operating state of the engine or the like, due to the pulsation, in addition to a forward flow flowing from the upstream side, a backflow flowing in a direction opposite from the forward flow from the downstream side may occur. While the forward flow flows into the passage flow path 31 from the passage entrance 33, there is a concern that the backflow flows into the passage flow path 31 from the passage exit 34. For example, when a forward flow flows from the passage entrance 33 and further flows from the passage flow path 31 into the measurement flow path 32, the flow rate of the forward flow is detected by the flow sensor 22. On the other hand, when the backflow generated in the intake passage 12 flows in from the passage exit 34 and further flows into the measurement flow path 32 from the passage flow path 31, the flow rate of the backflow is detected by the flow sensor 22.

The flow sensor 22 can detect the flow of air in the measurement flow path 32 in addition to the flow rate of air in the measurement flow path 32. However, when the backflow flowing from the passage exit 34 flows into the measurement flow path 32, the backflow flows in the measurement flow path 32 from the measurement entrance 35 toward the measurement exit 36 similarly to the forward flow flowing from the passage entrance 33. As described above, in the measurement flow path 32, since the orientation in which the backflow flowing in from the passage exit 34 flows and the orientation in which the forward flow flowing in from the passage entrance 33 flows are the same, the flow sensor 22 cannot detect the forward flow and the backflow separately. Therefore, even though the air flowing through the measurement flow path 32 actually includes a backflow, the air flow meter 20 measures the flow rate of the air assuming that all the air flowing through the measurement flow path 32 is forward flow. As a result, there is a concern that the measurement accuracy of the air flow meter 20 decreases.

In the intake passage 12, as the air passes around the air flow meter 20, disturbance of the airflow such as a vortex and stagnation may occur. For example, when the air flowing in the intake passage 12 as a forward flow passes through the housing front surface 21*e* and the housing back surface 21*f*, a flow that tries to directly proceed in the main flow direction and a flow that is about to proceed along the housing downstream surface 21*d* are mixed, and the disturbance of the airflow may occur. In a case where the disturbance of the airflow is present around the passage exit 34 such as on the downstream side of the housing downstream surface 21*d*, when a backflow occurs in the intake passage 12, the backflow becomes unstable including the disturbance of the airflow, and there is a concern that the unstable backflow enters the passage flow path 31 from the passage exit 34.

Therefore, in the air flow meter 20, even if the backflow flows from the passage exit 34 into the passage flow path 31, the branch measurement path 351 extends from the passage flow path 31 toward the passage exit 34, so that the backflow is less likely to flow from the passage flow path 31 into the branch measurement path 351. In particular, as described above, since the inclination angle θ26 of the branch measurement line CL23 with respect to the exit passage line CL25 is 60 degrees or less, the backflow from the passage flow path 31 to the branch measurement path 351 is further less likely to occur.

In the bypass flow path 30, the measurement entrance 35 does not face the passage entrance 33 side as described above. For this reason, the dynamic pressure of the forward flow flowing in from the passage entrance 33 is hardly applied to the measurement entrance 35, and the flow velocity of the air in the measurement flow path 32 tends to increase. In this configuration, even if a foreign matter such as dust, water droplets, and oil droplets enters the passage flow path 31 from the passage entrance 33 together with forward flow, the foreign matter hardly enters the branch measurement path 351 from the passage flow path 31. In this case, since the foreign matter having reached the flow sensor 22 in the measurement flow path 32 hardly damages the flow sensor 22 or hardly adheres to the flow sensor 22, the detection accuracy of the flow sensor 22 is suppressed from being lowered by the foreign matter.

The entire passage exit 34 and at least a part of the passage entrance 33 overlap in the depth direction Z, which is the main flow direction. In this configuration, in the intake passage 12, when a foreign matter is included in the main flow flowing into the portion of the passage entrance 33 overlapping the passage exit 34 in the depth direction Z, the foreign matter proceeds straight in the main flow direction together with the main flow, and is discharged from the passage exit 34 to the outside. Therefore, the foreign matter hardly enters the measurement entrance 35.

When the state of the pulsation generated in the intake passage 12 is referred to as a pulsation characteristic, the pulsation characteristic measured by the air flow meter 20 using the detection result of the flow sensor 22 may include an error with respect to the pulsation characteristic of the pulsation actually generated in the intake passage 12. Examples of the case where the pulsation characteristic measured by the air flow meter 20 includes an error include a case where the backflow flowing from the passage exit 34 enters the measurement flow path 32 from the passage flow path 31.

Figure 72:
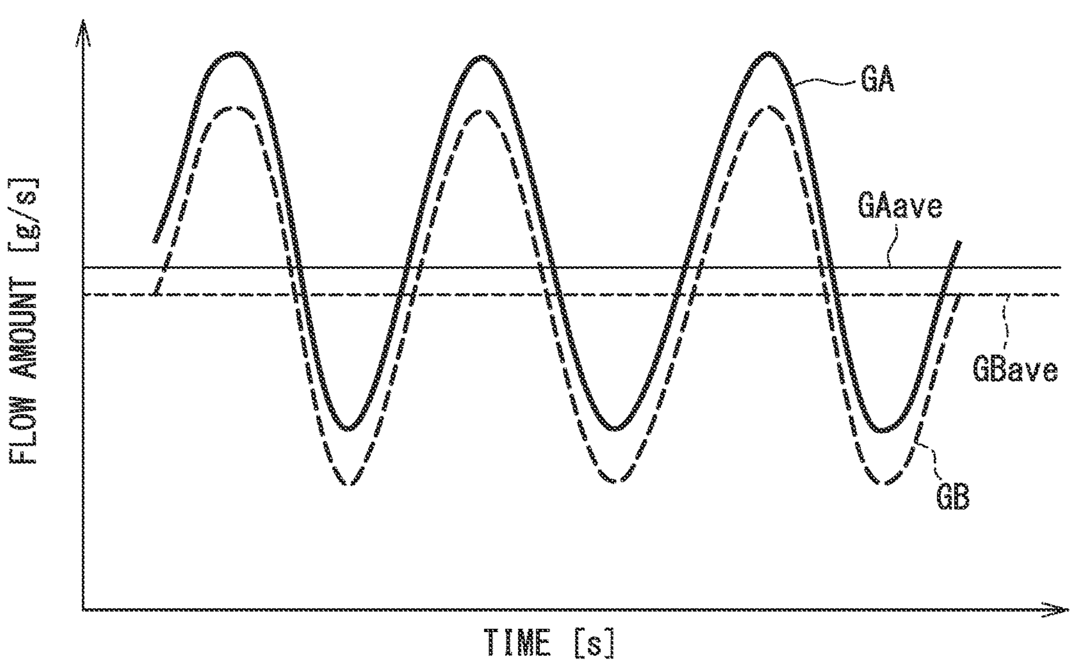
FIG. 72 is a view showing a change mode of a flow rate.

Here, the flow rate measured by the air flow meter 20 is referred to as a flow rate measurement value GA, the average value of the flow rate measurement values GA is referred to as a measurement average value GAave, the actual flow rate of the intake air flowing through the intake passage 12 is referred to as an actual flow rate GB, and the average value of the actual flow rate GB is referred to as an actual average value GBave. As shown in FIG. 72, when the flow rate measurement value GA becomes a value smaller than the actual flow rate GB due to the error included in the flow rate measurement value GA, the measurement average value GAave also becomes smaller than the actual average value GBave.

Figure 73:
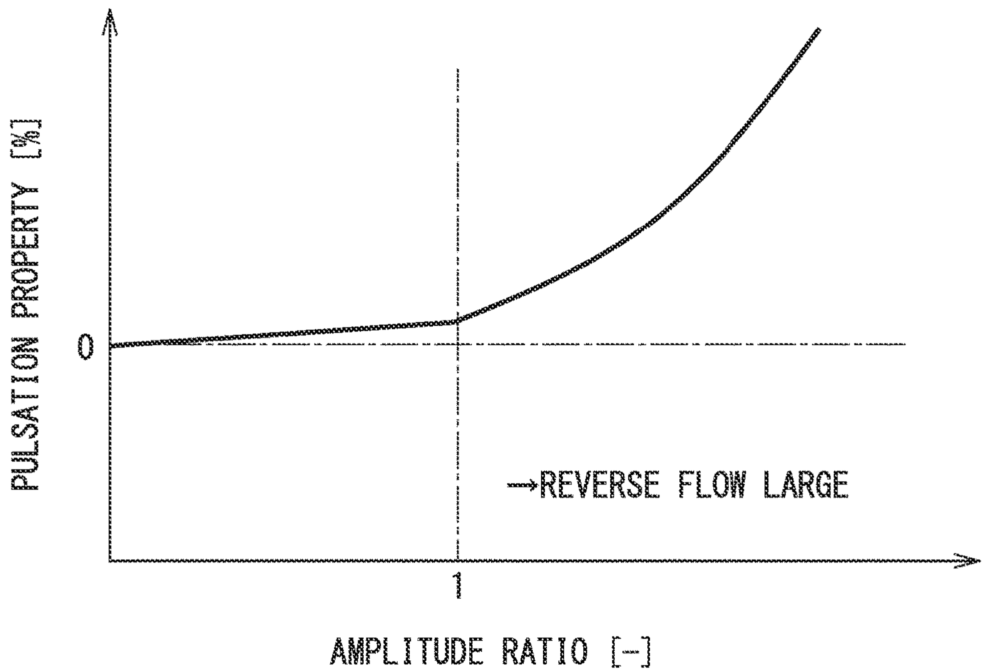
FIG. 73 is a view showing a relationship between a pulsation characteristic and an amplitude ratio.

The pulsation characteristics can be quantified by a value obtained by dividing the difference between the measurement average value GAave and the actual average value GBave by the actual average value GBave. In this case, a mathematical expression for calculating the pulsation characteristic can be expressed as (GAave−GBave)/GBave. The numerical value of the pulsation characteristic tends to increase as the amplitude of the pulsation increases. For example, when a value obtained by dividing the difference between the maximum value GBmax and the actual average value GBave of the actual flow rate GB by the actual average value GBave is referred to as an amplitude ratio, as shown in FIG. 73, the numerical value of the pulsation characteristic increases as the amplitude ratio increases. In particular, in the region where the amplitude ratio is larger than 1, the increase rate of the pulsation characteristic with the increase in the amplitude ratio is large. Here, the larger the amplitude ratio is, the larger the amount of backflow from the passage exit 34 is. A mathematical expression for calculating the amplitude ratio can be expressed as (GBmax−GBave)/GBave.

Figure 74:
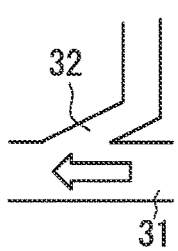
FIG. 74 is a view for explaining a configuration in which branch angles are different.
Figure 74:
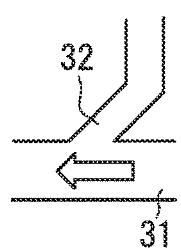
Figure 74:
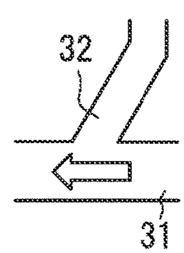
Figure 74:
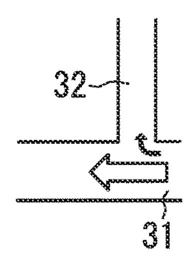

In the present embodiment, the inclination angle θ26 of the branch measurement line CL23 with respect to the main flow line CL22 is set to, for example, 60 degrees, but the numerical value of the pulsation characteristic is likely to change according to the inclination angle θ26. For example, as shown in FIG. 74, in the configuration in which the inclination angle θ26 is 30 degrees, 45 degrees, 60 degrees, and 90 degrees, when the backflow flows into the passage flow path 31 from the passage exit 34, the backflow is less likely to flow into the measurement flow path 32 in the configuration in which the inclination angle θ26 is 30 degrees, 45 degrees, and 60 degrees. On the other hand, in the configuration in which the inclination angle θ26 is 90 degrees, the backflow easily flows into the measurement flow path 32. In this case, the detection accuracy of the pulsation characteristic by the air flow meter 20 is likely to decrease.

Figure 75:
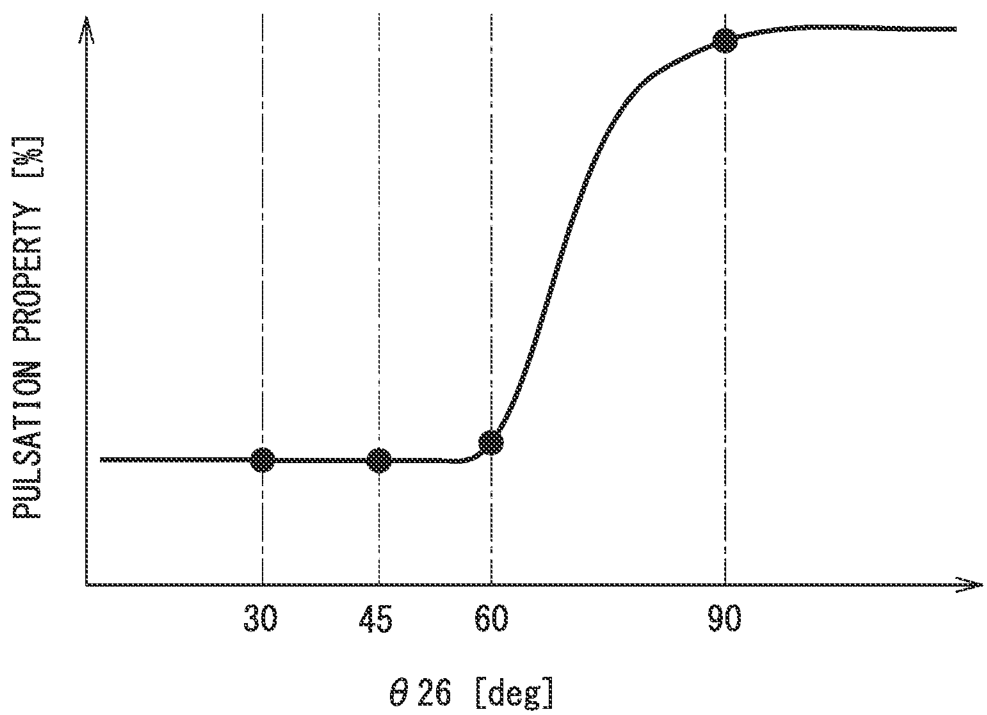
FIG. 75 is a view showing a relationship between a branch angle and a pulsation characteristic.

In the air flow meter 20, it is considered that the ease of flowing of the backflow into the measurement flow path 32 is different according to the inclination angle θ26, and as a result, the numerical value of the pulsation characteristic is different. For example, as shown in FIG. 75, in a configuration in which the inclination angle θ26 is 60 degrees or less, the numerical value of the pulsation characteristic is a relatively small value. This is considered to be due to an event in which a backflow is less likely to flow into the measurement flow path 32 when the inclination angle θ26 is 60 degrees or less. On the other hand, in the configuration in which the inclination angle θ26 is larger than 60 degrees, the numerical value of the pulsation characteristic is a relatively large value. This is considered to be due to an event that a backflow easily flows into the measurement flow path 32 when the inclination angle θ26 is larger than 60 degrees. In this configuration, as the inclination angle θ26 increases, the numerical value of the pulsation characteristic increases. This is considered to be due to an event that, in a range where the inclination angle θ26 is larger than 60 degrees, the backflow is more likely to flow into the measurement flow path 32 as the inclination angle θ26 is larger.

According to the present embodiment described so far, the entrance ceiling surface 342 is inclined with respect to the entrance floor surface 346. In this configuration, in the air flowing into the entrance passage path 331 from the passage entrance 33, the air such as the upward drift flow AF25 flowing into the entrance ceiling surface 342 side is changed in proceeding orientation by the entrance ceiling surface 342, and the air easily proceeds toward the entrance floor surface 346 along the entrance ceiling surface 342. Therefore, even if the air such as the upward drift flow AF26 is separated or about to be separated from the entrance floor surface 346, the separating air is pressed against the entrance floor surface 346 by the air such as the upward drift flow AF25 proceeding along the entrance ceiling surface 342 toward the entrance floor surface 346. In this case, separation of the air from the entrance floor surface 346 and occurrence of disturbance such as a vortex are restricted by the fluid flowing along the entrance ceiling surface 342, and as a result, the disturbance of the air is less likely to occur in the entrance passage path 331. Therefore, the detection accuracy of the flow rate by the flow sensor 22 can be enhanced, and furthermore, the measurement accuracy of the flow rate by the air flow meter 20 can be enhanced.

According to the present embodiment, the inclination angle θ21 of the entrance ceiling surface 342 with respect to the entrance floor surface 346 is 10 degrees or more. In this configuration, the inclination angle θ21 is set to a value large to some extent so that the air such as the upward drift flow AF25 of which the proceeding orientation is changed by the entrance ceiling surface 342 proceeds toward the entrance floor surface 346 instead of the passage exit 34. Therefore, as compared with a configuration in which the inclination angle θ21 is set to a value smaller than 10 degrees, for example, it is possible to reliably suppress separation of the air around the entrance floor surface 346 due to the air of the upward drift flow AF25 or the like whose proceeding orientation is changed by the entrance ceiling surface 342.

According to the present embodiment, the entrance ceiling surface 342 is inclined with respect to the entrance floor surface 346 so as to face the passage entrance 33 side. In this configuration, the air such as the main flow AF21 and the downward drift flow AF23 flowing from the passage entrance 33 to the entrance ceiling surface 342 side is less likely to be separated from the entrance ceiling surface 342. Therefore, it is possible to suppress generation of disturbance such as a vortex in the air flowing from the passage entrance 33 to the entrance ceiling surface 342 side.

For example, in a configuration in which the entrance ceiling surface 342 is inclined with respect to the entrance floor surface 346 so as to face the passage exit 34 side, the main flow AF21 flowing from the passage entrance 33 to the entrance ceiling surface 342 side separates from the entrance ceiling surface 342 as it proceeds toward the passage exit 34, and is easily separated. In this case, disturbance of the airflow is likely to occur in the passage flow path 31 due to generation of a vortex or the like by the main flow AF21.

According to the present embodiment, the entrance ceiling surface 342 is inclined so as to face the passage entrance 33 with respect to the main flow direction in which the main flow line CL22 extends. In this configuration, when air such as main flow AF21 flowing in the main flow direction flows into the entrance ceiling surface 342 side from the passage entrance 33, the air can be guided to the entrance floor surface 346 side by the entrance ceiling surface 342. Therefore, even if the air such as the main flow AF22 flowing in the main flow direction flows from the passage entrance 33 to the entrance floor surface 346 side and is about to be separated or separated, the air can be pressed against the entrance floor surface 346 by the air proceeding from the entrance ceiling surface 342 toward the entrance floor surface 346. Therefore, it is possible to suppress the occurrence of disturbance such as the vortex AF27 in the airflow around the entrance floor surface 346.

According to the present embodiment, the inclination angle θ22 of the entrance ceiling surface 342 with respect to the main flow direction is 10 degrees or more. In this configuration, among downward drift flows obliquely proceeding from the housing base end side toward the housing tip end side around the housing 21, downward drift flows AF23 and AF24 in which the inclination angle with respect to the main flow line CL22 is smaller than that of the entrance ceiling surface 342 are increased as much as possible. As a result, it is possible to suppress the occurrence of disturbance such as a vortex in the airflow due to separation of the air such as downward drift flowing from the passage entrance 33 to the entrance ceiling surface 342 side from the entrance ceiling surface 342.

On the other hand, for example, in a configuration in which the inclination angle θ22 of the entrance ceiling surface 342 with respect to the main flow direction is smaller than 10 degrees, the inclination angle of downward drift flow proceeding from the housing base end side toward the housing tip end side in around the housing 21 tends to be larger than the inclination angle θ22. For this reason, there is a concern that air such as downward drift flowing from the passage entrance 33 to the entrance ceiling surface 342 side is separated from the entrance ceiling surface 342 and disturbance such as a vortex occurs in the airflow.

According to the present embodiment, the main flow direction in which the main flow line CL22 extends is the direction in which the angle setting surface **27*a* of the housing 21 extends. Therefore, by using the angle setting surface 27*a* when setting the attachment angle of the housing 21 with respect to the piping unit 14, the housing 21 can be attached to the piping unit 14 in an appropriate orientation in accordance with the circumferential flow direction of the intake passage 12. That is, the housing 21 can be attached to the piping unit 14 in an orientation where the entrance ceiling surface 342** can exhibit the separation suppressing effect.

According to the present embodiment, the cross-sectional area S21 of the entrance passage path 331 gradually decreases from the passage entrance 33 toward the passage exit 34. In this configuration, as the air flowing into the entrance passage path 331 from the passage entrance 33 proceeds toward the passage exit 34, the degree of narrowing of the entrance passage path 331 increases, so that the air is easily straightened by the inner surface of the housing 21. Therefore, the air such as the upward drift flow AF25 of which the proceeding orientation is changed by the entrance ceiling surface 342 easily proceeds toward the entrance floor surface 346 without spreading to the housing front side and the housing back side than the entrance floor surface 346, and the disturbance of the air around the entrance floor surface 346 can be suppressed. In this manner, the entrance passage path 331 can have a shape in which the separation suppressing effect of the entrance ceiling surface 342 is easily exhibited.

According to the present embodiment, the inclination angle θ25 of the branch measurement line CL23 with respect to the entrance passage line CL24 is 90 degrees or more. In this configuration, the air flowing from the passage entrance 33 into the entrance passage path 331 and flowing along the entrance passage line CL24 can flow from the entrance passage path 331 into the measurement flow path 32 by gently changing its proceeding orientation at an obtuse angle without sharply changing its proceeding orientation at an acute angle. Therefore, when the air flowing through the passage flow path 31 flows into the measurement flow path 32, it is possible to suppress the occurrence of the disturbance of the airflow due to the rapid change in the proceeding orientation.

According to the present embodiment, the inclination angle θ26 of the branch measurement line CL23 with respect to the main flow line CL22 is 60 degrees or less. In this configuration, since the branch angle of the measurement flow path 32 with respect to the passage flow path 31 is 60 degrees or less, the air flowing into the entrance passage path 331 from the passage entrance 33 can be caused to flow into the measurement flow path 32 from the entrance passage path 331 without rapidly changing the proceeding orientation thereof. Therefore, when the air flowing through the passage flow path 31 flows into the measurement flow path 32, the airflow is less likely to be disturbed.

Further, in this configuration, in order for the backflow flowing from the passage exit 34 to flow from the passage flow path 31 into the branch measurement path 351, it is necessary to sharply turn at an acute angle. For this reason, an event that the backflow hardly flows into the branch measurement path 351 easily occurs, and it is possible to suppress the backflow from reaching the flow sensor 22. In this case, it is difficult for the air flow meter 20 to measure the flow rate assuming that the forward flow flowing in from the passage entrance 33 reaches the flow sensor 22 although the backflow flowing in from the passage exit 34 actually reaches the flow sensor 22. Therefore, the measurement accuracy of the flow rate of the intake air by the air flow meter 20 can be enhanced.

In this configuration, when a forward flow flows from the passage flow path 31 into the branch measurement path 351, the orientation of the forward flow is only required to gradually change toward the branch measurement path 351. In this case, as described above, the backflow is less likely to flow into the branch measurement path 351, while the forward flow is likely to flow into the branch measurement path 351. As described above, since the flow velocity of the forward flow flowing into the measurement flow path 32 is suppressed from being insufficient, the detection accuracy of the flow rate by the flow sensor 22 can be enhanced for the forward flow flowing in from the passage entrance 33.

According to the present embodiment, since the opening area of the passage exit 34 is smaller than the opening area of the passage entrance 33, the backflow generated in the intake passage 12 is less likely to flow into the passage exit 34. Therefore, it is possible to more reliably suppress the backflow from flowing into the branch measurement path 351.

Fourth Embodiment

In the first embodiment, the support recess portion 530 is provided on the mold back surface 55*f*, but in the fourth embodiment, the support projection portion is provided on the mold back surface 55*f*. In the present embodiment, components denoted by the same reference numerals as those in the drawings in the first embodiment and configurations that will not be described are similar to those in the first embodiment, and achieve the same functions and effects. In the present embodiment, differences from the first embodiment will be mainly described.

<Description of Configuration Group F>

Figure 76:
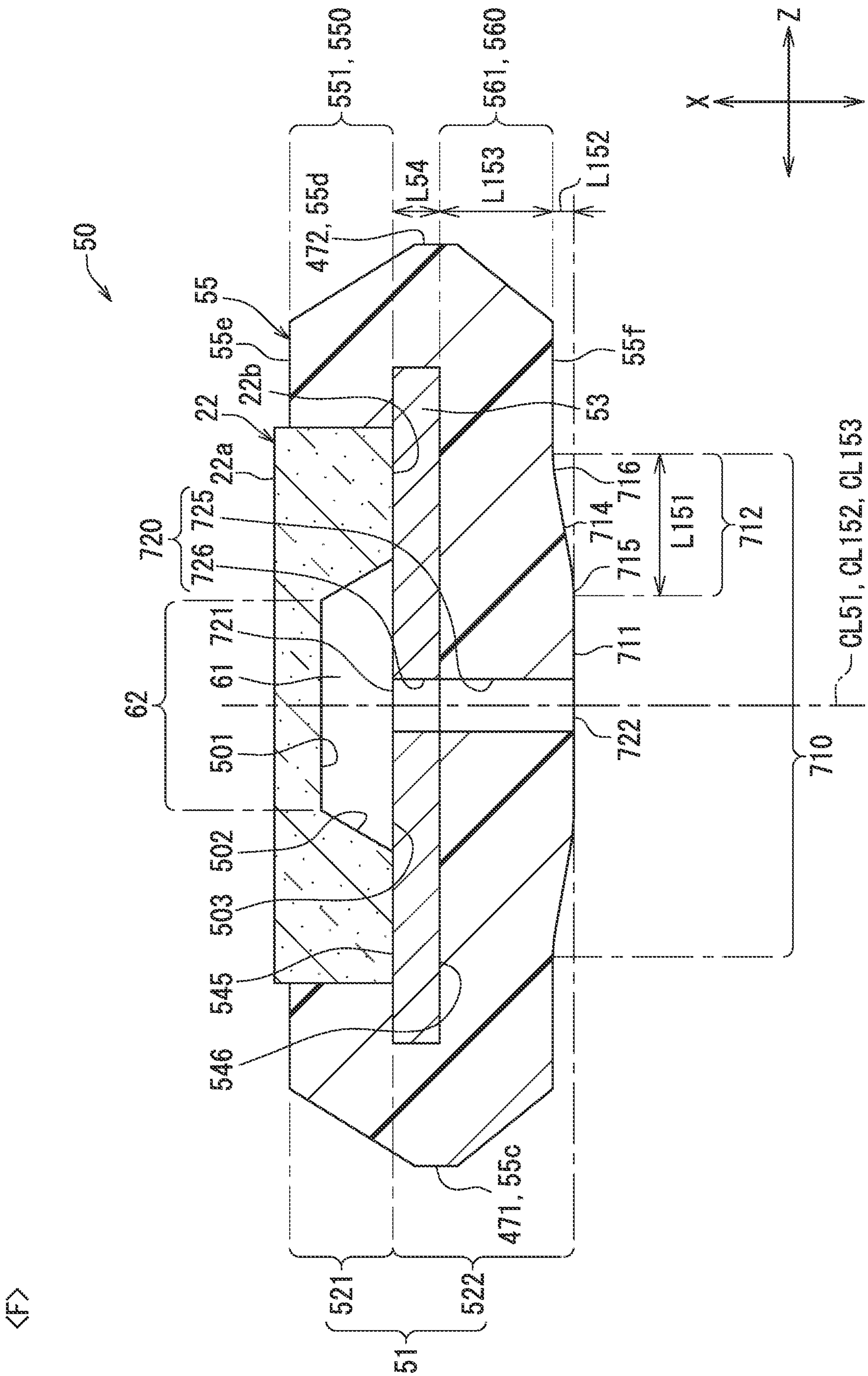
FIG. 76 is a cross-sectional view around a membrane portion of a flow sensor in the configuration group F of the fourth embodiment.

As shown in FIG. 76, the back support portion 522 includes a support projection portion 710 and a support hole 720 instead of the support recess portion 530 and the support hole 540. The support projection portion 710 is a projection portion provided on the mold back surface 55*f*, and is formed by a part of the mold back portion 560 projecting toward the mold back side.

The support projection portion 710 has a support projection tip end surface 711 and a support projection outer wall surface 712. A center line CL153 of the support projection portion 710 extends in the width direction X and passes through the center of the support projection tip end surface 711. The center line CL153 extends in parallel with the center line CL51 of the sensor recess portion 61 and is arranged with the center line CL51 of the sensor recess portion 61 in the height direction. Similarly to the center line CL53 of the support recess portion 530 of the first embodiment, the center line CL153 of the support projection portion 710 is disposed at a position shifted toward the mold base end side from the center line CL51 of the sensor recess portion 61 in the height direction Y.

The support projection tip end surface 711 is orthogonal to the center line CL153 of the support projection portion 710 and extends in parallel with the SA substrate 53. The support projection tip end surface 711 is formed in a circular shape or a substantially circular shape. The outer peripheral edge of the support projection tip end surface 711 is provided at a position separated inward from the base end portion of the support projection portion 710 in the directions Y and Z orthogonal to the center line CL153 of the support projection portion 710. The support projection tip end surface 711 corresponds to a support projection tip end portion.

The support projection outer wall surface 712 extends from the support projection tip end surface 711 toward the mold front side. The support projection outer wall surface 712 is inclined with respect to the center line CL153 of the support projection portion 710 and faces the mold back side. The support projection portion 710 is gradually reduced toward the mold back side in the width direction X, and has a tapered shape as a whole. The support projection outer wall surface 712 annularly extends along the outer peripheral edge of the support projection tip end surface 711.

The support projection outer wall surface 712 has an outer wall inclined surface 714, a tip end chamfered surface 715, and a base end chamfered surface 716. The outer wall inclined surface 714 extends straight in a direction inclined with respect to the center line CL153 of the support projection portion 710, and an inclination angle with respect to the center line CL153 is larger than 45 degrees, for example. The tip end chamfered surface 715 is a surface for chamfering an outside corner portion between the support projection tip end surface 711 and the outer wall inclined surface 714, and is bent so as to bulge toward the outside of the support projection portion 710. The base end chamfered surface 716 is a surface that chamfers the inside corner portion between the outer wall inclined surface 714 and the mold back surface 55*f*, and is curved so as to be recessed toward the inside of the support projection portion 710.

A length dimension L151 of the support projection outer wall surface 712 in the directions Y and Z orthogonal to the width direction X is larger than a length dimension L152 of the support projection outer wall surface 712 in the width direction X. The length dimension L151 is a separation distance between the inner peripheral edge and the outer peripheral edge of the support projection outer wall surface 712 in the directions Y and Z, and is a separation distance between the outer peripheral edge of the base end chamfered surface 716 and the inner peripheral edge of the tip end chamfered surface 715. The length dimension L152 is a projection dimension of the support projection portion 710 from the mold back surface 55*f*. The length dimension L152 is a separation distance between the tip end portion and the base end portion of the support projection outer wall surface 712 in the width direction X, and is a separation distance between the outer peripheral edge of the base end chamfered surface 716 and the inner peripheral edge of the tip end chamfered surface 715. The length dimension L152 is smaller than both a thickness dimension L153 of the portion of the mold back portion 560 where the support projection portion 710 is provided and the thickness dimension L54 of the SA substrate 53. In the support projection outer wall surface 712, a tip end portion is an inner peripheral edge, and a base end portion is an outer peripheral edge.

The support hole 720 extends from the support projection tip end surface 711 of the support projection portion 710 toward the flow sensor 22 and communicates with the sensor recess opening 503. The support hole 720 penetrates the back support portion 522 in the width direction X. A center line CL152 of the support hole 720 extends in the width direction X and extends in parallel with the center line CL51 of the sensor recess portion 61 and the center line CL153 of the support projection portion 710. The center line CL152 of the support hole 720 is arranged in the height direction Y with the center lines CL51 and CL152. The center line CL152 of the support hole 720 is arranged at a position shifted toward the mold tip end side from both of the center lines CL51 and CL153. The width direction X corresponds to the length direction of the support hole 720.

The support hole 720 includes a mold back hole 725 and an SA substrate hole 726. The mold back hole 725 is a through hole penetrating the mold back portion 560 in the width direction X. The SA substrate hole 726 is a through hole penetrating the SA substrate 53 in the width direction X. The SA substrate hole 726 is provided on the mold front side relative to the mold back hole 725, and the SA substrate hole 726 and the mold back hole 725 communicate with each other. The center line of the mold back hole 725 and the center line of the SA substrate hole 726 coincide with each other, and also coincide with the center line CL152 of the support hole 720. The SA substrate hole 726 and the mold back hole 725 have the same size and shape in a cross section orthogonal to the center line CL152. For example, each of the SA substrate hole 726 and the mold back hole 725 has a circular cross section or a substantially circular cross section, and has the same inner diameter. In the present embodiment, the support hole 540 of the first embodiment is referred to as the SA substrate hole 726.

The support hole 720 has a circular cross section or a substantially circular cross section, and has a uniform thickness in the direction where the center line CL152 extends. In the support hole 720, when an end portion on the mold front side is referred to as a front end portion 721 and an end portion on the mold back side is referred to as a back end portion 722, both the front end portion 721 and the back end portion 722 are circular or substantially circular. The front end portion 721 is an end portion on the mold front side of the SA substrate hole 726 and is included in the SA substrate front surface 545. The back end portion 722 is an end portion of the mold back side of the mold back hole 725 and is included in the support projection tip end surface 711. The back end portion 722 is disposed at a position separated inward from the outer peripheral edge of the support projection tip end surface 711 in the directions Y and Z orthogonal to the center line CL52 of the support hole 720. Therefore, the support projection tip end surface 711 annularly extends along the outer peripheral edge of the back end portion 722.

Figure 77:
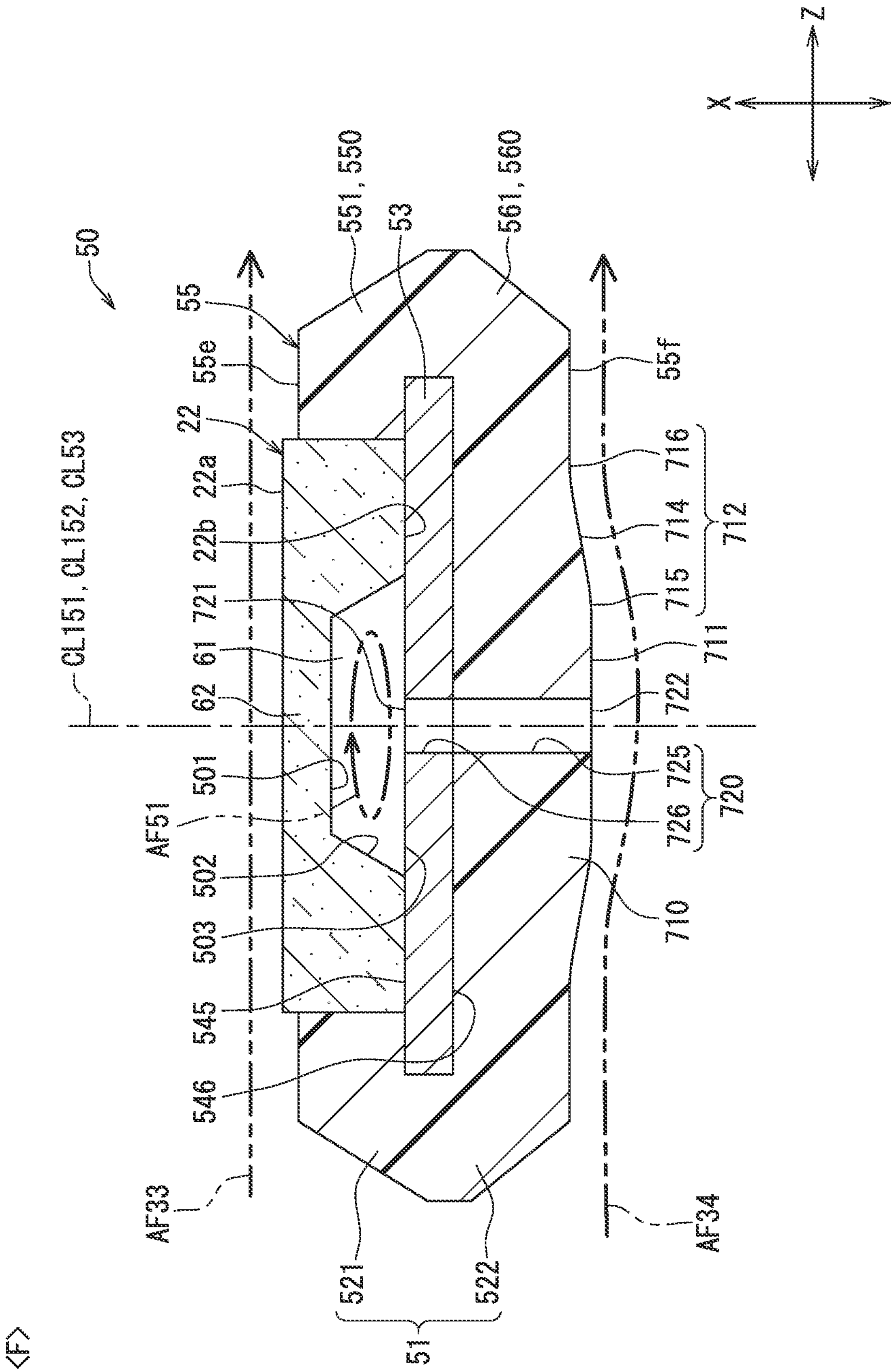
FIG. 77 is a view for explaining an airflow generated in the measurement flow path.

As shown in FIG. 77, the back closing flow AF34 flowing along the mold back surface 55*f* reaches the support projection portion 710 and flows along the support projection outer wall surface 712, so that the back closing flow AF34 obliquely proceeds toward the mold back side. Therefore, the back closing flow AF34 that, after proceeding along the support projection outer wall surface 712, passes through the back end portion 722 of the support hole 720 easily passes through a position separated from the back end portion 722 toward the mold back side. Therefore, the back closing flow AF34 hardly flows into the support hole 720 from the back end portion 722.

According to the present embodiment described so far, in the back support portion 522 of the sensor support portion 51, the support projection outer wall surface 712 provided around the support hole 720 is inclined so as to face the side opposite from the flow sensor 22. In this configuration, since the back closing flow AF34 flowing along the support projection outer wall surface 712 of the sensor support portion 51 tends to proceed away from the support hole 720 toward the mold back side in the length direction of the support hole 720, the back closing flow AF34 hardly flows into the support hole 720. Therefore, it is possible to suppress that the back closing flow AF34 flowing along the mold back surface 55*f* of the sensor support portion 51 from vigorously flowing into the sensor recess portion 61 through the support hole 720, and the cavity flow AF51 having an excessively large amount and velocity from being generated inside the sensor recess portion 61. In this case, similarly to the first embodiment, since the operation accuracy of the resistance elements 71 to 74 and the like in the membrane portion 62 is unlikely to decrease due to the cavity flow AF51, the measurement accuracy of the air flow meter 20 can be improved.

According to the present embodiment, in the directions Y and Z orthogonal to the width direction X, the outer peripheral edge of the support projection tip end surface 711 is provided at a position separated outward from the back end portion 722 of the support hole 720. In this configuration, even if the back closing flow AF34 flowing toward the support hole 720 along the support projection outer wall surface 712 reaches the outer peripheral edge of the support projection tip end surface 711, the back closing flow AF34 easily passes through the position separated from the back end portion 722 of the support hole 720 toward the mold upstream side. When the back closing flow AF34 reaches the back end portion 722 in the depth direction Z, the back closing flow AF34 easily passes through a position separated from the back end portion 722 toward the mold back side. As described above, since the back closing flow AF34 flowing along the support projection tip end surface 711 easily passes through the position separated from the back end portion 722 of the support hole 720, it is possible to suppress the back closing flow AF34 from flowing into the support hole 720 from the back end portion 722.

According to the present embodiment, the support projection tip end surface 711 becomes so large that the outer peripheral edge of the support projection tip end surface 711 is provided at a position separated outward from the sensor recess opening 503 in the directions Y and Z orthogonal to the width direction X. Therefore, it is possible to achieve a configuration in which the outer peripheral edge of the support projection tip end surface 711 is separated outward from the back end portion 722 of the support hole 720.

According to the present embodiment, the length dimension L151 of the support projection outer wall surface 712 in the directions Y and Z orthogonal to the width direction X is larger than the length dimension L152 of the support projection outer wall surface 712 in the width direction X. In this configuration, the degree to which the support projection outer wall surface 712 gradually narrows the support projection portion 710 toward the mold back side is as gentle as possible. For this reason, when the direction in which the back closing flow AF34 reaches the support projection outer wall surface 712 and proceeds changes, the change in the proceeding orientation is suppressed, so that disturbance such as a vortex is less likely to occur. Therefore, it is possible to suppress that disturbance of the airflow is generated around the back end portion 722 of the support hole 720 and the air flows into the support hole 720 from the back end portion 722 along with the disturbance.

Other Embodiments

Although a plurality of embodiments according to the present disclosure have been described above, the present disclosure is not to be construed as being limited to the above-described embodiments, and can be applied to various embodiments and combinations without departing from the gist of the present disclosure.

<Modification of Configuration Group A>

As the modification A1, in the measurement flow path 32, the front top portion 111*a* and the back top portion 112*a* may not be arranged in the width direction X. For example, only the front top portion 111*a* of the top portions 111*a* and 112*a* may be disposed on the center line CL5 of the heat resistance element 71. In this case, the back top portion 112*a* is disposed at a position shifted in at least one of the height direction Y and the depth direction Z with respect to the center line CL5.

As the modification A2, the front top portion 111*a* of the front narrowing portion 111 may not be disposed on the center line CL5 of the heat resistance element 71. For example, the front top portion 111*a* is only required to be arranged in the width direction X with a part of the heat resistance element 71 and is only required to face a part of the heat resistance element 71. The front top portion 111*a* is only required to be arranged in the width direction X with a part of the membrane portion 62 and is only required to face a part of the membrane portion 62. The front top portion 111*a* is only required to be arranged in the width direction X with a part of the flow sensor 22 and is only required to face a part of the flow sensor 22.

As the modification A3, the narrowing portions such as the front narrowing portion 111 and the back narrowing portion 112 may be provided on the measurement ceiling surface 102 and the measurement floor surface 101 in the measurement flow path 32. For example, in the measurement flow path 32, the narrowing portion is only required to be provided on at least one of the measurement floor surface 101, the measurement ceiling surface 102, the front measurement wall surface 103, and the back measurement wall surface 104.

As the modification A4, a physical quantity sensor that detects a physical quantity different from the flow rate of the intake air may be provided in the measurement flow path. Examples of the physical quantity sensor provided in the measurement flow path include a detection unit that detects temperature, a detection unit that detects humidity, a detection unit that detects pressure, and the like, in addition to the flow sensors 22 and 202. These detection units may be mounted on the sensors SA50 and 220 as a detection unit, or may be provided separately from the sensors SA50 and 220.

As the modification A5, the air flow meters 20 and 200 may not include the passage flow paths 31 and 211. That is, the bypass flow paths 30 and 210 may not be branched. For example, the measurement entrances 35 and 215 of the measurement flow paths 32 and 212 are provided on the outer surface of the housings 21 and 201. In this configuration, all the air flowing into the housings 21 and 201 from the measurement entrances 35 and 215 flows out from the measurement exits 36 and 216.

As the modification A6, the measurement flow path 32 may not be provided with the narrowing portion such as the front narrowing portion 111 or the back narrowing portion 112. In this case, since the shape of the measurement flow path 32 is simplified, the shape and size of the measurement flow path 32 are less likely to vary among the plurality of air flow meters 20. That is, the shape and size of the measurement flow path 32 hardly vary among products. Therefore, the detection accuracy of the flow sensor 22 and the measurement accuracy of the air flow meter 20 are suppressed from varying for each product, and the detection accuracy and the measurement accuracy can be enhanced.

<Modification of Configuration Group B>

Figure 78:
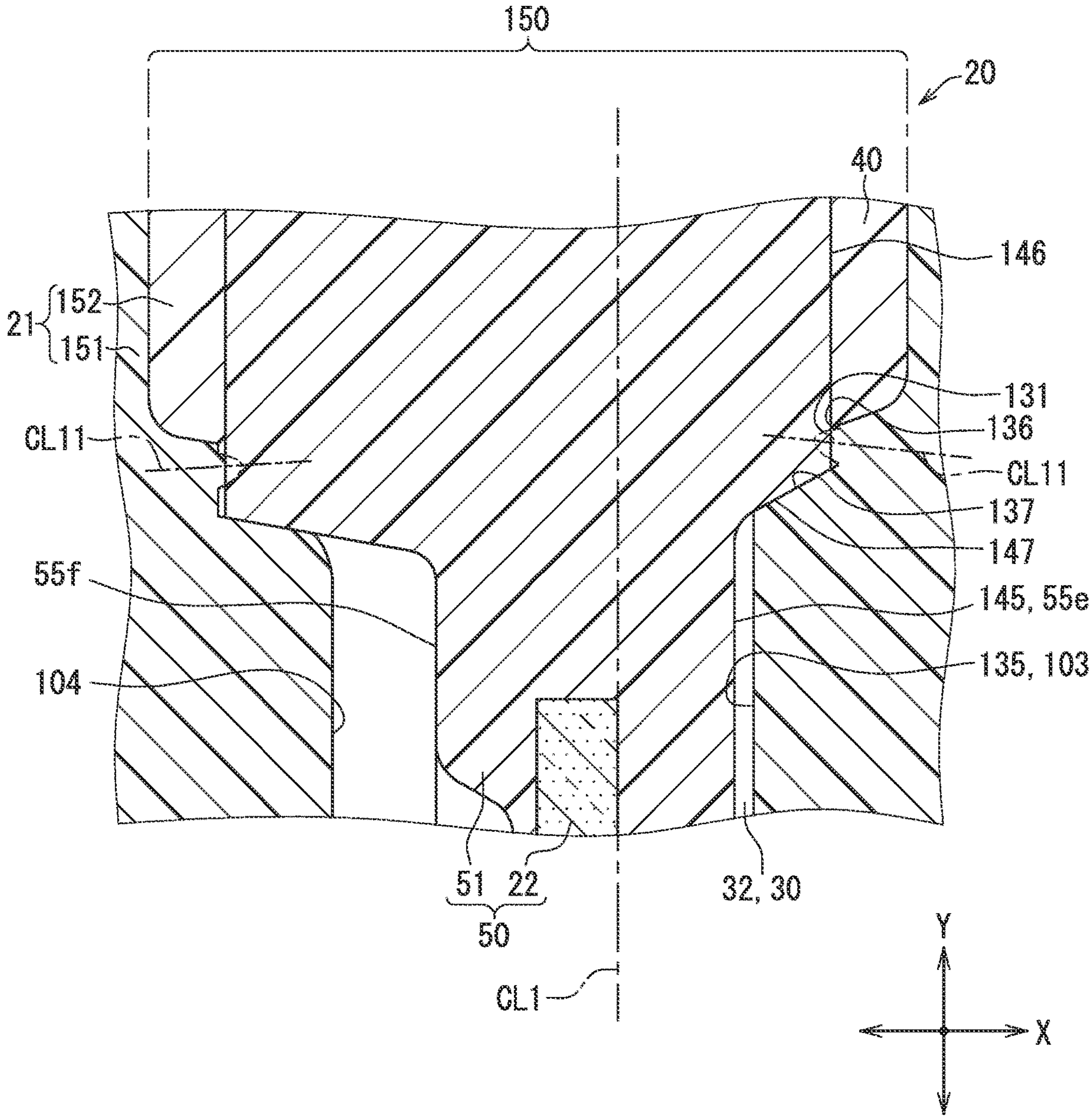
FIG. 78 is a longitudinal cross-sectional view around the housing partition portion of the air flow meter according to the first embodiment in the modification B1.

As the modification B1, the housing partition portion may be provided on the housing accommodation surface. For example, in the first embodiment, as shown in FIG. 78, the housing partition portion 131 is provided on the housing accommodation surface 136. In this configuration, the housing partition portion 131 extends toward the SA accommodation surface 146 of the sensor SA50. The center line CL11 of the housing partition portion 131 extends in a direction intersecting the height direction Y. The housing partition portion 131 does not extend in the directions X and Z orthogonal to the height direction Y, but obliquely extends from the housing accommodation surface 136 toward the housing base end side. Therefore, the center line CL11 of the housing partition portion 131 also obliquely intersects the housing accommodation surface 136 without being orthogonal thereto.

In the present modification, the housing partition portion 131 is provided on the housing accommodation surface 136. Therefore, by simply pushing the sensor SA50 toward the depth side of the SA accommodation region 150, it is possible to deform the tip end portion of the housing partition portion 131 to be scraped at the outside corner portion between the housing step surface 137 and the housing accommodation surface 136. As a result, the housing partition portion 131 easily comes into close contact with the housing accommodation surface 136. In FIG. 78, a portion of the housing partition portion 131 deformed so as to be scraped off by the sensor SA50 is indicated by a two-dot chain line.

Figure 79:
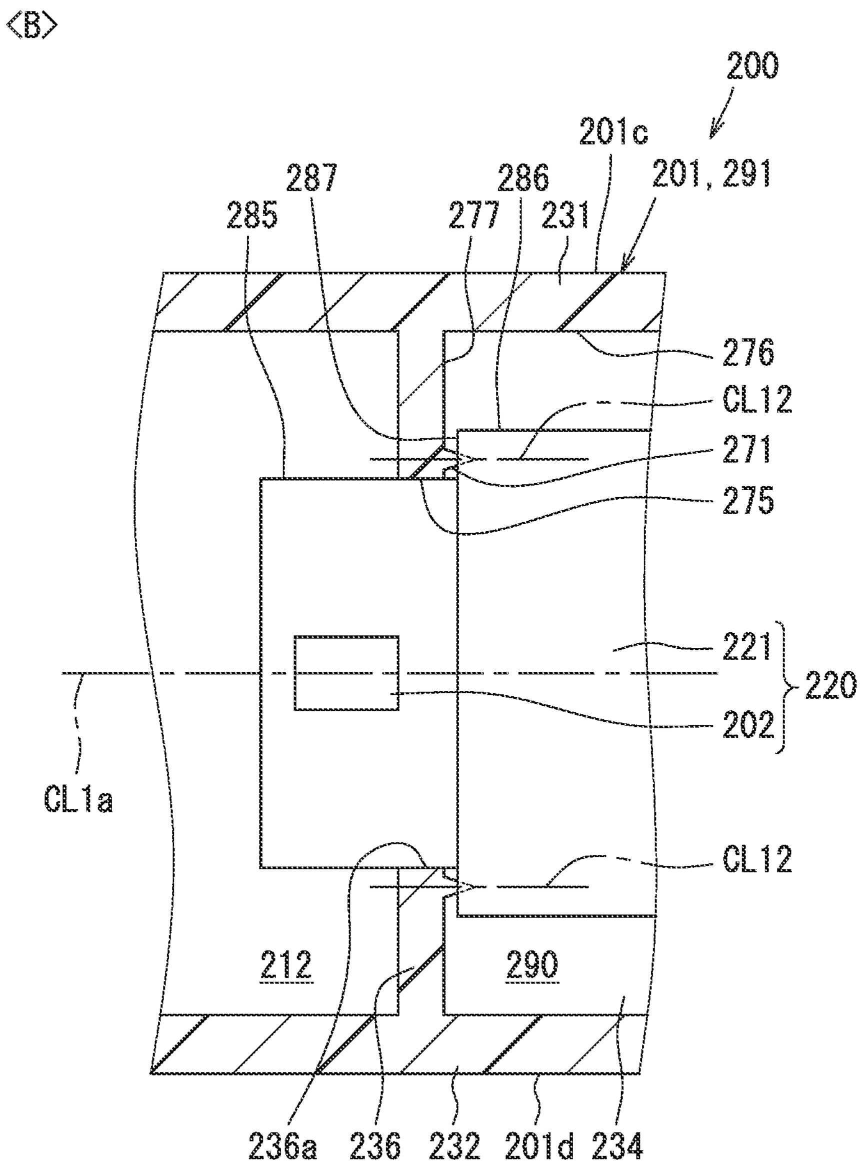
FIG. 79 is a cross-sectional view around the housing partition portion of the air flow meter according to the second embodiment in the modification B2.

As the modification B2, the housing partition portion may be provided on the housing step surface also in the second embodiment, similarly to the first embodiment. For example, as shown in FIG. 79, the housing partition portion 271 is provided on the housing step surface 277. In this configuration, the first intermediate hole 236*a* of the first intermediate wall portion 236 is formed not by the tip end portion of the housing partition portion 271 but by the tip end surface of the first intermediate wall portion 236. In FIG. 79, a portion of the housing partition portion 271 crushed by the sensor SA220 is indicated by a two-dot chain line.

Figure 80:
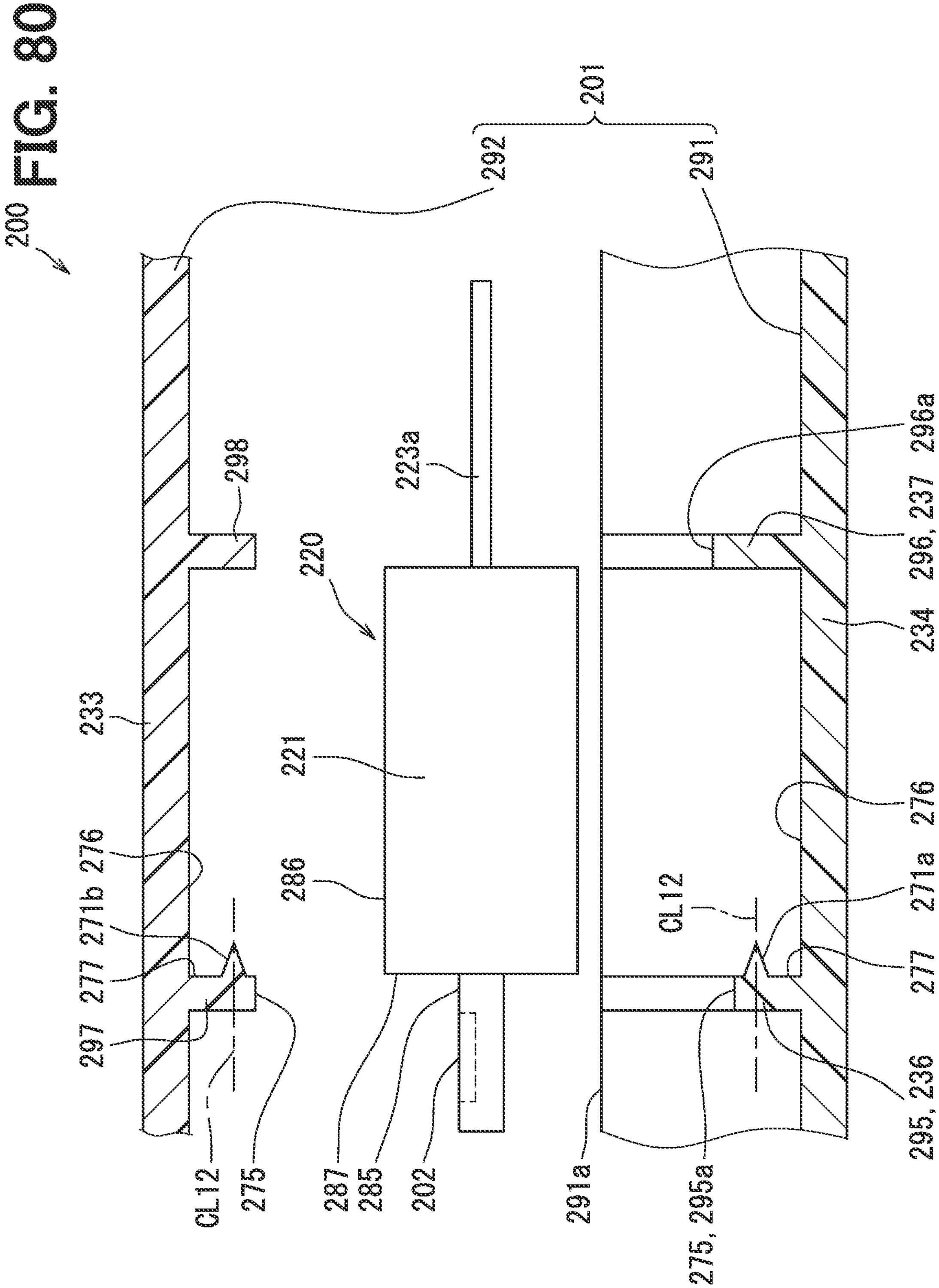
FIG. 80 is an exploded cross-sectional view of the base member, the cover member, and the sensor SA.

As shown in FIG. 80, in the base member 291, the base projection 271*a* is provided on the wall surface on the housing base end side relative to the first base projection portion 295. In the cover member 292, the cover projection 271*b* is provided on the surface on the housing base end side relative to the first cover projection portion 297.

As the modification B3, the housing partition portion may be provided on the housing flow path surface also in the first embodiment, similarly to the second embodiment. For example, the housing partition portion 131 is provided on the housing flow path surface 135.

Figure 81:
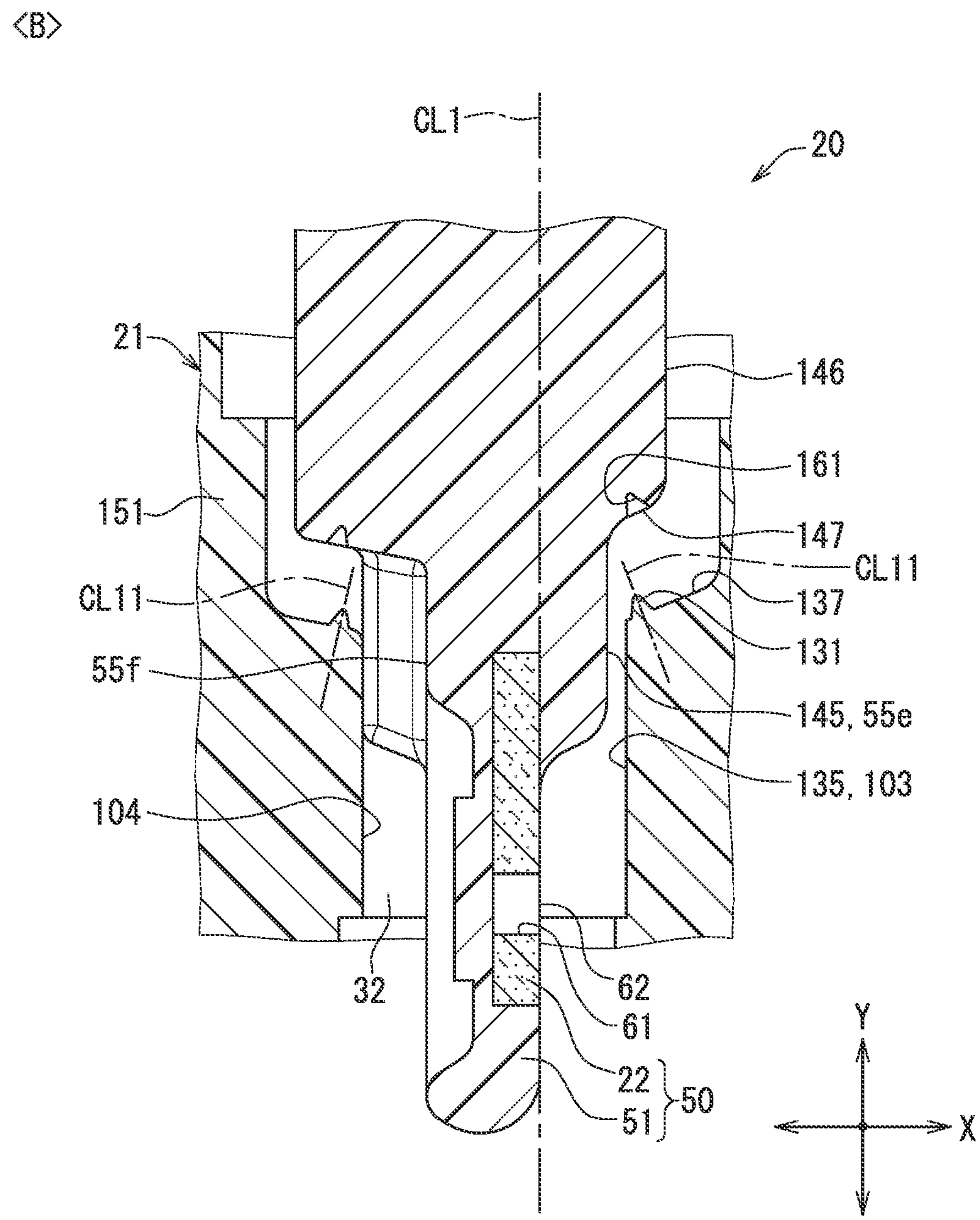
FIG. 81 is a longitudinal cross-sectional view around the housing partition portion of the air flow meter according to the first embodiment in the modification B4.

As the modification B4, a unit recess portion into which the housing partition portion enters may be provided in the detection unit. For example, as shown in FIG. 81, in the first embodiment, an SA recess portion 161 as a unit recess portion is provided on the SA step surface 147 of the sensor SA50. In this configuration, in a state where the sensor SA50 is attached to the first housing portion 151, the housing partition portion 131 enters the SA recess portion 161. The recess direction of the SA recess portion 161 from the SA step surface 147 is the same as the projection direction of the housing partition portion 131 from the housing step surface 137. That is, the center line of the SA recess portion 161 coincides with the center line CL11 of the housing partition portion 131.

In this configuration, the housing partition portion 131 and the inner surface of the SA recess portion 161 are easily in close contact with each other. Specifically, the depth dimension of the SA recess portion 161, which is the recess dimension from the SA step surface 147, is smaller than the projection dimension of the housing partition portion 131 from the housing step surface 137. In this case, the sensor SA50 is inserted from the housing opening portion 151*a* to cause the housing partition portion 131 to enter the inside of the SA recess portion 161, and then the sensor SA50 is further pushed, so that the housing partition portion 131 comes into contact with the inner surface of the SA recess portion 161 and is deformed to be crushed. As a result, the housing partition portion 131 easily comes into close contact with the inner surface of the SA recess portion 161.

Even if the housing partition portion 131 is not in contact with the inner surface of the SA recess portion 161, since the gap between the outer surface of the housing partition portion 131 and the inner surface of the SA recess portion 161 has a bent shape, the foreign matter or air hardly passes through the gap. Therefore, when the second housing portion 152 is manufactured, the housing partition portion 131 enters the SA recess portion 161, whereby it is possible to suppress the molten resin from entering the measurement flow path 32 through the gap between the first housing portion 151 and the sensor SA50.

Figure 82:
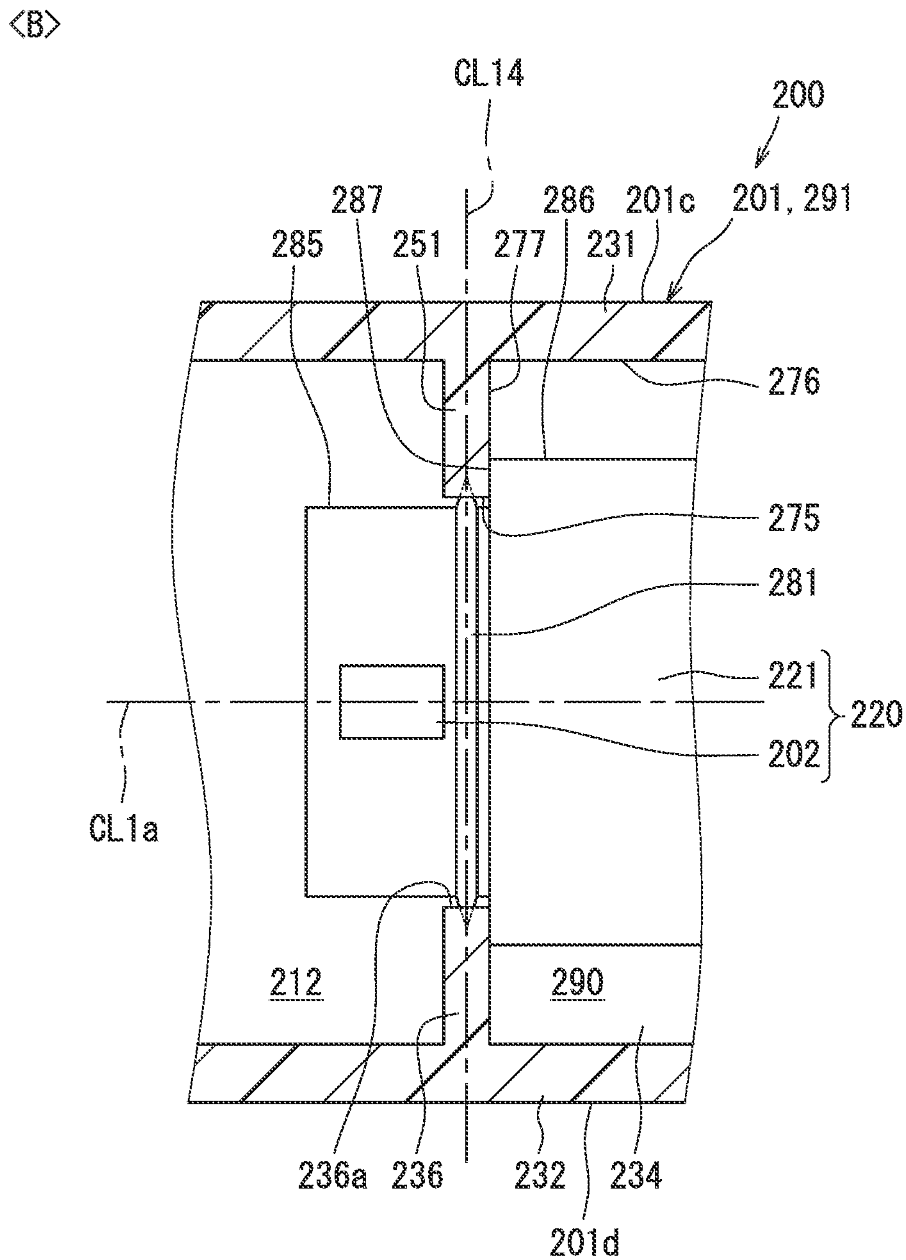
FIG. 82 is a cross-sectional view around the housing partition portion of the air flow meter according to the second embodiment in the modification B5.

As the modification B5, the gap between the housing and the detection unit may be partitioned by the unit partition portion included in the detection unit. For example, as shown in FIG. 82, in the second embodiment, the sensor SA220 as the detection unit has an SA partition portion 302 as a unit partition portion. The SA partition portion 302 is a projection portion provided on the outer surface of the sensor SA220, and projects from the sensor SA220 toward the housing 201. The tip end portion of the SA partition portion 302 is in contact with the inner surface of the housing 201. The SA partition portion 302 partitions the SA accommodation region 290 and the measurement flow path 212 between the outer surface of the sensor SA220 and the inner surface of the housing 201.

The SA partition portion 302 is provided on the SA flow path surface 285 of the sensor SA220. The SA partition portion 302 is provided in a portion of the SA flow path surface 285 facing the housing flow path surface 275 of the housing 201, and projects outward toward the housing flow path surface 275 in a direction intersecting the height direction Y. A center line CL14 of the SA partition portion 302 extends linearly in the directions X and Z orthogonal to the height direction Y. The SA partition portion 302 annularly surrounds the outer periphery of the sensor SA220 together with the SA flow path surface 285. In this case, the SA partition portion 302 has a portion extending in the width direction X and a portion extending in the depth direction Z, and has a substantially rectangular frame shape as a whole.

The SA partition portion 302 has a tapered shape similarly to the housing partition portion 131 of the first embodiment. In the housing 201, the tip end surface of the first intermediate wall portion 236 is a flat surface, and the tip end portion of the SA partition portion 302 is in contact with the flat surface.

Figure 83:
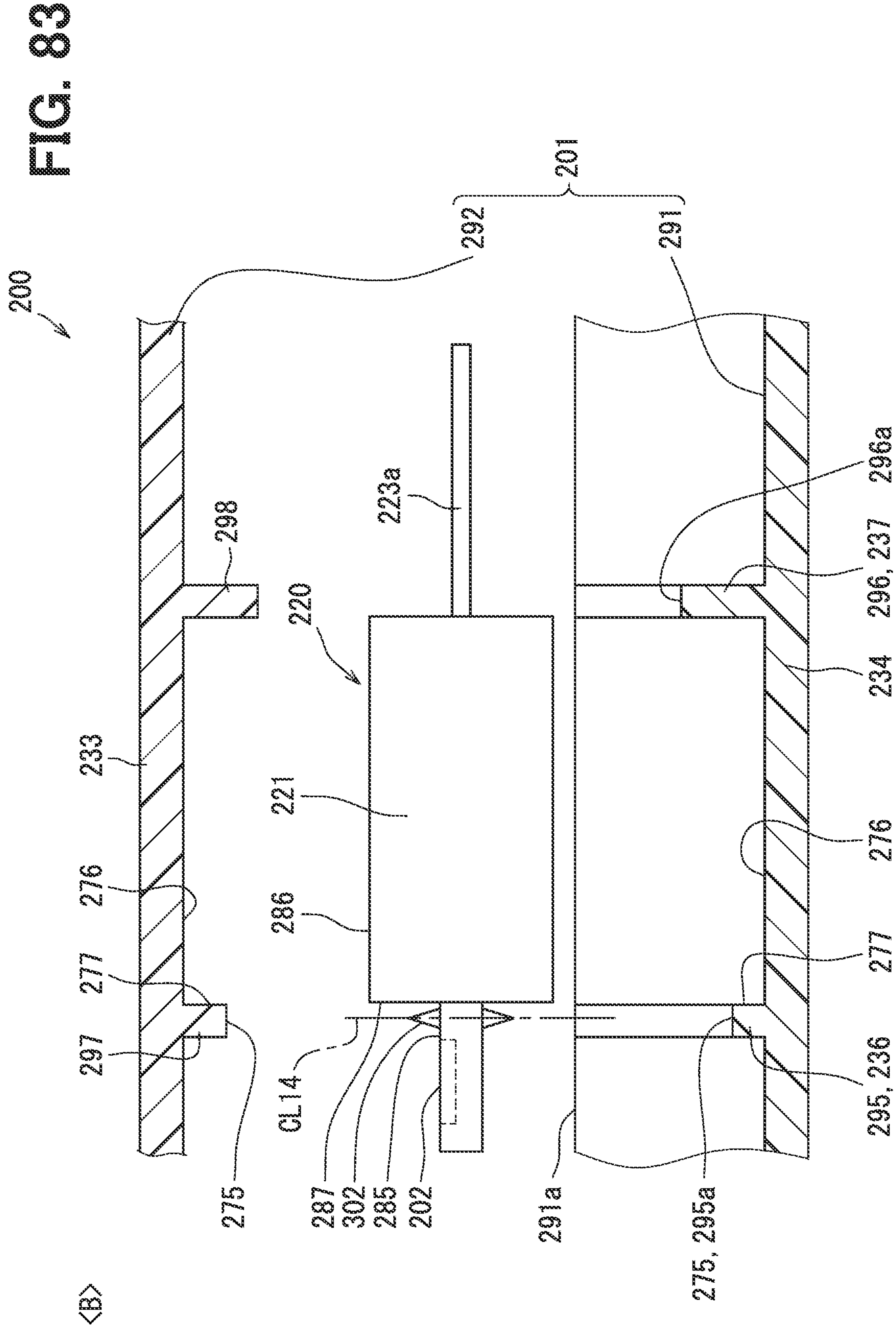
FIG. 83 is an exploded cross-sectional view of the base member, the cover member, and the sensor SA.

In the manufacturing process of the air flow meter 200, when the sensor SA220 is assembled to the base member 291 as shown in FIG. 83, the SA partition portion 302 is deformed in the same manner as the base projection 271*a* of the first embodiment is deformed. Specifically, by pushing the sensor SA220 into the base member 291 from the base opening portion 291*a*, the tip end portion of the SA partition portion 302 is deformed by being crushed or scraped by the first base projection portion 295 of the base member 291. When the cover member 292 is assembled to the base member 291, the SA partition portion 302 is deformed in the same manner as the cover projection 271*b* of the first embodiment is deformed. Specifically, by pressing the cover member 292 against the sensor SA220 and the base member 291, the tip end portion of the SA partition portion 302 is crushed and deformed by the first cover projection portion 297 of the cover member 292. In these cases, in the SA partition portion 302, the tip end portion is crushed or scraped so that the newly formed tip end surface easily comes into close contact with the housing flow path surface 275 of the housing 201, and the sealability between the SA partition portion 302 and the housing flow path surface 275 is improved.

Figure 84:
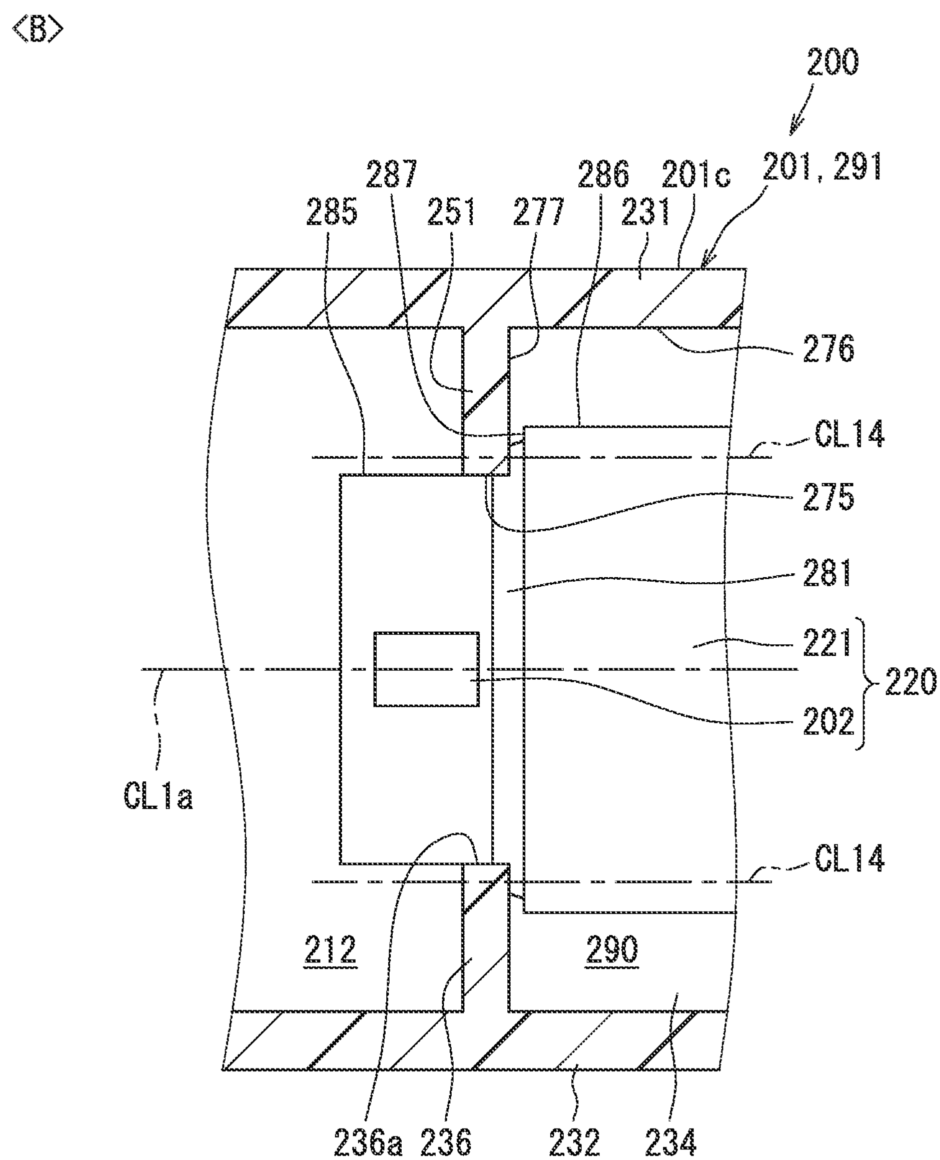
FIG. 84 is a cross-sectional view around the housing partition portion of the air flow meter according to the second embodiment in the modification B6.

As the modification B6, in the modification B5, as shown in FIG. 84, the SA partition portion 302 may be provided on the SA step surface 287 of the sensor SA220. The SA partition portion 302 extends in the height direction Y toward the housing step surface 277. The center line CL4 of the SA partition portion 302 extends in the height direction Y. The SA partition portion 302 annularly surrounds the outer periphery of the sensor SA220 together with the SA step surface 287.

Figure 85:
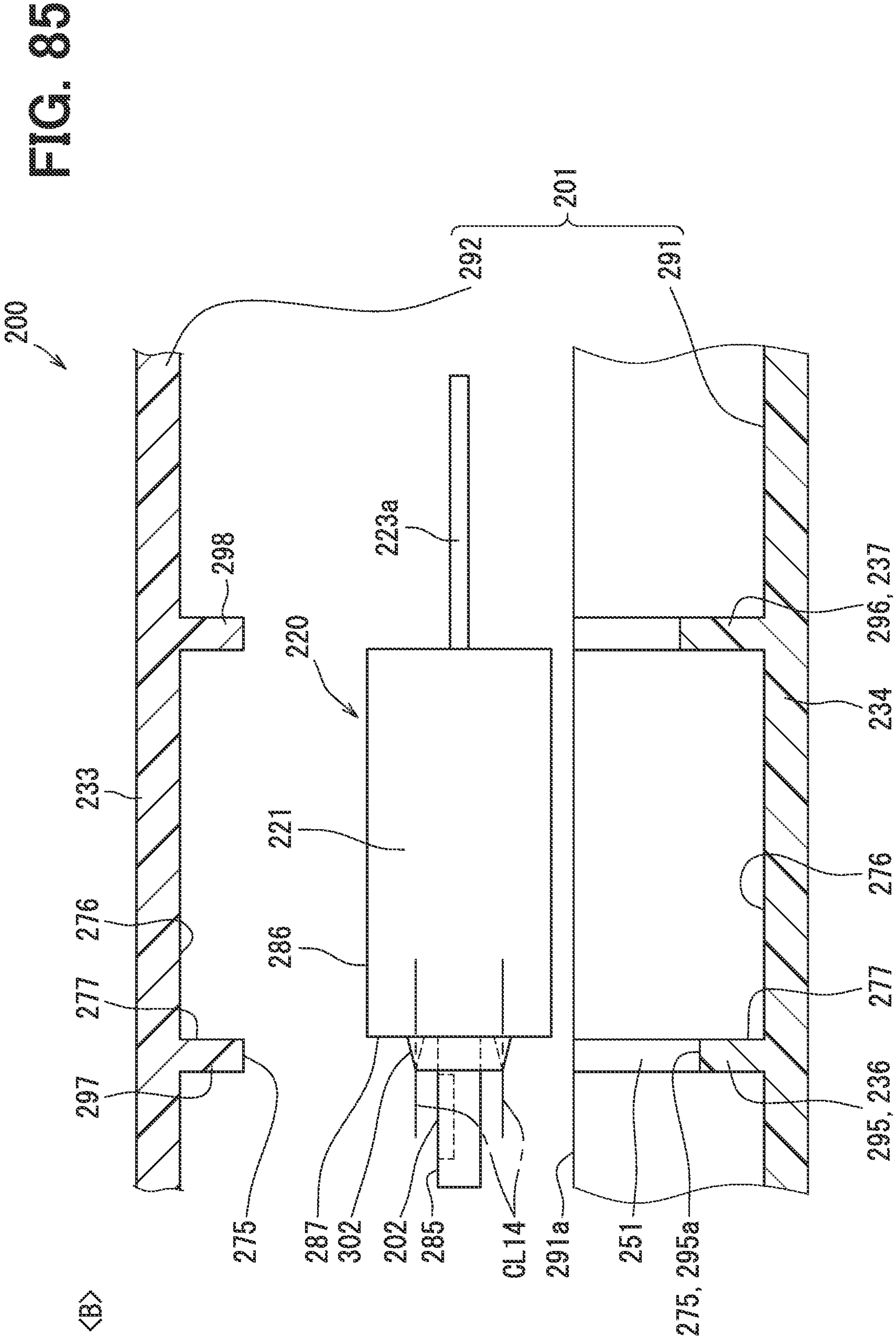
FIG. 85 is an exploded cross-sectional view of the base member, the cover member, and the sensor SA.

In the manufacturing process of the air flow meter 200, when the sensor SA220 is assembled to the base member 291 as shown in FIG. 85, the SA partition portion 302 is deformed by the projection portions 295 and 297 of the base member 291 or the cover member 292 as in the modification B5. As a result, the new tip end surface of the SA partition portion 302 easily comes into close contact with the housing flow path surface 275.

As shown in FIG. 85, the SA partition portion 302 is provided on the SA step surface 287 at a position closer to the SA flow path surface 285 than the SA accommodation surface 286. In this configuration, by partitioning the measurement flow path 212 and the SA accommodation region 290 by the SA partition portion 302 at a position as close as possible to the measurement flow path 212 side, it is possible to make it as small as possible a portion of the gap between the housing 201 and the sensor SA220, the portion included in the measurement flow path 212. Therefore, by providing the SA partition portion 302 at a position as close as possible to the SA flow path surface 285, it is possible to enhance the detection accuracy of the flow sensor 202.

As shown in FIGS. 84 and 85, in the configuration in which the SA partition portion 302 provided on the SA step surface 287 is in contact with the housing step surface 277, both the SA step surface 287 and the housing step surface 277 intersect in the height direction Y and face each other. Therefore, the SA partition portion 302 becomes hooked on the housing step surface 277 when the sensor SA220 is inserted into the first intermediate hole 236*a* of the first intermediate wall portion 236. Therefore, the SA partition portion 302 can be brought into close contact with the housing step surface 277 by performing work of simply pushing the sensor SA220 into the housing 201 toward the measurement flow path 212.

Figure 86:
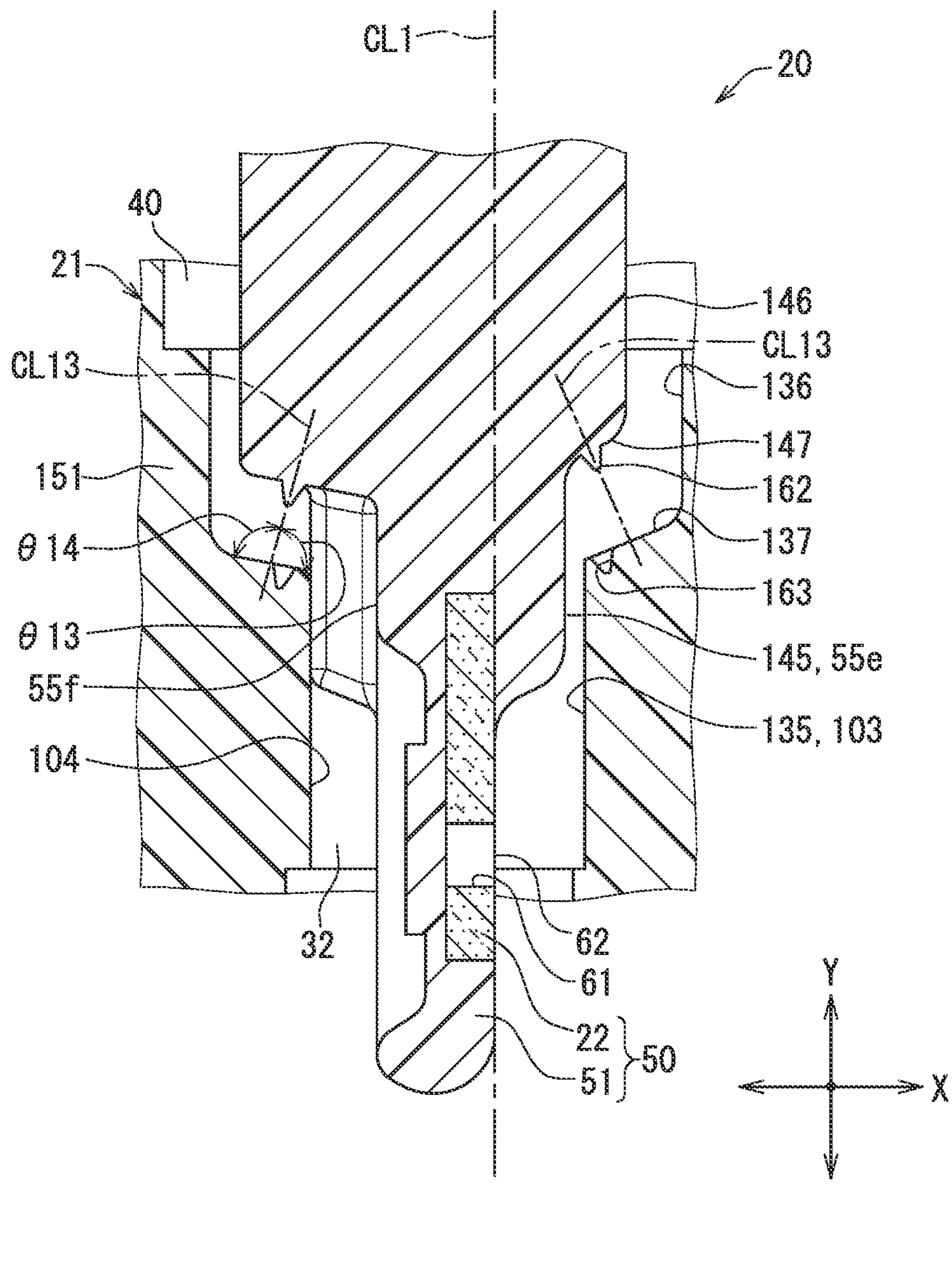
FIG. 86 is a longitudinal cross-sectional view around the housing partition portion of the air flow meter according to the first embodiment in the modification B7.

As the modification B7, by combining the above-described the modifications B4 and B5, a housing recess portion into which the unit partition portion enters may be provided in the housing. For example, as shown in FIG. 86, in the first embodiment, the sensor SA50 as the detection unit has an SA partition portion 162 as the unit partition portion, and the housing 21 has a housing recess portion 163. In this configuration, the SA partition portion 162 is a projection portion provided on the outer surface of the sensor SA50, and projects from the sensor SA50 toward the housing 21. The SA partition portion 162 enters the housing recess portion 163.

The SA partition portion 162 is provided on the SA step surface 147 of the sensor SA50. The SA partition portion 162 extends in the height direction Y, and a center line CL13 of the SA partition portion 162 extends linearly in a state of being inclined with respect to both the SA step surface 147 and the housing step surface 137. The SA partition portion 162 annularly surrounds the outer periphery of the sensor SA50 together with the SA step surface 147. In this case, the SA partition portion 162 has a portion extending in the width direction X and a portion extending in the depth direction Z, and has a substantially rectangular frame shape as a whole. The SA partition portion 162 has a tapered shape similarly to the housing partition portion 131 of the first embodiment.

The housing recess portion 163 is provided in the housing step surface 137. The recess direction of the housing recess portion 163 from the housing step surface 137 is the same as the projection direction of the SA partition portion 162 from the SA step surface 147. That is, the center line of the housing recess portion 163 coincides with the center line CL13 of the SA partition portion 162.

The SA partition portion 162 enters the housing recess portion 163. In this configuration, the SA partition portion 162 and the inner surface of the housing recess portion 163 are easily in close contact with each other. Specifically, the depth dimension of the housing recess portion 163 is smaller than the projection dimension of the SA partition portion 162. In this case, after the sensor SA50 is inserted from the housing opening portion 151*a* and the SA partition portion 162 is caused to enter the housing recess portion 163, the sensor SA50 is further pushed, so that the SA partition portion 162 comes into contact with the inner surface of the housing recess portion 163 and is deformed so as to be crushed. As a result, the SA partition portion 162 easily comes into close contact with the inner surface of the housing recess portion 163. Even if the SA partition portion 162 is not in contact with the inner surface of the housing recess portion 163, since the gap between the outer surface of the SA partition portion 162 and the housing recess portion 163 has a bent shape, the foreign matter or air is less likely to pass through the gap.

In FIG. 86, among angles between the center line CL13 of the SA partition portion 162 and the housing step surface 137, an accommodation side angle θ14 facing the SA accommodation region 150 is larger than a flow path side angle θ13 facing the measurement flow path 32. That is, the relationship of θ14>θ13 is established. In this configuration, when the tip end portion of the SA partition portion 162 comes into contact with the housing step surface 137, the tip end portion of the SA partition portion 162 easily falls or collapses toward the SA accommodation region 150 side rather than the measurement flow path 32 side. Therefore, even if the SA partition portion 162 is crushed by the housing step surface 137 to generate crushed residue such as fragments, the crushed residue is less likely to enter the measurement flow path 32.

As shown in FIG. 86, in the configuration in which the SA partition portion 162 provided on the SA step surface 147 is in contact with the housing step surface 137, both the SA step surface 147 and the housing step surface 137 intersect in the height direction Y and face each other. Therefore, the SA partition portion 162 becomes hooked on the housing step surface 137 when the sensor SA50 is inserted into the first housing portion 151. In this case, the SA partition portion 162 can be brought into close contact with the housing step surface 137 by performing work of simply pushing the sensor SA50 into the first housing portion 151 toward the measurement flow path 32.

As the modification B8, the installation position of the housing partition portion provided on the housing step surface may not be a position closer to the housing flow path surface than the housing accommodation surface. For example, in the second embodiment, on the housing step surface 277, the housing partition portion 271 is provided at a position closer to the housing accommodation surface 276 than the housing flow path surface 275. Further, in the housing step surface 137, the separation distance to the housing partition portion 131 may be the same between the housing flow path surface 135 and the housing accommodation surface 136.

As the modification B9, the installation position of the unit partition portion provided on the unit step surface may not be a position closer to the unit flow path surface than the unit accommodation surface. For example, in the modification B6 described above, on the SA step surface 287, the SA partition portion 302 is provided at a position closer to the SA accommodation surface 286 than the SA flow path surface 285. In the SA step surface 287, the separation distance to the SA partition portion 302 may be the same between the SA flow path surface 285 and the SA accommodation surface 286.

As the modification B10, the housing partition portion may be provided on a plurality of surfaces of the housing step surface, the housing flow path surface, and the housing accommodation surface. In this configuration, the housing partition portions provided on the plurality of surfaces may be connected to one another or may be independent from one another. For example, in the first embodiment, the housing partition portions 131 provided on the housing step surface 137 and the housing flow path surface 135 are arranged in the height direction Y independently of each other.

As the modification B11, the unit partition portion may be provided on a plurality of surfaces of the unit step surface, the unit flow path surface, and the unit accommodation surface. In this configuration, the unit partition portions provided on the plurality of surfaces may be connected to one another or independent of one another. For example, in the modification B7 described above, the SA partition portions 162 provided on the SA step surface 147 and the SA flow path surface 145 are arranged in the height direction Y in a state of being independent from each other.

As the modification B12, the housing partition portion and the unit partition portion may not annularly surround the detection unit. For example, in the housing step surface 137 of the first embodiment, a portion having a high height position in the height direction Y and a portion having a low height position in the height direction Y are arranged in the circumferential direction. In this configuration, the housing partition portion 131 is provided only in the low portion of the high portion and the low portion. In this case, since the high portion of the housing step surface 137 and the housing partition portion 131 are in contact with the SA step surface 147, no gap is generated between the inner surface of the first housing portion 151 and the sensor SA50. The housing partition portion 131 does not have an annular shape even if extending in the width direction X or the depth direction Z.

As the modification B13, the physical quantity measurement device may include both the housing partition portion and the unit partition portion. For example, the housing partition portion and the unit partition portion are arranged in the height direction Y. In this configuration, of the housing step surface, the housing flow path surface, and the housing accommodation surface, the unit partition portion may be provided on a surface not facing the surface provided with the housing partition portion, or the unit partition portion may be provided on a surface facing the surface provided with the housing partition portion. The housing partition portion and the unit partition portion may be in contact with each other. In this configuration, the housing partition portion and the unit partition portion are pressed against each other as the detection unit is inserted into the housing, so that at least one of the housing partition portion and the unit partition portion is easily deformed. In this case, since the housing partition portion and the unit partition portion are easily brought into close contact with each other, the sealability at the boundary portion between the measurement flow path and the accommodation region is enhanced by both the housing partition portion and the unit partition portion.

As the modification B14, as long as the housing partition portion is in contact with the outer surface of the detection unit, the shape may not change before and after the detection unit is mounted to the housing. Similarly, as long as the unit partition portion is in contact with the inner surface of the housing, the shape of the unit partition portion may not change before and after the detection unit is mounted to the housing.

As the modification B15, the orientation in which the housing partition portion extends from the inner surface of the housing is not limited to those in the above embodiments. For example, in the first embodiment, the accommodation side angle θ12 may not be larger than the flow path side angle θ11. Similarly, the orientation in which the unit partition extends from the outer surface of the detection unit is not limited to those the above embodiments. For example, in the modification B7 described above, the accommodation side angle θ14 may not be larger than the flow path side angle θ11.

As the modification B16, the housing partition portion and the unit partition portion may not have a tapered shape. For example, in the first embodiment, the housing partition portion 131 may have a rectangular shape in longitudinal section. In this case, in the directions X and Z orthogonal to the height direction Y, the width dimension of the housing partition portion 131 is the same between the base end portion and the tip end portion of the housing partition portion 131.

As the modification B17, the accommodation region may be a space in which gas such as air exists inside the housing. In this configuration, the sealability at the boundary portion between the accommodation region and the measurement flow path is enhanced by the housing partition portion or the unit partition portion, so that air is suppressed from coming and going between the accommodation region and the measurement flow path. Therefore, it is possible to suppress that the detection accuracy of the flow rate by the flow sensor in the measurement flow path decreases due to leakage of air from the measurement flow path to the accommodation region or entry of air from the accommodation region to the measurement flow path.

<Modification of Configuration Group C>

Figure 87:
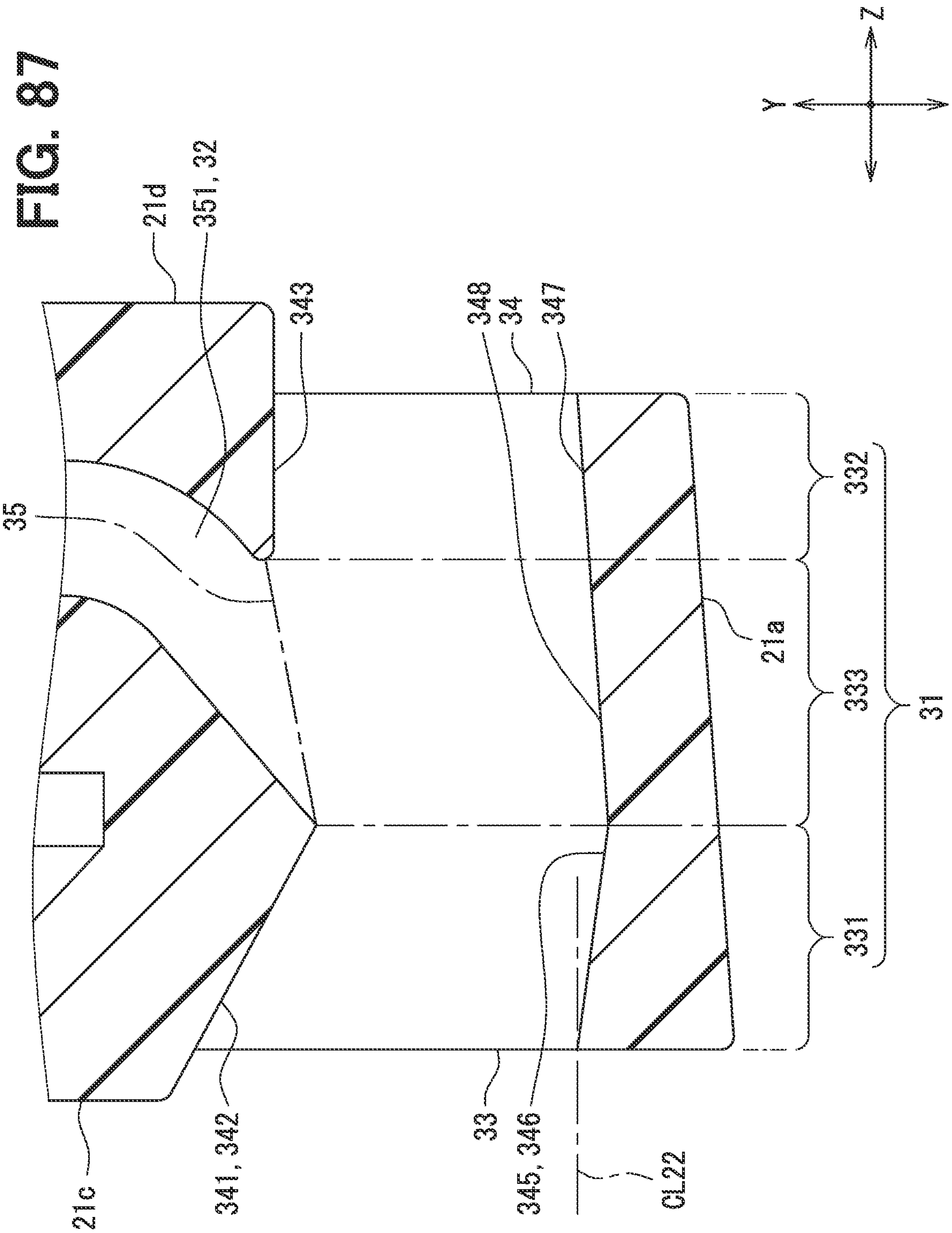
FIG. 87 is a longitudinal cross-sectional view of the air flow meter around the passage flow path according to the third embodiment in the modification C1.
Figure 88:
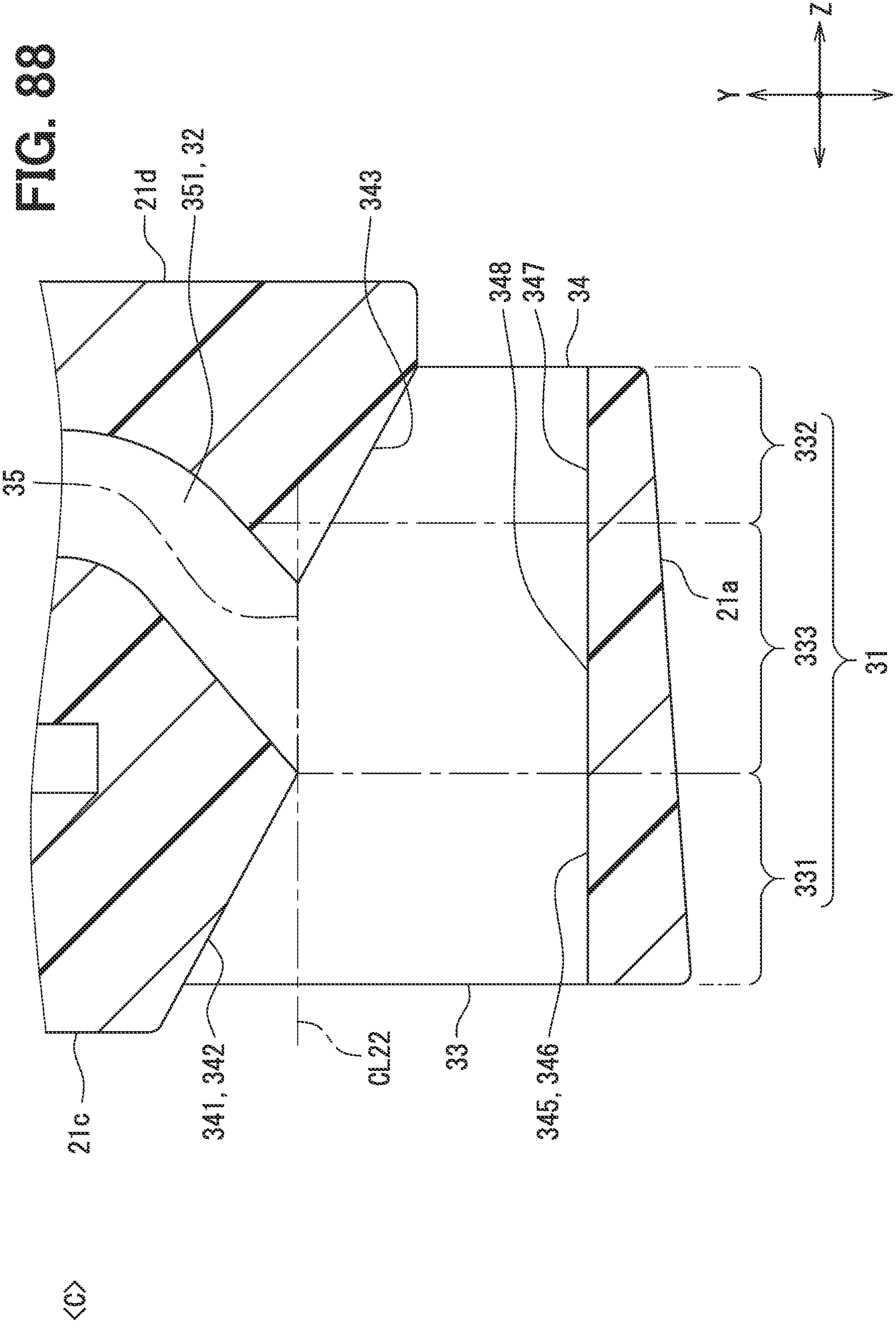
FIG. 88 is a longitudinal cross-sectional view of the air flow meter around the passage flow path according to the third embodiment in the modification C2.
Figure 89:
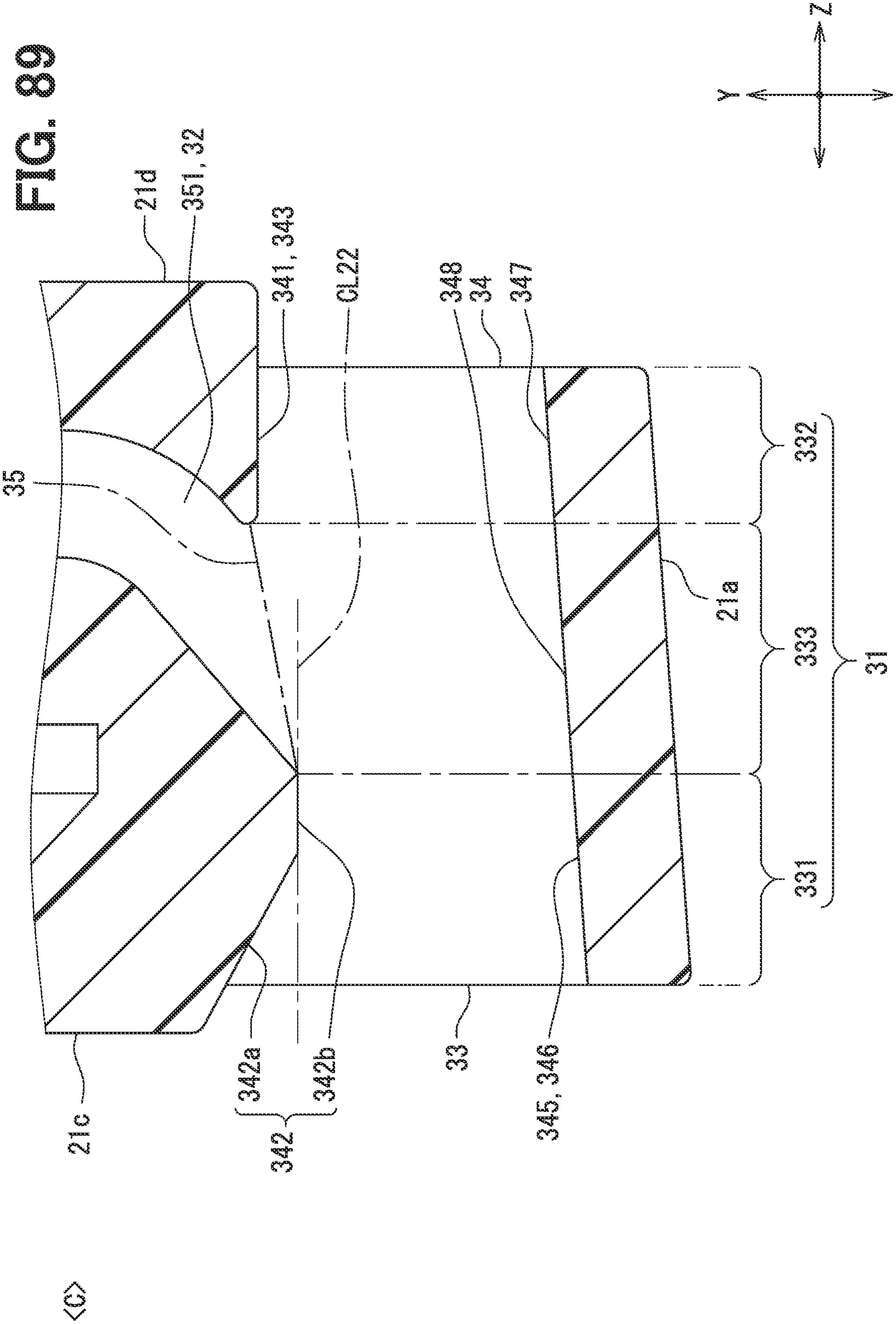
FIG. 89 is a longitudinal cross-sectional view of the air flow meter around the passage flow path according to the third embodiment in the modification C3.

As the modification C1, the entrance floor surface may not face the passage entrance side. For example, in the third embodiment, as shown in FIG. 87, the entrance floor surface 346 is configured to face the passage exit 34 side. In this configuration, the entrance floor surface 346 is inclined with respect to any of the main flow line CL22, the exit floor surface 347, and the branch floor surface 348 so as to face the side opposite from the passage entrance 33 in the depth direction Z. As shown in FIG. 88, the entrance floor surface 346 may extend in parallel with the main flow line CL22. The entire passage floor surface 345 may face the passage exit 34 side, and may extend in parallel with the main flow line CL22 as shown in FIG. 89. In any configuration, the entrance ceiling surface 342 is only required to be inclined with respect to the entrance floor surface 346.

As the modification C2, the measurement entrance may not face the passage exit side. For example, in the third embodiment, as shown in FIG. 88, the measurement entrance 35 does not face either the passage entrance 33 side or the passage exit 34 side. The measurement entrance 35 extends in parallel with the main flow line CL22 and faces the passage floor surface 345 side. In this configuration, the passage floor surface 345 extends parallel to the main flow line CL22, while the exit ceiling surface 343 is inclined with respect to the main flow line CL22. The exit ceiling surface 343 is inclined with respect to the exit floor surface 347 so as to face the passage exit 34 side.

As the modification C3, a part of the entrance ceiling surface may be a ceiling inclined surface. For example, in the third embodiment, as shown in FIG. 89, the entrance ceiling surface 342 has a ceiling inclined surface **342*a* and a ceiling connection surface 342*b*. In this configuration, the ceiling inclined surface 342*a* extends from the passage entrance 33 toward the passage exit 34 and is inclined with respect to the entrance floor surface 346. The ceiling inclined surface 342*a* faces the passage entrance 33 side and is inclined with respect to the main flow line CL22 in addition to the entrance floor surface 346. In the depth direction Z, the length dimension of the ceiling inclined surface 342*a* is smaller than the length dimension of the entrance floor surface 346. The ceiling connection surface 342*b* connects the downstream end portion of the ceiling inclined surface 342*a* and the upstream end portion of the measurement entrance 35 in the depth direction Z, and extends in parallel with the main flow line CL22 extending in the main flow direction. In the depth direction Z, for example, the length dimension of the ceiling inclined surface 342*a* is larger than the length dimension of the ceiling connection surface 342*b***.

In the present modification, the ceiling inclined surface 342*a* is a portion corresponding to the entrance ceiling surface 342 of the third embodiment. Therefore, the inclination angle of the ceiling inclined surface 342*a* with respect to the entrance floor surface 346 is the inclination angle θ21, and the inclination angle of the ceiling inclined surface 342*a* with respect to the main flow line CL22 is the inclination angle θ22. The separation distance between the ceiling inclined surface 342*a* and the entrance floor surface 346 in the height direction Y is the separation distance H21.

As the modification C4, in the third embodiment, the inclination angle θ21 of the entrance ceiling surface 342 with respect to the entrance floor surface 346 may be a value equal to or less than the inclination angle θ22 of the entrance ceiling surface 342 with respect to the main flow line CL22. For example, as in the modification C1 described above, the entrance floor surface 346 is inclined with respect to the main flow line CL22 so as to face the passage exit 34 side.

As the modification C5, in the third embodiment, if the inclination angle θ21 of the entrance ceiling surface 342 with respect to the entrance floor surface 346 is a value of 10 degrees or more, the inclination angle θ22 of the entrance ceiling surface 342 with respect to the main flow line CL22 may not be a value of 10 degrees or more. For example, the entrance ceiling surface 342 is configured to face the passage exit 34. In this configuration, the inclination angle θ22 of the entrance ceiling surface 342 with respect to the main flow line CL22 is a value smaller than 0 degrees, while the inclination angle θ21 of the entrance ceiling surface 342 with respect to the entrance floor surface 346 is 10 degrees or more. In this case, the entrance floor surface 346 is greatly inclined with respect to the main flow line CL22 so as to face the passage entrance 33 side.

As the modification C6, in the third embodiment, the inclination angle θ23 of the branch measurement line CL23 with respect to the entrance floor surface 346 may be a value equal to or larger than the inclination angle θ24 of the branch measurement line CL23 with respect to the main flow line CL22. For example, similarly to the modification C4, the entrance floor surface 346 is inclined with respect to the main flow line CL22 so as to face the passage exit 34 side.

As the modification C7, in the third embodiment, the inclination angle θ21 of the entrance ceiling surface 342 with respect to the entrance floor surface 346 may be a value in a range larger than 0 degrees and smaller than 10 degrees. The inclination angle θ22 of the entrance ceiling surface 342 with respect to the main flow line CL22 may be a value in a range larger than 0 degrees and smaller than 10 degrees.

As the modification C8, in the third embodiment, the inclination angle θ23 of the branch measurement line CL23 with respect to the entrance floor surface 346 may be a value in a range larger than 0 degrees and smaller than 90 degrees. The inclination angle θ24 of the branch measurement line CL23 with respect to the main flow line CL22 may be a value in a range larger than 0 degrees and smaller than 90 degrees.

As the modification C9, in the third embodiment, the entrance ceiling surface 342 and the entrance floor surface 346 may be bent so as to bulge or be bent toward the housing tip end side. In this configuration, for example, a linear imaginary line passing through the upstream end portion and the downstream end portion of the entrance ceiling surface 342 is assumed, and the inclination mode of the imaginary line with respect to the entrance floor surface 346 and the main flow line CL22 is set as the inclination mode of the entrance ceiling surface 342. A linear imaginary line passing through the upstream end portion and the downstream end portion of the entrance floor surface 346 is assumed, and an inclination mode of the imaginary line with respect to the entrance ceiling surface 342 and the branch measurement line CL23 is set as an inclination mode of the entrance floor surface 346.

As the modification C10, in the third embodiment, the passage flow path 31 may not include the exit passage path 332 as long as the passage flow path 31 includes the entrance passage path 331 and the branch passage path 333. In this configuration, the downstream end portion of the branch passage path 333 is the passage exit 34. In this configuration, the passage ceiling surface 341 has the entrance ceiling surface 342 but does not have the exit ceiling surface 343. In this configuration, the passage floor surface 345 has the entrance floor surface 346 and the branch floor surface 348, but does not have the exit floor surface 347.

As the modification C11, in the third embodiment, the decrease rate of the cross-sectional area S21 of the entrance passage path 331 may not be a constant value between the upstream end portion and the downstream end portion of the entrance passage path 331. For example, it is assumed that the decrease rate of the cross-sectional area S21 gradually decreases from the passage entrance 33 toward the passage exit 34. In this configuration, the graph indicating the value of the cross-sectional area S21 in the entrance passage path 331 has a shape bulging downward unlike FIG. 67. The decrease rate of the cross-sectional area S21 is configured to gradually increase from the passage entrance 33 toward the passage exit 34. In this configuration, the graph indicating the value of the cross-sectional area S21 in the entrance passage path 331 has a shape bulging upward unlike FIG. 67.

As the modification C12, in the third embodiment, the cross-sectional area S21 of the entrance passage path 331 may be a cross-sectional area in a direction orthogonal to the entrance passage line CL24 instead of a cross-sectional area in a direction orthogonal to the main flow line CL22.

As the modification C13, in the third embodiment, the branch measurement path 351 may be bent without extending straight from the measurement entrance 35. That is, the center line of the branch measurement path 351 may be bent without extending straight. For the configuration in which the center line of the branch measurement path 351 is bent, a tangential line at the measurement entrance 35 is assumed for the center line of the branch measurement path 351, and this tangential line is defined as the branch measurement line CL23.

As the modification C14, in the third embodiment, the inclination angle θ26 of the branch measurement line CL23 with respect to the exit passage line CL25 may be a value in a range larger than 0 degrees and smaller than 60 degrees.

As the modification C15, in the measurement flow path 32, the flow sensor 22 may be provided in the branch measurement path 351, the guide measurement path 352, and the discharge measurement path 354.

As the modification C16, in the air flow meter 20, the portion having the angle setting surface 27*a* for setting the installation angle of the housing 21 with respect to the intake passage 12 may not be the flange portion 27. For example, the housing 21 is fixed to the pipe flange 14*c* with a bolt or the like in a state where a part of the housing 21 is caught on the tip end surface of the pipe flange 14*c* of the piping unit 14. In this configuration, a surface of the housing 21 overlapping the tip end surface of the pipe flange 14*c* is an angle setting surface, and the angle setting surface overlaps the tip end surface of the pipe flange 14*c*, so that the installation angle of the housing 21 with respect to the intake passage 12 is set.

<Modification of Configuration Group D>

Figure 90:
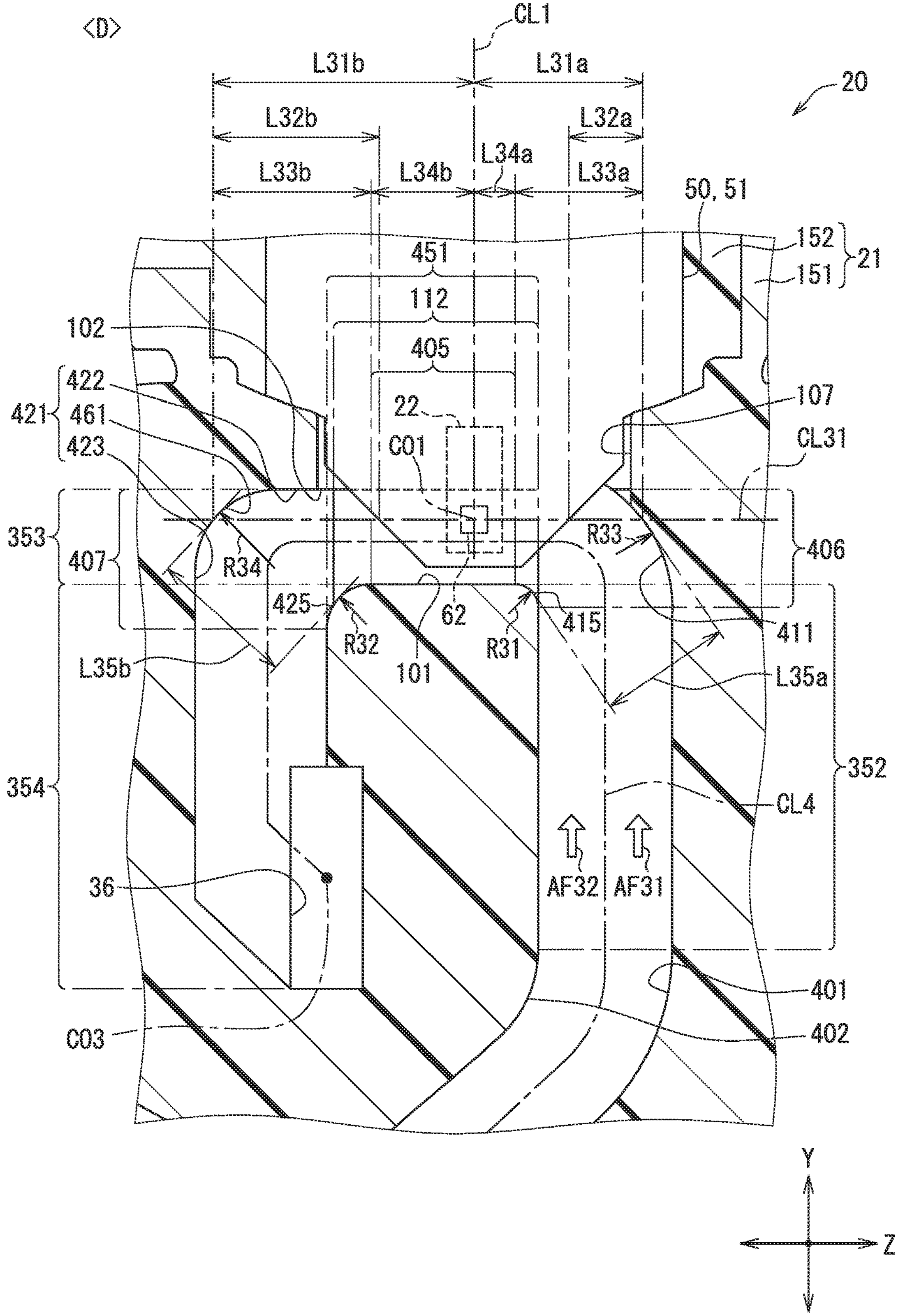
FIG. 90 is a longitudinal cross-sectional view of the air flow meter according to the first embodiment in the modification D1.

As the modification D1, the downstream outer bent surface 421 may have a curved portion. For example, as shown in FIG. 90, the downstream outer bent surface 421 has a downstream outer curved surface 461 in addition to the downstream outer lateral surface 422 and the downstream outer longitudinal surface 423. The downstream outer curved surface 461 extends so as to expand along the center line CL4 of the measurement flow path 32, and is curved so as to continuously bend along the center line CL4. The downstream outer curved surface 461 is provided between the downstream outer lateral surface 422 and the downstream outer longitudinal surface 423 in the direction where the center line CL4 extends, and connects the downstream outer lateral surface 422 and the downstream outer longitudinal surface 423.

A curvature radius R34 of the downstream outer curved surface 461 is smaller than the curvature radius R33 of the upstream outer bent surface 411. Therefore, similarly to the first embodiment, the bend of the downstream outer bent surface 421 is sharper than the bend of the upstream outer bent surface 411. On the other hand, the curvature radius R34 of the downstream outer curved surface 461 is larger than the curvature radius R32 of the downstream inner bent surface 425. Therefore, the bend of the downstream outer bent surface 421 is looser than the bend of the downstream inner bent surface 425.

The arrangement line CL31 passes through not the downstream outer longitudinal surface 423 but the downstream outer curved surface 461 in the downstream outer bent surface 421. In this configuration, the air having passed through the flow sensor 22 and proceeded along the arrangement line CL31 changes its orientation by hitting the downstream outer curved surface 461, and easily proceeds toward the downstream side of the downstream bent path 407.

According to the present modification, since the downstream outer bent surface 421 has the downstream outer curved surface 461, the air blown out toward the downstream bent path 407 from between the sensor support portion 51 and the narrowing portions 111 and 112 easily flows along the downstream outer curved surface 461. In this case, since the air having passed through the flow sensor 22 is less likely to stay in the downstream bent path 407, it is possible to suppress a decrease in the flow rate and the flow velocity of the air having passed through the flow sensor 22.

Preferably, by the curvature radius R34 of the downstream outer curved surface 461 being smaller than the curvature radius R33 of the upstream outer bent surface 411, the recess degree of the downstream outer bent surface 421 is larger than the recess degree of the upstream outer bent surface 411. In this configuration, the air reaching the downstream bent path 407 from the flow sensor 22 side easily flows toward the measurement exit 36 along the downstream outer curved surface 461 while increasing the recess degree of the downstream outer bent surface 421 as much as possible. Therefore, due to the shape of the downstream outer bent surface 421, it is possible to suppress that the air stays in the downstream bent path 407 and the pressure loss in the downstream bent path 407 increases.

As the modification D2, in the modification D1 described above, the downstream outer bent surface 421 may have the downstream outer curved surface 461 but may not have at least one of the downstream outer lateral surface 422 and the downstream outer longitudinal surface 423. For example, the downstream outer bent surface 421 does not include both the downstream outer lateral surface 422 and the downstream outer longitudinal surface 423. In this configuration, the downstream outer curved surface 461 is stretched between the upstream end portion and the downstream end portion of the downstream bent path 407. In this case, the entire downstream outer bent surface 421 is the downstream outer curved surface 461, and the downstream outer bent surface 421 corresponds to the downstream outer curved surface.

As the modification D3, the upstream outer bent surface 411 may have at least one of an upstream outer longitudinal surface extending straight from the upstream end portion of the upstream bent path 406 and an upstream outer lateral surface extending straight from the downstream end portion of the upstream bent path 406. In this configuration, the entire upstream outer bent surface 411 is not the upstream outer curved surface, but the upstream outer bent surface 411 has the upstream outer curved surface in addition to at least one of the upstream outer longitudinal surface and the upstream outer lateral surface. For example, in a configuration in which the upstream outer bent surface 411 has an upstream outer longitudinal surface and an upstream outer curved surface, the arrangement line CL31 may pass through the upstream outer longitudinal surface. In the upstream outer bent surface 411, an upstream outer inside corner portion may be formed as an inside corner portion in which the upstream outer longitudinal surface and the upstream outer lateral surface enter each other inward.

As the modification D4, the upstream inner bent surface 415 may have at least one of an upstream inner longitudinal surface extending straight from the upstream end portion of the upstream bent path 406 and an upstream inner lateral surface extending straight from the downstream end portion of the upstream bent path 406. In this configuration, the entire upstream inner bent surface 415 is not the upstream inner curved surface, but the upstream inner bent surface 415 has the upstream inner curved surface in addition to at least one of the upstream inner longitudinal surface and the upstream inner lateral surface. In the upstream inner bent surface 415, an upstream inner outside corner portion may be formed as an outside corner portion where the upstream inner longitudinal surface and the upstream inner lateral surface meet outward.

As the modification D5, the downstream inner bent surface 425 may have at least one of a downstream inner longitudinal surface extending straight from the upstream end portion of the downstream bent path 407 and a downstream inner lateral surface extending straight from the downstream end portion of the downstream bent path 407. In this configuration, the entire downstream inner bent surface 425 is not the downstream inner curved surface, but the downstream inner bent surface 425 has the downstream inner curved surface in addition to at least one of the downstream inner longitudinal surface and the downstream inner lateral surface. In the downstream inner bent surface 425, a downstream inner outside corner portion may be formed as an outside corner portion where the downstream inner longitudinal surface and the downstream inner lateral surface meet outward.

As the modification D6, the outer bent surfaces 411 and 421 and the inner bent surfaces 415 and 425 may be bent not continuous but stepwise by having at least one inclined surface inclined with respect to the arrangement line CL31. For example, the downstream outer bent surface 421 has a downstream outer inclined surface as an inclined surface extending straight in a direction inclined with respect to the arrangement line CL31. In this configuration, the connection portion between the downstream outer lateral surface 422 and the downstream outer longitudinal surface 423 is chamfered by the downstream outer inclined surface, and the downstream outer bent surface 421 does not have the downstream outer inside corner portion 424. A plurality of downstream outer inclined surfaces may be arranged along the center line CL4 of the measurement flow path 32, and in this configuration, the downstream outer bent surface 421 has a shape bent stepwise by the plurality of downstream outer inclined surfaces.

As the modification D7, a configuration in which the recess degree of the downstream outer bent surface 421 is larger than the recess degree of the upstream outer bent surface 411 may be implemented regardless of the curvature radius. For example, it is assumed that the entire downstream outer bent surface 421 is a downstream outer curved surface, the entire upstream outer bent surface 411 is an upstream outer curved surface, and the curvature radius R34 of the downstream outer bent surface 421 is larger than the curvature radius R33 of the upstream outer bent surface 411. Also in this configuration, if the length dimension of the downstream outer bent surface 421 is smaller than the length dimension of the upstream outer bent surface 411 in the direction where the center line CL4 of the measurement flow path 32 extends, the recess degree of the downstream outer bent surface 421 is larger than the recess degree of the upstream outer bent surface 411.

As the modification D8, in the sensor path 405, at least the measurement floor surface 101 may extend straight along the arrangement line CL31. The upstream end portion of the flow sensor 22 may be provided at the upstream end portion of the sensor path 405, and the downstream end portion of the flow sensor 22 may be provided at the downstream end portion of the sensor path 405. For example, the length dimension of the sensor path 405 and the length dimension of the flow sensor 22 may be the same in the depth direction Z.

As the modification D9, the downstream end portion of the upstream outer bent surface 411 may be provided at a position closer to the flow sensor 22 than the downstream end portion of the upstream inner bent surface 415 in the depth direction Z. In this case, the upstream end portion of the sensor path 405 is defined not by the downstream end portion of the upstream inner bent surface 415 but by the downstream end portion of the upstream outer bent surface 411. Further, in the depth direction Z, the upstream end portion of the downstream outer bent surface 421 may be provided at a position closer to the flow sensor 22 than the upstream end portion of the downstream inner bent surface 425. In this case, the downstream end portion of the sensor path 405 is defined not by the upstream end portion of the downstream inner bent surface 425 but by the upstream end portion of the downstream outer bent surface 421.

As the modification D10, the arrangement line CL31 is only required to pass through the flow sensor 22. For example, the arrangement line CL31 is only required to pass through a part of the heat resistance element 71 even if it is not the center CO1 of the heat resistance element 71. The arrangement line CL31 may pass through the center or a part of the membrane portion 62, or may pass through the center or a part of the flow sensor 22. As long as the arrangement line CL31 extends in the arrangement direction of the upstream bent path 406 and the downstream bent path 407, the arrangement line CL31 may be inclined with respect to the angle setting surface 27*a* of the housing 21, the depth direction Z, and the main flow direction.

As the modification D11, on the arrangement line CL31, if the flow sensor 22 is arranged at a position closer to the upstream outer bent surface 411 than the downstream outer bent surface 421, the sensor support portion 51 may not be arranged at a position closer to the upstream outer bent surface 411 than the downstream outer bent surface 421. In this case, in the sensor support portion 51, the flow sensor 22 is arranged at a position closer to the mold upstream surface 55*c* than the mold downstream surface 55*d* on the arrangement line CL31.

As the modification D12, on the arrangement line CL31, as long as the flow sensor 22 is disposed at a position closer to the upstream outer bent surface 411 than the downstream outer bent surface 421, the flow sensor 22 may not be disposed at a position closer to the upstream end portion than the downstream end portion of the sensor path 405. In this case, on the arrangement line CL31, the separation distance between the upstream end portion of the downstream bent path 407 and the downstream outer bent surface 421 is larger than the separation distance between the downstream end portion of the upstream bent path 406 and the upstream outer bent surface 411.

As the modification D13, in the measurement flow path 32, the upstream bent path 406 and the downstream bent path 407 may be bent in opposite directions with respect to the sensor path 405. For example, both the upstream bent path 406 and the downstream bent path 407 do not extend from the sensor path 405 toward the housing tip end side, but one extends toward the housing tip end side and the other extends toward the housing base end side. If the upstream bent path 406 extends from the sensor path 405 toward the housing tip end side and the downstream bent path 407 extends from the sensor path 405 toward the housing base end side, the downstream outer bent surface 421 extends not from the measurement floor surface 101 but from the measurement ceiling surface 102. The downstream inner bent surface 425 extends not from the measurement ceiling surface 102 but from the measurement floor surface 101.

Figure 91:
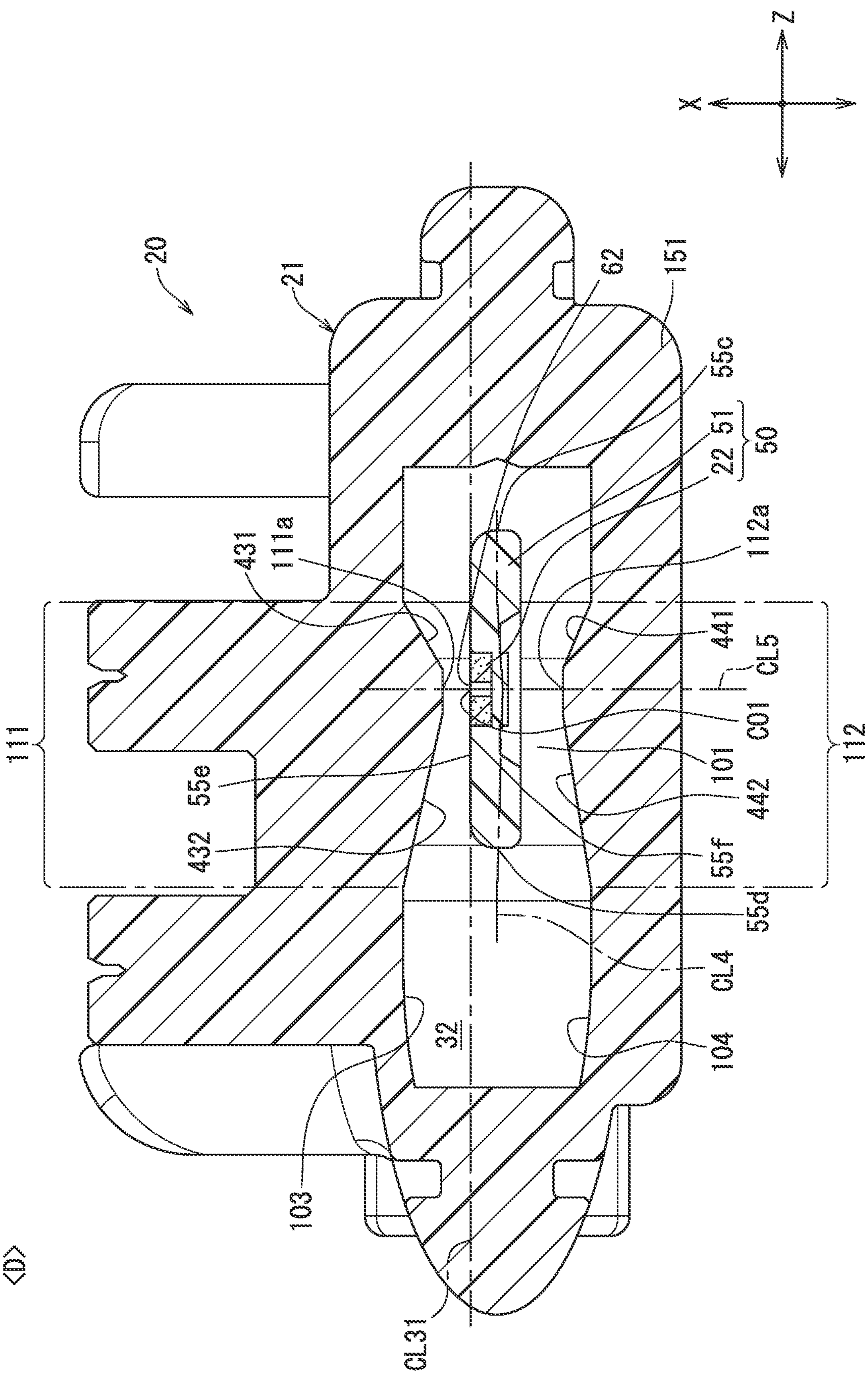
FIG. 91 is a transverse cross-sectional view of the air flow meter according to the first embodiment in the modification D14.

As the modification D14, the measurement narrowing surface of the measurement narrowing portion and the measurement expansion surface may be curved so as to be recessed, or may extend straight without being curved. For example, as shown in FIG. 91, in the narrowing portions 111 and 112, the narrowing surfaces 431 and 441 extend straight from the top portions 111*a* and 112*a* toward the upstream side, and the expansion surfaces 432 and 442 extend straight from the top portions 111*a* and 112*a* toward the downstream side. The narrowing surfaces 431 and 441 are inclined with respect to the arrangement line CL31 so as to face the upstream side of the measurement flow path 32, and the expansion surfaces 432 and 442 are inclined with respect to the arrangement line CL31 so as to face the downstream side of the measurement flow path 32. The increase rate of the projection dimension of the narrowing surfaces 431 and 441 is uniform from the narrowing upstream surfaces 433 and 443 toward the top portions 111*a* and 112*a*. The decrease rate of the projection dimension of the expansion surfaces 432 and 442 is uniform from the top portions 111*a* and 112*a* toward the expansion downstream surfaces 434 and 444.

The narrowing portions 111 and 112 have tip end surfaces extending along the arrangement line CL1, and these tip end surfaces are the top portions 111*a* and 112*a*. The centers of the top portions 111*a* and 112*a* in the depth direction Z are disposed at positions closer to the downstream bent path 407 than the center line CL5 of the heat resistance element 71.

According to the present modification, since the front narrowing surface 431 and the back narrowing surface 441 extend straight, the straightening effect of the airflow by these narrowing surfaces 431 and 441 can be enhanced. Since the front expansion surface 432 and the back expansion surface 442 extend straight, the airflow is likely to be disturbed due to separation of the airflow from these expansion surfaces 432 and 442 to the extent that the detection accuracy of the flow sensor 22 is not reduced. In this case, it is possible to weaken the momentum of the air blown out as the jet from between the sensor support portion 51 and the expansion surfaces 432 and 442 toward the downstream bent path 407. Therefore, it is possible to suppress the jet from bouncing back on the downstream outer bent surface 421 and returning to the flow sensor 22 as a backflow.

In the measurement narrowing portion, only one of the measurement narrowing surface and the measurement expansion surface may extend straight. Specifically, at least one of the front narrowing portion 431, the front expansion surface 432, the back narrowing surface 441, and the back expansion surface 442 may extend straight. The front top portion 111*a* and the back top portion 112*a* may be curved so as to bulge or may be curved so as to be recessed.

As the modification D15, the shape and size of the narrowing portions 111 and 112 may be different from those in the configuration of the first embodiment. For example, in the narrowing portions 111 and 112, the length dimensions W32*a* and W32*b* of the narrowing surfaces 431 and 441 may not be smaller than the length dimensions W33*a* and W33*b* of the expansion surfaces 432 and 442. The front narrowing upstream surface 433 and the front expansion downstream surface 434 may not be flush with each other. In this case, the projection dimension of the front narrowing surface 431 from the front narrowing upstream surface 433 is different from the projection dimension of the front expansion surface 432 from the front expansion downstream surface 434. Similarly to the front narrowing portion 111, for the back narrowing portion 112, the back narrowing upstream surface 443 and the back expansion downstream surface 444 may not be flush with each other. In this case, the projection dimension of the back narrowing surface 441 from the back narrowing upstream surface 443 is different from the projection dimension of the back expansion surface 442 from the back expansion downstream surface 444.

As the modification D16, the shape and size of the front narrowing portion 111 and the back narrowing portion 112 may be different. For example, the length dimension W31*a* of the front narrowing portion 111 may be larger or may be smaller than the length dimension W31*b* of the back narrowing portion 112. The length dimension W32*a* of the front narrowing portion 431 may be larger or smaller than the length dimension W32*b* of the back narrowing surface 441. The length dimension W33*a* of the front expansion surface 432 may be larger or smaller than the length dimension W33*b* of the back expansion surface 442. The projection dimensions D32*a* and D36*a* of the front top portion 111*a* may be the same as or smaller than the projection dimensions D32*b* and D36*b* of the back top portion 112*a*.

As the modification D17, the narrowing portions 111 and 112 may protrude outward from the measurement partition portion 451 in the depth direction Z. The narrowing portions 111 and 112 may be provided at positions not entering the upstream bent path 406 or the downstream bent path 407. For example, the narrowing portions 111 and 112 are provided only on the sensor path 405 of the sensor path 405, the upstream bent path 406, and the downstream bent path 407. The narrowing portions 111 and 112 may not be stretched between the measurement ceiling surface 102 and the measurement floor surface 101. For example, the narrowing portions 111 and 112 are configured to extend from only one of the measurement ceiling surface 102 and the measurement floor surface 101. The narrowing portions 111 and 112 are provided at positions separated from both the measurement ceiling surface 102 and the measurement floor surface 101 between the measurement ceiling surface 102 and the measurement floor surface 101.

As the modification D18, the measurement narrowing portion such as the narrowing portions 111 and 112 is only required to be provided in the measurement flow path 32 on at least one of the front measurement wall surface 103, the back measurement wall surface 104, the outer measurement bent surface 401, and the inner measurement bent surface 402. For example, at least one of the front narrowing portion 111 and the back narrowing portion 112 is provided. The measurement narrowing portion is provided on each of the measurement wall surfaces 103 and 104 and the measurement bent surfaces 401 and 402.

As the modification D19, the bulging degree of the downstream inner bent surface 425 may not be smaller than the bulging degree of the upstream inner bent surface 415. The recess degree of the downstream outer bent surface 421 may be smaller than the bulging degree of the downstream inner bent surface 425. The recess degree of the upstream outer bent surface 411 may be larger than the bulging degree of the upstream inner bent surface 415. In any configuration, the relationship of L35*b*>L35*a* is preferably established in the measurement flow path 32.

As the modification D20, the relationship of L35*b*>L35*a* may not be established in the measurement flow path 32. That is, the separation distance L35*b* between the downstream outer bent surface 421 and the downstream inner bent surface 425 may not be larger than the separation distance L35*a* between the upstream outer bent surface 411 and the upstream inner bent surface 415.

As the modification D21, the recess degree of the downstream outer bent surface 421 may not be larger than the recess degree of the upstream outer bent surface 411.

As the modification D22, on the arrangement line CL31, the flow sensor 22 may not be disposed at a position closer to the upstream outer bent surface 411 than the downstream outer bent surface 421.

<Modification of Configuration Group E>

As the modification E1, in the mold upstream surface 55*c* of the sensor support portion 51, the entire portion provided in the measurement flow path 32 may be disposed on the upstream side relative to the narrowing portions 111 and 112. That is, in the measurement flow path 32, if the portion included in the arrangement cross section CS41 in the mold upstream surface 55*c* is provided on the upstream side relative to the narrowing portions 111 and 112, the other portion may not be provided on the upstream side relative to the narrowing portions 111 and 112.

As the modification E2, in the arrangement cross section CS41, the mold upstream surface 55*c* may be disposed on the upstream side relative to at least one of the front narrowing portion 111 and the back narrowing portion 112. For example, the back narrowing portion 112 is disposed on the mold downstream side relative to the mold upstream surface 55*c* in the arrangement cross section CS41.

As the modification E3, in the sensor support portion 51, the mold upstream inclined surface 471 may be inclined with respect to the height direction Y so as to gradually approach the mold downstream surface 55*d* toward the mold base end surface 55*b*. The mold upstream inclined surface 471 may be a bent surface such as a curved surface bent so as to bulge or be bent in the depth direction Z.

As the modification E4, the mold upstream surface 55*c* of the sensor support portion 51 may not have the mold upstream inclined surface 471. For example, the mold upstream surface 55*c* is configured to extend from the mold tip end surface 55*a* toward the mold base end surface 55*b* without being inclined with respect to the height direction Y.

As the modification E5, at least a part of the mold upstream surface 55*c* of the sensor support portion 51 may be provided in the upstream bent path 406. For example, the entire mold upstream inclined surface 471 is provided in the upstream bent path 406. The sensor support portion 51 may be provided at a position separated from the upstream bent path 406.

As the modification E6, in the mold downstream surface 55*d* of the sensor support portion 51, the entire portion provided in the measurement flow path 32 may be disposed on the upstream side relative to the downstream end portions 111*c* and 112*c* of the narrowing portions 111 and 112. That is, in the measurement flow path 32, if the portion included in the arrangement cross section CS41 in the mold downstream surface 55*d* is present on the upstream side relative to the downstream end portions 111*c* and 112*c* of the narrowing portions 111 and 112, the other portion may not be provided on the upstream side relative to the downstream end portions 111*c* and 112*c*.

As the modification E7, in the arrangement cross section CS41, the mold downstream surface 55*d* is only required to be disposed on the upstream side relative to at least one of the front downstream end portion 111*c* of the front narrowing portion 111 and the back downstream end portion 112*c* of the back narrowing portion 112. For example, the back downstream end portion 112*c* of the back narrowing portion 112 is disposed on the downstream side relative to the mold downstream surface 55*d* in the arrangement cross section CS41.

As the modification E8, in the sensor support portion 51, the mold downstream inclined surface 472 may be inclined with respect to the height direction Y so as to gradually approach the mold upstream surface 55*c* toward the mold base end surface 55*b*. The mold downstream inclined surface 472 may be a bent surface such as a curved surface bent so as to bulge or be bent in the depth direction Z.

As the modification E9, the mold downstream surface 55*d* of the sensor support portion 51 may not have the mold downstream inclined surface 472. For example, the mold downstream surface 55*d* is configured to extend from the mold tip end surface 55*a* toward the mold base end surface 55*b* without being inclined with respect to the height direction Y.

As the modification E10, at least a part of the mold downstream surface 55*d* of the sensor support portion 51 may be provided in the downstream bent path 407. For example, the entire mold downstream inclined surface 472 is provided in the downstream bent path 407. The sensor support portion 51 may be provided at a position separated from the downstream bent path 407.

As the modification E11, in the mold downstream surface 55*d* of the sensor support portion 51, the entire portion provided in the measurement flow path 32 may be disposed on the downstream side relative to the narrowing portions 111 and 112.

As the modification E12, the flow sensor 22 may be provided on the downstream side or the upstream side relative to the front top portion 111*a* or the back top portion 112*a* as long as the flow sensor 22 is provided at the position where the flow rate becomes largest in the measurement flow path 32. The flow sensor 22 may be provided at a position different from the position where the flow velocity becomes largest in the measurement flow path 32.

As the modification E13, the opening area of the measurement exit 36 may not be smaller than the opening area of the measurement entrance 35. The opening area of the passage exit 34 may not be smaller than the opening area of the passage entrance 33.

<Modification of Configuration Group F>

Figure 92:
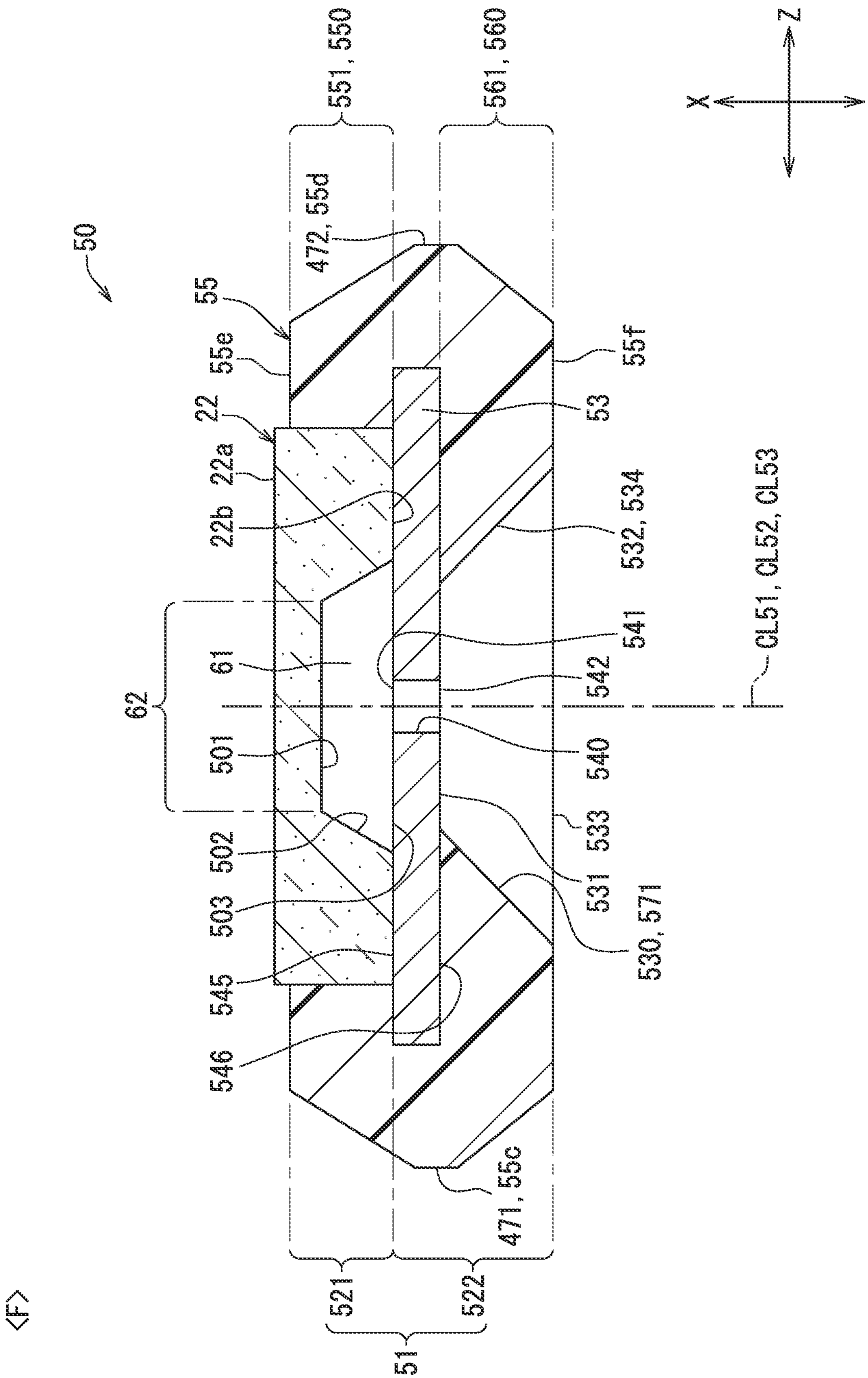
FIG. 92 is a cross-sectional view around the membrane portion of the flow sensor according to the first embodiment in the modification F1.

As the modification F1, in the first embodiment, the support recess inner wall surface 532 may not have at least one of the bottom surface chamfered surface 535 and the opening surface chamfered surface 536. For example, as shown in FIG. 92, the support recess inner wall surface 532 does not have both the bottom surface chamfered surface 535 and the opening surface chamfered surface 536. In this configuration, the entire support recess inner wall surface 532 is the inner wall inclined surface 534. The inner wall inclined surface 534 is stretched between the support recess bottom surface 531 and the support recess opening 533.

Figure 93:
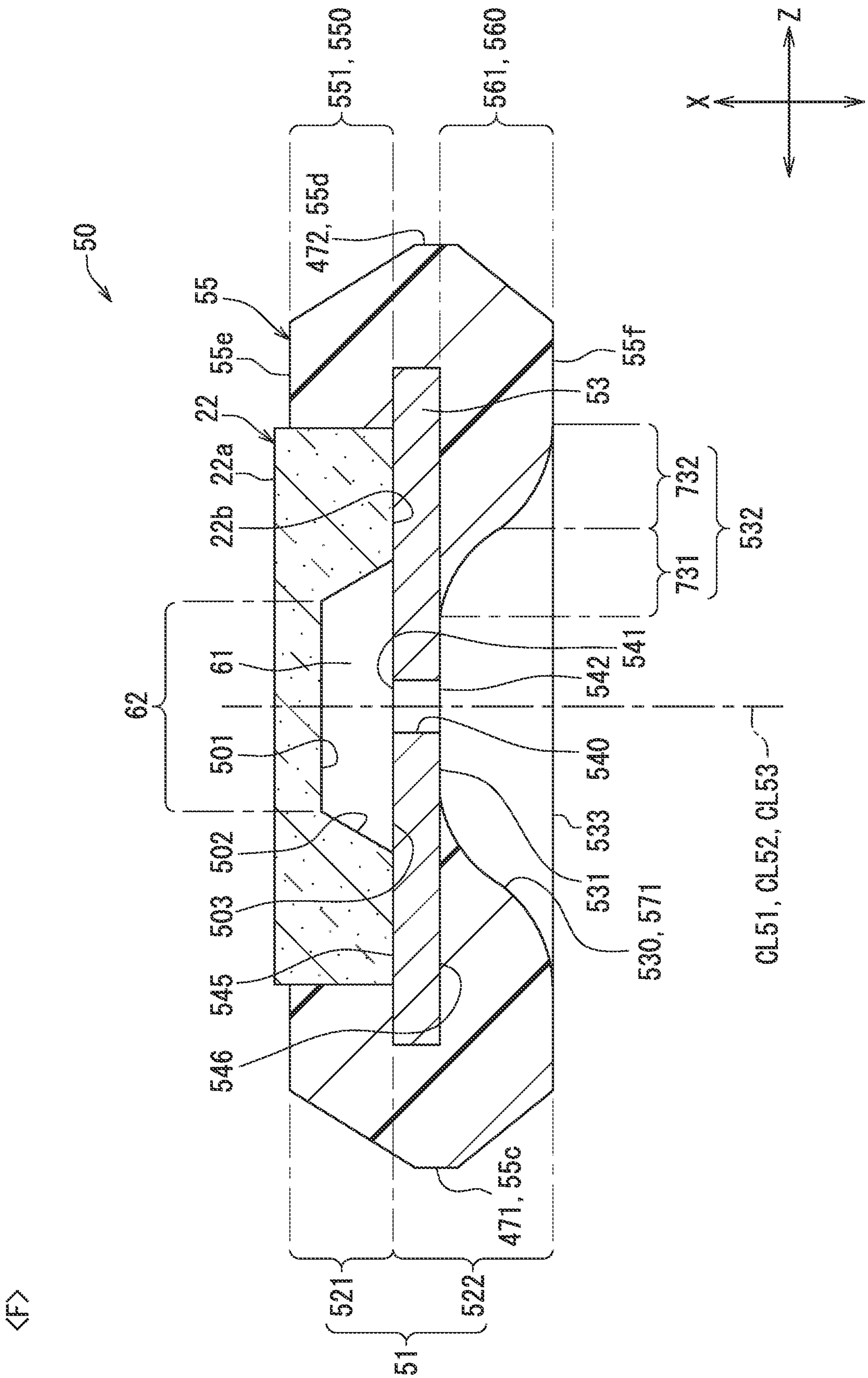
FIG. 93 is a cross-sectional view around the membrane portion of the flow sensor according to the first embodiment in the modification F2.

As the modification F2, in the first embodiment, the support recess inner wall surface 532 may not have the inner wall inclined surface 534, and the entire support recess inner wall surface 532 may be bent. For example, as shown in FIG. 93, the support recess inner wall surface 532 has a bottom curved surface 731 and an opening curved surface 732. The bottom curved surface 731 extends from the support recess bottom surface 531 toward the mold back side, and forms an inner peripheral edge of the support recess inner wall surface 532. The bottom curved surface 731 is curved so as to be recessed toward the outside of the support recess portion 530. The opening curved surface 732 extends from the mold back surface 55*f* toward the mold front side, and forms the support recess opening 533. The opening curved surface 732 is curved so as to bulge toward the inside of the support recess portion 530. Both the bottom curved surface 731 and the opening curved surface 732 extend annularly so as to surround the center line CL53 of the support recess portion 530, and are connected to each other between the support recess bottom surface 531 and the support recess opening 533 in the width direction X.

Figure 94:
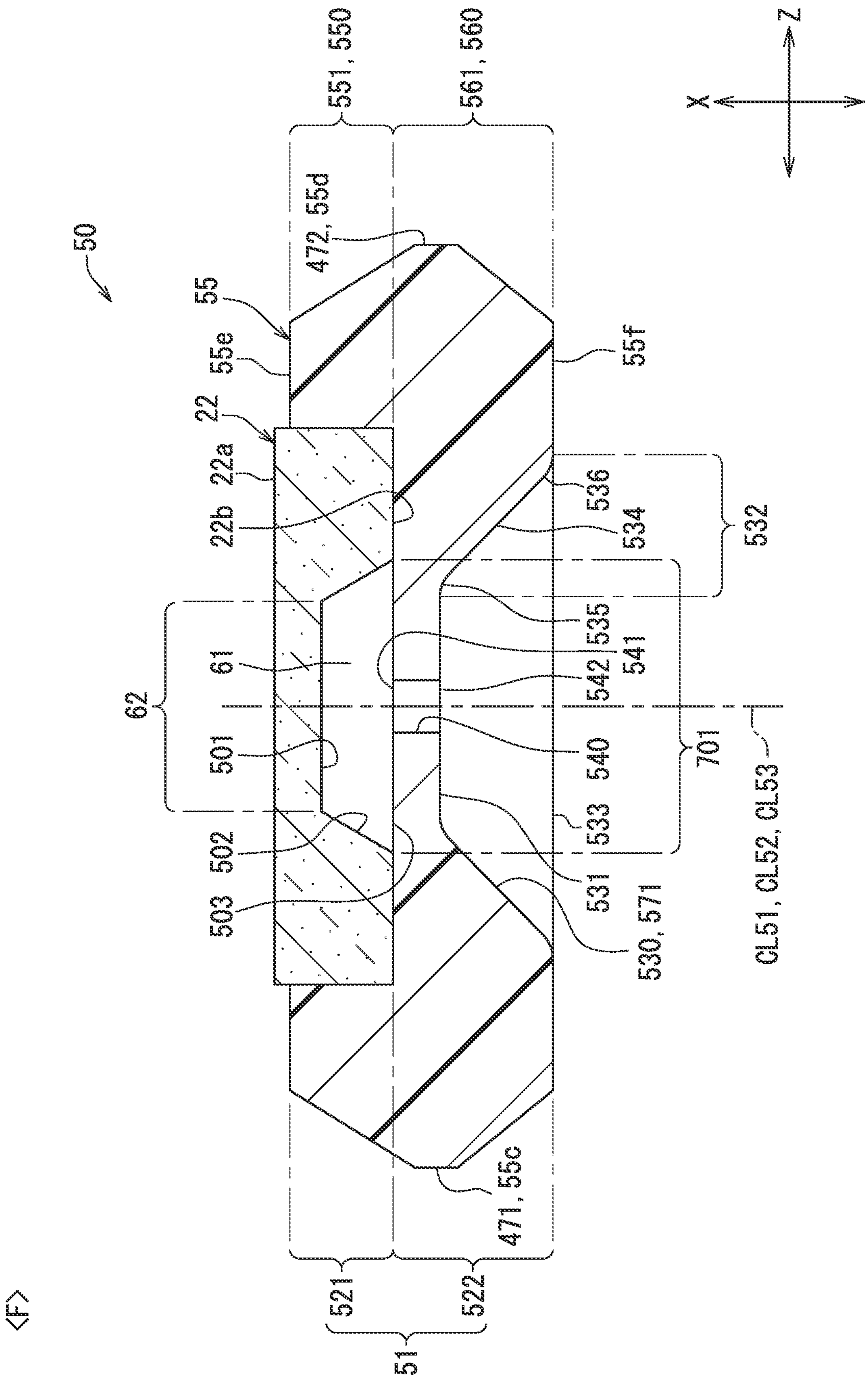
FIG. 94 is a cross-sectional view around the membrane portion of the flow sensor according to the first embodiment in the modification F3.

As the modification F3, in the first embodiment, not the SA substrate 53 but the mold back portion 560 of the back support portion 522 may be closed so as to cover the sensor recess opening 503 of the flow sensor 22. For example, as shown in FIG. 94, the mold back portion 560 is configured to be overlapped on the sensor back surface 22*b* of the flow sensor 22. In this configuration, both the support recess portion 530 and the support hole 540 are provided in the mold back portion 560 of the back support portion 522. In the support recess portion 530, the support recess bottom surface 531, in addition to the support recess inner wall surface 532, is also formed by the mold back portion 560.

In the present modification, the flow sensor 22 may be or may not be mounted on the SA substrate 53. Examples of the configuration in which the flow sensor 22 is mounted on the SA substrate 53 include a configuration in which a portion of the flow sensor 22 closer to the mold base end side than the support recess portion 530 is mounted on the SA substrate 53. Examples of the configuration in which the flow sensor 22 is not mounted on the SA substrate 53 include a configuration in which the sensor SA50 does not have the SA substrate 53.

Figure 95:
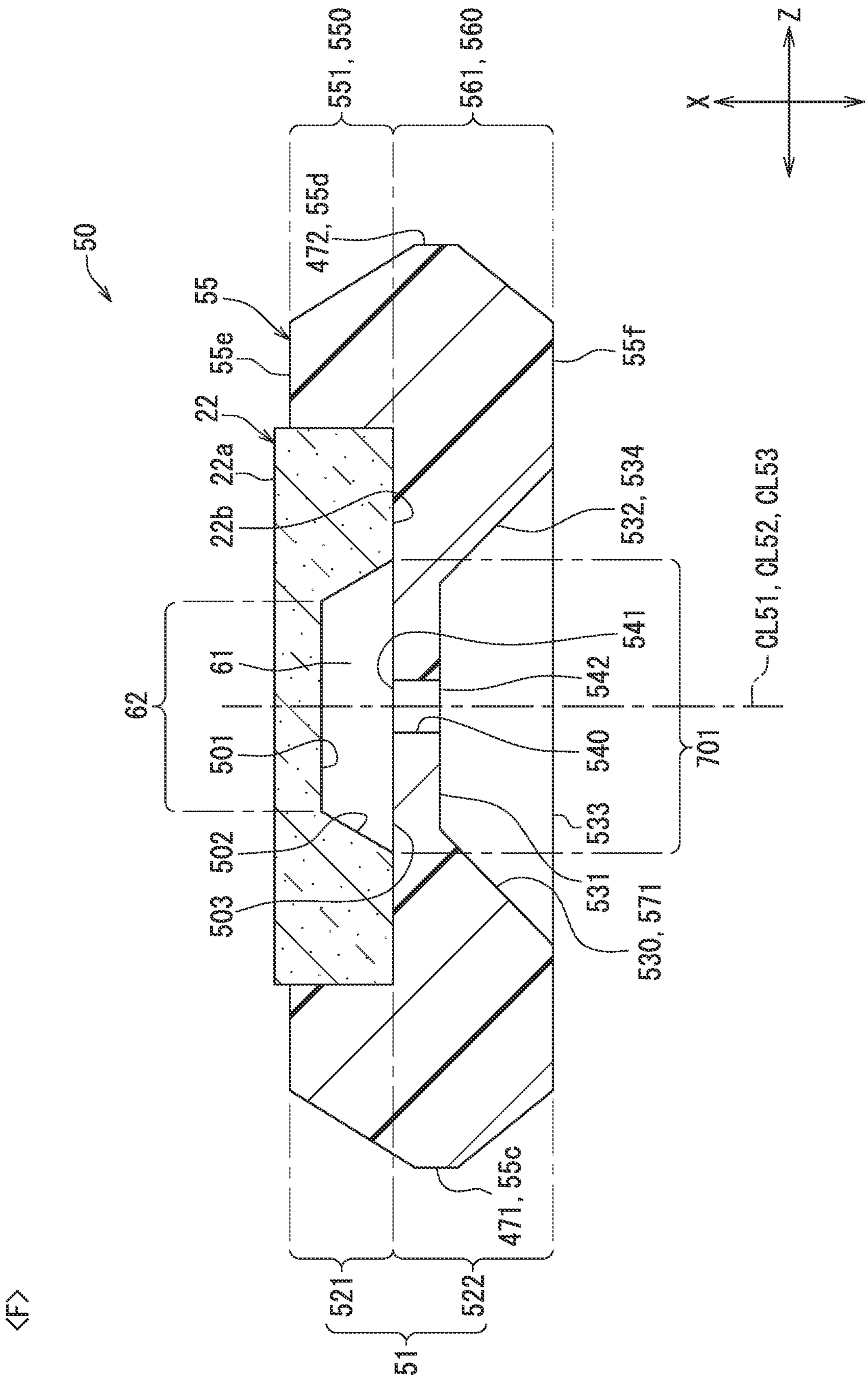
FIG. 95 is a cross-sectional view around the membrane portion of the flow sensor according to the first embodiment in the modification F4.

As the modification F4, in the modification F3 described above, similarly to the modification F1 described above, the support recess inner wall surface 532 may not have at least one of the bottom surface chamfered surface 535 and the opening surface chamfered surface 536. For example, as shown in FIG. 95, the support recess inner wall surface 532 does not have both the bottom surface chamfered surface 535 and the opening surface chamfered surface 536.

Figure 96:
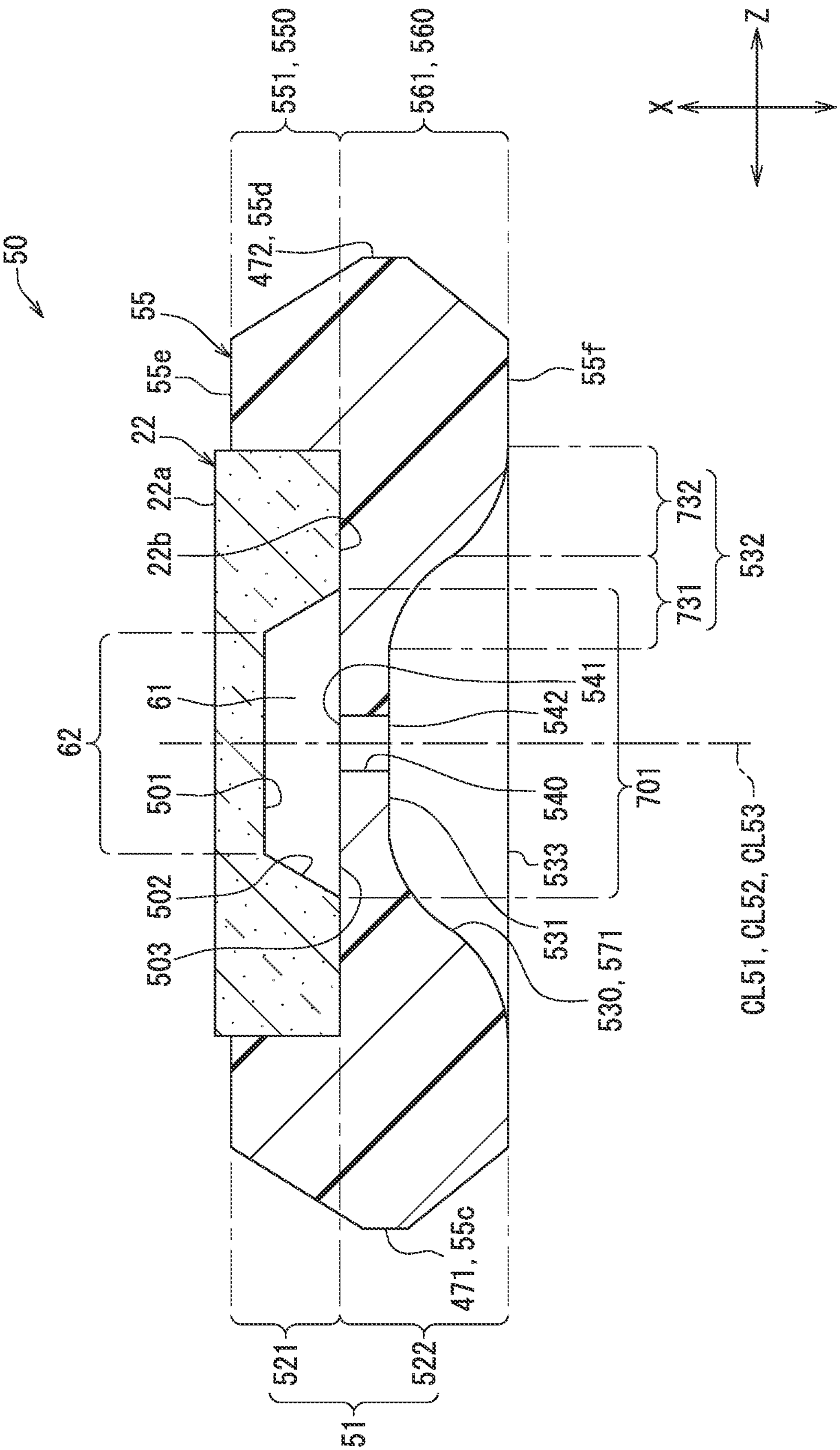
FIG. 96 is a cross-sectional view around the membrane portion of the flow sensor according to the first embodiment in the modification F5.

As the modification F5, in the modification F3 described above, similarly to the modification F2 described above, the support recess inner wall surface 532 may not have the inner wall inclined surface 534, and the entire support recess inner wall surface 532 may be bent. For example, as shown in FIG. 96, the support recess inner wall surface 532 has the bottom curved surface 731 and the opening curved surface 732.

Figure 97:
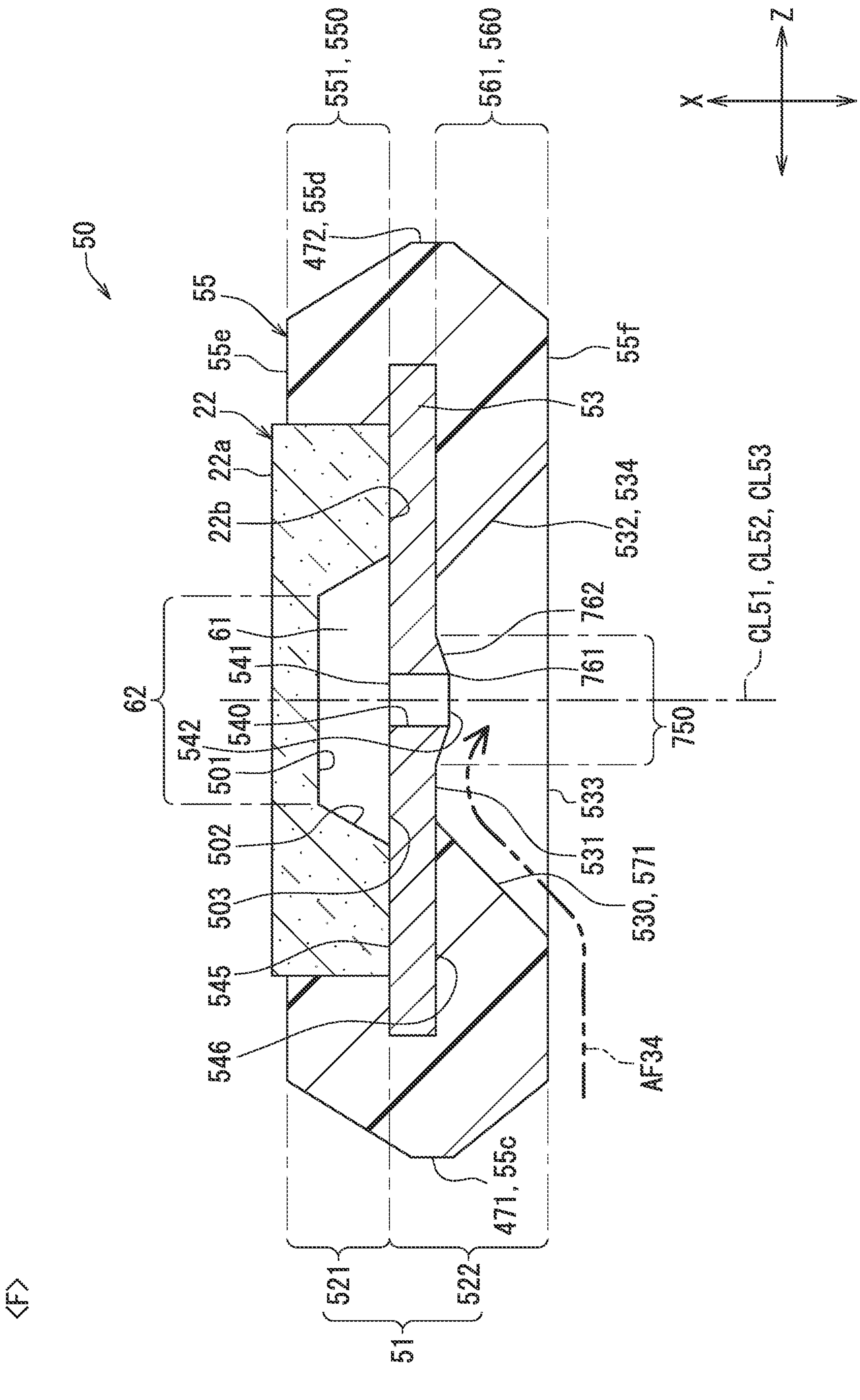
FIG. 97 is a cross-sectional view around the membrane portion of the flow sensor according to the first embodiment in the modification F6.

As the modification F6, in the first embodiment, the SA substrate back surface 546 of the SA substrate 53 may not be a flat surface. For example, as shown in FIG. 97, the SA substrate 53 has a substrate projection portion 750. The substrate projection portion 750 is a projection portion provided on the SA substrate back surface 546, and is formed by a part of the SA substrate 53 projecting toward the mold back side. The center line of the substrate projection portion 750 extends in the width direction X and passes through the center of the substrate projection tip end portion 761. The center line of the substrate projection portion 750 coincides with the center line CL51 of the support hole 540.

The substrate projection portion 750 has a substrate projection tip end portion 761 and a substrate projection outer wall surface 762. The substrate projection tip end portion 761 is a tip end portion of the substrate projection portion 750, and the support hole 540 extends from the substrate projection tip end portion 761 toward the flow sensor 22. Therefore, the back end portion 542 of the support hole 540 is provided in the substrate projection tip end portion 761. The substrate projection tip end portion 761 annularly extends along the outer peripheral edge of the back end portion 542.

The substrate projection outer wall surface 762 extends from the substrate projection tip end portion 761 toward the mold front side. The substrate projection outer wall surface 762 is inclined with respect to the center line CL51 of the support hole 540 and faces the mold back side. The substrate projection portion 750 is gradually reduced toward the mold back side in the width direction X, and has a tapered shape as a whole. The substrate projection outer wall surface 762 annularly extends along the substrate projection tip end portion 761. The substrate projection outer wall surface 762 extends from the back end portion 542 of the support hole 540, and the substrate projection tip end portion 761 linearly extends along the boundary portion between the substrate projection outer wall surface 762 and the back end portion 542.

The SA substrate 53 is manufactured by performing processing such as punching on a plate-shaped base material. When manufacturing the SA substrate 53 by cutting the base material, in a case where a burr extending from the SA substrate back surface 546 to the mold back side is generated in the peripheral edge portion of the back end portion 542 of the support hole 540, the substrate projection portion 750 is sometimes formed using this burr. In the configuration in which the substrate projection portion 750 is formed by the burr, the substrate projection portion 750 is not necessarily formed in an annular shape, and the projection dimension of the substrate projection portion 750 from the SA substrate back surface 546 is not necessarily uniform in the circumferential direction of the substrate projection portion 750.

Next, a flow of air inside the support recess portion 530 will be described. As shown in FIG. 97, the back closing flow AF34 flowing from the support recess opening 533 and proceeding toward the mold front side along the support recess inner wall surface 532 reaches the substrate projection portion 750 and flows along the substrate projection outer wall surface 762, thereby proceeding obliquely toward the mold back side. Therefore, the back closing flow AF34 that passes through the back end portion 542 of the support hole 540 after proceeding along the substrate projection outer wall surface 762 easily passes through a position separated from the back end portion 542 to the mold back side in the support recess portion 530. Therefore, the substrate projection portion 750 can suppress the back closing flow AF34 from flowing into the support hole 540 from the back end portion 542 inside the support recess portion 530.

Figure 98:
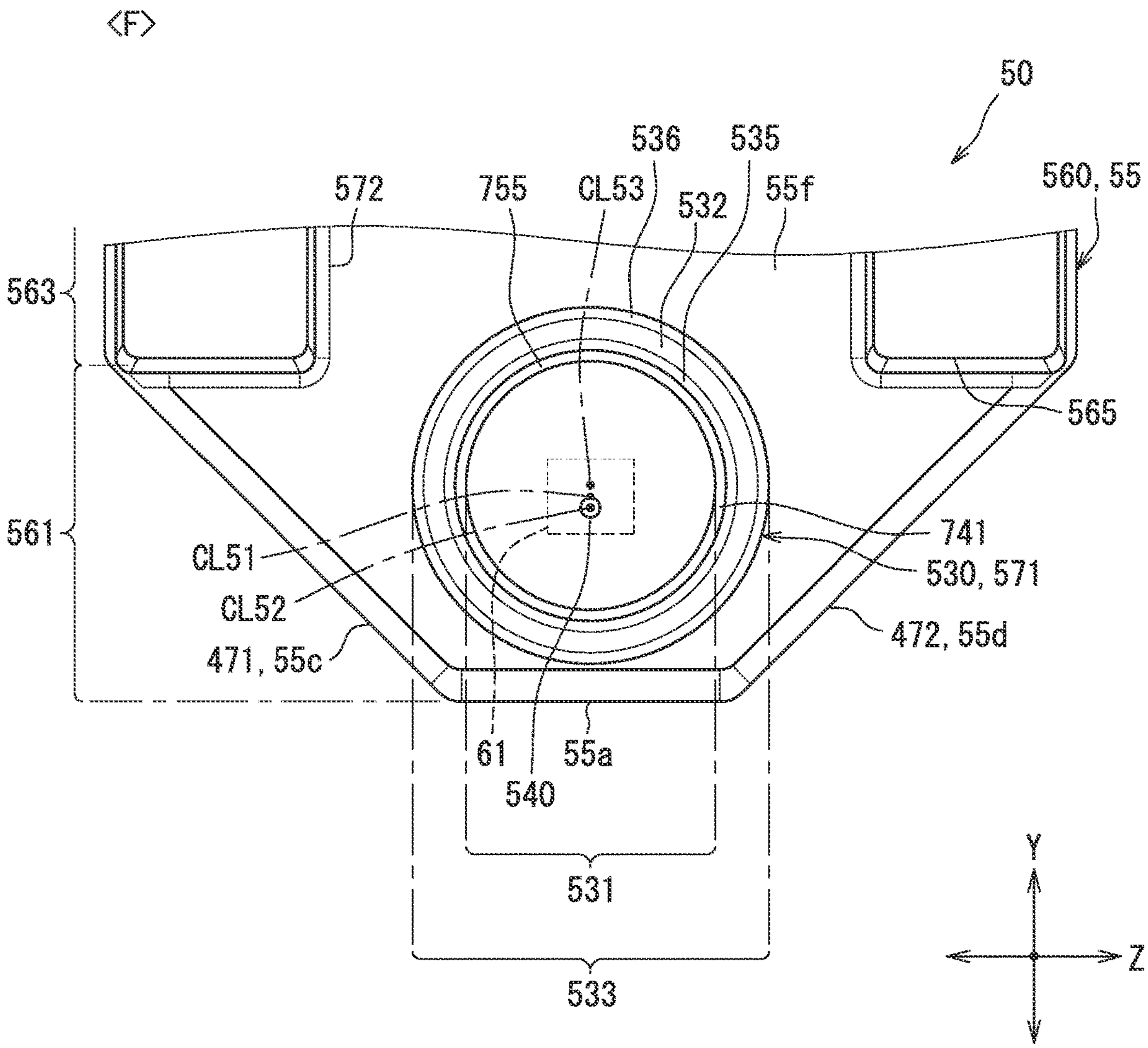
FIG. 98 is an enlarged view around the sensor recess portion of the flow sensor as viewed from the mold back side according to the first embodiment in the modification F7.

As the modification F7, in the first embodiment, the mold back portion 560 may further extend inward from the inner peripheral edge of the bottom surface chamfered surface 535. For example, as shown in FIG. 98, the mold back portion 560 has a mold extending portion 755. The mold extending portion 755 is a portion extending inward along the SA substrate back surface 546 from the inner peripheral edge of the bottom surface chamfered surface 535 in the mold back portion 560. In this case, the bottom surface chamfered surface 535 is a surface for chamfering the inside corner portion between the inner wall inclined surface 534 and the mold extending portion 755. The mold extending portion 755 annularly extends along the outer peripheral edge of the support recess bottom surface 531 and the inner peripheral edge of the bottom surface chamfered surface 535.

As described above, the mold back portion 560 is manufactured by resin molding as a part of the mold portion 55. When the molten resin enters between the support recess mold portion 592*a* of the back mold portion 591 and the SA substrate 53 at the time of manufacturing the mold portion 55, the mold extending portion 755 is sometimes formed using this entering portion. In the configuration in which the mold extending portion 755 is formed by the entering portion of the molten resin, the mold extending portion 755 is not necessarily annular, and the extension dimension of the mold extending portion 755 from the bottom surface chamfered surface 535 is not necessarily uniform in the circumferential direction of the support recess portion 530.

In the configuration in which the support recess inner wall surface 532 does not have the bottom surface chamfered surface 535 as in the modification F1, the mold extending portion 755 may extend inward from the inner peripheral edge of the inner wall inclined surface 534. In the configuration in which the support recess inner wall surface 532 has the bottom curved surface 731 as in the modification F2, the mold extending portion 755 may extend inward from the inner peripheral edge of the bottom curved surface 731.

As the modification F8, in the first embodiment, at least a part of the inner peripheral edge of the support recess inner wall surface 532 may be provided at a position not separated outward from the back end portion 542 of the support hole 540. For example, the entire inner peripheral edge of the support recess inner wall surface 532 is provided at a position not separated outward from the back end portion 542. In this configuration, the support recess bottom portion, which is the bottom portion of the support recess portion 530, extends linearly along the boundary portion between the support recess inner wall surface 532 and the back end portion 542.

As the modification F9, as in the first embodiment, the inclination degree of the support recess inner wall surface 532 with respect to the center line CL53 of the support recess portion 530 may not be uniform in the circumferential direction of the support recess inner wall surface 532. For example, the inclination degree of the portion of the support recess inner wall surface 532 arranged on the support recess bottom surface 531 in the depth direction Z is larger than the inclination degree of the portion of the support recess inner wall surface 532 arranged on the support recess bottom surface 531 in the height direction Y. In this configuration, the length dimension L51 of the support recess inner wall surface 532 in the depth direction Z is larger than the length dimension L51 of the support recess inner wall surface 532 in the height direction Y.

As the modification F10, in the first embodiment, in at least a part of the support recess inner wall surface 532, the length dimension L51 in the height direction Y and the depth direction Z may not be larger than the length dimension L52 in the width direction X. For example, in the entire circumferential direction of the support recess inner wall surface 532, the length dimension L51 in the directions Y and Z is smaller than the length dimension L52 in the width direction X.

As the modification F11, the positional relationship among the center line CL51 of the sensor recess portion 61, the center line CL52 of the support hole 540, and the center line CL53 of the support recess portion 530 is not limited to that in the configuration of the first embodiment. For example, the center line CL51 of the sensor recess portion 61 may be disposed at a position closer to the center line CL53 of the support recess portion 530 than the center line CL52 of the support hole 540. The arrangement order in the height direction Y may not be the order in which the center line CL51 of the sensor recess portion 61 is arranged between the center line CL52 of the support hole 540 and the center line CL53 of the support recess portion 530. These center lines CL51, CL52, and CL53 may be arranged at positions shifted in the depth direction Z. For example, these center lines CL51, CL52, and CL53 are arranged in the depth direction Z. These center lines CL51, CL52, and CL53 may coincide with one another.

As the modification F12, in the first embodiment, the length dimension of the support hole 540 may not be smaller than the depth dimension of the support recess portion 530. For example, the length dimension of the support hole 540 is larger than the depth dimension of the support recess portion 530. In this configuration, the thickness dimension L54 of the SA substrate 53 is larger than the thickness dimension L52 of the back measurement portion 561.

As the modification F13, in the first embodiment, the support recess portion 530 may not be formed by the recess formation hole 571 penetrating the mold portion 55, but the support recess portion 530 may be formed by a recess portion provided in the mold portion 55. In this configuration, the support recess bottom surface 531 of the support recess portion 530 is formed by the mold back portion 560, and the support hole 540 penetrates the mold back portion 560 in addition to the SA substrate 53.

Figure 99:
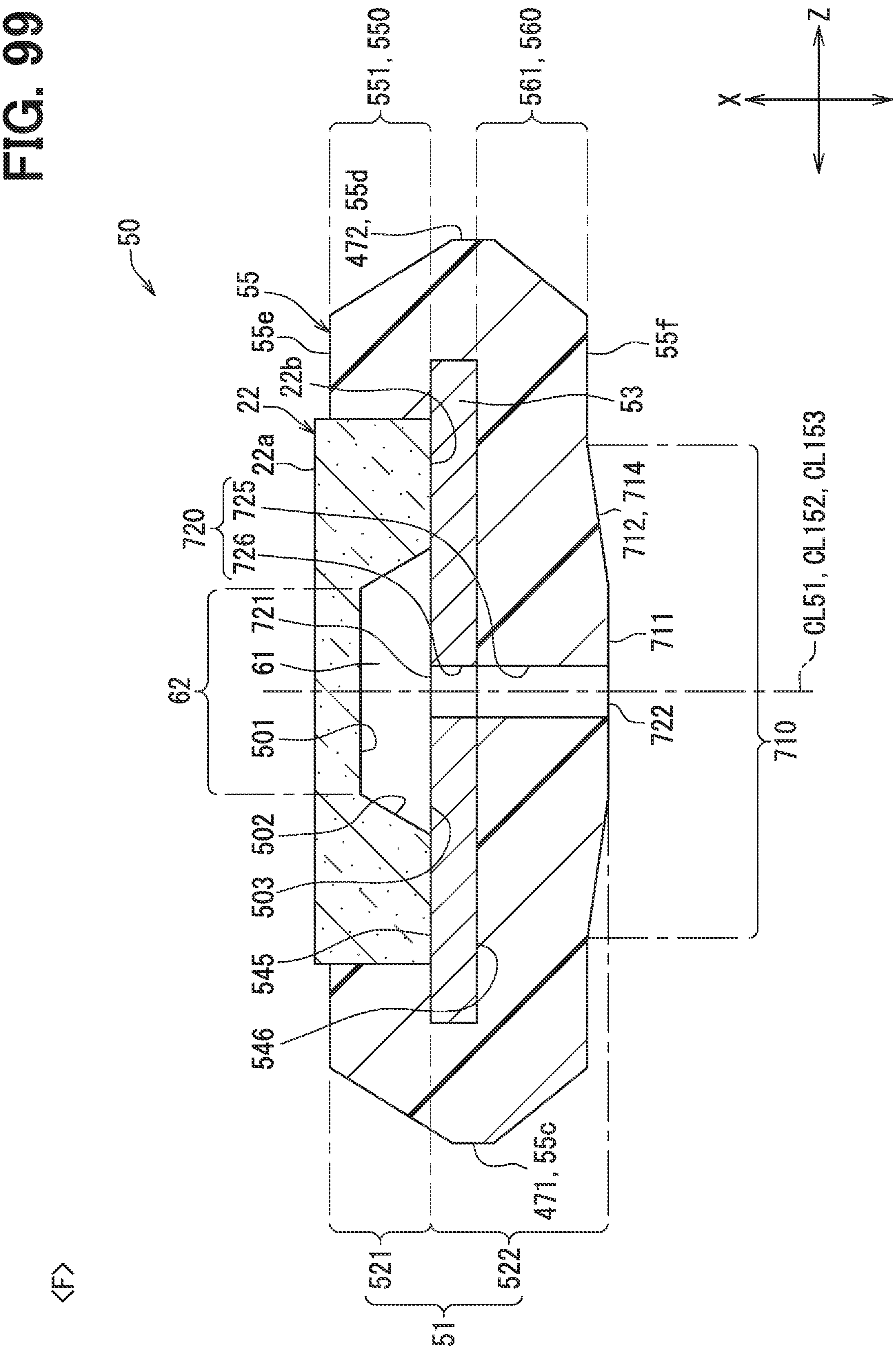
FIG. 99 is a cross-sectional view around the membrane portion of the flow sensor according to the fourth embodiment in the modification F14.

As the modification F14, in the fourth embodiment, the support projection outer wall surface 712 may not have at least one of the tip end chamfered surface 715 and the base end chamfered surface 716. For example, as shown in FIG. 99, the support projection outer wall surface 712 does not have both the tip end chamfered surface 715 and the base end chamfered surface 716. In this configuration, the entire support projection outer wall surface is the outer wall inclined surface 714. This outer wall inclined surface 714 is stretched between the support projection tip end surface 711 and the mold back surface 55*f*.

Figure 100:
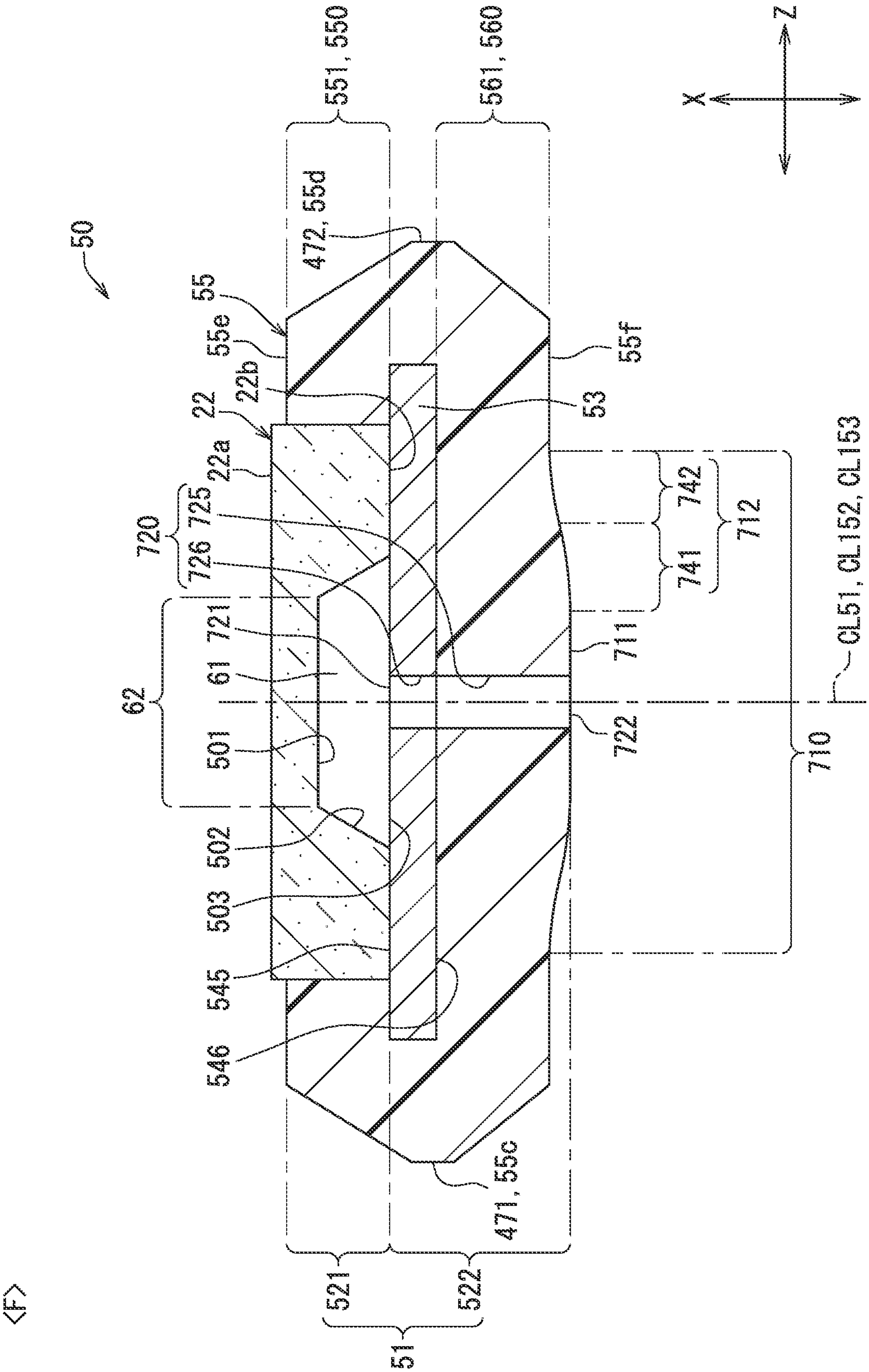
FIG. 100 is a cross-sectional view around the membrane portion of the flow sensor according to the fourth embodiment in the modification F15.

As the modification F15, in the fourth embodiment, the support projection outer wall surface 712 may not have the outer wall inclined surface 714, and the entire support projection outer wall surface 712 may be bent. For example, as shown in FIG. 100, the support projection outer wall surface 712 has a base end curved surface 741 and a tip end curved surface 742. The base end curved surface 741 extends from the mold back surface 55*f* toward the mold back side, and forms the outer peripheral edge of the support projection outer wall surface 712. The base end curved surface 741 is curved so as to be recessed toward the inside of the support projection portion 710. The tip end curved surface 742 extends from the support projection tip end surface 711 toward the mold front side, and forms then inner peripheral edge of the support projection outer wall surface 712. The tip end curved surface 742 is bent so as to bulge toward the outside of the support projection portion 710. Both the base end curved surface 741 and the tip end curved surface 742 extend annularly so as to surround the center line CL153 of the support projection portion 710, and are connected to each other between the support projection tip end surface 711 and the mold back surface 55*f* in the width direction X.

Figure 101:
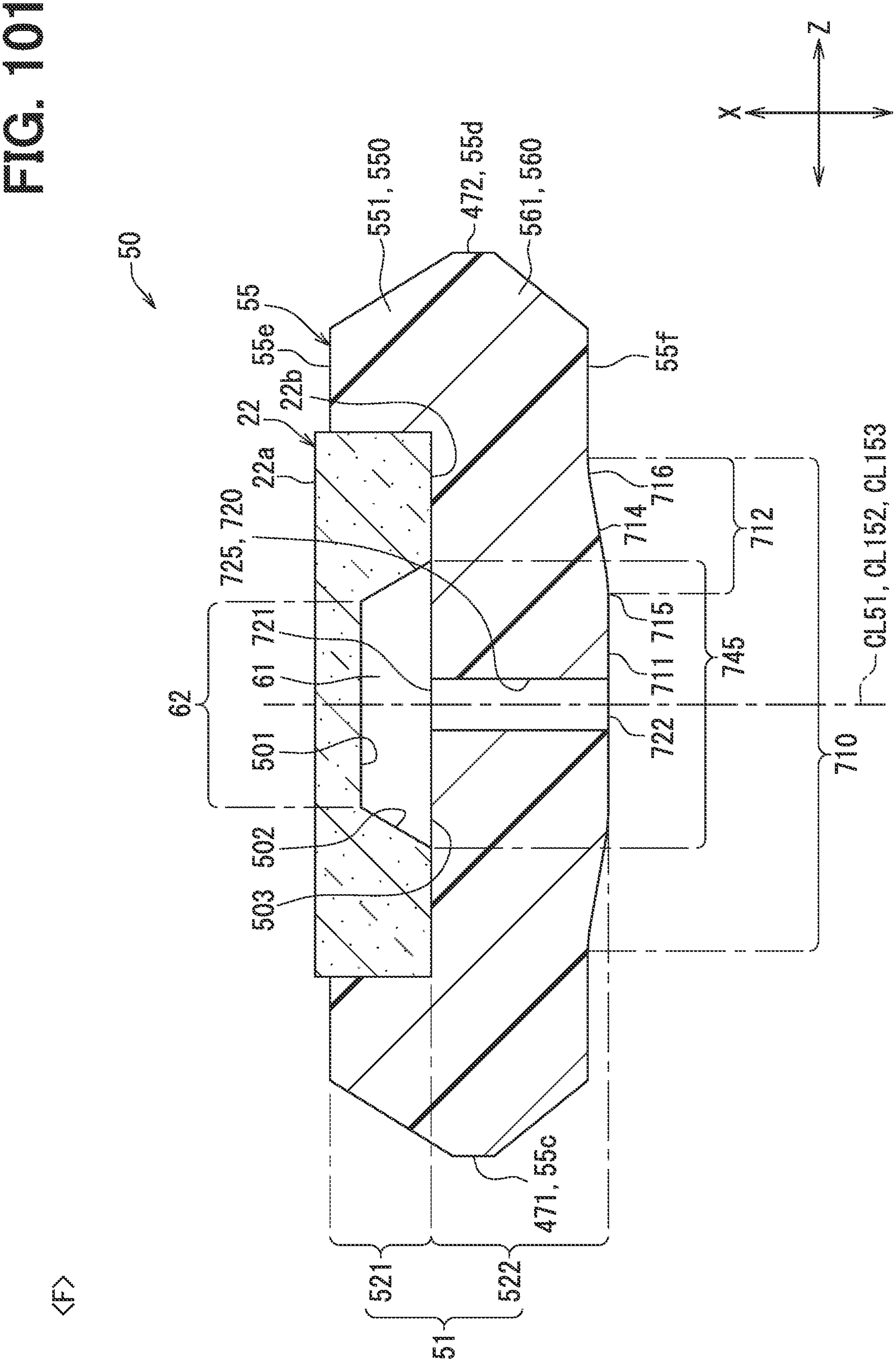
FIG. 101 is a cross-sectional view around the membrane portion of the flow sensor according to the fourth embodiment in the modification F16.

As the modification F16, in the fourth embodiment, of the back support portion 522, not the SA substrate 53 but the mold back portion 560 may be closed so as to cover the sensor recess opening 503 of the flow sensor 22. For example, as shown in FIG. 101, the mold back portion 560 is configured to be overlapped on the sensor back surface 22*b* of the flow sensor 22. In this configuration, when a portion of the mold back portion 560 overlapping the sensor recess opening 503 in the width direction X is referred to as a mold covering portion 745 covering the sensor recess opening 503, the support hole 720 is provided in the mold covering portion 745. The outer peripheral edge of the mold covering portion 745 is provided at a position overlapping the support projection outer wall surface 712 in the width direction X. In this case, the outer peripheral edge of the mold covering portion 745 is disposed on the outside relative to the support projection tip end surface 711 and disposed on the inside relative to the mold back surface 55*f* in the directions Y and Z orthogonal to the width direction X. Unlike the fourth embodiment, the mold back hole 725 forms the entire support hole 720.

In the present modification, as in the modification F3 described above, the flow sensor 22 may be or may not be mounted on the SA substrate 53. Examples of the configuration in which the flow sensor 22 is mounted on the SA substrate 53 include a configuration in which a portion of the flow sensor 22 closer to the mold base end side than the support projection portion 710 is mounted on the SA substrate 53.

Figure 102:
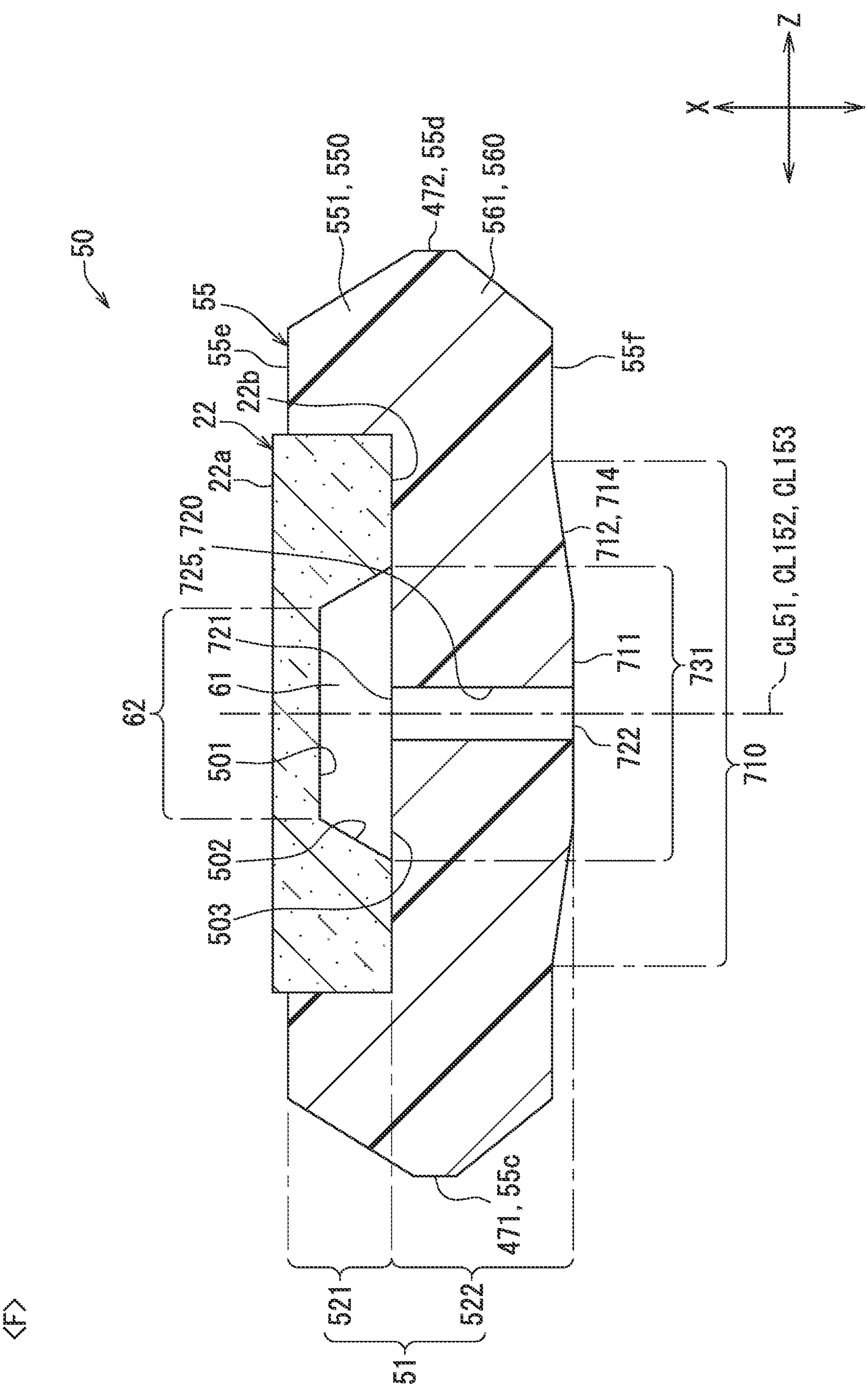
FIG. 102 is a cross-sectional view around the membrane portion of the flow sensor according to the fourth embodiment in the modification F17.

As the modification F17, in the modification F8, similarly to the modification F6, the support projection outer wall surface 712 may not have at least one of the tip end chamfered surface 715 and the base end chamfered surface 716. For example, as shown in FIG. 102, the support projection outer wall surface 712 does not have both the tip end chamfered surface 715 and the base end chamfered surface 716.

Figure 103:
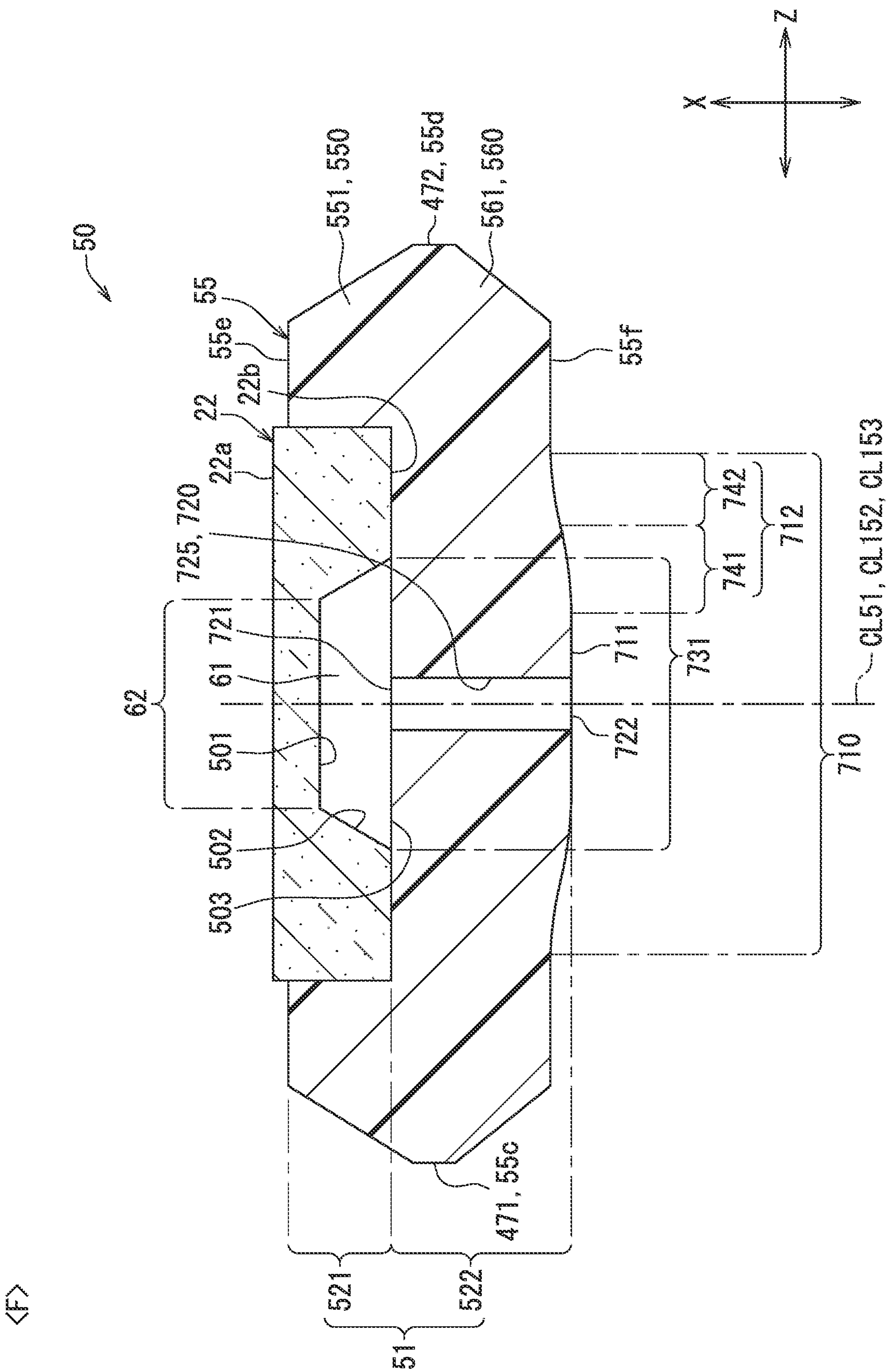
FIG. 103 is a cross-sectional view around the membrane portion of the flow sensor according to the fourth embodiment in the modification F18.

As the modification F18, in the modification F8 described above, similarly to the modification F7 described above, the support projection outer wall surface 712 may not have the outer wall inclined surface 714, and the entire support projection outer wall surface 712 may be bent. For example, as shown in FIG. 103, the support projection outer wall surface 712 has the base end curved surface 741 and the tip end curved surface 742.

As the modification F19, in the fourth embodiment, at least a part of the inner peripheral edge of the support projection outer wall surface 712 may be provided at a position not spaced outward from the back end portion 722 of the support hole 720. For example, the entire inner peripheral edge of the support projection outer wall surface 712 is provided at a position not separated outward from the back end portion 722. In this configuration, the support projection tip end portion of the support projection portion 710, which is the tip end of the support projection portion 710, extends linearly along the boundary portion between the support projection outer wall surface 712 and the back end portion 722.

As the modification F20, in the fourth embodiment, the inclination degree of the support projection outer wall surface 712 with respect to the center line CL153 of the support projection portion 710 may not be uniform in the circumferential direction of the support projection outer wall surface 712. For example, the inclination degree of the portion of the support projection outer wall surface 712 arranged in the depth direction Z on the support projection tip end surface 711 is larger than the inclination degree of the portion of the support projection outer wall surface 712 arranged in the height direction Y on the support projection tip end surface 711. In this configuration, the length dimension L151 of the support projection outer wall surface 712 in the depth direction Z is larger than the length dimension L151 of the support projection outer wall surface 712 in the height direction Y.

As the modification F21, in the fourth embodiment, at least a part of the support projection outer wall surface 712, the length dimension L151 in the height direction Y and the depth direction Z may not be larger than the length dimension L152 in the width direction X in. For example, the length dimension L151 in the directions Y and Z is smaller than the length dimension L152 in the width direction X in the entire circumferential direction of the support projection outer wall surface 712.

As the modification F22, the positional relationship among the center line CL51 of the sensor recess portion 61, the center line CL152 of the support hole 720, and the center line CL153 of the support recess portion 530 is not limited to that of the configuration of the fourth embodiment. For example, the center line CL51 of the sensor recess portion 61 may be disposed at a position closer to the center line CL153 of the support projection portion 710 than the center line CL152 of the support hole 720. The arrangement order in the height direction Y may not be the arrangement order in which the center line CL51 of the sensor recess portion 61 is arranged between the center line CL152 of the support hole 720 and the center line CL153 of the support projection portion 710. These center lines CL51, CL152, and CL153 may be arranged at positions shifted in the depth direction Z. For example, these center lines CL51, CL152, and CL153 are arranged in the depth direction Z. These center lines CL51, CL152, and CL153 may coincide with each other.

As the modification F23, the relationship between the length dimensions L151 and L152 and the thickness dimensions L153 and L54 is not limited to that of the configuration of the fourth embodiment. For example, the length dimension L152 of the support projection outer wall surface 712 in the width direction X may not be smaller than the thickness dimension L153 of the portion of the mold back portion 560 where the support projection portion 710 is provided or the thickness dimension L54 of the SA substrate 53. For example, in the width direction X, the projection dimension of the support projection portion 710 from the mold back surface **55*f* is larger than the thickness dimension L153. The length dimension L152 may not be smaller than the length dimension L151 of the support projection outer wall surface 712** in the directions Y and Z orthogonal to the width direction X.

As the modification F24, the flow sensor 22 may include a sensor filter that restricts entry of foreign matters into the sensor recess portion 61. For example, in the first embodiment, the sensor filter overlaps the sensor back surface **22*b*, so that the sensor recess opening 503 is covered with the sensor filter. In this configuration, even if the back closing flow AF34 flows into the support hole 540, the back closing flow AF34 passes through the sensor filter and then flows into the sensor recess portion 61. Therefore, even if the back closing flow AF34** contains a foreign matter, the foreign matter is removed by the sensor filter.

As the modification F25, the cross-sectional shape of the support recess portion such as the support recess portion 530 may not be circular or substantially circular. For example, in the first embodiment, the support recess portion 530 may have a rectangular cross section, and the support recess bottom surface 531 and the support recess opening 533 may have rectangular shapes.

As the modification F26, the cross-sectional shape of the support hole such as the support holes 540 and 720 may not be circular or elliptical. For example, in the first embodiment, the support hole 540 may have a rectangular cross section, and the front end portion 541 and the back end portion 542 may have rectangular shapes. In the fourth embodiment described above, in the support hole 720, the SA substrate hole 726 and the mold back hole 725 may have a rectangular cross section, and the front end portion 721 and the back end portion 722 may have rectangular shapes.

As the modification 27, the sensor front surface **22*a* of the flow sensor 22 may be provided at a position on the mold front side relative to the mold front surface 55*e* or a position flush with the mold front surface 55*e***.

As the modification 28, the peripheral edge recess portion 56 of the mold portion 55 is not limited to the shape and size of the first embodiment described above. For example, the peripheral edge recess portion 56 may be formed in an annular shape by extending along the entire outer peripheral edge of the flow sensor 22, or may be provided on only one of the mold upstream side and the mold downstream side relative to the flow sensor 22. Further, in the peripheral edge recess portion 56, the height dimension of the inner wall surface on the inner peripheral side may not be smaller than the height dimension of the inner wall surface on the outer peripheral side. For example, in a configuration in which the sensor front surface **22*a* of the flow sensor 22 is provided at a position on the mold front side with respect to the mold front surface 55*e*, the height dimension of the inner wall surface on the inner peripheral side is larger than the height dimension of the inner wall surface on the outer peripheral side. In the configuration in which the sensor front surface 22*a* is provided to be flush with the mold front surface 55*e*, there is no height dimension of the inner wall surface on the inner peripheral side. In this configuration, one recess portion having the sensor front surface 22*a* as a part of the bottom surface is formed to include the peripheral edge recess portion 56. The mold front surface 55*e* may not be provided with the peripheral edge recess portion 56**.

<Modification of Configuration Group G>

Figure 104:
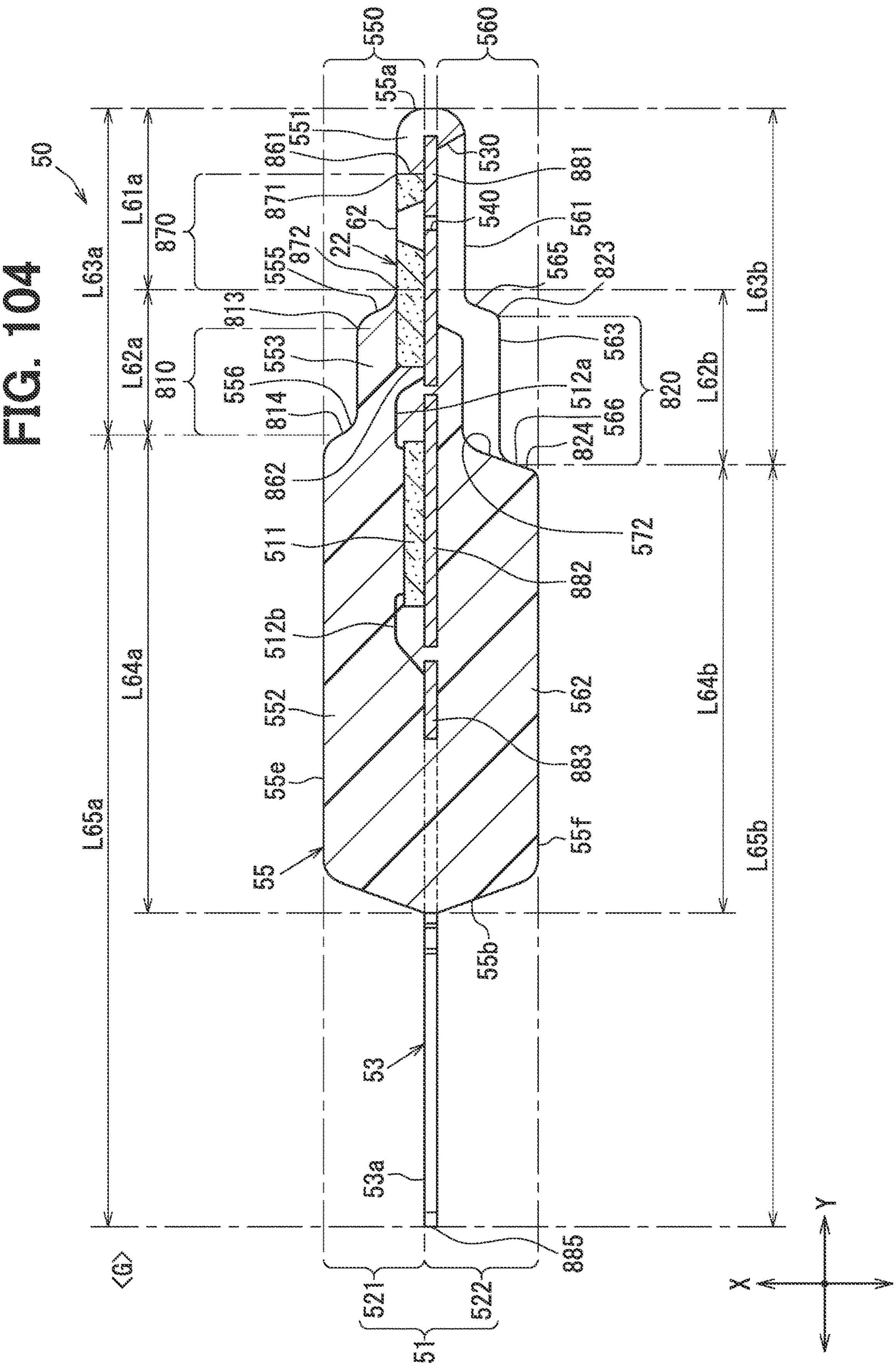
FIG. 104 is a longitudinal cross-sectional view of the sensor SA according to the first embodiment in the modification G1.

As the modification G1, in the first embodiment, if the separation distance L**62*a* between the exposed base end portion 872 and the front fixed base end portion 814 is different from the separation distance L62*b* between the exposed base end portion 872 and the back fixed base end portion 824, the relationship of L62b<L62a may not be established. For example, as shown in FIG. 104, the separation distance L62b between the exposed base end portion 872 and the back fixed base end portion 824 is larger than the separation distance L62a between the exposed base end portion 872 and the front fixed base end portion 814. That is, the relationship of L62b>L62a is established. Also in this configuration, since the separation distances L62a and L62b are different from each other, it is possible to manage the orientation in which the attitude of the sensor SA50 is shifted with respect to the first housing portion 151 in the manufacturing process of the air flow meter 20** as in the first embodiment.

As the modification G2, in the first embodiment, the fixed surfaces 810, 820, 830, and 840 fixed to the first housing portion 151 may be formed of the SA substrate 53 instead of the mold portion 55. For example, in the sensor SA50, a part of the SA substrate front surface 545 of the SA substrate 53 and a part of the SA substrate back surface 546 are exposed from the mold front surface 55e and the mold back surface 55f, and this exposed portion is in contact with the first housing portion 151.

Figure 105:
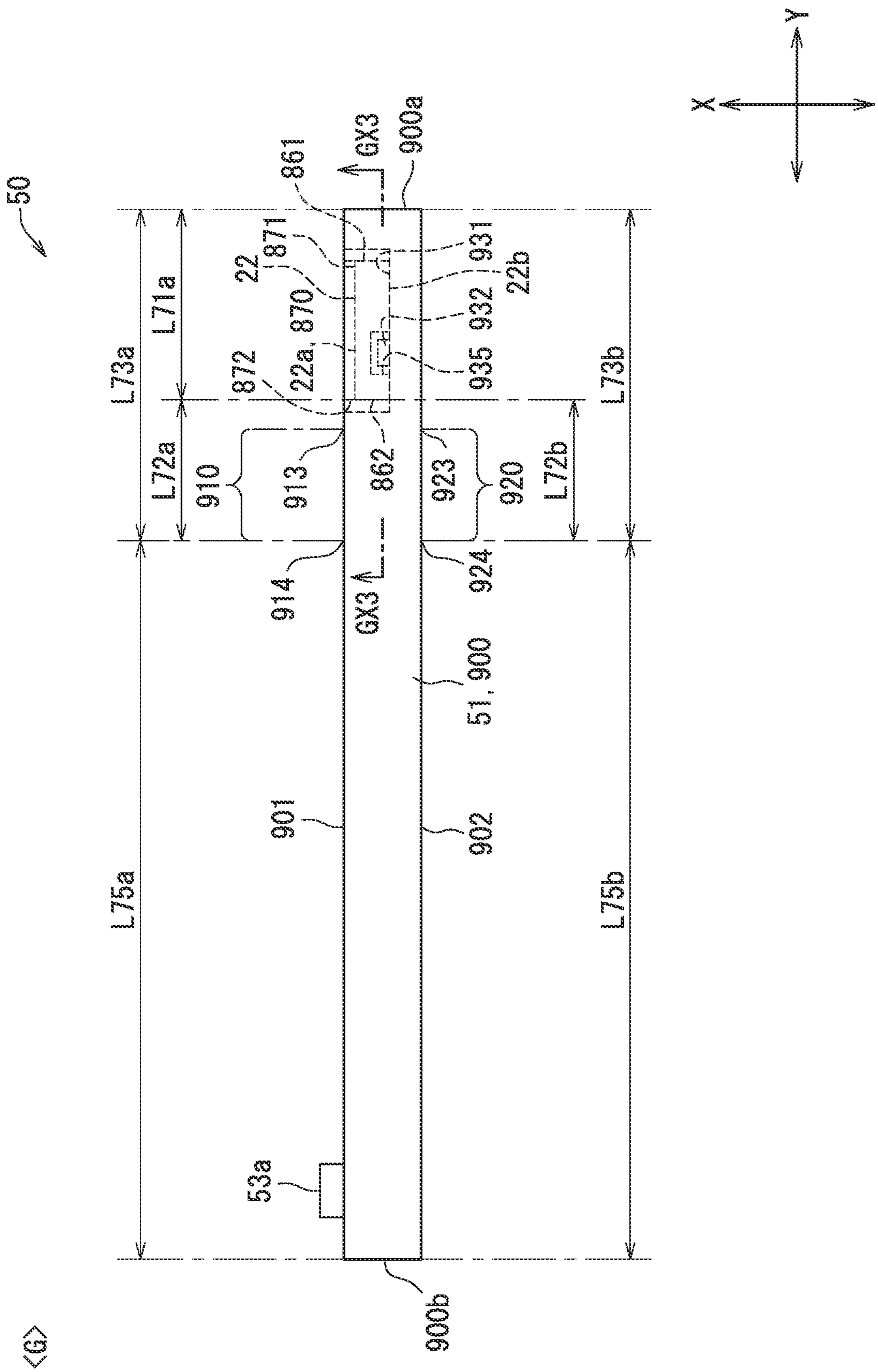
FIG. 105 is a side view of the sensor SA according to the first embodiment in the modification G3.
Figure 106:
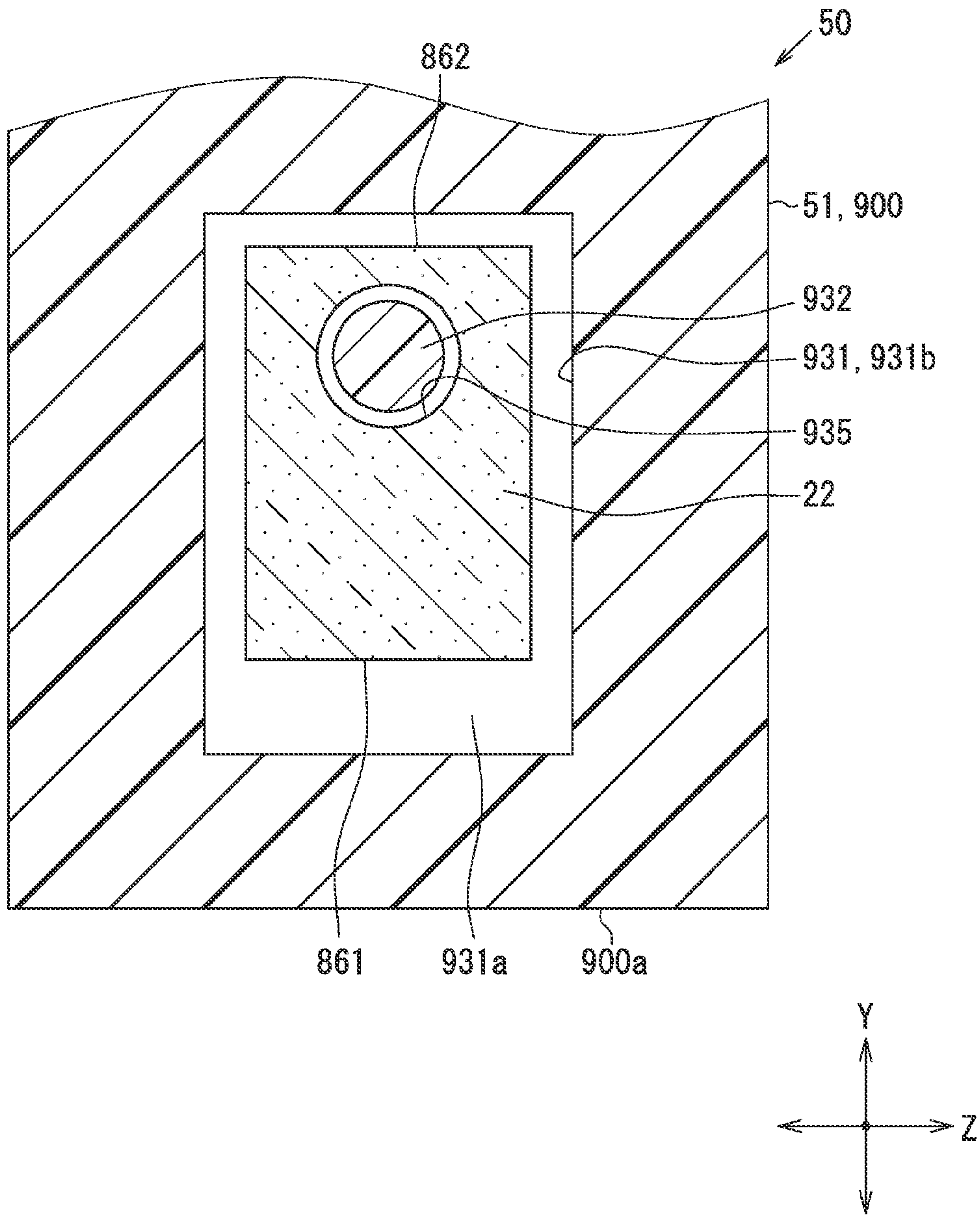
FIG. 106 is a plan view around the flow sensor of the sensor SA according to the first embodiment in the modification G3.

As the modification G3, in the first embodiment, at least a part of the flow sensor 22 may be accommodated in a recess portion provided in a substrate such as the SA substrate 53. For example, as shown in FIGS. 105 and 106, the flow sensor 22 of the sensor SA50 is not covered by the mold portion 55.

In this configuration, the sensor SA50 includes an SA substrate 900, and the sensor support portion 51 is formed by the SA substrate 900. The SA substrate 900 is a circuit substrate formed of a material such as glass epoxy resin. In the sensor SA50, the outer surface of the SA substrate 900 is basically the outer surface of the sensor support portion 51. The SA substrate 900 has an SA substrate front surface 901, which is one plate surface, and an SA substrate back surface 902, which is the other plate surface. In the SA substrate 900, the end portion provided in the measurement flow path 32 is referred to as a substrate tip end portion 900a, and the end portion on a side opposite from the substrate tip end portion 900a in the height direction Y is referred to as a substrate base end portion 900b. In FIGS. 105 and 106, illustration of the flow processing unit 511 and the like is omitted.

The sensor SA50 is fixed to the housing 21 in a state where the SA substrate 900 is in contact with the inner surface of the housing 21. When the portion of the outer surface of the SA substrate 900 in contact with the inner surface of the housing 21 is referred to as a fixed surface, the fixed surface includes a front fixed surface 910, a back fixed surface 920, an upstream fixed surface, and a downstream fixed surface. The front fixed surface 910 is included in the SA substrate front surface 901, and the back fixed surface 920 is included in the SA substrate back surface 902.

The front fixed surface 910 and the back fixed surface 920 are provided at a position overlapping in the width direction X. For example, a front fixed tip end portion 913, which is an end portion of the front fixed surface 910 on the substrate tip end portion 900a side, and a back fixed tip end portion 923, which is an end portion of the back fixed surface 920 on the substrate tip end portion 900a side, are provided side by side in the width direction X. A front fixed base end portion 914, which is an end portion of the front fixed surface 910 on the substrate base end portion 900b side, and a back fixed base end portion 924, which is an end portion of the back fixed surface 920 on the substrate base end portion 900b side, are provided side by side in the width direction X.

In the SA substrate 900, the flow sensor 22 and the lead terminal 53a are provided on the SA substrate front surface 901 side. The lead terminal 53a is provided at a position closer to the substrate base end portion 900b than the substrate tip end portion 900a on the SA substrate front surface 901.

The SA substrate 900 has a sensor accommodation recess portion 931, and at least a part of the flow sensor 22 is accommodated inside the sensor accommodation recess portion 931. The sensor accommodation recess portion 931 is a recess portion provided on the SA substrate front surface 901, and is disposed at a position closer to the substrate tip end portion 900a than the substrate base end portion 900b in the height direction Y. In the width direction X, the depth dimension of the sensor accommodation recess portion 931 is larger than the thickness dimension of the flow sensor 22, and the flow sensor 22 does not protrude to the outside from the opening portion of the sensor accommodation recess portion 931. The sensor bonding portion 67 is provided between the bottom surface of the sensor accommodation recess portion 931 and the flow sensor 22, and the flow sensor 22 is bonded to the bottom surface of the sensor accommodation recess portion 931 by the sensor bonding portion 67.

In the flow sensor 22, the entire sensor front surface 22a is exposed from the SA substrate front surface 901, and the entire sensor front surface 22a is the sensor exposure surface 870. That is, the sensor front surface 22a corresponds to the sensor exposure surface. In the sensor front surface 22a, an end portion on the substrate tip end portion 900a side is the exposed tip end portion 871, and an end portion on the substrate base end portion 900b side is the exposed base end portion 872. In the flow sensor 22, the exposed tip end portion 871 is included in the sensor tip end portion 861, and the exposed base end portion 872 is included in the sensor base end portion 862.

In the sensor SA50, in the height direction Y, a separation distance L72a between the exposed base end portion 872 of the flow sensor 22 and the front fixed base end portion 914 of the SA substrate 900 is smaller than a separation distance L71a between the exposed base end portion 872 and the substrate tip end portion 900a. That is, the relationship of L72a<L71a is established. In the height direction Y, a separation distance L73a between the substrate tip end portion 900a and the front fixed base end portion 914 is smaller than a separation distance L75a between the front fixed base end portion 914 and the substrate base end portion 900b. That is, the relationship of L73a<L75a is established.

Similarly to the front side of the sensor SA50, in the height direction Y, a separation distance L72b between the exposed base end portion 872 of the flow sensor 22 and the back fixed base end portion 924 of the SA substrate 900 is smaller than the separation distance L71a on the front side. That is, the relationship of L72b<L71a is established. In the height direction Y, a separation distance L73b between the substrate tip end portion 900a and the back fixed base end portion 924 is smaller than a separation distance L75b between the back fixed base end portion 924 and the substrate base end portion 900b. That is, the relationship of L73b<L75b is established.

On the front side and the back side of the sensor SA50, the separation distance L72a between the exposed base end portion 872 and the front fixed base end portion 914 is the same as the separation distance L72b between the exposed base end portion 872 and the back fixed base end portion 924. The substrate tip end portion 900*a* corresponds to a support tip end portion, and the substrate base end portion 900*b* corresponds to a support base end portion. The front fixed surface 910 corresponds to a front fixed portion, and the back fixed surface 920 corresponds to a back fixed portion. The SA substrate front surface 901 corresponds to a support front surface, and the SA substrate back surface 902 corresponds to a support back surface.

The SA substrate 900 includes a bottom restriction portion 932, the flow sensor 22 includes a sensor reception portion 935, and the bottom restriction portion 932 and the sensor reception portion 935 are in a state of being caught by each other. In the sensor SA50, positional displacement of the flow sensor 22 with respect to the SA substrate 900 in the directions Y and Z orthogonal to the width direction X is restricted. The bottom restriction portion 932 is a projection portion provided on a bottom surface 931*a* of the sensor accommodation recess portion 931. The sensor reception portion 935 is a recess portion provided in the sensor back surface 22*b* of the flow sensor 22. The bottom restriction portion 932 is in a state of entering the sensor reception portion 935 from the sensor back surface 22*b* side, and restricts movement of the flow sensor 22 in the height direction Y and the depth direction Z inside the sensor accommodation recess portion 931.

In the manufacturing process of the sensor SA50, the bottom restriction portion 932 is inserted into the sensor reception portion 935 to position the flow sensor 22 in the sensor accommodation recess portion 931 in the height direction Y and the depth direction Z. Therefore, the installation position of the flow sensor 22 on the SA substrate 900 is less likely to shift from the design position.

Figure 107:
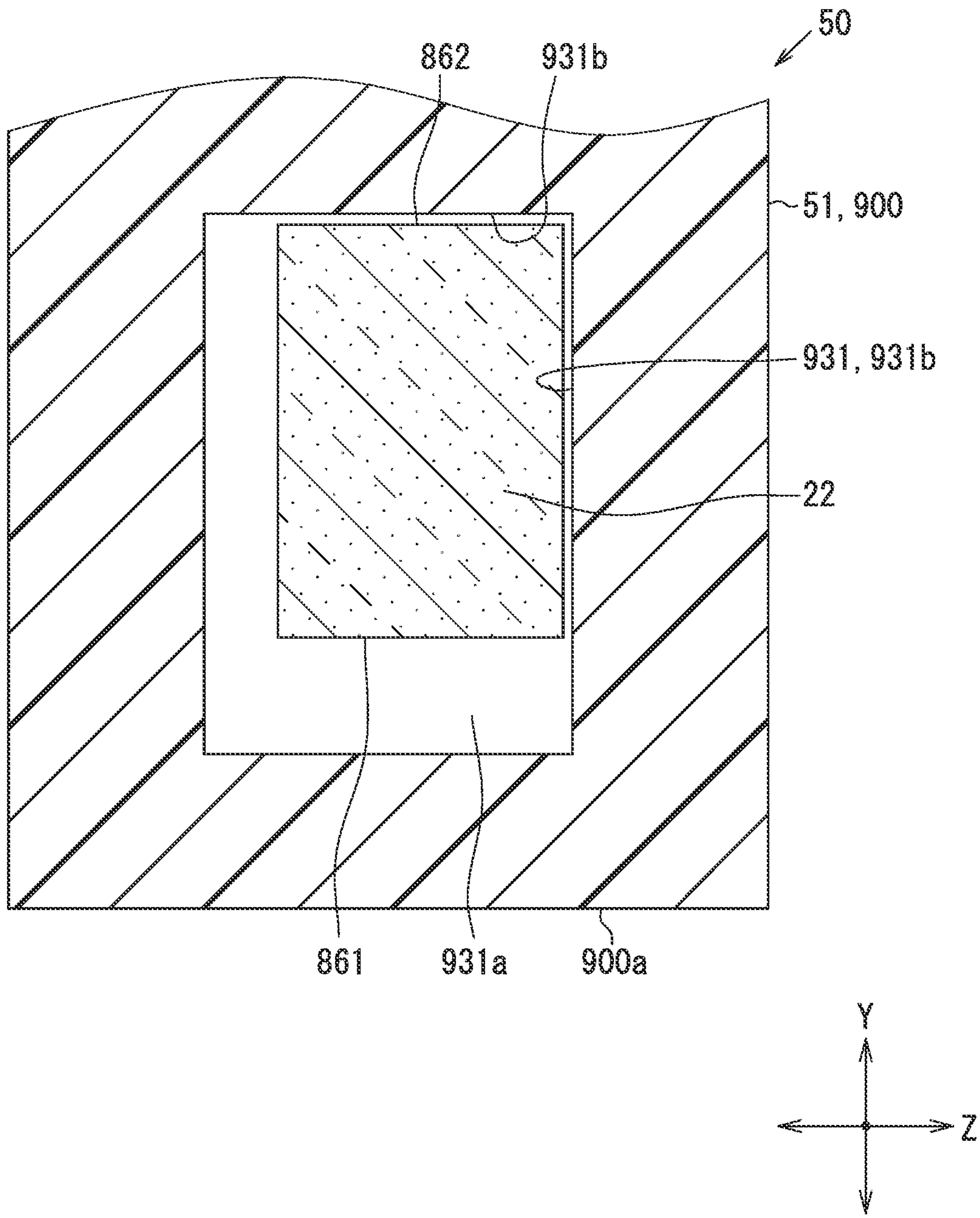
FIG. 107 is a plan view around the flow sensor of the sensor SA according to the modification G3 in the modification G4.

As the modification G4, in the modification G3 described above, the SA substrate 900 may not include the bottom restriction portion 932. For example, as shown in FIG. 107, the flow sensor 22 is provided at a position where an end portion such as the sensor base end portion 862 is in contact with a wall surface 931*b* of the sensor accommodation recess portion 931. In this configuration, even if the SA substrate 900 does not have the bottom restriction portion 932, the wall surface 931*b* restricts positional displacement of the flow sensor 22 in the height direction Y and the depth direction Z inside the sensor accommodation recess portion 931. In the manufacturing process of the sensor SA50, the flow sensor 22 is positioned in the sensor accommodation recess portion 931 by bringing into contact with the wall surface 931*b* the end portions extending in two directions intersecting each other in the outer peripheral edge of the flow sensor 22.

Figure 108:
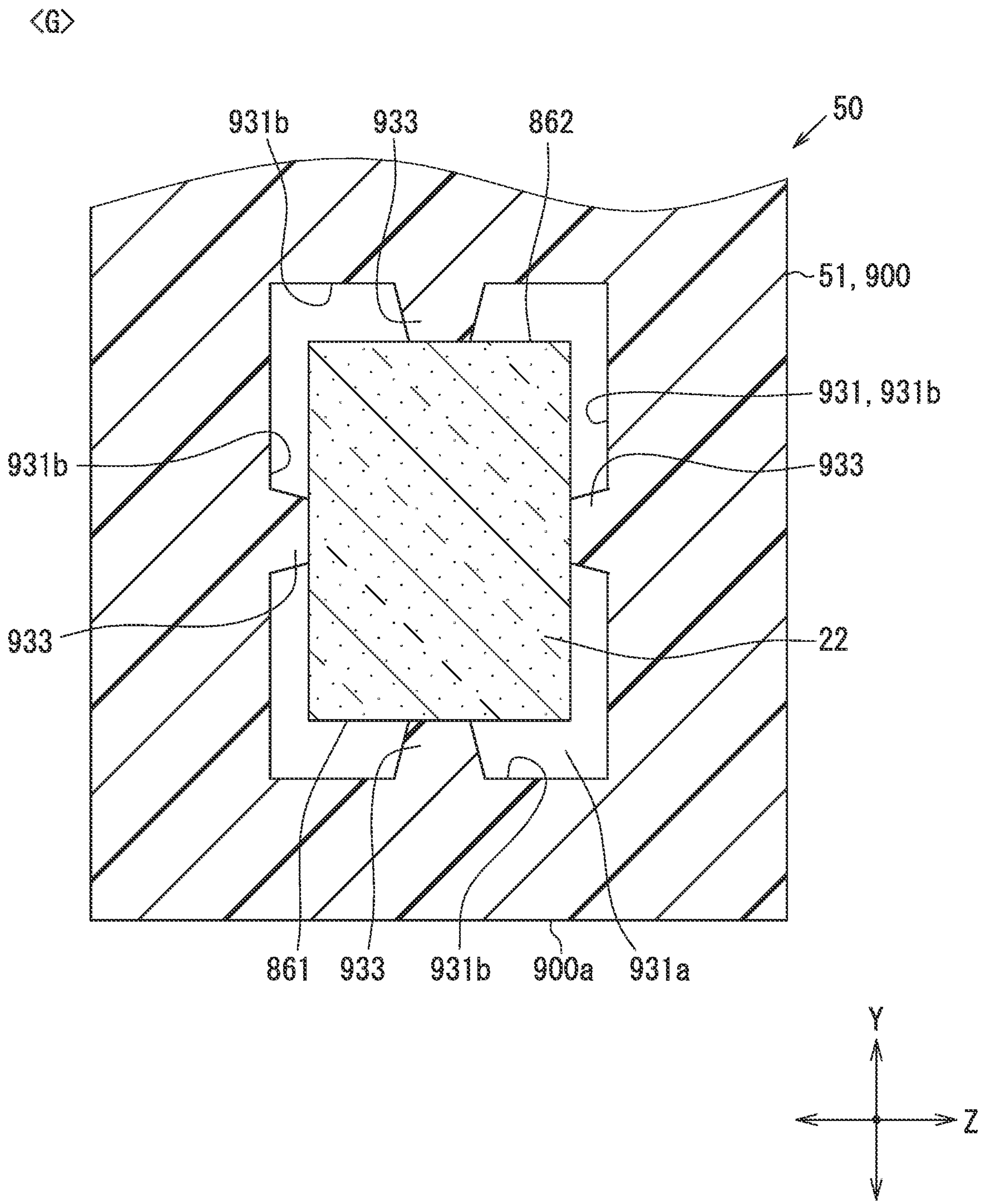
FIG. 108 is a plan view around the flow sensor of the sensor SA according to the modification G3 in the modification G5.

As the modification G5, in the modification G3, as shown in FIG. 108, the SA substrate 900 may include a wall restriction portion 933. The wall restriction portion 933 is a projection portion provided on the wall surface 931*b*, and projects from the wall surface 931*b* toward the inside of the sensor accommodation recess portion 931. For example, in the wall surface 931*b* of the sensor accommodation recess portion 931, the wall restriction portion 933 is provided in each of a portion on the substrate tip end portion 900*a* side, a portion on the substrate base end portion 900*b* side, a portion on the upstream side in the measurement flow path 32, and a portion on the downstream side in the measurement flow path 32. In this configuration, the wall restriction portion 933 restricts displacement of the flow sensor 22 in the height direction Y and the depth direction Z inside the sensor accommodation recess portion 931. Further, in the manufacturing process of the sensor SA50, the flow sensor 22 is positioned in the sensor accommodation recess portion 931 by bringing the flow sensor 22 into contact with the tip end portion of the wall restriction portion 933.

As the modification G6, in the first embodiment, for the mold front side of the sensor SA50, if L62*a*<L61*a*, the relationships of L63*a*≥L64*a*, L63*a*≥L65*a*, L61*a*≥L64*a*, and L61*a*≥L65*a* may be established. Similarly, for the mold back side, if L62*b*<L61*a*, relationships of L63*b*≥L64*b*, L63*b*≥L65*b*, L61*b*≥L64*b*, and L61*b*≥L65*b* may be established.

As the modification G7, in the first embodiment, at least one of the relationship of L62*a*<L61*a* on the mold front side and the relationship of L62*b*<L61*a* on the mold back side may not be established. For example, if the relationship of L62*a*<L61*a* on the mold front side is established, the relationship of L62*b*<L61*a* on the mold back side may not be established.

As the modification G8, in the first embodiment, in the mold portion 55, the length dimensions of the fixed surfaces 810, 820, 830, and 840 in the height direction Y may be the same as or different from one another. For example, as shown in FIG. 104, in the height direction Y, the length dimension of the front fixed surface 810 may be smaller than the length dimension of the back fixed surface 820.

As the modification G9, in the first embodiment, the fixed surfaces 810, 820, 830, and 840 of the sensor SA50 may not be included in each of the front intermediate portion 553, the back intermediate portion 563, and the SA step surface 147, but may be included in at least one of them. The fixed surfaces 810, 820, 830, and 840 may be included in the front base portion 552, the back base portion 562, the front measurement step surface 555, the back measurement step surface 565, the front measurement portion 551, and the back measurement portion 561. That is, in the sensor SA50, at least a part of the sensor support portion 51 is only required to be fixed in contact with the inner surface of the first housing portion 151.

As the modification G10, in the first embodiment, at least one of the fixed surfaces 810, 820, 830, and 840 may be provided at a position separated from the flow sensor 22 toward the mold base end side in the height direction Y. For example, in the height direction Y, the fixed surfaces 810, 820, 830, and 840 are provided between the flow sensor 22 and the flow processing unit 511.

As the modification G11, the shape and size of the ribs 801 to 803 in the first housing portion 151 are not limited to those of the configuration of the first embodiment. For example, the ribs 801 to 803 may have the same length as or different lengths from one another. The ribs 801 to 803 may extend to the mold tip end side relative to the end portion on the mold base end side of the front measurement step surface 555 or the back measurement step surface 565, or may be provided at a position separated from this end portion toward the mold base end side. The ribs 801 to 803 may extend in a direction inclined with respect to the height direction Y.

In other words, in the present modification, the mode regarding the shape and size of the intermediate contact surfaces 811, 821, 831, and 841 of the sensor SA50 are not limited to those of the configuration of the first embodiment. For example, the intermediate contact surfaces 811, 821, 831, and 841 of the fixed surfaces 810, 820, 830, and 840 may have the same length as one another or may have different lengths from one another. The intermediate contact surfaces 811, 821, 831, and 841 may be provided at positions separated from the end portion of the mold base end side on the front measurement step surface 555 or the back measurement step surface 565 toward the mold base end side. The intermediate contact surfaces 811, 821, 831, and 841 may extend in a direction inclined with respect to the height direction Y.

As the modification G12, the mode regarding the installation position of the ribs 801 to 803 in the first housing portion 151 is not limited to that of the configuration of the first embodiment. For example, one front rib 801, one back rib 802, and one downstream rib 803 may be provided, or three or more of any of them may be provided. A rib may be provided on the upstream measurement wall surface 805 in the first housing portion 151. In the first housing portion 151, at least one of the front measurement wall surface 103, the back measurement wall surface 104, the upstream measurement wall surface 805, and the downstream measurement wall surface 806 may be provided with a rib, and each may not be provided with a rib. Examples of the configuration in which the ribs are not provided on all the wall surfaces 103, 104, 805 and 806 include a configuration in which the front intermediate portion 553 and the back intermediate portion 563 of the sensor SA50 are not in contact with the inner surface of the first housing portion 151. The examples include a configuration in which the entire outer surface of the intermediate portions 553 and 563 is in contact with the inner surface of the first housing portion 151.

In other words, in the present modification, the mode regarding the installation position of the intermediate contact surfaces 811, 821, 831, and 841 of the sensor SA50 is not limited to that of the configuration of the first embodiment. For example, one for each of the intermediate contact surfaces 811, 821, 831, and 841 of the fixed surfaces 810, 820, 830, and 840 may be provided, or three or more of at least one of the intermediate contact surfaces may be provided. The fixed surfaces 810, 820, 830, and 840 may not have the intermediate contact surfaces 811, 821, 831, and 841.

As the modification G13, in the first embodiment, the housing 21 may be formed of a member manufactured by one time of resin molding, or may be formed of a member manufactured by three or more times of resin molding. For example, in the housing 21, the portion provided in the gap between the first housing portion 151 and the sensor SA50 and the portion including the flange portion 27 and the connector portion 28 may be molded with resin with different configurations. When the portion that fills the gap between the first housing portion 151 and the sensor SA50 is the second housing portion, the portion including the flange portion 27 and the connector portion 28 can be referred to as the third housing portion. In the housing 21, the portion that fills the gap between the first housing portion 151 and the sensor SA50 may be formed by potting instead of molding.

As the modification G14, in the first embodiment, the conductive layer 66*b* may be formed of a material different from platinum as long as the gauge factor is lower than that of the conductive layer formed of a material mainly composed of silicon. For example, the conductive layer 66*b* may be formed of molybdenum. That is, the main component of the material forming the conductive layer 66*b* may be molybdenum. The conductive layer 66*b* may be formed of silicon. That is, the main component of the material forming the conductive layer 66*b* may be silicon.

As the modification G15, in the first embodiment, the sensor bonding portion 67 may be formed of an adhesive different from the silicon adhesive as long as the sensor bonding portion is more easily deformed than a bonding portion formed of an acrylic adhesive or an epoxy adhesive. For example, the sensor bonding portion 67 may be formed of a urethane adhesive. The urethane adhesive is an adhesive containing a urethane resin as a main component. The sensor bonding portion 67 may be formed of an acrylic adhesive or an epoxy adhesive.

As the modification G16, in the first embodiment, the sensor bonding portion 67 may not necessarily be provided between the SA substrate 53 and the flow sensor 22. For example, the sensor bonding portion 67 is provided at the inside corner portion formed by the SA substrate front surface 545 of the SA substrate 53 and the end surface of the flow sensor 22. Also in this configuration, if the sensor bonding portion 67 extends along the outer peripheral edge of the flow sensor 22 and is bonded to the SA substrate front surface 545 and the end surface of the flow sensor 22, the SA substrate 53 and the flow sensor 22 can be bonded by the sensor bonding portion 67. Also in this configuration, since the sensor bonding portion 67 is easily deformed with the deformation of the SA substrate 53, the deformation of the flow sensor 22 with the deformation of the SA substrate 53 can be suppressed by the sensor bonding portion 67.

As the modification G17, in the first embodiment, in the flow sensor 22, at least the membrane portion 62 is only required to be provided in the measurement flow path 32. On the sensor front surface 22*a* of the flow sensor 22, at least a portion including the outer surface of the membrane portion 62 is only required to be exposed to the measurement flow path 32.

As the modification G18, in the first embodiment, the bonding wire 512*a* may electrically connect the flow sensor 22 and the flow processing unit 511 with the SA substrate 53 interposed therebetween. For example, as shown in FIG. 104, the bonding wire 512*a* indirectly connects the flow sensor 22 and the flow processing unit 511 with the sensor mounting portion 881 interposed therebetween. In this configuration, one end of the bonding wire 512*a* is connected to the sensor mounting portion 881, and the other end is directly connected to the flow processing unit 511.

[Features of Configuration Group A>

The configuration disclosed in the present description includes the features of the configuration group A as follows.

[Feature A1]

A physical quantity measurement device (20) configured to measure a physical quantity of a fluid, the physical quantity measurement device including:

a measurement flow path (32) that is configured to cause fluid to flow therethrough;

a housing (21) that forms the measurement flow path; and a detection unit (50) that includes a physical quantity sensor (22) that detects a physical quantity of a fluid in the measurement flow path, and a plate-shaped sensor support portion (51) that supports the physical quantity sensor, the detection unit (50) that is attached to a housing such that a support tip end portion (55*a*), which is a tip end portion of the sensor support, and the physical quantity sensor are accommodated in the measurement flow path, wherein the sensor support portion includes a support front surface (55*e*), which is one plate surface of the sensor support portion, and on which the physical quantity sensor is provided, and a support back surface (55*f*), which is opposite from the support front surface, the housing includes, as formation surfaces that form the measurement flow path, a floor surface (101) that faces a support tip end portion, a front wall surface (103) that faces the support front surface, and a back wall surface (104) that is provided on a side opposite from the front wall surface with a floor surface interposed between the front wall surface and the back wall surface, and faces the support back surface, and a front distance (L1), which is a separation distance between the front wall surface and the physical quantity sensor in a front and back direction (X) in which the front wall surface and the back wall surface are arranged, is larger than a floor distance (L3), which is a separation distance between the floor surface and the support tip end portion in a height direction (Y) orthogonal to the front and back direction and in which the floor surface and the support tip end portion are arranged.

[Feature A2]

The physical quantity measurement device according to feature A1, wherein the front distance is smaller than a back distance (L2), which is a separation distance between the back wall surface and the support back surface in the front and back direction.

[Feature A3]

The physical quantity measurement device according to feature A1 or A2, wherein the housing includes a front narrowing unit (111) that forms the front wall surface, bulges toward the back wall surface in the front and back direction, and narrows the measurement flow path such that a measurement width dimension (W1), which is a separation distance between the front wall surface and the back wall surface in the front and back direction, gradually decreases from an upstream side toward the physical quantity sensor, and the front distance is a separation distance between the front narrowing unit and the physical quantity sensor in the front and back direction.

[Feature A4]

The physical quantity measurement device according to feature A3, wherein the measurement flow path includes a measurement entrance (35), which is an upstream end portion of the measurement flow path, and through which a fluid flows in, and a measurement exit (36), which is a downstream end portion of the measurement flow path, and through which a fluid flows out, a center line (CL4) of the measurement flow path passes through a center (CO2) of the measurement entrance and a center (CO3) of the measurement exit, and extends along the measurement flow path, the front narrowing portion includes a front top portion (111*a*), which is a top portion where a separation distance (W2) between the front narrowing portion and the center line of the measurement flow path is the smallest, the front narrowing portion provided at a position where the front top portion and the physical quantity sensor face each other in the front and back direction, and the front distance is a separation distance between the front top portion and the physical quantity sensor.

[Feature A5]

The physical quantity measurement device according to feature A3 or A4, wherein the housing includes a back narrowing unit (112) that forms the back wall surface, bulges toward the front wall surface in the front and back direction, and narrows the measurement flow path such that the measurement width dimension gradually decreases from the upstream side toward the physical quantity sensor.

[Feature A6]

The physical quantity measurement device according to any one of features A1 to A5, wherein the measurement flow path includes a front region (122), which is a region between the front wall surface and the support front surface in the front and back direction, the front region includes a floor side region (122*a*) between the physical quantity sensor and the floor surface in the height direction, and a ceiling side region (122*b*) on a side opposite from the floor side region in the height direction with the physical quantity sensor interposed between the floor side region and the ceiling side region, a cross-sectional area (S1) of a portion where the physical quantity sensor is provided in the measurement flow path includes a floor side area (S2), which is an area of the floor side region, and a ceiling side area (S3), which is an area of the ceiling side region, and the ceiling side area is smaller than the floor side area.

[Feature A7]

The physical quantity measurement device according to feature A6, wherein the measurement flow path is bent such that the floor surface is on an inner peripheral side, and the floor side region is provided on an inner peripheral side relative to the ceiling side region in the front region.

[Feature A8]

The physical quantity measurement device according to any one of features A1 to A7, wherein the physical quantity sensor includes a heater unit (71) that generates heat, and a temperature detection units (72, 73) that are arranged along the heater unit along one surface (65*a*) of the physical quantity sensor and detect temperature, and a front distance is a separation distance between the front wall surface and the heater unit.

[Feature A9]

The physical quantity measurement device according to any one of features A1 to A7, wherein the sensor support portion includes a sensor substrate (65), which is a substrate on which the physical quantity sensor is mounted, and a protection resin portion (55), which is formed of a resin material and protects the sensor substrate and the physical quantity sensor, and the support front surface and the support back surface are formed of the protection resin portion.

[Features of Configuration Group B>

The configuration disclosed in the present description includes the features of the configuration group B as follows.

[Feature B1]

A physical quantity measurement device (20, 200) configured to measure a physical quantity of a fluid, the physical quantity measurement device including:

a measurement flow path (32, 212) through which a fluid flows;

a detection unit (50, 220) that includes a physical quantity sensor (22, 202) that is provided in the measurement flow path and detects a physical quantity of a fluid, and a plate-shaped sensor support portion (51, 221) that supports the physical quantity sensor; and a housing (21, 201) that forms the measurement flow path and an accommodation region (150, 290) that accommodates a part of the detection unit, wherein an inner surface of the housing includes a housing intersection surface (137, 277) that intersects an arrangement direction (Y) in which the measurement flow path and the accommodation region are arranged, a housing flow path surface (135, 275) that extends from the housing intersection surface toward a measurement flow path side, and a housing accommodation surface (136, 276) that extends from the housing intersection surface toward an accommodation region side, and the housing includes a housing partition portion (131, 271) that is provided on at least one of the housing intersection surface, the housing flow path surface, and the housing accommodation surface, projects toward the detection unit, and partitions the measurement flow path and the accommodation region between the housing and the detection unit in a state of being in contact with the detection unit.

[Feature B2]

The physical quantity measurement device according to feature B1, wherein the housing partition portion annularly surrounds the detection unit.

[Feature B3]

The physical quantity measurement device according to feature B1 or B2, wherein the housing partition portion is provided at a position closer to the housing flow path surface than the housing accommodation surface in the housing intersection surface.

[Feature B4]

The physical quantity measurement device according to any one of features B1 to B3, wherein an accommodation side angle (θ12), which faces the accommodation region, is larger than a flow path side angle (θ11), which faces the measurement flow path, in a portion where a center line (CL11) of the housing partition portion provided on the housing intersection surface and the housing intersection surface intersect each other.

[Feature B5]

The physical quantity measurement device according to any one of features B1 to B4, wherein the detection unit includes a unit recess portion (161), which is a recess portion provided in the detection unit, and the housing partition portion enters the unit recess portion and is in contact with an inner surface of the unit recess portion.

[Feature B6]

The physical quantity measurement device according to any one of features B1 to B5, wherein an outer surface of the detection unit includes, as outer surfaces of the detection unit, a unit intersection surface (147, 287) that intersects the arrangement direction (Y) in which the measurement flow path and the accommodation region are arranged, a unit flow path surface (145, 285) that extends from the unit intersection surface toward a measurement flow path side, and a unit accommodation surface (146, 286) that extends from the unit intersection surface toward an accommodation region side, and the housing partition portion is in contact with at least one of the unit intersection surface, the unit flow path surface, and the unit accommodation surface.

[Feature B7]

The physical quantity measurement device according to feature B6, wherein the housing partition portion is provided on the housing intersection surface and is in contact with the unit intersection surface.

[Feature B8]

A physical quantity measurement device (20, 200) configured to measure a physical quantity of a fluid, the physical quantity measurement device including:

a measurement flow path (32, 212) through which a fluid flows;

a detection unit (50, 220) that includes a physical quantity sensor (22, 202) that is provided in the measurement flow path and detects a physical quantity of a fluid, and a plate-shaped sensor support portion (51, 221) that supports the physical quantity sensor; and a housing (21, 201) that forms the measurement flow path and an accommodation region (150, 290) that accommodates a part of the detection unit, wherein an outer surface of the detection unit includes a unit intersection surface (147, 287) that intersects the arrangement direction (Y) in which the measurement flow path and the accommodation region are arranged, a unit flow path surface (145, 285) that extends from the unit intersection surface toward a measurement flow path side, and a unit accommodation surface (146, 286) that extends from the unit intersection surface toward an accommodation region side, and the detection unit includes a unit partition portion (162, 302) that is provided on at least one of a unit intersection surface, a unit flow path surface, and a unit accommodation surface, projects toward the housing, and partitions the measurement flow path and the accommodation region between the housing and the detection unit in a state of being in contact with the housing.

[Feature B9]

The physical quantity measurement device according to feature B8, wherein the unit partition portion annularly surrounds the detection unit.

[Feature B07]

The physical quantity measurement device according to feature B8 or B9, wherein the unit partition portion is provided at a position closer to the unit flow path surface than the unit accommodation surface in the unit intersection surface.

[Feature B08]

The physical quantity measurement device according to any one of features B8 to B10, wherein an accommodation side angle (θ14), which faces the accommodation region, is larger than a flow path side angle (θ13), which faces the measurement flow path, in a portion where a center line (CL13) of the unit partition portion provided on the unit intersection surface and the unit intersection surface intersect each other.

[Feature B09]

The physical quantity measurement device according to any one of features B8 to B11, wherein the housing includes a housing recess portion (163), which is a recess portion provided in the housing, and the unit partition portion enters the housing recess portion and is in contact with an inner surface of the housing recess portion.

[Feature B10]

The physical quantity measurement device according to any one of features B8 to B13, wherein an inner surface of the housing includes a housing intersection surface (137, 277) that intersects the arrangement direction (Y) in which the measurement flow path and the accommodation region are arranged, a housing flow path surface (135, 275) that extends from the housing intersection surface toward a measurement flow path side, and a housing accommodation surface (136, 276) that extends from the housing intersection surface toward an accommodation region side, and the unit partition portion is in contact with at least one of the housing intersection surface, the housing flow path surface, and the housing accommodation surface.

[Feature B11]

The physical quantity measurement device according to feature B14, wherein the unit partition portion is provided on the unit intersection surface and is in contact with the housing intersection surface.

[Features of Configuration Group C>

The configuration disclosed in the present description includes the features of the configuration group C as follows.

[Feature C1]

A physical quantity measurement device (20) configured to measure a physical quantity of a fluid, the physical quantity measurement device including:

a passage flow path (31) that includes a passage entrance (33) through which a fluid flows in and a passage exit (34) from which a fluid flowing in from the passage entrance flows out;

a measurement flow path (32) that is branched from the passage flow path and for measuring a physical quantity of a fluid, the measurement flow path (32) including a measurement entrance (35) that is provided between the passage entrance and the passage exit and through which a fluid flows in from the passage flow path, and a measurement exit (36) through which a fluid flowing in through the measurement entrance flows out;

a physical quantity sensor (22) that is provided in a measurement flow path and configured to detect a physical quantity of the fluid; and a housing (21) that forms the passage flow path and the measurement flow path, and an inner surface of the housing includes an entrance ceiling surface (342) that forms an entrance passage path (331) stretched between the passage entrance and the measurement entrance of the passage flow path, the entrance ceiling surface (342) being stretched between the passage entrance and the measurement entrance in a direction (Z) in which the passage entrance and the passage exit are arranged, and an entrance floor surface (346) that forms the entrance passage path and faces the entrance ceiling surface with the entrance passage path interposed between the entrance floor surface and the entrance ceiling surface, and the entrance ceiling surface includes a ceiling inclined surface (342, 342*a*) that is inclined with respect to the entrance floor surface such that a separation distance (H21) from the entrance floor surface gradually decreases from the passage entrance toward the passage exit, the ceiling inclined surface (342, 342*a*) extending from the passage entrance toward the measurement entrance.

[Feature C2]

The physical quantity measurement device according to feature C1, wherein an inclination angle (θ21) of the ceiling inclined surface with respect to the entrance floor surface is equal to or greater than 10 degrees.

[Feature C3]

The physical quantity measurement device according to feature C1 or C2, wherein the ceiling inclined surface is inclined with respect to the entrance floor surface so as to face a passage entrance side.

[Feature C4]

The physical quantity measurement device according to any one of features C1 to C3, wherein the ceiling inclined surface is inclined so as to face a passage entrance side with respect to a main flow direction (Z), which is a direction in which, of a fluid, a main flow that mainly flows into the passage entrance, proceeds.

[Feature C5]

The physical quantity measurement device according to feature C4, wherein an inclination angle (θ22) of the ceiling inclined surface with respect to the main flow direction is equal to or greater than 10 degrees.

[Feature C6]

The physical quantity measurement device according to feature C4 or C5, wherein the housing includes an angle setting surface (27*a*) that sets an attachment angle of the housing with respect to an attachment target (14) to which the housing is attached, and the main flow direction is a direction in which the angle setting surface extends.

[Feature C7]

The physical quantity measurement device according to any one of features C1 to C6, wherein a cross-sectional area (S21) of the entrance passage path gradually decreases from the passage entrance toward the measurement entrance.

[Feature C8]

The physical quantity measurement device according to any one of features C1 to C7, wherein an inclination angle (θ25) of a center line (CL23) of the measurement flow path at the measurement entrance with respect to an entrance passage line (CL24), which is a center line of the entrance passage path, is equal to or greater than 90 degrees.

[Feature C9]

The physical quantity measurement device according to any one of features C1 to C8, wherein a branch angle (θ26) of the measurement flow path with respect to the passage flow path is equal to or less than 60 degrees.

[Features of Configuration Group D>

The configuration disclosed in the present description includes the features of the configuration group D as follows.

[Feature D1]

A physical quantity measurement device (20) configured to measure a physical quantity of a fluid, the physical quantity measurement device including:

a measurement flow path (32) including a measurement entrance (35) through which a fluid flows in and a measurement exit (36) through which a fluid flowing in through the measurement entrance flows out;

a physical quantity sensor (22) that is provided in a measurement flow path and configured to detect a physical quantity of the fluid; and a housing (21) that forms the measurement flow path, wherein the measurement flow path includes a sensor path (405) that is provided with the physical quantity sensor, an upstream bent path (406) that is provided between the sensor path and the measurement entrance in the measurement flow path and is bent so as to extend from the sensor path toward the measurement entrance in the housing, and a downstream bent path (407) that is provided between the sensor path and the measurement exit in the measurement flow path and is bent so as to extend from the sensor path toward the measurement exit in the housing, an inner surface of the housing includes an upstream outer bent surface (411) that forms the upstream bent path from an outside of a bend, and a downstream outer bent surface (421) that forms the downstream bent path from an outside of a bend, and a recess degree of the downstream outer bent surface toward a side on which the measurement flow path expands is larger than a recess degree of the upstream outer bent surface toward a side on which the measurement flow path expands.

[Feature D2]

The physical quantity measurement device according to feature D1, wherein the upstream outer bent surface includes an upstream outer curved surface (411) that is curved along the upstream bent path, the downstream outer bent surface includes a downstream outer curved surface (461) that is curved along the downstream bent path, and a curvature radius (R34) of the downstream outer curved surface is smaller than a curvature radius (R33) of the upstream outer curved surface, so that the recess degree of the downstream outer bent surface is larger than the recess degree of the upstream outer bent surface.

[Feature D3]

The physical quantity measurement device according to feature D1, wherein the upstream outer bent surface includes the upstream outer curved surface (411) that is curved along the upstream bent path, and the downstream outer bent surface forms an inside corner portion (424) that is recessed so as to enter inward in the downstream bent path such that a recess degree of the downstream outer bent surface becomes larger than a recess degree of the upstream outer bent surface.

[Feature D4]

The physical quantity measurement device according to any one of features D1 to D3, wherein an inner surface of the housing includes an upstream inner bent surface (415) that forms the upstream bent path from an inside of a bend, and a downstream inner bent surface (425) that forms the downstream bent path from an inside of a bend, and in a direction orthogonal to a center line (CL4) of the measurement flow path, a separation distance (L35*b*) of a portion where the downstream outer bent surface and a downstream inner bent surface are farthest from each other is larger than a separation distance (L35*a*) of a portion where the upstream outer bent surface and an upstream inner bent surface are farthest from each other.

[Feature D5]

The physical quantity measurement device according to feature D4, wherein a bulging degree of the downstream inner bent surface toward a side where the measurement flow path is expanded is smaller than a bulging degree of the upstream inner bent surface toward a side where the measurement flow path is expanded.

[Feature D6]

The physical quantity measurement device according to feature D4 or D5, wherein the upstream inner bent surface includes an upstream inner curved surface (415) that is curved along the upstream bent path, the downstream inner bent surface includes a downstream inner curved surface (425) that is curved along the downstream bent path, and a curvature radius (R32) of the downstream inner curved surface is larger than a curvature radius (R31) of the upstream inner curved surface, so that the bulging degree of the downstream inner bent surface is smaller than the bulging degree of the upstream inner bent surface.

[Feature D7]

The physical quantity measurement device according to any one of features D1 to D6, wherein the sensor path extends in an arrangement direction (Z) of the upstream bent path and a downstream bent path.

[Feature D8]

The physical quantity measurement device according to any one of features

D1 to D7, wherein the housing includes a measurement narrowing portion (111, 112) that gradually reduces and narrows the measurement flow path from a measurement entrance side toward the physical quantity sensor, and gradually expands the measurement flow path from a physical quantity sensor side toward the measurement exit, and the measurement narrowing portion is provided between an upstream end portion of the upstream bent path and a downstream end portion of the downstream bent path in the measurement flow path.

[Feature D9]

The physical quantity measurement device according to feature D8, wherein the measurement narrowing portion includes a measurement narrowing surface (431, 441) that forms an inner surface of the housing and gradually reduces and narrows the measurement flow path from a measurement entrance side toward the physical quantity sensor, and a measurement expansion surface (432, 442) that gradually expands the measurement flow path from a physical quantity sensor side toward the measurement exit, and a length dimension (W33*a*, W33*b*) of the measurement expansion surface is larger than a length dimension (W32*a*, W32*b*) of the measurement narrowing surface in an arrangement direction (Z) of the upstream bent path and a downstream bent path.

[Feature D07]

The physical quantity measurement device according to feature D8 or D9, wherein the measurement expansion surface extends straight from the physical quantity sensor side toward the measurement exit.

[Feature D08]

The physical quantity measurement device according to any one of features D8 to D10, wherein a separation distance (W34*a*, W35*a*) between the downstream outer bent surface and the measurement narrowing portion on an arrangement line is larger than a separation distance (W34*b*, W35*b*) between the upstream outer bent surface and the measurement narrowing portion in the arrangement direction (Z) of the upstream bent path and the downstream bent path.

[Feature D09]

The physical quantity measurement device according to any one of features D8 to D11, wherein an inner surface of the housing includes a pair of measurement wall surfaces (103, 104) that form the measurement flow path and face each other with the upstream outer bent surface and the downstream outer bent surface interposed between the pair of measurement wall surfaces, and the measurement narrowing portion is provided on at least one of the pair of measurement wall surfaces.

[Feature D10]

The physical quantity measurement device according to any one of features D1 to D12, wherein an inner surface of the housing includes a pair of wall surfaces (103, 104) that form the measurement flow path and face each other with the upstream outer bent surface and the downstream outer bent surface interposed between the pair of wall surfaces, and the measurement exit is provided on at least one of the pair of wall surfaces in an orientation where the measurement flow path is opened in a direction (X) where the pair of wall surfaces are arranged.

[Feature Da1]

A physical quantity measurement device (20) configured to measure a physical quantity of a fluid, the physical quantity measurement device including:

a measurement flow path (32) including a measurement entrance (35) through which a fluid flows in and a measurement exit (36) through which a fluid flowing in through the measurement entrance flows out;

a physical quantity sensor (22) that is provided in a measurement flow path and configured to detect a physical quantity of the fluid; and a housing (21) that forms the measurement flow path, wherein the measurement flow path includes a sensor path (405) that is provided with the physical quantity sensor, an upstream bent path (406) that is provided between the sensor path and the measurement entrance in the measurement flow path and is bent so as to extend from the sensor path toward the measurement entrance in the housing, and a downstream bent path (407) that is provided between the sensor path and the measurement exit in the measurement flow path and is bent so as to extend from the sensor path toward the measurement exit in the housing, an inner surface of the housing includes an upstream outer bent surface (411) that forms the upstream bent path from an outside of a bend, and a downstream outer bent surface (421) that forms the downstream bent path from an outside of a bend, and on an assumption of an arrangement line (CL31) as an imaginary straight line passing through the physical quantity sensor and extending in an arrangement direction (Z) of the upstream bent path and the downstream bent path, a separation distance (L31*b*) between the downstream outer bent surface and the physical quantity sensor on the arrangement line is larger than a separation distance (L31*a*) between the upstream outer bent surface and the physical quantity sensor on the arrangement line.

[Feature Da2]

The physical quantity measurement device according to feature Da1, wherein the sensor path extends along the arrangement line.

[Feature Da3]

The physical quantity measurement device according to feature Da1 or Da2, wherein, in the sensor path, a separation distance (L34*b*) between the physical quantity sensor and the downstream bent path is larger than a separation distance (L34*a*) between the physical quantity sensor and the upstream bent path.

[Feature Da4]

The physical quantity measurement device according to any one of features Da1 to Da3, comprising:

a sensor support portion (51) that supports the physical quantity sensor in the measurement flow path, wherein a separation distance (L32*b*) between the downstream outer bent surface and the sensor support portion on the arrangement line is larger than a separation distance (L32*a*) between the upstream outer bent surface and the sensor support portion on the arrangement line.

[Feature Da5]

The physical quantity measurement device according to any one of features Da1 to Da4, wherein the downstream outer bent surface includes a downstream outer longitudinal surface (423) that is provided at a position through which the arrangement line passes and extends straight from a downstream end portion of the downstream bent path toward an upstream side.

[Feature Da6]

The physical quantity measurement device according to any one of features Da1 to Da5, wherein an inner surface of the housing includes a downstream inner bent surface (425) that forms the downstream bent path from an inside of a bend, and the downstream inner bent surface includes a downstream inner curved surface (425) that is curved along the downstream bent path.

[Feature Da7]

The physical quantity measurement device according to any one of features Da1 to Da6, wherein the housing includes a measurement narrowing portion (111, 112) that gradually reduces and narrows the measurement flow path from a measurement entrance side toward the physical quantity sensor, and gradually expands the measurement flow path from a physical quantity sensor side toward the measurement exit, and the measurement narrowing portion is provided between an upstream end portion of the upstream bent path and a downstream end portion of the downstream bent path in the measurement flow path.

[Feature Da8]

The physical quantity measurement device according to feature Da7, wherein the measurement narrowing portion includes a measurement narrowing surface (431, 441) that forms an inner surface of the housing and gradually reduces and narrows the measurement flow path from a measurement entrance side toward the physical quantity sensor, and a measurement expansion surface (432, 442) that gradually expands the measurement flow path from a physical quantity sensor side toward the measurement exit, and a length dimension (W33*a*, W33*b*) of the measurement expansion surface is larger than a length dimension (W32*a*, W32*b*) of the measurement narrowing surface in the arrangement direction arrangement direction.

[Feature Da9]

The physical quantity measurement device according to feature Da8, wherein the measurement expansion surface extends straight from the physical quantity sensor side toward the measurement exit.

[Feature Da07]

The physical quantity measurement device according to any one of features Da7 to Da9, wherein a separation distance (W34*a*, W35*a*) between the downstream outer bent surface and the measurement narrowing portion on the arrangement line is larger than a separation distance (W34*b*, W35*b*) between the upstream outer bent surface and the measurement narrowing portion on the arrangement line.

[Feature Da08]

The physical quantity measurement device according to any one of features Da7 to Da10, wherein an inner surface of the housing includes a pair of measurement wall surfaces (103, 104) that form the measurement flow path and face each other with the upstream outer bent surface and the downstream outer bent surface interposed between the pair of measurement wall surfaces, and the measurement narrowing portion is provided on at least one of the pair of measurement wall surfaces.

[Feature Da09]

The physical quantity measurement device according to any one of features Da1 to Da11, wherein the upstream outer bent surface includes an upstream outer curved surface (411) that is stretched between an upstream end portion and a downstream end portion of the upstream bent path and is curved along the upstream bent path.

[Feature Da10]

The physical quantity measurement device according to any one of features Da1 to Da12, wherein an inner surface of the housing includes an inner measurement bent surface (402) that is bent so as to bulge toward the physical quantity sensor in a state of being stretched between the measurement entrance and the measurement exit, and forms the measurement flow path from an inside of a bend.

[Feature Da11]

The physical quantity measurement device according to any one of features Da1 to Da13, wherein an inner surface of the housing includes a pair of wall surfaces (103, 104) that form the measurement flow path and face each other with the upstream outer bent surface and the downstream outer bent surface interposed between the pair of wall surfaces, and the measurement exit is provided on at least one of the pair of wall surfaces in an orientation where the measurement flow path is opened in an orthogonal direction (X) where the pair of wall surfaces are arranged and orthogonal to the arrangement line.

[Features of Configuration Group E>

The configuration disclosed in the present description includes the features of the configuration group E as follows.

[Feature E1]

A physical quantity measurement device (20) configured to measure a physical quantity of a fluid, the physical quantity measurement device including:

a measurement flow path (32) including a measurement entrance (35) through which a fluid flows in and a measurement exit (36) through which a fluid flowing in through the measurement entrance flows out;

a physical quantity sensor (22) that is provided in a measurement flow path and configured to detect a physical quantity of the fluid;

a sensor support portion (51) that supports the physical quantity sensor in the measurement flow path; and a housing (21) that forms the measurement flow path, wherein the measurement flow path includes a sensor path (405) that is provided with the physical quantity sensor, an upstream bent path (406) that is provided between the sensor path and the measurement entrance in the measurement flow path and is bent so as to extend from the sensor path toward the measurement entrance in the housing, and a downstream bent path (407) that is provided between the sensor path and the measurement exit in the measurement flow path and is bent so as to extend from the sensor path toward the measurement exit in the housing, the housing includes a measurement narrowing portion (111, 112) that gradually reduces and narrows the measurement flow path from a measurement entrance side toward the physical quantity sensor, and on an assumption of an arrangement line (CL31) as an imaginary straight line passing through the physical quantity sensor and extending in an arrangement direction (Z) of the upstream bent path and the downstream bent path, in an arrangement cross section (CS41) extending along the arrangement line, an upstream end portion (55*c*, 471) of the sensor support portion is provided on an upstream side relative to the measurement narrowing portion.

[Feature E2]

The physical quantity measurement device according to feature E1, wherein the upstream end portion of the sensor support portion includes an upstream inclined portion (471), which is inclined with respect to the arrangement cross section and across the upstream end portion of the measurement narrowing portion in the arrangement direction.

[Feature E3]

The physical quantity measurement device according to feature E1 or E2, wherein a downstream end portion (55*d*, 472) of the sensor support portion is provided on an upstream side relative to a downstream end portion (111*c*, 112*c*) of the measurement narrowing portion in the arrangement cross section.

[Feature E4]

The physical quantity measurement device according to feature E3, wherein the downstream end portion of the sensor support portion includes a downstream inclined portion (472), which is inclined with respect to the arrangement cross section and across the downstream end portion of the measurement narrowing portion in the arrangement direction.

[Feature E5]

The physical quantity measurement device according to any one of features E1 to E4, wherein the measurement narrowing portion includes a measurement narrowing surface (431, 441) that forms an inner surface of the housing and gradually reduces and narrows the measurement flow path from a measurement entrance side toward the physical quantity sensor, and a measurement expansion surface (432, 442) that gradually expands the measurement flow path from a physical quantity sensor side toward the measurement exit, and a length dimension (W33*a*, W33*b*) of the measurement expansion surface is larger than a length dimension (W32*a*, W32*b*) of the measurement narrowing surface in the arrangement direction arrangement direction.

[Feature E6]

The physical quantity measurement device according to any one of features E1 to E5, wherein the physical quantity sensor is mounted on a front surface (55*e*), which is one surface of the sensor support portion, an inner surface of the housing includes a front measurement wall surface (103), which faces the front surface of the sensor support portion, and a back measurement wall surface (104), which faces a back surface (**55*f*) opposite from the front surface of the sensor support portion, as a pair of wall surfaces that form the measurement flow path and face each other with the sensor support portion interposed between the front measurement wall surface and the back measurement wall surface, and, the housing includes as the measurement narrowing portion, a front narrowing portion (111**) that is provided at a position facing the physical quantity sensor on the front measurement wall surface.

[Feature E7]

The physical quantity measurement device according to feature E6, wherein the housing includes as the measurement narrowing portion, a back narrowing portion (112) that is provided at a position opposite from the front narrowing portion on the back measurement wall surface with the physical quantity sensor interposed between the back measurement wall surface and the front measurement wall surface.

[Feature E8]

The physical quantity measurement device according to feature E7, wherein a separation distance (D33a) between the sensor support portion and the front narrowing portion is smaller than a separation distance (D33b) between the sensor support portion and the back narrowing portion in the arrangement cross section.

[Feature E9]

The physical quantity measurement device according to feature E7 or E8, wherein a center line (CL4) of the measurement flow path passes through a center (CO2) of the measurement entrance and a center (CO3) of the measurement exit, and extends along the measurement flow path, the front narrowing portion includes a front top portion (**111*a*) as a top portion at which a separation distance (W2) between the front narrowing portion and the center line of the measurement flow path is minimized, the back narrowing portion includes a back top portion (112*a*) as a top portion at which a separation distance (W3**) between the back narrowing portion and the center line of the measurement flow path is minimized, and a reduction rate at which the front narrowing portion reduces the measurement flow path is larger than a reduction rate at which the back narrowing portion reduces the measurement flow path.

[Feature E07]

The physical quantity measurement device according to any one of features E1 to E9, wherein, in the measurement flow path, the physical quantity sensor is provided in accordance with a position where a flow velocity is maximized by the measurement narrowing portion narrowing the measurement flow path.

[Feature E08]

The physical quantity measurement device according to any one of features E1 to E10, wherein the upstream end portion of the sensor support portion is provided on the upstream bent path in the arrangement cross section.

[Feature E09]

The physical quantity measurement device according to any one of features E1 to E11, wherein an opening area of the measurement exit is smaller than an opening area of the measurement entrance.

[Feature E10]

The physical quantity measurement device according to any one of features E1 to E12, comprising:

a passage flow path (31) including a passage entrance (33) through which a fluid flows in and a passage exit (34) from which the fluid flowing in from the passage entrance flows out, wherein the measurement flow path is a branch flow path branched from the passage flow path, and an opening area of the passage exit is smaller than an opening area of the passage entrance.

[Features of Configuration Group F>

The configuration disclosed in the present description includes the features of the configuration group F as follows.

[Feature F1]

A physical quantity measurement device (20) configured to measure a physical quantity of a fluid, the physical quantity measurement device comprising:

a measurement flow path (32) that is configured to cause fluid to flow therethrough;

a physical quantity sensor (22) that is provided in a measurement flow path and configured to detect a physical quantity of the fluid; and a sensor support portion (51) that supports the physical quantity sensor, wherein the physical quantity sensor includes a sensor recess portion (61), which is a recess portion provided on a sensor back surface (**22*b*), which is one surface of the physical quantity sensor, and a membrane portion (62), which forms a sensor recess bottom surface (501), which is a bottom surface of the sensor recess portion, and is provided with a detection element (71 to 74) configured to detect a physical quantity of the fluid, and the sensor support portion includes a back support portion (522), which extends along the sensor back surface and is provided so as to cover a sensor recess opening (503), which is an opening of the sensor recess portion, a support recess portion (530), which is a recess portion provided on a support back surface (55*f*), which is a surface of the back support portion on a side opposite from the physical quantity sensor, a support hole (540), which extends from a support recess bottom portion (531), which is a bottom surface of the support recess portion, toward the sensor recess portion, penetrates the back support portion, and communicates with the sensor recess opening, and a support recess inner wall surface (532), which is included in an inner surface of the support recess portion together with the support recess bottom portion, extends from the support recess bottom portion toward a side opposite from the physical quantity sensor, and is inclined with respect to a center line (CL52**) of the support hole so as to face a side opposite from the physical quantity sensor.

[Feature F2]

The physical quantity measurement device according to feature F1, wherein an outer peripheral edge of the support recess bottom portion is provided at a position separated outward from a back end portion (542), which is an end portion of the support hole on a side opposite from the physical quantity sensor.

[Feature F3]

The physical quantity measurement device according to feature F1 or F2, wherein the outer peripheral edge of the support recess bottom portion is provided at a position separated outward from the sensor recess opening in directions (Y, Z) orthogonal to the center line of the support hole.

[Feature F4]

The physical quantity measurement device according to any one of features F1 to F3, wherein a length dimension (L51) of a support recess inner wall surface in directions (Y, Z) orthogonal to the center line of the support hole is larger than a length dimension (L52) of a support recess inner wall surface in a direction (X) in which the center line of the support hole extends.

[Feature F5]

The physical quantity measurement device according to any one of features F1 to F4, wherein a length dimension (L54) of the support hole is smaller than a depth dimension (L52) of the support recess portion in a direction (X) in which the center line of the support hole extends.

[Feature F6]

A physical quantity measurement device (20) configured to measure a physical quantity of a fluid, the physical quantity measurement device comprising:

a measurement flow path (32) that is configured to cause fluid to flow therethrough;

a physical quantity sensor (22) that is provided in a measurement flow path and configured to detect a physical quantity of the fluid; and a sensor support portion (51) that supports the physical quantity sensor, wherein the physical quantity sensor includes a sensor recess portion (61), which is a recess portion provided on a sensor back surface (22*b*), which is one surface of the physical quantity sensor, and a membrane portion (62), which forms a sensor recess bottom surface (501), which is a bottom surface of the sensor recess portion, and is provided with a detection element (71 to 74) configured to detect a physical quantity of the fluid, and the sensor support portion includes a back support portion (522), which extends along the sensor back surface and covers a sensor recess opening (503), which is an opening of the sensor recess portion, a support projection portion (710), which is a projection portion provided on a support back surface (55*f*), which is a surface of the back support portion on a side opposite from the physical quantity sensor, a support hole (720), which extends from a support projection tip end portion (711), which is a tip end portion of the support projection portion, toward the sensor recess portion, penetrates the back support portion, and communicates with the sensor recess opening, and a support projection outer wall surface (712), which is included in an outer surface of the support projection portion together with the support projection tip end portion, extends from the support projection tip end portion toward the physical quantity sensor, and is inclined with respect to a center line (CL152) of the support hole so as to face a side opposite from the physical quantity sensor.

[Feature F7]

The physical quantity measurement device according to feature F6, wherein an outer peripheral edge of the support projection tip end portion is provided at a position separated outward from a back end portion (722), which is an end portion of the support hole on a side opposite from the physical quantity sensor.

[Feature F8]

The physical quantity measurement device according to feature F6 or F7, wherein the outer peripheral edge of the support projection tip end portion is provided at a position separated outward from the sensor recess opening in directions (Y, Z) orthogonal to the center line of the support hole.

[Feature F9]

The physical quantity measurement device according to any one of features F6 to F8, wherein a length dimension (L151) of the support projection outer wall surface in directions (Y, Z) orthogonal to the center line of the support hole is larger than a length dimension (L152) of the support projection outer wall surface in direction (X) in which the center line of the support hole extends.

[Features of Configuration Group G>

The configuration disclosed in the present description includes the features of the configuration group G as follows.

[Feature G1]

A physical quantity measurement device (20) configured to measure a physical quantity of a fluid, the physical quantity measurement device comprising:

a measurement flow path (32) that is configured to cause fluid to flow therethrough;

a physical quantity sensor (22) that detects a physical quantity of a fluid in the measurement flow path;

a sensor support portion (51) that supports the physical quantity sensor; and a flow path housing portion (151) that forms the measurement flow path and supports the sensor support portion, wherein the sensor support portion includes a support tip end portion (55*a*, 900*a*), which is one end portion provided in the measurement flow path, and a support front surface (55*e*, 901) that includes a front fixed portion (810, 910), which is provided at a position separated from the support tip end portion and fixed to an inner surface of the flow path housing portion, the support front surface being a surface on a side where the physical quantity sensor is exposed, and the physical quantity sensor includes a sensor exposure surface (870) exposed from the support front surface, and in a height direction (Y) in which the support tip end portion and the front fixed portion are arranged, a separation distance (L62*a*, L72*a*) between a front fixed base end portion (814, 914), which is an end portion of the front fixed portion on a side opposite from the support tip end portion, and an exposed base end portion (872), which is an end portion of the sensor exposure surface on a side opposite from the support tip end portion, is smaller than a separation distance (L61*a*, L71*a*) between the exposed base end portion and the support tip end portion.

[Feature G2]

The physical quantity measurement device according to feature G1, wherein, in the height direction, a front fixed tip end portion (813, 913), which is an end portion of the front fixed portion on a support tip end portion side, is provided between a sensor tip end portion (861), which is an end portion of the physical quantity sensor on a support tip end portion side, and a sensor base end portion (862), which is an end portion of the physical quantity sensor on a side opposite from the sensor tip end portion.

[Feature G3]

The physical quantity measurement device according to feature G1 or G2, wherein the sensor support portion includes a support back surface (55*f*), which includes a back fixed portion (820, 920) provided at a position separated from the support tip end portion and fixed to an inner surface of the flow path housing portion, the support back surface being a surface opposite from the support front surface, and in the height direction, a separation distance (L62*b*, L72*b*) between a back fixed base end portion (824, 924), which is an end portion of the back fixed portion on a side opposite from the support tip end portion, and the exposed base end portion is smaller than a separation distance (L61a, L71a) between the exposed base end portion and the support tip end portion.

[Feature G4]

The physical quantity measurement device according to feature G3, wherein a separation distance (L62a) between the front fixed base end portion and the exposed base end portion is different from a separation distance (L62b) between the back fixed base end portion and the exposed base end portion.

[Feature G5]

The physical quantity measurement device according to any one of features G1 to G4, wherein the physical quantity sensor includes a conductive layer (66b), which has conductivity, extends along the sensor exposure surface, and restricts the physical quantity sensor from deforming in a direction (X) orthogonal to the sensor exposure surface.

[Feature G6]

The physical quantity measurement device according to feature G5, wherein the conductive layer is formed of platinum.

[Feature G7]

The physical quantity measurement device according to any one of features G1 to G6, comprising:

a support plate portion (53), which supports the physical quantity sensor in a state of being overlapped on a sensor back surface (22b) of the physical quantity sensor on a side opposite from the sensor exposure surface; and a bonding portion (67), which bonds the physical quantity sensor and the support plate portion to each other, and is deformed along with deformation of the support plate portion to restrict deformation of the physical quantity sensor.

[Feature G8]

The physical quantity measurement device according to feature G7, wherein the bonding portion is formed to include a silicon resin.

[Features of Configuration Group Z>

The configuration disclosed in the present description includes the features of the configuration group Z as follows.

[Feature Z1]

A physical quantity measurement device (20) configured to measure a physical quantity of a fluid, the physical quantity measurement device, comprising:

a measurement flow path (32) including a measurement entrance (35) through which a fluid flows in and a measurement exit (36) through which a fluid flowing in through the measurement entrance flows out;

a physical quantity sensor (22) that is provided in a measurement flow path and configured to detect a physical quantity of the fluid; and a housing (21) that forms the measurement flow path.

According to the feature Z1, the physical quantity sensor can detect the physical quantity of the fluid flowing into the measurement flow path from the measurement entrance. Of the configurations disclosed in the present description, configurations not included in the feature Z1 are not essential configurations. Although there are several problems in the present description, the configuration group Z is an essential configuration for solving these problems.

Although the present disclosure has been described in accordance with the embodiments, it is understood that the present disclosure is not limited to the embodiments and structures. The present disclosure also includes various modifications and modifications within equivalent ranges. In addition, various combinations and forms, and other combinations and forms including only one element, more elements, or less elements are also within the scope and idea of the present disclosure.

What is claimed is:

1. A physical quantity measurement device configured to measure a physical quantity of a fluid, the physical quantity measurement device comprising:

a measurement flow path that is configured to cause fluid to flow therethrough;

a physical quantity sensor that is provided in a measurement flow path and configured to detect a physical quantity of the fluid;

a sensor support portion that supports the physical quantity sensor;

a flow path housing portion that forms the measurement flow path and supports the sensor support portion, wherein the sensor support portion includes a support tip end portion, which is one end portion provided in the measurement flow path, and a support front surface, which includes a front fixed portion, which is provided at a position separated from the support tip end portion and fixed to an inner surface of the flow path housing portion, the support front surface being a surface on a side where the physical quantity sensor is exposed, the physical quantity sensor includes a sensor exposure surface exposed from the support front surface, and a membrane portion provided with a detection element, which is configured to detect the physical quantity of the fluid, and forming a part of the sensor exposure surface, in a height direction in which the support tip end portion and the front fixed portion are arranged, a separation distance between a front fixed base end portion, which is an end portion of the front fixed portion on a side opposite from the support tip end portion, and an exposed base end portion, which is an end portion of the sensor exposure surface on a side opposite from the support tip end portion, is smaller than a separation distance between the exposed base end portion and the support tip end portion and in the height direction, the membrane portion is provided at a position closer to the exposed base end portion than the support tip end portion.

2. The physical quantity measurement device according to claim 1, wherein the sensor support portion includes a support back surface, which includes a back fixed portion provided at a position separated from the support tip end portion and fixed to the inner surface of the flow path housing portion, the support back surface being a surface opposite from the support front surface, and in the height direction, the separation distance between the front fixed base end portion and the exposed base end portion is different from a separation distance between a back fixed base end portion, which is an end portion of the back fixed portion on a side opposite from the support tip end portion, and the exposed base end portion.

3. The physical quantity measurement device according to claim 1, wherein in the height direction, a front fixed tip end portion, which is an end portion of the front fixed portion on a side of the support tip end portion, is provided between a sensor tip end portion, which is an end portion of the physical quantity sensor on a side of the support tip end portion, and a sensor base end portion, which is an end portion of the physical quantity sensor on a side opposite from the sensor tip end portion.

4. The physical quantity measurement device according to claim 1, wherein the physical quantity sensor includes a conductive layer, which has a conductivity and extends along the sensor exposure surface, and the conductive layer restricts the physical quantity sensor from deforming in a direction orthogonal to the sensor exposure surface.

5. The physical quantity measurement device according to claim 4, wherein the conductive layer is formed of platinum.

6. The physical quantity measurement device according to claim 1, further comprising:

a support plate portion, which supports the physical quantity sensor in a state of being overlapped on a sensor back surface of the physical quantity sensor on a side opposite from the sensor exposure surface; and a bonding portion, which bonds the physical quantity sensor and the support plate portion to each other, and is configured to be deformed along with deformation of the support plate portion to restrict deformation of the physical quantity sensor.

7. The physical quantity measurement device according to claim 6, wherein the bonding portion is formed to include a silicon resin.

8. A physical quantity measurement device configured to measure a physical quantity of a fluid, the physical quantity measurement device comprising:

a measurement flow path that is configured to cause fluid to flow therethrough;

a physical quantity sensor that is provided in a measurement flow path and configured to detect a physical quantity of the fluid;

a sensor support portion that supports the physical quantity sensor; and a flow path housing portion that forms the measurement flow path and supports the sensor support portion, wherein the sensor support portion includes a support tip end portion, which is one end portion provided in the measurement flow path, and a support front surface, which includes a front fixed portion, which is provided at a position separated from the support tip end portion and fixed to an inner surface of the flow path housing portion, the support front surface being a surface on a side where the physical quantity sensor is exposed, the physical quantity sensor includes a sensor exposure surface exposed from the support front surface, and a membrane portion in a film shape provided with a detection element, which is configured to detect the physical quantity of the fluid, and forming a part of the sensor exposure surface, and in a height direction in which the support tip end portion and the front fixed portion are arranged, the membrane portion is provided at a position closer to an exposed base end portion, which is an end portion of the sensor exposure surface on a side opposite from the support tip end portion, than the support tip end portion.

9. The physical quantity measurement device according to claim 8, wherein the sensor support portion includes a support back surface, which includes a back fixed portion provided at a position separated from the support tip end portion and fixed to the inner surface of the flow path housing portion, the support back surface being a surface opposite from the support front surface, and in the height direction, a separation distance between a front fixed base end portion, which is an end portion of the front fixed portion on a side opposite from the support tip end portion, and the exposed base end portion is different from a separation distance between a back fixed base end portion, which is an end portion of the back fixed portion on a side opposite from the support tip end portion, and the exposed base end portion.

10. The physical quantity measurement device according to claim 9, wherein in the height direction, a separation distance between a back fixed base end portion, which is an end portion of the back fixed portion on a side opposite from the support tip end portion, and the exposed base end portion is smaller than the separation distance between the exposed base end portion and the support tip end portion.

11. A physical quantity measurement device configured to measure a physical quantity of a fluid, the physical quantity measurement device comprising:

a measurement flow path that is configured to cause fluid to flow therethrough;

a physical quantity sensor that is provided in a measurement flow path and configured to detect a physical quantity of the fluid;

a sensor support portion that supports the physical quantity sensor; and a flow path housing portion that forms the measurement flow path and supports the sensor support portion, wherein the sensor support portion includes a support tip end portion, which is one end portion provided in the measurement flow path, a support front surface, which includes a front fixed portion, which is provided at a position separated from the support tip end portion and fixed to an inner surface of the flow path housing portion, the support front surface being a surface on a side where the physical quantity sensor is exposed, and a support back surface, which includes a back fixed portion provided at a position separated from the support tip end portion and fixed to the inner surface of the flow path housing portion, the support back surface being a surface opposite from the support front surface, the physical quantity sensor includes a sensor exposure surface exposed from the support front surface, and in a height direction in which the support tip end portion and the front fixed portion are arranged, a separation distance between a front fixed base end portion, which is an end portion of the front fixed portion on a side opposite from the support tip end portion, and an exposed base end portion, which is an end portion of the sensor exposure surface on a side opposite from the support tip end portion, is different from a separation distance between a back fixed base end portion, which is an end portion of the back fixed portion on a side opposite from the support tip end portion, and the exposed base end portion.

12. The physical quantity measurement device according to claim 11, wherein in the height direction, the separation distance between the front fixed base end portion and the exposed base end portion is larger than the separation distance between the back fixed base end portion and the exposed base end portion.

13. The physical quantity measurement device according to claim 11, wherein the physical quantity sensor includes a membrane portion in a film shape provided with a detection element, which is configured to detect the physical quantity of the fluid, and forming a part of the sensor exposure surface, and in the height direction, the membrane portion is provided at a position closer to the exposed base end portion than the support tip end portion.

14. The physical quantity measurement device according to claim 11, wherein the sensor support portion includes a protection resin portion, which is formed of a resin material and protects the physical quantity sensor, wherein in the height direction, a separation distance between an opposite end portion of the protection resin portion, which is on an opposite side from the support tip end portion, and the exposed base end portion is larger than the separation distance between the exposed base end portion and the support tip end portion.

15. A physical quantity measurement device configured to measure a physical quantity of a fluid, the physical quantity measurement device comprising:

a measurement flow path that is configured to cause fluid to flow therethrough;

a physical quantity sensor that is provided in a measurement flow path and configured to detect a physical quantity of the fluid;

a sensor support portion that supports the physical quantity sensor; and a flow path housing portion that forms the measurement flow path and supports the sensor support portion, wherein the sensor support portion includes a support tip end portion, which is one end portion provided in the measurement flow path, and a support front surface, which includes a front fixed portion, which is provided at a position separated from the support tip end portion and fixed to an inner surface of the flow path housing portion, the support front surface being a surface on a side where the physical quantity sensor is exposed, the physical quantity sensor includes a sensor exposure surface exposed from the support front surface, and in a height direction in which the support tip end portion and the front fixed portion are arranged, a separation distance between a front fixed base end portion, which is an end portion of the front fixed portion on a side opposite from the support tip end portion, and an exposed base end portion, which is an end portion of the sensor exposure surface on a side opposite from the support tip end portion, is smaller than a separation distance between the exposed base end portion and the support tip end portion.

* * * * *